United States Patent
Ahlfeld et al.

(10) Patent No.: US 9,941,025 B2
(45) Date of Patent: Apr. 10, 2018

(54) NUCLEAR FUEL AND METHOD OF FABRICATING THE SAME

(75) Inventors: Charles E. Ahlfeld, LaJolla, CA (US); William W. Bowen, Kennewick, WA (US); Roderick A. Hyde, Redmond, WA (US); Ronald L. Klueh, Knoxville, TN (US); Sean M. McDeavitt, Bryan, TX (US); Joshua C. Walter, Kirkland, WA (US); Steven R. Kirkendall, Richland, WA (US)

(73) Assignee: TerraPower, LLC, Bellevue, WA (US)

( * ) Notice: Subject to any disclaimer, the term of this patent is extended or adjusted under 35 U.S.C. 154(b) by 1991 days.

(21) Appl. No.: 13/066,253

(22) Filed: Apr. 8, 2011

(65) Prior Publication Data

US 2012/0257707 A1   Oct. 11, 2012

(51) Int. Cl.
| | |
|---|---|
| G21C 3/17 | (2006.01) |
| G21C 3/16 | (2006.01) |
| G21C 3/58 | (2006.01) |
| G21C 3/62 | (2006.01) |
| G21C 21/04 | (2006.01) |
| G21C 3/04 | (2006.01) |

(52) U.S. Cl.
CPC ............ *G21C 3/16* (2013.01); *G21C 3/044* (2013.01); *G21C 3/17* (2013.01); *G21C 3/58* (2013.01); *G21C 3/623* (2013.01); *G21C 21/04* (2013.01); *Y02E 30/38* (2013.01)

(58) Field of Classification Search
CPC .......... G21C 3/17; G21C 3/041; G21C 3/044; G21C 3/58; G21C 3/60; G21C 3/626
See application file for complete search history.

(56) References Cited

U.S. PATENT DOCUMENTS

| | | | |
|---|---|---|---|
| 3,146,173 A | 8/1964 | Fortescue et al. |
| 3,285,737 A | 11/1966 | Bellamy |
| 3,743,576 A | 7/1973 | Fortescue |
| 3,833,470 A | 9/1974 | Gyarmati et al. |
| 4,020,131 A | 4/1977 | Feraday |
| 4,264,540 A | 4/1981 | Butler |
| 5,596,615 A | 1/1997 | Nakamura et al. |
| 5,841,200 A | 11/1998 | Bauer et al. |
| 6,221,286 B1 | 4/2001 | Dehaudt et al. |

(Continued)

FOREIGN PATENT DOCUMENTS

| | | |
|---|---|---|
| EP | 502395 B1 * | 8/1995 |
| EP | 0502395 | 12/2002 |

OTHER PUBLICATIONS

Denis, A., and Piotrikowski, R. "A Fission Gas Release Model," Proc. Tech. Comm. Meeting on Water Reactor Fuel Element Modeling at High Burnup and Experimental Support, IAEA-TECDOC-957, pp. 455-465. (Year: 1997).*

(Continued)

*Primary Examiner* — Sharon M Davis

(57) ABSTRACT

A nuclear fuel includes a volume of a nuclear fuel material defined by a surface, the nuclear fuel material including a plurality of grains, some of the plurality of grains having a characteristic length along at least one dimension that is smaller than or equal to a selected distance, wherein the selected distance is suitable for maintaining adequate diffusion of a fission product from a grain interior to a grain boundary in some of the grains, the nuclear fuel material including a boundary network configured to transport the fission product from at least one grain boundary of some of the grains to the surface of the volume of the nuclear fuel material.

85 Claims, 199 Drawing Sheets

(56) References Cited

U.S. PATENT DOCUMENTS

| | | | |
|---|---|---|---|
| 6,808,656 B2 | 10/2004 | Gradel et al. | |
| 2002/0149125 A1* | 10/2002 | Gradel | G21C 3/623 264/0.5 |
| 2009/0080592 A1 | 3/2009 | Arsenlis et al. | |
| 2009/0252279 A1 | 10/2009 | Dorr et al. | |
| 2009/0324953 A1* | 12/2009 | Spino et al. | 428/402 |
| 2010/0091933 A1* | 4/2010 | Song | G21C 3/58 376/414 |

OTHER PUBLICATIONS

Denis, A. and Soba, A. "Simulation of pellet-cladding thermomechanical interaction and fission gas release," Nuclear Engineering and Design, 223, pp. 211-229. (Year: 2003).*

Ewing, R. "Long-term storage of spent nuclear fuel," Nature Materials, Mar. 14, 2015, pp. 252-257. (Year: 2015).*

Elsner et al.; "Thermionic Space Power Reactor System Research and Development"; Annual Summary Report; bearing a date of Dec. 17, 1963; pp. 1-125.

Jagielski et al.; "Effect of Grain Size on Mechanical Properties of Irradiated Mono- and Polycrystalline $MgAl_2O_4$"; Acta Physica Polonica A; bearing a date of 2011; pp. 118-121; vol. 120, No. 1.

PCT International Search Report; International App. No. PCT/US12/32485; dated Sep. 25, 2012; pp. 1-5.

Veshchunov, M.S.; "A New Model of Grain Growth Kinetics in $UO_2$ Fuel Pellets. Part I: Grain Growth Kinetics Controlled by Grain Face Bubble Migration"; Journal of Nuclear Materials; bearing a date of 2005, accepted on Jun. 10, 2005; pp. 208-219; vol. 346; Elsevier B.V.

* cited by examiner

NUCLEAR FUEL AND METHOD OF FABRICATING THE SAME

TECHNICAL FIELD

The present disclosure generally relates to nuclear fuel and a method for fabricating a nuclear fuel, and, more particularly, to a swelling resistant nuclear fuel and a method for fabricating a swelling resistant nuclear fuel.

SUMMARY

In one aspect, a nuclear fuel includes, but is not limited to, a volume of a nuclear fuel material defined by a surface, the nuclear fuel material including a plurality of grains, some of the plurality of grains having a characteristic length along at least one dimension smaller than or equal to a selected distance, the selected distance suitable for maintaining adequate diffusion of a fission product from a grain interior to at least one grain boundary in some of the grains, the nuclear fuel material including a boundary network configured to transport the fission product from at least one grain boundary of some of the grains to the surface of the volume of the nuclear fuel material.

In another aspect, a nuclear fuel includes, but is not limited to, a volume of a nuclear fuel material defined by a surface, the nuclear fuel material including a plurality of nuclear fuel elements, the nuclear fuel elements including a metal, some of the plurality of nuclear fuel elements having a characteristic length along at least one dimension smaller than or equal to a selected distance, the selected distance suitable for maintaining adequate diffusion of a fission product from a nuclear fuel element interior to at least one free surface in some of the nuclear fuel elements, the plurality of nuclear fuel elements consolidated to a selected density.

In another aspect, a nuclear fuel includes, but is not limited to, a volume of a nuclear fuel material defined by a surface, the nuclear fuel material including a plurality of nuclear fuel elements, the nuclear fuel elements including a ceramic material, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, the plurality of nuclear fuel elements consolidated to a selected density, the nuclear fuel material including a boundary network configured to transport the fission product from at least one free surface of some of the nuclear fuel elements to the surface of the volume of the nuclear fuel material.

In another aspect, a nuclear fuel includes, but is not limited to, a volume of a nuclear fuel material defined by a surface, the nuclear fuel material including a plurality of nuclear fuel elements, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, and a plurality of dispersant particles dispersed within the volume of a nuclear fuel material, wherein some of the dispersant particles are configured to create preferential fission product occupation sites within the nuclear fuel material.

In one aspect, a method for fabricating a nuclear fuel may include, but is not limited to, providing a nuclear fuel material, the nuclear fuel material consolidated into a solid volume of nuclear fuel material having a surface, the consolidated nuclear fuel material including a plurality of grains, and performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains.

In another aspect, a method for fabricating a nuclear fuel may include, but is not limited to, providing a plurality of nuclear fuel elements, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, some of the nuclear fuel elements including a metal nuclear fuel material, and consolidating the plurality of nuclear fuel elements into a volume of nuclear fuel material having a surface.

In another aspect, a method for fabricating a nuclear fuel may include, but is not limited to, providing a plurality of nuclear fuel elements, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, some of the nuclear fuel elements including a ceramic nuclear fuel material, and consolidating the plurality of nuclear fuel elements into a volume of nuclear fuel material having a surface, the volume of nuclear fuel material including a boundary network configured to transport the fission product from at least one free surface of some of the nuclear fuel elements to the surface of the volume of the nuclear fuel material.

In another aspect, a method for fabricating a nuclear fuel may include, but is not limited to, providing a nuclear fuel material, dispersing a plurality of dispersant particles within the nuclear fuel material, wherein some of the dispersant particles are configured to create preferential fission product occupation sites within the nuclear fuel material, consolidating the nuclear fuel material into a volume of nuclear fuel material having a surface, the consolidated nuclear fuel material including a plurality of grains, and performing one or more processes on the consolidated volume of nuclear fuel material in order to obtain a characteristic length along at least one dimension of some of the grains smaller than or equal to a selected distance, wherein the selected distance is suitable for maintaining adequate diffusion of a fission product from a grain interior to at least one grain boundary in some of the grains.

In another aspect, a method for fabricating a nuclear fuel may include, but is not limited to, providing a plurality of nuclear fuel elements, some of the plurality of nuclear fuel elements having a characteristic length along at least one dimension smaller than or equal to a selected distance, the selected distance suitable for maintaining adequate diffusion of a fission product from a nuclear fuel element interior to at least one free surface in some of the nuclear fuel elements, dispersing a plurality of dispersant particles within the plurality of nuclear fuel elements, wherein some of the dispersant particles are configured to create preferential fission product occupation sites within the nuclear fuel material, and consolidating the plurality of nuclear fuel elements into a volume of nuclear fuel material having a surface.

In addition to the foregoing, various other nuclear fuel and/or method aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 2I is a schematic diagram illustrating a nuclear fuel formed via mechanical processing.

DETAILED DESCRIPTION

Figure 1A:
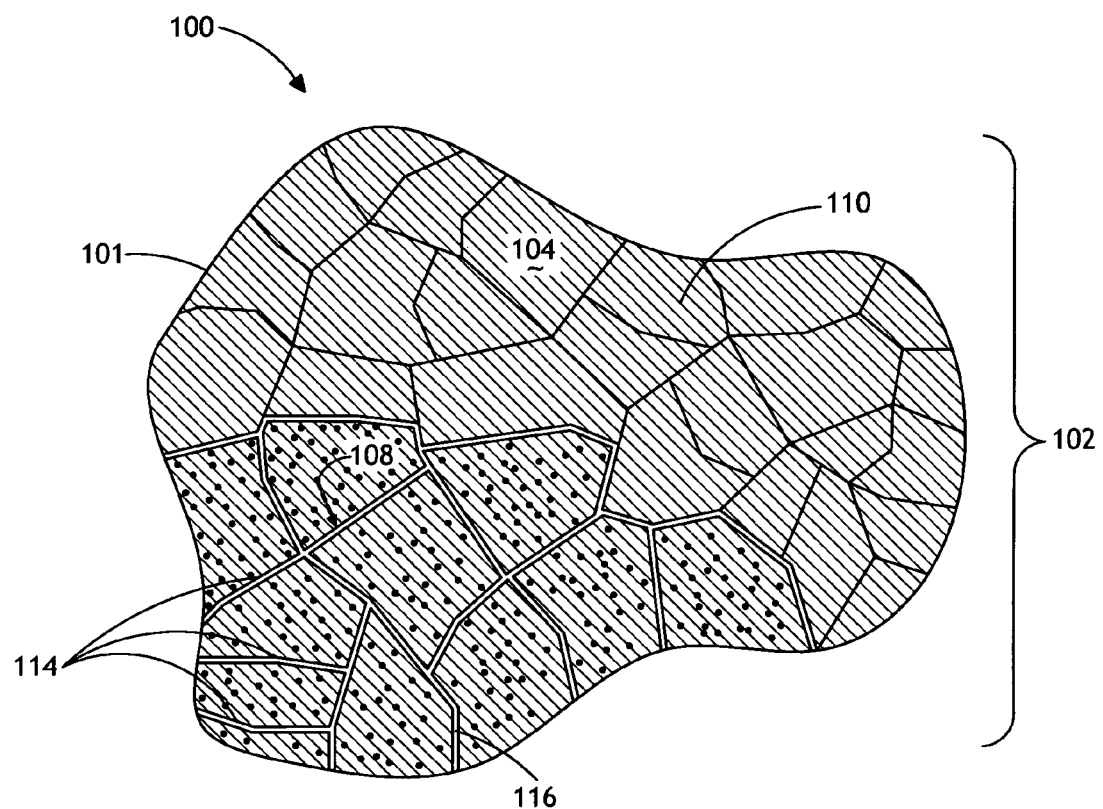
FIG. 1A is a schematic diagram illustrating a nuclear fuel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 4, a nuclear fuel and a method for fabricating a nuclear fuel are described. The nuclear fuel of the present disclosure may be structured in order to provide a more efficient release of a fission product 108 (e.g., fission gas 118, fission liquid 119, or fission solid 120) created within a volume of the nuclear fuel during a fission reaction process. The efficient release of fission gas 118, for instance, may minimize the growth and development of void regions within the nuclear fuel volume. As pressure builds within the void regions the resultant force may lead the nuclear fuel to "swell." As the nuclear fuel swells, the outer surface of the nuclear fuel volume may exert a force on the surrounding cladding. Moreover, in addition to swelling avoidance, efficient release of fission products 108 may also reduce parasitic neutron capture by the various fission products 108 and the residual decay heat from the nuclear fuel.

Figure 1B:
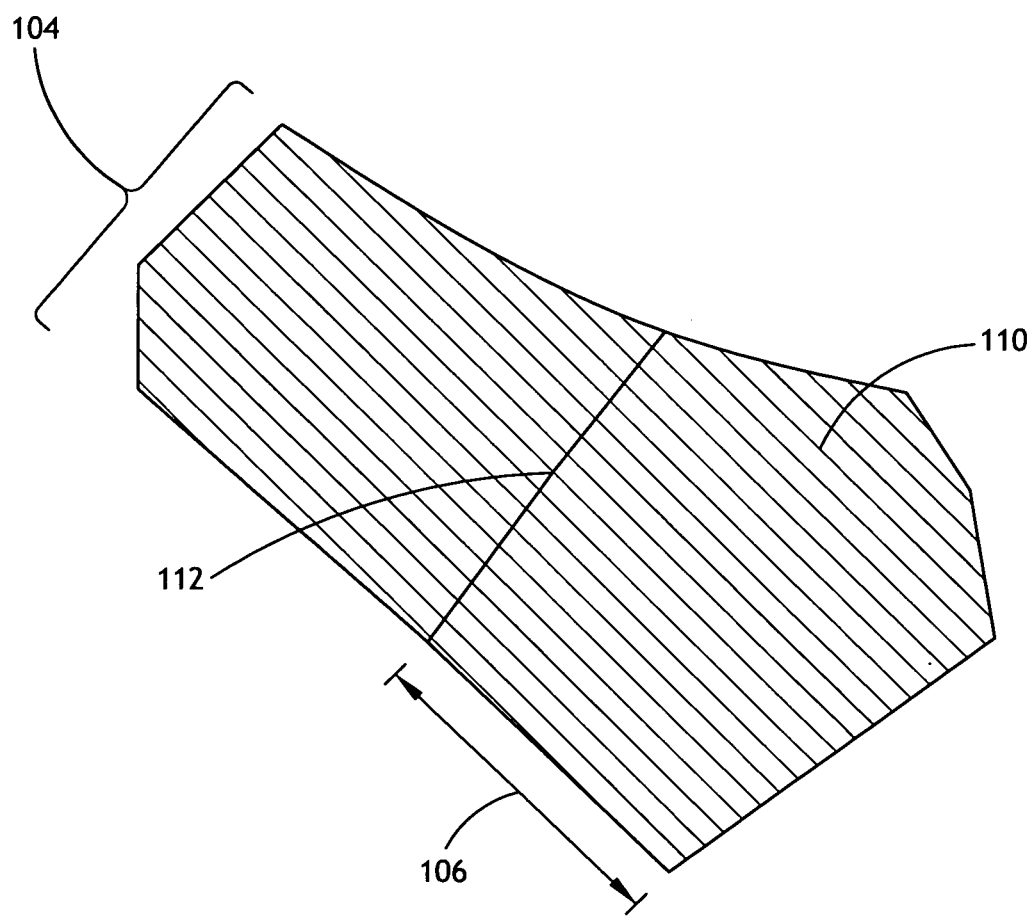
FIG. 1B is a schematic diagram illustrating a pair of adjacent grains of the nuclear fuel.

Referring now to FIGS. 1A and 1B, a nuclear fuel 100 and methods for making a nuclear fuel are described in accordance with the present disclosure. A given volume 102 of a nuclear fuel 100 may include a plurality of grains 104 of one or more nuclear fuel materials. The one or more nuclear fuel materials of the nuclear fuel 100 may be microstructurally engineered such that the grains 104 of the nuclear fuel material 100 have a characteristic length 106 along at least one dimension that is smaller than or equal to a selected distance. The distance may be selected based on a critical distance necessary to maintain an adequate level of diffusion of a fission product 108, such as a gaseous fission product 118 (e.g., krypton or xenon), a liquid fission product 119 (e.g., liquid sodium), or a solid fission product 120 (e.g., tellurium or cesium), from the interior 110 of the grains 104 to the grain-boundaries 112 of the grains 104. It is recognized that by increasing the ratio between the grain-boundary area and the volume of the grain interior 110 in a given grain 104 the number of fission gas 118 bubbles formed at the grain-boundary 112 as a result of diffusion of fission gas 118 from the grain interior 110 may increase. Therefore, by decreasing the size in one or more dimensions 106 (e.g., average size) of the grains 104 of the nuclear fuel material, thereby increasing the ratio between grain-boundary area and grain interior volume, it is possible to enhance the diffusion of fission gas 118, or other fission products 108, from the grain interiors 110 to the grain-boundaries 112 of the grains 104 of the nuclear fuel 100. In doing so, the likelihood of fission gas nucleation at the grain-boundary 112 may be increased, while the likelihood of fission gas nucleation within the grain interior 110 is simultaneously decreased. In this sense, as the size of one or more grains 104 is decreased in one or more dimensions the fission product 108 (e.g., fission gas 118), which is produced in proportion to the power of the reactor (i.e., flux in reactor core), concentration gradient is increased. The increased fission product concentration aids in regulating the maximum fission product concentration level within the one or more grains 104 of the nuclear fuel 100. Further, the nuclear fuel 100 may include a boundary network 114 configured to transport a fission product 108, such as a fission gas 118, from the grain-boundaries 112 of the grains 104 of the nuclear fuel 100 to the external geometric surface 101 of a given volume 102 of the nuclear fuel 100. If a given fission gas 118 bubble has an open transportation pathway 116 to the geometric surface 101 of the nuclear fuel 100 then the fission gas bubble 118 may be released from the nuclear fuel material volume 102. The aggregated effects of fission gas 118 release across the entire volume 102 of the nuclear fuel 100 may result in a reduction or elimination of swelling in the nuclear fuel 118 upon implementation in an operational setting of a nuclear reactor. In addition to improving fission gas diffusion from a grain-interior 110 to a grain-boundary 112, the engineering of reduced sized grains 104 also increases the spatial density of transportation pathways 116 of the boundary network 114 of the nuclear fuel 100, thereby increasing the likelihood of transportation of a given fission gas bubble from a grain-boundary 112 to the geometric surface 101 of the nuclear fuel 100. In one aspect of the present invention, one or more processes may be utilized in order to achieve the characteristic length 106 along one or more directions (i.e., grain size) of the one or grains 104 required for adequate diffusion of fission products 108 and the boundary network 114 in the nuclear fuel 100. In the context of the present disclosure the term "size" is used interchangeably with "characteristic length along one or more dimensions" and "size along one or more dimensions" for purposes of brevity and clarity.

Figure 1C:
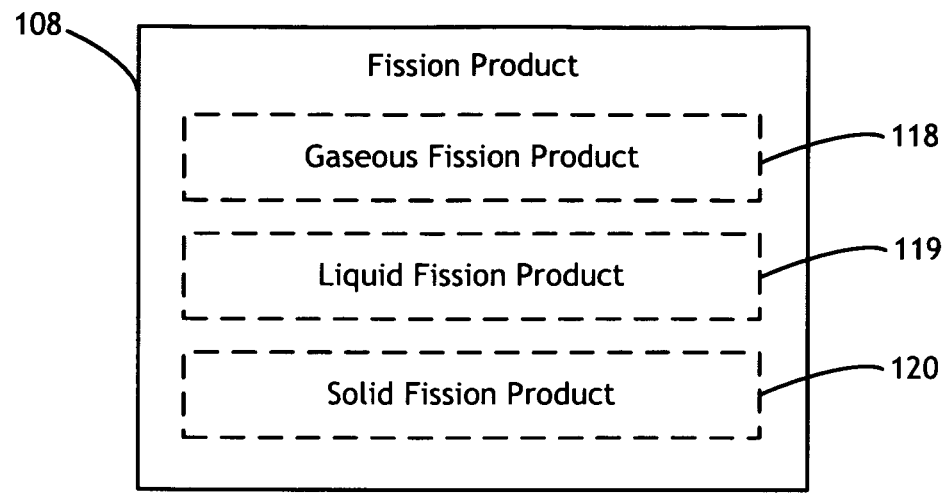
FIG. 1C is a block diagram illustrating types of fission products.

Referring now to FIG. 1C, the fission product 108 produced within the interior 110 of one or more grains 104 of the nuclear fuel 100 may include a fission gas 118, a liquid fission product 119, or a solid fission product. For example, the grains 104 of the nuclear fuel 100 may have a grain size 106 below a critical level required for a fission gas 108 to adequately diffuse from the interiors 110 of the grains 104 of the nuclear fuel to the grain-boundaries 112 of the nuclear fuel 100. For instance the grains 104 of the nuclear fuel 100 may be engineered to have a size smaller than the critical size necessary for adequate diffusion of krypton produced during a fission process within the nuclear fuel 100. In another instance, the grains 104 of the nuclear fuel 100 may be engineered to have a size smaller the critical size necessary for adequate diffusion of xenon produced during a fission process within the nuclear fuel 100. In the case of xenon, which is a fission product of uranium, it is of particular interest to provide a means for efficient transport of the gas from the nuclear fuel 100 interior to the nuclear fuel geometric surface 101. Xenon is a significant neutron absorber and its build up within the nuclear fuel 100 may have a significant negative neutronic impact on a nuclear fuel 100. In another example, the grains 104 of the nuclear fuel 100 may have a grain size 106 below a critical level required for a solid fission product 120 to adequately diffuse from the interiors 110 of the grains 104 of the nuclear fuel to the grain-boundaries 112 of the nuclear fuel 100. For instance, the grains 104 of the nuclear fuel 100 may have a grain size 106 below a critical level required for cesium to adequately diffuse from the interiors 110 of the grains 104 of the nuclear fuel to the grain-boundaries 112 of the nuclear fuel 100. In another example, the grains 104 of the nuclear fuel 100 may have a grain size 106 below a critical level required for a liquid fission product 119 to adequately diffuse from the interiors 110 of the grains 104 of the nuclear fuel to the grain-boundaries 112 of the nuclear fuel 100. For instance, the grains 104 of the nuclear fuel 100 may have a grain size 106 below a critical level required for a liquid metal to adequately diffuse from the interiors 110 of the grains 104 of the nuclear fuel to the grain-boundaries 112 of the nuclear fuel 100.

The diffusion of fission products in uranium dioxide is generally described in S. G. Prussin et al., "Release of fission products (Xe, I, Te, Cs, Mo, and Tc) from polycrystalline $UO_2$," *Journal of Nuclear Materials*, Vol. 154, Issue 1 pp. 25-37 (1988), which is incorporated herein by reference. The diffusion of fission products in thorium metal is generally described in C. H. Fox Jr. et al., "The diffusion of fission products in thorium metal," *Journal of Nuclear Materials*, Vol. 62, Issue 1 pp. 17-25 (1976), which is incorporated herein by reference. The migration of gaseous and solid fission products in a uranium-plutonium mixed oxide fuel is generally described in L. C. Michels et al., "In-pile migration of fission product inclusions in mixed-oxide fuels," *Journal of Applied Physics*, Vol. 44, Issue 3 pp. 1003-1008 (1973), which is incorporated herein by reference.

Figure 1D:
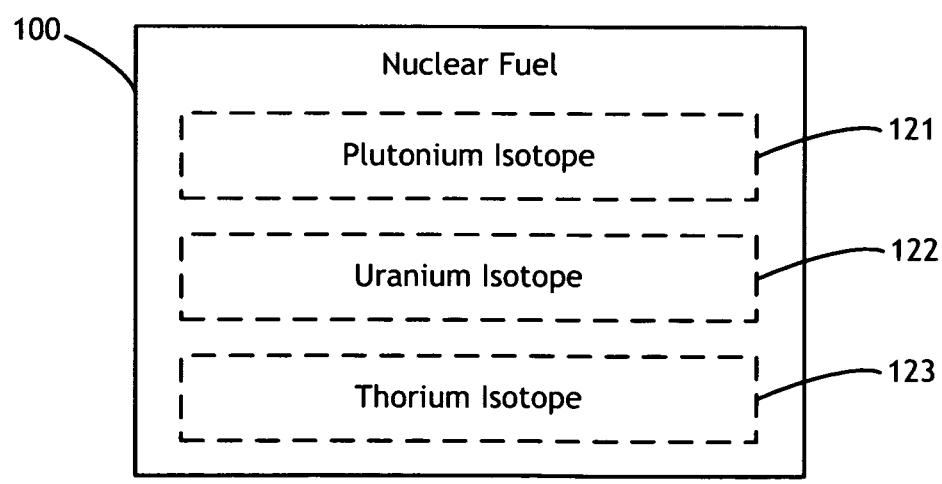
FIG. 1D is a block diagram illustrating types of fissionable material suitable for implementation in the nuclear fuel.

Referring now to FIG. 1D, the nuclear fuel 100 may incorporate any known nuclear fissile material. For example, the nuclear fuel 100 may include, but is not limited to, a uranium based material 121, a plutonium based material 122, or a thorium based materials 123. For instance, the nuclear fuel 100 of the present invention may contain $^{235}U$. In another instance, the nuclear fuel 100 of the present invention may contain $^{239}PU$. Further, it should be recognized that the nuclear fuel 100 need not be fissile directly upon fabrication. For instance, the nuclear fuel 100 of the present invention may implement a $^{232}Th$ based material, which is not fissile. Thorium-232 may, however, be implemented in a breeder reactor context, wherein $^{232}Th$ may be bred into $^{233}U$, which is suitable for fission. Therefore, in a general sense, the nuclear fuel 100 of the present invention may incorporate a non-fissile material, which may then be bred into a fissile material. It should be recognized that the fissile and non-fissile materials described above should not be interpreted as limitations, but merely illustrations as it is anticipated that additional materials may be suitable for implementation in the nuclear fuel 100 of the present invention.

Figure 1E:
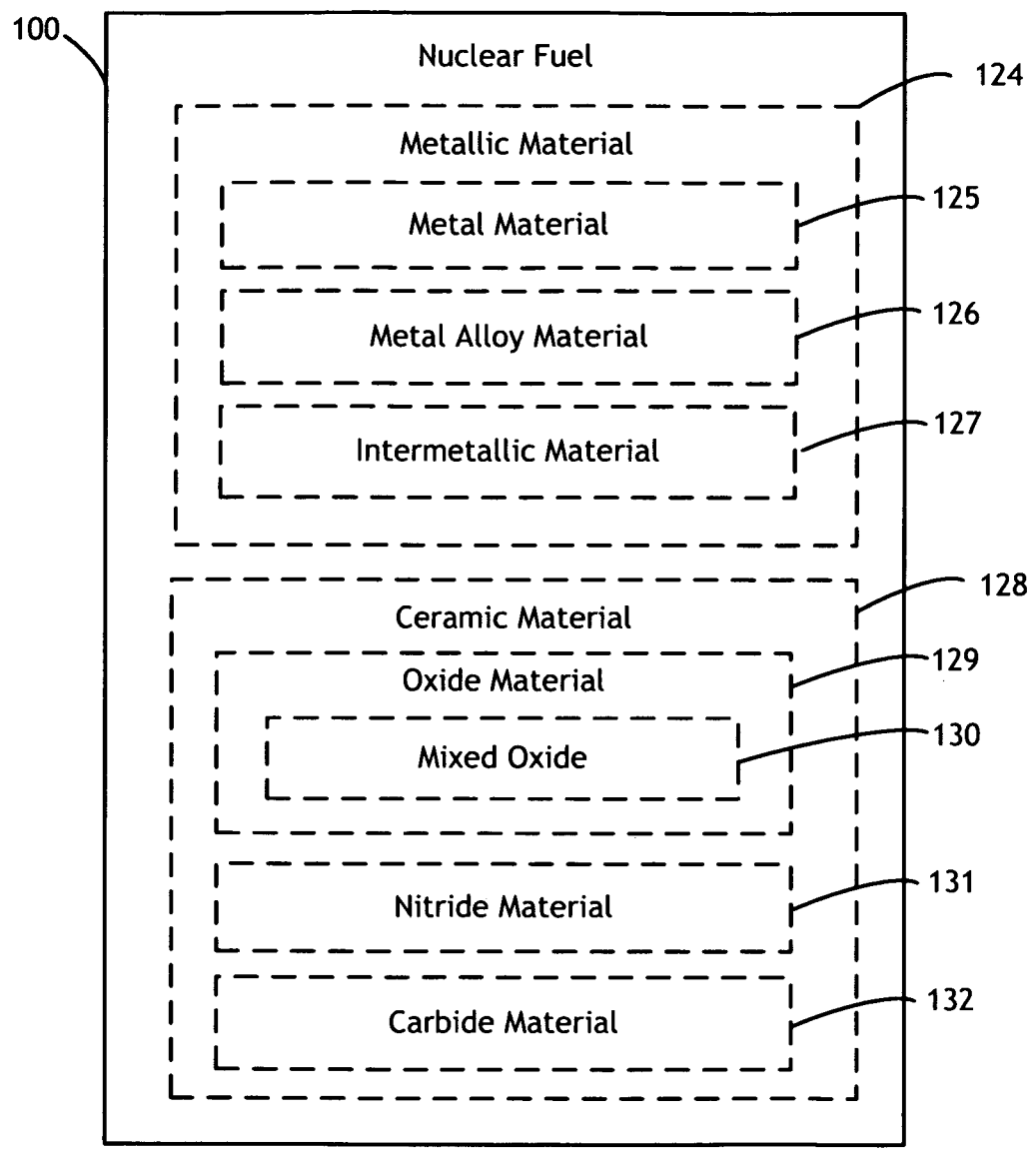
FIG. 1E is a block diagram illustrating types of nuclear fuel material suitable for implementation in the nuclear fuel.

Referring now to FIG. 1E, the nuclear fuel material of the nuclear fuel 100 may include one or more metallic nuclear fuel material 124, such as, but not limited to, a substantially pure metal nuclear fuel material 125, a metal alloy nuclear fuel material 126, or an intermetallic nuclear fuel material 127. For example, a pure metal nuclear fuel material 124 may include, but is not limited to, uranium-235, plutonium-239, or thorium-233. In another example, a metal alloy nuclear fuel material 126 may include, but is not limited to, uranium-zirconium, uranium-plutonium-zirconium, uranium-zirconium-hydride, or uranium aluminum. By way of a further example, an intermetallic nuclear fuel material 127 may include, but is not limited to, $UFe_2$ or $UNi_2$. It should be recognized that the above list of suitable metallic nuclear fuel materials for inclusion in the nuclear fuel material of the nuclear fuel 100 of the present invention should not be interpreted as a limitation but rather merely an illustration.

In another embodiment, the nuclear fuel material of the nuclear fuel 100 may include one or more ceramic nuclear fuel materials 128, such as, but not limited to, an oxide nuclear fuel material 129, a nitride nuclear fuel material 131, or a carbide nuclear fuel material 132. For example, an oxide based nuclear material 129 may include, but is not limited to, uranium dioxide ($UO_2$), plutonium dioxide ($PuO_2$), or thorium dioxide ($ThO_2$). Moreover, an oxide based nuclear fuel material 129 may include a mixed oxide nuclear fuel material, such as, but not limited to, a mixture of $PuO_2$ and depleted or natural $UO_2$. In another example, a nitride based nuclear fuel material 131 may include, but is not limited to, uranium-nitride or plutonium nitride. By way of a further example, a carbide base nuclear fuel material may include, but is not limited to, uranium carbide 132. It should be recognized that the above list of suitable ceramic nuclear fuel materials for inclusion in the nuclear fuel 100 of the present invention should not be interpreted as a limitation but rather merely as an illustration.

While the nuclear materials described above are done so in the context of material "grains" and FIG. 1A, it should be appreciated that the implementation of these materials may be extended to other contexts, such as those described in FIGS. 2A through 4 of the present disclosure.

It should be recognized that, in addition to the fissionable nuclear material described above, the nuclear fuel 100 of the present invention may also include portions of non-fissionable material, such as, but not limited to, neutron moderating material or neutron reflective material. In a general sense, the term "nuclear fuel" in the context of the present disclosure is not limited to fissionable material but may encompass an entire volume of an object or material used as a fuel source in a nuclear reactor setting. Therefore, while the term "nuclear fuel" may be used to refer to the material in a given volume, it may also be extended to embodiments of the nuclear fuel material implemented in a nuclear reactor setting, such as fuel pellets, fuel pebbles, or fuel rods.

Figure 1F:
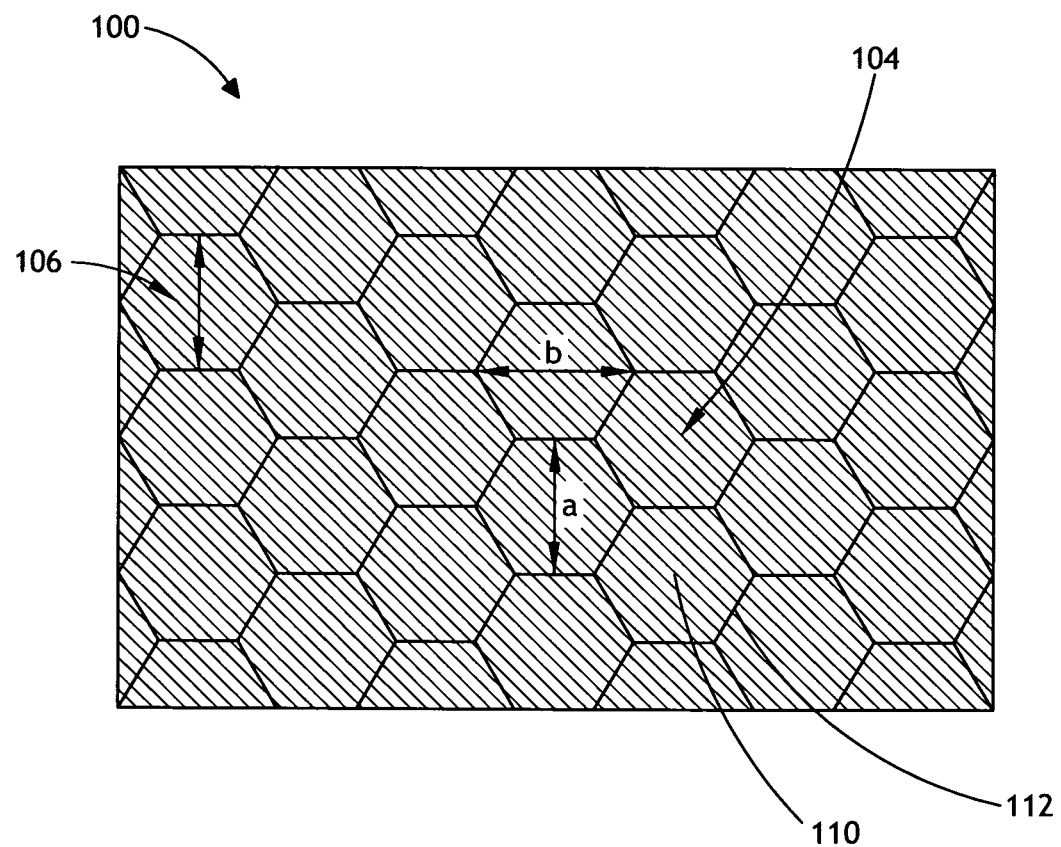
FIG. 1F is an idealized schematic diagram illustrating grains of the nuclear fuel.
Figure 1G:
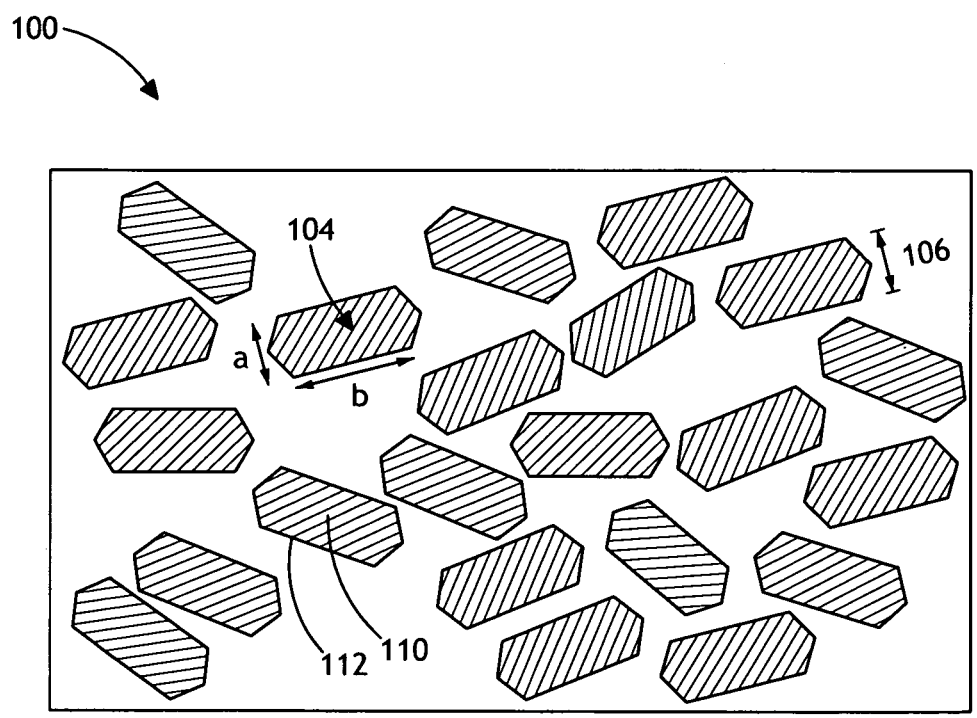
FIG. 1G is an idealized schematic diagram illustrating deformed grains of the nuclear fuel.
Figure 1H:
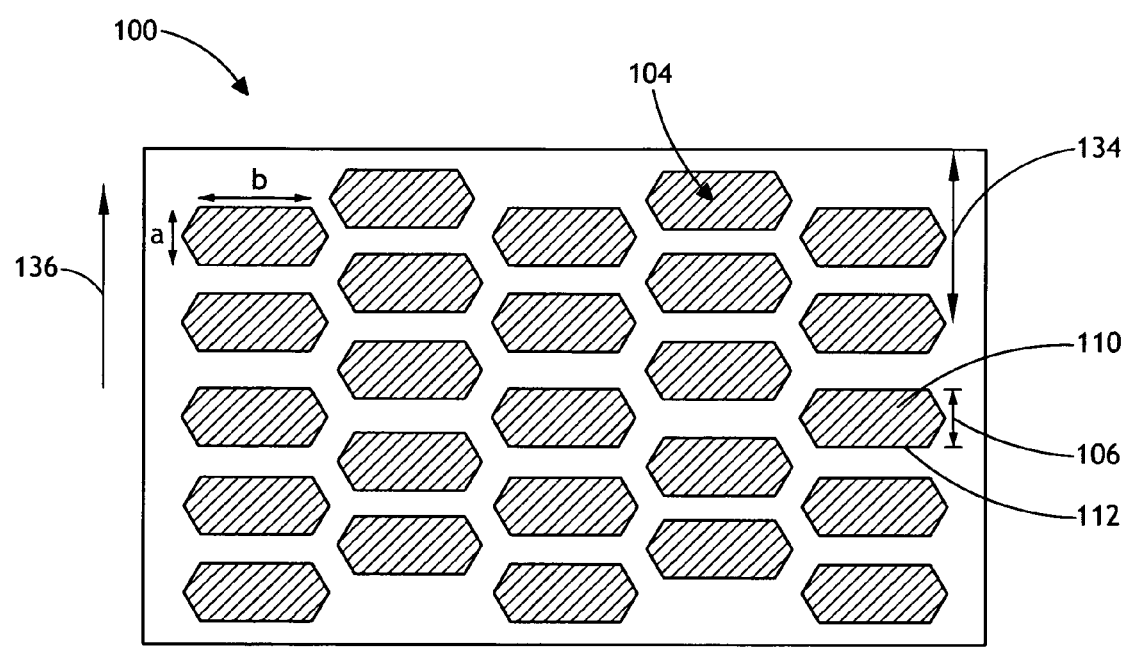
FIG. 1H is an idealized schematic diagram illustrating deformed grains of the nuclear fuel.

Referring now to FIGS. 1F through 1H, the characteristic length 106 along at least one dimension of one or more grains 104 may include a characteristic length 106 along all dimensions of one or more grains 104 of the nuclear fuel 100. For example, the grains 104 of the nuclear fuel 100 may be engineered such that the "height", represented by "a," and "width," represented by "b" are similar in size. Therefore, notwithstanding of factors (e.g., stress or thermal gradients), a fission product 108 may efficiently diffuse from the grain interior 110 to the grain boundary 112 along all directions within the grain. In this context, a grain structure may be characterized by the "grain size" of the grains 106 of the nuclear fuel 100. The "grain size" may be selected such that the grains are small enough to allow for adequate diffusion from the interiors 110 of the one or more grains 104 to the boundaries 112 of the one or more grains 104.

As shown in FIG. 1G, the characteristic length 106 along at least one dimension of one or more grains 104 may include a characteristic length 106 along a selected dimension of one or more grains 104. For example, as shown in FIG. 1G, the grains 106 within the nuclear fuel 100 may be engineered to have a selected characteristic length 106 along a given dimension of the grains 106. For instance, in a grain 104 having an elongated grain structure, the grain may have a selected characteristic length along the "thin" dimension, shown as dimension "a" in FIG. 1G, of the grain 106. In another instance, in a grain 106 having an elongated grain structure, the grain 104 may have a selected characteristic length along the "thick" dimension, shown as dimension "b" in FIG. 1G, of the grain 106. It should be recognized that the grain 104 need only have at least one characteristic length grain 106 smaller than the distance required for adequate diffusion from the interiors 110 of the one or more grains 104 to the boundaries 112 of the one or more grains 104. It is further recognized, however, that all dimensions of a grain 104 may have a characteristic length 106 smaller than or equal to a distance required for adequate diffusion of fission product 108 from the interiors 110 of the one or more grains 104 to the boundaries 112 of the one or more grains 104.

As shown in FIG. 1H, the characteristic length 106 along at least one dimension of one or more grains 104 may include a characteristic length 106 along a selected direction 134. For example, the grains 106 within the nuclear fuel 100 may be engineered to have a selected characteristic length 106 along a given direction in the nuclear fuel 100. For instance, a grain 104 having an elongated grain structure may have a selected characteristic length 106 along a selected direction 134 within the nuclear fuel 100. It should be recognized that engineering the grain structures to have a characteristic length 106 along a selected direction 134 smaller than the length required for adequate diffusion of a fission product 108 from a grain interior 110 to a grain-boundary 112 may supply a more efficient means for transferring fission product 108 (e.g., fission gas 118) from the grain interior 110.

In another embodiment, one or more grains 104 may have a characteristic length 104 along a dimension of the one or more grains selected to maximize heat transfer from a grain-interior 110 to a grain-boundary 112. For example, the one or more grains 106 may be oriented such that their narrow dimensions, shown as "a" in FIG. 1H, are aligned substantially perpendicular to a thermal gradient 136 in the nuclear fuel 100. Such an arrangement aids in the heat transfer from the grain-interior 110 to the grain-boundary, aiding in the diffusion of a fission product 108 from the grain interior 110 to its grain boundary 112. By way of another example (not shown), in a cylindrical fuel pellet fabricated utilizing the nuclear fuel 100 of the present invention the grains 104 of the nuclear fuel 100 may be arranged (i.e., on average the grains of the material may be arranged) to have their the narrow dimension substantially perpendicular to the radial thermal gradient of the cylindrical pellet. It should be noted that the illustrations in FIGS. 1H, 1G, and 1F represent simplified conceptual illustrations of a plurality of grains 106 consistent with the present invention and should not be interpreted as schematical in nature. Further, it should be recognized by those skilled in the art that a variety of materials processing techniques (e.g., cold-working and/or annealing, compression, or extrusion) may be implemented in order to develop the symmetrical grain structure in FIG. 1F, and the deformed elongated grain structure illustrated in FIGS. 1G and 1H. A variety of materials processing techniques are discussed further herein.

In another embodiment, the grains 106 of the nuclear fuel 100 may have an average characteristic length 106 along at least one dimension smaller than or equal to a selected distance necessary for adequate diffusion of a fission product. For example, the grains 106 of the nuclear fuel 100 may have an average characteristic length along a selected dimension of the grains 104 of the nuclear fuel. The average length may be selected to maintain adequate diffusion from the interiors of the grains 104 of the nuclear fuel 100 to the grain boundaries 112 of the grains of the nuclear fuel 100. It is recognized that there may exist a maximum average grain size 106 which will provide adequate diffusion of fission products 108 from the interiors 110 of the grains 104 to the grain boundaries 112 of the grains 104.

In another embodiment, the grains 106 of the nuclear fuel 100 may have an average characteristic length 106 along a selected direction smaller than or equal to a selected distance necessary for adequate diffusion of a fission product. For example, the grains 106 of the nuclear fuel 100 may have an average characteristic length along a selected dimension of the grains 104 of the nuclear fuel. The average length along a selected direction may be selected to maintain adequate diffusion from the interiors of the grains 104 of the nuclear fuel 100 to the grain boundaries 112 of the grains of the nuclear fuel 100. It is recognized that there may exist a maximum average grain size along a selected direction 106 which will provide adequate diffusion of fission products 108 from the interiors 110 of the grains 104 to the grain boundaries 112 of the grains 104.

In another embodiment, the grains 104 of the nuclear fuel may have a selected statistical distribution of characteristic lengths. For example, the grains 104 of the nuclear fuel 100 may have a grain size distribution having a selected percentage of the grains having a grain size 106 below a selected distance. For instance, the nuclear fuel 100 of the present invention may have a grain size 106 distribution such that 75% of the grains have a grain size 106 equal to or less than 5 μm, with an average grain size of 3 μm. In another embodiment, the grains 104 of the nuclear fuel 100 may have multiple statistical distributions of characteristic lengths. For instance, the nuclear fuel 100 of the present invention may have a grain size 106 distribution such that 25% of the grains have a grain size 106 equal to or less than 10 μm, 25% of the grains have a grain size 106 equal to or less than 5 μm, and 10% of the grains are below 1 μm. In another instance, the nuclear fuel 100 of the present invention may have a grain size 106 distribution such that 25% of the grains have a grain size 106 equal to or less than 10 μm and 25% of the grains have a grain size 106 equal to or greater than 50 μm. In another instance, the nuclear fuel 100 of the present invention may have a grain size 106 distribution such that 25% of the grains have a grain size 106 between 1 μm and 5 μm, 50% of the grains have a grain size between 5 μm and 10 μm, and 25% of the grains have a grain size 106 greater than 10 μm.

It is further contemplated that the grain sizes 106 may be spatially distributed throughout the volume 102 of the nuclear fuel. For example, the average grain size 106 of grains within a first region may be selected to be greater or less than the average grain sizes 106 with a second, third, or up to and including an Nth region. Moreover, it is also contemplated herein that the spatial grain size 106 distribution may be continuous or discrete in nature. For example, in a cylindrical fuel pellet, the grains 104 may be engineered such that the grains are on average smallest at the center of the pellet and monotonically increase in size along the radial direction towards the pellet's surface. In another example, the grains 104 within a cylindrical fuel pellet may be distributed such that multiple discrete grain size zones exist within the pellet, with each zone containing grains with a selected average grain size 106. For instance, the central grain zone may have a first average grain size (e.g., 10 nm), a first concentric ring zone around the central zone may have a second average grain size (e.g., 100 nm), and a second concentric ring zone around the first concentric ring zone may have a third average grain size (e.g., 1 μm). It may be advantageous to have grain sizes in a central region of a cylindrical fuel pellet to have smaller grain sizes the outer pellet regions as the central region may experience larger fission process activity, and may require a larger degree of fission product 108 diffusion in order to avoid swelling.

In another embodiment, the maximum characteristic length 106 along one or more dimensions of one or more grains 104 may be selected based on an operation condition of the nuclear fuel 100. For example, the operational condition of the nuclear fuel 100 may include the temperature a nuclear fuel 100 is utilized in a nuclear reactor system. For example, the higher the operational temperature of the nuclear reactor fuel 100 the smaller the average grain size 106 must be in order to provide adequate fission product 108 diffusion from the grain interiors 110 to the grain boundaries 112. In another example, the operational condition of the nuclear fuel 100 may include a thermally induced pressure within the nuclear fuel. For instance, as the nuclear fuel 100 thermally expands into a cladding structure housing the nuclear fuel 100, the interaction between the fuel surface 101 and the cladding may induce a stress within the nuclear fuel 100.

In another embodiment, the maximum characteristic length 106 along one or more dimensions of one or more grains 104 may be selected based on the chemical composition of the nuclear fuel 100. For example, in the case of uranium-zirconium (UZr) and uranium-plutonium-zirconium (U—Pu—Zr) alloys the average grain size 106 required to provide adequate fission product 108 diffusion from the interiors 110 of the grains 104 to the grain-boundaries 112 may be dictated by the relative zirconium content in the UZr or U—Pu—Zr alloy. Zirconium is used as an alloying agent in metallic nuclear fuels in order to stabilize the phases (e.g., stabilize the migration of constituent materials) of metallic nuclear fuels. Moreover, in the case of U—Pu—Zr, for example, past studies by D. L. Porter et al. have indicated that migration of constituent materials does not occur for Pu concentrations of less than 8 wt. percent during irradiation. In the context of cylindrical fuel pellets, in U—Pu—Zr alloys with which migration of constituent materials does occur, it is recognized that the constituent materials tend to migrate to multiple radial zones within the cylindrical pellet, with Zr tending to migrate radially outward toward the cylindrical fuel pellet surface. Due to this outward migration, the central zone of a cylindrical U—Pu—Zr pellet may develop depleted Zr concentrations. This shifting in relative concentration may have large effects on fission product 108 production as well as diffusivity within a given region of the pellet. Therefore, the average grain size 106 required to ensure adequate diffusion from the grain interiors 110 to the grain boundaries 112 within a nuclear fuel 100 will depend upon the chemical composition and the geometric arrangement of the constituent materials of the given nuclear fuel 100.

Moreover, the fission product generation rate of a given fuel may dictate the maximum allowable average grain size 106 required to ensure adequate diffusion from a grain-interior 110 to a grain-boundary 112 in one or more grains 104 of a nuclear fuel 100. The fission product generation rate is proportional to the fission rate within a given nuclear fuel 100. The fission rate within the given fuel is dependent upon, among other things, the fissionable materials implemented to form the nuclear fuel 100 and their relative concentration.

In another embodiment, the maximum allowable characteristic length 106 along one or more dimensions of one or more grains 104 may be selected based on a desirable fission product concentration level. For example, the characteristic length 106 may be selected such that it is smaller than a critical distance with which fissiongas 118 nucleation occurs. In this manner, the characteristic length 106 may be selected such that the average grain size 106 of the nuclear fuel 100 is small enough to limit the fission product 108 concentration and as a result limit the fission gas 118 nucleation within the nuclear reactor fuel 100.

It should be appreciated by those skilled in the art that the fission product generation rate, the chemical composition, and the temperature of implementation are intimately related quantities within a given nuclear fuel 100. For this reason, the exact evolution of fission product production is highly dynamic and may depend precisely on quantities, such as, but not limited to, the relative proportions of material constituents of the nuclear fuel 100, the geometry of the nuclear fuel 100, the operating temperature of the nuclear fuel 100, the density of the nuclear fuel 100 and the nuclear reactor type. It is, therefore, contemplated herein that any implementation of the nuclear fuel 100 of the present invention may rely on a trial and error method (e.g., using trial and error utilizing nuclear reactor or utilizing simulated nuclear reactor conditions) or any computational modeling process known in the art suitable to determine a maximum grain size 106 for a selected fuel composition parameters (e.g., type of fissionable material, relative concentration of constituent fissionable materials, geometrical distribution of fissionable material, density, or size of fuel piece) and nuclear reactor system parameters (e.g., type of reactor, temperature of operation, type of fuel material piece (e.g., fuel rod, fuel pellet, fuel pebble, or the like). For a detailed description of nuclear fuel swelling, fission product generation, and constituent material distribution and migration in U—Pu—Zr systems, see D. L. Porter et al., "Fuel Constituent Redistribution during the Early Stages of U—Pu—Zr Irradiation," *Metallurgical Transactions A*, Vol. 21A, July 1990 p. 1871; and G. L. Hofman et al., "Swelling Behavior of U—Pu—Zr Fuel," *Metallurgical Transactions A*, Vol. 21A, July p. 517 (1990), the disclosures of which are incorporated herein by reference.

Referring again to FIGS. 1A and 1B, the one or more transportation pathways 116 of the boundary network 114 of the nuclear fuel 100 may be defined by a region between two or more adjacent grains 104. For example, as shown in FIG. 1B, the grain-boundary 112 between adjacent edges of neighboring grains 104 may define a transportation pathway 116 of the boundary network 114 of the nuclear fuel material 100.

Figure 1I:
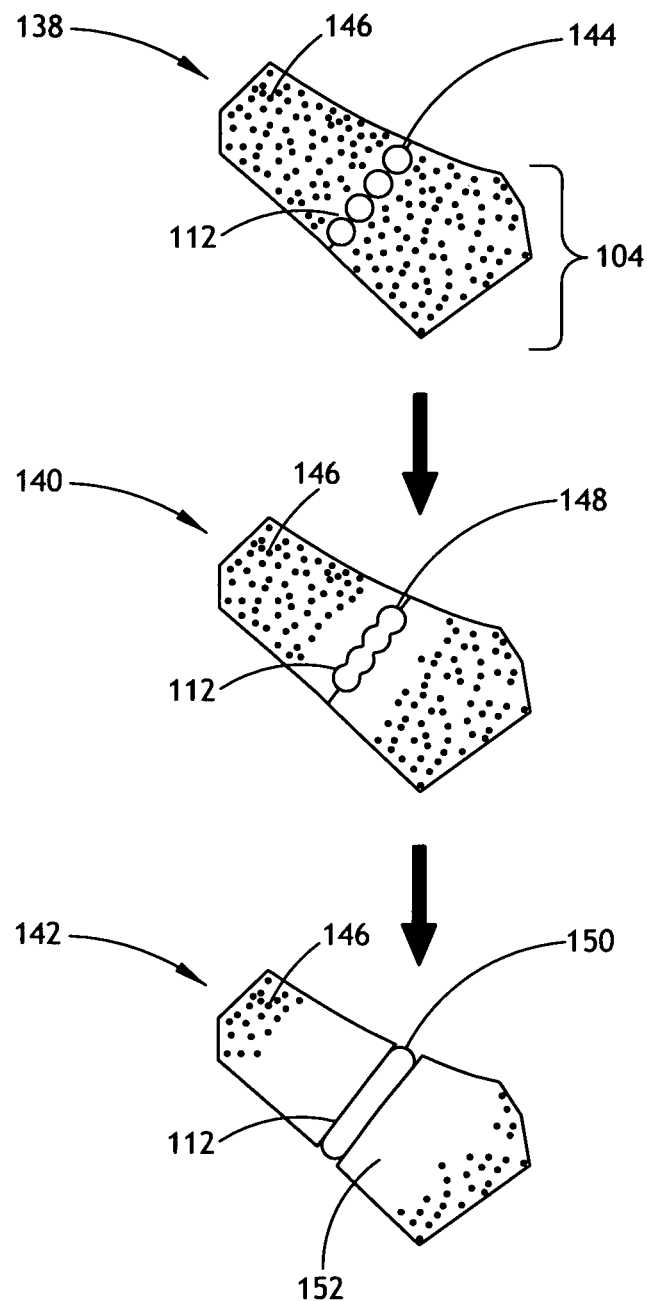
FIG. 1I is a schematic diagram illustrating an open bubble formation process in the boundary network of the nuclear fuel.

Referring now to FIG. 1I, the formation of a transportation pathway 116 of the boundary network 114 of the nuclear fuel 100 is illustrated. In one embodiment, the transportation pathway 116 between adjacent grains 104 of a nuclear fuel 100 may be formed via growth of an open bubble 150 of a fission gas 118 along the grain boundary 112 between adjacent grains 104. For example, in a first step 138, fission gas bubbles 144 begin to nucleate along a grain boundary 112 between two adjacent grains 104. The bubbles 144 are referred to herein as "closed" bubbles as they represent closed spherical voids within the nuclear fuel material. As discussed previously in the present disclosure, as grains 104 within a nuclear fuel 100 are reduced in size the grain-boundary area/grain interior volume ratio increases. The increase in the boundary area/interior volume ratio may lead to a relative increase in the number of fission gas bubbles nucleated at the grain boundary 144 and a relative decrease in the fission gas nucleation bubbles within the interior 146 of a given grain 104, during a fission process. Further, in step 140, as more and more fission gas bubbles continue to nucleate at a given grain-boundary the closed bubbles begin to coalesce and connect with one another to form a coalesced closed bubble structure 148. Then, in step 142, due to surface diffusion the coalesced closed bubbles 148 fully transform into an "open" bubble structure 150. As a result of the diffusion of fission gas atoms to the grain-boundary 112, a denuded region 152 within the interior 110 of the grain 104 is formed near the grain-boundary 112. The formation of an open bubble 150 forms the transportation pathway 116, defined on its edges by the grain-boundaries 112 of adjacent grains 104. If the transportation pathway 116 formed by the open bubbles (i.e., cracks) extends to the geometrical surface 101 of the nuclear fuel 100 then the fission gas may escape the volume 102 of the nuclear fuel 100.

The migration of fission gas bubbles in irradiated uranium dioxide is generally described in Mary Ellen Gulden, "Migration of gas bubbles in irradiated uranium dioxide," *Journal of Nuclear Materials*, Vol. 23, Issue 1 July pp. 30-36 (1967), which is incorporated herein by reference.

In another embodiment, a plurality of transport pathways 116 may form a system of interconnected pathways 114. For example, as previously described, as the grain size 104 decreases within the nuclear fuel 100 the spatial density of grain-boundaries, and therefore transportation pathways 116, within the nuclear fuel 100 increases. An increase in transportation pathway density serves two purposes. First, number of transportation pathways that intersect the geometric surface 101 of the volume 102 of the nuclear fuel 100 will increase as the number of transportation pathways 116 increases within the nuclear fuel 100. As a result of the increase in transportation pathways 116 intersecting with the geometric surface 101 of the nuclear fuel 100, the amount of fission gas that may be transported via the boundary network 114 from the grain-boundaries 104 of the grains 104 increases. Second, the likelihood that a given transportation pathway 116 will intersect with another transportation pathway 116 will increase as the transportation pathway density increases with the nuclear fuel 100. Thus, a reduced grain size 106 in the grains 104 of the nuclear fuel 100 may lead to an increase in the number of transportation pathways 116 open to the geometric surface 101 and an increase in the frequency of interconnection between the multiple transportation pathways 116, both facilitating efficient fission gas transport from the grain-boundaries 112 to the geometric surface 101.

It is further contemplated that the transportation pathways 116 of the interconnected boundary network 114 may be formed or their growth may be facilitated utilizing a volatile precipitating agent. For example, a volatile precipitating agent may be added to a metallic 124 or ceramic nuclear fuel material 128 prior to a casting process. During casting, a heat treatment (e.g., annealing process) may be applied to the nuclear fuel material. The heat treatment may cause the precipitating agent to precipitate out to the grain-boundaries 112 of the nuclear fuel 100. If large enough concentrations of the precipitating agent are present within the pre-cast nuclear fuel the precipitation of the precipitating agent may act to form one or more void regions within the nuclear fuel 100. Moreover, the precipitating agent may form a plurality of interconnected void regions within the nuclear fuel 100 which act to form the boundary network 114 of the nuclear fuel 100. It should also be recognized that the utilization of a precipitating agent may facilitate the growth of the boundary network 114 along the grain-boundaries 112 within the nuclear fuel 100. The precipitating agent may include, but is not limited to, nitrogen or carbon.

In addition, it is contemplated herein that the grain-boundary 112 formation of the nuclear fuel 100 may be manipulated utilizing a precipitating metal agent to the nuclear fuel material prior to casting. For example, a metallic precipitating agent (e.g., niobium) may be added to a metallic fuel material 124 (e.g., uranium-zirconium) prior to a casting process. It is recognized that at a threshold metal precipitating agent concentration, upon cooling, the metal precipitating agent may precipitate out of the metal nuclear fuel material 124. It should further be recognized that the amount of metal precipitating agent which precipitates out of the nuclear fuel material upon cooling may depend on the cooling rate. As a result of precipitation, upon solidification, the metallic precipitating agent may form an additional phase within the nuclear fuel 100. For example, the metallic precipitating agent may form a distribution of solid regions of the metallic precipitating agent within the nuclear fuel 100. These solid metallic precipitating agent regions may facilitate the growth of the one or more grain-boundaries at the location of the metallic precipitating agents.

It is further recognized that fission gas pressure that develops within the boundary network 114 as a result of fission gas diffusion from the grain interior may facilitate fission gas release due to grain-boundary 112 fracture (i.e., cracking). Grain-boundary 112 fracture may increase the boundary network 114 area, allowing for the boundary network to more readily transport fission gas to the nuclear fuel surface 101. It is also further recognized that the addition of a precipitating agent may facilitate the grain-boundary 112 fracture as the precipitating agent pressure at the grain-boundary may act to hasten the grain-boundary 112 fracture.

It is further contemplated that the boundary network 114 may be formed by a plurality of void regions. While the above description generally relates to the formation of a boundary network 114 defined by the region between grain-boundaries 112, developed via fission gas nucleation at one or more grain-boundaries 112, it is recognized that any plurality of void regions outside of the one or more grain interiors 110 may lead to formation of a boundary network 114. For example, as will be further described herein, dispersant particles (e.g., zirconium oxide particles) may be dispersed throughout the nuclear fuel 100 along the grain-boundaries 112. The dispersant particles may act to create preferential fission gas occupation sites. If the gas occupation sites are distributed within the nuclear fuel 100 in a manner that provides for an interconnection of the bubbles formed at these gas occupation sites a boundary network 114 may be formed. Moreover, in a general sense, any method known in the art suitable for controlling porosity within the nuclear fuel 100 (e.g., metal nuclear fuel or ceramic nuclear fuel) may be utilized in order to create or facilitate the creation of a boundary network 114.

It should be recognized that the boundary network 114 of the nuclear fuel 100 of the present invention may be formed prior to or during a nuclear fission process within the nuclear fuel 100. For example, as described above, the nuclear fuel 100 of the grain structure of the nuclear fuel 100 may be configured to develop a boundary network 114 upon production of fission products 108 (e.g., fission gas) during utilization of the nuclear fuel 100 within a nuclear reactor setting. In this manner, the nuclear fuel 100 may have an average grain size 106 below a critical value necessary for providing adequate diffusion of fission products 108 to the grain boundaries 112 of the nuclear fuel 100. Then, when the nuclear fuel 100 undergoes fission in the nuclear reactor 100, the fission products 108 nucleate more readily at the grain-boundaries 112, ultimately forming an interconnected boundary network 114. In another example, as described above, the boundary network 114 may be substantially formed prior to utilization in a nuclear reactor system. For instance, utilization of precipitating agents during a casting and annealing process may produce a boundary network 114 in the nuclear fuel 100. In another instance, any known void forming or porosity control process may be implemented during the fabrication of the nuclear fuel 100 in order to develop a boundary network 114 adequate to transport fission products, such as fission gas, from the grain-boundaries 112 of the nuclear fuel 100 to the geometric surface 101 of then nuclear fuel 100.

Figure 1J:
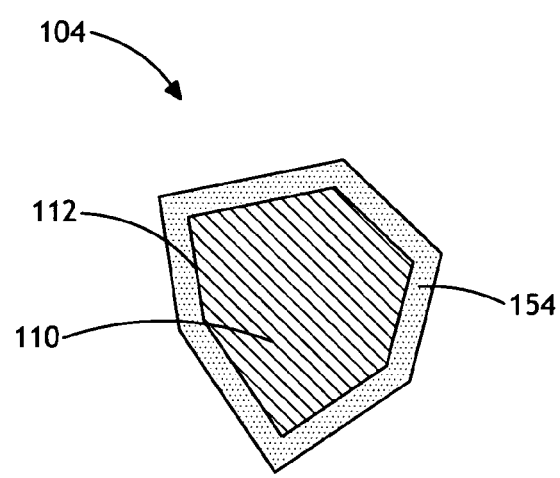
FIG. 1J is a schematic diagram illustrating an interfacial layer on a grain of the nuclear fuel.

Referring now to FIG. 1J, one or more grains 104 of the nuclear fuel 100 may include an interfacial layer 154. For example, one or more processes (e.g., chemical process or annealing process) may be implemented in order to grow an interfacial layer 154 a grain-boundary 112 of one or more grains 104. For instance, the formation of an interfacial region 154 may inhibit grain growth within the nuclear fuel 100 upon crystallization during a casting process. In this manner, an interfacial region may aid in maintaining the grain sizes 106 of the grains at or below the critical size necessary to maintain adequate diffusion of a fission product 108 from the grain interiors 110 to the grain-boundaries 112 of the nuclear fuel 100. For example, the interfacial region 154 may include an oxide layer, a nitride layer, or a carbide layer. For instance, nitrogen or carbon within the nuclear fuel material may precipitate out of the fuel matrix during a heat treatment process prior to casting. The nitrogen or carbon precipitates may then, upon cooling, form a metal nitride or metal carbide layer, respectively, at the surface of the crystallized grain structures. In another example, an oxygen atmosphere may be applied during, the casting phase of the fabrication process in order to form a metal oxide interfacial layer 154 at the grain-boundaries 112 of the nuclear fuel 100. It is contemplated herein that the thickness of the interfacial layer 154 may be a fraction of the size of the grain 104 with which it is grown. For instance, the interfacial layer 154 may have a thickness between 0.1 and 10 nm, whereas the interior grain structure may have a thickness between 0.1 and 10 μm. By way of another example, in the case of metallic nuclear materials, the interfacial region may include an intermetallic, which may be different in chemical composition from the interior 110 of the grains 104.

In a general sense, any treatment process known in the art suitable for growing a grain-boundary interfacial layer 154 may be implemented in accordance with the present intention. The above description pertaining to interfacial layer 154 growth is illustrative only and should not be interpreted as a limitation.

In another embodiment, the one or more processes implemented in order to achieve a characteristic length 106 along at least one dimension in some of the grains 104 required for adequate fission gas diffusion and the corresponding boundary network of the nuclear fuel 100 may include one or more material processing techniques. A variety of material processing techniques may be implemented in order to control the grain sizes 106 and the development of the boundary network 114 of the nuclear fuel 100. For example, the nuclear fuel 100 may be processed utilizing a cold-working process, an annealing process, a normalization process, or a tempering process. It should be recognized that the above list of material processing techniques is not exhaustive and should not be interpreted as a limitation as a variety of other material processing techniques may be suitable for fabricating the nuclear fuel 100 of the present invention.

In one aspect, the grains 104 of the nuclear fuel 100 may be engineered to have a characteristic length 106 smaller than or equal to a selected distance along one or more dimensions utilizing one or more material processing techniques.

In one embodiment, a cold-working process may be utilized to produce grains 104 within the nuclear fuel 100 having a characteristic length 106 smaller than or equal to a selected distance along one or more dimensions. It is recognized that the grain sizes 106 of a nuclear fuel 100 material may be reduced through a plastic deformation process that may occur when a given volume of a nuclear fuel 100 is cold-worked. For example, a solid consolidated metal 125 (e.g., uranium, plutonium or thorium) or metal alloy 126 (e.g., uranium zirconium, uranium zirconium hydride, uranium aluminum, or the like) nuclear fuel piece may undergo a cold-working process in order to reduce the grain sizes 106 of the nuclear fuel material grains 104, thereby shifting the average grain size of the material to smaller values. For instance, the solid metal 125 or metal alloy 126 nuclear fuel piece may include a cast metal or metal alloy nuclear fuel piece, such as a fuel rod. The cast metallic nuclear fuel may then be processed utilizing a cold-working process. For example, the cast metallic nuclear fuel piece may be cold-worked at a temperature below its recrystallization temperature (e.g., room temperature). The metallic piece may be cold-worked until the average grain size of the nuclear fuel material is at or below the size necessary to provide adequate diffusion of a fission product 108 to the grain boundaries 112 of the grains 104 of the material. For instance, a uranium-plutonium-zirconium fuel rod may be cold-worked until the average grain size 106 within the fuel rod is approximately 1 μm.

It is further contemplated that a metallic fuel rod may be fabricated utilizing an extrusion process performed at ambient temperatures. Extruding the metallic fuel material at room temperatures provides the necessary plastic deformation required for reduction of grain sizes 106 within the material. As a result, extrusion of the metallic nuclear fuel material at room temperate may create a cold-worked grain structure, wherein the grain sizes 106 of the material are below the critical size required for adequate fission product 108 diffusion. Further, the room temperature extruded metallic fuel rod may then be annealed at a low recrystallization temperature in order to achieve the desired grain size within the material. It should be noted that if room temperature fuel rod extrusion is not possible an extrusion process may also be performed at a temperature low enough to inhibit recrystallization and grain growth, but high enough to allow for fuel road extrusion.

It should be recognized that any cold-working process known in the art may be implemented to reduce the average grain size within a metal 125, metal alloy 126, or intermetallic 127 nuclear fuel. For example, a compression process, a bending process, a drawing process, an extrusion process, a forging process or a shearing process may be applied to a metal 125, a metal alloy 126, or an intermetallic 127 nuclear fuel material at a selected temperature below the material's recrystallization temperature. It should be recognized that the above cold-working processes do not represent limitations and should be interpreted as illustrations as it is contemplated that a variety of cold-working methods and conditions may be applicable in other contexts. Moreover, it should be recognized that a cold-working process may be applied to metal 125, a metal alloy 126, or an intermetallic 127 nuclear fuel irrespective of prior casting. The description of casting and extrusion above is merely for illustrative purposes and should not be interpreted as a required limitation prior to the cold-working of a metal or metal alloy nuclear fuel material in order to reduce the average grain of the material below a size required for adequate diffusion of fission products 108. It is contemplated that a variety of other metal 125, a metal alloy 126, or an intermetallic 127 nuclear fuel piece fabrication methods may be implemented within the context of the present invention.

By way of another example, a thorium or thorium alloy may be cold-rolled in order to form a fuel piece suitable for implementation in a nuclear reactor setting. Thorium or a thorium alloy is particularly useful in the context of cold-rolling processing due to its high level of ductility. Utilizing a cold-rolling process allows for control of the average grain size of a rolled thorium or thorium alloy fuel piece without a prior process step, such as casting. Thus, a cold-rolling process may be implemented in a manner which controls the grain size distribution of the grains of the thorium or thorium alloy piece as the piece is formed into a fuel rod. For instance, a solid piece of thorium may be cold-rolled into a thin planar sheet, wherein the grain sizes 106 within the sheet are below the critical size necessary to ensure adequate diffusion of a fission product 108 from the grain-interiors 110 to the grain-boundaries 112. This grain-engineered sheet may then be further manipulated by rolling the sheet into a cylindrical or pellet shape.

In another example, a solid consolidated ceramic nuclear fuel piece may undergo a cold-working process in order to reduce the average grain size of the grains within the ceramic nuclear fuel material. The solid ceramic nuclear fuel piece may be fabricated utilizing any ceramic nuclear fuel fabrication process known in the art. For instance, the ceramic nuclear fuel piece may be fabricated by compacting and pressing a ceramic nuclear fuel powder (e.g., uranium dioxide powder), or a precursor of a nuclear fuel powder (e.g., $U_3O_8$), into a fuel pellet or fuel pebble. For example, an organic binder agent may be added to the nuclear fuel powder prior to pressing. After pressing the powder and binder mixture into a desired shape, the binder may be evaporated off using a high temperature treatment, wherein the ceramic piece is heated above the organic agent boiling point but below the ceramic nuclear fuel melting point. The compacted nuclear fuel powder may then be sintered to a selected density, up to 98% of the theoretical density. The compacted ceramic nuclear fuel material may then be processed utilizing a cold-working process, such as a compression process. The ceramic piece may be cold-worked until the average grain size of the nuclear fuel material is at or below the size necessary to provide adequate diffusion of a fission product 108 to the grain boundaries 112 of the grains 104 of the ceramic material 128. The cold-working processes described above are generally suitable for implementation in the context of cold-working a ceramic nuclear fuel piece.

While cold-working is often difficult to implement in the context of ceramic materials, due to their brittle nature, it is contemplated herein that cold-working processes, such as those described above may be implemented to control the average grain size of ceramic nuclear fuel material. The cold-working of ceramic materials is generally described in David W. Richerson, *Modern ceramic engineering: properties, processing, and use in design*, 3rd ed, CRC Press-Taylor & Francis Group, 2003, pp. 235-240, which is incorporated herein by reference.

The description of ceramic nuclear fuel material sintering above should not be interpreted as a required limitation of the present invention, rather sintering is but one method used to create a ceramic nuclear fuel piece suitable for implementation in the present invention. It is contemplated that a variety of other ceramic nuclear fuel piece fabrication methods (e.g., casting, in-situ reaction, injection molding or the like) may be implemented within the context of the present invention. Moreover, the above description of uranium dioxide as a material suitable for cold-working should not be interpreted as a limitation as any ceramic nuclear fuel material including, but not limited to, oxides, carbides, and nitrides may be implemented in this context.

In a further embodiment, an annealing process may be implemented in order to achieve the desired grain size 106 within a nuclear fuel material. For example, after cold-working a metallic nuclear fuel material (e.g., cold-working a cast piece or extrusion of material at room temperature or low temperature) an annealing process may be utilized in order to achieve the desired average grain size 106 within the metallic nuclear fuel material. It should be recognized by those skilled in the art that after introducing cold-work into a given material a subsequent anneal at temperatures below the recrystallization temperature may result in a refinement of the grains of the material. For example, after extruding or applying another cold-working process to a metallic nuclear fuel piece, the metallic nuclear fuel 125 may be annealed to a low temperature below the recrystallization temperature in order to further refine the grains 106 of the nuclear fuel material. In order to facilitate the production of smaller grain structures in the nuclear fuel 100, the temperature at which the subsequent annealing processes takes place should be above the temperature at which the recovery phase of the cold-worked metallic nuclear fuel material initiates. Moreover, it should also be recognized that the recrystallization temperature is a function of the amount of cold-work introduced into the nuclear fuel 100.

In another embodiment, an annealing process may be implemented in order to increase the grain size 106 of the grains of the nuclear fuel 100. For instance, the room temperature extrusion process may result in an average grain size within a material that is smaller than the target average grain size. An annealing process may then be implemented in order to grow the average grain size to the target level. It should be noted that the target grain size described herein is below the critical size necessary to achieve adequate diffusion within the metallic nuclear fuel 100, but smaller than the required size for other purposes (e.g., achieving a target material density, a target porosity, and the like). Generally speaking, an annealing process at temperatures above the nuclear fuel material's recrystallization temperature may be implemented in order to achieve the desired grain size after implementation of any cold-working process known in the art or described herein. The annealing temperature, the annealing rate, and the soak time may be selected based on the requirements of the specific material in use and the amount of cold-work previously introduced into the system. In another embodiment, an annealing process may be implemented in order to achieve the desired grain size 106 within a ceramic nuclear fuel material. For example, upon cold-working of a ceramic nuclear fuel material an annealing process may be utilized in order to achieve the desired average grain size 106 within the ceramic nuclear fuel material 128. For instance, the cold-working process may result in an average grain size within a material that is smaller than the target average grain size. An annealing process may then be implemented in order to grow the average grain size to the target level. Generally speaking, an annealing process may be implemented in order to achieve the desired grain size after implementation of any cold-working process suitable for ceramic material processing known in the art or described herein.

The principles of annealing, recovery, and recrystallization are generally described in F. J. Humphreys and M. Hatherly, *Recrystallization and Related Annealing Phenomena*, 2nd ed, Elsevier, 2004, which is incorporated herein by reference.

It should be recognized that, in the context of a metallic nuclear fuel material, an annealing temperature should be selected well below the melting temperature of the metallic nuclear fuel. For example, in metal alloy nuclear fuel materials such as U—Pu—Zr and U—Pu, a spatial redistribution of materials may occur upon annealing. Implementing an annealing temperature that is too near the melting temperature of the metallic fuel may exacerbate this redistribution of materials. For instance, upon heating above the melting temperature an existing thermal gradient within the material may lead to a redistribution of Pu in either the U—Pu—Zr or U—Pu alloys. A redistribution of Pu may lead to an altered temperature profile within the fuel during implementation in a nuclear reactor with higher temperature readings at the redistributed Pu sites. Therefore, metallic nuclear fuels should undergo heat treatment (e.g., annealing, normalization, tempering and the like) at a temperature low enough to minimize material redistribution within the nuclear fuel material.

In another embodiment, a normalization process may be utilized to engineer grains 104 within the nuclear fuel 100 to have a characteristic length 106 smaller than or equal to a selected distance along one or more dimensions. For example, after a cold-worked nuclear fuel material has undergone a heat treatment process (e.g., annealing), the material may then be cooled in air. This process may relieve stress in the material and may result in reduced grain sizes 106 with the nuclear fuel 100. For instance, a metal 125 or metal alloy 126 nuclear fuel piece may be formed via a casting process. After the casting process, the metallic nuclear fuel material piece may be heated to a temperature above its upper critical point. The metallic nuclear fuel material piece material may then be held at the elevated temperature for sufficient time to allow the production of smaller grains within the material. Then, the material may be cooled in air to a temperature well below the critical point. A normalization process may lead to a reduction in the average grain size in the nuclear fuel 100 at or below the average grain size required to maintain adequate fission product 108 diffusion within the material.

In another embodiment, a tempering process may be utilized to engineer grains 104 within the nuclear fuel 100 to have a characteristic length 106 smaller than or equal to a selected distance along one or more dimensions. It is recognize that any known tempering process is suitable for implementation in the context of the present invention.

In another embodiment, the one or more processes implemented in order to achieve a grain size 106 required for adequate fission product 108 diffusion and the corresponding boundary network 114 of the nuclear fuel 100 may include one or more chemical treatment process. In one embodiment, a chemical process utilized to reduce grain size 106 and develop the boundary network 114 in the nuclear fuel 100 material may include, but is not limited to, an oxygen reduction process. For example, in the case of an oxide based nuclear fuel material, such as $UO_2$ or $PO_2$, an oxygen reduction process may be applied to the metal oxide fuel utilizing a reduction gas. By chemically reducing a given metal oxide nuclear fuel into a sub-stoichiometric state, the average grain size 106 of the metal oxide nuclear fuel may be reduced in size relative to the stoichiometric phase. For instance, exposing a $UO_2$ based nuclear fuel 100 to a reducing gas consisting of an argon/hydrogen mixture may reduce the uranium oxide to a sub-stoichiometric phase, such as, but not limited to, $UO_{1.8}$. It should be recognized by those skilled in the art that an oxygen reduction to a sub-stoichiometric state may "shrink" the exposed grains. It is recognized that an oxygen reduction process may be implemented in order to further develop the boundary network 114 as a result of the increased grain-boundary area which results when adjacent grains 104 shrink. It is contemplated that 8 to 16% mixture of argon to hydrogen should be suitable for reduction. Moreover, a reducing gas consisting of nitrogen and hydrogen may also be suitable for implementation in the present invention.

It should be further recognized by those skilled in the art that non-sintered $UO_2$ may often solidify into a hyperstoichiometric state. As such, a subsequent oxygen-reducing treatment as described above may be implemented to reduce the hyperstoichiometric $UO_2$ to a stoichiometric or sub-stoichiometric state.

In another embodiment, the porosity of the nuclear fuel 100 may be controlled via a porosity control process. For example, a porosity control process may be implemented to establish or further develop the boundary network of the nuclear fuel 100. For instance, porosity of the nuclear fuel 100 may be controlled during a compacting and sintering process, wherein porosity may be controlled via the compaction parameters (e.g., pressure, binder agent concentration, temperature, and the like).

In another embodiment, the textures of two or more of the grains 104 within the nuclear reactor fuel 100 may be controlled via a grain texture control process. Any grain texture control process in the art is suitable for implementation in the context of the present invention. For example, an annealing process may be used to at least partially impart grain texture into the grain structure of the grains 104 of the nuclear fuel 100. In another example, a shear deformation process (e.g., shear rolling) may be used to impart grain texture into the grain structure of the grains 104 of the nuclear fuel 100

It is further contemplated that the grain sizes 106 of the grains 104 and the boundary network 114 of the nuclear fuel 100 may need not be achieved upon fabrication in a fabrication facility setting. Rather, it is contemplated herein that the required grain structure and boundary network 114 of the nuclear fuel 100 of the present invention may be established upon initiation of a fission process during implementation in a nuclear reactor setting. For example, the high temperature of the nuclear reactor environment may result in an annealing effect in the nuclear fuel 100. In another example, when the grain sizes 106 of the grain structure are properly configured, which is an object of the present invention, the irradiation leading to fission product 108 production within the nuclear fuel 100 may lead to a further development of the boundary network 114

While the above description relates to the material processing of a macroscopic piece of nuclear fuel material, it is further contemplated that the grain sizes of microscopic particles and the corresponding boundary network may be controlled utilizing a variety of material processing techniques.

It should be recognized that the creation of the boundary network 114 in the nuclear fuel 100 of the present invention is intimately related to the control of the average grain size 106 of the nuclear fuel 100. For example, as the average grain size 106 is reduced in a given nuclear fuel material, the spatial density of grain-boundaries 112 increases, thereby increasing the relative proportion of the boundary network 114 area to the volume 102 of the nuclear fuel 100. As a result, as the average grain sizes of the nuclear fuel 100 decrease, the number of boundary network pathways 116 intersecting the geometric surface 101 of the nuclear fuel increases.

Therefore, any of the material processes described in the present disclosure to control the grain sizes 106 of the nuclear fuel 100 may also be implemented in order to control the extent of the boundary network 114 of the nuclear fuel 100 of the present invention. For example, just as a cold-working process may be used to control the average grain size 106 within a metal nuclear fuel 125 or metal alloy nuclear fuel 126, a cold-working process may be utilized to control the growth of the boundary network 114. It is recognized, however, that in some instances a user may achieve adequate average grain size 106 within a given nuclear fuel 100 (i.e., size required to ensure adequate diffusion of a fission product 108 from the interior 110 of a grain 104 to its grain-boundary 112) without necessarily achieving adequate boundary network 114 development within the nuclear fuel 100 (i.e., network density and interconnectedness required to ensure transport of the fission product 108 to the fuel's geometric surface 101). In this instance, the average grain size 106 of the nuclear fuel 100 may be further reduced in order to achieve the adequate grain-boundary density and likelihood of interconnectedness within the fuel to achieve adequate transport of a fission product 108 from the grain boundaries 112 of the grains to the geometric surface 101 of the nuclear fuel 101.

In another instance, an average grain size 106 within a given nuclear fuel 100 required for adequate diffusion of a fission product 108 from the interior 110 of a grain 104 may be achieved utilizing a first process, such as cold-working. Then, the boundary network 114 may be further developed utilizing a second process, such as an oxygen reduction step, utilizing a forming gas ambient, such as a hydrogen/argon mixture. In a general sense, a first material process step may be utilized to achieve a first level of reduction in the grain sizes 106 of the nuclear fuel 100, while a second material process step may be utilized to further reduce the grain sizes 106 in order to further develop the boundary network 114 of the nuclear fuel 100.

It is further contemplated herein that the nuclear fuel of the present disclosure may be configured to operate in a variety of nuclear reactor system contexts. For example, the nuclear fuel 100, 200, 300, and 400 of the present invention may be utilized in a thermal spectrum nuclear reactor, a fast spectrum nuclear reactor, a multi-spectrum nuclear reactor, a breeder nuclear reactor, or a traveling wave reactor.

It is contemplated herein that the previously provided disclosure of the nuclear fuel 100 and the various methods and processes utilized to make the nuclear fuel 100 should be considered to extend to the remainder of the disclosure.

Figure 2A:
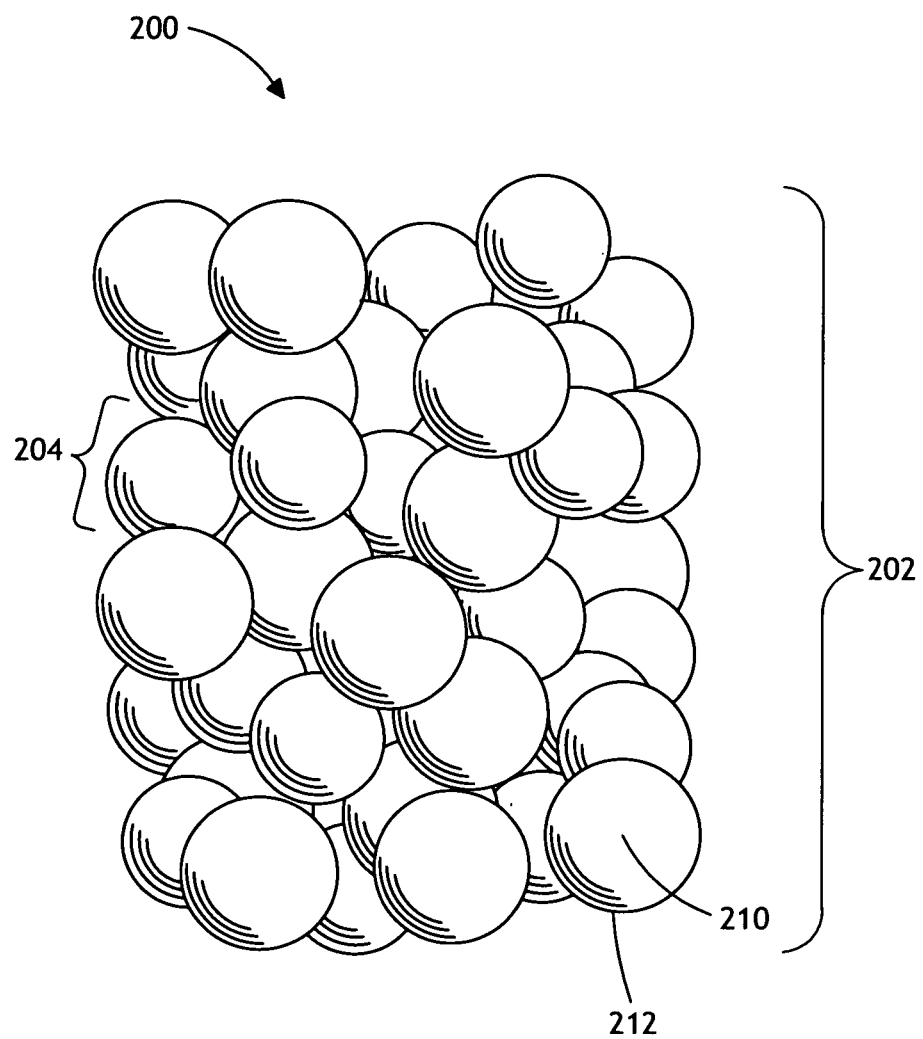
FIG. 2A is a schematic diagram illustrating a nuclear fuel.
Figure 2B:
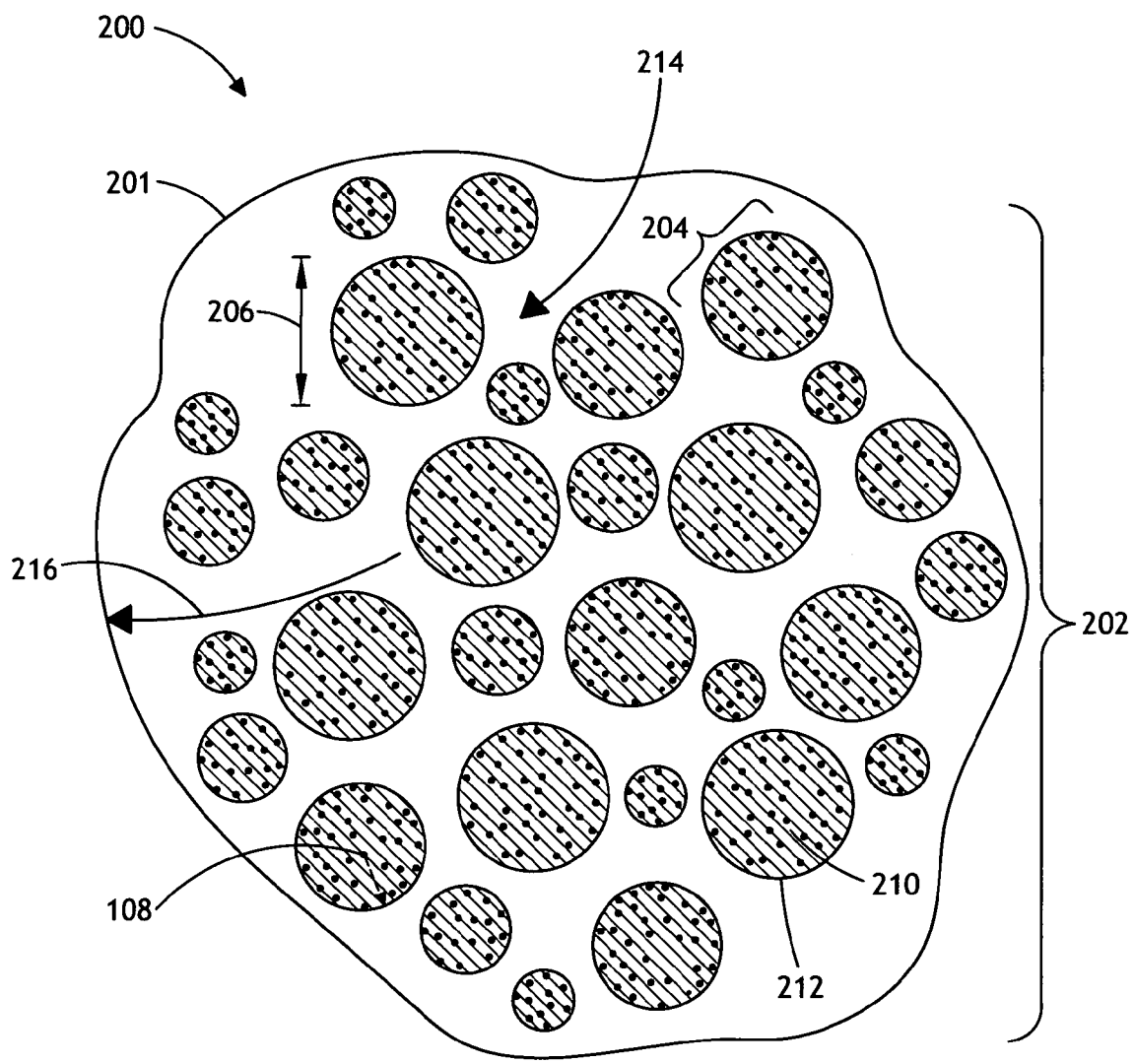
FIG. 2B is a schematic diagram illustrating a nuclear fuel.

Referring now to FIGS. 2A and 2B, alternative embodiments of the present invention are illustrated. A nuclear fuel 200 and methods for making a nuclear fuel are described in accordance with the present disclosure. A given volume 202 of a nuclear fuel 200 may include a plurality of nuclear fuel elements 204 of one or more nuclear fuel materials. In one embodiment, the nuclear fuel elements 204 may be fabricated using one or more metallic nuclear fuel materials 124. In another embodiment, the nuclear fuel elements 204 may be fabricated using one or more ceramic nuclear fuel materials 128. The nuclear fuel elements 204 may be engineered to have a characteristic length 206 along at least one dimension that is smaller than or equal to a selected distance. The distance may be selected based on the critical distance necessary to maintain an adequate level of diffusion of a fission product 108 (e.g., fission gas 118, fission liquid 119, or a fission solid 120) from the interior 210 of the nuclear fuel elements 204 to one or more free surfaces 212 of the nuclear fuel elements 204. As is the case in the grain structure context illustrated in FIGS. 1A through 1X, it is recognized that by increasing the ratio between the nuclear fuel element free surface area and the nuclear fuel element interior volume the number of fission gas 118 bubbles formed at the free surface 212 of a nuclear fuel element 204 as a result of fission gas diffusion from the nuclear fuel element interior 210 may increase. Therefore, by decreasing the size of nuclear fuel elements 204 of the nuclear fuel material, thereby increasing the ratio between free surface area and element interior volume, it is possible to enhance the diffusion of fission gas 118, or other fission products 108, from the interiors 210 of the fuel elements 204 to the free surfaces 212 of the fuel elements 204. As in the case with grain-boundary fission product 108 nucleation, the decrease in nuclear fuel element size 206 increases the likelihood of fission gas 118 nucleation at the free surface 212 of the nuclear fuel element 204, while simultaneously decreasing the likelihood of fission gas 118 nucleation within the fuel element interior 210. The nuclear fuel elements 204 may further be consolidated to a selected density. The selected density may be chosen to balance the power density requirements of the nuclear fuel 200 and the boundary network requirements necessary for fission product 108 migration to the geometric surface 201 of the nuclear fuel 200.

Further, the nuclear fuel 200 may include a boundary network 214 configured to transport a fission product 108, such as a fission gas 118, from the free surfaces 212 of the nuclear fuel elements 204 of the nuclear fuel 200 to the external geometric surface 201 of a given volume 202 of the nuclear fuel 200. If a given fission gas bubble 118, or other fission product 108, has an open transportation pathway 216 to the geometric surface 201 of the nuclear fuel 200 then the fission gas bubble 118 may be released from the nuclear fuel material volume 202. As previously described above, the aggregated effects of fission gas 118 release across the entire volume 202 of the nuclear fuel 200 may result in a reduction or elimination of swelling in the nuclear fuel 200 upon implementation of the nuclear fuel 200 in an operational setting of a nuclear reactor. In addition to improving fission product 108 diffusion to the free surfaces 212 of the nuclear fuel elements 204, the engineering of reduced sized nuclear fuel elements 204 may also increase the spatial density of transportation pathways 216 of the boundary network 214 of the nuclear fuel 200, thereby increasing the likelihood of fission product 108 transportation from a free surface 212 to the geometric surface 201 of the nuclear fuel 200.

In one embodiment, the nuclear fuel elements 204 of the nuclear fuel 200 may include one or more metallic nuclear fuel material 124, such as, but not limited to, a metal nuclear fuel material 125, a metal alloy nuclear fuel material 126, or an intermetallic nuclear fuel material 127. For example, a metal nuclear fuel material may include, but is not limited to, uranium-235 metal, plutonium-239 metal, or thorium-233 metal. In another example, a metal alloy nuclear fuel material 126 may include, but is not limited to, uranium-zirconium, uranium-plutonium-zirconium, uranium-zirconium-hydride, or uranium aluminum. By way of a further example, an intermetallic nuclear fuel material 127 may include, but is not limited to, $UFe_2$ or $UNi_2$. It should be recognized that the above list of suitable metallic nuclear fuel materials for inclusion in the nuclear fuel elements 204 of the nuclear fuel 200 of the present invention should not be interpreted as a limitation but rather merely an illustration.

In another embodiment, the nuclear fuel elements 204 of the nuclear fuel 200 may include one or more ceramic nuclear fuel material 128, such as, but not limited to, an oxide nuclear fuel material 129, a nitride nuclear fuel material 131, or a carbide nuclear fuel material 132. For example, an oxide based nuclear material 129 may include, but is not limited to, uranium dioxide ($UO_2$), plutonium dioxide ($PuO_2$), or thorium dioxide ($ThO_2$). Moreover, an oxide based nuclear fuel material 129 may include a mixed oxide nuclear fuel material, such as, but not limited to, a mixture of $PuO_2$ and depleted or natural $UO_2$. In another example, a nitride based nuclear fuel material 131 may include, but is not limited to, uranium-nitride or plutonium nitride. By way of a further example, a carbide base nuclear fuel material may include, but is not limited to, uranium carbide 132. It should be recognized that the above list of suitable ceramic nuclear fuel materials for inclusion in the nuclear fuel elements 204 of the present invention should not be interpreted as a limitation but rather merely an illustration.

The fabrication of the nuclear fuel elements 204 for implementation in the nuclear fuel 200 of the present invention may include a variety of material processing techniques. In one embodiment, the nuclear fuel elements may be fabricated utilizing a ball milling process. For example, a ceramic material 128 or metallic material 124 or a pre-cursor thereof may undergo a ball milling process in order to fabricate a plurality of nuclear fuel elements 204 having a characteristic length 206 along a selected dimension. For instance, a uranium dioxide powder may undergo further ball milling (e.g., wet milling, dry milling, high energy ball milling or reactive ball milling) processing in order to achieve an average particle size within the uranium dioxide at or below the critical size necessary to provide adequate fission product 108 diffusion in the nuclear fuel's consolidated form. Ball milling processing is well known in the art and is capable of producing particle sizes over a large range of sizes. In some instances, ball milling has been shown capable of producing particles sizes as small as 1-5 nm. For example, a milling process may be applied to a volume of uranium dioxide powder for a sufficient time to produce particles in the size range 0.001 to 100 μm. It should be recognized that the above examples do not represent limitations but should merely be interpreted as illustrations. Those skilled in the art will recognize that there exists a variety of ball milling procedures applicable to a variety of materials and material conditions suitable to produce particle shaped nuclear fuel elements 204 for implementation in the present invention. The principles of ball milling metal and ceramic powders to sub-10 nm levels are generally described in A. S. Edelstein and R. C. Cammarata, *Nanomaterials: Synthesis, Properties, and Applications,* 1st ed, Taylor & Francis Group, 1996, which is incorporated herein by reference. The principles of high energy ball milling of oxide ceramics are generally described in S. Indris et al., "Nanocrystalline Oxide Ceramics Prepared by High-Energy Ball Milling," *Journal of Materials Synthesis and Processing,* Vol. 8, Nos. 3/4 (2000), which is incorporated herein by reference.

In addition to ball milling, the nuclear fuel elements 204 of the nuclear fuel 200 may be fabricated utilizing additional mechanical processing techniques. For example, a mechanical process suitable for fabricating nuclear fuel elements 204 having a reduced thickness in at least one dimension may be utilized to fabricate the nuclear fuel elements 204 of the nuclear fuel 200. For instance, a cold-rolling process may be utilized to fabricate planar thin sheets of a metal nuclear fuel material, such as thorium. The metallic nuclear fuel sheets may be cold-rolled to a thickness smaller than the critical distance required for adequate diffusion of fission products 108 from the interior of the sheets to the surface of the sheets. By way of another example, a drawing process may be utilized to fabricate thin wire structures of a metal nuclear fuel material. The metallic nuclear fuel wires may be drawn to a cross-sectional radius smaller than the critical distance required for adequate diffusion of fission products 108 from the interior of the wires to the surface of the wires. Those skilled in the art will recognize that there exist a variety of mechanical process techniques suitable for fabricating nuclear fuel elements 204 of the nuclear fuel 200 of the present invention. It should further be recognized that the wires and planar sheets described above do not represent limitations on the shape of mechanically shaped nuclear fuel elements 204 of the present invention and are merely illustrative in nature.

In another embodiment, the nuclear fuel elements 204 of the nuclear fuel 200 may be fabricated utilizing a nanostructuring technique. For example, nanostructuring techniques may be implemented to form nanowires, nanotubes, nanorods, nanosheets, nanorings, or the like. For example, the nuclear fuel elements 204 of the nuclear fuel 200 may include nanorods formed from the nanostructuring of a metal oxide based nuclear fuel material. For instance, nanorods of metal oxide materials have been fabricated to have thicknesses as small as 40 nm with lengths of 10 μm. The principles of metal oxide nanorod formation are generally described in U.S. Pat. No. 5,897,945, issued on Apr. 27, 1999, and is incorporated herein by reference.

It should be recognized that the nuclear fuel elements 204 of the present invention may be fabricated in variety of manners. It should be further recognized that, based on the context of the nuclear fuel 200 implementation, one fabrication method may be superior to another method of fabrication. The key feature of the various fabrication methods is that they may provide a means for producing nuclear fuel elements 204 having a size equal to or smaller than a critical distance necessary for providing adequate diffusion of a fission product 108 in the condensed nuclear fuel 200.

In further embodiments, one or more processes may be utilized in order to refine the size, shape, or other characteristic of the fabricated nuclear fuel elements 204 of the nuclear fuel. For example, one or more material processing techniques may be utilized to reduce the size of the nuclear fuel elements 204 along one or more dimensions. Further, one or more material processing techniques may be utilized to reduce the grain sizes within the nuclear fuel elements 204 along one or more dimensions The material processing techniques may include, but are not limited to, cold-working, annealing, tempering, normalizing, chemical treatment, mechanical treatment, irradiation, exposure to high temperature environment, porosity control, or texture control. The various applicable processes have been described previously herein. It should be recognized that the previous description of the above material processing methods may be extended to the processing of non-consolidated nuclear fuel elements 204 currently presented.

In one embodiment, a portion of the nuclear fuel elements 204 of the nuclear fuel 200 may include nuclear fuel elements 204 having a three dimensional geometric shape. For example, the three dimensional geometric shaped nuclear fuel elements 204 may include regular or irregular shaped nuclear fuel elements. For instance, the nuclear fuel elements 204 may include, but are not limited to, a spherical element, a cylindrical element, an ellipsoidal element, a toroidal element, or a rhomboidal element.

In another embodiment, some of the nuclear fuel elements 204 of the nuclear fuel 200 may include, but are not limited to, a particle nuclear fuel element, a linear nuclear fuel element, or a planar nuclear fuel element. For instance a particle nuclear element may include, but is not limited to, a spherical particle, a cylindrical particle, an ellipsoidal particle, or an irregular shaped particle. In another instance, the linear nuclear fuel element may include, but is not limited to, a cylindrically shaped wire, or a cylindrical shaped rod or rodlet. In an additional instance, a planar nuclear fuel element, may include, but is not limited to, a rectangular "sheet" shaped nuclear fuel element.

Figure 2C:
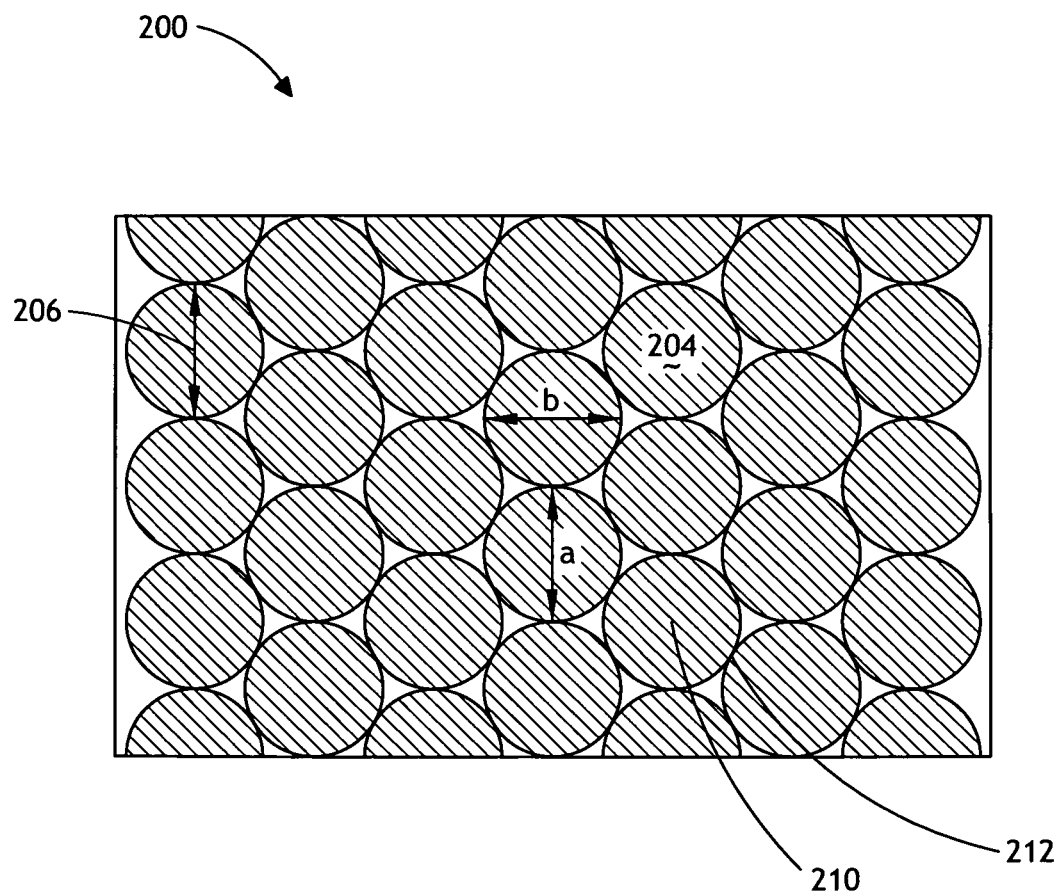
FIG. 2C is an idealized schematic diagram illustrating grains of the nuclear fuel.
Figure 2D:
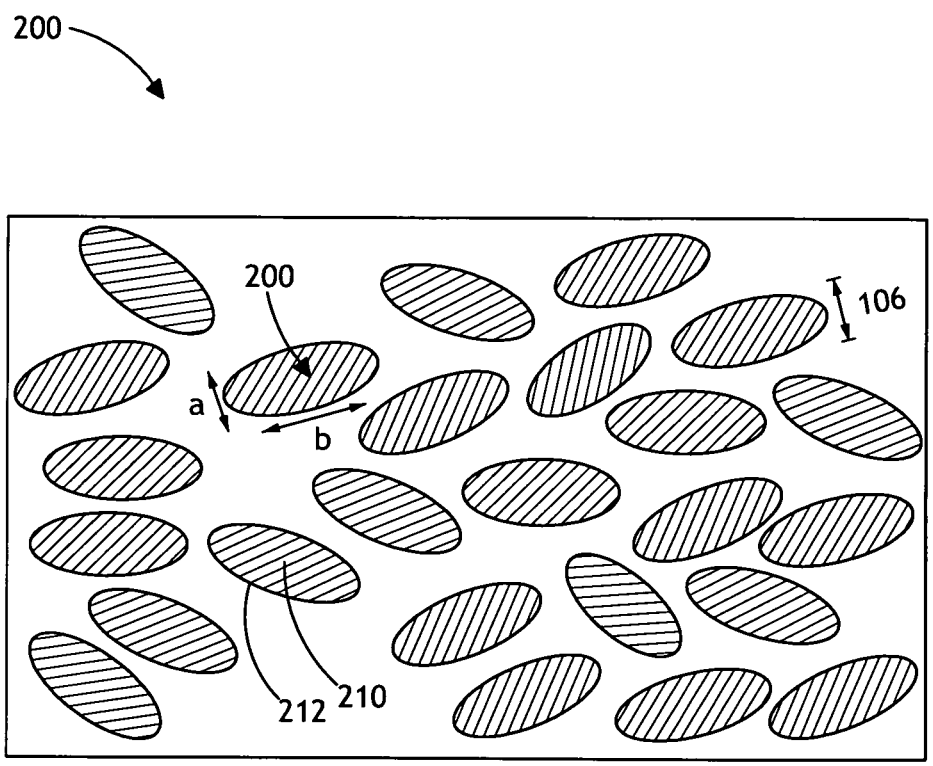
FIG. 2D is an idealized schematic diagram illustrating deformed grains of the nuclear fuel.
Figure 2E:
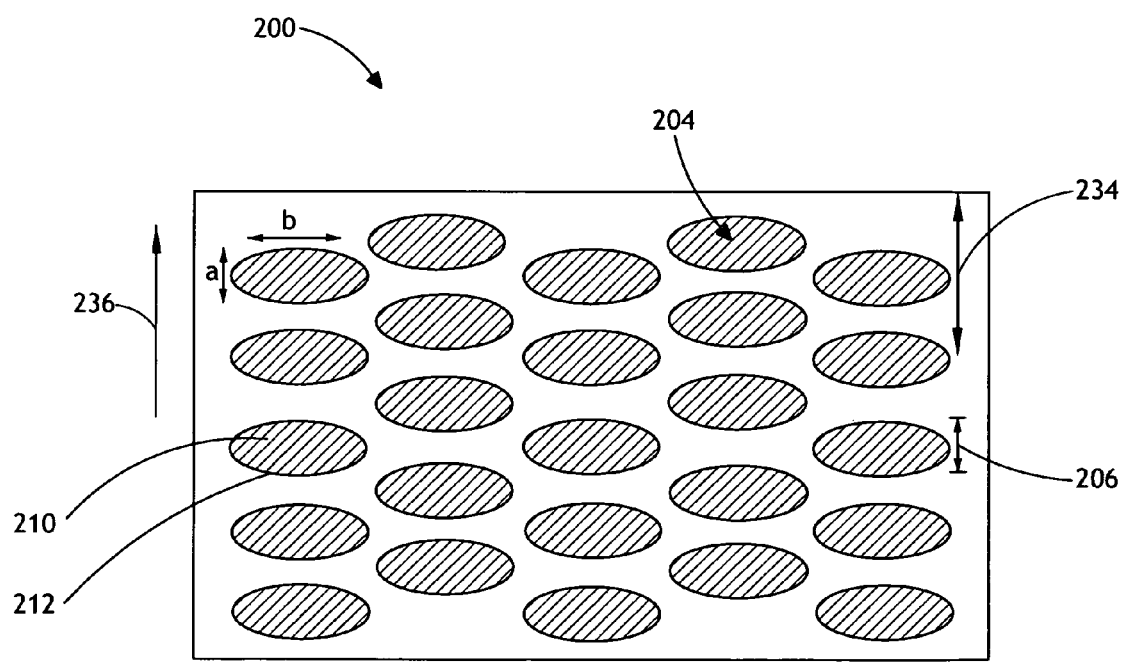
FIG. 2E is an idealized schematic diagram illustrating deformed grains of the nuclear fuel.

Referring now to FIGS. 2C through 2E, the characteristic length 206 along at least one dimension of one or more nuclear fuel elements 204 may include a characteristic length 206 along all dimensions of one or more nuclear fuel elements 204 of the nuclear fuel 200. For example, the nuclear fuel elements 204 of the nuclear fuel 200 may be engineered such that the "height", represented by "a," and "width," represented by "b" are similar in size. Therefore, a fission product 108 may efficiently diffuse from the nuclear fuel element interior 210 to the nuclear fuel element surface 212 along all directions within the grain. In this context, a nuclear fuel element 204 may be characterized by the nuclear fuel element "size." The nuclear fuel element size 206 may be selected such that the nuclear fuel elements 204 are small enough to allow for adequate diffusion from the interiors 210 of the one or more nuclear fuel elements 204 to the boundaries 212 of the one or more nuclear fuel elements 204.

As shown in FIG. 2D, the characteristic length 206 along at least one dimension of one or more nuclear fuel elements 204 may include a characteristic length 206 along a selected dimension of one or more nuclear fuel elements 204. For example, as shown in FIG. 2D, the nuclear fuel elements 204 within the nuclear fuel 200 may be engineered to have a selected characteristic length 206 along a given dimension of the nuclear fuel elements 106. For instance, in the case of a nuclear fuel element 204 having an elongated structure, the nuclear fuel element 204 may have a selected characteristic length along the "thin" dimension, shown as dimension "a" in FIG. 2D, of the nuclear fuel element 204. In another instance, in the case of a nuclear fuel element 204 having an elongated structure, the nuclear fuel element 204 may have a selected characteristic length along the "thick" dimension, shown as dimension "b" in FIG. 2D, of the nuclear fuel element 204. It should be recognized that the nuclear fuel element 104 need only have at least one characteristic length 206 smaller than the distance required for adequate diffusion from the interiors 210 of the one or more nuclear fuel elements 204 to the boundaries 212 of the one or more nuclear fuel elements 204. It is further recognized, however, that all dimensions of a nuclear fuel element 204 may have a characteristic length 206 smaller than or equal to a distance required for adequate diffusion of fission product 108 from the interiors 210 of the one or more nuclear fuel elements 204 to the boundaries 212 of the one or more nuclear fuel elements 204.

As shown in FIG. 2E, the characteristic length 206 along at least one dimension of one or more nuclear fuel elements 204 may include a characteristic length 206 along a selected direction 234. For example, the nuclear fuel elements 204 within the nuclear fuel 200 may be engineered to have a selected characteristic length 206 along a given direction in the nuclear fuel 200. For instance, a nuclear fuel element 204 having an elongated structure may have a selected characteristic length 206 along a selected direction 234 within the nuclear fuel 200.

In another embodiment, one or more nuclear fuel elements 204 may have a characteristic length 204 along a dimension of the one or more nuclear fuel elements 204 selected to maximize heat transfer from a nuclear fuel element-interior 210 to a nuclear fuel element-boundary 212. For example, the one or more nuclear fuel elements 204 may be oriented such that their narrow dimensions, shown as "a" in FIG. 2E, are aligned substantially perpendicular to a thermal gradient 236 in the nuclear fuel 200. Such an arrangement aids in the heat transfer from the nuclear fuel element-interior 210 to the nuclear fuel element-surface 212, aiding in the diffusion of a fission product 108 from the nuclear fuel element interior 210 to the nuclear fuel element surface 212. By way of another example (not shown), in a spherical fuel pebble fabricated utilizing the nuclear fuel 200 of the present invention the nuclear fuel elements 204 of the nuclear fuel 200 may be arranged to have their the narrow dimension substantially perpendicular to the radial thermal gradient of the cylindrical pellet. It should be noted that the illustrations in FIGS. 2C, 2D, and 2E represent simplified conceptual illustrations of a plurality of nuclear fuel elements 204 consistent with the present invention and should not be interpreted as schematical in nature. Further, it should be recognized by those skilled in the art that a variety of materials processing techniques (e.g., cold-working and/or annealing, compression, or extrusion) previously and further described herein may be implemented in order to develop the symmetrical nuclear fuel element structure in FIG. 2C, and the deformed elongated nuclear fuel element structure illustrated in FIGS. 2D and 2E.

In other embodiments, it is contemplated herein that the plurality of nuclear fuel elements 204 of the nuclear fuel 200 may include controllable statistical attributes, such as average sizes and statistical distributions (e.g., counting statistics and spatial distribution statistics) similar to the plurality of grains 104 of the nuclear fuel 100 described previously herein, which extends to the instant context.

In other embodiments, it is contemplated that the critical distance required to ensure adequate diffusion of fission products 108 from the interior of the nuclear fuel elements 204 to the surface of the nuclear fuel elements may depend on a variety of conditions The conditions include, but are not limited to, operational conditions of the nuclear fuel 200 (e.g., operational temperature or temperature induced pressure within the nuclear fuel 200), the chemical composition of the nuclear fuel 200, the fission product generation rate, or the size required to inhibit fission product nucleation within the nuclear fuel 200. The description of these conditions in the context of the nuclear fuel 100 should be interpreted to extend to the instant context.

Referring again to FIGS. 2A and 2B, a plurality of transportation pathways 216 may form a system of interconnected pathways 214. For example, as previously described, as the nuclear element size 204 decreases within the nuclear fuel 200 the spatial density of nuclear element surfaces 212, and therefore transportation pathways 216, within the nuclear fuel 200 increases. An increase in transportation pathway density serves two purposes. First, the number of transportation pathways that intersect the geometric surface 201 of the volume 202 of the nuclear fuel 200 will increase as the number of transportation pathways 216 increases within the nuclear fuel 200. As a result of the increase in transportation pathways 216 intersecting with the geometric surface 201 of the nuclear fuel 200, the amount of fission gas 118 that may be transported via the boundary network 214 from the nuclear fuel element surfaces 212 of the nuclear fuel elements 204 increases. Second, the likelihood that a given transportation pathway 216 will intersect with another transportation pathway 216 will increase as the transportation pathway density increases within the nuclear fuel 200. Thus, a reduced nuclear fuel element size 206 of the nuclear fuel 100 may lead to an increase in the number of transportation pathways 216 open to the geometric surface 201 and an increase in the frequency of interconnection between the multiple transportation pathways 216, both of which facilitate the efficient fission gas transport from the nuclear fuel elements 212 to the geometric surface 201.

In one embodiment, the boundary network 214 of the nuclear fuel 200 may generally be controlled by controlling the porosity within the nuclear fuel 200. In a further embodiment, the porosity of the nuclear fuel 200 may be controlled by variation of the pressing and sintering parameters upon consolidation of the plurality of nuclear fuel elements 204 into a solid consolidated volume 202 of nuclear fuel 200. For instance, the robustness of the boundary network 214 may controlled by varying at least one of the group including pressing pressure, sintering temperature, sintering time, presence of reducing atmosphere, binding agent parameters. Therefore, during the fabrication of the nuclear fuel 200, the qualities of the boundary network 214 of the nuclear fuel 200 may depend, among other things, upon: nuclear fuel element size 204, binding agent mixture concentration, type of binding agent, compaction pressure, sintering temperature, annealing temperature, annealing time and nuclear fuel element chemical composition. It should be noted that this merely represents an illustrative list of parameters which may dictate the formation of the boundary network 214 of the nuclear fuel 200 in the context of sintering.

It is further contemplated that a sintering and/or compaction process may be applied to the consolidation of either metallic nuclear fuel elements or ceramic nuclear fuel elements. The principles of sintering of metals are generally described in U.S. Pat. No. 4,992,232, issued on Feb. 12, 1991; and U.S. Pat. No. 2,227,177, issued on Dec. 31, 1940, which are incorporated herein by reference. The principles of sintering ceramics are generally described in U.S. Pat. No. 6,808,656, issued on Oct. 26, 2004; and U.S. Pat. No. 3,995,000, issued on Nov. 30, 1976, which are incorporated herein by reference. The principles of sintering uranium dioxide and precursors thereof in the presence of various atmospheres are described in J. Williams et al., "Sintering uranium oxides of composition $UO_2$ to $U_3O_8$ in various atmospheres," *Journal of Nuclear Materials*, Vol. 1, Issue 1 April pp. 28-38 (1959), which is incorporated herein by reference.

It is contemplated herein that previously described aspects of boundary network 114 formation, such as facilitation of boundary network growth via fission gas 118 diffusion, formation of a boundary network via control of void region growth, or development of a boundary network via precipitation, within the nuclear fuel 100 should be interpreted to extend to the instant context.

In one embodiment, the selected density of the nuclear fuel 200 may include a density less than the theoretical density of the nuclear fuel material. For example, the nuclear fuel elements 204 may be consolidated into a solid consolidated volume having a density of 70% of the theoretical density of the material. In another instance, the density may be 98% of the theoretical material density. In a general sense, there is no specific requirement for the nuclear fuel 200 density. Rather, the density should be selected on a case by case basis, depending on the specifics of implementation. The minimum density required is a function of the required power density of the nuclear fuel 200. Based on currently implement fuels, most modern day nuclear reactor systems require a fuel density of approximately 68% or greater, however, this should not be interpreted as a limitation. It is contemplated herein that the density of the nuclear fuel 100 may be significantly below 68% of the theoretical density of the material. For instance, the fuel density of the nuclear fuel 100 may be below 50% of the theoretical density of the material. The selected density may balance the power density requirements of the nuclear fuel 200 and the fission product transport requirements provided by an open boundary network 114. It is contemplated herein that the precise density utilized in a given application may be determined on a trial and error basis given the specific implementation or via a computer modeling technique.

In one embodiment, the consolidated volume 202 of nuclear fuel 200 may take on a variety of shapes. For example, the nuclear fuel elements 204 may be consolidated and compacted and sintered utilizing a mold. This process may result in a self-supporting fuel segment. The shape of the fuel segment may include, but is not limited to, a rod, a rodlet, a plate, a sheet, an annuli, a sphere, or any other three-dimensional shape. In another embodiment, the consolidated volume 202 of nuclear fuel 200 may be formed by consolidating the nuclear fuel elements 204 into a container, such as a tube. For instance, a powder of spherical particle shaped nuclear fuel elements 204 may be consolidated into a tubular container.

Figure 2F:
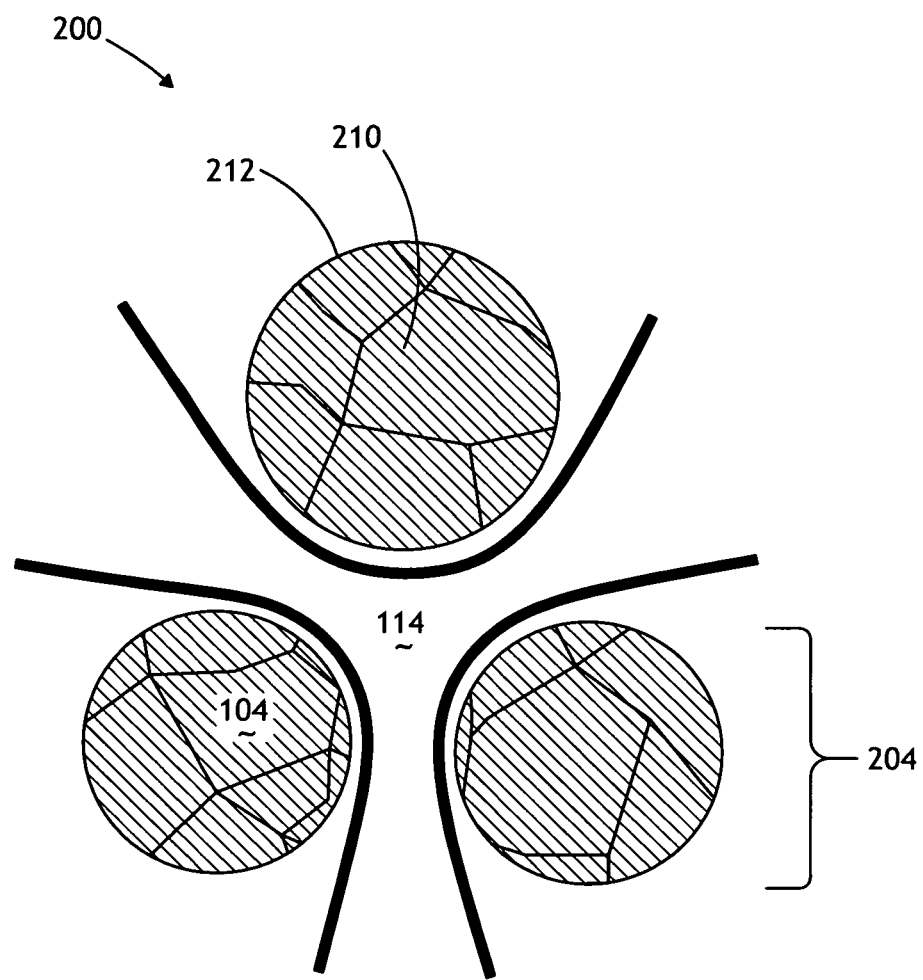
FIG. 2F is a schematic diagram illustrating the two or more grains of the nuclear fuel elements of the nuclear fuel.

Referring now to FIG. 2F, the nuclear fuel elements 204 of the nuclear fuel 200 may include two or more grains. For example, the individual nuclear fuel elements 204 (e.g., particles) of the present invention may include a plurality of grains. The nuclear fuel elements 204 may be fabricated in manner to ensure their constituent grains have sizes small enough to ensure fission product diffusion 108 from the grain-interiors to the grain-boundaries of the nuclear fuel elements 204. In another embodiment, the nuclear fuel elements 204 of the nuclear fuel 200 may include one or more transportation pathways configured to transport one or more fission products 108 from the grain-boundaries of the nuclear fuel element-interior 210 to the surface 212 of the nuclear fuel element 204. The grain structure and transportation pathway requirements of the nuclear fuel elements 204 are consistent with the description provided previously herein.

Figure 2G:
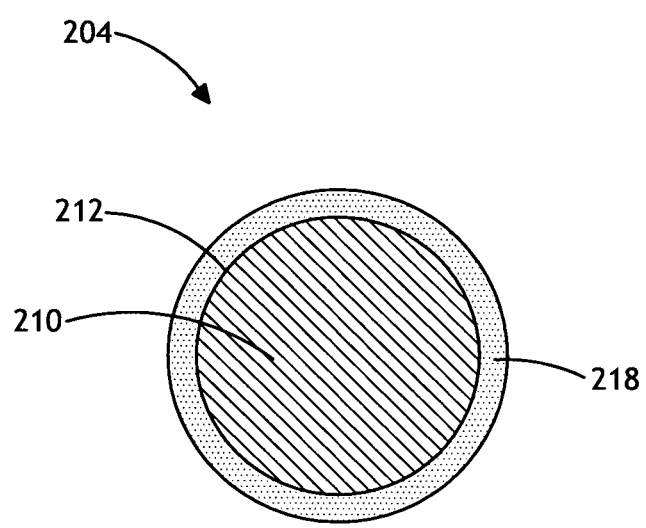
FIG. 2G is a schematic diagram illustrating an interfacial layer on a nuclear fuel element of the nuclear fuel.

Referring now to FIG. 2G, one or more nuclear fuel elements 204 of the nuclear fuel 200 may include an interfacial layer 218. It is contemplated herein that the previously described aspects of interfacial layer formation within the nuclear fuel 100 should be interpreted to extend to the instant context.

Figure 2H:
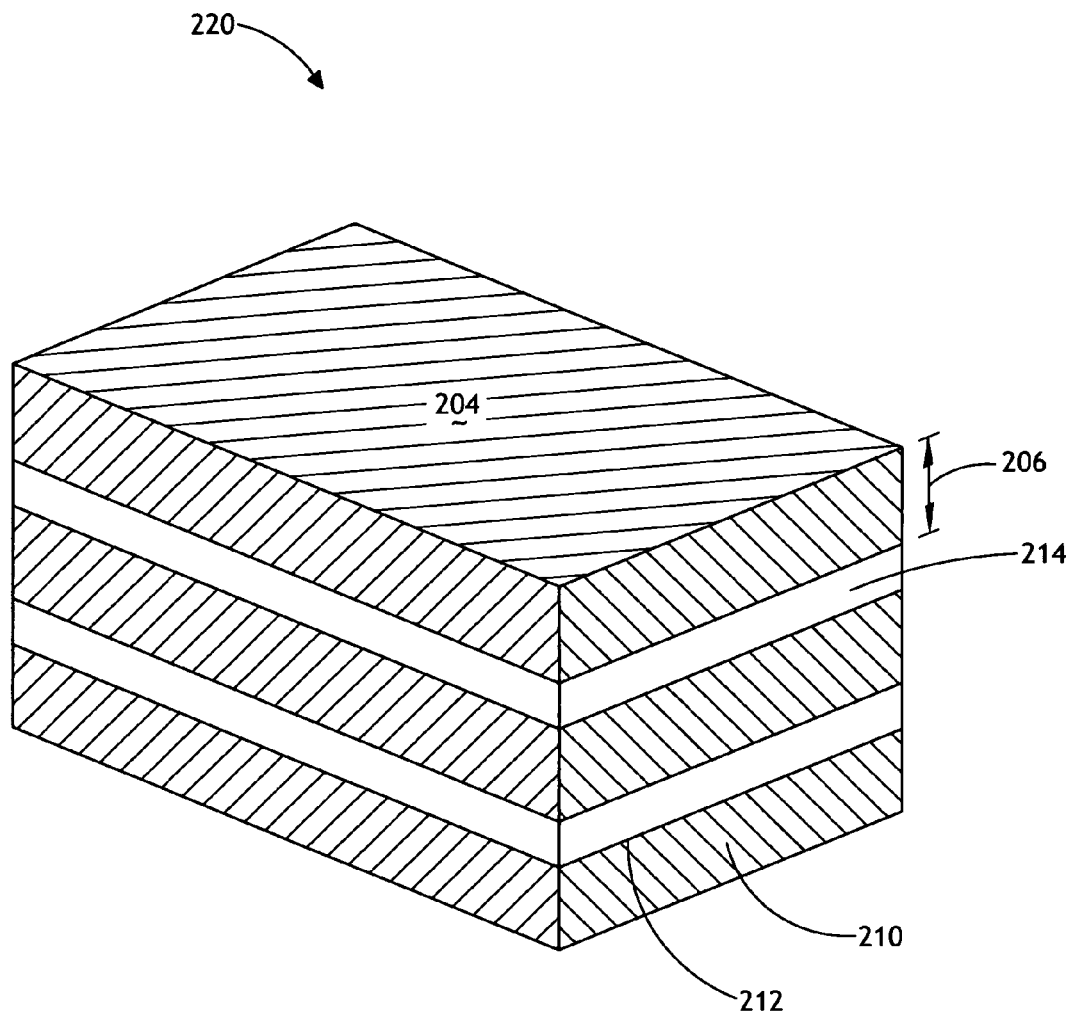
FIG. 2H is a schematic diagram illustrating a nuclear fuel formed via mechanical processing.
Figure 2J:
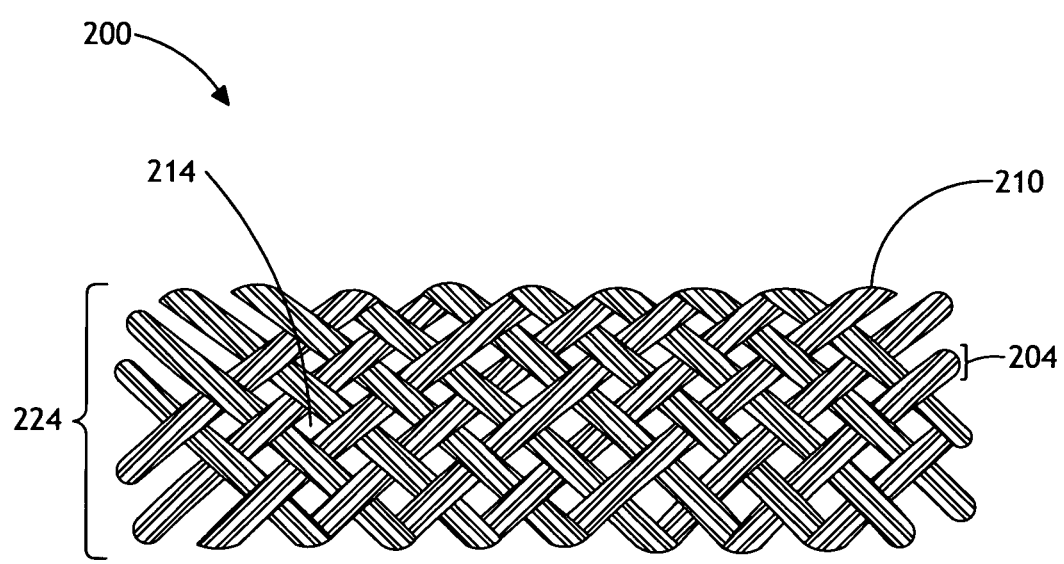
FIG. 2J is a schematic diagram illustrating a nuclear fuel formed via mechanical processing.

Referring now to FIGS. 2H through 2J, the nuclear fuel elements 204 may be consolidated into a solid volume 202 utilizing a mechanical consolidation method. For example, as shown in FIG. 2H, a plurality of planar nuclear fuel elements 204 may be stacked to form a consolidated stack of nuclear fuel 200. In this example, it is further contemplated that an interfacial region 218 may be optionally grown or deposited on the surface of the planar nuclear fuel elements 204 in order to provide a spacer layer between subsequent nuclear fuel elements 204. Moreover, the spacer layer may act to define the boundary network 114 as the porosity of the spacer layer may be controlled, allowing for sufficient transport of fission gases 118 from the surfaces 212 of nuclear fuel elements 204 to the geometric surface 201 of the nuclear fuel 200. It should be further noted that in this context the pathways of the boundary network 214 need not interconnect since any single pathway has an open pathway to the geometric surface 201 of the nuclear fuel 200.

In another example, shown in FIG. 2I, a planar nuclear fuel element 204 may be "rolled" into a consolidated cylindrically shaped nuclear fuel 200. For example, a sufficiently ductile metallic nuclear fuel element 204, such as thorium, may be used to form the rolled fuel illustrated in FIG. 2I. Moreover, a space layer as described above may also be optionally utilized to define an open pathway to the nuclear fuel surface 200.

By way of another example, shown in FIG. 2J, a plurality of wire shaped nuclear fuel elements 204 may be woven into consolidated nuclear fuel 200. For example, a wire structure formed from processing a metallic nuclear fuel material may be woven into the consolidated nuclear fuel 200 illustrated in FIG. 2J. It is contemplated herein that the diameter of the nuclear fuel wires 210 may have diameter of approximately 5 to 100 µm. This thickness, however, should not be considered a limitation but merely an illustration.

In other embodiments, the consolidated volume of the nuclear fuel 200 may be processed utilizing a variety of processes (e.g., material processing techniques) previously described herein. For example, the nuclear fuel 200 may undergo one or more processing techniques, such as, but not limited to, cold-working, annealing, tempering, normalization, chemical treatment, or irradiation. The previous description of fuel piece processing provided previously herein should be apply to the instant context.

Figure 3:
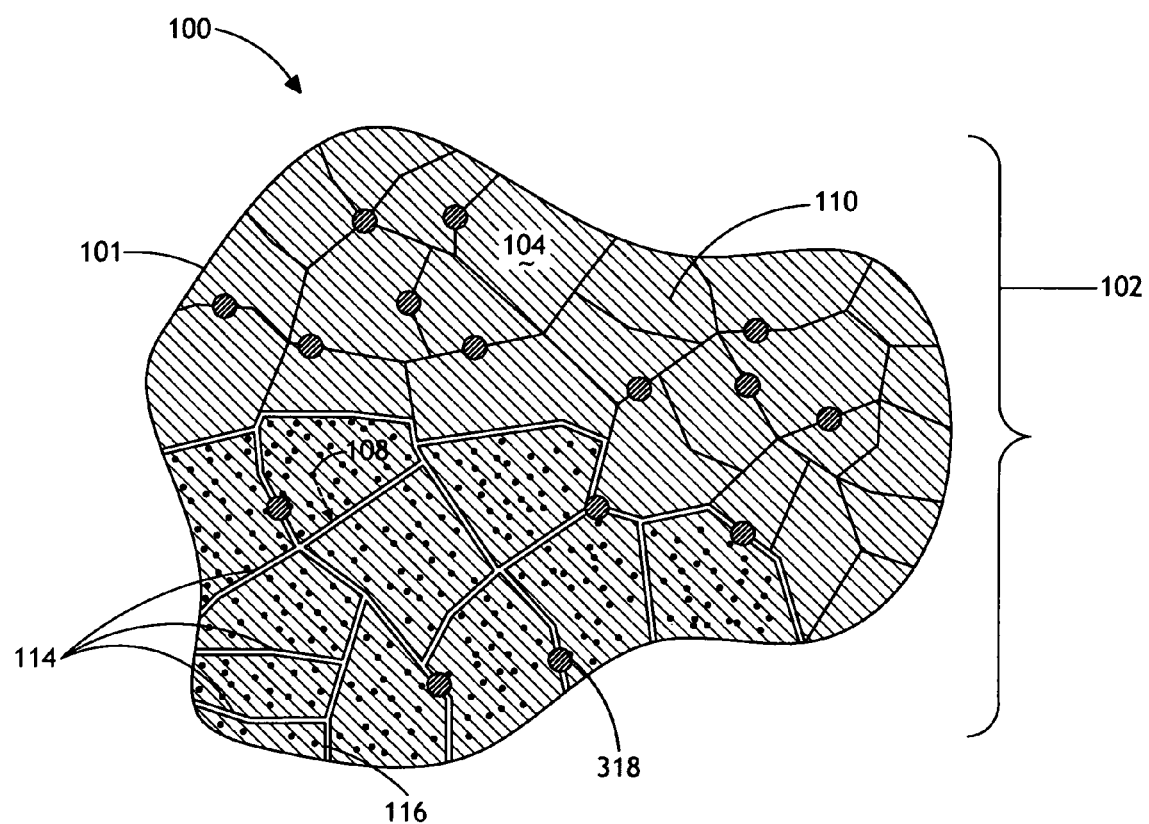
FIG. 3 is a schematic diagram illustrating a nuclear fuel including a plurality of dispersant particles.
Figure 4:
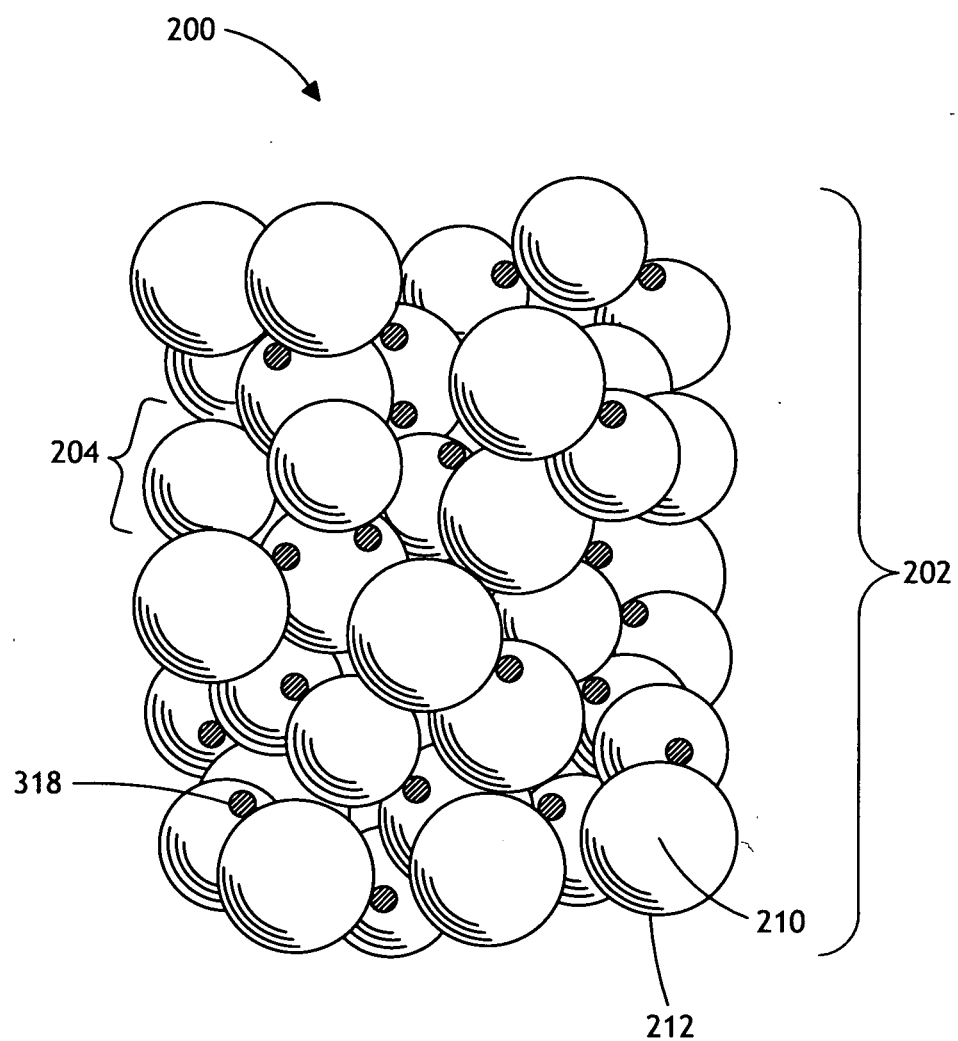
FIG. 4 is a schematic diagram illustrating a nuclear fuel including a plurality of dispersant particles.

Referring now to FIGS. 3 and 4, alternative embodiments of the present invention are illustrated. In one aspect, the nuclear fuel 100 and 200 of the present invention may further include a plurality of dispersant particles 318 dispersed within the volume of the nuclear fuel 100 and 200. The dispersant particles may serve as preferential fission product 108 (e.g., fission gas 108) occupation sites within the nuclear fuel 100.

In one embodiment, the dispersant particles 318 may include one or more ceramic particles. For example, the dispersant particles may include one or more oxide particles, nitride particles, or carbide particles. For instance, some of the dispersant particles may include, but is not limited to, stable oxides. One type of stable oxide suitable for implementation in a nuclear fuel setting is zirconium dioxide. It is recognized, however, that that zirconium is neutronically problematic in a nuclear fuel setting due to neutron absorption. Therefore, the wt. percentage of zirconium in a metal alloy or ceramic based nuclear fuel should be approximately between 0 and 10%. This, however, should not be considered a limitation as it is anticipated in certain contexts zirconium concentration may exceed 10%. In addition to zirconium oxide based materials, it is further contemplated that a variety of other oxide based material may be suitable for implementation in the present invention, such as, but not limited to, yttrium oxide, scandium oxide, chromium oxide, and titanium oxide. In another embodiment, the dispersant particles 318 may include one or more metallic particles. For example, the dispersant particles may include one or more metal particles, metal alloy particles, or intermetallic particles.

In another embodiment, the dispersant particles 318 may include particles shells. For example, the dispersant particles may consist of substantially hollow shells of oxide material. For instance, one or more metallic particles may undergo an oxidation process. This oxidation process may result in an oxide layer at the surfaces of the one or more particles. Then, the metallic interiors of the one or more particles may under an additional treatment process which acts to dissolve the metallic center of the particle, leaving the one or dispersant particles consisting of hollow oxide shells. For example, a uranium based metal may be utilized in order to fabricate uranium oxide hollow shell dispersant particles. It is further contemplated that the uranium oxide shell dispersant particles may be fabricated to have a size of approximately 1 µm. It should be recognized that the above description does not represent a limitation but should be interpreted merely as an illustration. It is contemplated herein that the concepts described above may be extend to other metals and metal alloys (e.g., plutonium, uranium-plutonium, uranium-zirconium, or thorium) and other shell materials (e.g., nitrides or carbides).

In another embodiment, as illustrated in FIG. 3, the dispersant particles 318 may be distributed along the grain-boundaries 112 of nuclear fuel 100. For example, the dispersant particles 318 may be dispersed within a nuclear fuel material (e.g., prior to consolidation of the nuclear fuel material). Then, after dispersal of the dispersant particles into the nuclear fuel material the nuclear fuel material may then be consolidated into a solid volume 102 of nuclear fuel 100. The consolidated nuclear fuel 100 may include a plurality of grains having a characteristic length 106 along at least one dimension smaller than or equal to a critical distance necessary to ensure adequate diffusion of a fission product 108 from the grain-interiors 110 to the grain-boundaries 112 of the nuclear fuel 100. Further, the consolidated nuclear fuel may include a boundary network 114 configured to transport a fission product 108 from the grain-boundaries 110 of the nuclear fuel 100 to the geometric surface of the nuclear fuel 100. In one instance, the dispersant particles 138 may be dispersed into a molten metal or metal alloy nuclear fuel prior to casting. In another instance, the dispersant particles may be interspersed with a metal oxide nuclear fuel powder prior to compaction and sintering. In either case, the dispersant particles 138 may localize along the grain-boundaries of the solidified and crystallized nuclear fuel material 100.

In another embodiment, as illustrated in FIG. 4, the dispersant particles 318 may be distributed along the surfaces of the nuclear fuel elements 204 in nuclear fuel 200. For example, the dispersant particles 318 may be dispersed within a volume of unconsolidated nuclear fuel elements 204 (e.g., powder of spherically shaped uranium dioxide particles) having a characteristic length 206 suitable for maintaining adequate fission product 108 diffusion from the nuclear fuel element-interior 210 to the nuclear fuel element surface 212. Then, after dispersal of the dispersant particles 318 into the nuclear fuel material the nuclear fuel material may then be consolidated into a solid volume 102 of nuclear fuel 100. The consolidated nuclear fuel 200 may include a boundary network 114 configured to transport a fission product 108 from the nuclear fuel element surfaces 212 to the geometric surface of the nuclear fuel 200. For instance, the dispersant particles 318 may be dispersed into a metal oxide nuclear fuel powder prior to compaction and sintering. The plurality of nuclear fuel elements 204 (along with the dispersed dispersant particles 318) may then be consolidated utilizing a consolidation process, such as, but not limited to, compaction and sintering.

It should be recognized that the dispersant particles located at the grain-boundaries 112 of nuclear fuel 100 and the nuclear fuel element surfaces 212 of nuclear fuel 200 may serve as preferential occupation sites for fission gas 118 that diffuses from within the grains 104 or nuclear fuel elements 204. In this manner, the dispersant particles 318 may act to facilitate the production of a boundary network 114 or 214 in nuclear fuel 100 and nuclear fuel 200 respectively. In the case of nuclear fuel 100, the preferential nucleation of fission gas 118 at a dispersant particle 318 location may act to facilitate the "open" bubble formation previously described herein. In the case of nuclear fuel 200, the preferential nucleation of fission gas 118 at a dispersant particle 318 may act to produce connected void regions in the regions between nuclear fuel elements 204 and may aid in porosity control.

In a further embodiment, the dispersant particles 318 may be distributed uniformly throughout the volume of nuclear fuel 100 or 200 in order to produce a low density geometrical arrangement. For example, in the case of a cylindrical fuel pellet, the dispersant particles 318 may be distributed throughout the nuclear fuels 100 or 200 in manner which produces low density cylindrical concentric shells. In another example, in the context of a spherical fuel segment, the dispersant particles 318 may be distributed throughout the nuclear fuels 100 or 200 in a manner which creates low density spherical concentric shells. Moreover, it is also anticipated that the density of dispersant particles within a given fuel segment may vary spatially within the fuel segment. For instance, in the case of a cylindrical fuel pellet, the maximum density may exist at the center of the fuel pellet, with the dispersant particle density decreasing as a function of the distance from the center of the fuel pellet. [see 4:00 of #53]

In another embodiment, it is further contemplated that a dispersant may be introduced into the nuclear fuel 100 in order to inhibit the recrystallization of the grain structure of a cold-worked nuclear fuel material. As a result, the dispersion of particles into the volume of the nuclear fuel material may aid in achieving an average grain size 106 in the nuclear fuel 100 below a critical size required for adequate fission product diffusion. For example, a selected particle type may be introduced into the nuclear material prior to consolidation into a solid metallic nuclear fuel piece. For example, particles may be introduced at volume fractions of between 0 and 40%. It has been observed that, in a general sense, an increase in volume fraction of dispersant particles may lead to a decrease in the grain size of the nuclear fuel 100 upon recrystallization. Further, the grain size 106 upon recrystallization may also be a function of the size of the dispersant particle introduced into the nuclear fuel material. Particle sizes introduced into the nuclear fuel material may range between 0.005 and 50 µm. In a general sense, as the particle size decreases the size of grains upon recrystallization also decrease. This concept is often referred to as "Zener pinning."

The ultimate choice of dispersant particle may depend, among other things on the desired grain size 106 or nuclear fuel element size 206, chemical compatibility of the dispersant particles with the primary materials of the nuclear fuel, the potential for migration within the nuclear fuel upon exposure to a high temperature environment, and neutron cross-section of the dispersant particles.

It should be recognized that the precise sizes of the grains 104 of nuclear fuel 100 or the nuclear fuel elements 204 of nuclear fuel 200 may be determined on a case by case basis. The required sizes of grains 104 or nuclear fuel elements 204 may depend on a variety of factors, including, but not limited to, nuclear reactor type, density requirements (i.e., power density requirements may demand a minimum density), chemical composition of nuclear fuel, temperature of implementation, required lifetime of nuclear fuel and the like. Therefore, these factors should be considered when engineering the specific embodiment of the nuclear fuel of the present invention.

Following are a series of flowcharts depicting methods of fabrication of the nuclear fuel. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
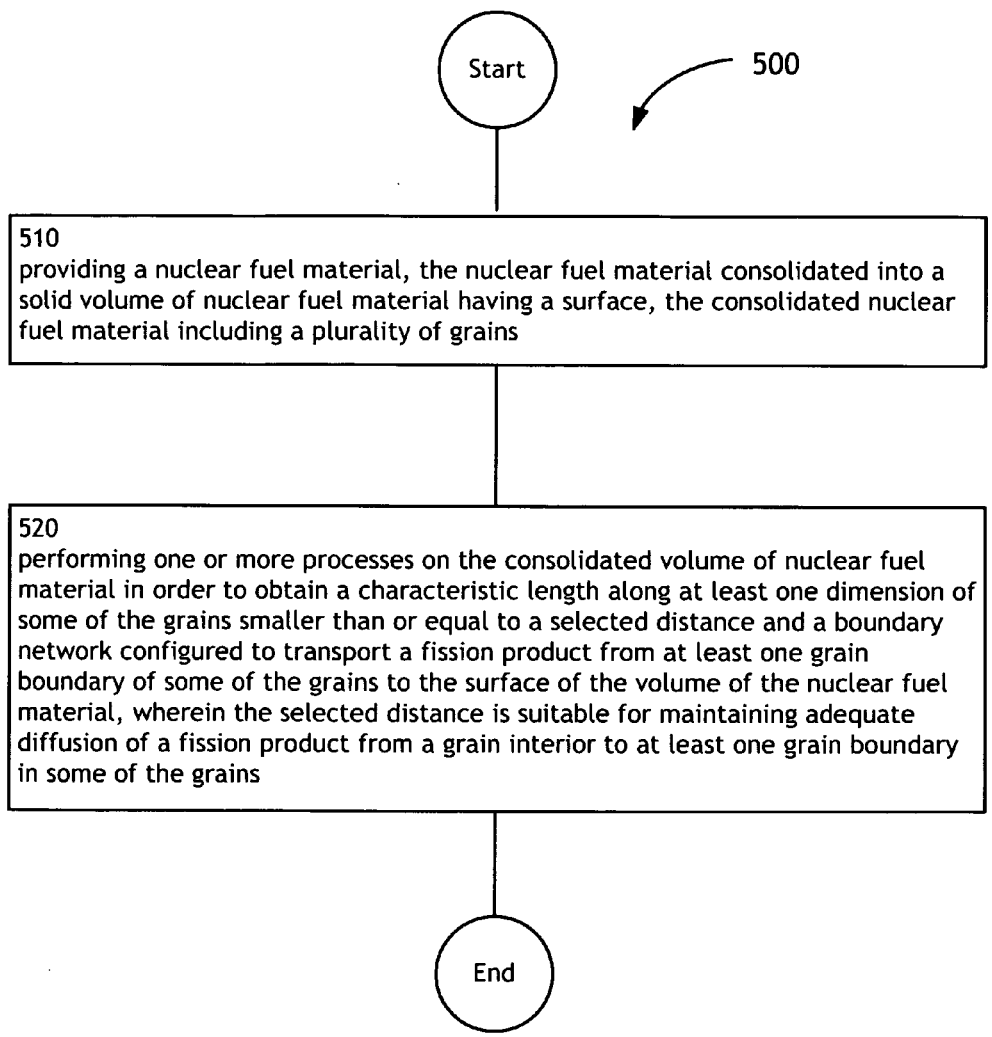
FIG. 5 is a high-level flowchart of a method for fabricating a nuclear fuel

FIG. 5 illustrates an operational flow 500 representing example operations related to a method for fabricating a nuclear fuel. In FIG. 5 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 500 moves to a providing operation 510. Providing operation 510 depicts providing a nuclear fuel material, the nuclear fuel material consolidated into a solid volume of nuclear fuel material having a surface, the consolidated nuclear fuel material including a plurality of grains. For example, as shown in FIGS. 1A through 4, nuclear fuel material may be consolidated into a volume 102 of nuclear fuel material having a plurality of grains 104. For instance, a volume 102 of metallic nuclear fuel material 124 may be cast from a molten phase into a solid nuclear fuel piece. In another instance, a ceramic nuclear fuel material 128 may be formed during a compaction and sintering process. The consolidated volume 102 of nuclear fuel material may then be provided for further processing.

Then, processing operation 520 depicts performing one or more processes on the consolidated volume 102 of nuclear fuel material in order to obtain a characteristic length 106 along at least one dimension of some of the grains 104 smaller than or equal to a selected distance and a boundary network 114 configured to transport a fission product 108 from at least one grain boundary 112 of some of the grains 104 to the surface 101 of the volume 102 of the nuclear fuel material, wherein the selected distance is suitable for maintaining adequate diffusion of a fission product 108 from a grain interior 110 to at least one grain boundary 112 in some of the grains. For example, as shown in FIGS. 1A through 4, a first process step may be performed on the volume 102 of nuclear fuel material (e.g., fuel rod, fuel pellet, or fuel pebble) in order to reduce the grain sizes 106 of the grains 104 within the volume 102 of nuclear fuel material to a size below a critical size required for adequate diffusion of a fission product 108 from the interior 110 of the grains 104 to the grain-boundaries 112. Additionally, in either the first process step or a second process step a boundary network 114 suitable for transporting a fission product 108 from the grain-boundaries 112 to the geometric surface 101 of the nuclear fuel 100.

Figure 6:
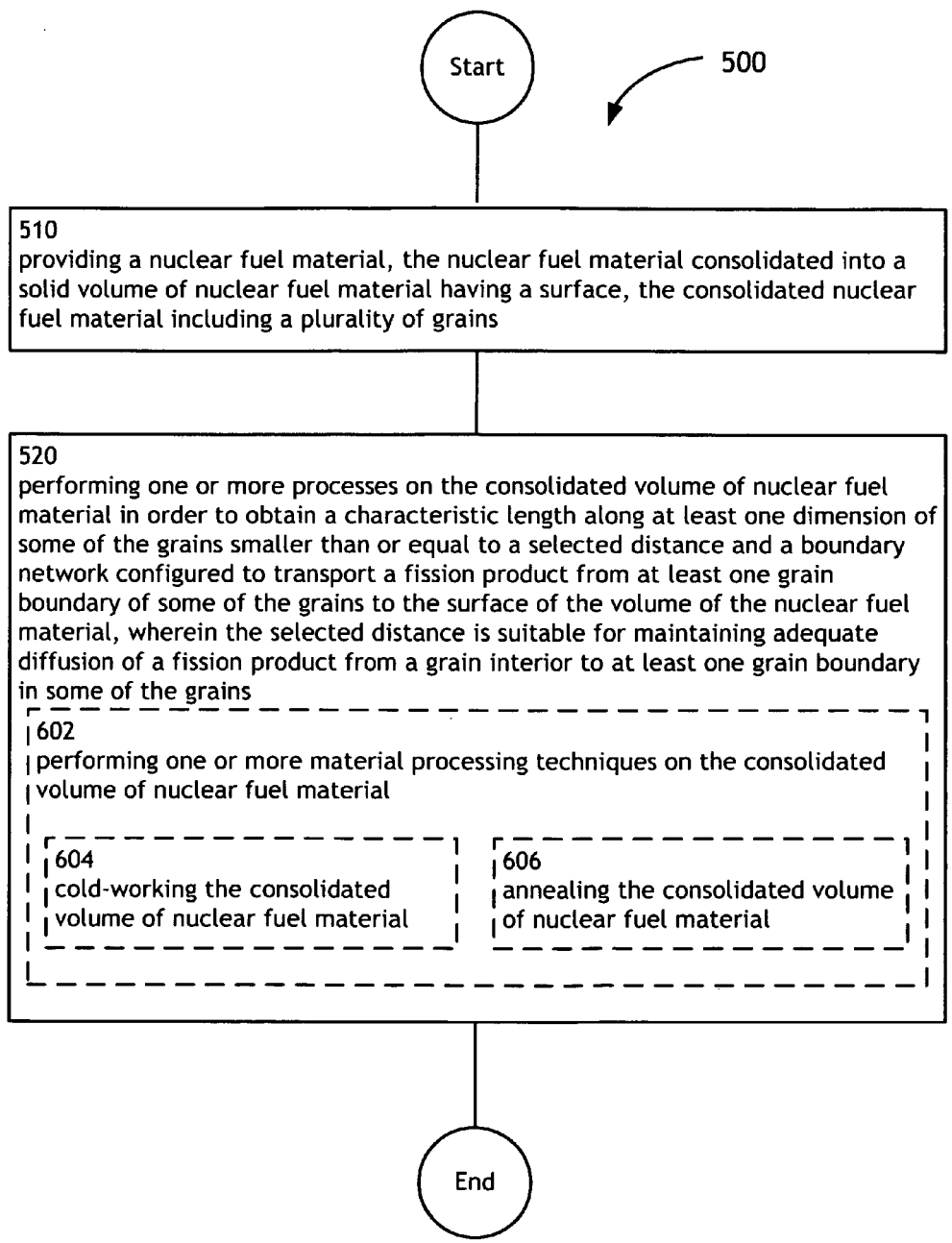

FIG. 6 illustrates alternative embodiments of the example operational flow 500 of FIG. 5. FIG. 6 illustrates example embodiments where the processing operation 520 may include at least one additional operation. Additional operations may include an operation 602, an operation 604, and/or an operation 606.

The operation 602 illustrates performing one or more material process techniques on the consolidated volume of nuclear fuel material. For example, as shown in FIGS. 1A through 4, one or more material processing techniques may be employed to reduce the grain sizes 106 of the grains 104 within the nuclear fuel 100 below a size required for adequate diffusion of a fission product 108. In another example, one or more material processing steps may be employed to form or facilitate the formation of the boundary network 114 within the nuclear reactor fuel 100. Moreover, as the grain sizes 106 decrease within the nuclear fuel 100 the number of potential transportation pathways 116 of the boundary network 114 increases, increasing the interconnection frequency within the boundary network 114 and increasing the number of pathways 116 that intersect with the geometric surface 101 of the nuclear fuel 100. Further, grain size 106 reduction and boundary network 114 formation may be carried out utilizing a single process step or multiple process steps.

Further, the operation 604 illustrates cold-working the consolidated volume of nuclear fuel material. For example, as shown in FIGS. 1A through 4, the consolidated volume 102 of nuclear fuel material may be cold-worked in order to reduce the grain sizes 106 of one or more grains 104 within the consolidated volume 102 and/or develop the boundary network 114 of the nuclear fuel 100. The cold-working process may include, but is not limited to, cold-rolling, extruding a cast nuclear fuel material at low temperature, bending, compression, or drawing.

Further, the operation 606 illustrates annealing the consolidated volume of nuclear fuel material. For example, as shown in FIGS. 1A through 4, the consolidated volume 102 of nuclear fuel material may be annealed in order to reduce the grain sizes 106 of one or more grains 104 within the consolidated volume 102 and/or develop the boundary network 114 of the nuclear fuel 100. For instance, after being cold-worked, the nuclear reactor fuel 100 may be annealed to a temperature below the recrystallization temperature in order to achieve the desired grain size 106 within the nuclear fuel 100. In another instance, during a casting process, the nuclear reactor fuel 100 may be annealed in order to facilitate the migration of precipitating agents, such as carbon or nitrogen, out of the nuclear fuel material to the grain-boundaries 112 of the nuclear fuel 100.

Figure 7:
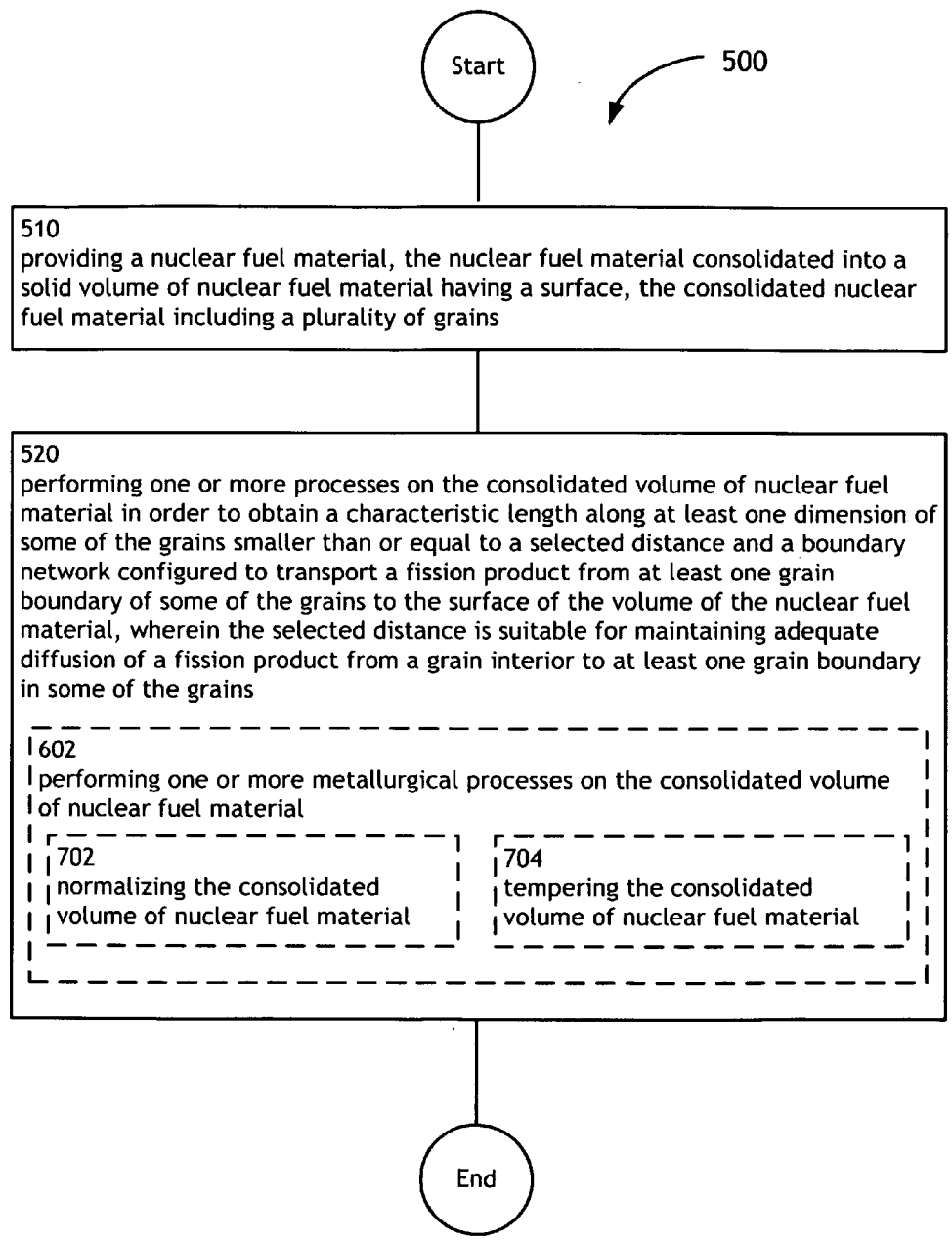

FIG. 7 illustrates alternative embodiments of the example operational flow 500 of FIG. 5. FIG. 7 illustrates example embodiments where the processing operation 520 may include at least one additional operation. Additional operations may include an operation 702, and/or an operation 704.

Further, the operation 702 illustrates normalizing the consolidated volume of nuclear fuel material. For example, as shown in FIGS. 1A through 4, the consolidated volume 102 of nuclear fuel material may undergo a normalizing process in order to reduce the grain sizes 106 of one or more grains 104 within the consolidated volume 102 and/or develop the boundary network 114 of the nuclear fuel 100. For instance, after undergoing a cold-working process, the nuclear reactor fuel 100 may be annealed to a temperature above its upper critical temperature. The nuclear fuel 100 may be held at the elevated temperature for a selected amount of time and then cooled to ambient temperatures in air.

Further, the operation 704 illustrates tempering the consolidated volume of nuclear fuel material. For example, as shown in FIGS. 1A through 4, the consolidated volume 102 of nuclear fuel material may undergo a tempering process in order to reduce the grain sizes 106 of one or more grains 104 within the consolidated volume 102 and/or develop the boundary network 114 of the nuclear fuel 100. For instance, the composition of the nuclear fuel material of the consolidated volume 102 of the nuclear fuel 100 may be suitable for precipitation of a precipitant (e.g., carbon) upon annealing. For example, a tempering process may be utilized to precipitate out a precipitating agent, such as, but not limited to, carbon. The precipitation of this agent into the grain structure of the nuclear fuel 100 may then lead to a reduction in the grain sizes 106 of the grains 104 and/or development of the boundary network 114 of the nuclear fuel 100.

Figure 8:
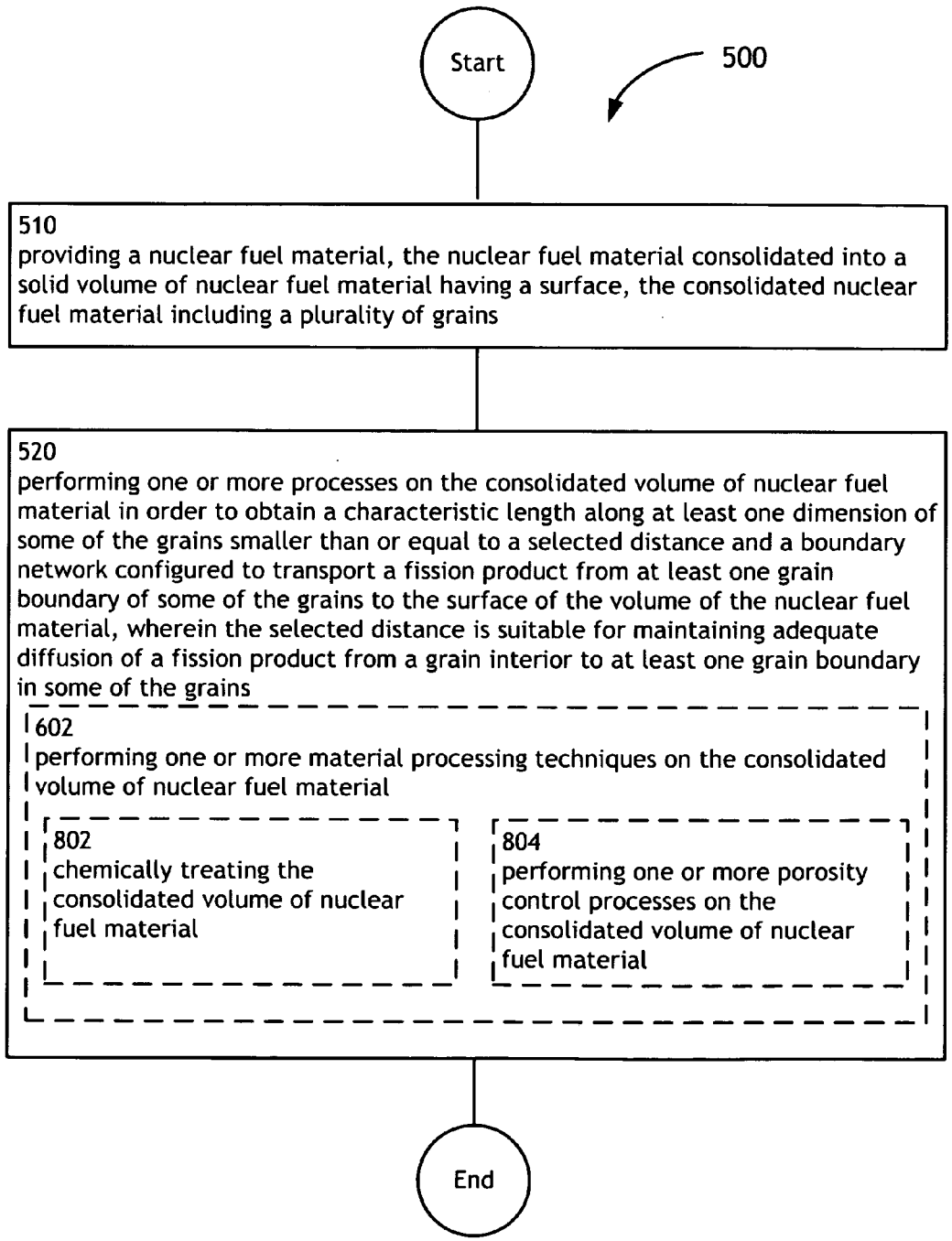

FIG. 8 illustrates alternative embodiments of the example operational flow 500 of FIG. 5. FIG. 8 illustrates example embodiments where the operation 520 may include at least one additional operation. Additional operations may include an operation 802, and/or an operation 804.

The operation 802 illustrates chemically treating the consolidated volume of nuclear fuel material. For example, as shown in FIGS. 1A through 4, the consolidated volume 102 of nuclear fuel material may undergo a chemical treatment process in order to reduce the grain sizes 106 of one or more grains 104 within the consolidated volume 102 and/or develop the boundary network 114 of the nuclear fuel 100. For instance, a volume of 102 uranium dioxide may undergo an annealing process in the presence of an oxygen reducing gas (e.g., hydrogen-argon mixture or hydrogen-nitrogen mixture) in order to convert a portion of the stoichiometric $UO_2$ phase to a non-stoichiometric oxygen reduced phase, such as $UO_{1.8}$. The sub-stoichiometric phase has a reduced grain size with respect to the stoichiometric phase.

The operation 804 illustrates performing one or more porosity control processes on the consolidated volume of nuclear fuel material. For example, as shown in FIGS. 1A through 4, the consolidated volume 102 of nuclear fuel material may undergo a porosity control process. For instance, porosity of the nuclear fuel 100 may be controlled via a heat treatment process (e.g., an annealing process or melting process) or a chemical treatment process.

Figure 9:
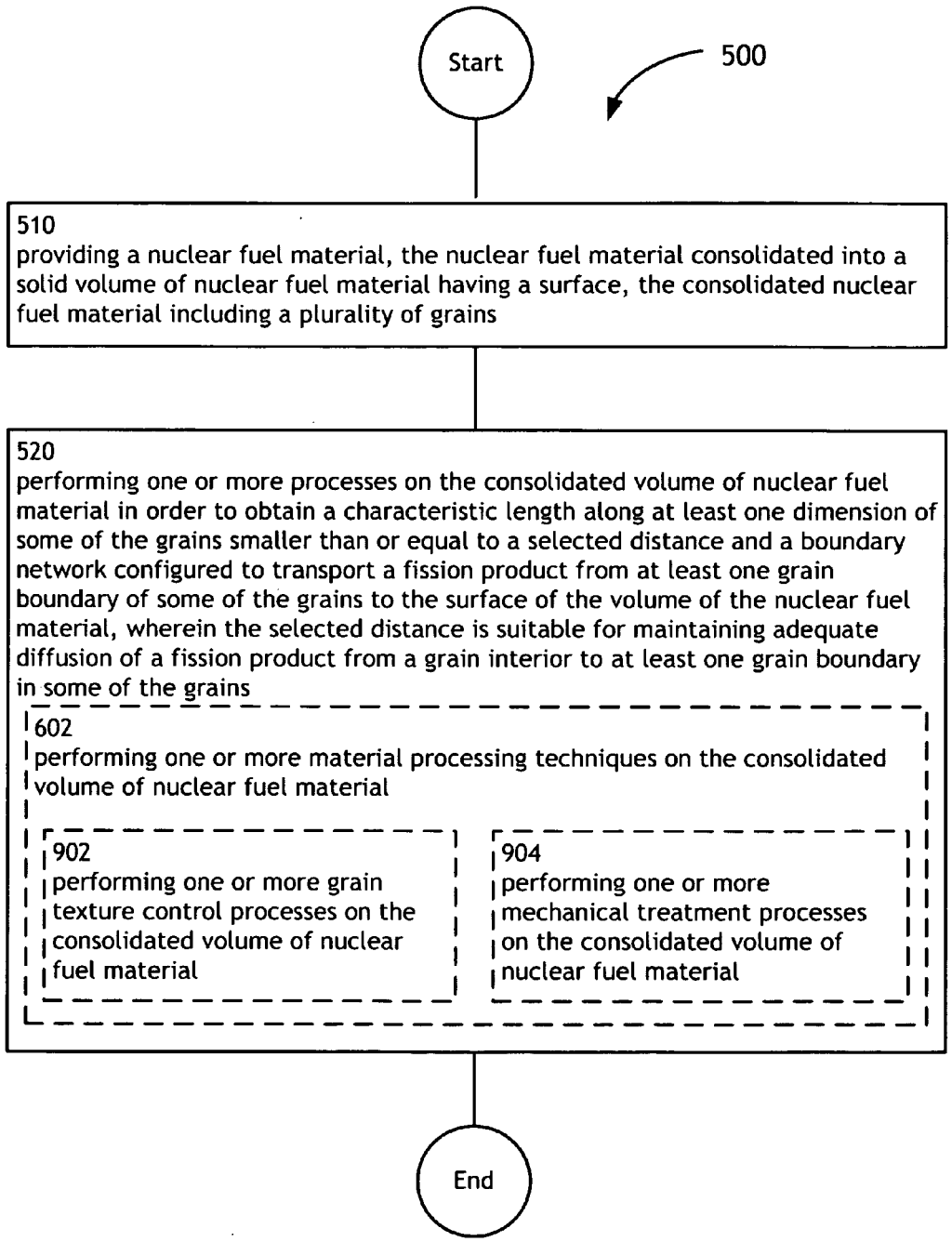

FIG. 9 illustrates alternative embodiments of the example operational flow 500 of FIG. 5. FIG. 9 illustrates example embodiments where the operation 520 may include at least one additional operation. Additional operations may include an operation 902, and/or an operation 904.

The operation 902 illustrates performing one or more grain texture control processes on the consolidated volume of nuclear fuel material. For example, as shown in FIGS. 1A through 4, the consolidated volume 102 of nuclear fuel material may undergo a grain texture control process. For instance, grain textures of the grains 104 of the nuclear fuel 100 may be controlled via a heat treatment process (e.g., annealing) or a chemical treatment process (e.g., doping).

The operation 904 illustrates performing one or more mechanical treatment processes on the consolidated volume of nuclear fuel material. For example, as shown in FIGS. 1A through 4, the consolidated volume 102 of nuclear fuel material may undergo a mechanical treatment process (e.g., compression, drawing, and the like) in order to reduce the grain sizes 106 of one or more grains 104 within the consolidated volume 102 and/or develop the boundary network 114 of the nuclear fuel 100.

Figure 10:
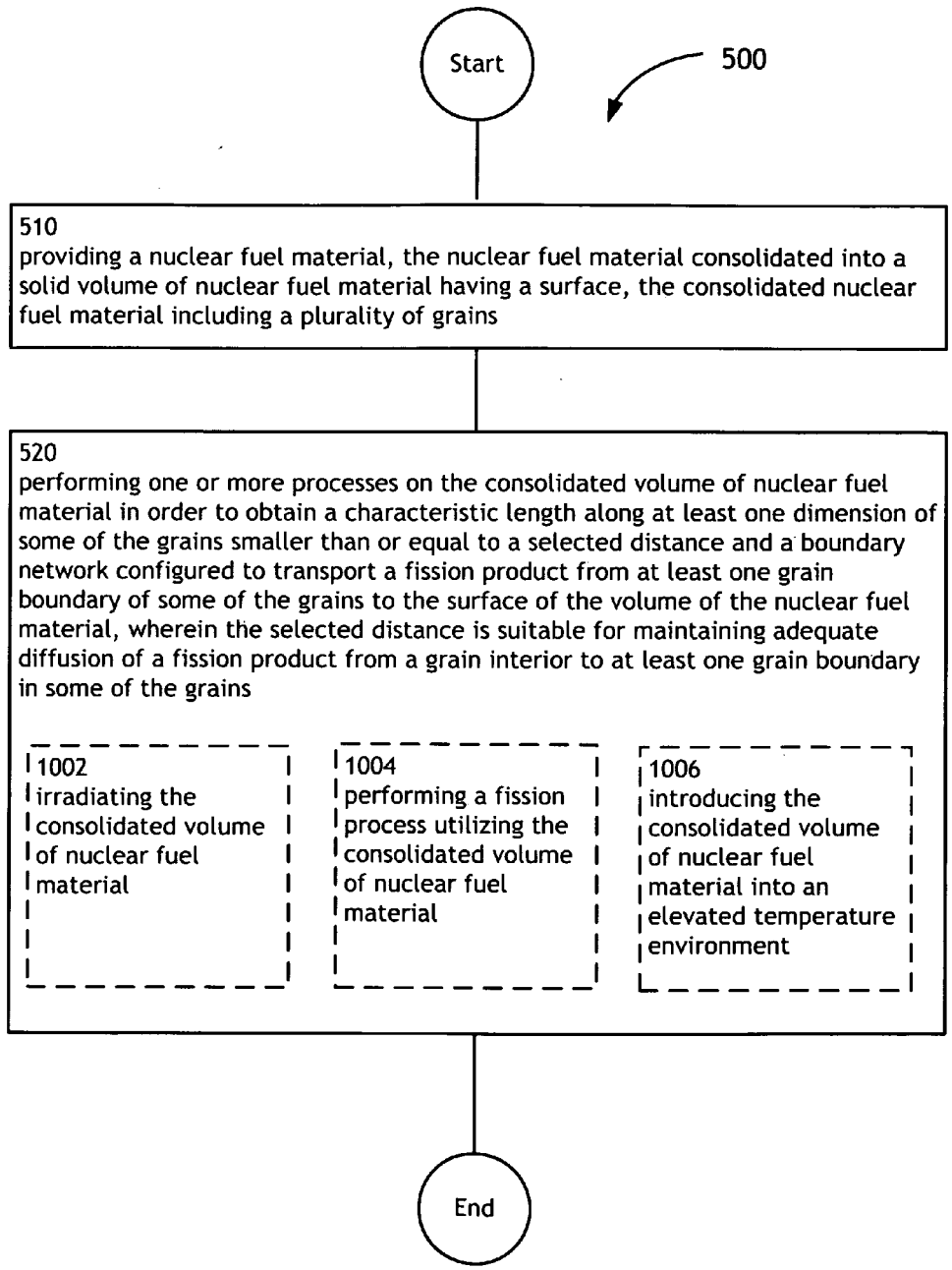

FIG. 10 illustrates alternative embodiments of the example operational flow 500 of FIG. 5. FIG. 10 illustrates example embodiments where the operation 520 may include at least one additional operation. Additional operations may include an operation 1002, 1004 and/or an operation 1006.

The operation 1002 illustrates irradiating the consolidated volume of nuclear fuel material. For example, as shown in FIGS. 1A through 4, the consolidated volume 102 of nuclear fuel material may be irradiated in order to reduce the grain sizes 106 of one or more grains 104 within the consolidated volume 102 and/or develop the boundary network 114 of the nuclear fuel 100. For instance, the consolidated volume 102 of nuclear fuel material may be implemented in a nuclear reactor setting. Prior to implementation in the nuclear reactor setting, the grain sizes 106 of the nuclear fuel 100 may be engineered to have a size below the critical size necessary for adequate diffusion of a produced fission gases (e.g., xenon or krypton) from the grain-interiors 110 to the grain-boundaries 112 of the nuclear fuel 100. As a result, when implemented in a nuclear reactor setting the fission gases produced during the nuclear fuel 100 fission processes may efficiently nucleate at the grain-boundaries 112 of the nuclear fuel 100. This may facilitate the production of a boundary network 114 suitable for transportation of the fission gases to the geometric surface 101 of the nuclear fuel 100.

The operation 1004 illustrates performing a fission process utilizing the consolidated volume of nuclear fuel material. For example, as shown in FIGS. 1A through 4, the consolidated volume 102 of nuclear fuel material may be utilized in nuclear reactor in order to reduce the grain sizes 106 of one or more grains 104 within the consolidated volume 102 and/or develop the boundary network 114 of the nuclear fuel 100. For instance, the elevated radiation environment and/or the high temperatures within the nuclear fuel 100 may lead to the efficient nucleation at the grain-boundaries 112 of the nuclear fuel 100. This may facilitate the production of a boundary network 114 suitable for transportation of the fission gases to the geometric surface 101 of the nuclear fuel 100.

The operation 1006 illustrates introducing the consolidated volume of nuclear fuel material into an elevated temperature environment. For example, as shown in FIGS. 1A through 4, the consolidated volume 102 of nuclear fuel material may be exposed to a high temperature environment in order to reduce the grain sizes 106 of one or more grains 104 within the consolidated volume 102 and/or develop the boundary network 114 of the nuclear fuel 100. For instance, the consolidated volume 102 of nuclear fuel material may be implemented in a nuclear reactor setting. The nuclear fuel grain structure may be configured (e.g., cold-worked) to take advantage of the high temperature environment which occurs when the nuclear reactor fuel 100 undergoes fission.

The thermal energy produced by the fission of a portion of the nuclear fuel 100 may act to reduce or further reduce the grain sizes 106 of one or more grains 104 within the consolidated volume 102 and/or develop the boundary network 114 of the nuclear fuel 100. For instance, the thermal energy produced during a fission process of the nuclear fuel 100 may act to facilitate migration of precipitant agents, such as carbon or nitrogen, within the nuclear fuel material. Upon thermal activation, the precipitants may migrate to the grain-boundaries 112 of the nuclear fuel 100, aiding in the developing the boundary network 114.

Figure 11:
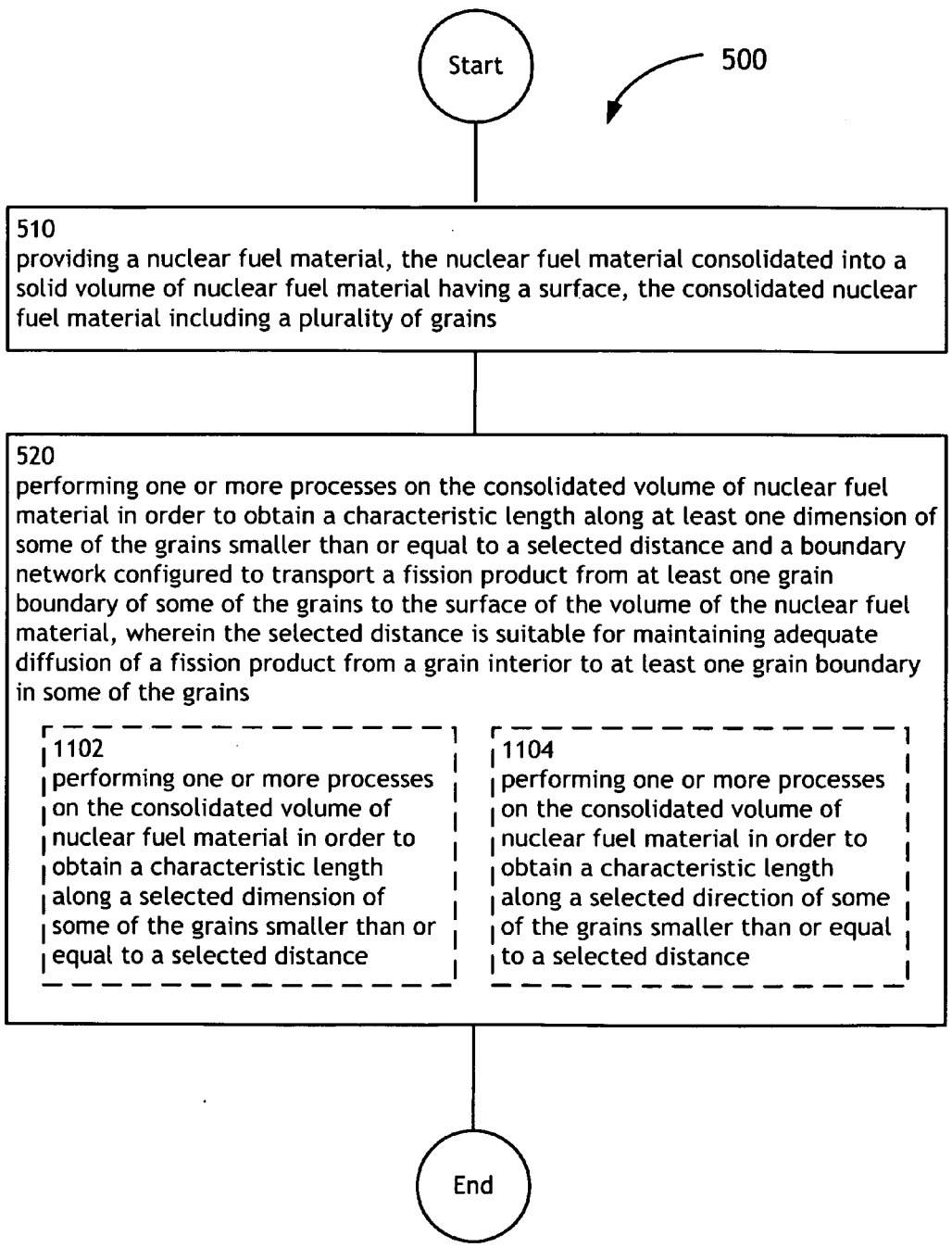

FIG. 11 illustrates alternative embodiments of the example operational flow 500 of FIG. 5. FIG. 11 illustrates example embodiments where the operation 520 may include at least one additional operation. Additional operations may include an operation 1102, and/or an operation 1104.

The operation 1102 illustrates performing one or more processes on the consolidated volume of nuclear fuel material in order to obtain a characteristic length along a selected dimension of some of the grains smaller than or equal to a selected distance. For example, as shown in FIG. 1G, one or more processes may be utilized in order engineer the grains 104 of the nuclear fuel 100 to have a characteristic length 106 along a selected dimension of some grains 104. For instance, in grains having an elongated structure, the grains 104 may have a "thin" dimension smaller than or equal to a selected distance.

The operation 1104 illustrates performing one or more processes on the consolidated volume of nuclear fuel material in order to obtain a characteristic length along a selected direction of some of the grains smaller than or equal to a selected distance. For example, as shown in FIG. 1H, one or more processes may be utilized in order engineer the grains 104 of the nuclear fuel 100 to have a characteristic length 106 along a selected direction of some of the grains smaller than or equal to a selected distance. For instance, in grains having an elongated structure, the grains 104 may have a characteristic length 106 along a selected direction 134 with the nuclear fuel 100. For example, the grains may have a selected characteristic length 106 along the radial direction within a cylindrically shaped nuclear fuel piece (e.g., fuel pellet).

Figure 12:
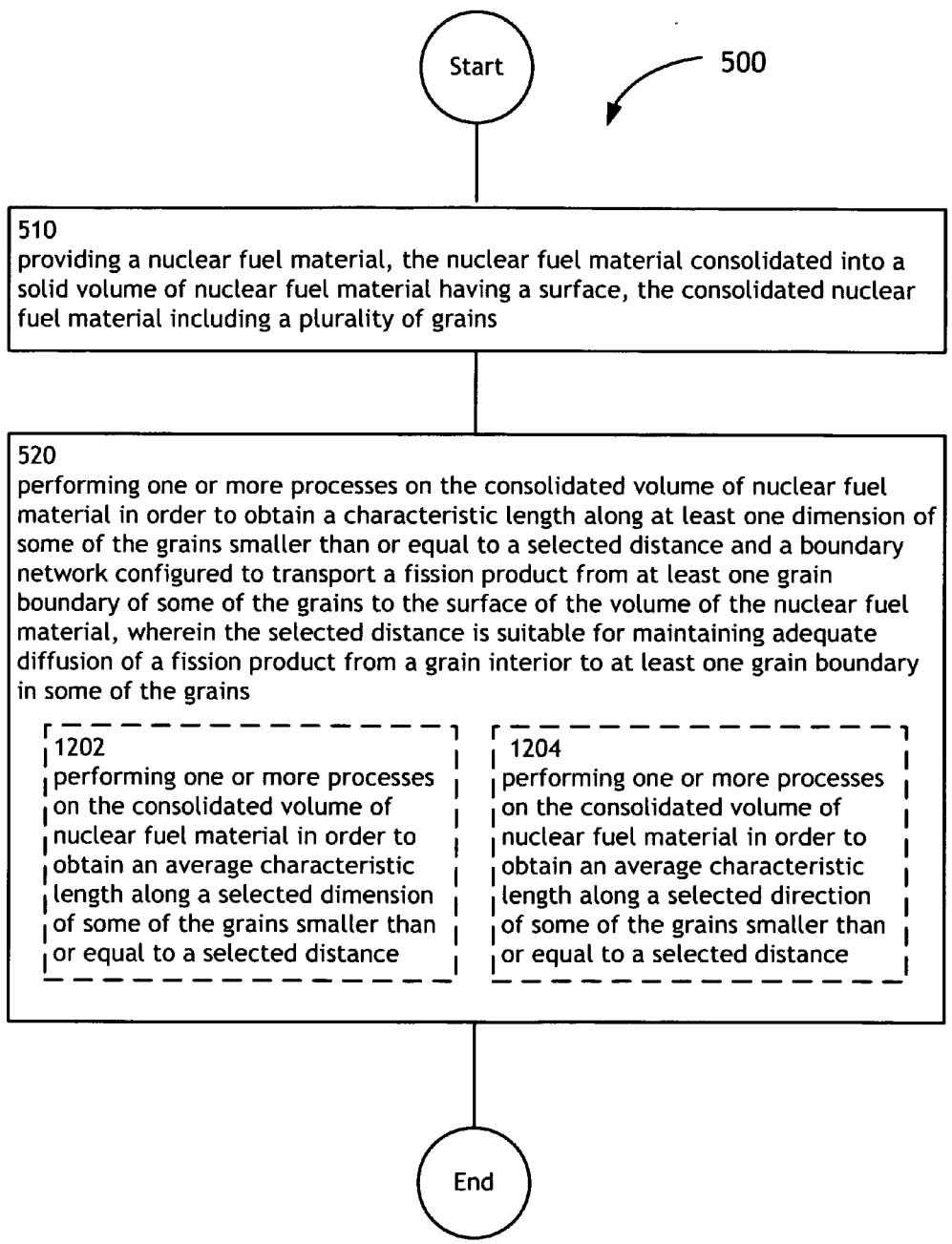

FIG. 12 illustrates alternative embodiments of the example operational flow 500 of FIG. 5. FIG. 12 illustrates example embodiments where the operation 520 may include at least one additional operation. Additional operations may include an operation 1202, and/or an operation 1204.

The operation 1202 illustrates performing one or more processes on the consolidated volume of nuclear fuel material in order to obtain an average characteristic length along a selected dimension of some of the grains smaller than or equal to a selected distance. For example, as shown in FIG. 1G, one or more processes may be utilized in order engineer the grains 104 of the nuclear fuel 100 to have an average characteristic length 106 along a selected dimension of some grains 104.

The operation 1204 illustrates performing one or more processes on the consolidated volume of nuclear fuel material in order to obtain an average characteristic length along a selected direction of some of the grains smaller than or equal to a selected distance. For example, as shown in FIG. 1H, one or more processes may be utilized in order engineer the grains 104 of the nuclear fuel 100 to have an average characteristic length 106 along a selected direction of some of the grains smaller than or equal to a selected distance. For instance, in grains having an elongated structure, the grains 104 may have an average characteristic length 106 along a selected direction 134 with the nuclear fuel 100. For example, the grains may have an average selected characteristic length 106 along the radial direction within a cylindrically shaped nuclear fuel piece (e.g., fuel pellet).

Figure 13:
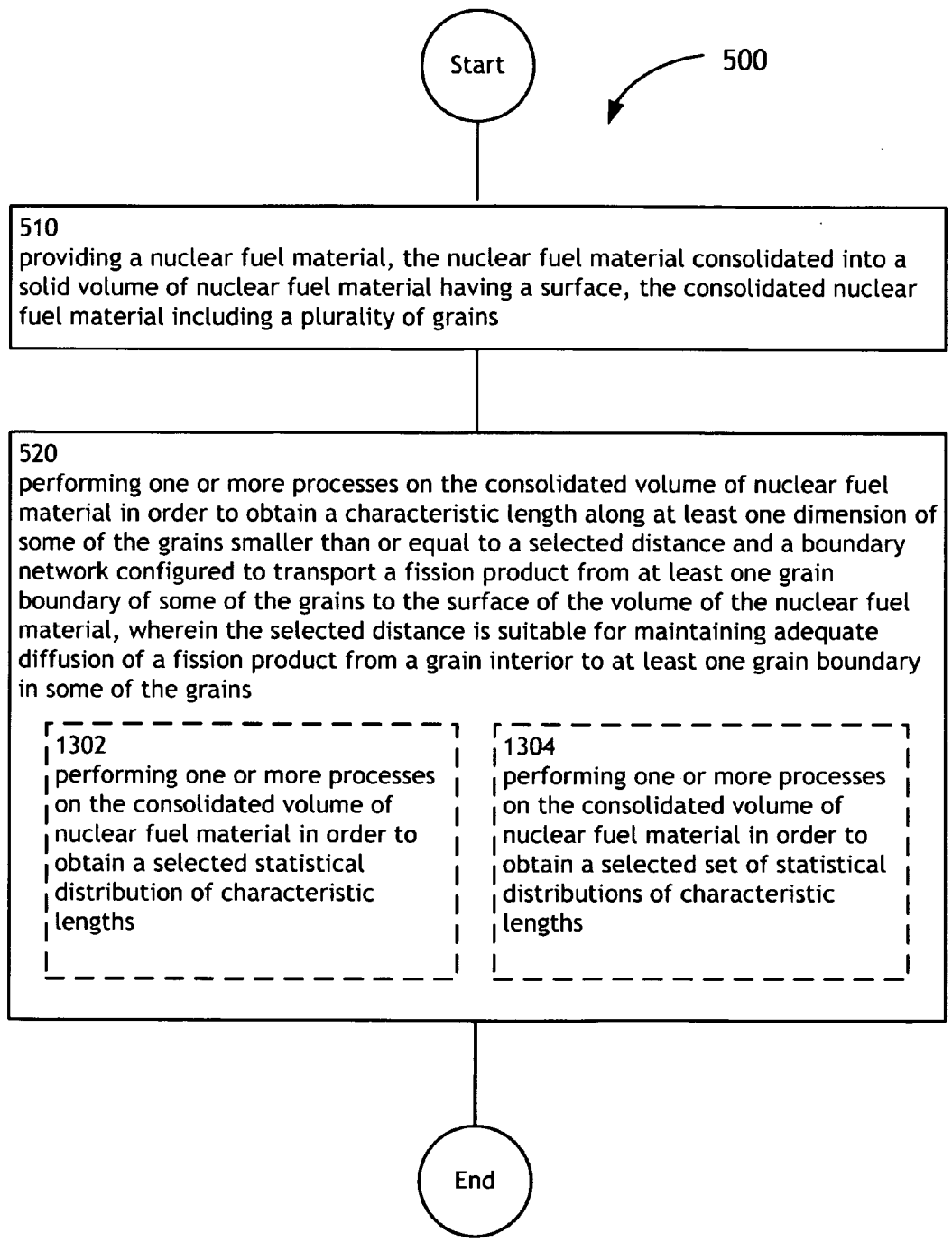

FIG. 13 illustrates alternative embodiments of the example operational flow 500 of FIG. 5. FIG. 13 illustrates example embodiments where the operation 520 may include at least one additional operation. Additional operations may include an operation 1302, and/or an operation 1304.

The operation 1302 illustrates performing one or more processes on the consolidated volume of nuclear fuel material in order to obtain a selected statistical distribution of characteristic lengths. For example, as shown in FIGS. 1A through 4, the grains 104 of the nuclear fuel 100 may have a selected statistical distribution of characteristic lengths. For example, the grains 104 of the nuclear fuel 100 may have a grain size distribution having a selected percentage of the grains 104 having a grain size 106 below a selected distance. For instance, the nuclear fuel 100 of the present invention may have a grain size 106 distribution such that 65% of the grains have a grain size 106 equal to or less than 4 μm, with an average grain size of 2.5 μm. In another example, the grains 104 of the nuclear fuel 100 may have a selected spatial distribution of characteristic lengths.

The operation 1304 illustrates performing one or more processes on the consolidated volume of nuclear fuel material in order to obtain a selected set of statistical distributions of characteristic lengths. In another embodiment, the grains 104 of the nuclear fuel 100 may have multiple statistical distributions of characteristic lengths. For instance, the nuclear fuel 100 of the present invention may have a grain size 106 distribution such that 25% of the grains have a grain size 106 equal to or less than 10 μm, 25% of the grains have a grain size 106 equal to or less than 5 μm, and 10% of the grains are below 1 μm.

Figure 14:
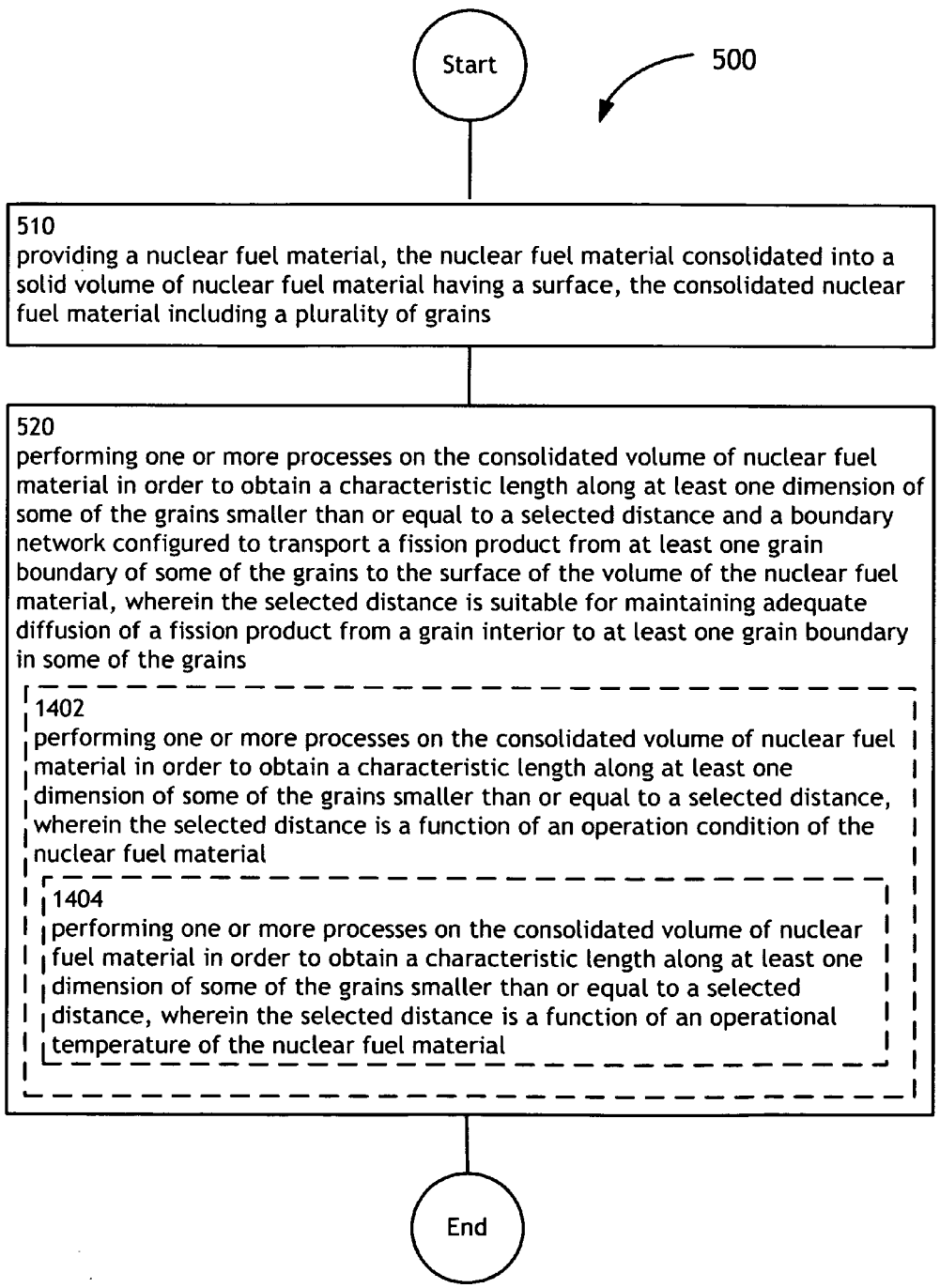

FIG. 14 illustrates alternative embodiments of the example operational flow 500 of FIG. 5. FIG. 14 illustrates example embodiments where the operation 520 may include at least one additional operation. Additional operations may include an operation 1402, and/or an operation 1404.

The operation 1402 illustrates performing one or more processes on the consolidated volume of nuclear fuel material in order to obtain a characteristic length along at least one dimension of some of the grains smaller than or equal to a selected distance, wherein the selected distance is a function of an operation condition of the nuclear fuel material. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, which is a function of an operation condition of the nuclear fuel 100. For instance, the critical size necessary to ensure adequate diffusion of a fission product 108 from the grain-interiors 110 to the grain-boundaries 112 of the nuclear fuel may depend upon an operational condition of the nuclear fuel 100.

Further, the operation 1404 illustrates performing one or more processes on the consolidated volume of nuclear fuel material in order to obtain a characteristic length along at least one dimension of some of the grains smaller than or equal to a selected distance, wherein the selected distance is a function of an operational temperature of the nuclear fuel material. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, which is a function of an operation temperature of the nuclear fuel 100. For instance, the critical size necessary to ensure adequate diffusion of a fission product 108 from the grain-interiors 110 to the grain-boundaries 112 of the nuclear fuel may depend upon the operation temperature of the nuclear fuel 100.

Figure 15:
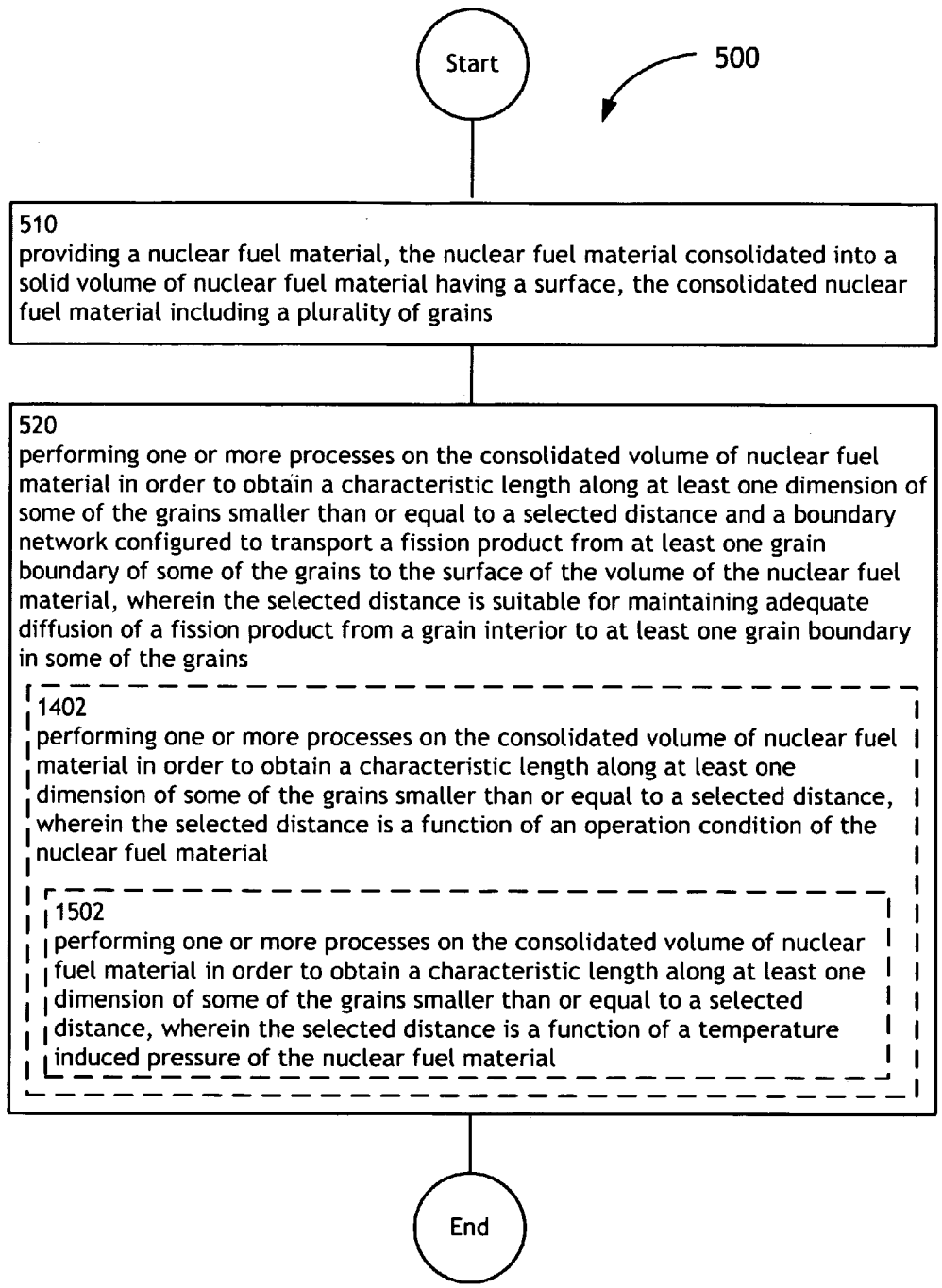

FIG. 15 illustrates alternative embodiments of the example operational flow 500 of FIG. 5. FIG. 15 illustrates example embodiments where the operation 520 may include at least one additional operation. Additional operations may include an operation 1502.

Further, the operation 1502 illustrates performing one or more processes on the consolidated volume of nuclear fuel material in order to obtain a characteristic length along at least one dimension of some of the grains smaller than or equal to a selected distance, wherein the selected distance is a function of a temperature induced pressure of the nuclear fuel material. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, which is a function of a temperature induced pressure of the nuclear fuel 100. For instance, the critical size necessary to ensure adequate diffusion of a fission product 108 from the grain-interiors 110 to the grain-boundaries 112 of the nuclear fuel may depend upon the temperature induced pressure within the nuclear reactor fuel 100.

Figure 16:
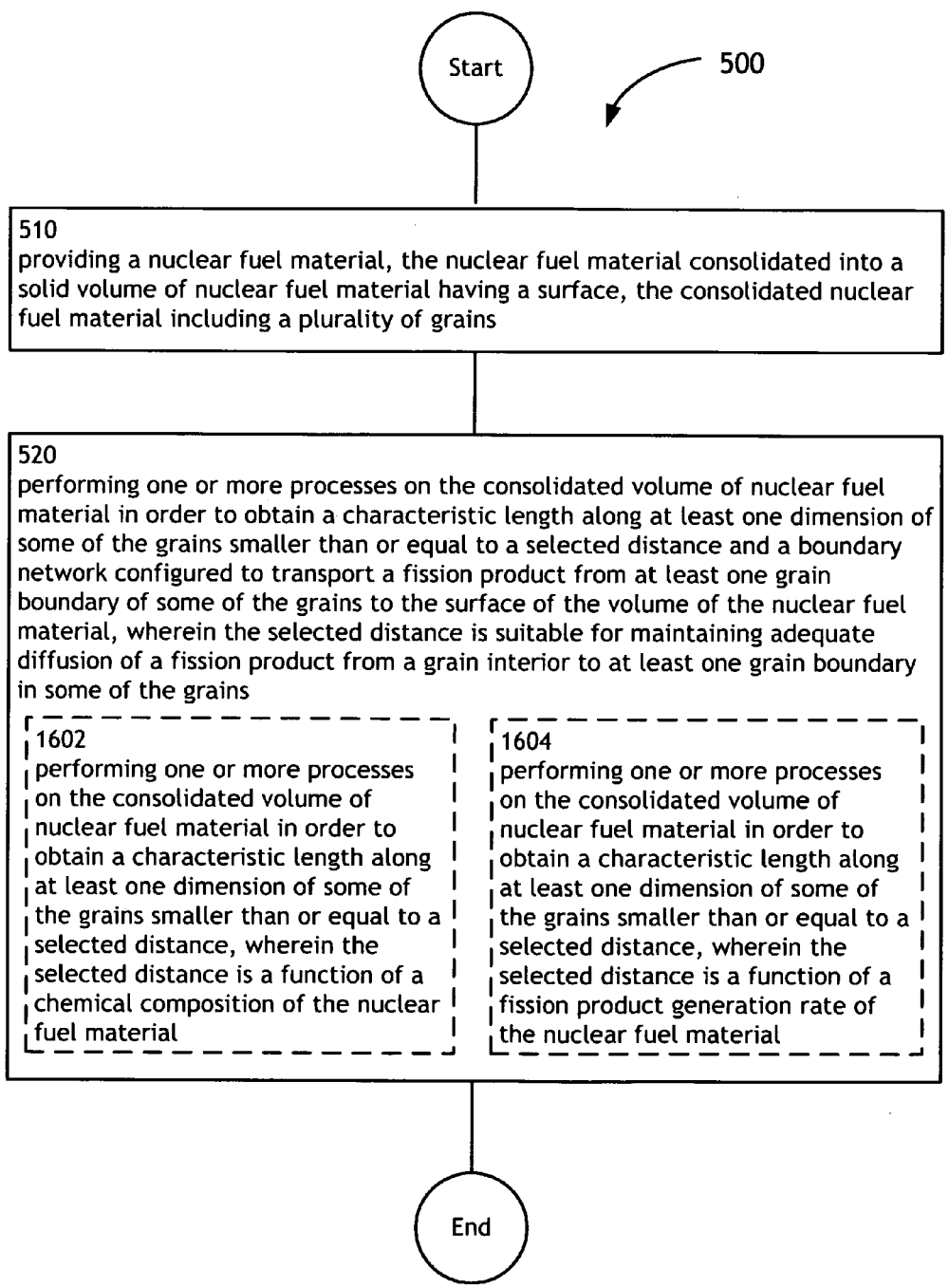

FIG. 16 illustrates alternative embodiments of the example operational flow 500 of FIG. 5. FIG. 16 illustrates example embodiments where the operation 520 may include at least one additional operation. Additional operations may include an operation 1602, and/or an operation 1604.

The operation 1602 illustrates performing one or more processes on the consolidated volume of nuclear fuel material in order to obtain a characteristic length along at least one dimension of some of the grains smaller than or equal to a selected distance, wherein the selected distance is a function of a chemical composition of the nuclear fuel material. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, which is a function of the chemical composition of the nuclear fuel 100. For instance, the critical size necessary to ensure adequate diffusion of a fission product 108 from the grain-interiors 110 to the grain-boundaries 112 of the nuclear fuel may depend upon the chemical composition (e.g., type of fissile material(s), types of alloying agents, relative concentration of fissile materials, or the like) of the nuclear reactor fuel 100.

The operation 1604 illustrates performing one or more processes on the consolidated volume of nuclear fuel material in order to obtain a characteristic length along at least one dimension of some of the grains smaller than or equal to a selected distance, wherein the selected distance is a function of a fission product generation rate of the nuclear fuel material. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, which is a function of the fission product 108 generation rate within the nuclear fuel 100. For instance, the critical size necessary to ensure adequate diffusion of a fission product 108 from the grain-interiors 110 to the grain-boundaries 112 of the nuclear fuel may depend upon the fission product 108 generation rate of the nuclear reactor fuel 100. Further, the fission product 108 generation rate (e.g., fission gas 118 generation rate) is proportional to the fission rate within the nuclear fuel 100, which in turn may depend upon the power density of the nuclear fuel 100, which in turn may depend upon the chemical composition of the nuclear fuel 100.

Figure 17:
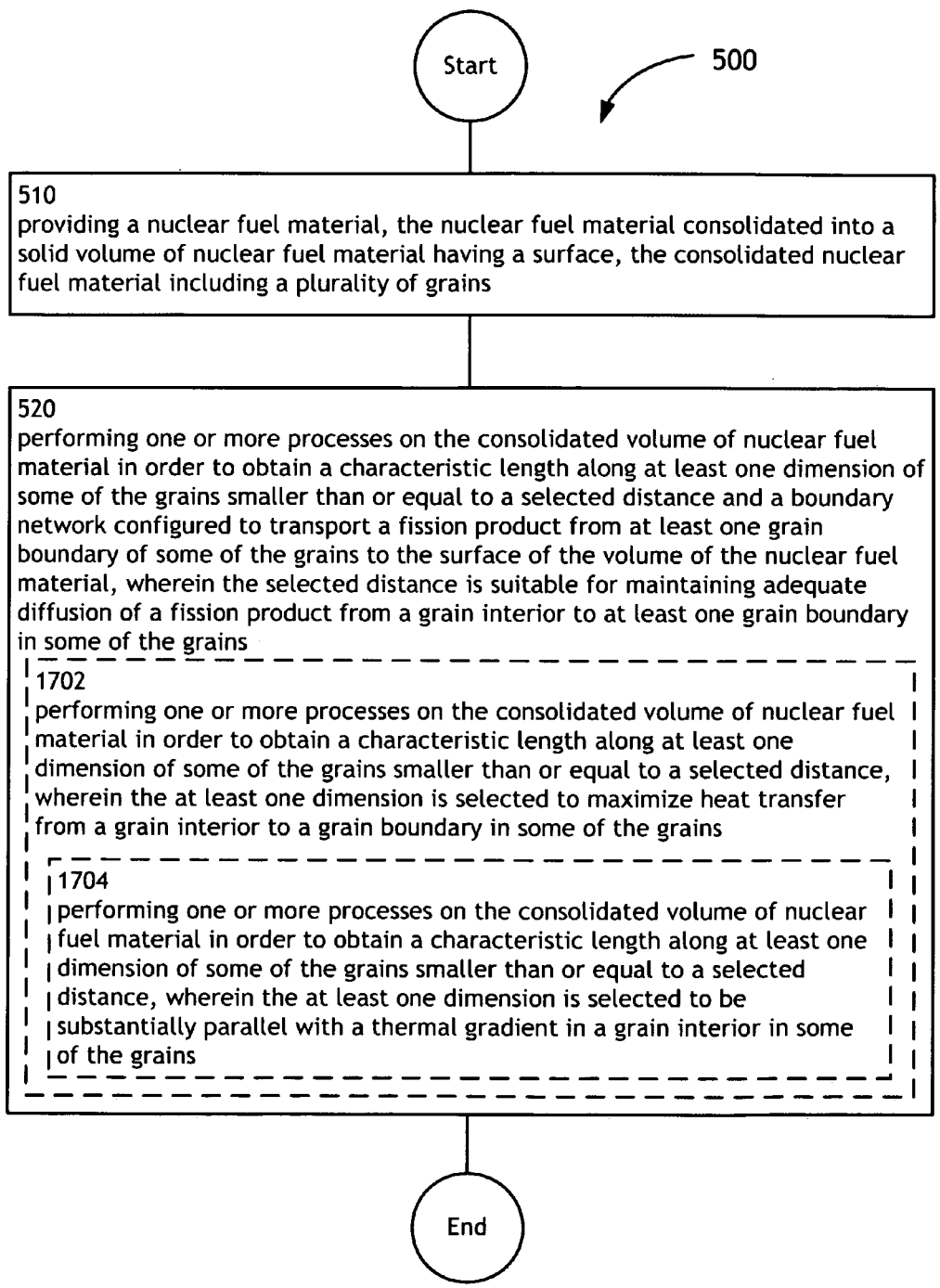

FIG. 17 illustrates alternative embodiments of the example operational flow 500 of FIG. 5. FIG. 17 illustrates example embodiments where the operation 520 may include at least one additional operation. Additional operations may include an operation 1702, and/or an operation 1704.

The operation 1702 illustrates performing one or more processes on the consolidated volume of nuclear fuel material in order to obtain a characteristic length along at least one dimension of some of the grains smaller than or equal to a selected distance, wherein the at least one dimension is selected to maximize heat transfer from a grain interior to a grain boundary in some of the grains. For example, as shown in FIGS. 1A through 4, one or more processes may be utilized in order to engineer the grains 104 of the nuclear fuel 100 to have a characteristic length 106 along at least one dimension of some of the grains 104 of the nuclear fuel smaller than a selected distance, wherein the dimension of the grains is selected to maximize heat transfer from the grain interiors 110 to the grain-boundaries 112 of the nuclear fuel 100. For instance, a dimension of the grains 104 to be minimize may be selected in order maximize (or at least improve) heat transfer from the grain-interiors 110 to the grain-boundaries 112.

Further, the operation 1704 illustrates performing one or more processes on the consolidated volume of nuclear fuel material in order to obtain a characteristic length along at least one dimension of some of the grains smaller than or equal to a selected distance, wherein the at least one dimension is selected to be substantially parallel with a thermal gradient in a grain interior in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, wherein the at least one dimension is selected to be substantially parallel with a thermal gradient in a grain interior in some of the grains. For instance, in order to maximize diffusion of a fission gas 118 from the grain-interiors 110 to the grain-boundaries 112 a "thin" dimension of the grains 104 may be arranged so as to align substantially perpendicular to the direction of a thermal gradient within the nuclear reactor fuel 100.

Figure 18:
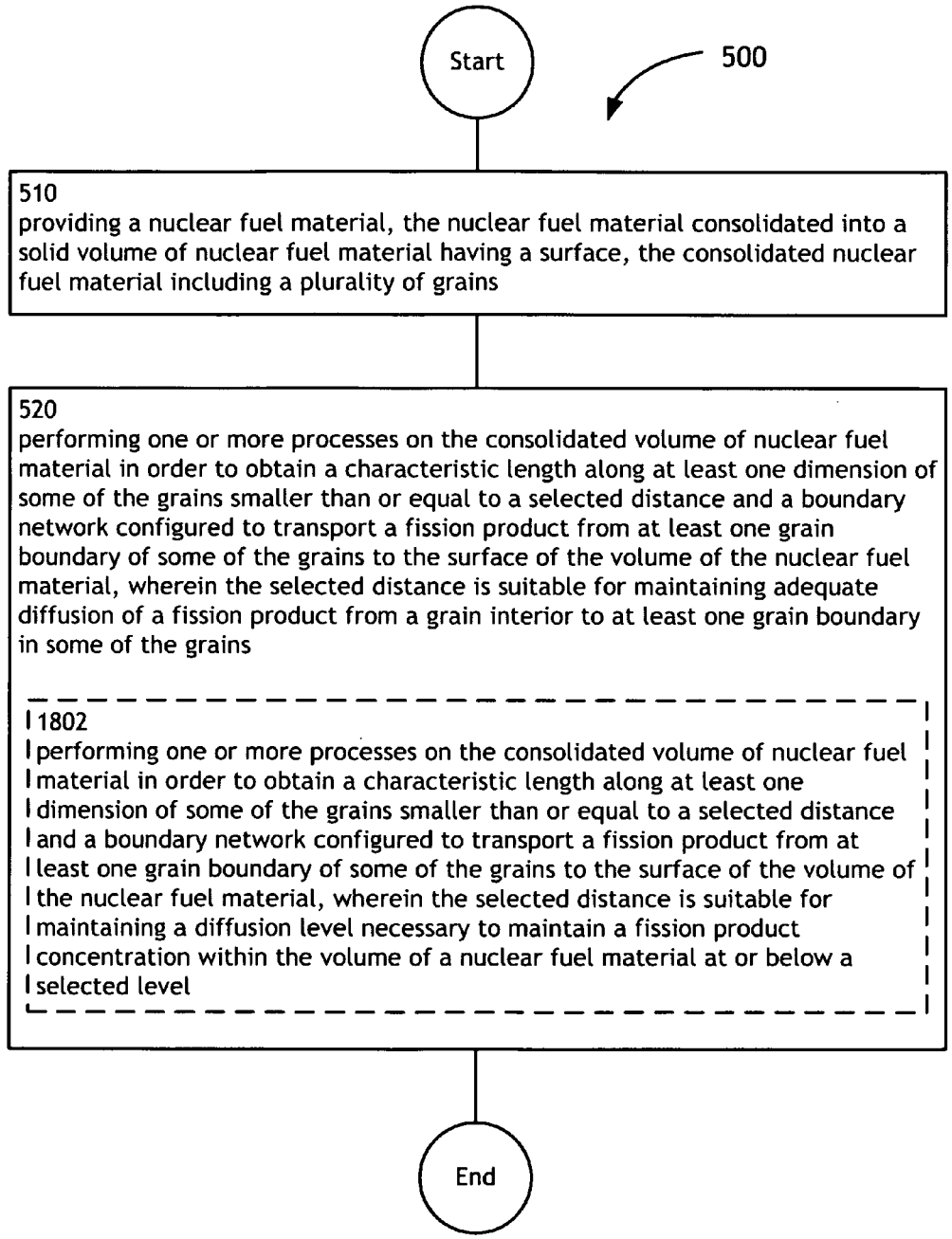

FIG. 18 illustrates alternative embodiments of the example operational flow 500 of FIG. 5. FIG. 18 illustrates example embodiments where the operation 520 may include at least one additional operation. Additional operations may include an operation 1802.

The operation 1802 illustrates performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining a diffusion level necessary to maintain a fission product concentration within the volume of a nuclear fuel material at or below a selected level. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a selected distance, which is selected in order to maintain a selected fission product 108 (e.g., fission gas 118) concentration within the volume 102 of the nuclear fuel 100 at or below a selected level. For instance, in a general sense, the rate of diffusion from the grain-interiors 110 to the grain-boundaries 112 in the grains 104 may be inversely related to the average grain size 106 of the grains 104 of the nuclear fuel 100. In this sense, as the grain sizes 106 of the grains 104 decrease, the fission gas 118 diffusion rate from the grain-interiors 110 to the grain-boundaries 112 increases. Therefore, the concentration of a fission gas 118 within the grains 104 may be adjusted to fall within acceptable concentration levels by engineering the grain sizes 106 of the grains 104 of the nuclear fuel 100.

Figure 19:
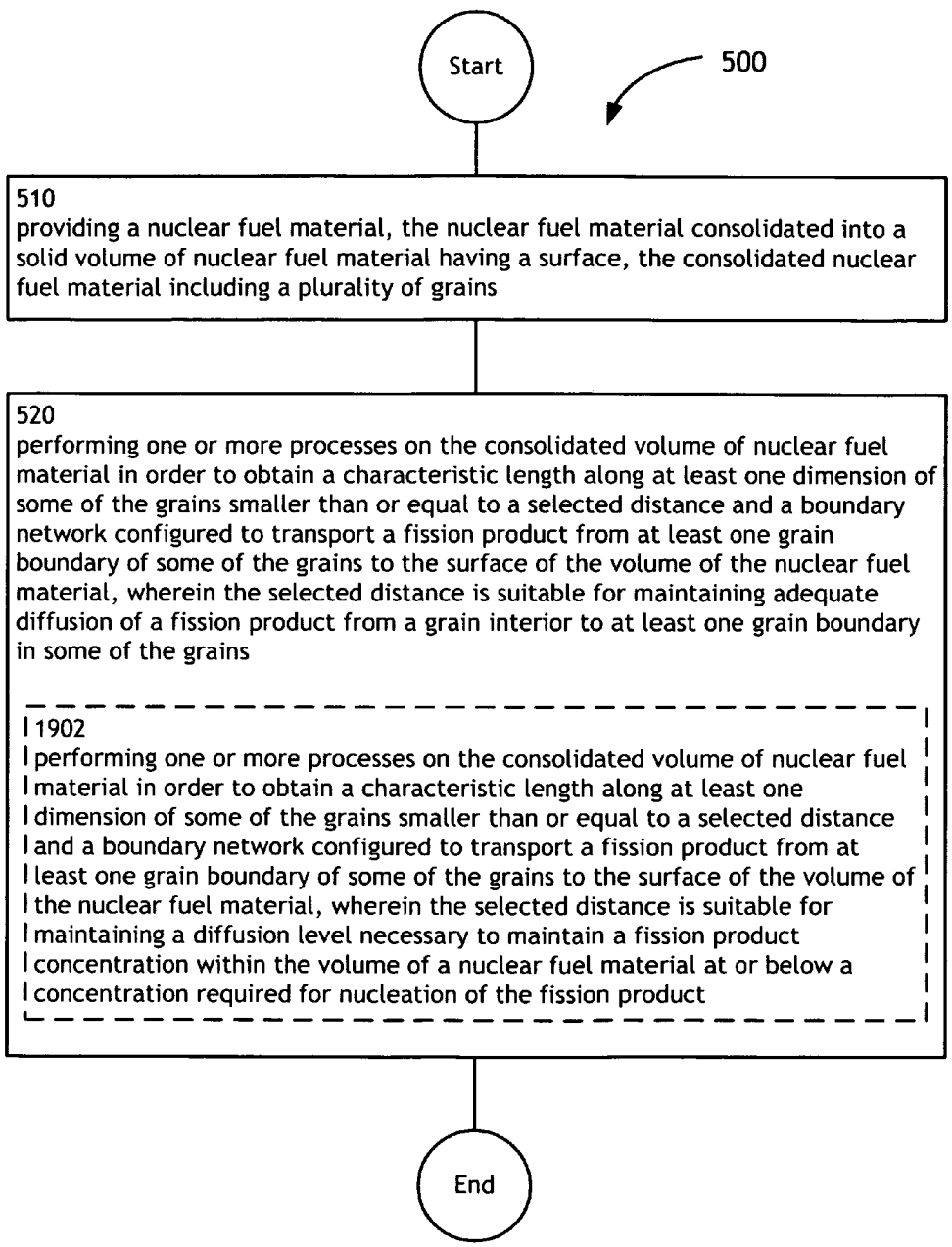

FIG. 19 illustrates alternative embodiments of the example operational flow 500 of FIG. 5. FIG. 19 illustrates example embodiments where the operation 520 may include at least one additional operation. Additional operations may include an operation 1902.

The operation 1902 illustrates performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining a diffusion level necessary to maintain a fission product concentration within the volume of a nuclear fuel material at or below a concentration required for nucleation of the fission product. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a selected distance, which is selected in order to maintain a selected fission product 108 (e.g., fission gas 118) concentration below a concentration level required for nucleation of the fission product 108 within a grain-interior 110. For instance, the concentration of a fission gas 118 within the grains 104 may be adjusted to fall below the concentration level required for fission gas nucleation with the grain-interiors 110 by engineering the grain sizes 106 of the grains 104 of the nuclear fuel 100.

Figure 20:
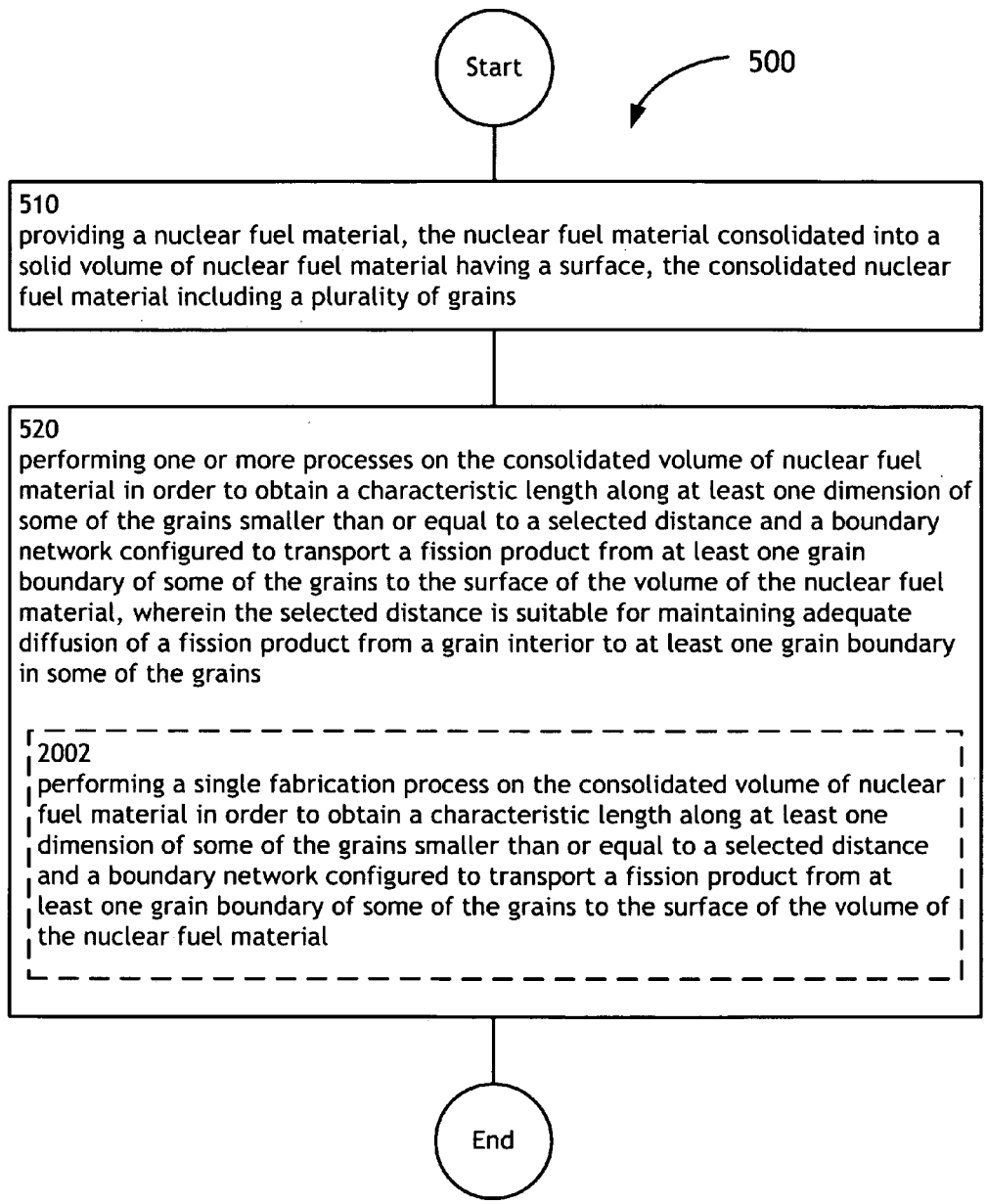
Figure 21:
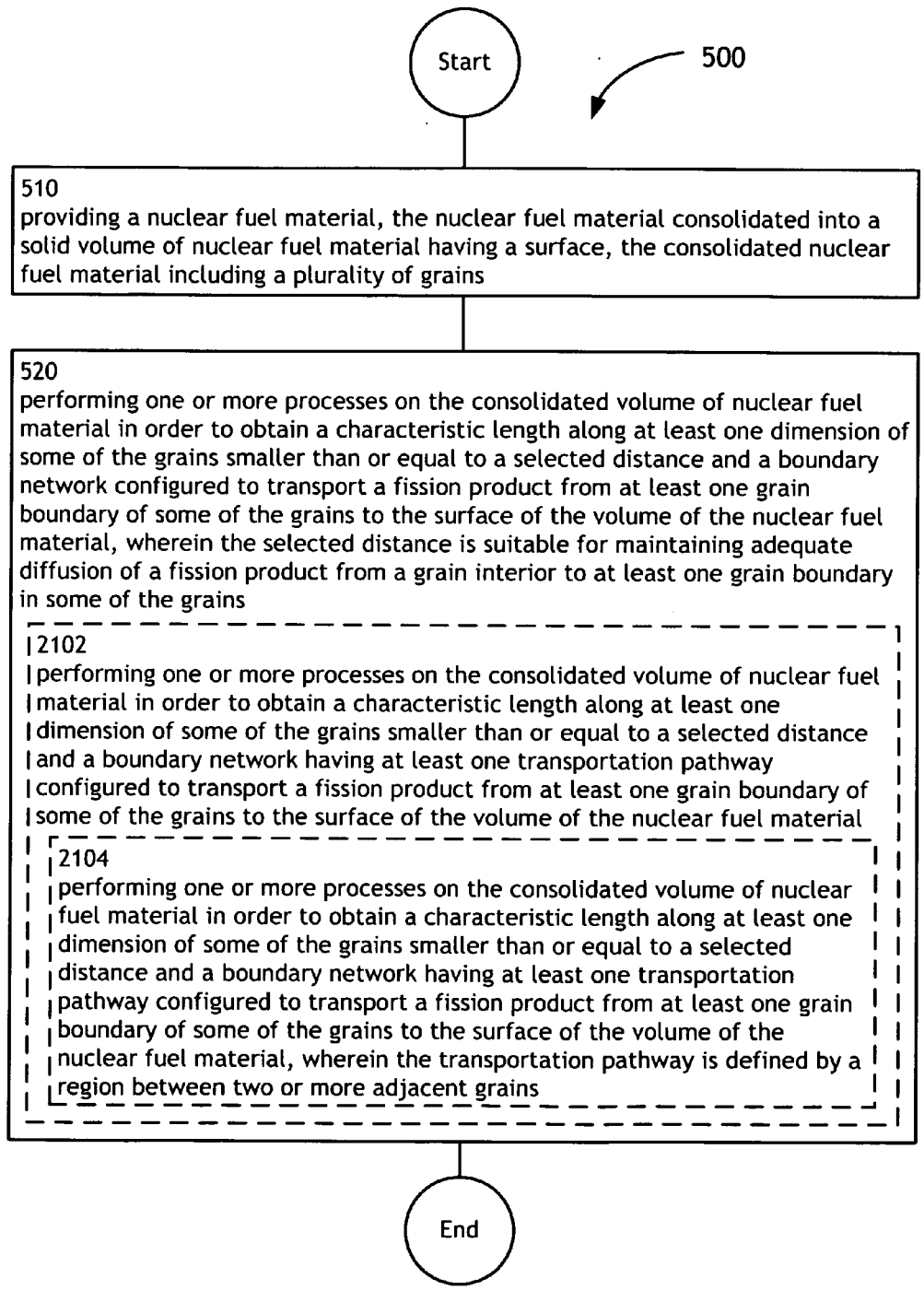

FIG. 20 illustrates alternative embodiments of the example operational flow 500 of FIG. 5. FIG. 20 illustrates example embodiments where the operation 520 may include at least one additional operation. Additional operations may include an operation 2002.

The operation 2002 illustrates performing a single fabrication process on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material. For example, as shown in FIGS. 1A through 4, the consolidated volume 102 of nuclear fuel material may undergo a single process step in order to reduce the grain sizes 106 of one or more grains 104 within the consolidated volume 102 and develop the boundary network 114 of the nuclear fuel 100. It should be recognized that the reduction of grain sizes 106 within the nuclear fuel 100 and the development of the boundary network 114 are intimately related as the boundary network may be geometrically defined by the region(s) between two or more grains 104 of the nuclear fuel 100. For this reason, a process that alters the grain structure of the nuclear fuel 100 by reducing the grain sizes 106 of the nuclear fuel 100 will impact the state of the boundary network 114. For example, the reduction of grain sizes 106 leads to an increase in grain-boundaries 110, which in turn leads to an increase in the potential transportation pathways 116 of the boundary network 114. Moreover, a process, such as an oxygen reduction process, described previously, may act to reduce the volume of one or more grains 104 of the nuclear fuel 100. This reduction may lead to an increase in the grain-boundary area within the nuclear fuel 100, leading to a more robust boundary network 114.

Figure 21:
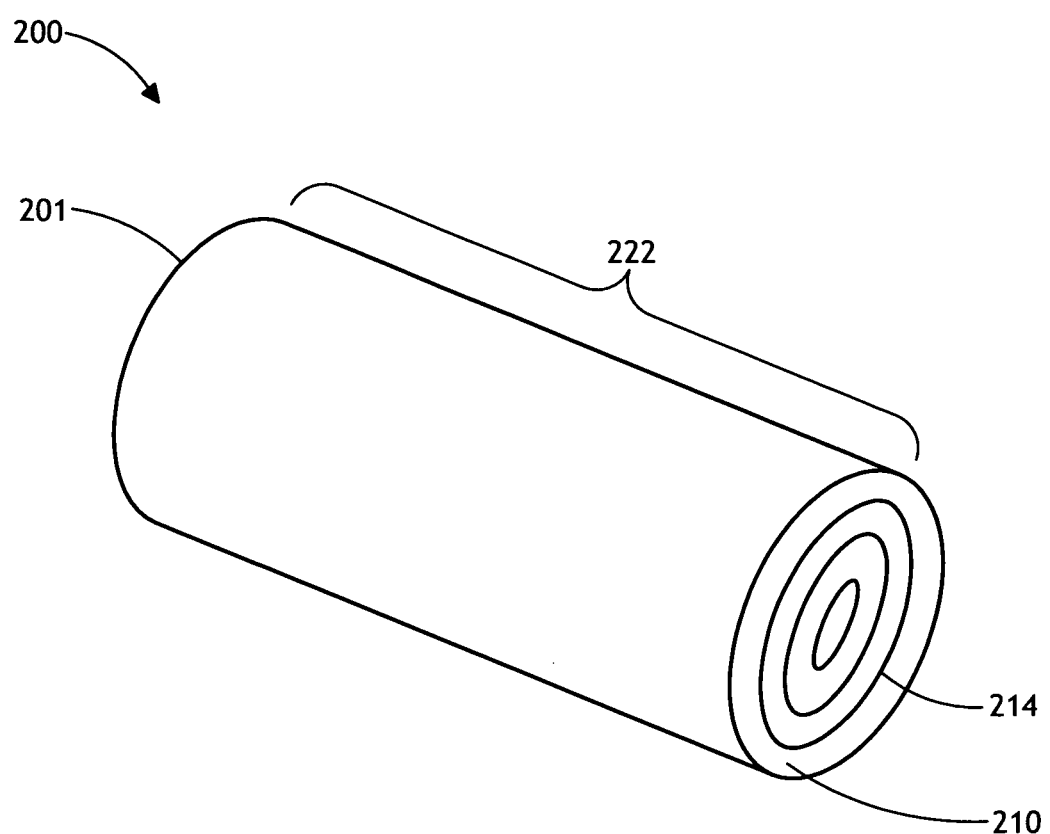
FIGS. 6 through 32 are high-level flowcharts depicting alternate implementations of FIG. 5.

FIG. 21 illustrates alternative embodiments of the example operational flow 500 of FIG. 5. FIG. 21 illustrates example embodiments where the operation 520 may include at least one additional operation. Additional operations may include an operation 2102, and/or an operation 2104.

The operation 2102 illustrates performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material. For example, as shown in FIGS. 1A through 4, the consolidated volume 102 of nuclear fuel material may undergo a one or more processes in order to develop a boundary network 114 within the nuclear fuel 100 having one or more transportation pathways 116.

Further, the operation 2104 illustrates performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material, wherein the transportation pathway is defined by a region between two or more adjacent grains. For example, as shown in FIGS. 1A through 4, the consolidated volume 102 of nuclear fuel material may undergo a one or more processes in order to develop a boundary network 114 within the nuclear fuel 100 having one or more transportation pathways 116 defined by a region between two or more grain boundaries 112. For instance, as shown in FIG. 1I, during a fission process in the nuclear fuel 100, fission gas 118 may diffuse from a grain-interior 110 to a grain-boundary. At high enough diffusion levels fission gas 118 bubbles may begin to nucleate at the grain-boundary 112. As more and more fission gas bubbles form at grain-boundary 112, an "open" bubble formation may be formed, resulting in an open transportation pathway 116 suitable for transporting fission gas 118 from a grain-boundary 110 to the geometric surface of the fuel 100.

Figure 22:
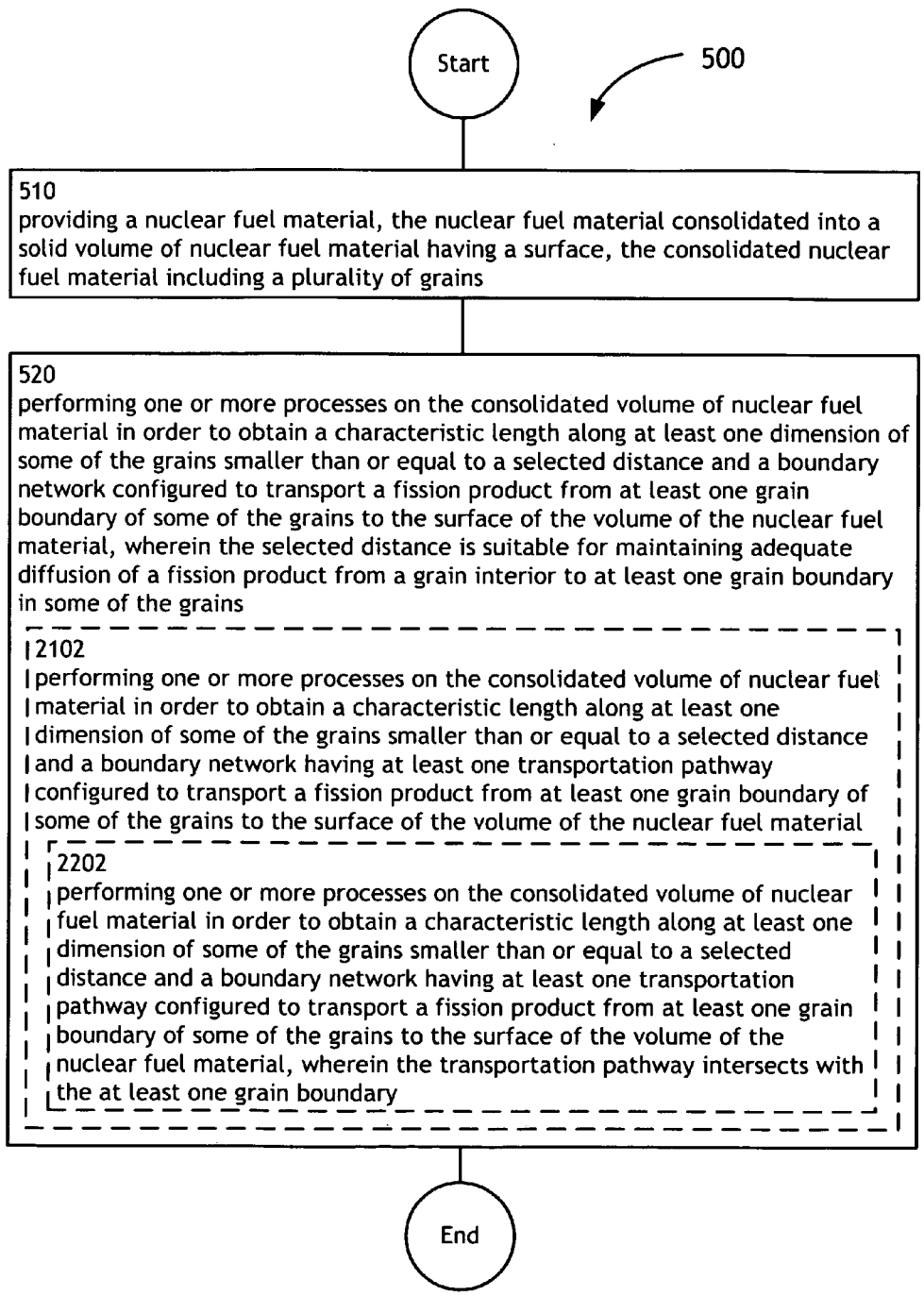

FIG. 22 illustrates alternative embodiments of the example operational flow 500 of FIG. 5. FIG. 22 illustrates example embodiments where the operation 520 may include at least one additional operation. Additional operations may include an operation 2202.

Further, the operation 2202 illustrates performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material, wherein the transportation pathway intersects with the at least one grain boundary. For example, as shown in FIGS. 1A through 4, the consolidated volume 102 of nuclear fuel material may undergo one or more processes in order to develop a boundary network 114 within the nuclear fuel 100 having one or more transportation pathways 116, wherein one or more transportation pathways 116 intersect with one or more grain boundaries 112.

Figure 23:
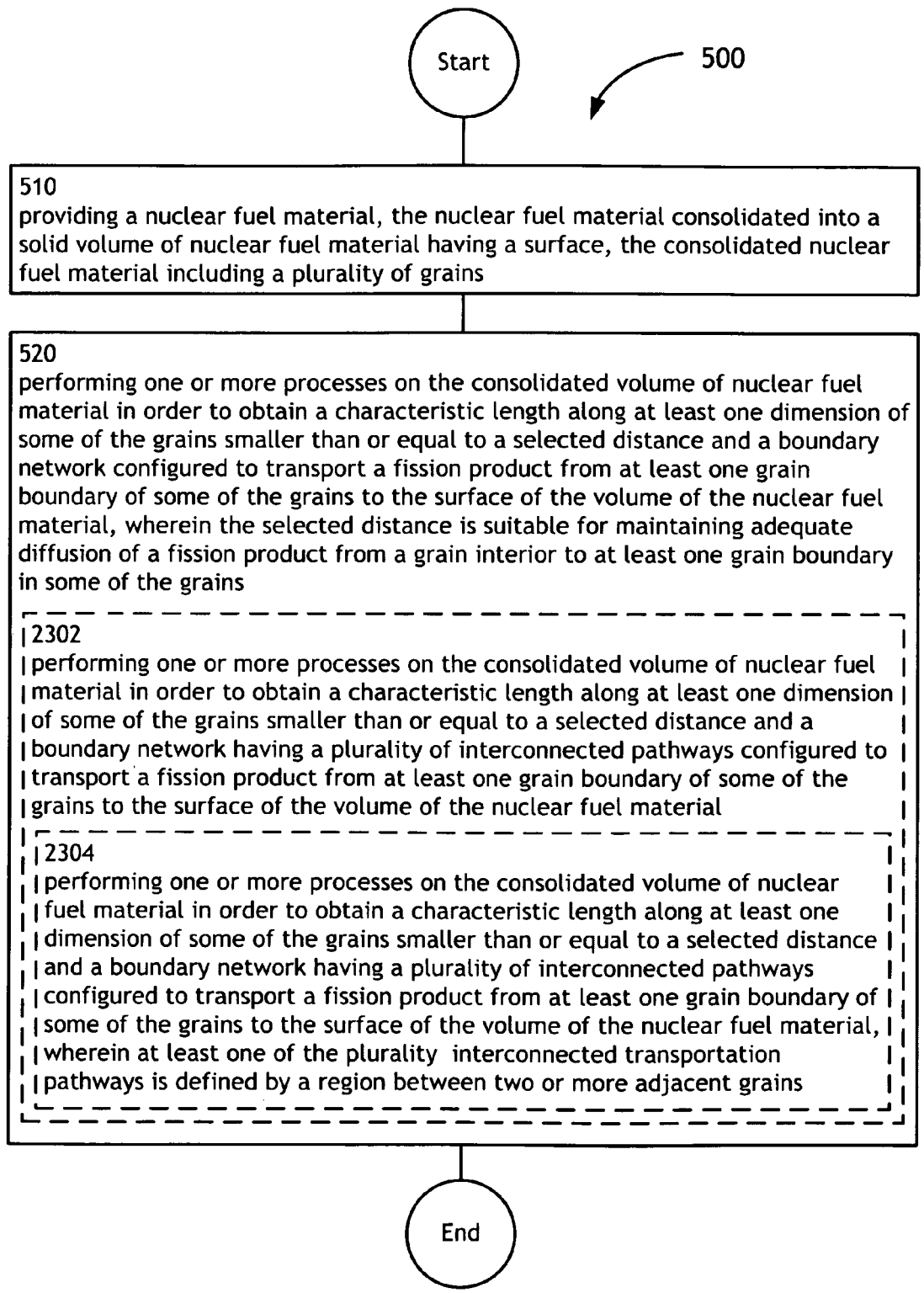

FIG. 23 illustrates alternative embodiments of the example operational flow 500 of FIG. 5. FIG. 23 illustrates example embodiments where the operation 520 may include at least one additional operation. Additional operations may include an operation 2302, and/or an operation 2304.

The operation 2302 illustrates performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material. For example, as shown in FIGS. 1A through 4, the consolidated volume 102 of nuclear fuel material may undergo one or more processes in order to develop a boundary network 114 within the nuclear fuel 100 having a plurality of interconnected pathways. For instance, as discussed above, as the density of transportation pathways 116 increases the likelihood of interconnection between transportation pathways 116 may increase. As such, any process (e.g., cold-working and annealing, oxygen reducing treatment, or the like) suitable for reducing grain size 106 within the nuclear fuel 100 may be utilized to form or further develop a plurality of interconnected pathways.

Further, the operation 2304 illustrates performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material, wherein at least one of the plurality interconnected transportation pathways is defined by a region between two or more adjacent grains. For example, as shown in FIGS. 1A through 4, the consolidated volume 102 of nuclear fuel material may undergo one or more processes in order to develop a boundary network 114 within the nuclear fuel 100 having a plurality of interconnected pathways defined by two or more regions between two or more grains 104. For instance, as discussed above, as the density of transportation pathways 116 increases the likelihood of interconnection between transportation pathways 116 may increase. As such, any process suitable for reducing grain size 106 within the nuclear fuel 100 may be utilized to form or further develop a plurality of interconnected pathways defined by the regions between two or more grains 104.

Figure 24:
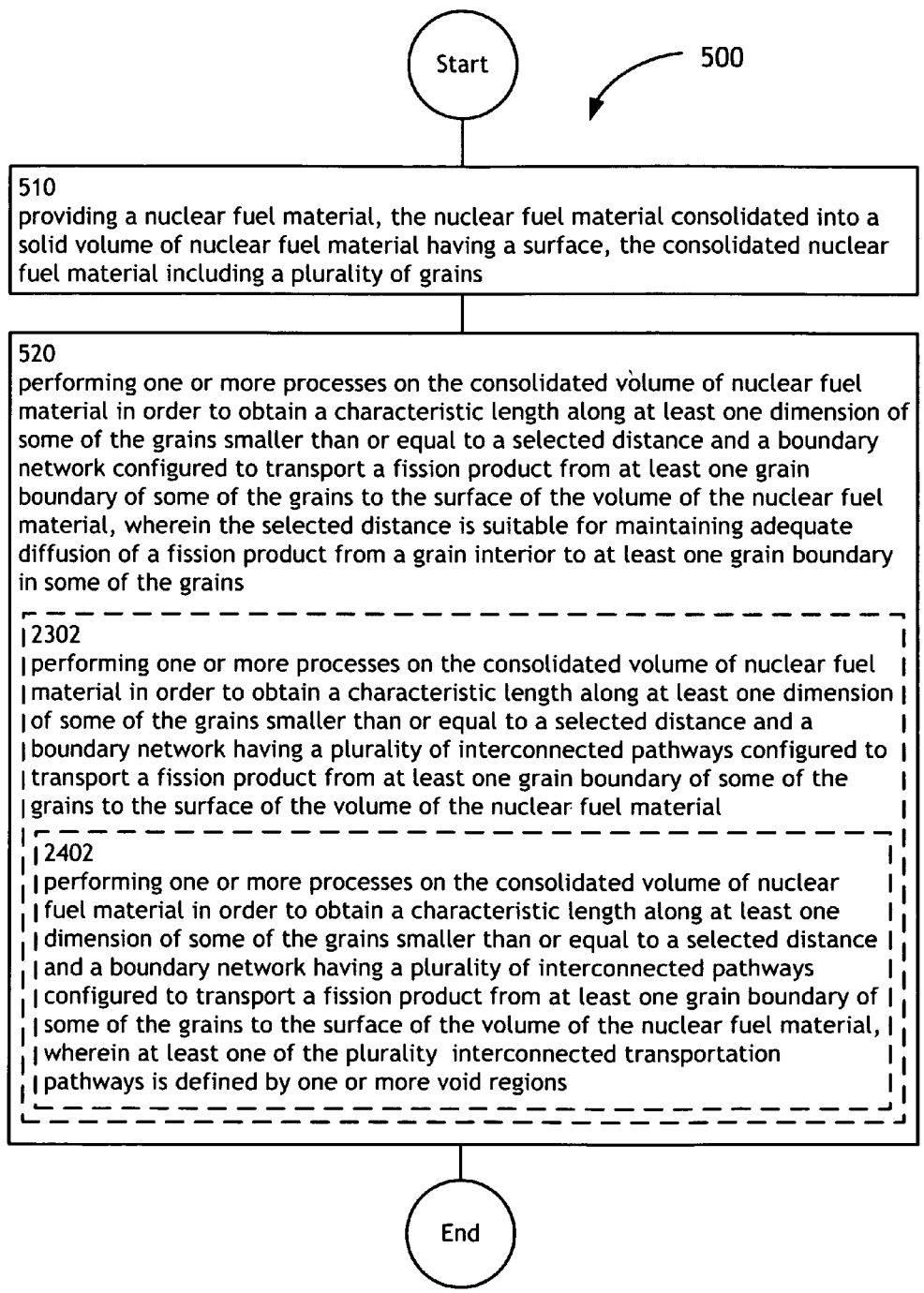

FIG. 24 illustrates alternative embodiments of the example operational flow 500 of FIG. 5. FIG. 24 illustrates example embodiments where the operation 520 may include at least one additional operation. Additional operations may include an operation 2402.

Further, the operation 2402 illustrates performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material, wherein at least one of the plurality interconnected transportation pathways is defined by one or more void regions. For example, as shown in FIGS. 1A through 4, the consolidated volume 102 of nuclear fuel material may undergo one or more processes in order to develop a boundary network 114 within the nuclear fuel 100 defined by one or more void regions. For instance, as discussed above, void regions may be formed by utilizing a nuclear fuel 100 doped with a dispersant (e.g., zirconium oxide particles) in a nuclear reactor setting as the dispersant particles form preferential fission gas 118 occupation sites, which create voids within the grain structure of the nuclear fuel 100. As the density of these voids grows with increasing dispersant doping levels and fission gas generation rate, the void regions may become interconnected, forming a boundary network 114.

Figure 25:
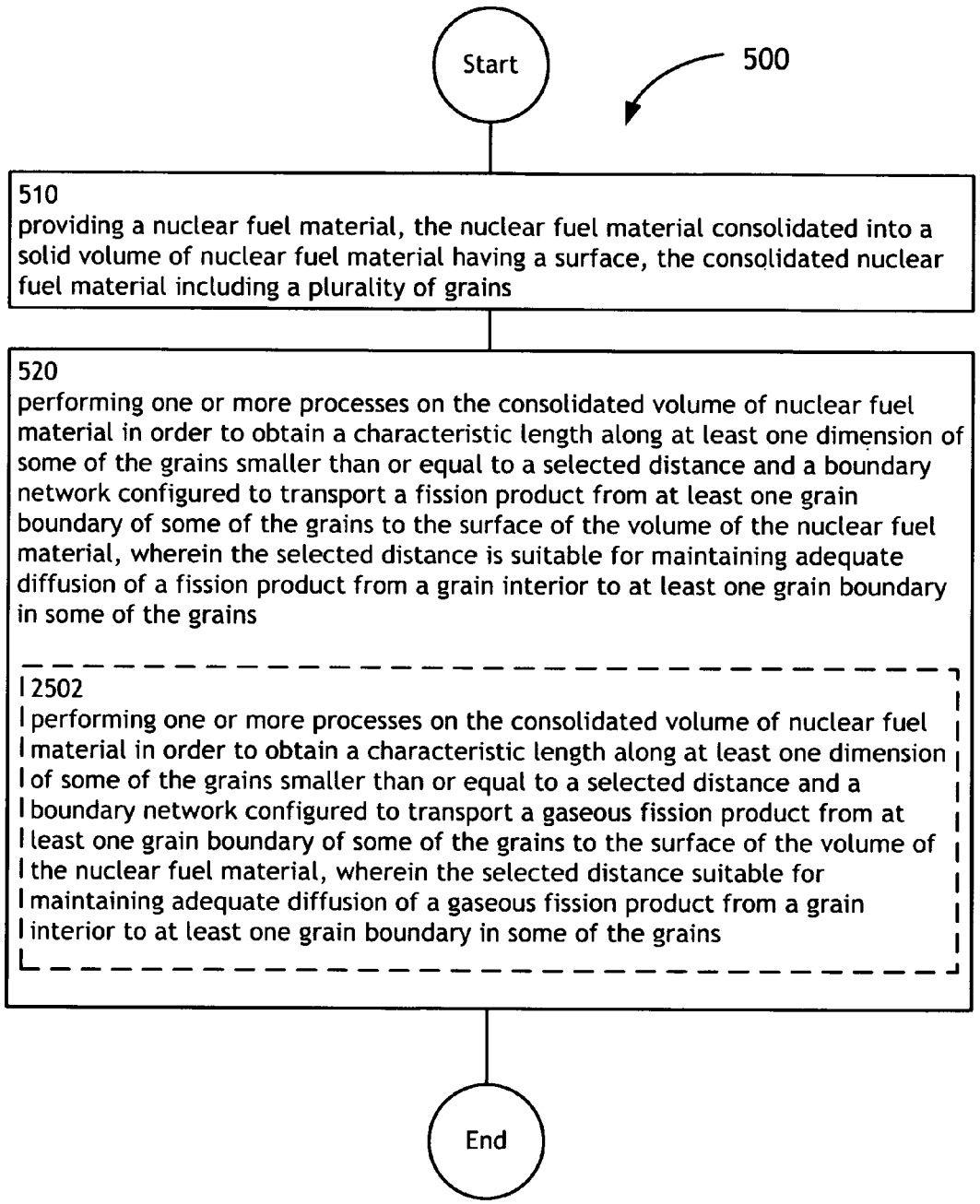

FIG. 25 illustrates alternative embodiments of the example operational flow 500 of FIG. 5. FIG. 25 illustrates example embodiments where the operation 520 may include at least one additional operation. Additional operations may include an operation 2502.

The operation 2502 illustrates performing one or more processes on the consolidated volume of nuclear fuel material in order to obtain a characteristic length along at least one dimension of some of the grains smaller than or equal to a selected distance and a boundary network configured to transport a gaseous fission product from at least one grain boundary of some of the grains to the surface of the volume of the nuclear fuel material, wherein the selected distance suitable for maintaining adequate diffusion of a gaseous fission product from a grain interior to at least one grain boundary in some of the grains. For example, as shown in FIGS. 1A through 4, the consolidated volume 102 of nuclear fuel material may undergo one or more processes in order to develop a boundary network 114 suitable for transporting a fission gas 118 from the grain-boundaries 112 of the grains 104 to the geometric surface 101 of the nuclear fuel. For instance, the consolidated volume 102 of nuclear fuel 100 material may undergo one or more processes in order to develop a boundary network 114 suitable for transporting xenon or krypton gas from the grain-boundaries 112 of the grains 104 to the geometric surface 101 of the nuclear fuel 100.

Figure 26:
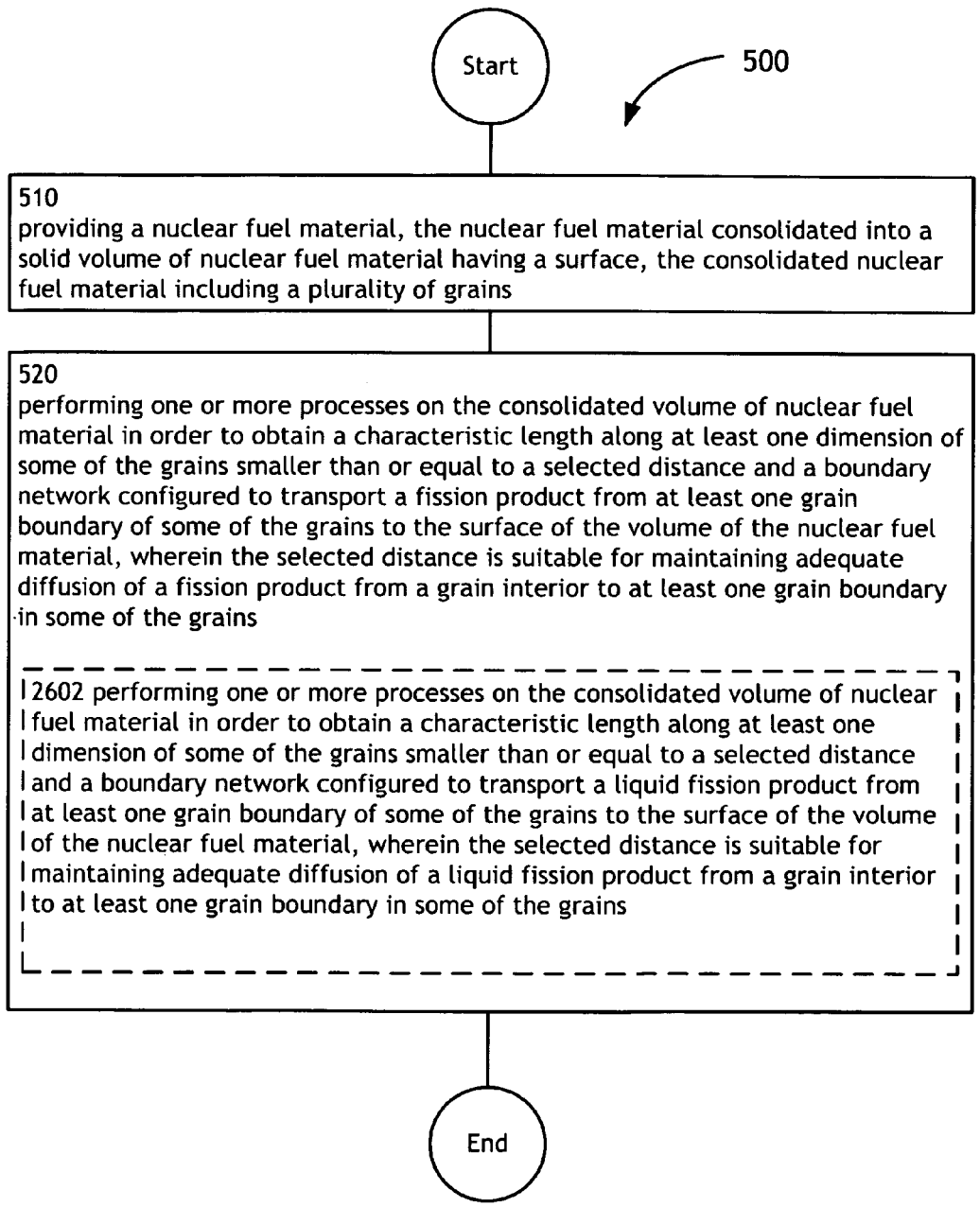

FIG. 26 illustrates alternative embodiments of the example operational flow 500 of FIG. 5. FIG. 26 illustrates example embodiments where the operation 520 may include at least one additional operation. Additional operations may include an operation 2602.

The operation 2602 illustrates performing one or more processes on the consolidated volume of nuclear fuel material in order to obtain a characteristic length along at least one dimension of some of the grains smaller than or equal to a selected distance and a boundary network configured to transport a liquid fission product from at least one grain boundary of some of the grains to the surface of the volume of the nuclear fuel material, wherein the selected distance is suitable for maintaining adequate diffusion of a liquid fission product from a grain interior to at least one grain boundary in some of the grains. For example, as shown in FIGS. 1A through 4, the consolidated volume 102 of nuclear fuel material may undergo one or more processes in order to develop a boundary network 114 suitable for transporting a liquid fission product 119 from the grain-boundaries 112 of the grains 104 to the geometric surface 101 of the nuclear fuel. For instance, the consolidated volume 102 of nuclear fuel 100 material may undergo one or more processes in order to develop a boundary network 114 suitable for transporting liquid sodium or liquid cesium from the grain-boundaries 112 of the grains 104 to the geometric surface 101 of the nuclear fuel 100.

Figure 27:
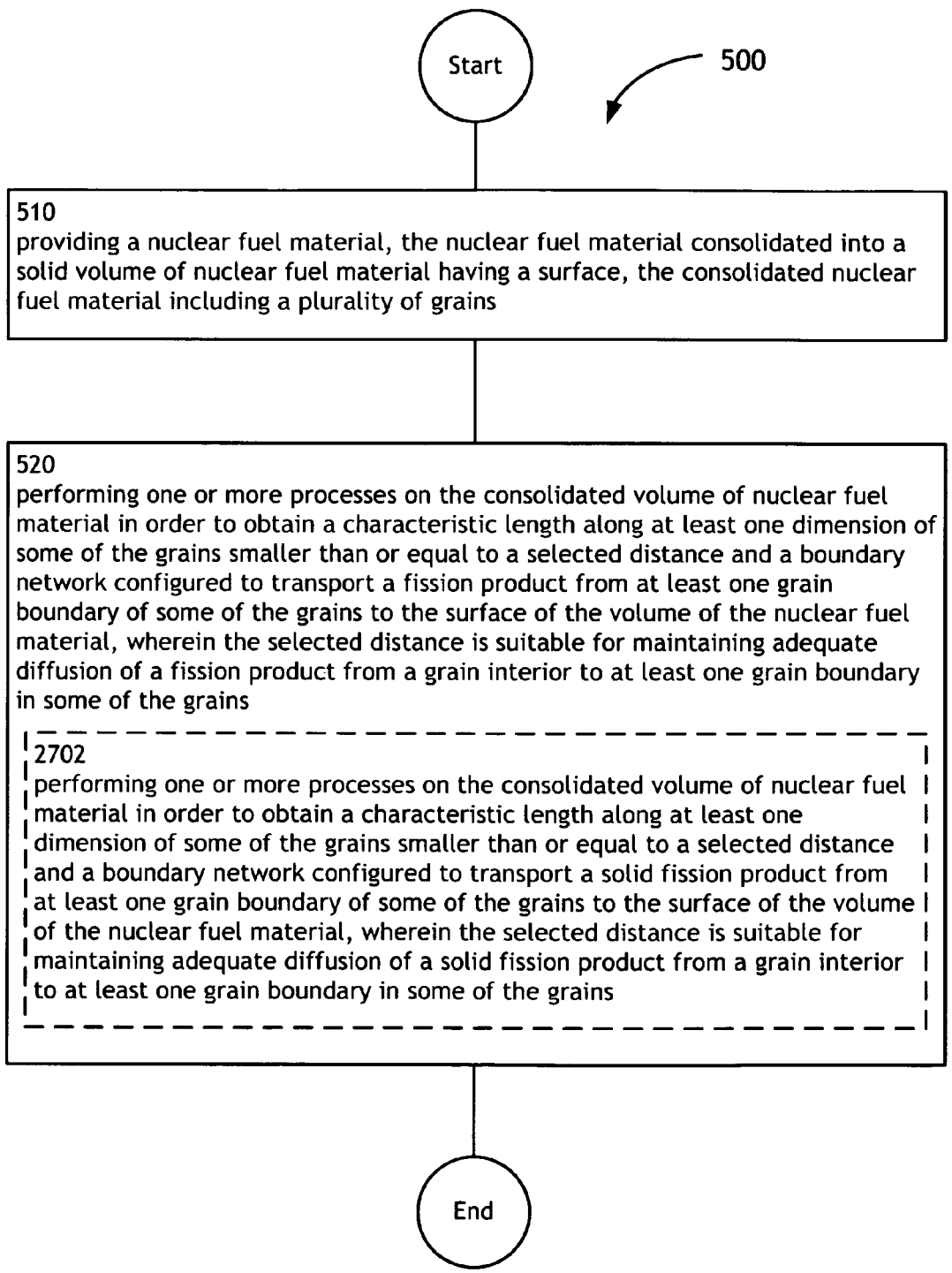

FIG. 27 illustrates alternative embodiments of the example operational flow 500 of FIG. 5. FIG. 27 illustrates example embodiments where the operation 520 may include at least one additional operation. Additional operations may include an operation 2702.

The operation 2702 illustrates performing one or more processes on the consolidated volume of nuclear fuel material in order to obtain a characteristic length along at least one dimension of some of the grains smaller than or equal to a selected distance and a boundary network configured to transport a solid fission product from at least one grain boundary of some of the grains to the surface of the volume of the nuclear fuel material, wherein the selected distance is suitable for maintaining adequate diffusion of a solid fission product from a grain interior to at least one grain boundary in some of the grains. For example, as shown in FIGS. 1A through 4, the consolidated volume 102 of nuclear fuel material may undergo one or more processes in order to develop a boundary network 114 suitable for transporting a solid fission product 120 from the grain-boundaries 112 of the grains 104 to the geometric surface 101 of the nuclear fuel. For instance, the consolidated volume 102 of nuclear fuel 100 material may undergo one or more processes in order to develop a boundary network 114 suitable for transporting a solid fission product 120, such as tellurium or cesium, from the grain-boundaries 112 of the grains 104 to the geometric surface 101 of a metal oxide, such as uranium dioxide, based nuclear fuel 100.

Figure 28:
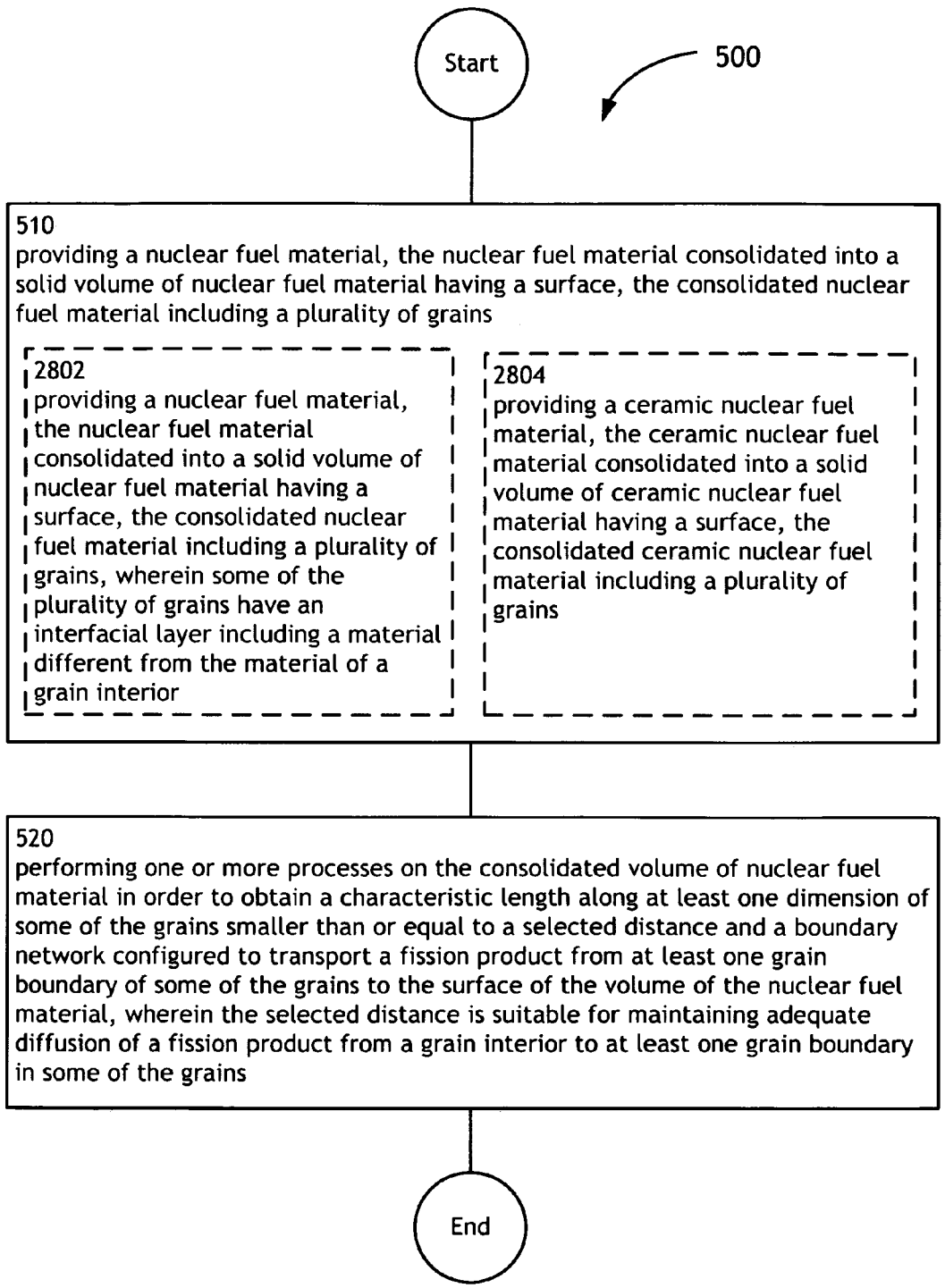

FIG. 28 illustrates alternative embodiments of the example operational flow 500 of FIG. 5. FIG. 28 illustrates example embodiments where the operation 510 may include at least one additional operation. Additional operations may include an operation 2802, and/or an operation 2804.

The operation 2802 illustrates providing a nuclear fuel material, the nuclear fuel material consolidated into a solid volume of nuclear fuel material having a surface, the consolidated nuclear fuel material including a plurality of grains, wherein some of the plurality of grains have an interfacial layer including a material different from the material of a grain interior. For example, as shown in FIG. 1J, the grains 104 of the solid volume of provided nuclear fuel material may include an interfacial layer of a material different than the grain-interiors 110. For instance, the grains 104 may include an oxide-based or carbide-based interfacial layer.

The operation 2804 illustrates providing a ceramic nuclear fuel material, the ceramic nuclear fuel material consolidated into a solid volume of ceramic nuclear fuel material having a surface, the consolidated ceramic nuclear fuel material including a plurality of grains. For example, as shown in FIGS. 1A through 4, the provided nuclear fuel material may include a ceramic based material nuclear fuel material. For instance, nuclear fuel material may include, but is not limited to a metal oxide (e.g., uranium dioxide, plutonium dioxide, or thorium dioxide) nuclear fuel material, a mixed oxide nuclear fuel material (e.g., blend of plutonium dioxide and depleted uranium dioxide), a metal nitride (e.g., uranium nitride) based nuclear fuel material, or a metal carbide (e.g., uranium carbide) based nuclear fuel material.

Figure 29:
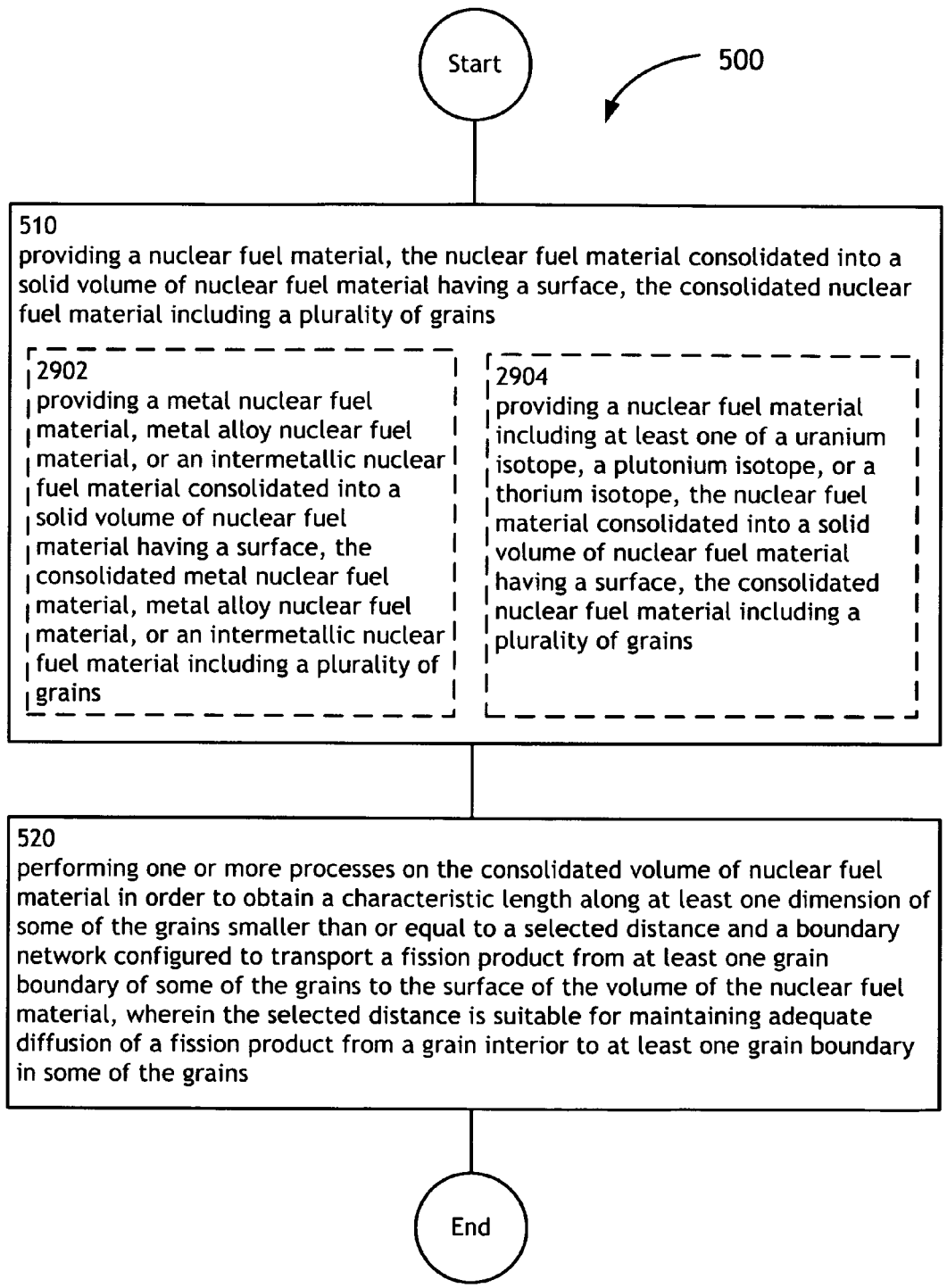

FIG. 29 illustrates alternative embodiments of the example operational flow 500 of FIG. 5. FIG. 29 illustrates example embodiments where the operation 510 may include at least one additional operation. Additional operations may include an operation 2902, and/or an operation 2904.

The operation 2902 illustrates providing a metal nuclear fuel material, a metal alloy nuclear fuel material, or an intermetallic nuclear fuel material consolidated into a solid volume of metal nuclear fuel material, a metal alloy nuclear fuel material, or an intermetallic nuclear fuel material having a surface, the consolidated metal nuclear fuel material, a metal alloy nuclear fuel material, or an intermetallic nuclear fuel material including a plurality of grains. For example, as shown in FIGS. 1A through 4, the provided nuclear fuel material may include a metal based nuclear fuel material. For instance, nuclear fuel material may include, but is not limited to a metal (e.g., uranium, plutonium, or thorium) nuclear fuel material, a metal alloy fuel material (e.g., uranium zirconium, uranium-plutonium-zirconium, or uranium zirconium hydride), or an intermetallic (e.g., $UFe_2$ or $UNi_2$) based nuclear fuel material.

The operation 2904 illustrates providing a nuclear fuel material including at least one of a uranium isotope, a plutonium isotope, or a thorium isotope, the nuclear fuel material consolidated into a solid volume of nuclear fuel material having a surface, the consolidated nuclear fuel material including a plurality of grains. For example, as shown in FIGS. 1A through 4, the provided nuclear fuel may include a fissile nuclear material including, but not limited to, uranium-235 or plutonium-239. By way of another example, the provided nuclear fuel may include a non-fissile nuclear material including, but not limited to, thorium-232. While thorium-232 is not by itself fissile, it may be utilized to breed uranium-233, which is fissile in nature.

Figure 30:
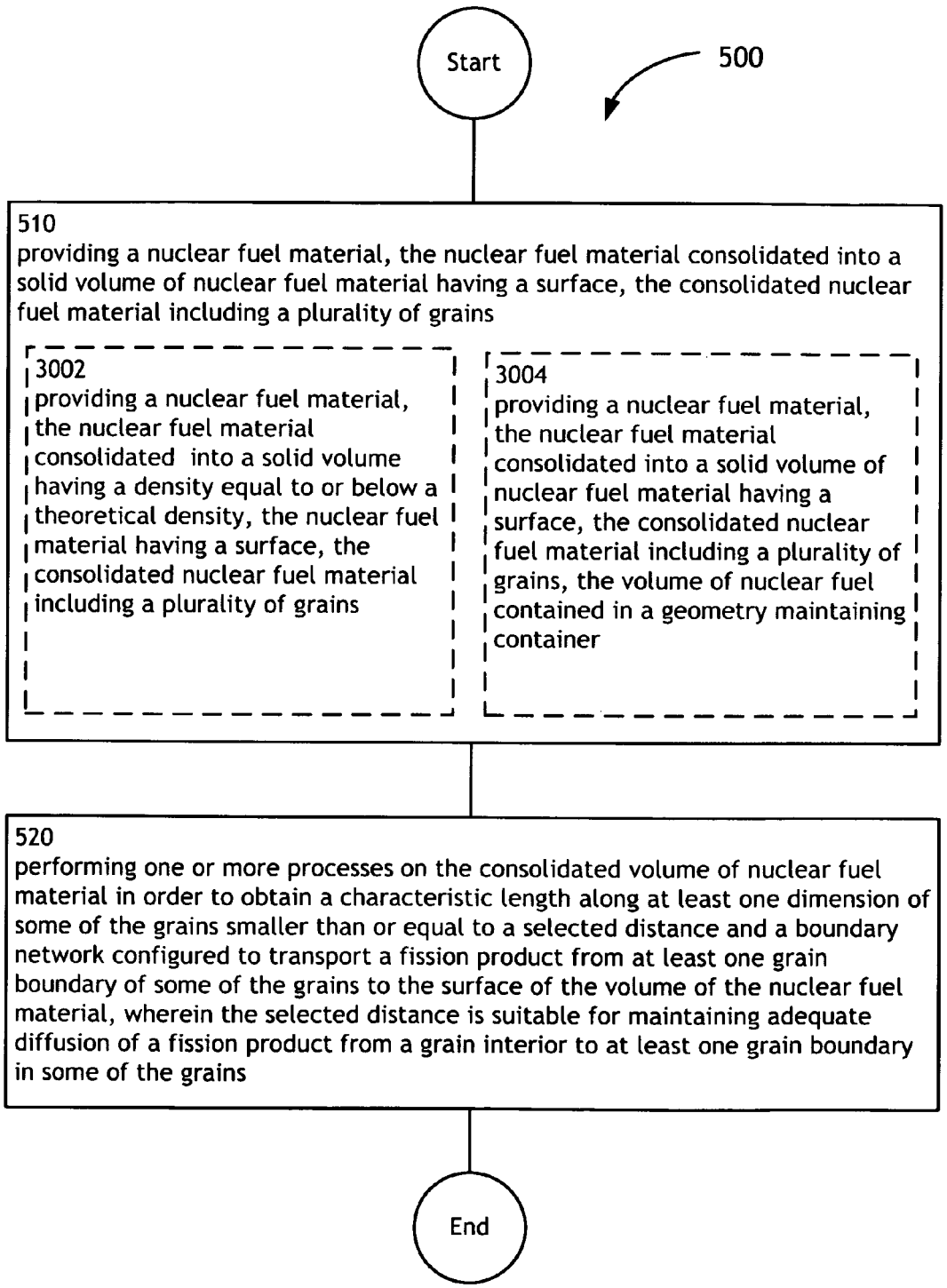

FIG. 30 illustrates alternative embodiments of the example operational flow 500 of FIG. 5. FIG. 30 illustrates example embodiments where the operation 510 may include at least one additional operation. Additional operations may include an operation 3002, and/or an operation 3004.

The operation 3002 illustrates providing a nuclear fuel material, the nuclear fuel material consolidated into a solid volume having a density equal to or below a theoretical density, the nuclear fuel material having a surface, the consolidated nuclear fuel material including a plurality of grains. For example, as shown in FIGS. 1A through 4, the consolidation process (e.g., casting, compacting, sintering, or the like) used to create the volume 102 of consolidated nuclear fuel material may fabricate a nuclear fuel piece having a selected density, wherein the selected density is less than the theoretical density. For instance, the nuclear fuel material may be consolidated to a density of 70% of the theoretical density.

The operation 3004 illustrates providing a nuclear fuel material, the nuclear fuel material consolidated into a solid volume of nuclear fuel material having a surface, the consolidated nuclear fuel material including a plurality of grains, the volume of nuclear fuel contained in a geometry maintaining container. For example, as shown in FIGS. 1A through 4, a casting process may consolidate a metallic nuclear fuel material inside a fuel rod, where the molten metallic nuclear fuel material may then solidify.

Figure 31:
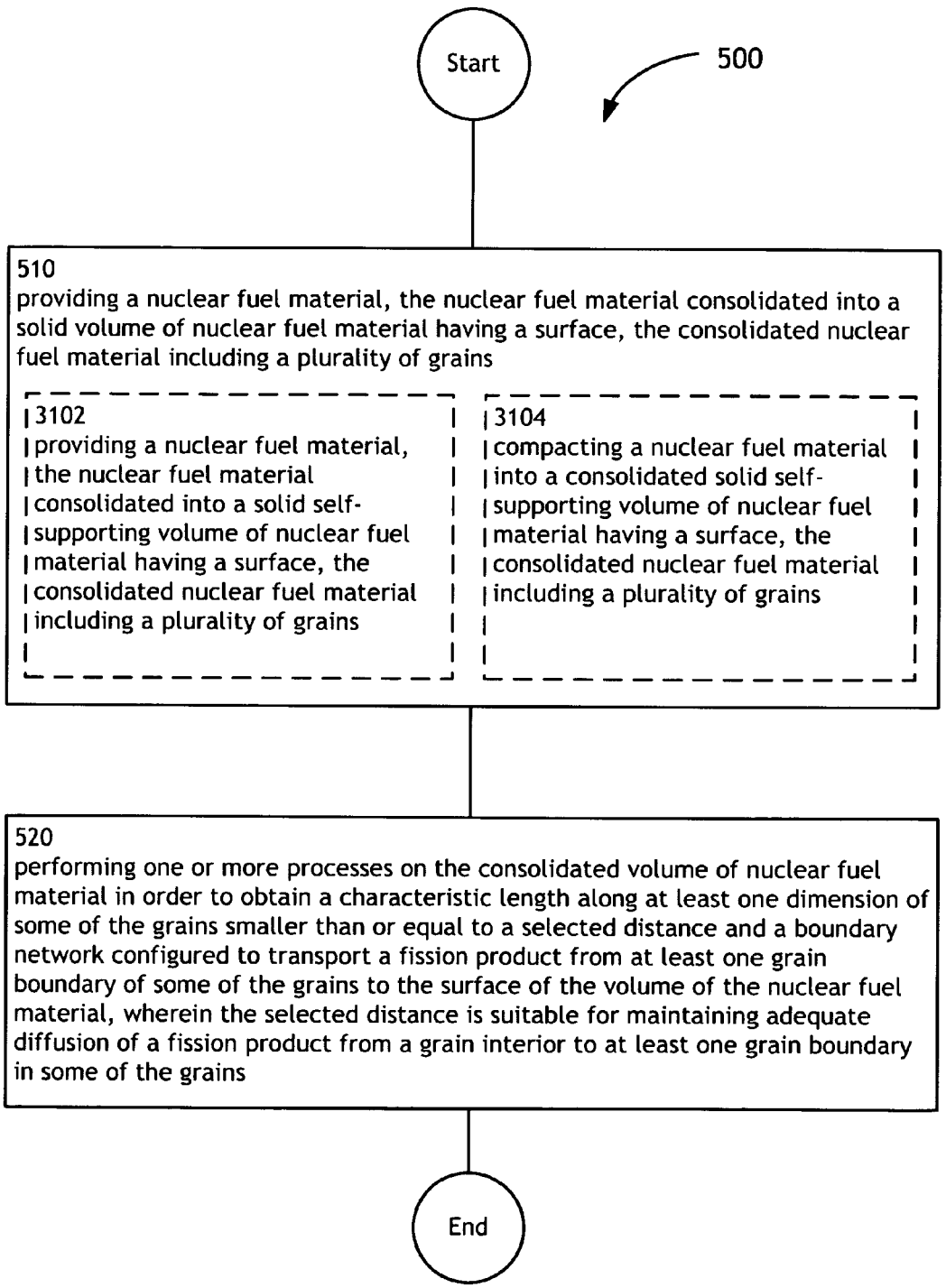

FIG. 31 illustrates alternative embodiments of the example operational flow 500 of FIG. 5. FIG. 31 illustrates example embodiments where the operation 510 may include at least one additional operation. Additional operations may include an operation 3102, and/or an operation 3104.

The operation 3102 illustrates providing a nuclear fuel material, the nuclear fuel material consolidated into a solid self-supporting volume of nuclear fuel material having a surface, the consolidated nuclear fuel material including a plurality of grains. For example, as shown in FIGS. 1A through 4, a metal oxide powder, such as uranium-dioxide, may be formed into a self-supporting geometry.

The operation 3104 illustrates compacting a nuclear fuel material into a consolidated solid self-supporting volume of nuclear fuel material having a surface, the consolidated nuclear fuel material including a plurality of grains. For example, as shown in FIGS. 1A through 4, a metal oxide powder, such as uranium-dioxide, may be placed in a mold and compacted to form a self-supporting fuel pellet.

Figure 32:
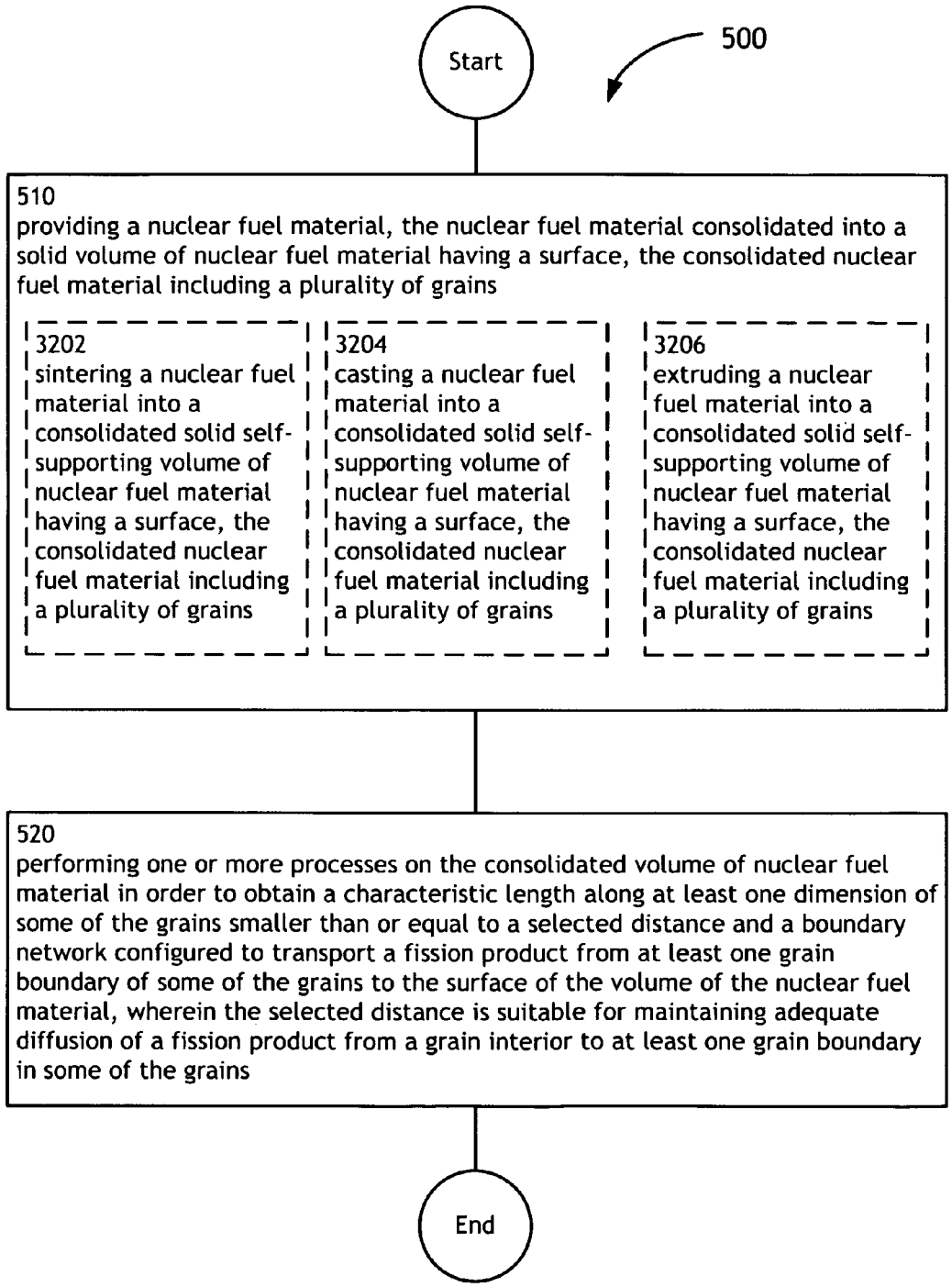

FIG. 32 illustrates alternative embodiments of the example operational flow 500 of FIG. 5. FIG. 32 illustrates example embodiments where the operation 510 may include at least one additional operation. Additional operations may include an operation 3202, 3204, and/or operation 3206.

The operation 3202 illustrates sintering a nuclear fuel material into a consolidated solid self-supporting volume of nuclear fuel material having a surface, the consolidated nuclear fuel material including a plurality of grains. For example, as shown in FIGS. 1A through 4, a metal oxide powder, such as uranium-dioxide, may be placed in a mold and compacted and sintered to form a self-supporting fuel pellet.

The operation 3204 illustrates casting a nuclear fuel material into a consolidated solid self-supporting volume of nuclear fuel material having a surface, the consolidated nuclear fuel material including a plurality of grains. For example, as shown in FIGS. 1A through 4, metallic nuclear fuel material, such as a metal alloy (e.g., Uranium-Plutonium), may be cast from a molten phase into a mold. Upon casting into a mold, the molten nuclear fuel material may undergo a cooling process until solidification.

Figure 33:
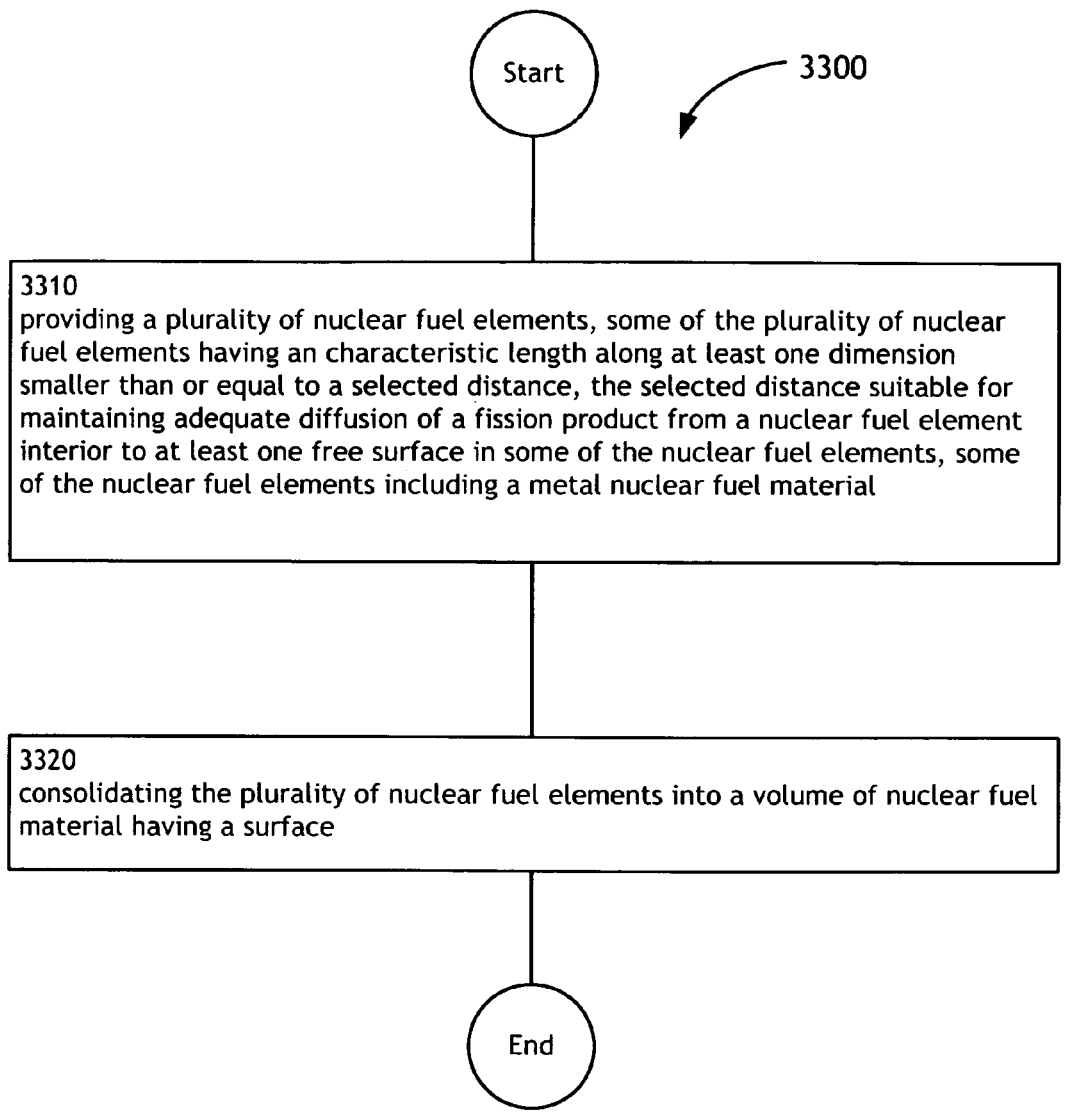
FIG. 33 is a high-level flowchart of a method for fabricating a nuclear fuel.

The operation 3206 illustrates extruding a nuclear fuel material into a consolidated solid self-supporting volume of nuclear fuel material having a surface, the consolidated nuclear fuel material including a plurality of grains. For example, as shown in FIGS. 1A through 4, metallic nuclear fuel material, such as a metal alloy (e.g., Uranium-Plutonium), may undergo an extruding process at room temperature or nearly room temperature to form a solid nuclear fuel piece. As has been discussed above, low-temperature extrusion has the added benefit of producing a grain structure having a reduced average grain size FIG. 33 illustrates an operational flow 3300 representing example operations related to a method for fabricating a nuclear fuel. In FIG. 33 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 3300 moves to a providing operation 3310. Providing operation 3310 depicts providing a plurality of nuclear fuel elements, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, some of the nuclear fuel elements including a metal nuclear fuel material. For example, as shown in FIGS. 1A through 4, a plurality of nuclear fuel elements 204 may be fabricated via a ball milling process such that their average size is smaller than a critical distance suitable for maintaining adequate diffusion of a fission product 108 from the interiors 210 of the nuclear fuel elements 204 to the surfaces 212 of the nuclear fuel elements 204. For instance, a plurality of spherical nuclear fuel particles may be fabricated to have an average radius of 100 nm.

Then, consolidating operation 3320 depicts consolidating the plurality of nuclear fuel elements into a volume of nuclear fuel material having a surface. For example, as shown in FIGS. 1A through 4, the provided plurality of nuclear fuel elements 204 (e.g., particles) may be consolidated into a solid volume 202 utilizing a compaction process.

Figure 34:
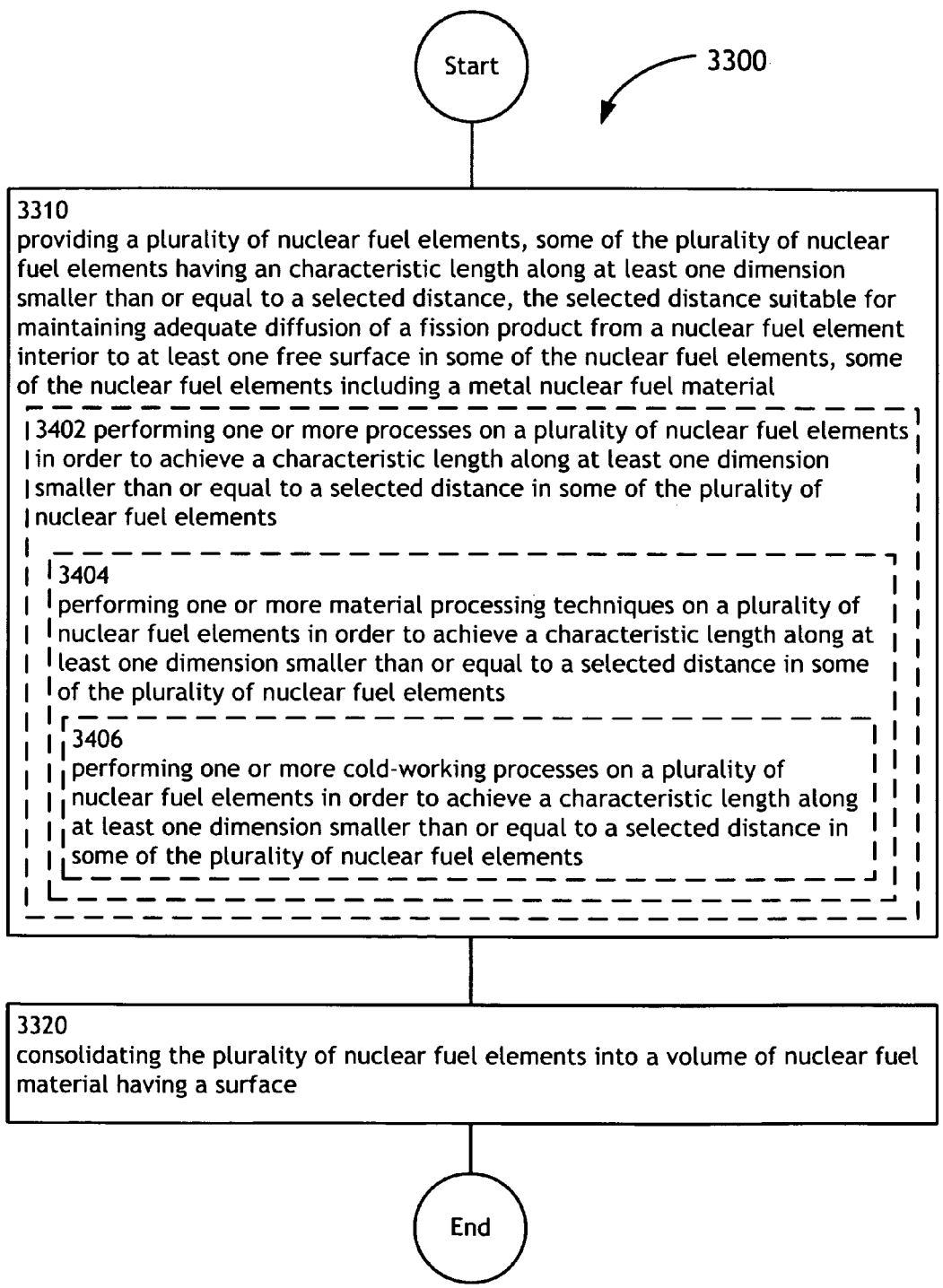
FIGS. 34 through 63 are high-level flowcharts depicting alternate implementations of FIG. 33.

FIG. 34 illustrates alternative embodiments of the example operational flow 3300 of FIG. 33. FIG. 34 illustrates example embodiments where the operation 3310 may include at least one additional operation. Additional operations may include an operation 3402, an operation 3404, and/or an operation 3406.

The operation 3402 illustrates performing one or more processes on a plurality of nuclear fuel elements in order to achieve a characteristic length along at least one dimension smaller than or equal to a selected distance in some of the plurality of nuclear fuel elements. For example, as shown in FIGS. 1A through 4, one or more processes may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 3404 illustrates performing one or more material processing techniques on a plurality of nuclear fuel elements in order to achieve a characteristic length along at least one dimension smaller than or equal to a selected distance in some of the plurality of nuclear fuel elements. For example, as shown in FIGS. 1A through 4, one or more material processing techniques may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 3406 illustrates performing one or more cold-working processes on a plurality of nuclear fuel elements in order to achieve a characteristic length along at least one dimension smaller than or equal to a selected distance in some of the plurality of nuclear fuel elements. For example, as shown in FIGS. 1A through 4, a cold-working process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. The cold-working process may include, but is not limited to, cold-rolling, drawing, bending, or compression.

Figure 35:
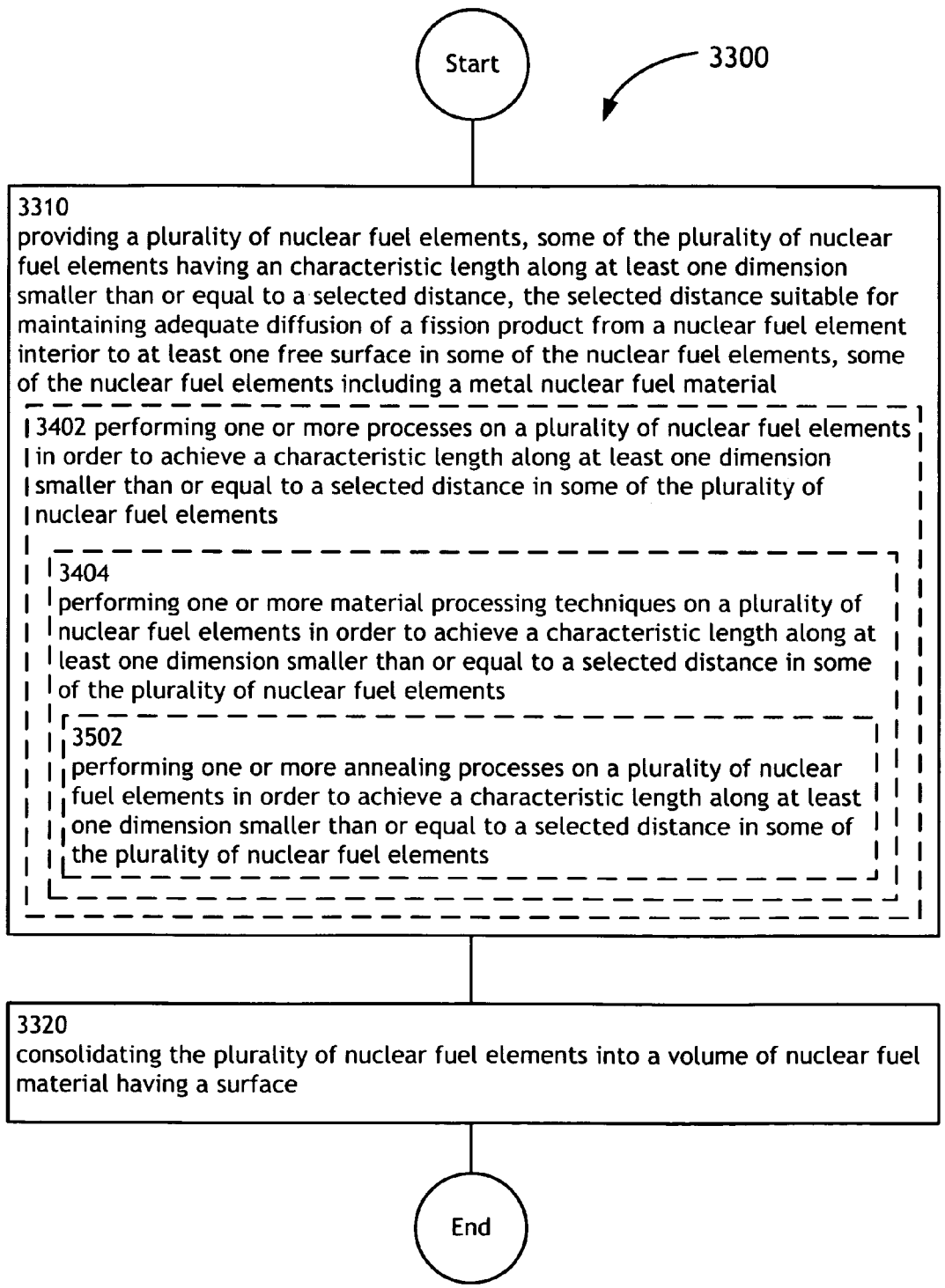

FIG. 35 illustrates alternative embodiments of the example operational flow 3300 of FIG. 33. FIG. 35 illustrates example embodiments where the operation 3310 may include at least one additional operation. Additional operations may include an operation 3502.

Further, the operation 3502 illustrates performing one or more annealing processes on a plurality of nuclear fuel elements in order to achieve a characteristic length along at least one dimension smaller than or equal to a selected distance in some of the plurality of nuclear fuel elements. For example, as shown in FIGS. 1A through 4, an annealing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. Further, the nuclear fuel elements 204 may be annealed in the presence of a processing gas, such as an oxygen reducing gas.

Figure 36:
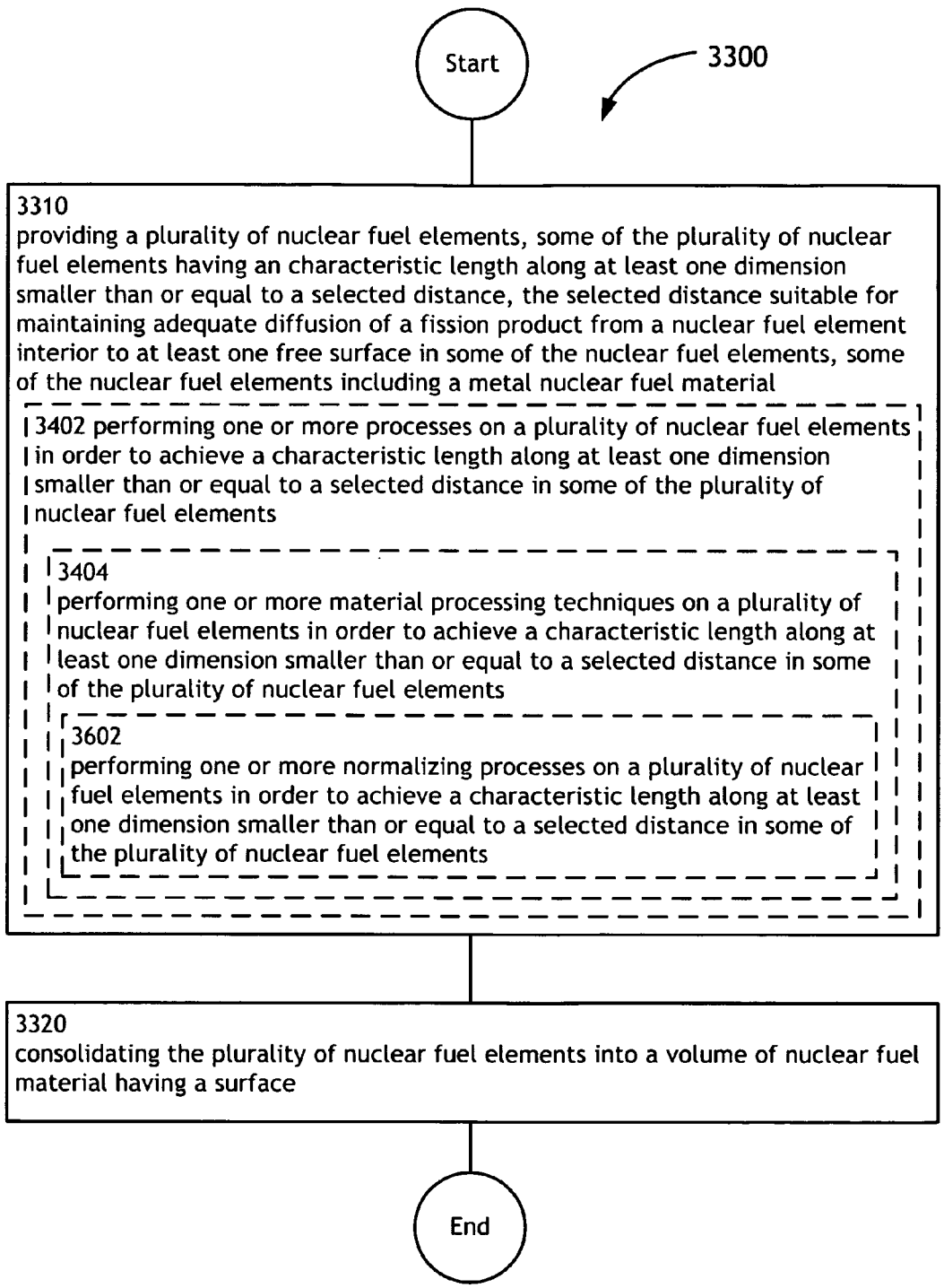

FIG. 36 illustrates alternative embodiments of the example operational flow 3300 of FIG. 33. FIG. 36 illustrates example embodiments where the operation 3310 may include at least one additional operation. Additional operations may include an operation 3602.

Further, the operation 3602 illustrates performing one or more normalizing processes on a plurality of nuclear fuel elements in order to achieve a characteristic length along at least one dimension smaller than or equal to a selected distance in some of the plurality of nuclear fuel elements. For example, as shown in FIGS. 1A through 4, a normalizing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 37:
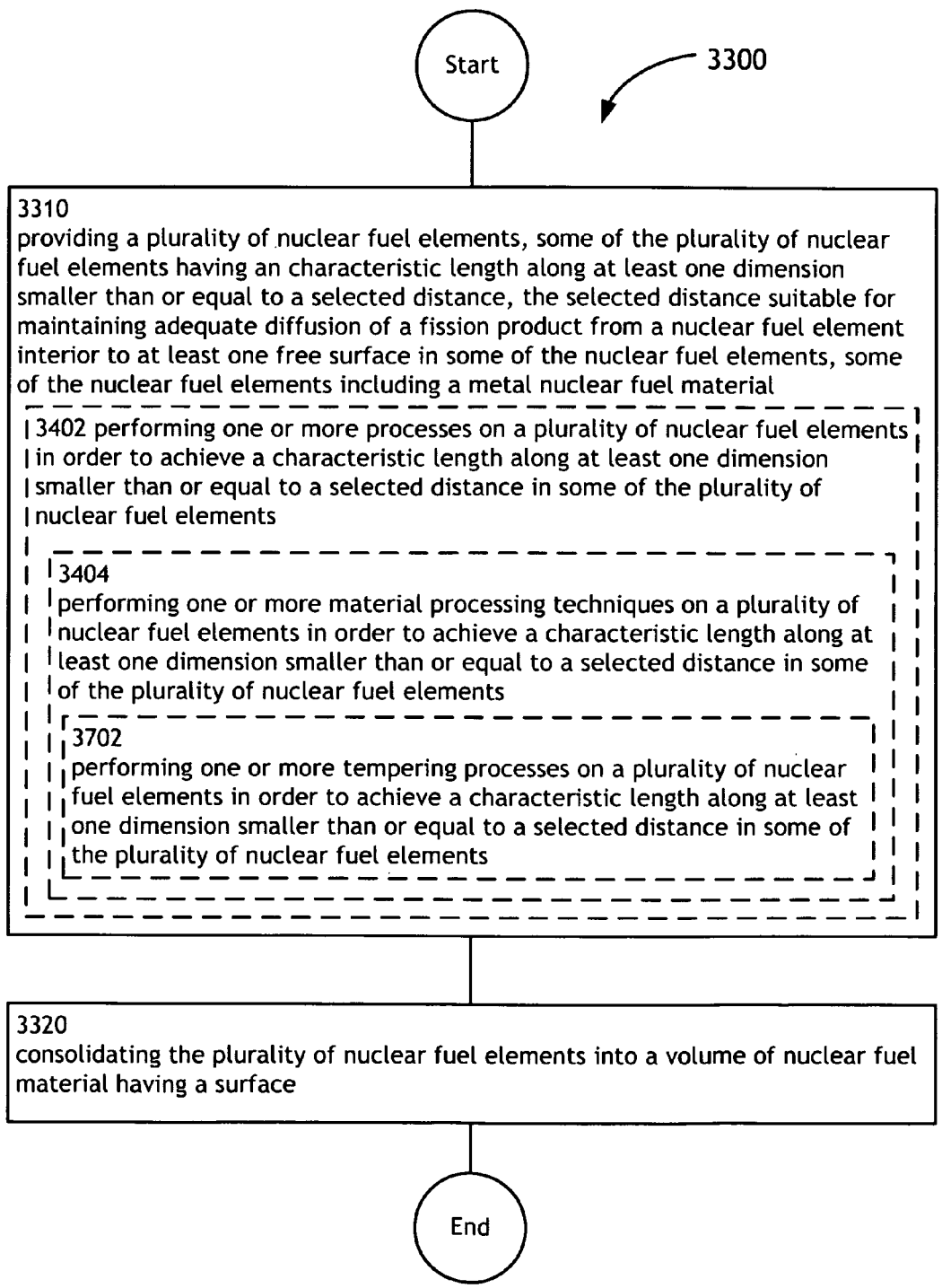

FIG. 37 illustrates alternative embodiments of the example operational flow 3300 of FIG. 33. FIG. 37 illustrates example embodiments where the operation 3310 may include at least one additional operation. Additional operations may include an operation 3702.

Further, the operation 3702 illustrates performing one or more tempering processes on a plurality of nuclear fuel elements in order to achieve a characteristic length along at least one dimension smaller than or equal to a selected distance in some of the plurality of nuclear fuel elements. For example, as shown in FIGS. 1A through 4, a tempering process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 38:
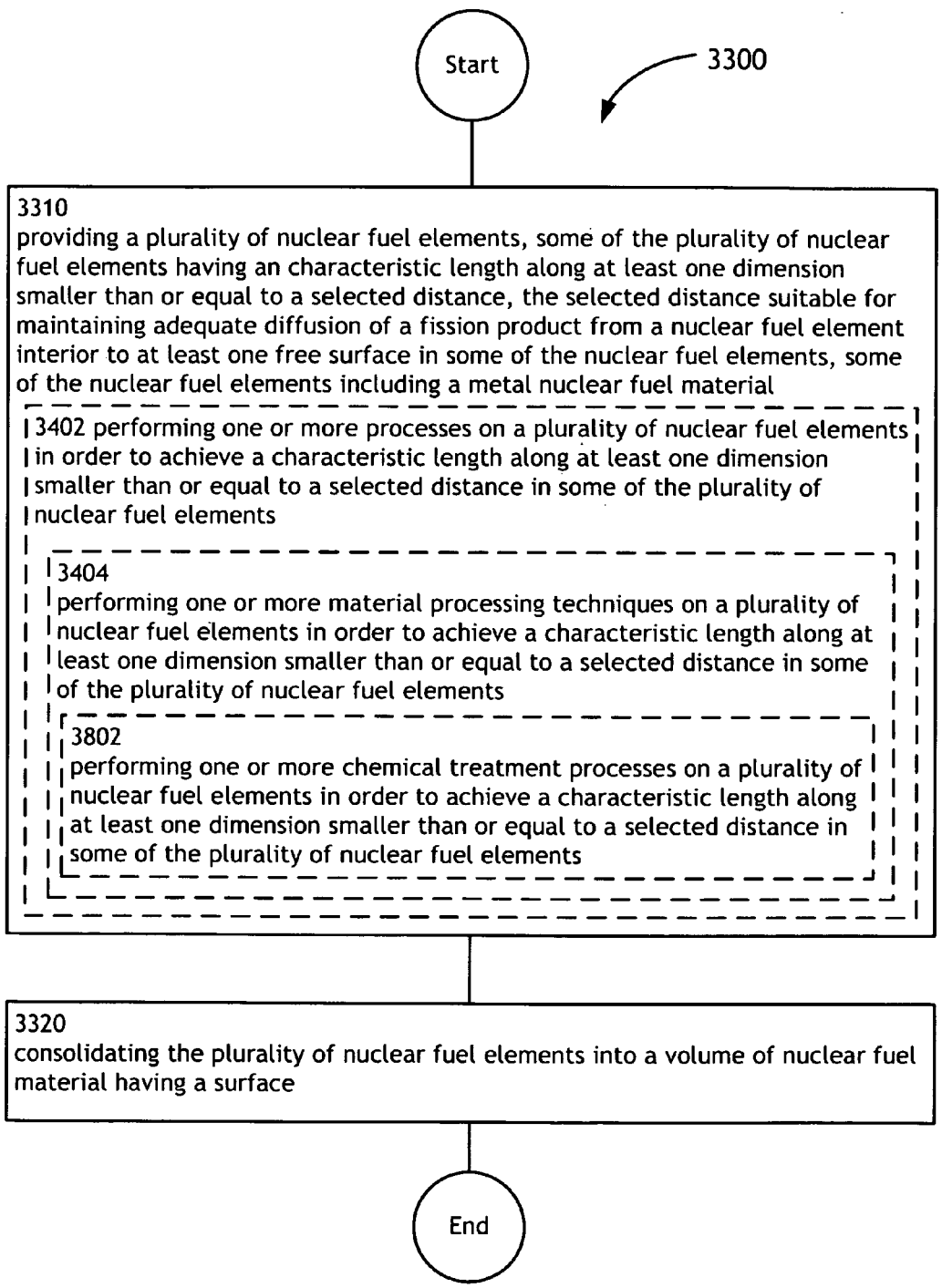

FIG. 38 illustrates alternative embodiments of the example operational flow 3300 of FIG. 33. FIG. 38 illustrates example embodiments where the operation 3310 may include at least one additional operation. Additional operations may include an operation 3802.

Further, the operation 3802 illustrates performing one or more chemical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a chemical treatment process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. For instance, an oxygen reducing treatment may be performed on the provided nuclear fuel elements 204, as described previously herein.

Figure 39:
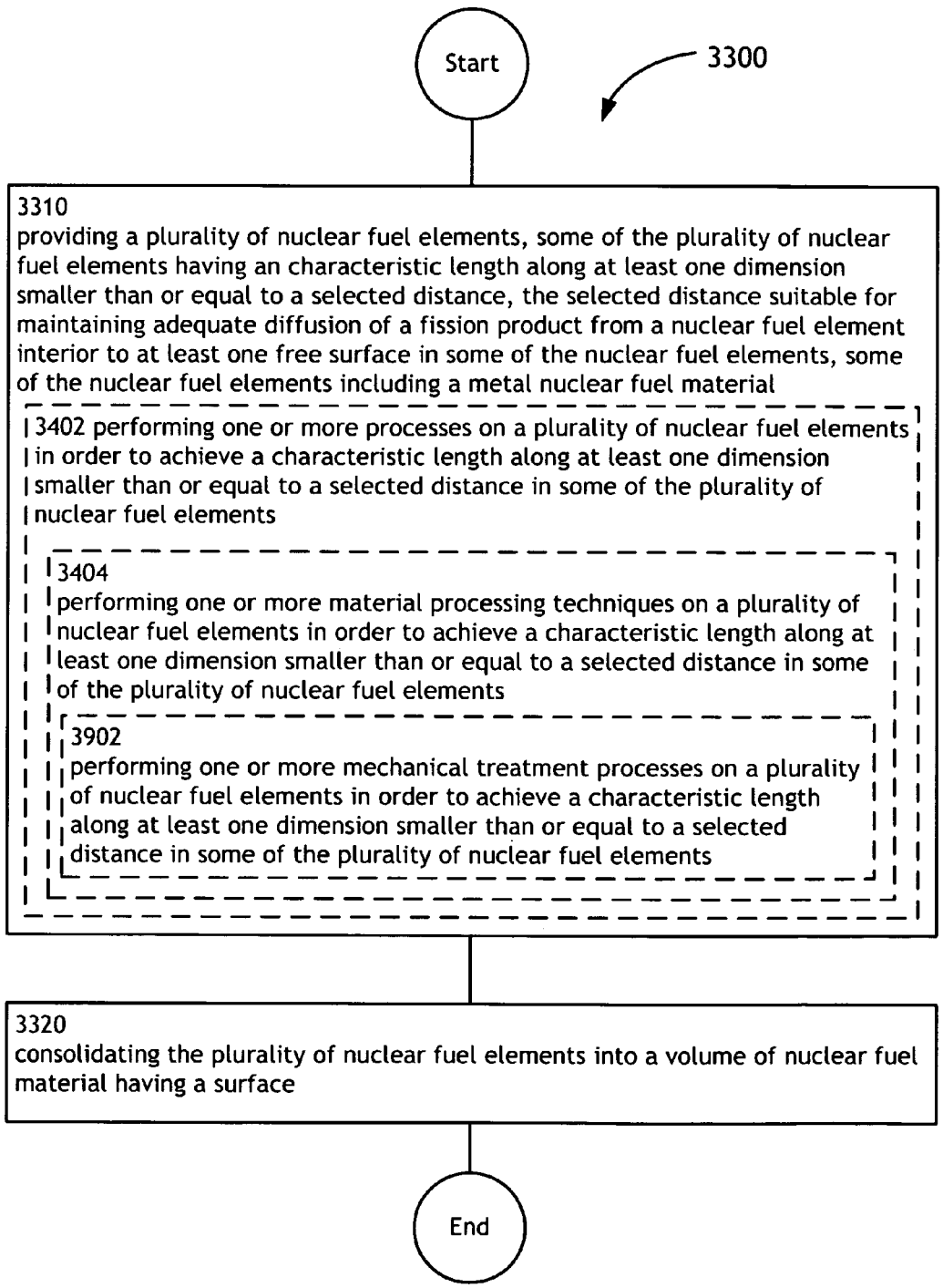

FIG. 39 illustrates alternative embodiments of the example operational flow 3300 of FIG. 33. FIG. 39 illustrates example embodiments where the operation 3310 may include at least one additional operation. Additional operations may include an operation 3902.

Further, the operation 3902 illustrates performing one or more mechanical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a mechanical process (e.g., ball milling) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

Figure 40:
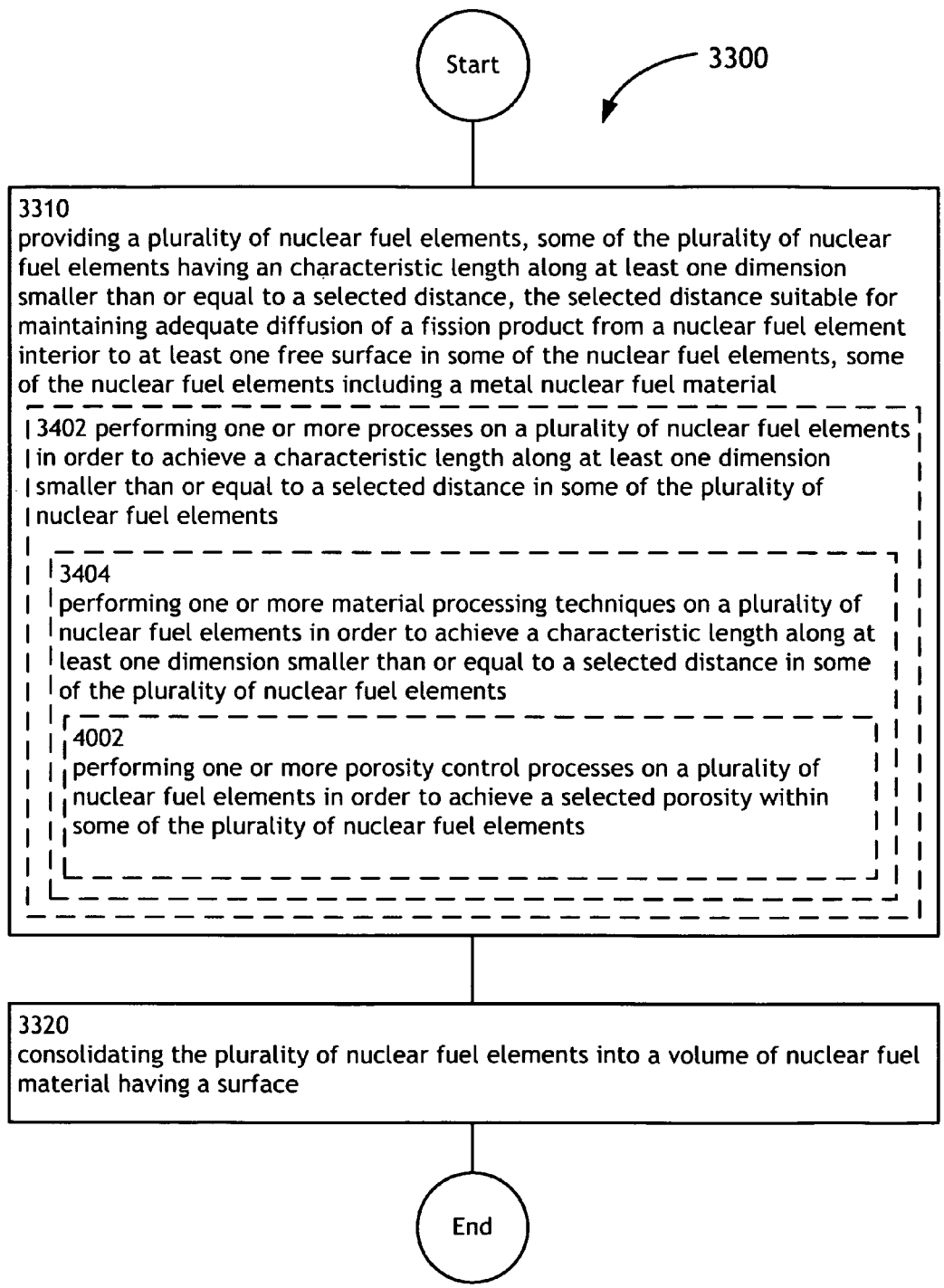

FIG. 40 illustrates alternative embodiments of the example operational flow 3300 of FIG. 33. FIG. 40 illustrates example embodiments where the operation 3310 may include at least one additional operation. Additional operations may include an operation 4002.

Further, the operation 4002 illustrates performing one or more porosity control processes on a plurality of nuclear fuel elements in order to achieve a selected porosity within some of the plurality of nuclear fuel elements. For example, as shown in FIGS. 1A through 4, a porosity control process may be performed on the provided nuclear fuel elements 204 in order to achieve a selected porosity in the nuclear fuel elements 204 the nuclear fuel elements 206. For instance, porosity of the nuclear fuel 100 may be controlled via a heat treatment process (e.g., an annealing process or melting process) or a chemical treatment process.

Figure 41:
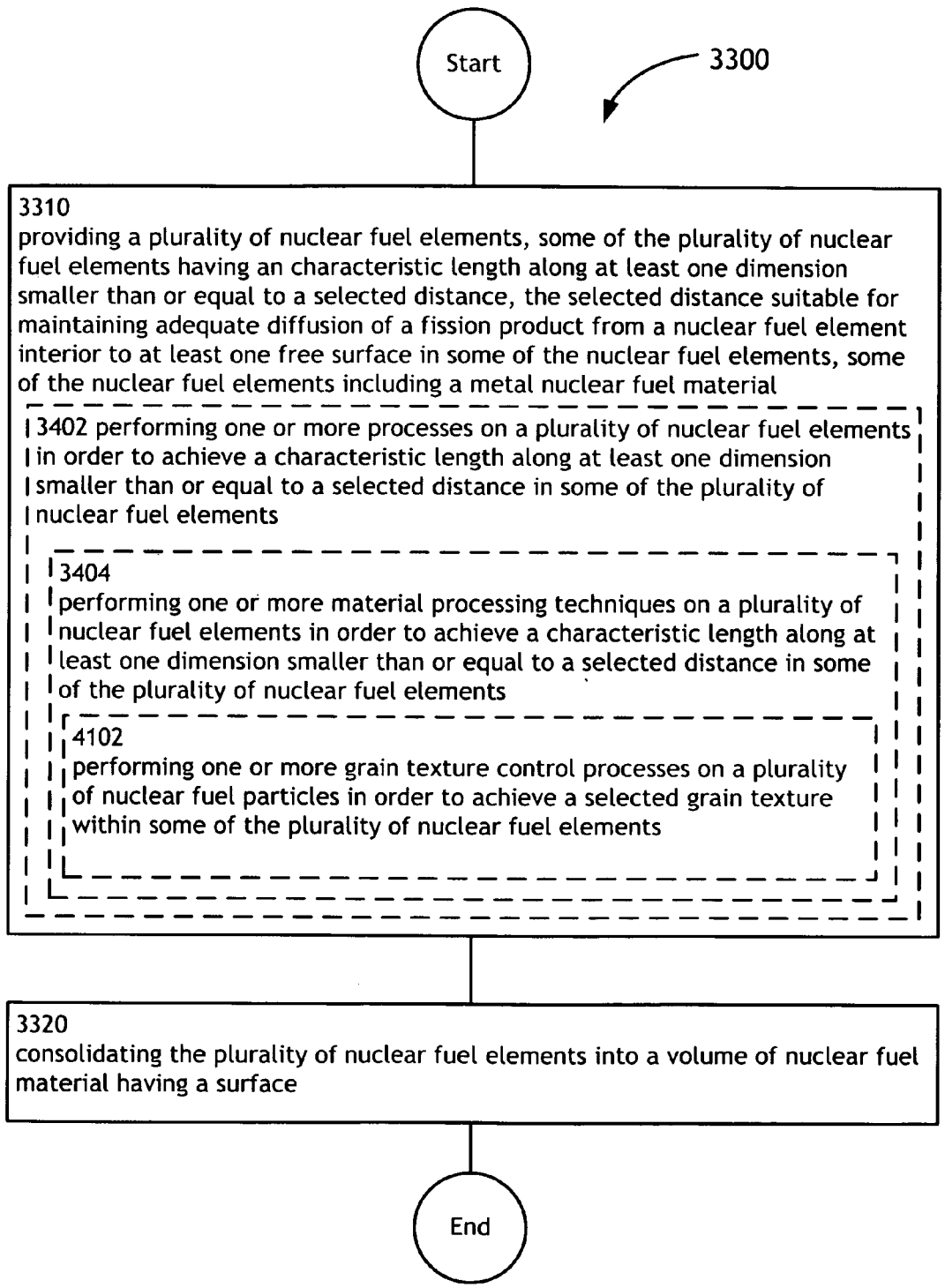

FIG. 41 illustrates alternative embodiments of the example operational flow 3300 of FIG. 33. FIG. 41 illustrates example embodiments where the operation 3310 may include at least one additional operation. Additional operations may include an operation 4102.

Further, the operation 4102 illustrates performing one or more grain texture control processes on a plurality of nuclear fuel particles in order to achieve a selected grain texture within some of the plurality of nuclear fuel elements. For example, as shown in FIGS. 1A through 4, a grain texture control process may be performed on the provided nuclear fuel elements 204 in order to achieve a selected grain texture in two or more grains of the nuclear fuel elements 204. For instance, grain textures of the grains of the nuclear fuel elements 204 may be controlled via a heat treatment process (e.g., annealing) or a chemical treatment process (e.g., doping).

Figure 42:
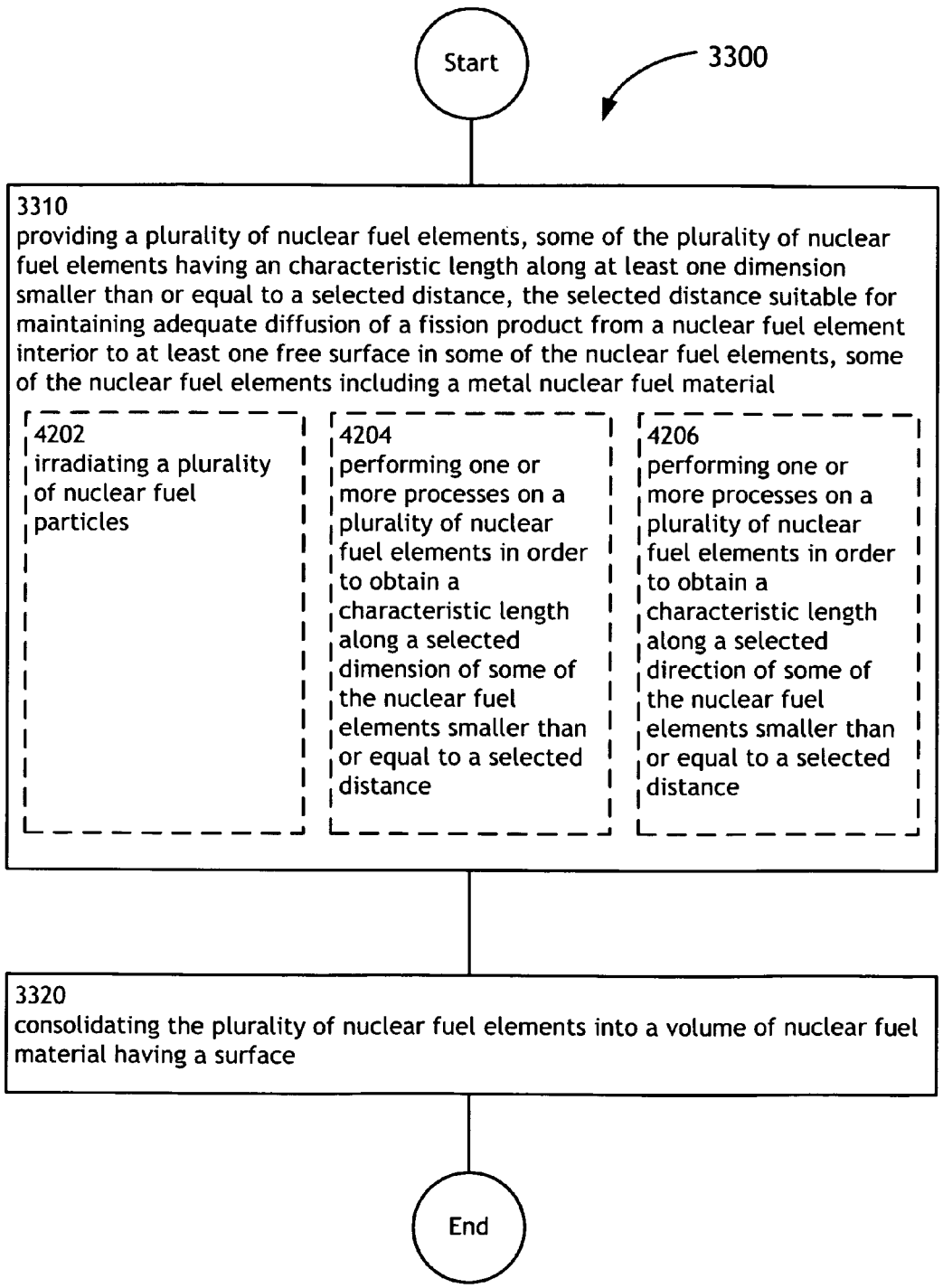

FIG. 42 illustrates alternative embodiments of the example operational flow 3300 of FIG. 33. FIG. 42 illustrates example embodiments where the operation 3310 may include at least one additional operation. Additional operations may include an operation 4202, an operation 4204, and/or an operation 4206.

The operation 4202 illustrates irradiating a plurality of nuclear fuel particles. For example, as shown in FIGS. 1A through 4, an irradiating process (e.g., exposure to neutron flux) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

The operation 4204 illustrates performing one or more processes on a plurality of nuclear fuel elements in order to obtain a characteristic length along a selected dimension of some of the nuclear fuel elements smaller than or equal to a selected distance. For example, as shown in FIG. 2D, one or more processes may be utilized in order engineer the nuclear fuel elements 204 to have a characteristic length 206 along a selected dimension of some of the nuclear fuel elements 204. For instance, in nuclear fuel elements 204 having an elongated structure, the nuclear fuel elements 204 may have a "thin" dimension that is smaller than or equal to a selected distance.

The operation 4206 illustrates performing one or more processes on a plurality of nuclear fuel elements in order to obtain a characteristic length along a selected direction of some of the nuclear fuel elements smaller than or equal to a selected distance. For example, as shown in FIG. 2E, one or more processes may be utilized in order engineer the nuclear fuel elements 204 of the nuclear fuel 200 to have a characteristic length 206 along a selected direction smaller than or equal to a selected distance. For instance, in nuclear fuel elements having an elongated structure, the nuclear fuel elements 204 may have a characteristic length 206 along a selected direction 134 within the nuclear fuel 200. For example, the nuclear fuel elements may have a selected characteristic length 206 along the radial direction within a cylindrically shaped nuclear fuel piece (e.g., fuel pellet).

Figure 43:
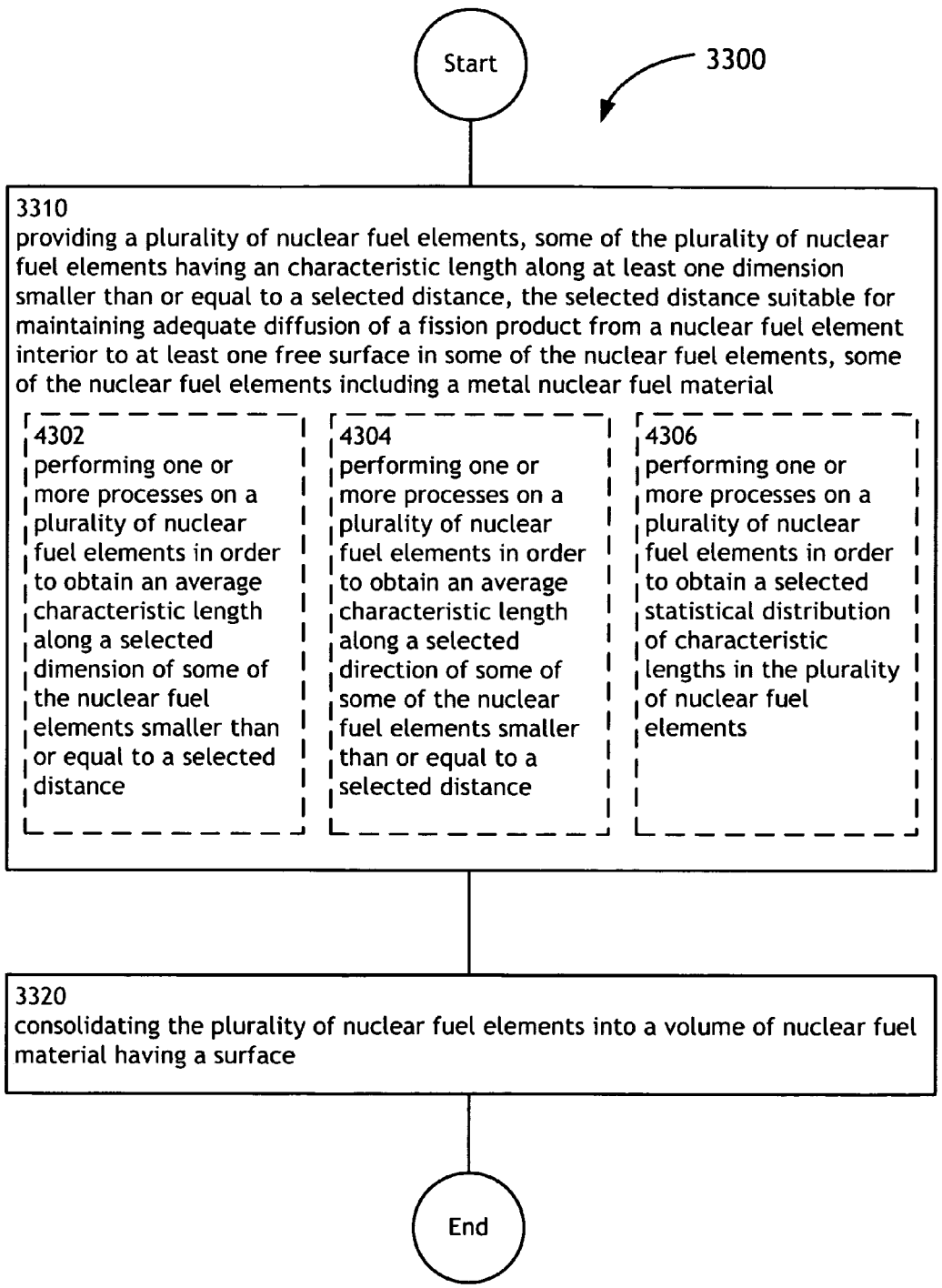

FIG. 43 illustrates alternative embodiments of the example operational flow 3300 of FIG. 33. FIG. 43 illustrates example embodiments where the operation 3310 may include at least one additional operation. Additional operations may include an operation 4302, an operation 4304, and/or an operation 4306.

The operation 4302 illustrates performing one or more processes on a plurality of nuclear fuel elements in order to obtain an average characteristic length along a selected dimension of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected dimension of some nuclear fuel elements 204.

The operation 4304 illustrates performing one or more processes on a plurality of nuclear fuel elements in order to obtain an average characteristic length along a selected direction of some of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected direction of some of the nuclear fuel elements 204 smaller than or equal to a selected distance. For instance, in nuclear fuel elements 204 having an elongated structure, the nuclear fuel elements 204 may have an average characteristic length 206 along a selected direction 134 with the nuclear fuel 200. For example, the nuclear fuel elements may have an average selected characteristic length 206 along the radial direction within a cylindrically shaped nuclear fuel piece (e.g., fuel pellet).

The operation 4306 illustrates performing one or more processes on a plurality of nuclear fuel elements in order to obtain a selected statistical distribution of characteristic lengths in the plurality of nuclear fuel elements. For example, as shown in FIGS. 1A through 4, the nuclear fuel elements 204 of the nuclear fuel 200 may have a selected statistical distribution of characteristic lengths 206. For example, the nuclear fuel elements 204 of the nuclear fuel 200 may have a element size distribution with a selected percentage of the nuclear fuel elements 204 having a size 206 below a selected distance. For instance, the nuclear fuel 200 of the present invention may have a nuclear fuel element (e.g., particle) size 206 distribution such that 65% of the nuclear fuel elements 204 have a size 206 equal to or less than 4 μm, with an average size of 2.5 μm. In another example, the nuclear fuel elements 204 of the nuclear fuel 200 may have a selected spatial distribution of characteristic lengths, within the consolidated volume of nuclear fuel 200.

Figure 44:
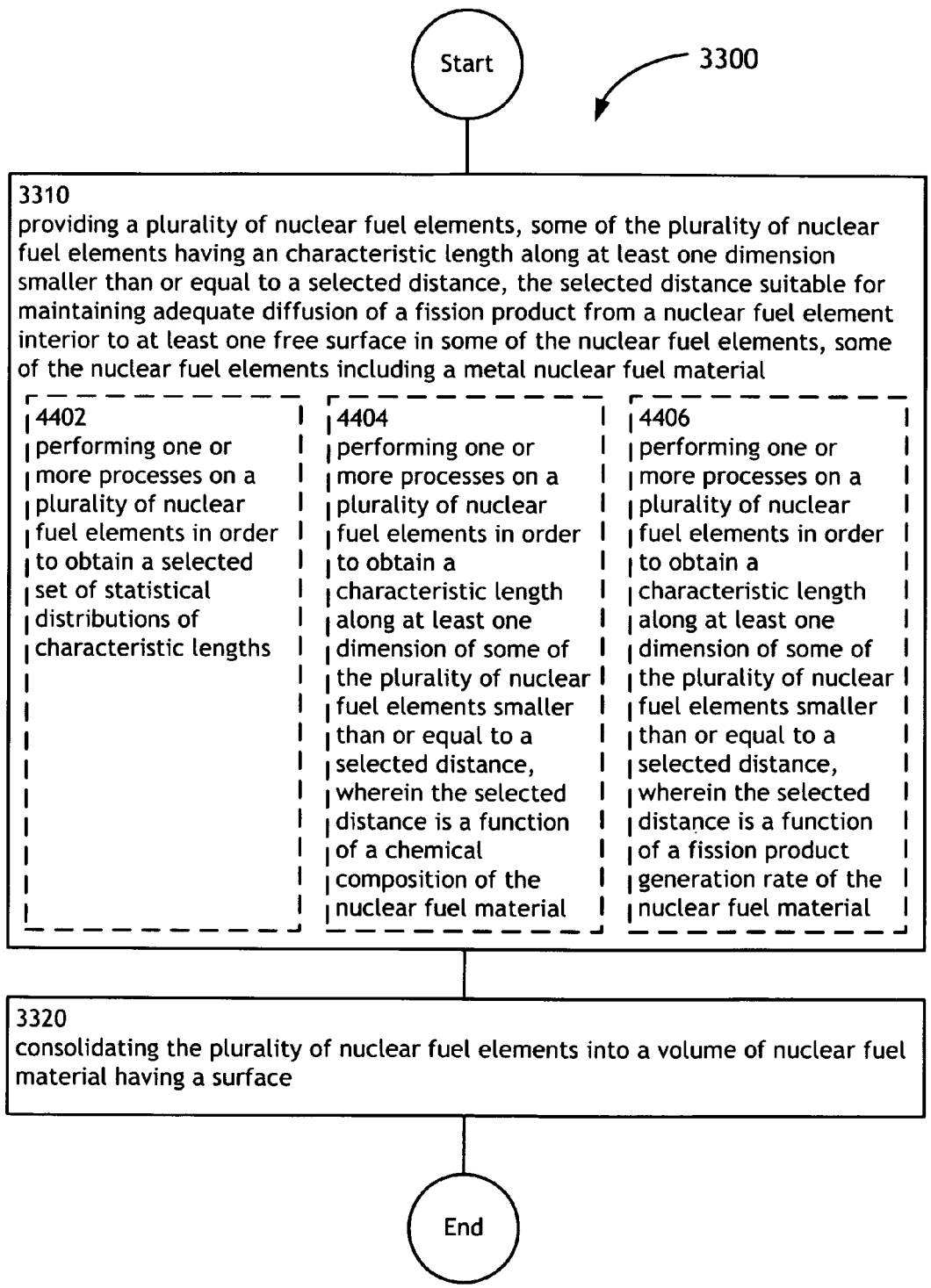

FIG. 44 illustrates alternative embodiments of the example operational flow 3300 of FIG. 33. FIG. 44 illustrates example embodiments where the operation 3310 may include at least one additional operation. Additional operations may include an operation 4402, an operation 4404, and/or an operation 4406.

The operation 4402 illustrates performing one or more processes on a plurality of nuclear fuel elements in order to obtain a selected set of statistical distributions of characteristic lengths. For example, the nuclear fuel elements 204 of the nuclear fuel 200 may have multiple statistical distributions of characteristic lengths 206. For instance, the nuclear fuel 200 of the present invention may have a nuclear fuel element size 206 distribution such that 25% of the nuclear fuel elements 204 have a size equal to or less than 10 μm, 25% of the nuclear fuel elements have a nuclear fuel element size 106 equal to or less than 5 μm, and 10% of the nuclear fuel elements are below 1 μm.

The operation 4404 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a chemical composition of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the chemical composition of the nuclear fuel 200. For instance, the critical size necessary to ensure adequate diffusion of a fission product 108 from the interiors 210 of the nuclear fuel elements 204 to the surfaces 212 of the nuclear fuel elements of the nuclear fuel 200 may depend upon the chemical composition (e.g., type of fissile material(s), types of alloying agents, relative concentration of fissile materials, or the like) of the nuclear reactor fuel 200.

The operation 4406 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a fission product generation rate of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the fission product 108 generation rate within the nuclear fuel 200. For instance, the critical size necessary to ensure adequate diffusion of a fission product 108 from interiors 210 of the nuclear fuel elements 204 to the surfaces 212 of the nuclear fuel elements 204 of the nuclear fuel 200 may depend upon the fission product 108 generation rate of the nuclear reactor fuel 200. Further, the fission product 108 generation rate (e.g., fission gas 118 generation rate) is proportional to the fission rate with the nuclear fuel 200, which in turn is proportional to the power density of the nuclear fuel 200, which in turn is dependent upon the chemical composition of the nuclear fuel 200.

Figure 45:
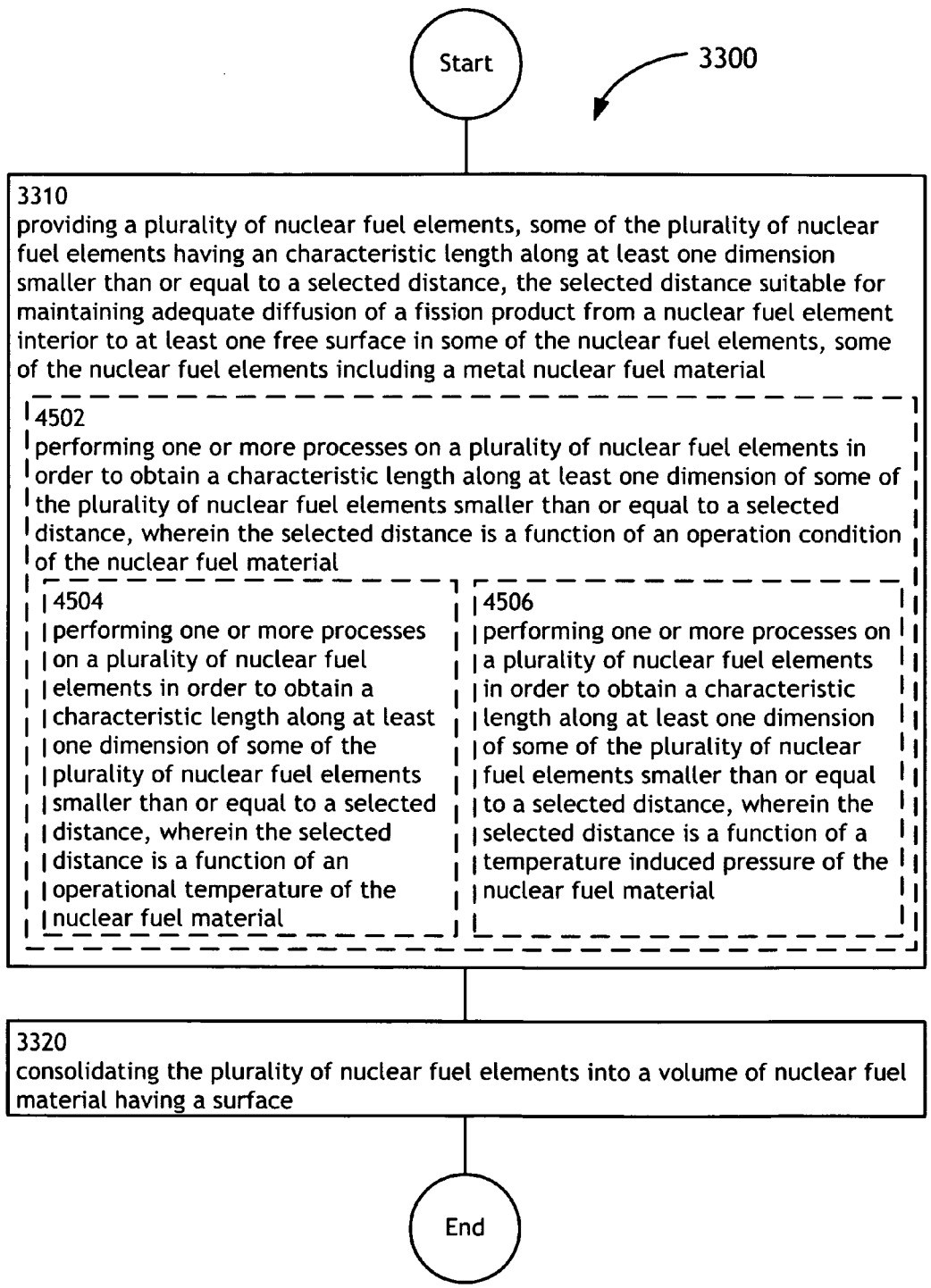

FIG. 45 illustrates alternative embodiments of the example operational flow 3300 of FIG. 33. FIG. 45 illustrates example embodiments where the operation 3310 may include at least one additional operation. Additional operations may include an operation 4502, an operation 4504, and/or an operation 4506.

The operation 4502 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operation condition of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of an operation condition of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend upon an operational condition of the nuclear fuel 200.

Further, the operation 4504 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operational temperature of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of an operation temperature of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the operation temperature of the nuclear fuel 200.

Further, the operation 4506 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a temperature induced pressure of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel smaller than a selected distance, which is a function of a temperature induced pressure of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the temperature induced pressure within the nuclear reactor fuel 100.

Figure 46:
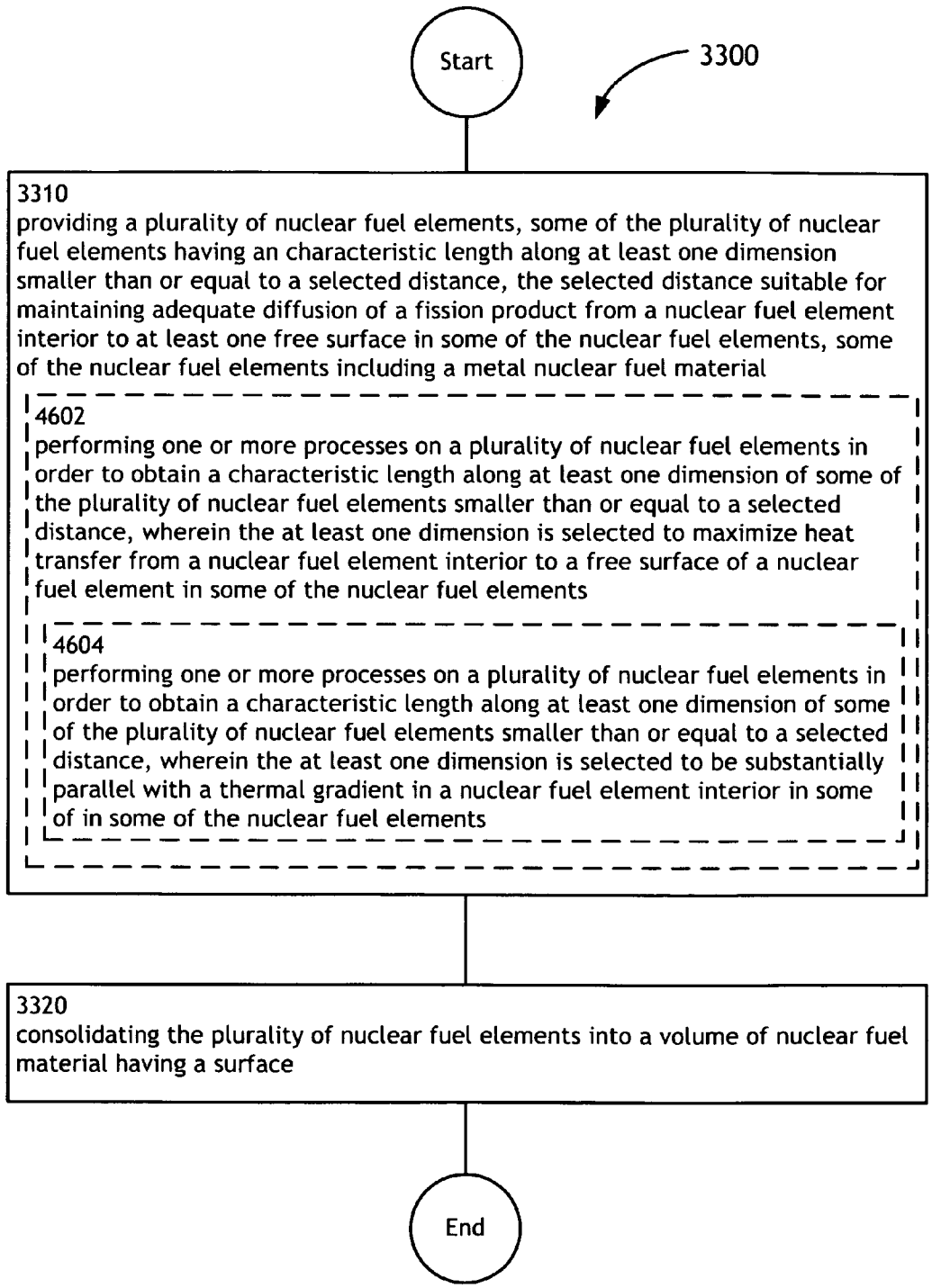

FIG. 46 illustrates alternative embodiments of the example operational flow 3300 of FIG. 33. FIG. 46 illustrates example embodiments where the operation 3310 may include at least one additional operation. Additional operations may include an operation 4602, and/or an operation 4604.

The operation 4602 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to maximize heat transfer from a nuclear fuel element interior to a free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the dimension of the nuclear fuel elements is selected in order to maximize heat transfer from the interiors 210 of the nuclear fuel elements 204 to the surfaces 212 of the nuclear fuel elements 204 of the nuclear fuel 200. For instance, a dimension of the nuclear fuel elements 204 to be minimized may be selected in order maximize (or at least improve) heat transfer from the interiors 210 of the nuclear fuel elements 204 to the surfaces 212 of the nuclear fuel elements 204.

Further, the operation 4604 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to be substantially parallel with a thermal gradient in a nuclear fuel element interior in some of in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the at least one dimension is selected to be substantially parallel with a thermal gradient in a grain interior in some of the nuclear fuel elements. For instance, in order to maximize diffusion of a fission gas 118 from the interiors 210 of the nuclear fuel elements 204 to the surfaces 212 of the nuclear fuel elements 204 a "thin" dimension of the nuclear fuel elements 204 may be arranged so as to align substantially perpendicular to the direction of a thermal gradient within the nuclear reactor fuel 100.

Figure 47:
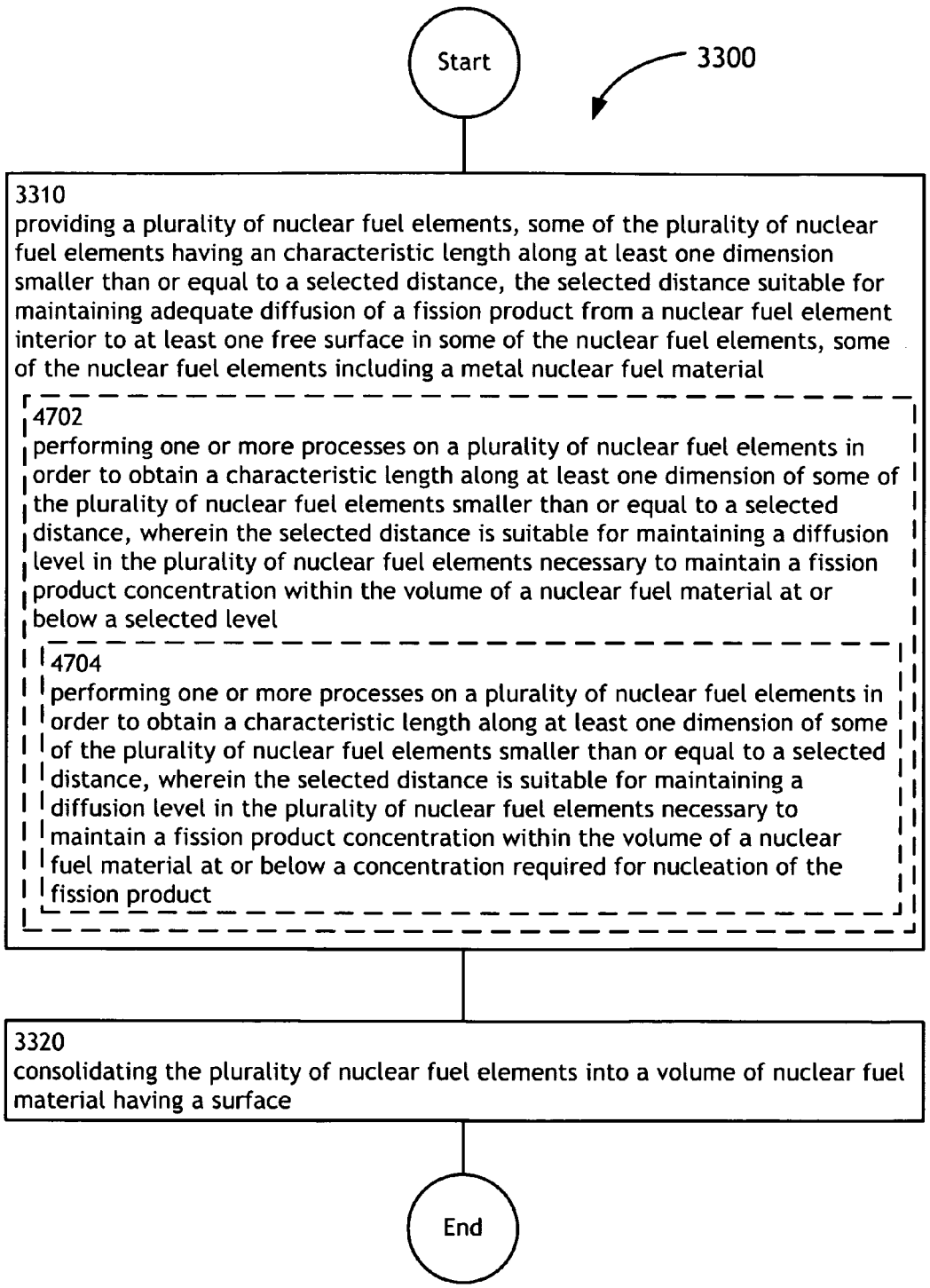

FIG. 47 illustrates alternative embodiments of the example operational flow 3300 of FIG. 33. FIG. 47 illustrates example embodiments where the operation 3310 may include at least one additional operation. Additional operations may include an operation 4702, and/or an operation 4704.

The operation 4702 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a selected level. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, which is selected in order to maintain a selected fission product 108 (e.g., fission gas 118) concentration within the volume 102 of the nuclear fuel 100 at or below a selected level. For instance, the rate of diffusion from the interiors 210 of the nuclear fuel elements 204 to the surfaces 212 of the nuclear fuel elements 204 in the nuclear fuel elements 204 may be inversely related to the average nuclear fuel element size 206 within the nuclear fuel 200. In this sense, as the nuclear fuel element sizes 206 of the nuclear fuel elements 204 decrease, the fission gas 118 diffusion rate from the interiors 210 of the nuclear fuel elements 204 to the surfaces 212 of the nuclear fuel elements 204 may increase. Therefore, the concentration of a fission gas 118 within the nuclear fuel elements 204 may be adjusted to fall within acceptable concentration levels by engineering the nuclear fuel element sizes 206 of the nuclear fuel elements 204 of the nuclear fuel 200.

Further, the operation 4704 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a concentration required for nucleation of the fission product. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain a selected fission product 108 concentration below a concentration level required for nucleation of the fission product 108 within an interior 210 of a nuclear fuel element 204. For instance, the concentration of a fission gas 118 within the nuclear fuel elements 204 may be adjusted to fall below the concentration level required for fission gas nucleation within the interiors 210 of the nuclear fuel elements 204 by engineering the nuclear fuel element sizes 206 of the nuclear fuel elements 204 of the nuclear fuel 200.

Figure 48:
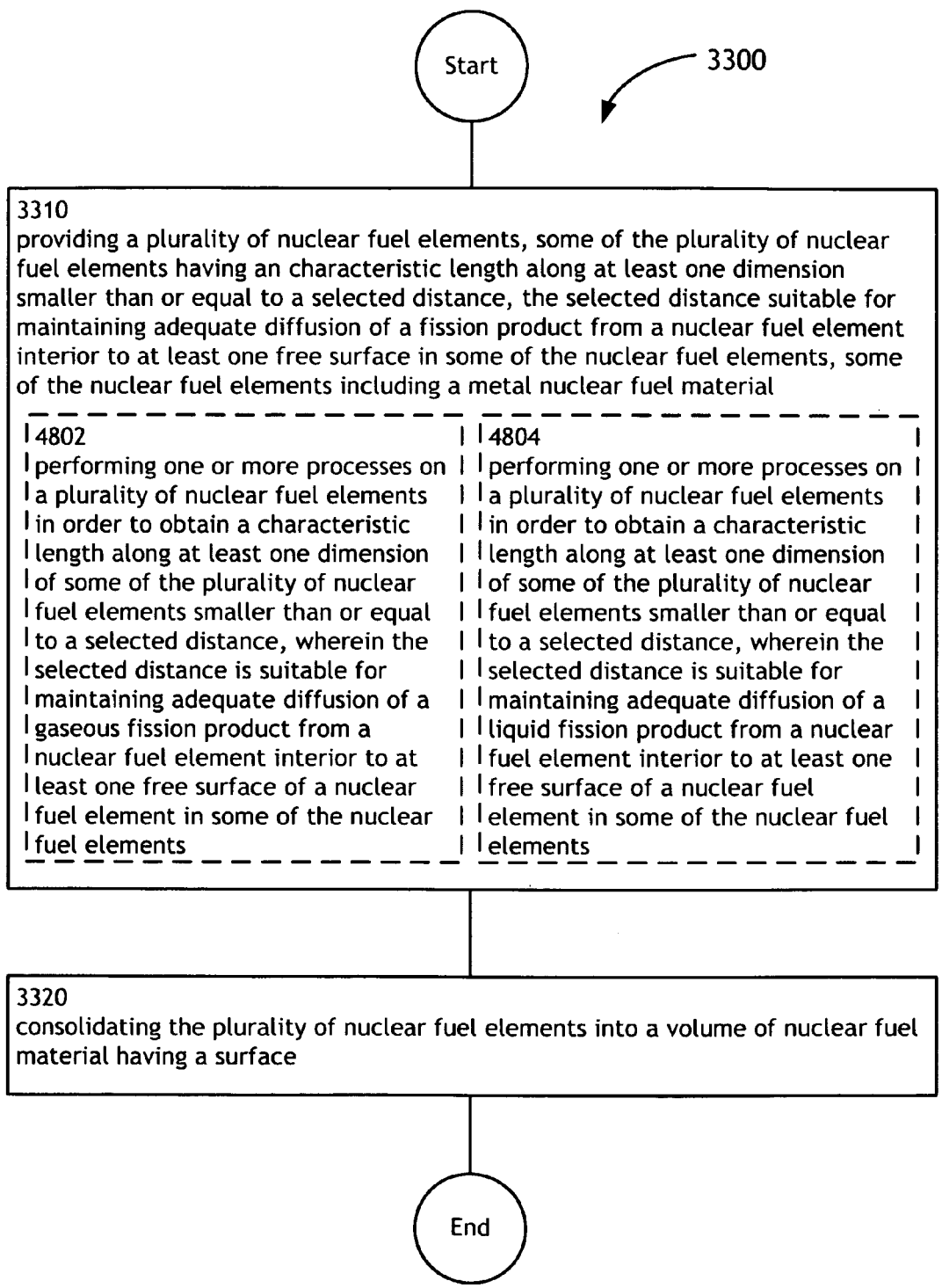

FIG. 48 illustrates alternative embodiments of the example operational flow 3300 of FIG. 33. FIG. 48 illustrates example embodiments where the operation 3310 may include at least one additional operation. Additional operations may include an operation 4802, and/or an operation 4804.

The operation 4802 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a gaseous fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a gaseous fission product (e.g., krypton or xenon) from the interiors 210 of the nuclear fuel elements 204 to the surfaces 212 of the nuclear fuel elements 204.

The operation 4804 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a liquid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a liquid fission product (e.g., a liquid metal) from the interiors 210 of the nuclear fuel elements 204 to the surfaces 212 of the nuclear fuel elements 204.

Figure 49:
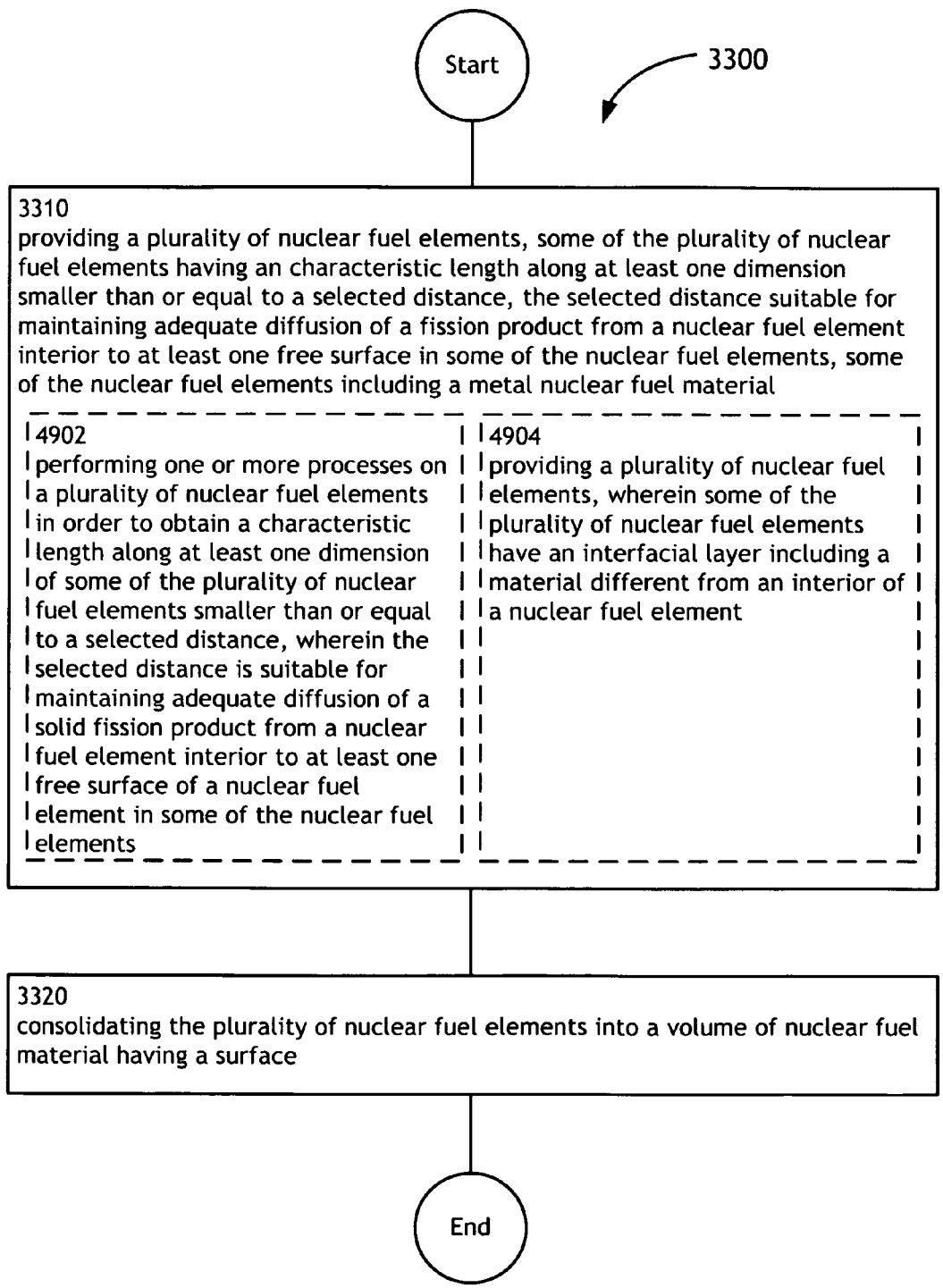

FIG. 49 illustrates alternative embodiments of the example operational flow 3300 of FIG. 33. FIG. 49 illustrates example embodiments where the operation 3310 may include at least one additional operation. Additional operations may include an operation 4902, and/or an operation 4904.

The operation 4902 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a solid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a solid fission product (e.g., tellurium or cesium) from the interiors 210 of the nuclear fuel elements 204 to the surfaces 212 of the nuclear fuel elements 204.

The operation 4904 illustrates providing a plurality of nuclear fuel elements, wherein some of the plurality of nuclear fuel elements have an interfacial layer including a material different from an interior of a nuclear fuel element. For example, as shown in FIG. 2G, one or more of the nuclear fuel elements 204 of the nuclear fuel 200 may include an interfacial layer of a material different from the material within the interiors 210 of the nuclear fuel elements 204. For instance, the nuclear fuel elements 204 may include an oxide-based or carbide-based interfacial layer.

Figure 50:
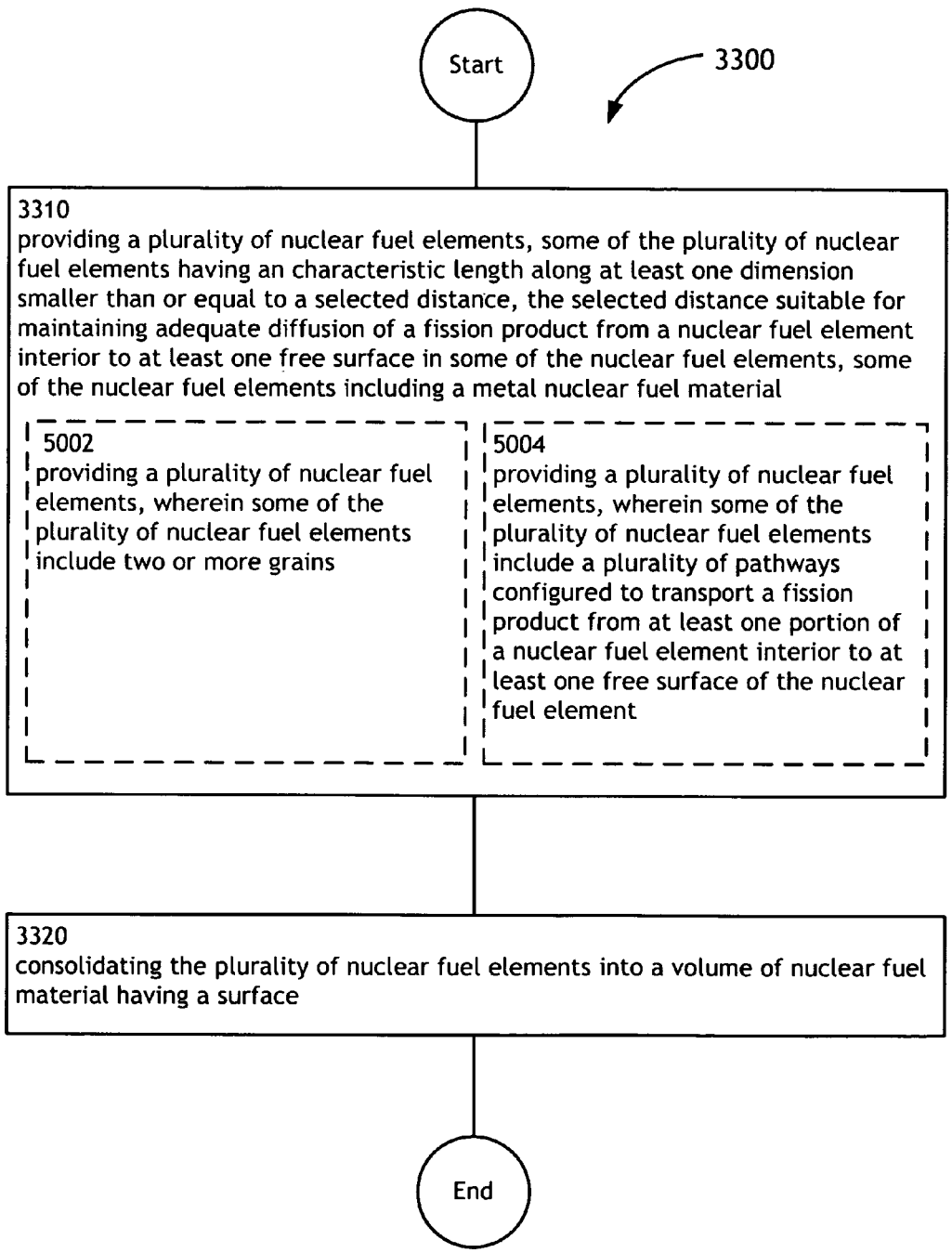

FIG. 50 illustrates alternative embodiments of the example operational flow 3300 of FIG. 33. FIG. 50 illustrates example embodiments where the operation 3310 may include at least one additional operation. Additional operations may include an operation 5002, and/or an operation 5004.

The operation 5002 illustrates providing a plurality of nuclear fuel elements, wherein some of the plurality of nuclear fuel elements include two or more grains. For example, as shown in FIG. 2F, one or more of the nuclear fuel elements 204 of the nuclear fuel 200 may include two or more grains.

The operation 5004 illustrates providing a plurality of nuclear fuel elements, wherein some of the plurality of nuclear fuel elements include a plurality of pathways configured to transport a fission product from at least one portion of a nuclear fuel element interior to at least one free surface of the nuclear fuel element. For example, as shown in FIG. 2F, one or more of the nuclear fuel elements 204 of the nuclear fuel 200 may include one or more internal pathways suitable for transporting fission gas 118 from the nuclear fuel element interior 210 to the nuclear fuel element surface 212. Moreover, as previously described herein, the internal pathways 110 may be defined by a grain-boundary 112 between adjacent grains within a common nuclear fuel element 204.

Figure 51:
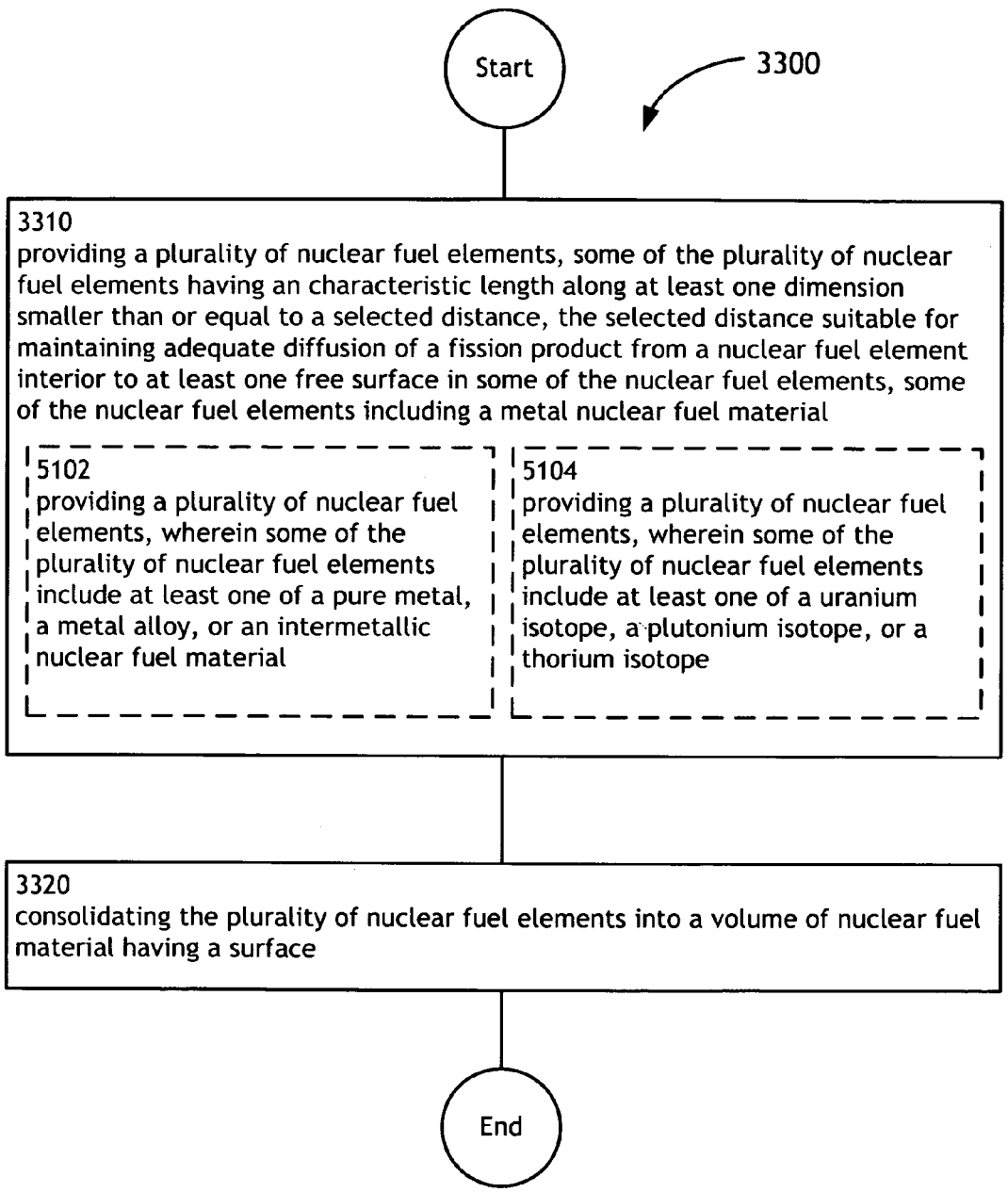

FIG. 51 illustrates alternative embodiments of the example operational flow 3300 of FIG. 33. FIG. 51 illustrates example embodiments where the operation 3310 may include at least one additional operation. Additional operations may include an operation 5102, and/or an operation 5104.

The operation 5102 illustrates providing a plurality of nuclear fuel elements, wherein some of the plurality of nuclear fuel elements include at least one of a pure metal, a metal alloy, or an intermetallic nuclear fuel material. For example, as shown in FIGS. 1A through 4, the provided nuclear fuel elements 204 may include a metal based nuclear fuel material. For instance, the plurality of nuclear fuel elements 204 of the nuclear fuel 200 may include, but is not limited to a metal (e.g., uranium, plutonium, or thorium) nuclear fuel material, a metal alloy fuel material (e.g., uranium zirconium, uranium-plutonium-zirconium, or uranium zirconium hydride), or an intermetallic (e.g., $UFe_2$ or $UNi_2$) based nuclear fuel material.

The operation 5104 illustrates providing a plurality of nuclear fuel elements, wherein some of the plurality of nuclear fuel elements include at least one of a uranium isotope, a plutonium isotope, or a thorium isotope. For example, as shown in FIGS. 1A through 4, the provided nuclear fuel elements 204 may include a fissile nuclear material including, but not limited to, uranium-235 or plutonium-239. By way of another example, the provided nuclear fuel elements 204 may include a non-fissile nuclear material including, but not limited to, thorium-232. While thorium-232 is not by itself fissile, it may be utilized to breed uranium-233, which is fissile in nature.

Figure 52:
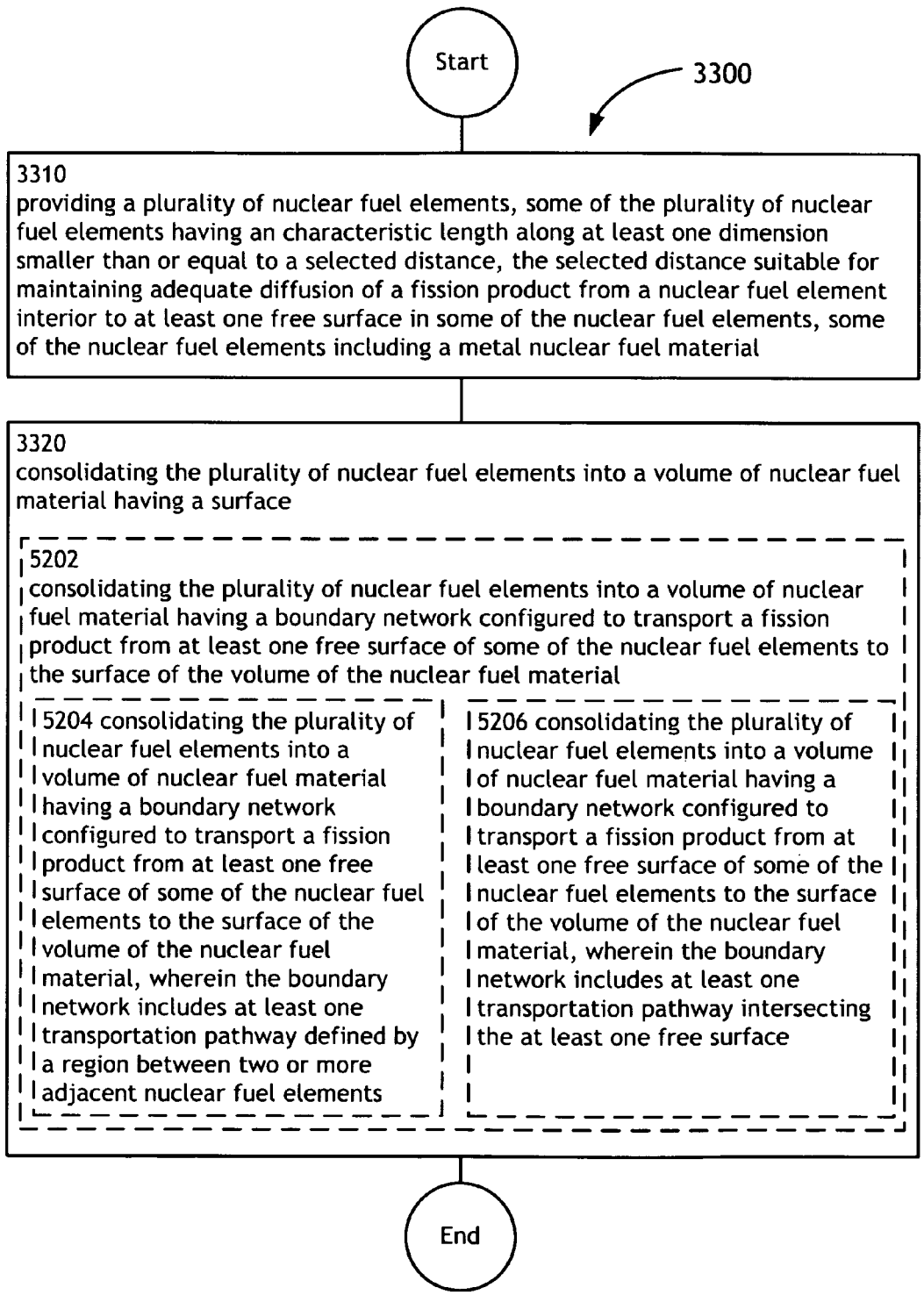

FIG. 52 illustrates alternative embodiments of the example operational flow 3300 of FIG. 33. FIG. 52 illustrates example embodiments where the operation 3320 may include at least one additional operation. Additional operations may include an operation 5202, an operation 5204, and/or an operation 5206.

The operation 5202 illustrates consolidating the plurality of nuclear fuel elements into a volume of nuclear fuel material having a boundary network configured to transport a fission product from at least one free surface of some of the nuclear fuel elements to the surface of the volume of the nuclear fuel material. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 configured to transport a fission product 118 from the surfaces 212 of the nuclear fuel elements 204 to the geometric surface 201 of the nuclear fuel 200.

Further, the operation 5204 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes at least one transportation pathway defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216.

Further, the operation 5206 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes at least one transportation pathway intersecting the at least one free surface. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216 intersecting a surface 212 of one or more nuclear fuel elements 204. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216 intersecting a surface 212 of one or more nuclear fuel elements 204.

Figure 53:
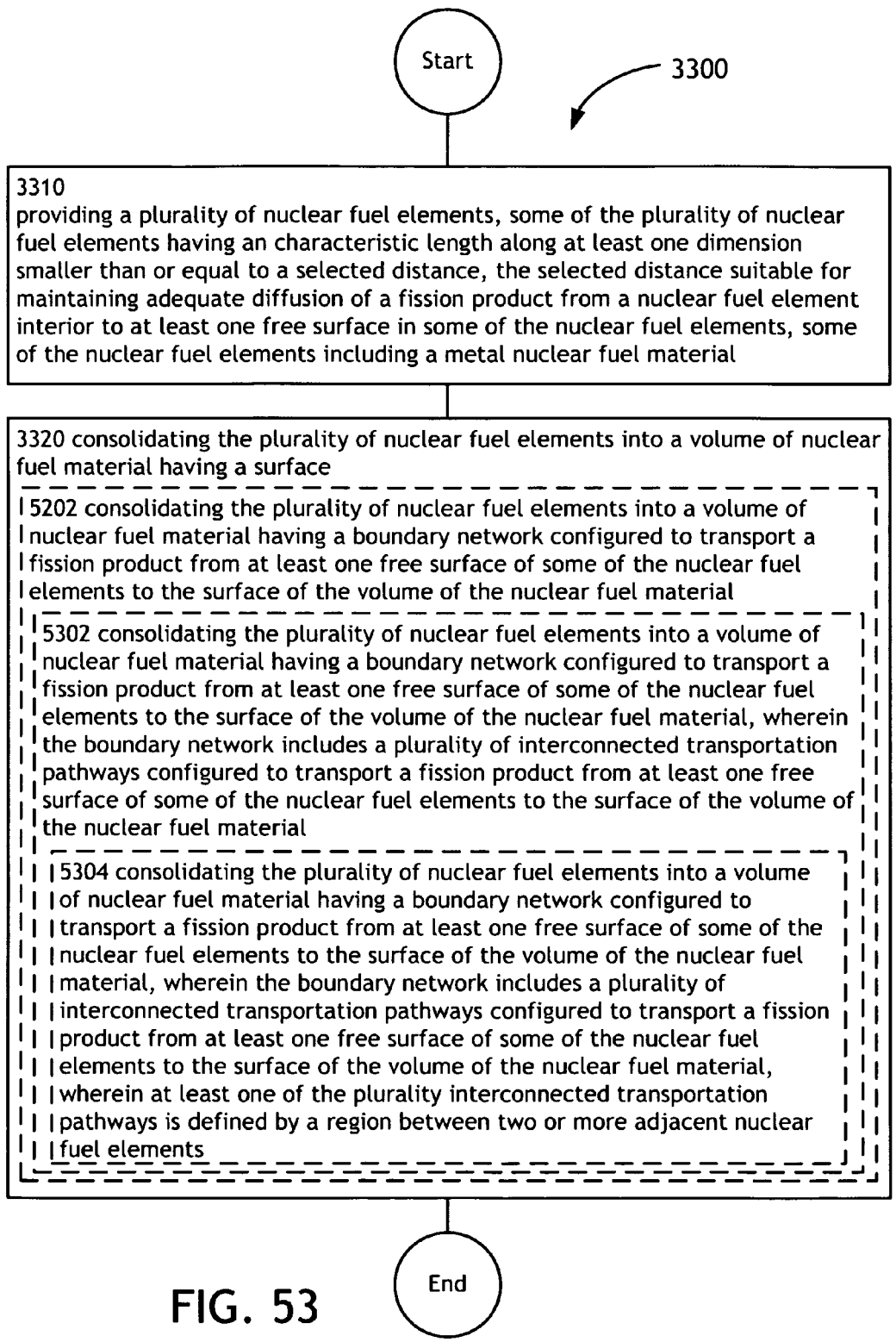

FIG. 53 illustrates alternative embodiments of the example operational flow 3300 of FIG. 33. FIG. 53 illustrates example embodiments where the operation 3320 may include at least one additional operation. Additional operations may include an operation 5302, and/or an operation 5304.

Further, the operation 5302 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 plurality of interconnected transportation pathways 216 configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 configured to transport a fission product 118 from the surfaces 212 of the nuclear fuel elements 204 to the geometric surface 201 of the nuclear fuel 200.

Further, the operation 5304 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material, wherein at least one of the plurality interconnected transportation pathways are defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by a region between two or more adjacent nuclear fuel elements. 204 and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 54:
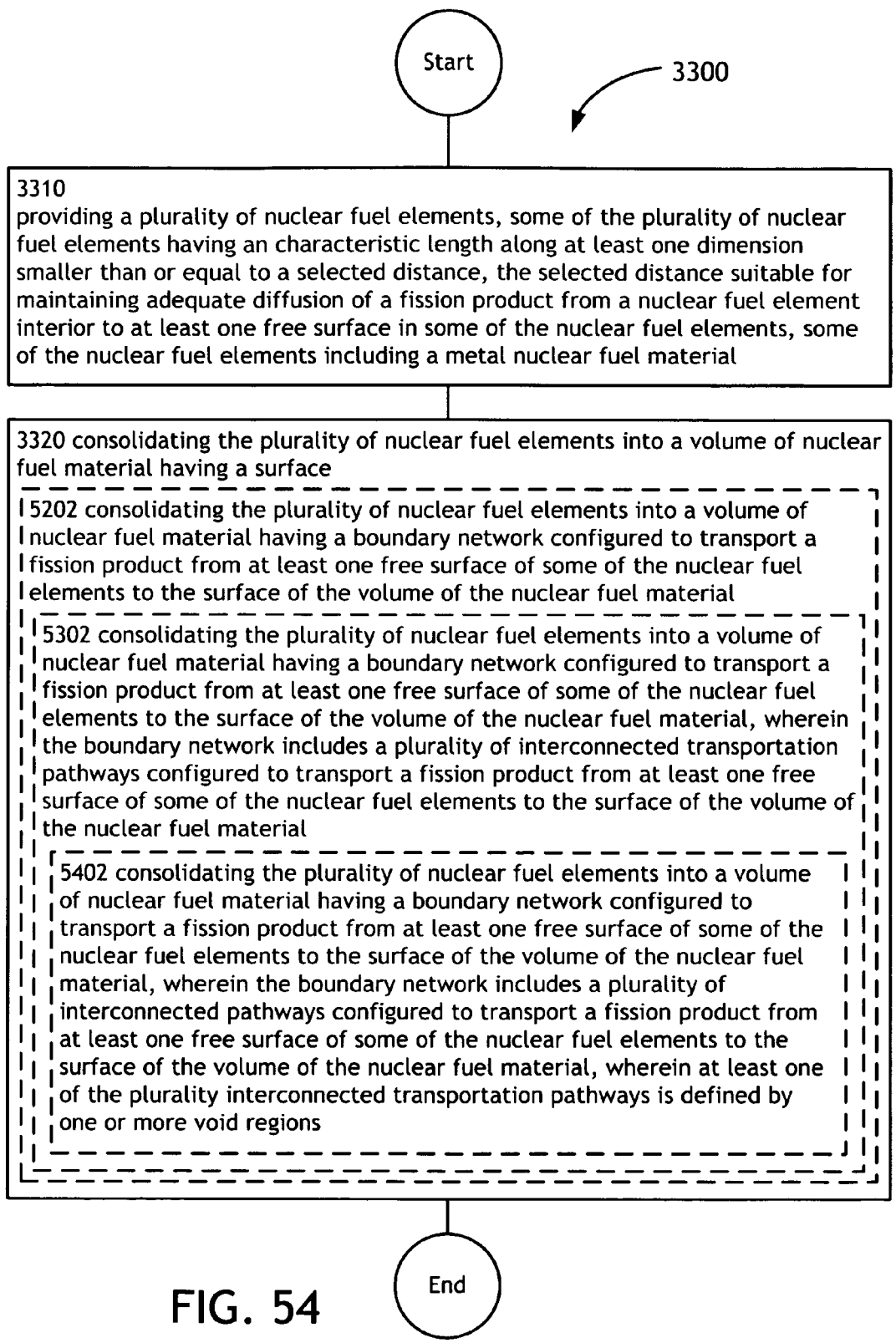

FIG. 54 illustrates alternative embodiments of the example operational flow 3300 of FIG. 33. FIG. 54 illustrates example embodiments where the operation 3320 may include at least one additional operation. Additional operations may include an operation 5402. Further, the operation 5402 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected pathways configured to transport a fission product from at least one free surface of some of the nuclear fuel elements to the surface of the volume of the nuclear fuel material, wherein at least one of the plurality interconnected transportation pathways is defined by one or more void regions. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by one or more void regions and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 55:
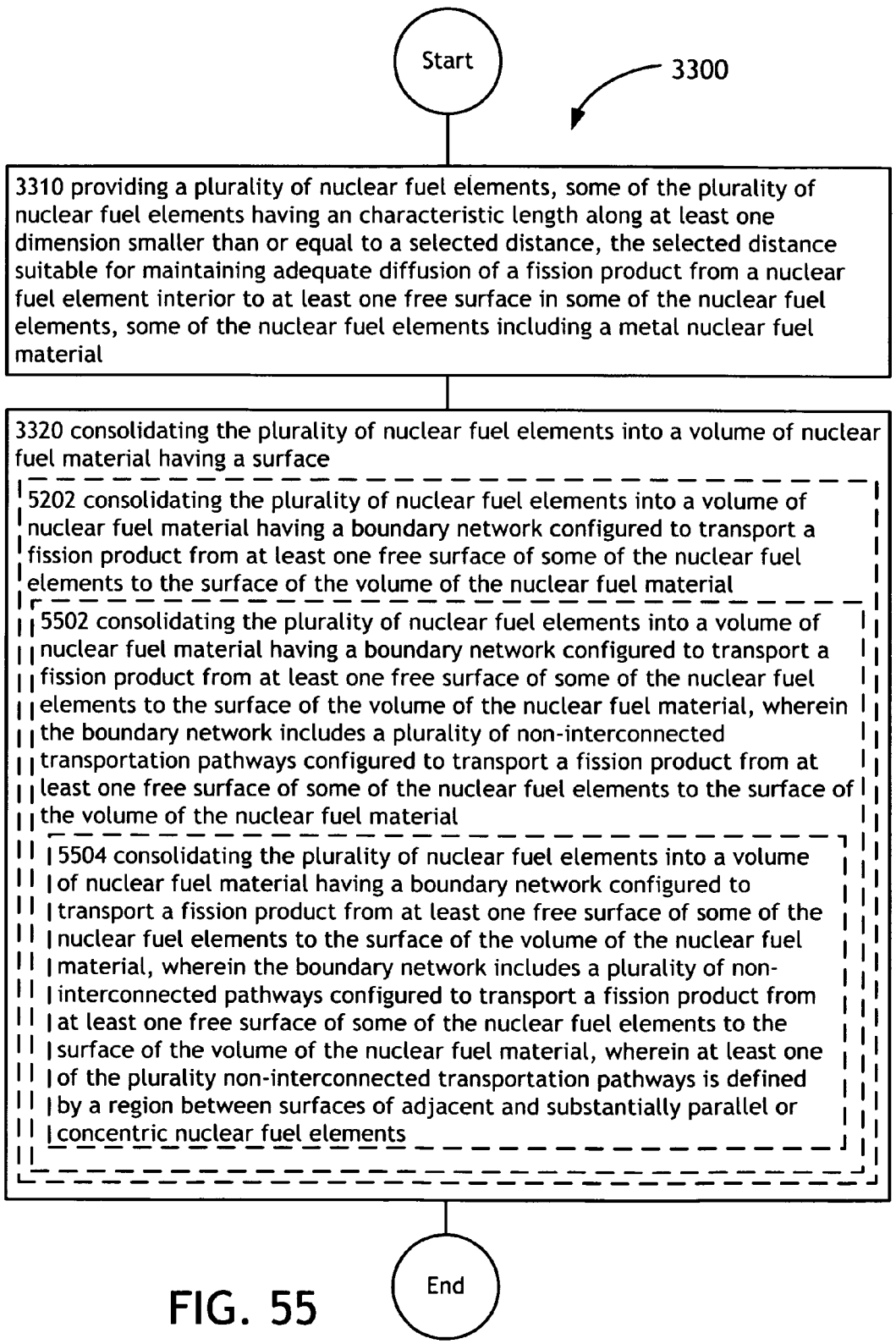

FIG. 55 illustrates alternative embodiments of the example operational flow 3300 of FIG. 33. FIG. 55 illustrates example embodiments where the operation 3320 may include at least one additional operation. Additional operations may include an operation 5502, and/or an operation 5504.

Further, the operation 5502 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of non-interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 configured to transport a fission product 118 from the surfaces 212 of the nuclear fuel elements 204 to the geometric surface 201 of the nuclear fuel 200.

Further, the operation 5504 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of non-interconnected pathways configured to transport a fission product from at least one free surface of some of the nuclear fuel elements to the surface of the volume of the nuclear fuel material, wherein at least one of the plurality non-interconnected transportation pathways is defined by a region between surfaces of adjacent and substantially parallel or concentric nuclear fuel elements. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 defined by a region between surfaces of adjacent and substantially parallel or concentric nuclear fuel elements 204.

Figure 56:
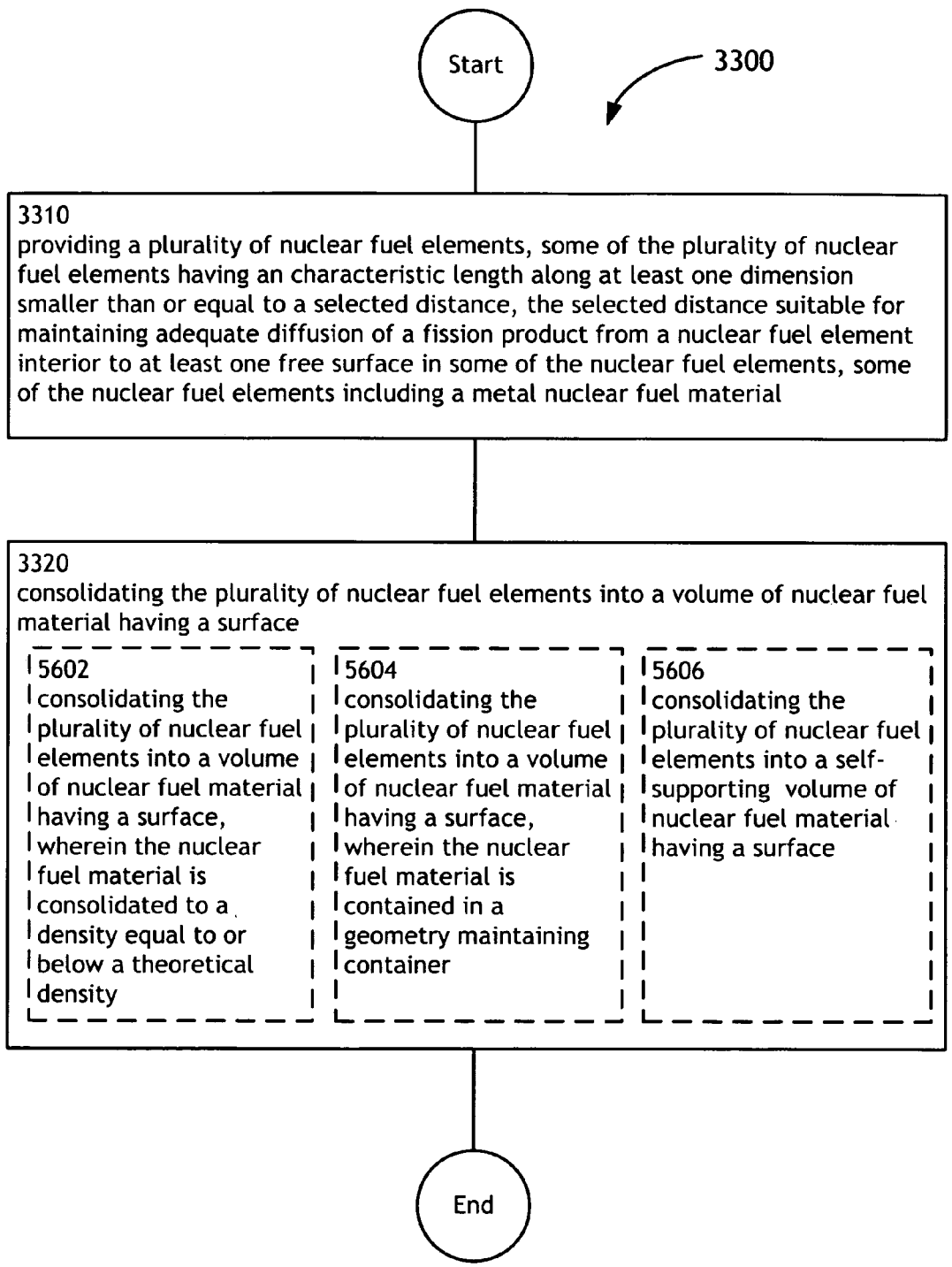

FIG. 56 illustrates alternative embodiments of the example operational flow 3300 of FIG. 33. FIG. 56 illustrates example embodiments where the operation 3320 may include at least one additional operation. Additional operations may include an operation 5602, an operation 5604, and/or an operation 5606.

The operation 5602 illustrates consolidating the plurality of nuclear fuel elements into a volume of nuclear fuel material having a surface, wherein the nuclear fuel material is consolidated to a density equal to or below a theoretical density. For example, as shown in FIGS. 1A through 4, the consolidation process (e.g., compacting, sintering, or the like) used to create the volume 202 of consolidated nuclear fuel 200 may produce a nuclear fuel piece having a selected density, wherein the selected density is less than the theoretical density. For instance, the nuclear fuel 200 may be consolidated to a density of 70% of the theoretical density.

The operation 5604 illustrates consolidating the plurality of nuclear fuel elements into a volume of nuclear fuel material having a surface, wherein the nuclear fuel material is contained in a geometry maintaining container. For example, as shown in FIGS. 1A through 4, the plurality of nuclear fuel elements 204 may be compacted into a fuel containing vessel or container suitable for maintaining the shape of the nuclear fuel piece.

The operation 5606 illustrates consolidating the plurality of nuclear fuel elements into a self-supporting volume of nuclear fuel material having a surface. For example, as shown in FIGS. 1A through 4, a metal oxide powder, such as uranium-dioxide, may be formed into a self-supporting geometry via a compacting and sintering.

Figure 57:
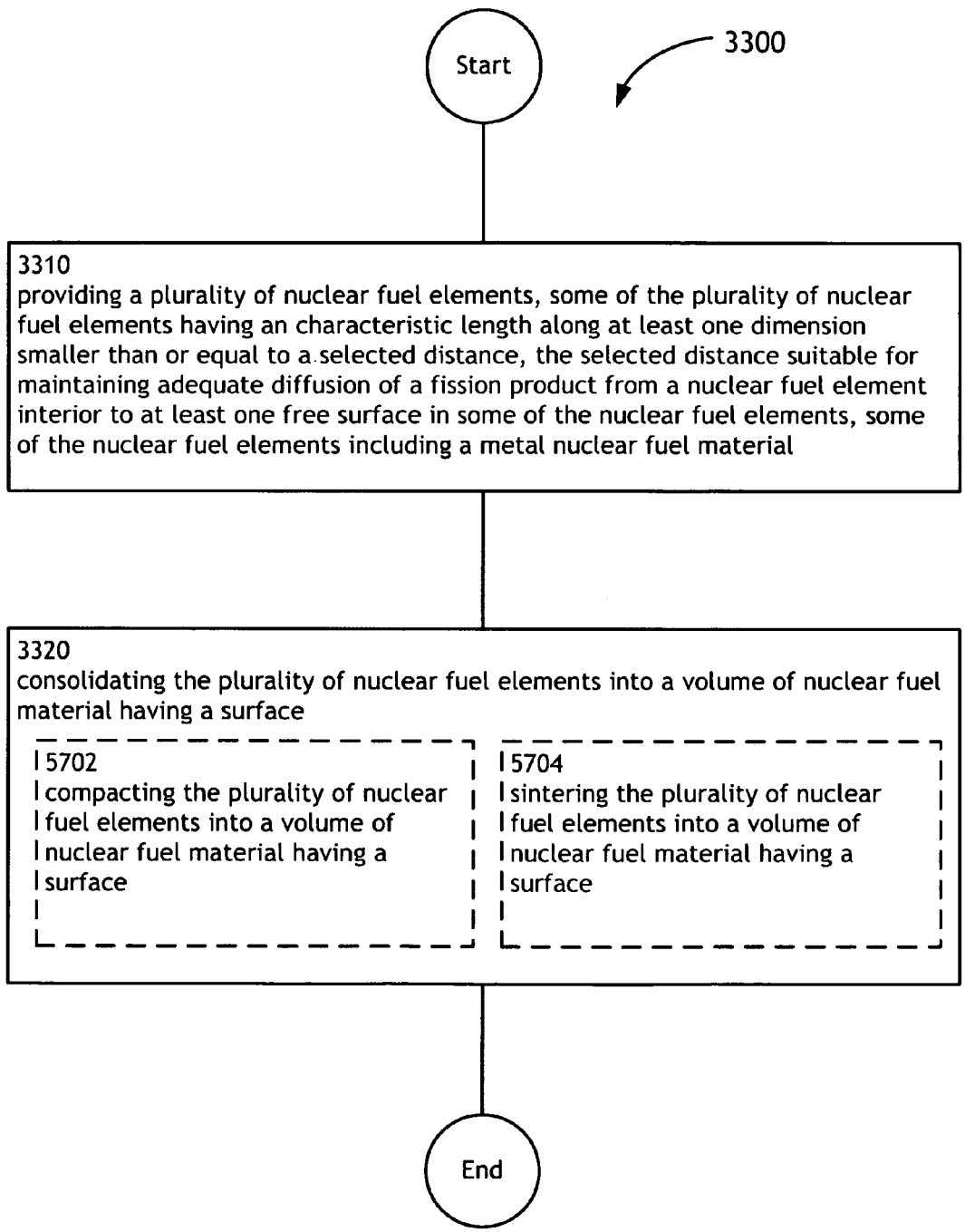

FIG. 57 illustrates alternative embodiments of the example operational flow 3300 of FIG. 33. FIG. 57 illustrates example embodiments where the operation 3320 may include at least one additional operation. Additional operations may include an operation 5702, and/or an operation 5704.

The operation 5702 illustrates compacting the plurality of nuclear fuel elements into a volume of nuclear fuel material having a surface. For example, as shown in FIGS. 1A through 4, a plurality of nuclear fuel elements 204, such as a metal powder, may be placed in a mold and compacted to form a self-supporting fuel pellet.

The operation 5704 illustrates sintering the plurality of nuclear fuel elements into a volume of nuclear fuel material having a surface. For example, as shown in FIGS. 1A through 4, a plurality of nuclear fuel elements 204, such as a metal powder, may be placed in a mold and compacted and sintered to form a self-supporting fuel pellet.

Figure 58:
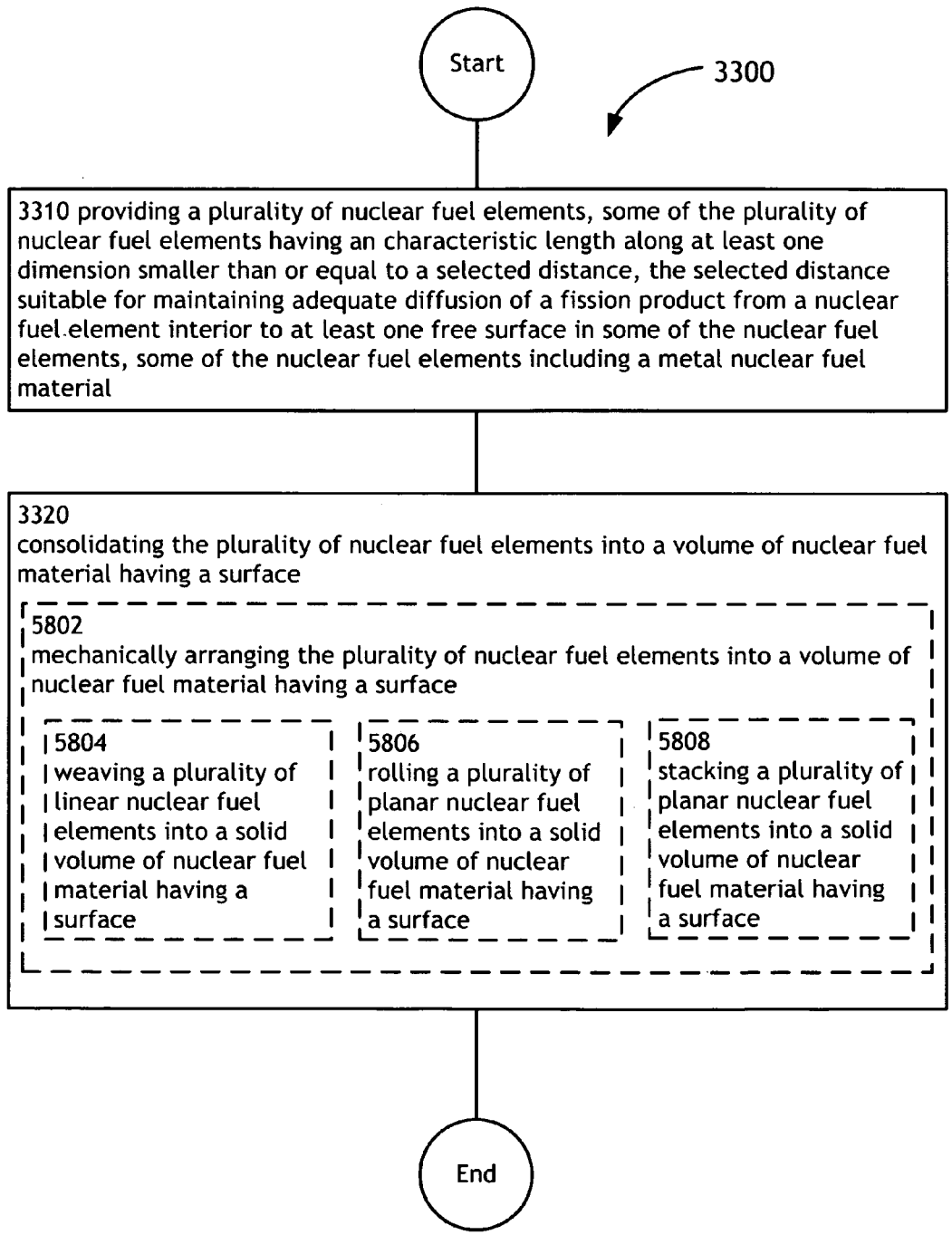

FIG. 58 illustrates alternative embodiments of the example operational flow 3300 of FIG. 33. FIG. 58 illustrates example embodiments where the operation 3320 may include at least one additional operation. Additional operations may include an operation 5802, an operation 5804, an operation 5806, and/or an operation 5808.

The operation 5802 illustrates mechanically arranging the plurality of nuclear fuel elements into a volume of nuclear fuel material having a surface. For example, as shown in FIGS. 1A through 4, a plurality of nuclear fuel elements 204, such as a plurality of metal (e.g., thorium) or metal alloy (e.g., uranium alloy) nuclear fuel elements, may be mechanically arranged into a volume 202 of nuclear fuel 200.

Further, the operation 5804 illustrates weaving a plurality of linear nuclear fuel elements into a solid volume of nuclear fuel material having a surface. For example, as shown in FIG. 2J, a plurality of nuclear fuel elements 204, such as a plurality of metal (e.g., thorium) or metal alloy (e.g., uranium alloy) nuclear fuel elements, may be woven into a woven structure 224 of nuclear fuel 200.

Further, the operation 5806 illustrates rolling a plurality of planar nuclear fuel elements into a solid volume of nuclear fuel material having a surface. For example, as shown in FIG. 2I, a nuclear fuel element 204, such as a metal or metal alloy planar sheet, may be rolled into a cylindrical volume 222. It is further recognized that two or more of the cylindrical rolled volumes 222 may be combined to form a nuclear fuel 200.

Further, the operation 5808 illustrates stacking a plurality of planar nuclear fuel elements into a solid volume of nuclear fuel material having a surface. For example, as shown in FIG. 2H, two or more nuclear fuel elements 204, such as a metal or metal alloy planar sheet, may be stacked together in order to form a volume of nuclear fuel 200.

Figure 59:
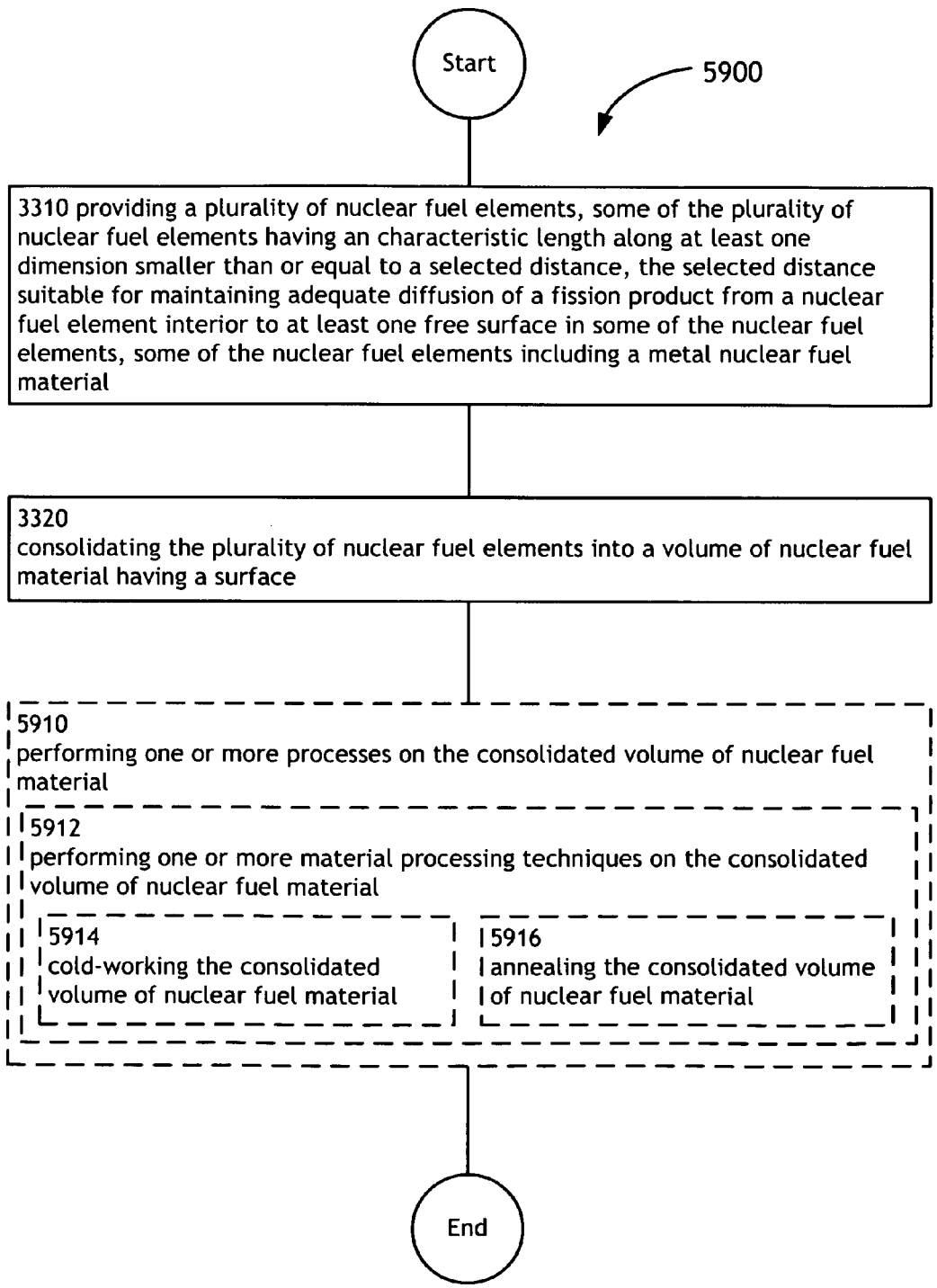

FIG. 59 illustrates an operational flow 5900 representing example operations related to a method for fabricating nuclear fuel. FIG. 59 illustrates an example embodiment where the example operational flow 3300 of FIG. 33 may include at least one additional operation. Additional operations may include an operation 5910, an operation 5912, an operation 5914, and/or an operation 5916.

After a start operation, a providing operation 3310, and a consolidating operation 3320, the operational flow 5900 moves to a processing operation 5910. Operation 5910 illustrates performing one or more processes on the consolidated volume of nuclear fuel material. For example, as shown in FIGS. 1A through 4, one or more process steps may be performed on the volume 202 of nuclear fuel 200 (e.g., fuel rod, fuel pellet, or fuel pebble).

The operation 5912 illustrates performing one or more material processing techniques on the consolidated volume of nuclear fuel material. For example, as shown in FIGS. 1A through 4, one or more material processing techniques may be performed on the volume 202 of nuclear fuel 200 in order to further refine the sizes of the nuclear elements 204 or the boundary network 214 of the nuclear fuel 200.

Further, the operation 5914 illustrates cold-working the consolidated volume of nuclear fuel material. For example, as shown in FIGS. 1A through 4, the consolidated volume 202 of nuclear fuel 200 may be cold-worked in order to further refine the sizes of the nuclear elements 204 or the boundary network 214 of the nuclear fuel 200. The cold-working process may include, but is not limited to, cold-rolling, extruding at low temperature, bending, compression, or drawing.

Further, the operation 5916 illustrates annealing the consolidated volume of nuclear fuel material. For example, as shown in FIGS. 1A through 4, the consolidated volume 202 of nuclear fuel material may be annealed. For instance, after being cold-worked, the nuclear reactor fuel 200 may be annealed in order to further refine the sizes of the nuclear elements 204 or the boundary network 214 of the nuclear fuel 200.

Figure 60:
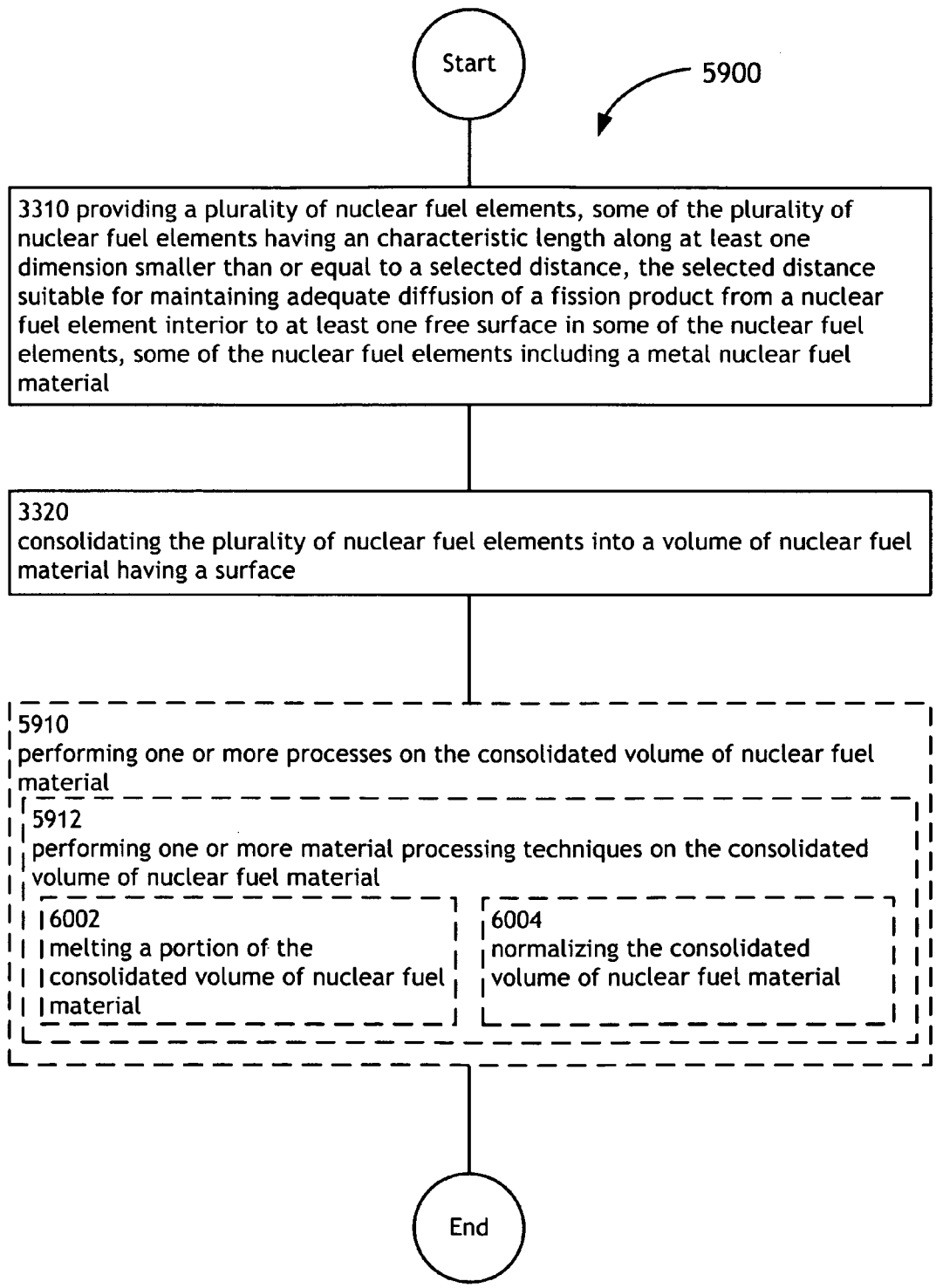

FIG. 60 illustrates alternative embodiments of the example operational flow 5900 of FIG. 59. FIG. 60 illustrates example embodiments where the operation 5910 may include at least one additional operation. Additional operations may include an operation 6002, and/or an operation 6004.

Further, the operation 6002 illustrates melting a portion of the consolidated volume of nuclear fuel material. For example, as shown in FIGS. 1A through 4, a portion of the consolidated volume 202 of nuclear fuel 200 may be melted.

Further, the operation 6004 illustrates normalizing the consolidated volume of nuclear fuel material. For example, as shown in FIGS. 1A through 4, the consolidated volume 202 of nuclear fuel 200 may be normalized in order to further refine the sizes of the nuclear elements 204 or the boundary network 214 of the nuclear fuel 200.

Figure 61:
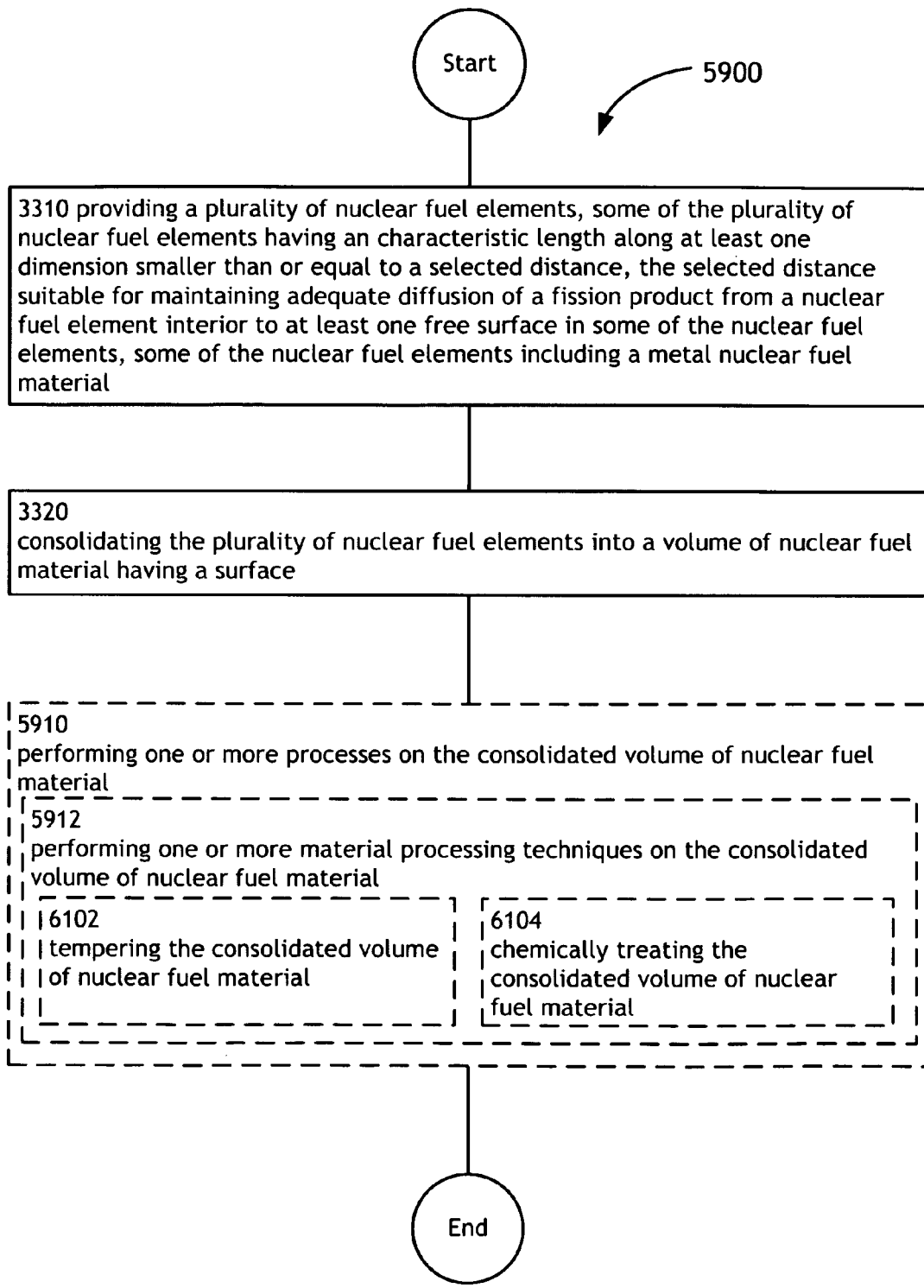

FIG. 61 illustrates alternative embodiments of the example operational flow 5900 of FIG. 59. FIG. 61 illustrates example embodiments where the operation 5910 may include at least one additional operation. Additional operations may include an operation 6102, and/or an operation 6104.

Further, the operation 6102 illustrates tempering the consolidated volume of nuclear fuel material. For example, as shown in FIGS. 1A through 4, the consolidated volume 202 of nuclear fuel 200 may be tempered in order to further refine the sizes of the nuclear elements 204 or the boundary network 214 of the nuclear fuel 200.

Further, the operation 6104 illustrates chemically treating the consolidated volume of nuclear fuel material. For example, as shown in FIGS. 1A through 4, the consolidated volume 202 of nuclear fuel 200 may be chemically treated in order to further refine the sizes of the nuclear elements 204 or the boundary network 214 of the nuclear fuel 200.

Figure 62:
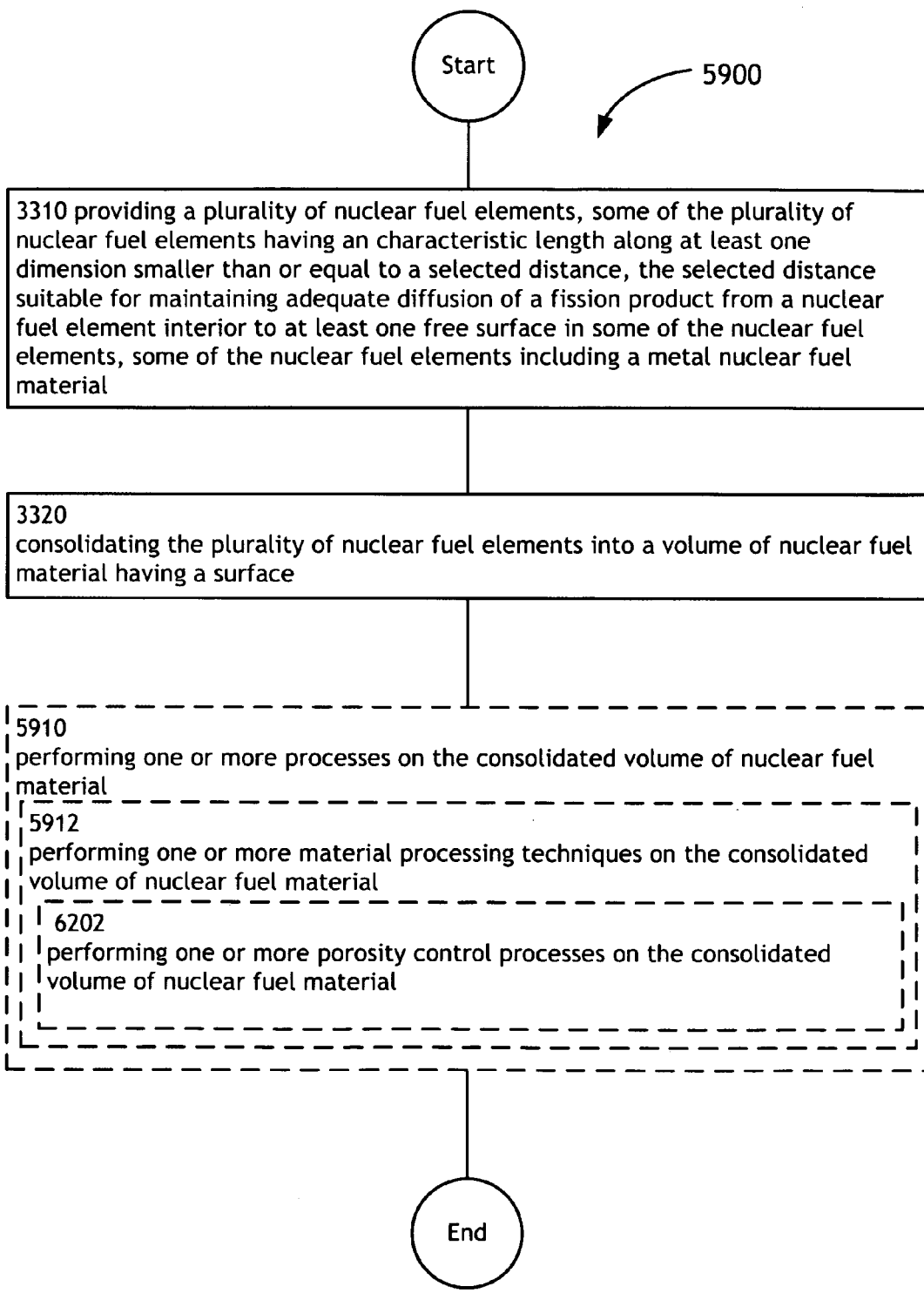

FIG. 62 illustrates alternative embodiments of the example operational flow 5900 of FIG. 59. FIG. 62 illustrates example embodiments where the operation 5910 may include at least one additional operation. Additional operations may include an operation 6202.

Further, the operation 6202 illustrates performing one or more porosity control processes on the consolidated volume of nuclear fuel material. For example, as shown in FIGS. 1A through 4, the consolidated volume 202 of nuclear fuel 200 may undergo a porosity control process (e.g., annealing or chemical treatment).

Figure 63:
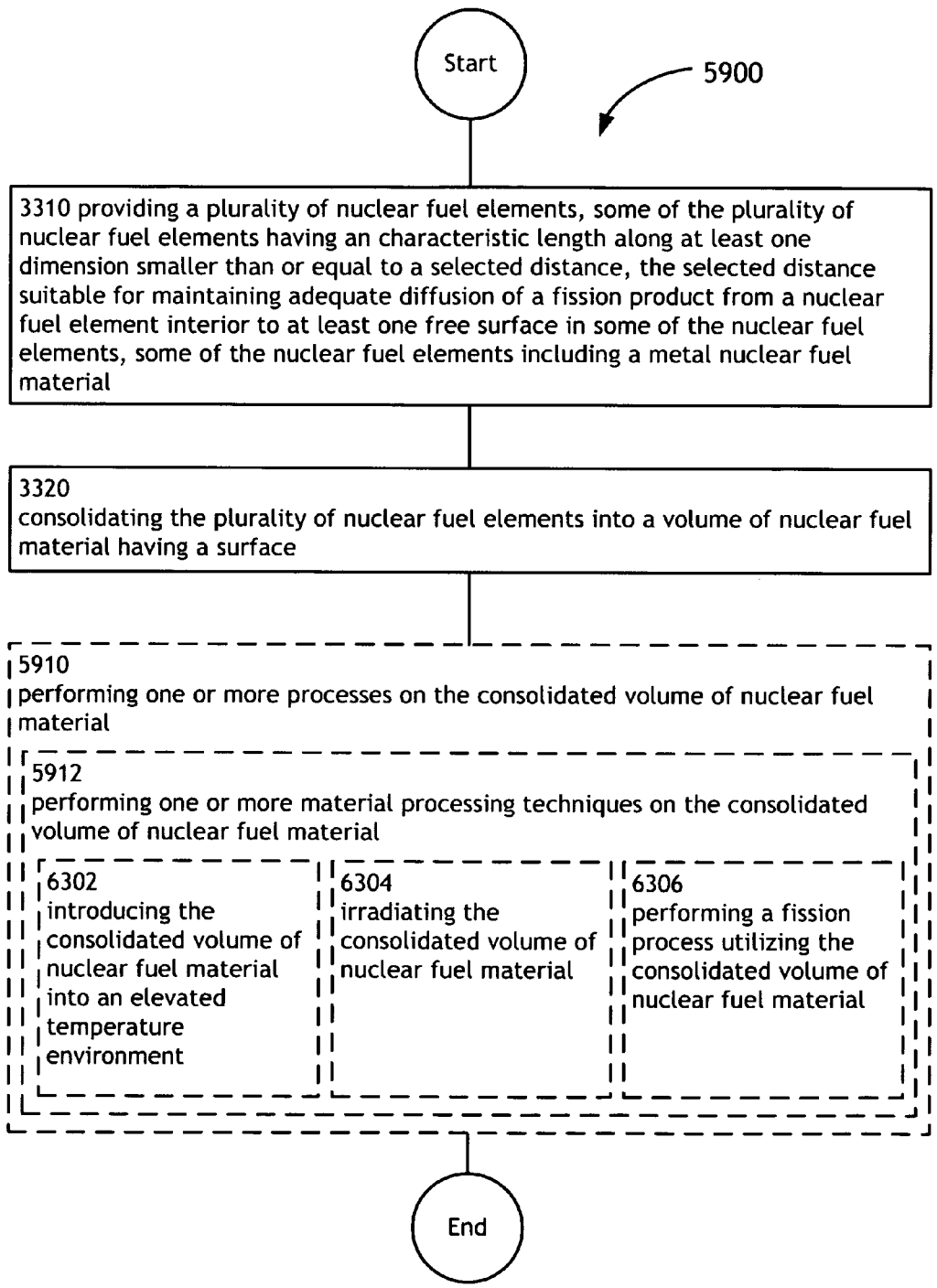

FIG. 63 illustrates alternative embodiments of the example operational flow 5900 of FIG. 59. FIG. 63 illustrates example embodiments where the operation 5910 may include at least one additional operation. Additional operations may include an operation 6302, an operation 6304, and/or an operation 6306.

The operation 6302 illustrates introducing the consolidated volume of nuclear fuel material into an elevated temperature environment. For example, as shown in FIGS. 1A through 4, the consolidated volume 202 of nuclear fuel 200 may be introduced into a high temperature environment, such as a operation within a nuclear reactor.

The operation 6304 illustrates irradiating the consolidated volume of nuclear fuel material. For example, as shown in FIGS. 1A through 4, the consolidated volume 202 of nuclear fuel 200 may be irradiated (e.g., irradiated in nuclear reactor implementation or irradiated via neutron source) in order to refine the sizes of the nuclear fuel elements 204 or the boundary network 214.

The operation 6306 illustrates performing a fission process utilizing the consolidated volume of nuclear fuel material For example, as shown in FIGS. 1A through 4, the consolidated volume 202 of nuclear fuel 200 may be utilized in a fission process (e.g., utilized in a nuclear reactor). It is recognized that the sizes of the nuclear fission elements 204 may become more refined and/or the boundary network 214 of the nuclear fuel 200 may become more developed upon implementing the nuclear fuel 200 in a nuclear reactor 200.

Figure 64:
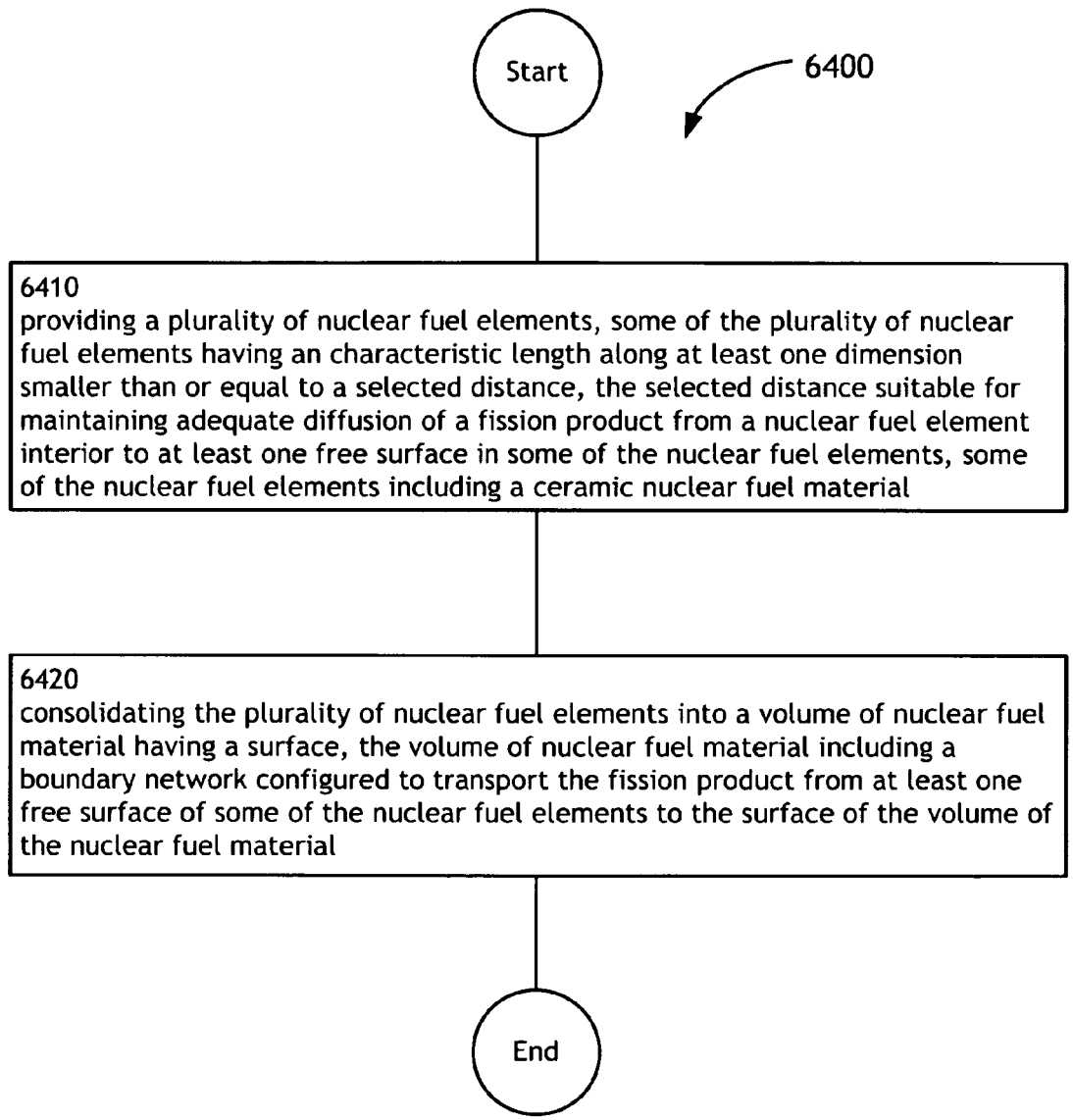
FIG. 64 is a high-level flowchart of a method for fabricating a nuclear fuel.

FIG. 64 illustrates an operational flow 6400 representing example operations related to a method for fabricating a nuclear fuel. In FIG. 64 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 6400 moves to a providing operation 6410. Providing operation 6410 depicts providing a plurality of nuclear fuel elements, some of the plurality of nuclear fuel elements having an characteristic length along at least one dimension smaller than or equal to a selected distance, the selected distance suitable for maintaining adequate diffusion of a fission product from a nuclear fuel element interior to at least one free surface in some of the nuclear fuel elements, some of the nuclear fuel elements including a ceramic nuclear fuel material. For example, as shown in FIGS. 1A through 4, a plurality of ceramic nuclear fuel elements 204 may be fabricated via a ball milling process such that their average size is smaller than a critical distance suitable for maintaining adequate diffusion of a fission product 108 from the interiors 210 of the nuclear fuel elements 204 to the surfaces 212 of the nuclear fuel elements 204. For instance, a plurality of spherical ceramic nuclear fuel particles may be fabricated to have an average radius of 100 nm.

Then, consolidating operation 6420 depicts consolidating the plurality of nuclear fuel elements into a volume of nuclear fuel material having a surface, the volume of nuclear fuel material including a boundary network configured to transport the fission product from at least one free surface of some of the nuclear fuel elements to the surface of the volume of the nuclear fuel material. For example, as shown in FIGS. 1A through 4, the nuclear fuel elements 204 (e.g., uranium dioxide particles) may be consolidated via a consolidation process, such as, but not limited to, a compacting process, or a sintering process, configured to provide a porosity level within the consolidated nuclear fuel 200 suitable for producing a boundary network 214 configured to transport a fission product 118 from the surfaces 212 of the nuclear fuel elements 204 to the geometric surface 201 of the nuclear fuel 200. By way of further example, the nuclear fuel elements 204 may be consolidated via a mechanical process configured to provide spatial configuration within the consolidated nuclear fuel 200 suitable for producing a boundary network 214 configured to transport a fission product 118 from the surfaces 212 of the nuclear fuel elements 204 to the geometric surface 201 of the nuclear fuel 200.

Figure 65:
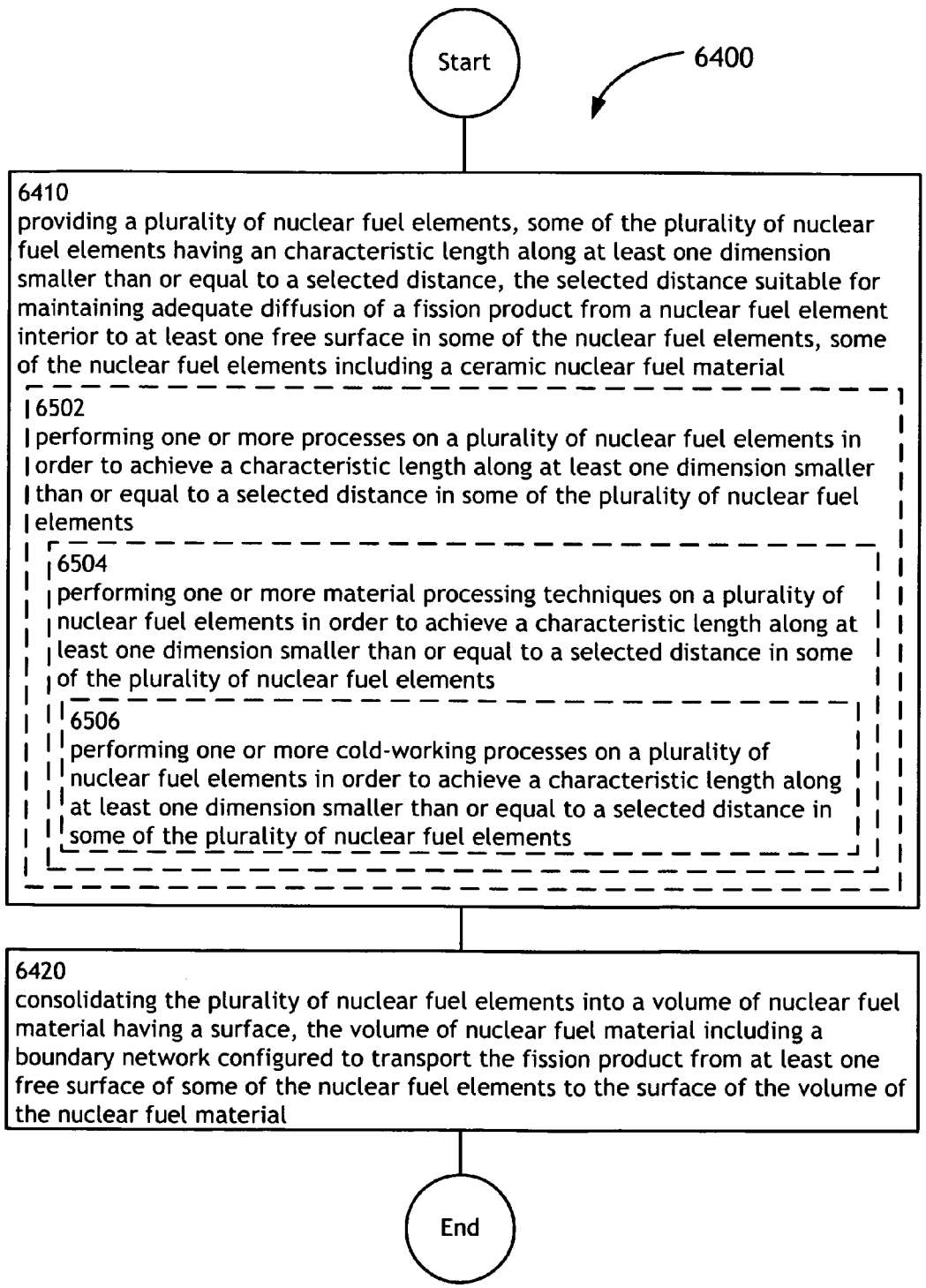
FIGS. 65 through 93 are high-level flowcharts depicting alternate implementations of FIG. 64.

FIG. 65 illustrates alternative embodiments of the example operational flow 6400 of FIG. 64. FIG. 65 illustrates example embodiments where the operation 6410 may include at least one additional operation. Additional operations may include an operation 6502, an operation 6504, and/or an operation 6506.

The operation 6502 illustrates performing one or more processes on a plurality of nuclear fuel elements in order to achieve a characteristic length along at least one dimension smaller than or equal to a selected distance in some of the plurality of nuclear fuel elements. For example, as shown in FIGS. 1A through 4, one or more processes (e.g., ball milling, nanostructuring, or chemical treatment) may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 6504 illustrates performing one or more material processing techniques on a plurality of nuclear fuel elements in order to achieve a characteristic length along at least one dimension smaller than or equal to a selected distance in some of the plurality of nuclear fuel elements. For example, as shown in FIGS. 1A through 4, one or more material processing techniques may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 6506 illustrates performing one or more cold-working processes on a plurality of nuclear fuel elements in order to achieve a characteristic length along at least one dimension smaller than or equal to a selected distance in some of the plurality of nuclear fuel elements. For example, as shown in FIGS. 1A through 4, a cold-working process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. The cold-working process may include, but is not limited to, cold-rolling, drawing, bending, or compression.

Figure 66:
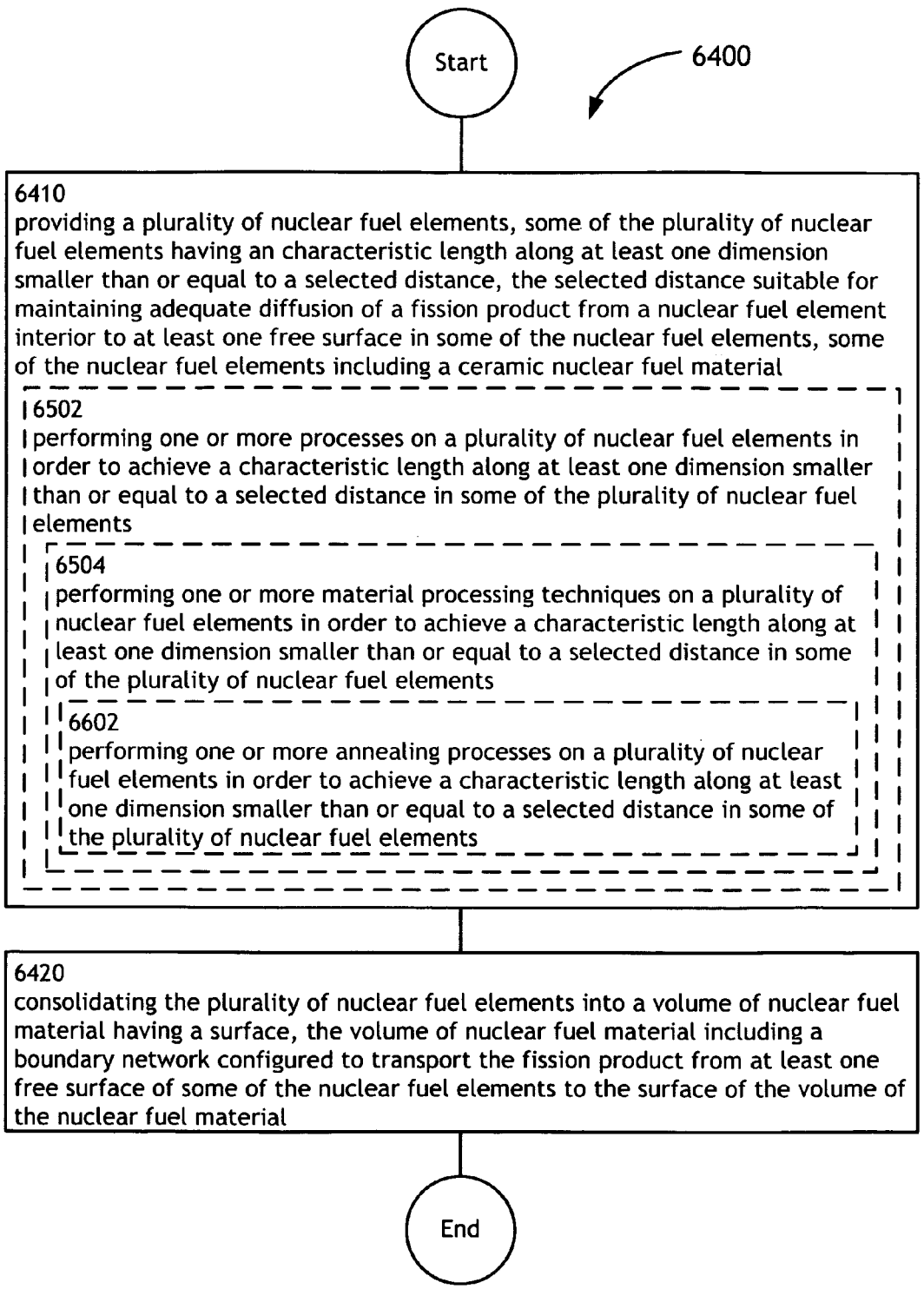

FIG. 66 illustrates alternative embodiments of the example operational flow 6400 of FIG. 64. FIG. 66 illustrates example embodiments where the operation 6410 may include at least one additional operation. Additional operations may include an operation 6602.

Further, the operation 6602 illustrates performing one or more annealing processes on a plurality of nuclear fuel elements in order to achieve a characteristic length along at least one dimension smaller than or equal to a selected distance in some of the plurality of nuclear fuel elements. For example, as shown in FIGS. 1A through 4, an annealing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. Further, the nuclear fuel elements 204 may be annealed in the presence of a processing gas, such as an oxygen reducing gas.

Figure 67:
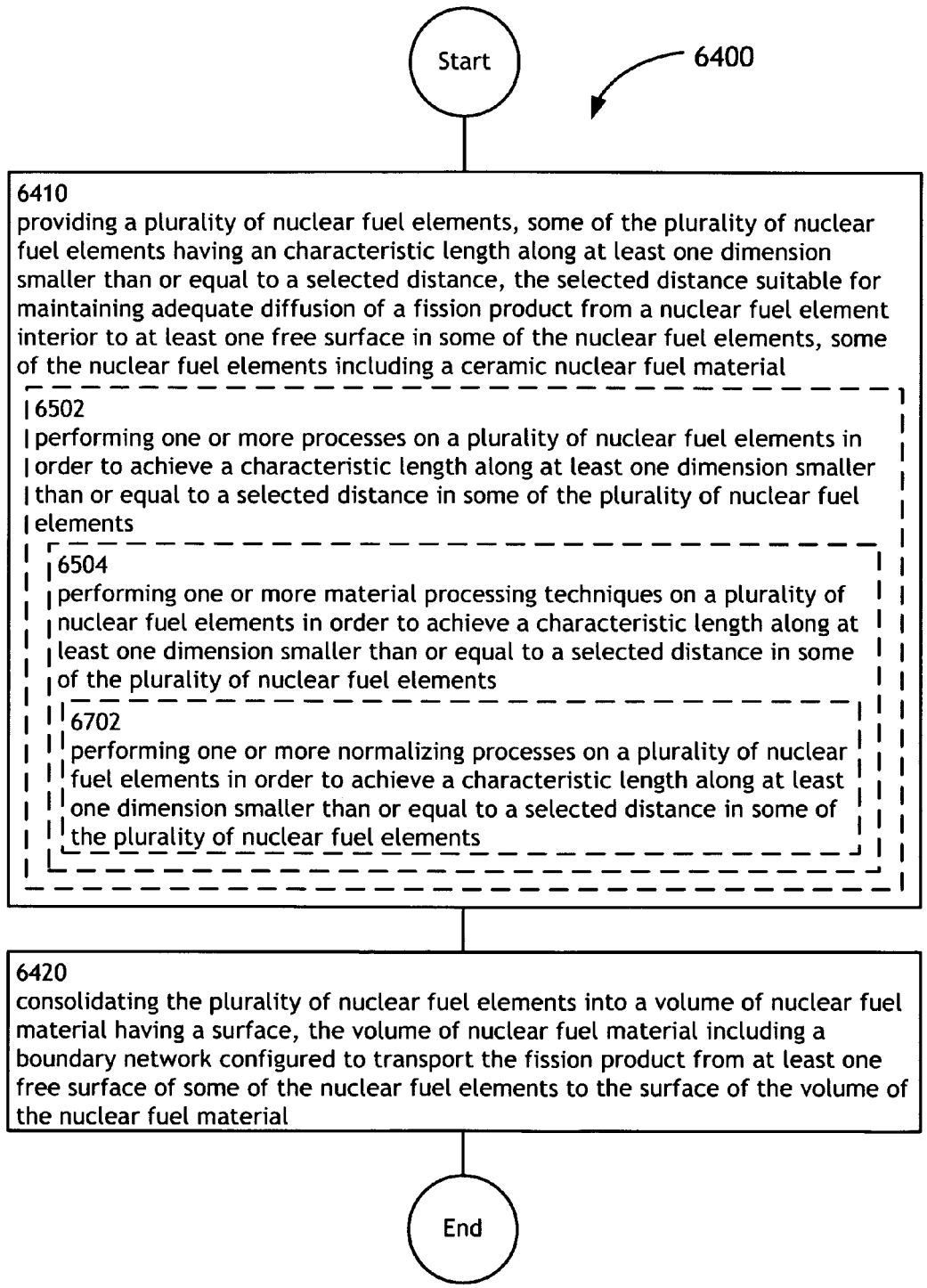

FIG. 67 illustrates alternative embodiments of the example operational flow 6400 of FIG. 64. FIG. 67 illustrates example embodiments where the operation 6410 may include at least one additional operation. Additional operations may include an operation 6702.

Further, the operation 6702 illustrates performing one or more normalizing processes on a plurality of nuclear fuel elements in order to achieve a characteristic length along at least one dimension smaller than or equal to a selected distance in some of the plurality of nuclear fuel elements. For example, as shown in FIGS. 1A through 4, a normalizing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 68:
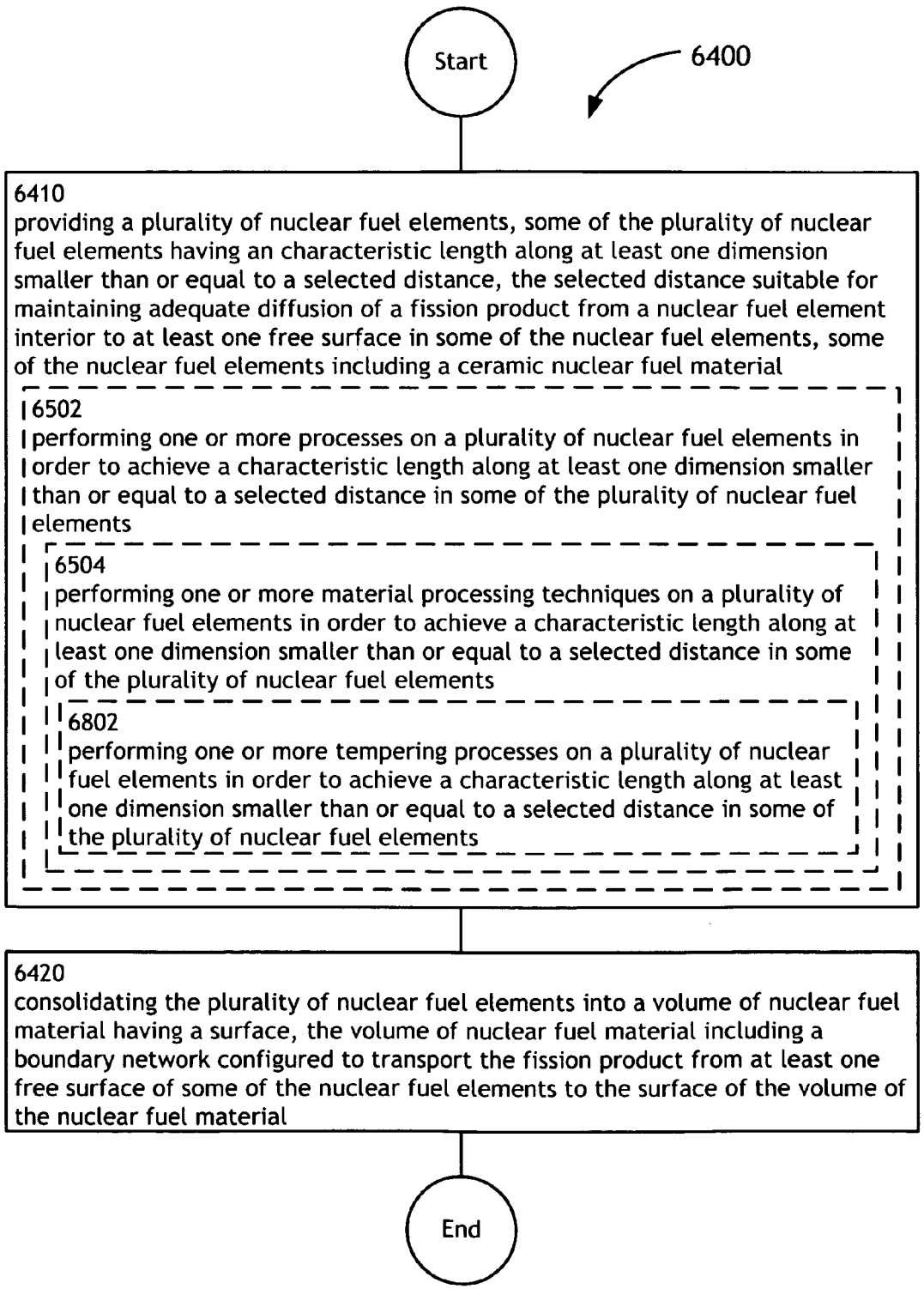

FIG. 68 illustrates alternative embodiments of the example operational flow 6400 of FIG. 64. FIG. 68 illustrates example embodiments where the operation 6410 may include at least one additional operation. Additional operations may include an operation 6802.

Further, the operation 6802 illustrates performing one or more tempering processes on a plurality of nuclear fuel elements in order to achieve a characteristic length along at least one dimension smaller than or equal to a selected distance in some of the plurality of nuclear fuel elements. For example, as shown in FIGS. 1A through 4, a tempering process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 69:
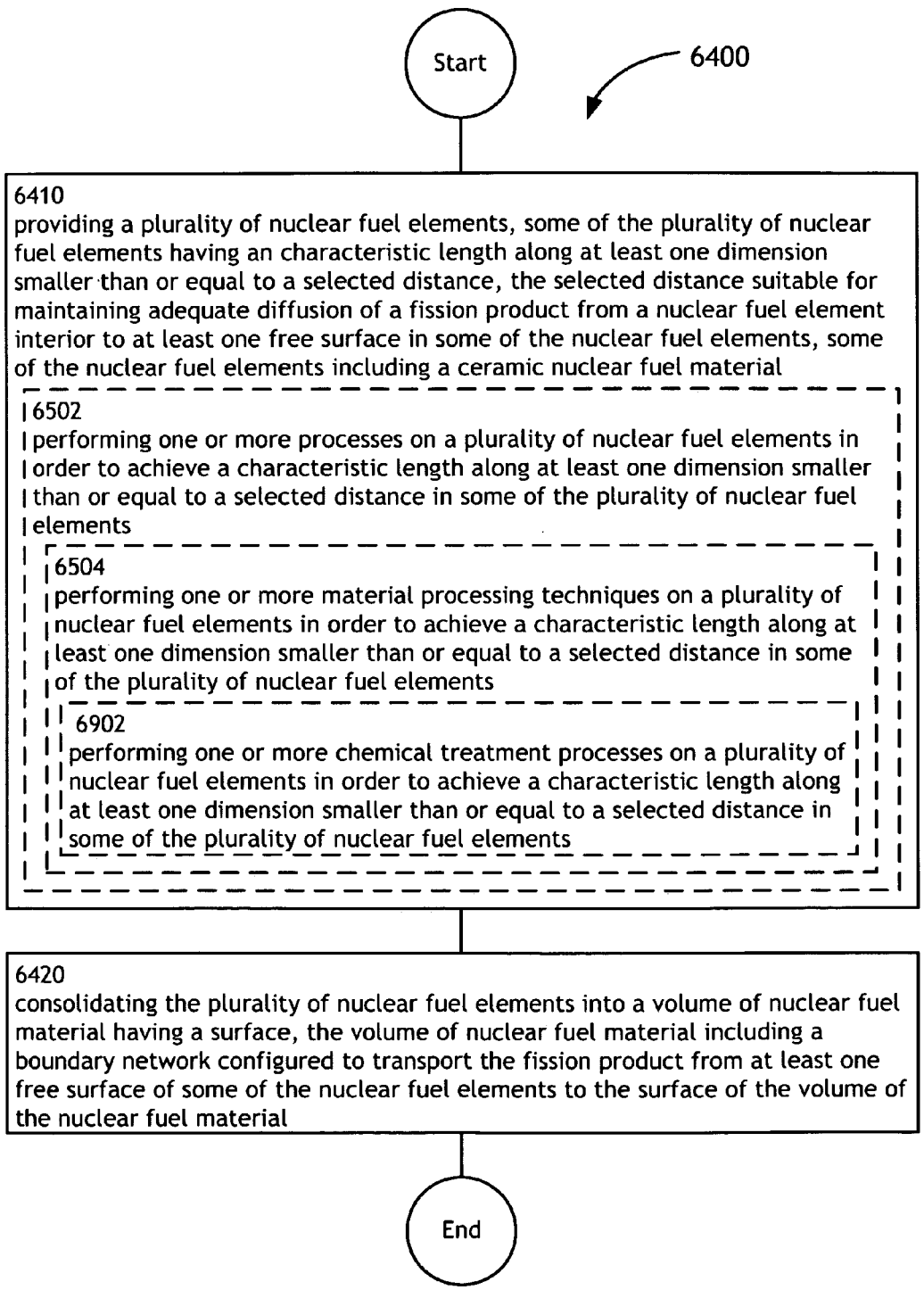

FIG. 69 illustrates alternative embodiments of the example operational flow 6400 of FIG. 64. FIG. 69 illustrates example embodiments where the operation 6410 may include at least one additional operation. Additional operations may include an operation 6902.

Further, the operation 6902 illustrates performing one or more chemical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a chemical treatment process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. For instance, an oxygen reducing treatment may be performed on the provided nuclear fuel elements 204, as described previously herein.

Figure 70:
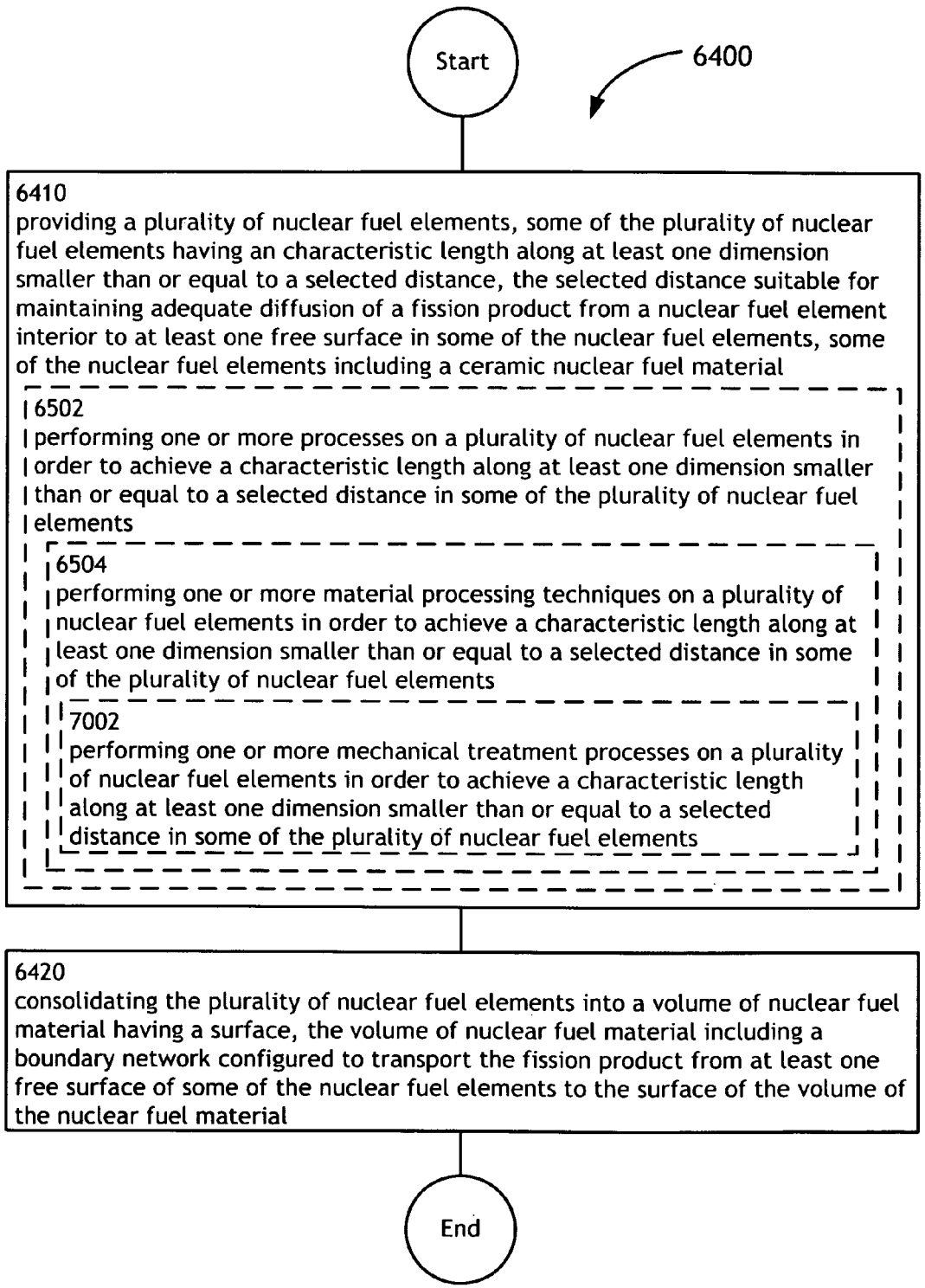

FIG. 70 illustrates alternative embodiments of the example operational flow 6400 of FIG. 64. FIG. 70 illustrates example embodiments where the operation 6410 may include at least one additional operation. Additional operations may include an operation 7002.

Further, the operation 7002 illustrates performing one or more mechanical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a mechanical process (e.g., ball milling) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

Figure 71:
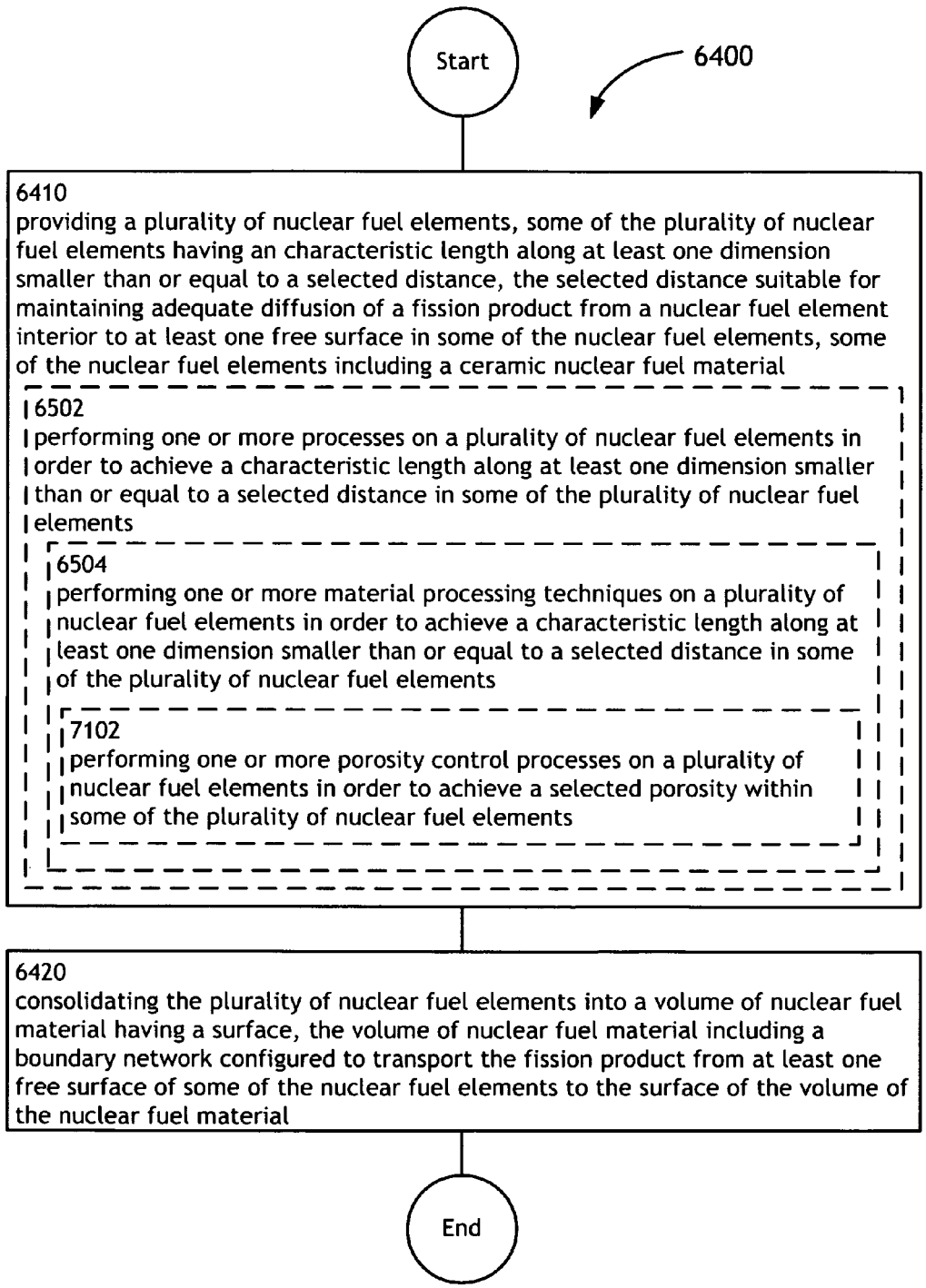

FIG. 71 illustrates alternative embodiments of the example operational flow 6400 of FIG. 64. FIG. 71 illustrates example embodiments where the operation 6410 may include at least one additional operation. Additional operations may include an operation 7102.

Further, the operation 7102 illustrates performing one or more porosity control processes on a plurality of nuclear fuel elements in order to achieve a selected porosity within some of the plurality of nuclear fuel elements. For example, as shown in FIGS. 1A through 4, a porosity control process may be performed on the provided nuclear fuel elements 204 in order to achieve a selected porosity in the nuclear fuel elements 204 the nuclear fuel elements 206. For instance, porosity of the nuclear fuel 100 may be controlled via a heat treatment process (e.g., an annealing process or melting process) or a chemical treatment process.

Figure 72:
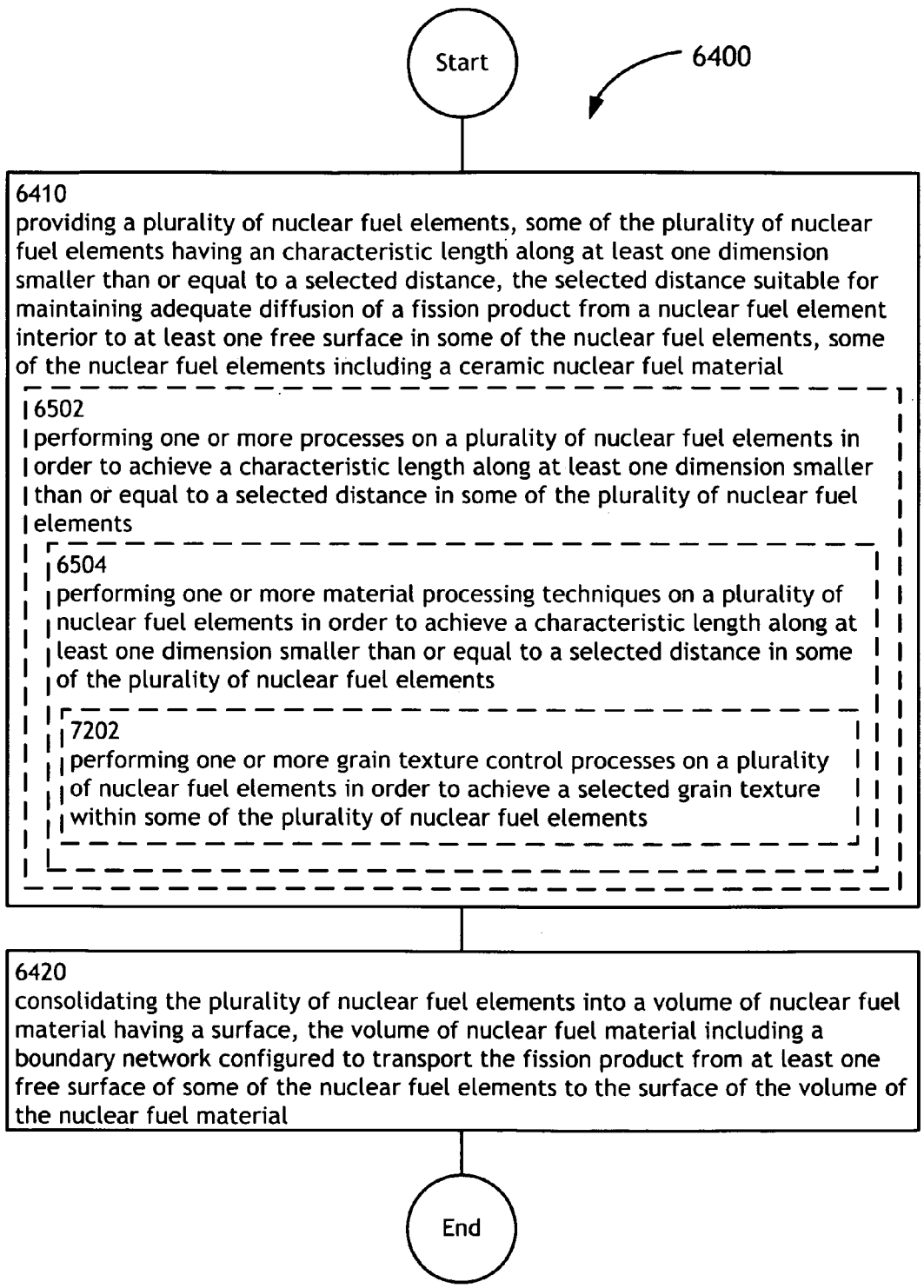

FIG. 72 illustrates alternative embodiments of the example operational flow 6400 of FIG. 64. FIG. 72 illustrates example embodiments where the operation 6410 may include at least one additional operation. Additional operations may include an operation 7202.

Further, the operation 7202 illustrates performing one or more grain texture control processes on a plurality of nuclear fuel elements in order to achieve a selected grain texture within some of the plurality of nuclear fuel elements. For example, as shown in FIGS. 1A through 4, a grain texture control process may be performed on the provided nuclear fuel elements 204 in order to achieve a selected grain texture in two or more grains of the nuclear fuel elements 204. For instance, grain textures of the grains of the nuclear fuel elements 204 may be controlled via a heat treatment process (e.g., annealing) or a chemical treatment process (e.g., doping).

Figure 73:
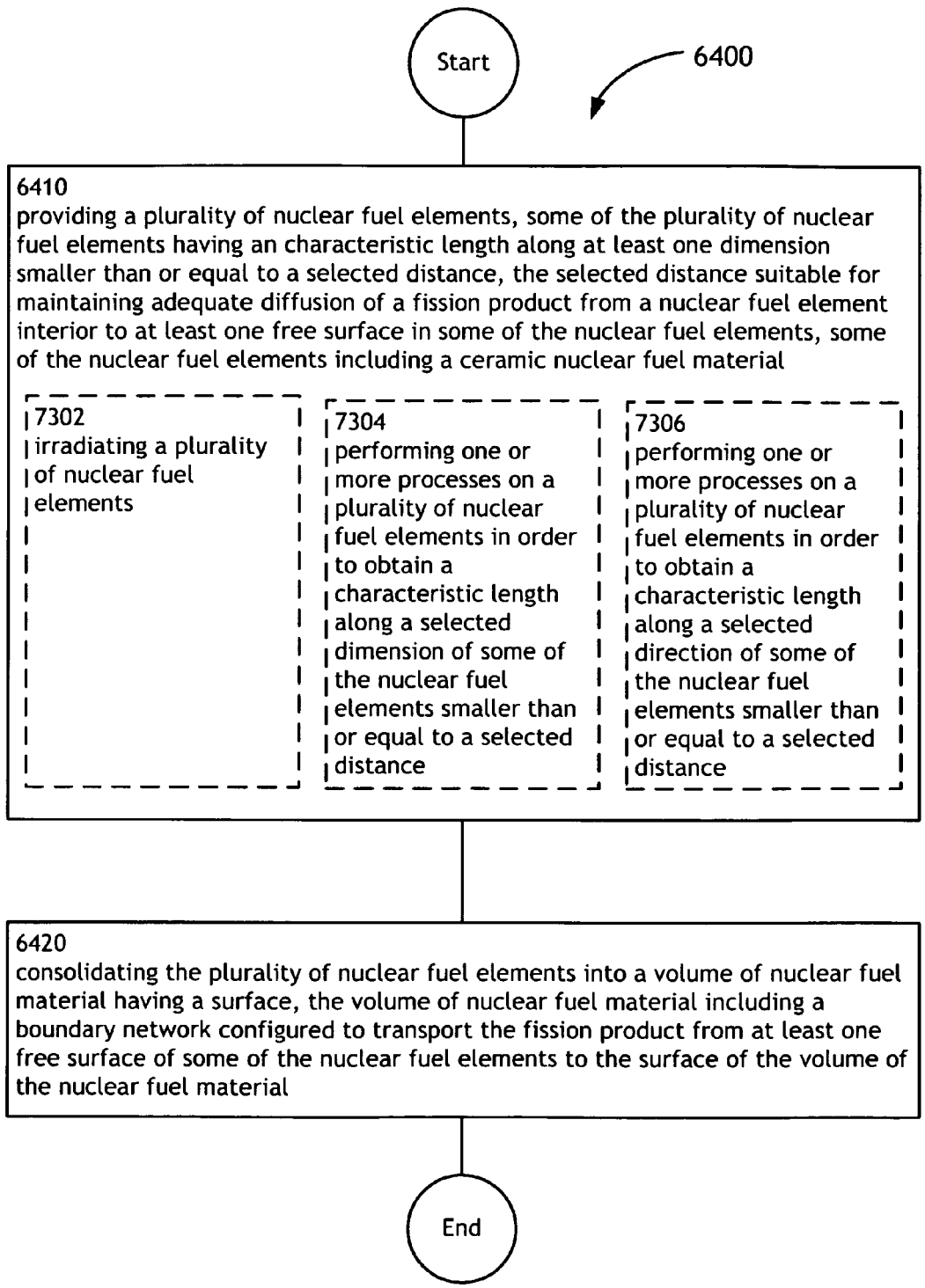

FIG. 73 illustrates alternative embodiments of the example operational flow 6400 of FIG. 64. FIG. 73 illustrates example embodiments where the operation 6410 may include at least one additional operation. Additional operations may include an operation 7302, an operation 7304, and/or an operation 7306.

The operation 7302 illustrates irradiating a plurality of nuclear fuel elements. For example, as shown in FIGS. 1A through 4, an irradiating process (e.g., exposure to neutron flux) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

The operation 7304 illustrates performing one or more processes on a plurality of nuclear fuel elements in order to obtain a characteristic length along a selected dimension of some of the nuclear fuel elements smaller than or equal to a selected distance. For example, as shown in FIG. 2D, one or more processes may be utilized in order engineer the nuclear fuel elements 204 to have a characteristic length 206 along a selected dimension of some of the nuclear fuel elements 204. For instance, in nuclear fuel elements 204 having an elongated structure, the nuclear fuel elements 204 may have a "thin" dimension that is smaller than or equal to a selected distance.

The operation 7306 illustrates performing one or more processes on a plurality of nuclear fuel elements in order to obtain a characteristic length along a selected direction of some of the nuclear fuel elements smaller than or equal to a selected distance. For example, as shown in FIG. 2E, one or more processes may be utilized in order engineer the nuclear fuel elements 204 of the nuclear fuel 200 to have a characteristic length 206 along a selected direction smaller than or equal to a selected distance. For instance, in nuclear fuel elements having an elongated structure, the nuclear fuel elements 204 may have a characteristic length 206 along a selected direction 134 within the nuclear fuel 200. For example, the nuclear fuel elements may have a selected characteristic length 206 along the radial direction within a cylindrically shaped nuclear fuel piece (e.g., fuel pellet).

Figure 74:
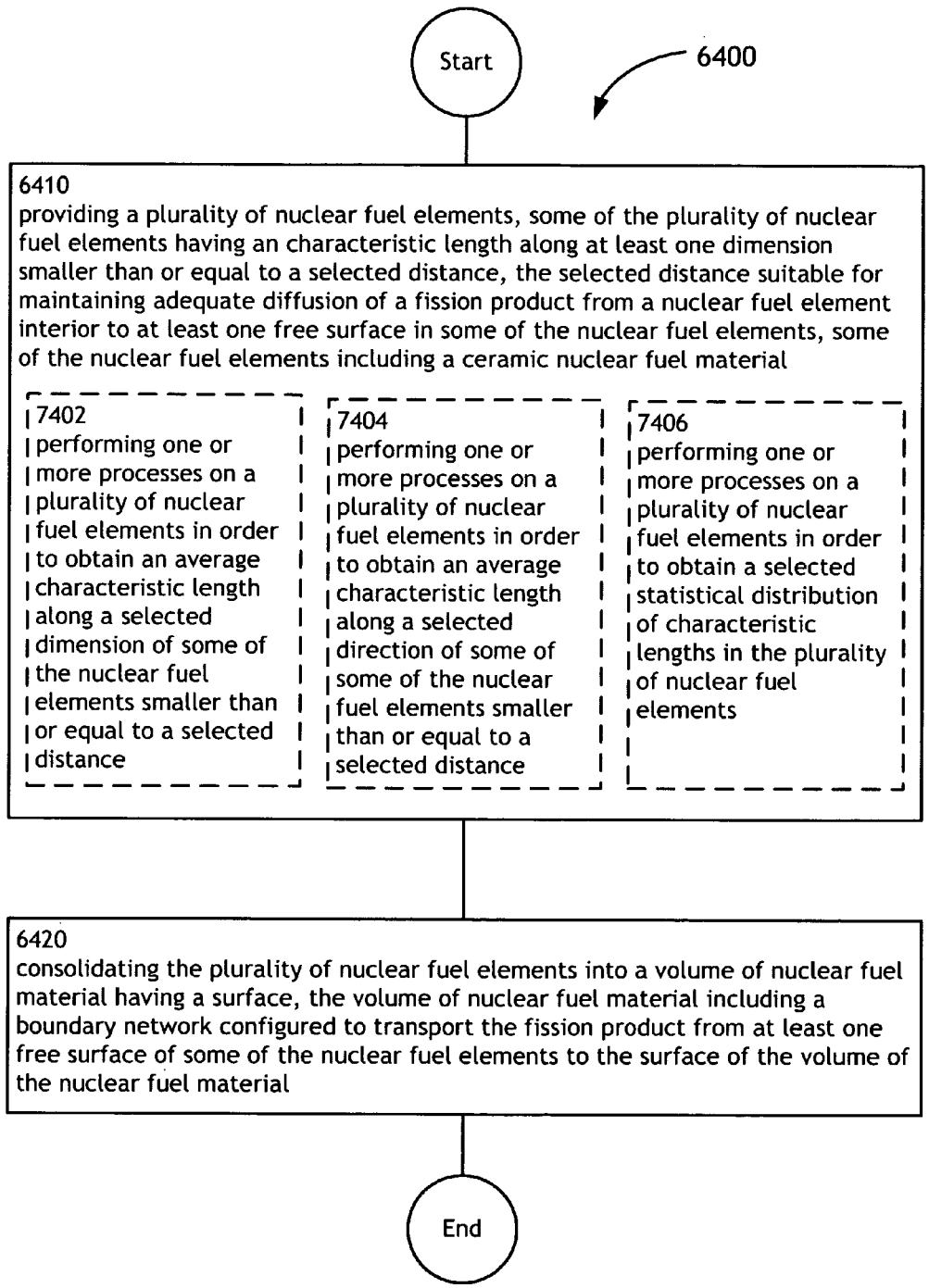

FIG. 74 illustrates alternative embodiments of the example operational flow 6400 of FIG. 64. FIG. 74 illustrates example embodiments where the operation 6410 may include at least one additional operation. Additional operations may include an operation 7402, an operation 7404, and/or an operation 7406.

The operation 7402 illustrates performing one or more processes on a plurality of nuclear fuel elements in order to obtain an average characteristic length along a selected dimension of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected dimension of some nuclear fuel elements 204.

The operation 7404 illustrates performing one or more processes on a plurality of nuclear fuel elements in order to obtain an average characteristic length along a selected direction of some of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected direction of some of the nuclear fuel elements 204 smaller than or equal to a selected distance. For instance, in nuclear fuel elements 204 having an elongated structure, the nuclear fuel elements 204 may have an average characteristic length 206 along a selected direction 134 with the nuclear fuel 200. For example, the nuclear fuel elements may have an average selected characteristic length 206 along the radial direction within a cylindrically shaped nuclear fuel piece (e.g., fuel pellet).

The operation 7406 illustrates performing one or more processes on a plurality of nuclear fuel elements in order to obtain a selected statistical distribution of characteristic lengths in the plurality of nuclear fuel elements. For example, as shown in FIGS. 1A through 4, the nuclear fuel elements 204 of the nuclear fuel 200 may have a selected statistical distribution of characteristic lengths 206. For example, the nuclear fuel elements 204 of the nuclear fuel 200 may have an element size distribution with a selected percentage of the nuclear fuel elements 204 having a size 206 below a selected distance. For instance, the nuclear fuel 200 of the present invention may have a nuclear fuel element (e.g., particle) size 206 distribution such that 65% of the nuclear fuel elements 204 have a size 206 equal to or less than 1 μm, with an average size of 0.750 μm. In another example, the nuclear fuel elements 204 of the nuclear fuel 200 may have a selected spatial distribution of characteristic lengths, within the consolidated volume of nuclear fuel 200.

Figure 75:
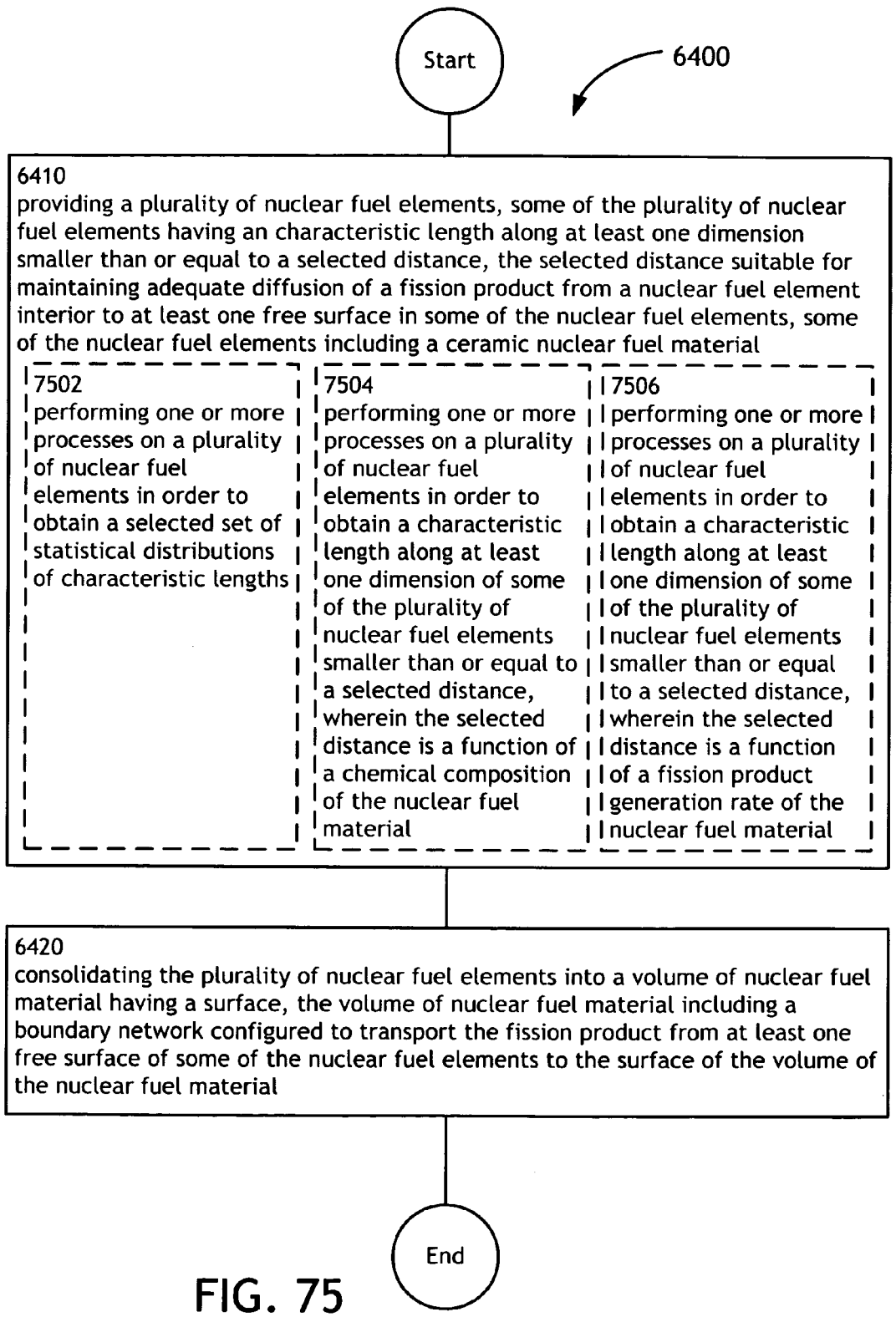

FIG. 75 illustrates alternative embodiments of the example operational flow 6400 of FIG. 64. FIG. 75 illustrates example embodiments where the operation 6410 may include at least one additional operation. Additional operations may include an operation 7502, an operation 7504, and/or an operation 7506.

The operation 7502 illustrates performing one or more processes on a plurality of nuclear fuel elements in order to obtain a selected set of statistical distributions of characteristic lengths. For example, the nuclear fuel elements 204 of the nuclear fuel 200 may have multiple statistical distributions of characteristic lengths 206. For instance, the nuclear fuel 200 of the present invention may have a nuclear fuel element size 206 distribution such that 25% of the nuclear fuel elements 204 have a size equal to or less than 1 μm, 25% of the nuclear fuel elements have a nuclear fuel element size 106 equal to or less than 0.5 μm, and 10% of the nuclear fuel elements are below 0.1 μm.

The operation 7504 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a chemical composition of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the chemical composition of the nuclear fuel 200. For instance, the critical size necessary to ensure adequate diffusion of a fission product 108 from the interiors 210 of the nuclear fuel elements 204 to the surfaces 212 of the nuclear fuel elements of the nuclear fuel 200 may depend upon the chemical composition (e.g., type of fissile material(s), types of alloying agents, relative concentration of fissile materials, or the like) of the nuclear reactor fuel 200.

The operation 7506 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a fission product generation rate of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the fission product 108 generation rate within the nuclear fuel 200. For instance, the critical size necessary to ensure adequate diffusion of a fission product 108 from interiors 210 of the nuclear fuel elements 204 to the surfaces 212 of the nuclear fuel elements 204 of the nuclear fuel 200 may depend upon the fission product 108 generation rate of the nuclear reactor fuel 200. Further, the fission product 108 generation rate (e.g., fission gas 118 generation rate) is proportional to the fission rate with the nuclear fuel 200, which in turn is proportional to the power density of the nuclear fuel 200, which in turn is dependent upon the chemical composition of the nuclear fuel 200.

Figure 76A:
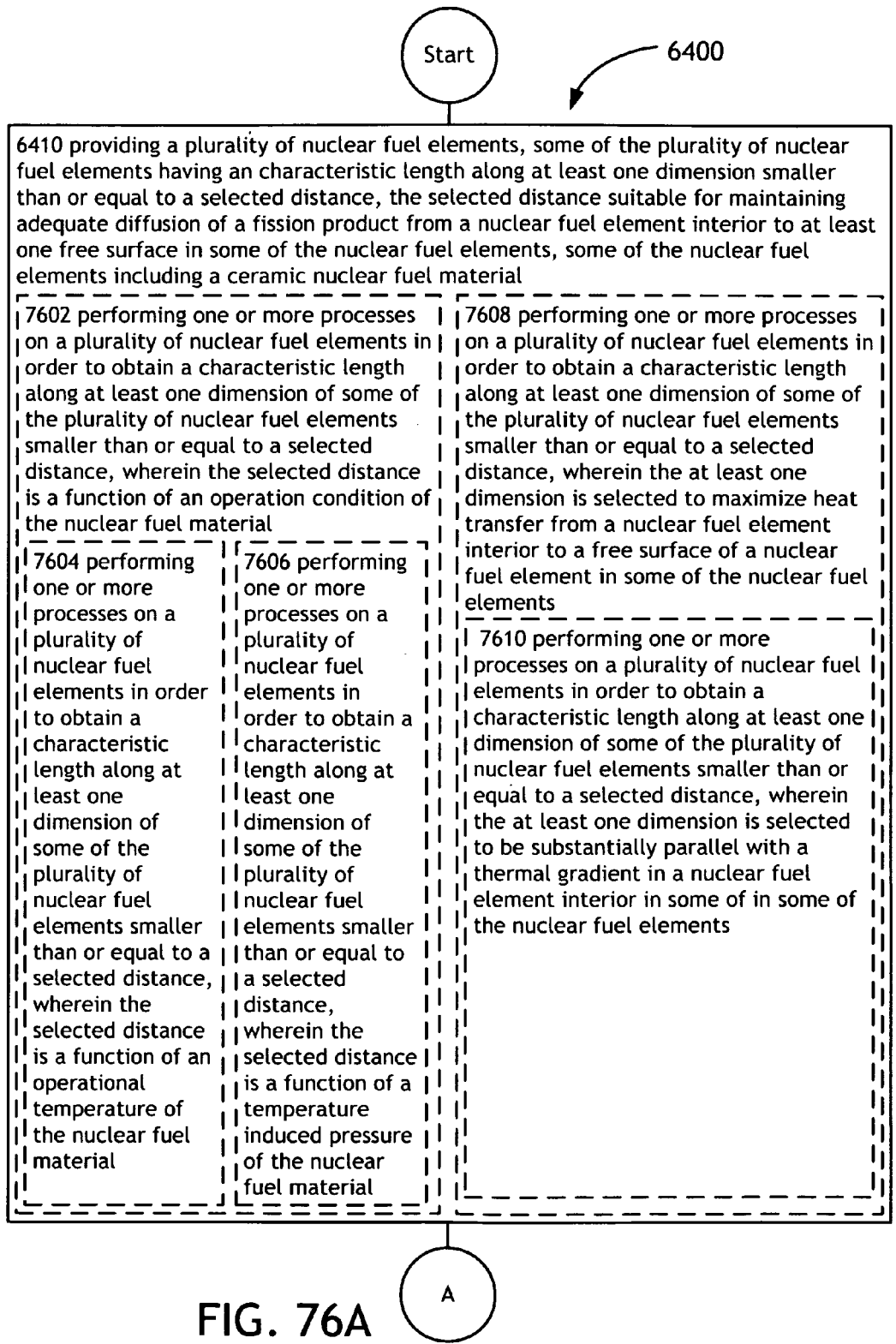
Figure 76B:
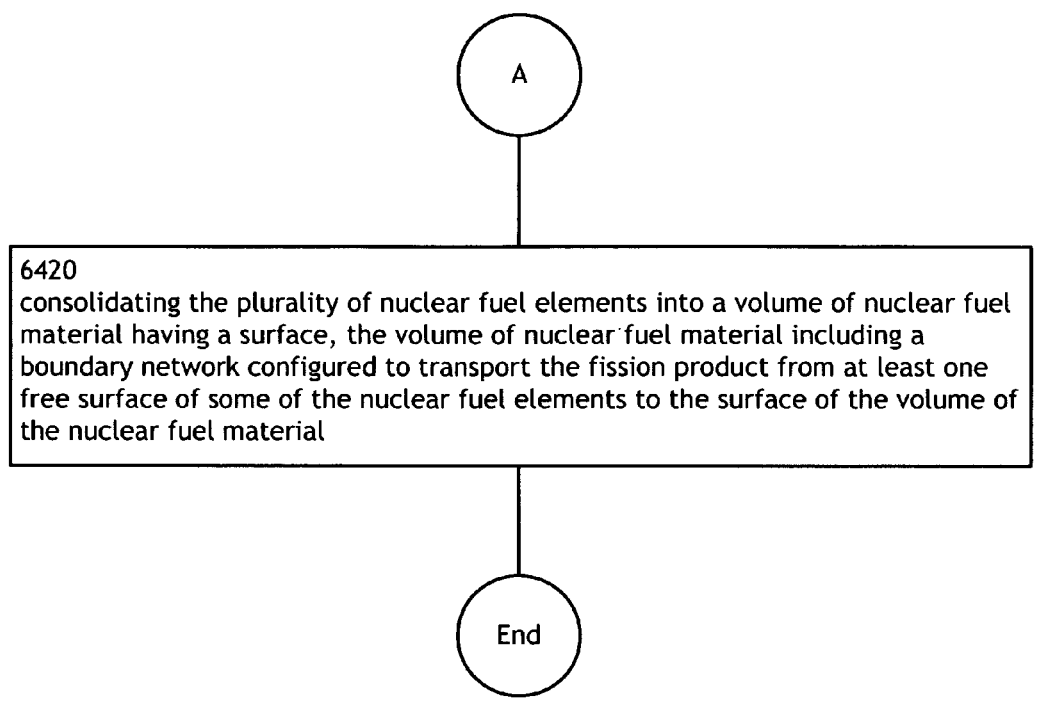

FIG. 76 illustrates alternative embodiments of the example operational flow 6400 of FIG. 64. FIG. 76 illustrates example embodiments where the operation 6410 may include at least one additional operation. Additional operations may include an operation 7602, an operation 7604, an operation 7606, an operation 7608, and/or an operation 7610.

The operation 7602 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operation condition of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel smaller than a selected distance, which is a function of an operation condition of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend upon an operational condition of the nuclear fuel 200.

Further, the operation 7604 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operational temperature of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of an operation temperature of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the operation temperature of the nuclear fuel 200.

Further, the operation 7606 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a temperature induced pressure of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel smaller than a selected distance, which is a function of a temperature induced pressure of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the temperature induced pressure within the nuclear reactor fuel 100.

The operation 7608 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to maximize heat transfer from a nuclear fuel element interior to a free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the dimension of the nuclear fuel elements is selected in order to maximize heat transfer from the interiors 210 of the nuclear fuel elements 204 to the surfaces 212 of the nuclear fuel elements 204 of the nuclear fuel 200. For instance, a dimension of the nuclear fuel elements 204 to be minimized may be selected in order maximize (or at least improve) heat transfer from the interiors 210 of the nuclear fuel elements 204 to the surfaces 212 of the nuclear fuel elements 204.

Further, the operation 7610 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to be substantially parallel with a thermal gradient in a nuclear fuel element interior in some of in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the at least one dimension is selected to be substantially parallel with a thermal gradient in a grain interior in some of the nuclear fuel elements. For instance, in order to maximize diffusion of a fission gas 118 from the interiors 210 of the nuclear fuel elements 204 to the surfaces 212 of the nuclear fuel elements 204 a "thin" dimension of the nuclear fuel elements 204 may be arranged so as to align substantially perpendicular to the direction of a thermal gradient within the nuclear reactor fuel 100.

Figure 77:
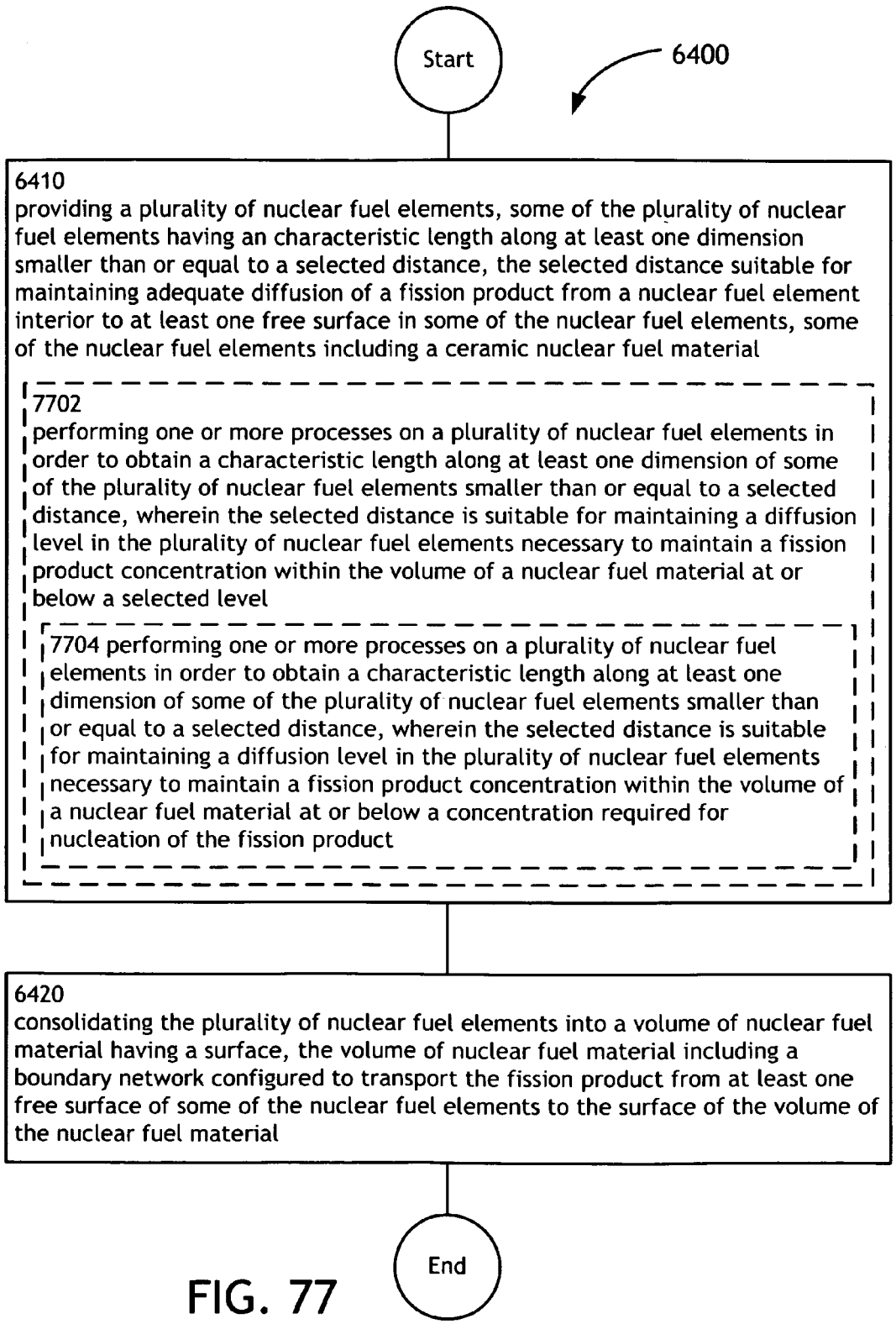

FIG. 77 illustrates alternative embodiments of the example operational flow 6400 of FIG. 64. FIG. 77 illustrates example embodiments where the operation 6410 may include at least one additional operation. Additional operations may include an operation 7702, and/or an operation 7704.

The operation 7702 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a selected level. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, which is selected in order to maintain a fission product 108 (e.g., fission gas 118) concentration within the volume 102 of the nuclear fuel 100 at or below a selected level. For instance, the rate of diffusion from the interiors 210 of the nuclear fuel elements 204 to the surfaces 212 of the nuclear fuel elements 204 in the nuclear fuel elements 204 may be inversely related to the average nuclear fuel element size 206 within the nuclear fuel 200. In this sense, as the nuclear fuel element sizes 206 of the nuclear fuel elements 204 decrease, the fission gas 118 diffusion rate from the interiors 210 of the nuclear fuel elements 204 to the surfaces 212 of the nuclear fuel elements 204 may increase. Therefore, the concentration of a fission gas 118 within the nuclear fuel elements 204 may be adjusted to fall within acceptable concentration levels by engineering the nuclear fuel element sizes 206 of the nuclear fuel elements 204 of the nuclear fuel 200.

Further, the operation 7704 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a concentration required for nucleation of the fission product. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain a selected fission product 108 concentration below a concentration level required for nucleation of the fission product 108 within an interior 210 of a nuclear fuel element 204. For instance, the concentration of a fission gas 118 within the nuclear fuel elements 204 may be adjusted to fall below the concentration level required for fission gas nucleation within the interiors 210 of the nuclear fuel elements 204 by engineering the nuclear fuel element sizes 206 of the nuclear fuel elements 204 of the nuclear fuel 200.

Figure 78:
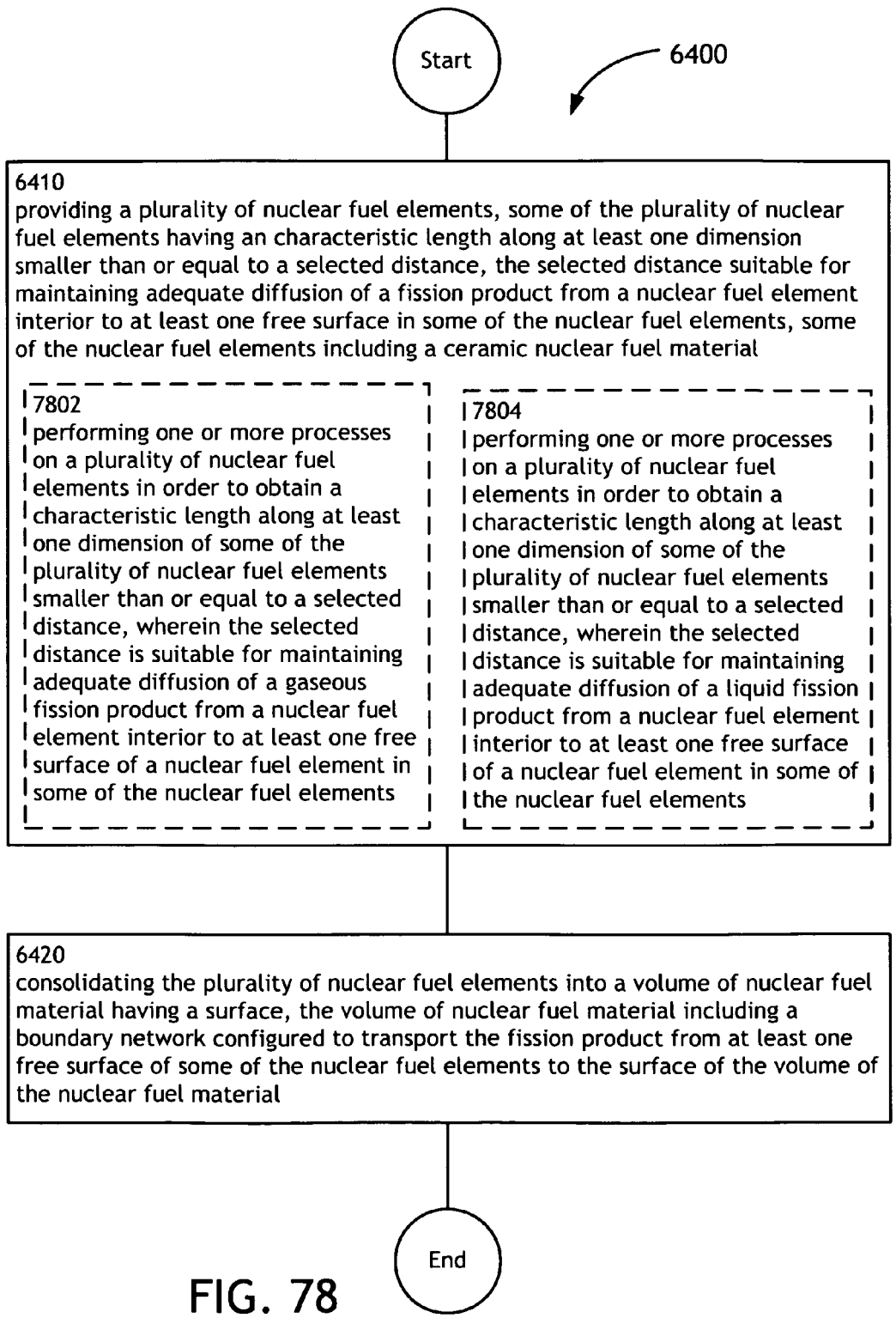

FIG. 78 illustrates alternative embodiments of the example operational flow 6400 of FIG. 64. FIG. 78 illustrates example embodiments where the operation 6410 may include at least one additional operation. Additional operations may include an operation 7802, and/or an operation 7804.

The operation 7802 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a gaseous fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a gaseous fission product (e.g., krypton or xenon) from the interiors 210 of the nuclear fuel elements 204 to the surfaces 212 of the nuclear fuel elements 204.

The operation 7804 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a liquid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a liquid fission product (e.g., a liquid metal) from the interiors 210 of the nuclear fuel elements 204 to the surfaces 212 of the nuclear fuel elements 204.

Figure 79:
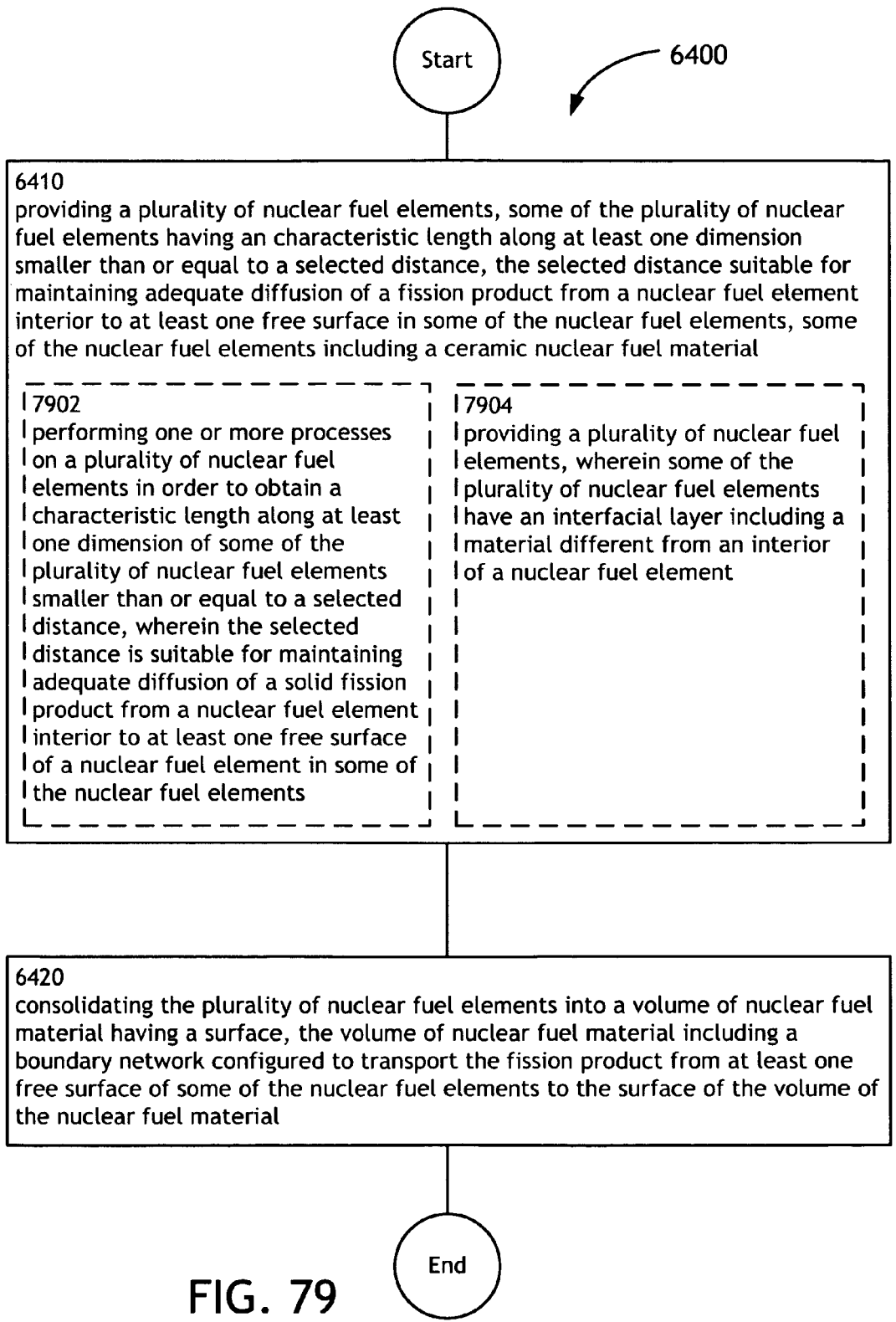

FIG. 79 illustrates alternative embodiments of the example operational flow 6400 of FIG. 64. FIG. 79 illustrates example embodiments where the operation 6410 may include at least one additional operation. Additional operations may include an operation 7902, and/or an operation 7904.

The operation 7902 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a solid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a solid fission product (e.g., tellurium or cesium) from the interiors 210 of the nuclear fuel elements 204 to the surfaces 212 of the nuclear fuel elements 204.

The operation 7904 illustrates providing a plurality of nuclear fuel elements, wherein some of the plurality of nuclear fuel elements have an interfacial layer including a material different from an interior of a nuclear fuel element. For example, as shown in FIG. 2G, one or more of the nuclear fuel elements 204 of the nuclear fuel 200 may include an interfacial layer of a material different from the material within the interiors 210 of the nuclear fuel elements 204. For instance, the nuclear fuel elements 204 may include an oxide-based, nitride-based, or carbide-based interfacial layer.

Figure 80:
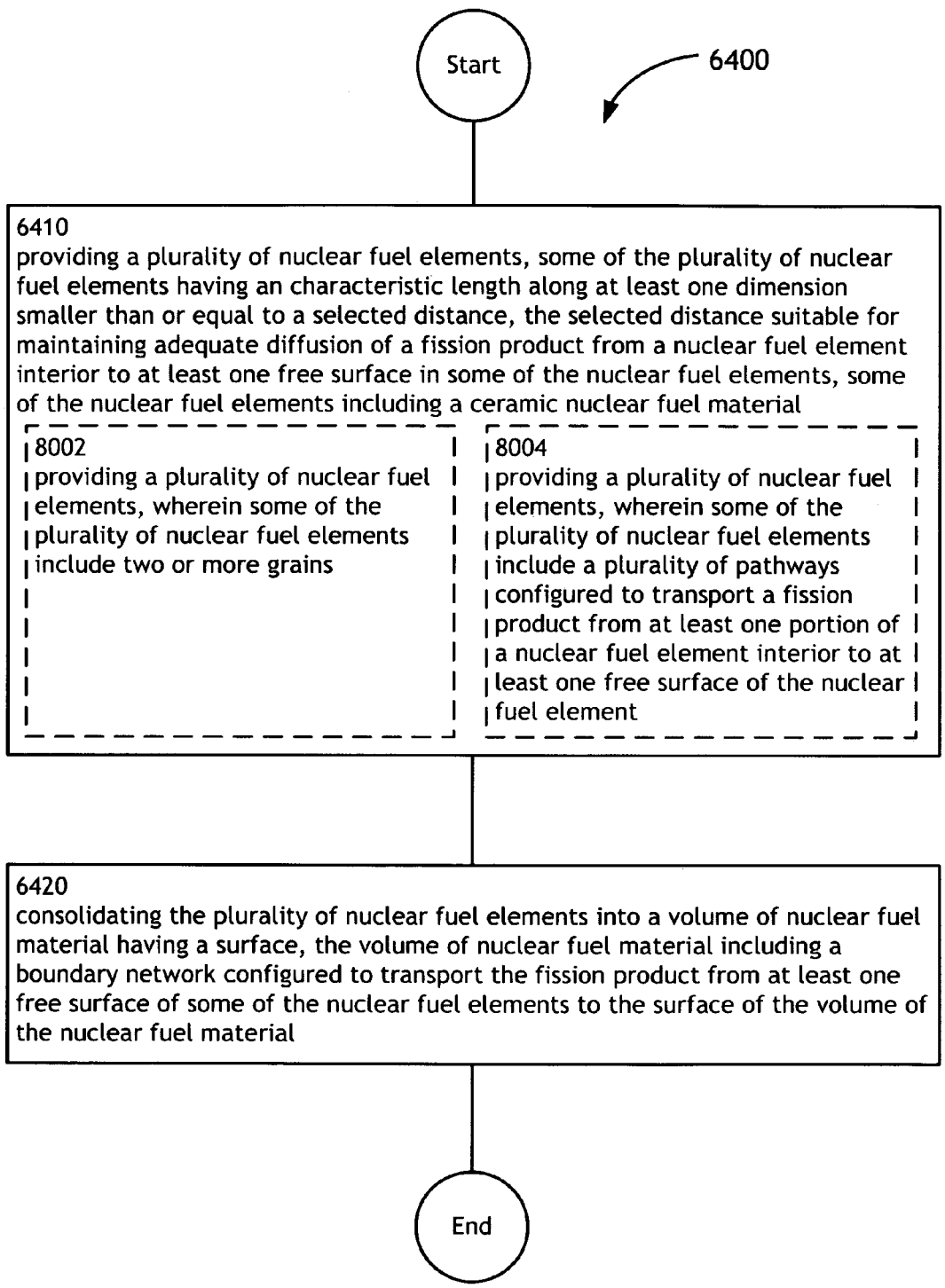

FIG. 80 illustrates alternative embodiments of the example operational flow 6400 of FIG. 64. FIG. 80 illustrates example embodiments where the operation 6410 may include at least one additional operation. Additional operations may include an operation 8002, and/or an operation 8004.

The operation 8002 illustrates providing a plurality of nuclear fuel elements, wherein some of the plurality of nuclear fuel elements include two or more grains. For example, as shown in FIG. 2F, one or more of the nuclear fuel elements 204 of the nuclear fuel 200 may include two or more grains (i.e., the nuclear fuel elements 204 are polycrystalline).

The operation 8004 illustrates providing a plurality of nuclear fuel elements, wherein some of the plurality of nuclear fuel elements include a plurality of pathways configured to transport a fission product from at least one portion of a nuclear fuel element interior to at least one free surface of the nuclear fuel element. For example, as shown in FIG. 2F, one or more of the nuclear fuel elements 204 of the nuclear fuel 200 may include one or more internal pathways suitable for transporting fission gas 118 from the nuclear fuel element interior 210 to the nuclear fuel element surface 212. Moreover, as previously described herein, the internal pathways 110 may be defined by a grain-boundary 112 between adjacent grains within a common nuclear fuel element 204.

Figure 81:
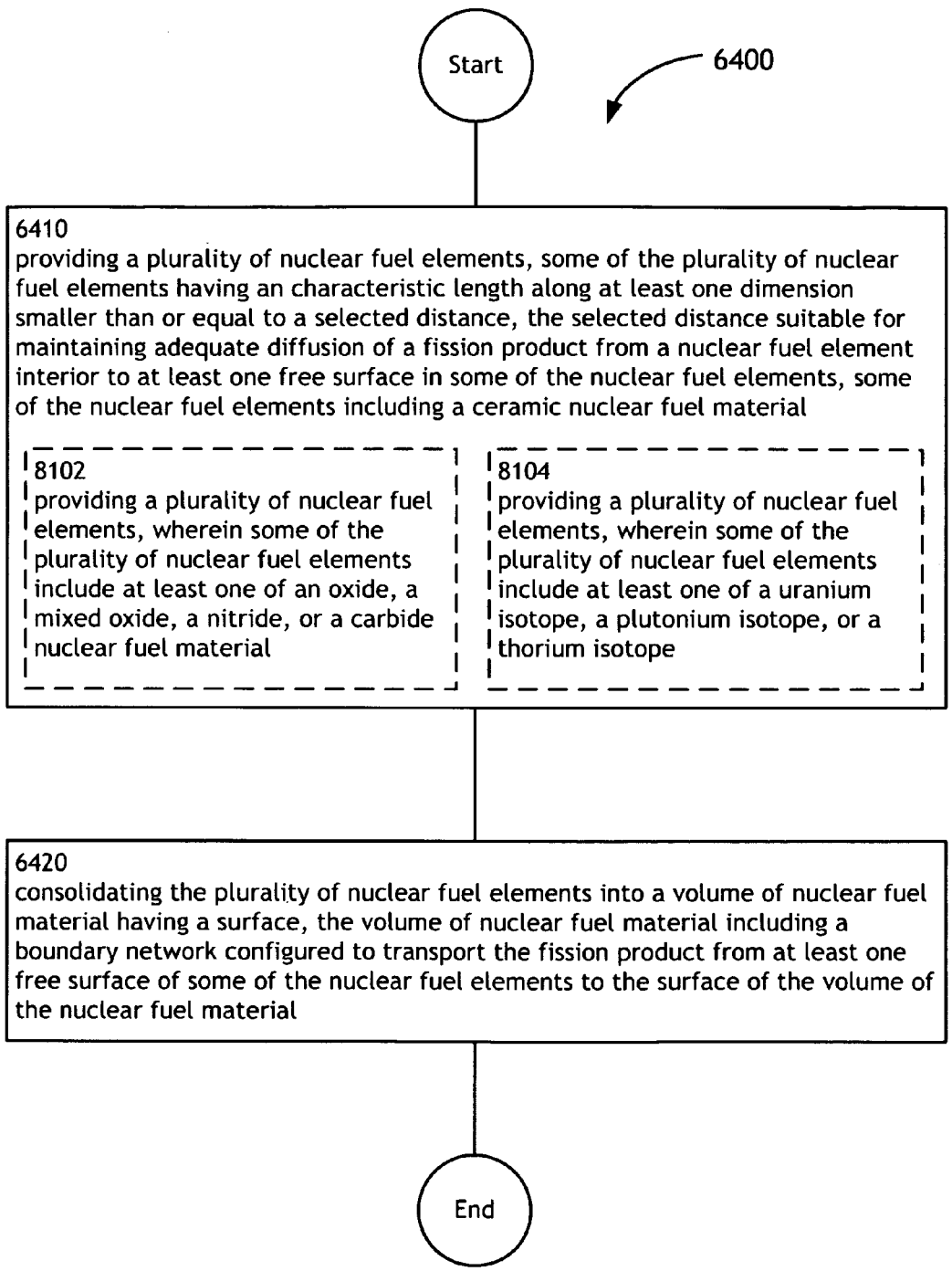

FIG. 81 illustrates alternative embodiments of the example operational flow 6400 of FIG. 64. FIG. 81 illustrates example embodiments where the operation 6410 may include at least one additional operation. Additional operations may include an operation 8102, and/or an operation 8104.

The operation 8102 illustrates providing a plurality of nuclear fuel elements, wherein some of the plurality of nuclear fuel elements include at least one of an oxide, a mixed oxide, a nitride, or a carbide nuclear fuel material. For example, as shown in FIGS. 1A through 4, the provided nuclear fuel elements 204 may include a ceramic based nuclear fuel material. For instance, the plurality of nuclear fuel elements 204 of the nuclear fuel 200 may include, but is not limited to, metal oxide material (e.g., uranium dioxide, plutonium dioxide, or thorium dioxide), a metal nitride fuel material (e.g., uranium nitride), or metal carbide fuel material (e.g., uranium carbide).

The operation 8104 illustrates providing a plurality of nuclear fuel elements, wherein some of the plurality of nuclear fuel elements include at least one of a uranium isotope, a plutonium isotope, or a thorium isotope. For example, as shown in FIGS. 1A through 4, the provided nuclear fuel elements 204 may include a fissile nuclear material including, but not limited to, uranium-235 or plutonium-239. By way of another example, the provided nuclear fuel elements 204 may include a non-fissile nuclear material including, but not limited to, thorium-232. While thorium-232 is not by itself fissile, it may be utilized to breed uranium-233, which is fissile in nature.

Figure 82:
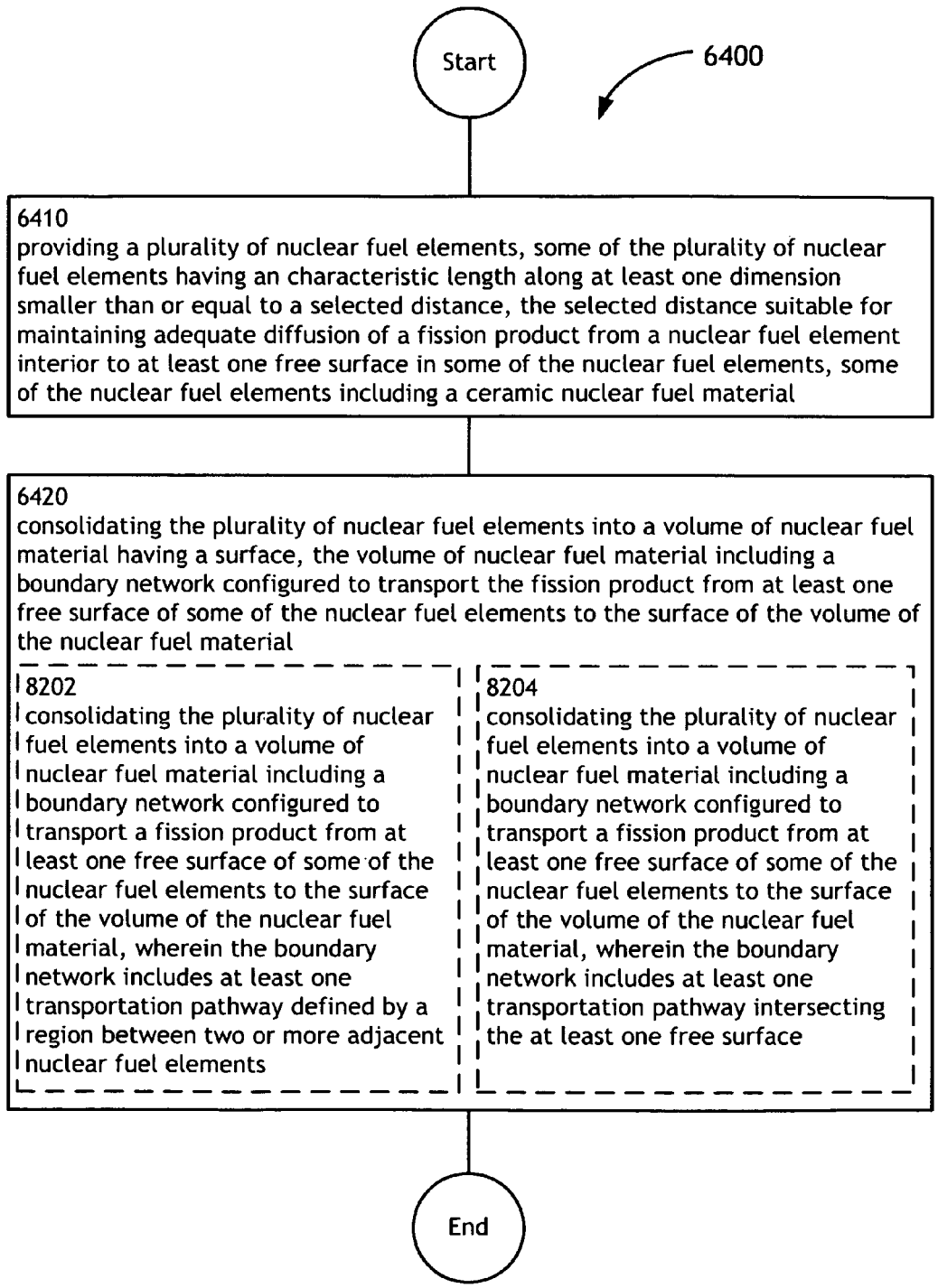

FIG. 82 illustrates alternative embodiments of the example operational flow 6400 of FIG. 64. FIG. 82 illustrates example embodiments where the operation 6420 may include at least one additional operation. Additional operations may include an operation 8202, and/or an operation 8204.

The operation 8202 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes at least one transportation pathway defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216.

The operation 8204 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes at least one transportation pathway intersecting the at least one free surface. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216 intersecting a surface 212 of one or more nuclear fuel elements 204. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216 intersecting a surface 212 of one or more nuclear fuel elements 204.

Figure 83:
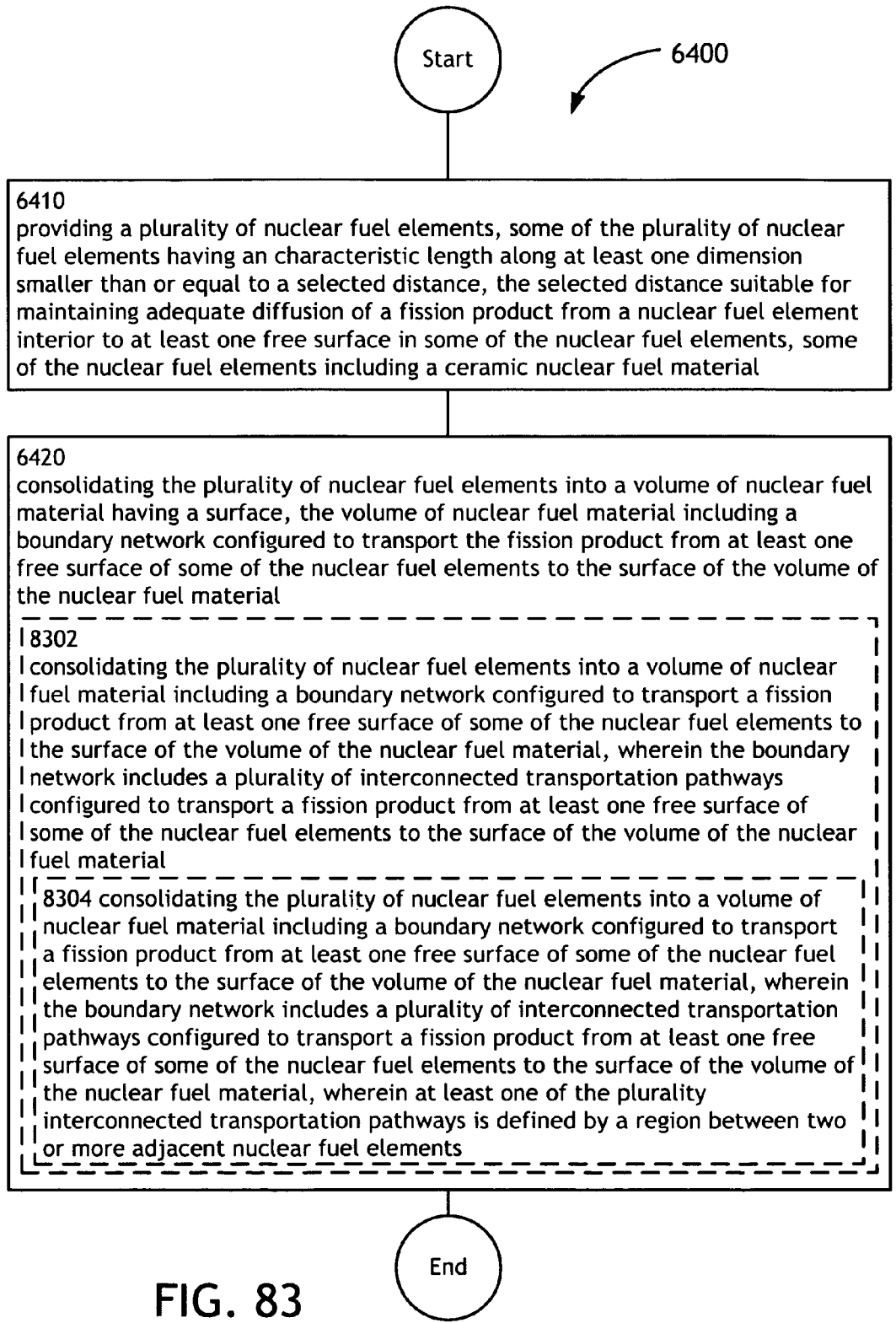

FIG. 83 illustrates alternative embodiments of the example operational flow 6400 of FIG. 64. FIG. 83 illustrates example embodiments where the operation 6420 may include at least one additional operation. Additional operations may include an operation 8302, and/or an operation 8304.

The operation 8302 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 plurality of interconnected transportation pathways 216 configured to transport a fission product 118 from the surfaces 212 of the nuclear fuel elements 204 to the geometric surface 201 of the nuclear fuel 200. By way of further example, FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 configured to transport a fission product 118 from the surfaces 212 of the nuclear fuel elements 204 to the geometric surface 201 of the nuclear fuel 200.

Further, the operation 8304 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material, wherein at least one of the plurality interconnected transportation pathways is defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by a region between two or more adjacent nuclear fuel elements. 204 and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 84:
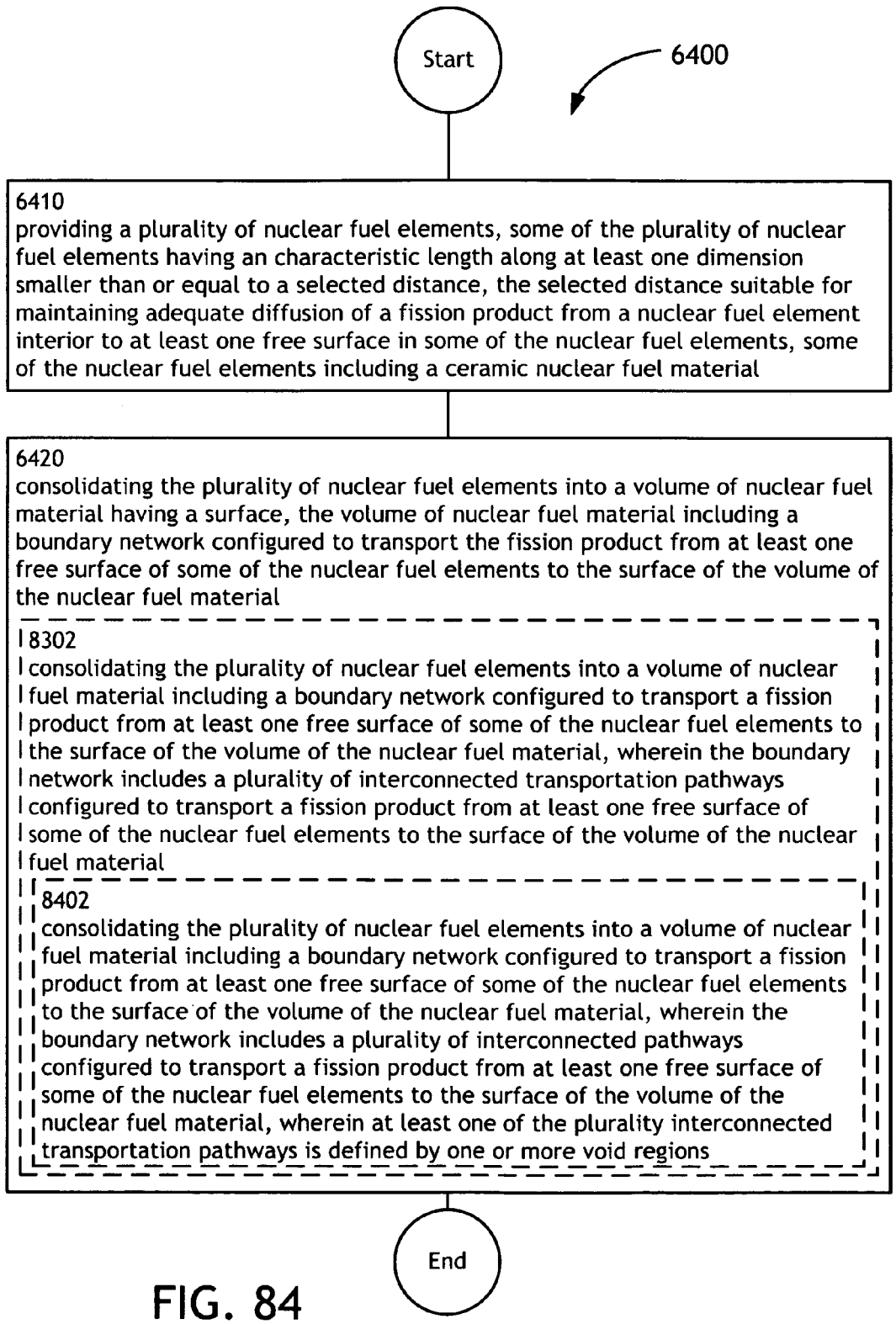

FIG. 84 illustrates alternative embodiments of the example operational flow 6400 of FIG. 64. FIG. 84 illustrates example embodiments where the operation 6420 may include at least one additional operation. Additional operations may include an operation 8402.

Further, the operation 8402 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes a plurality of interconnected pathways configured to transport a fission product from at least one free surface of some of the nuclear fuel elements to the surface of the volume of the nuclear fuel material, wherein at least one of the plurality interconnected transportation pathways is defined by one or more void regions. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by one or more void regions and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 85:
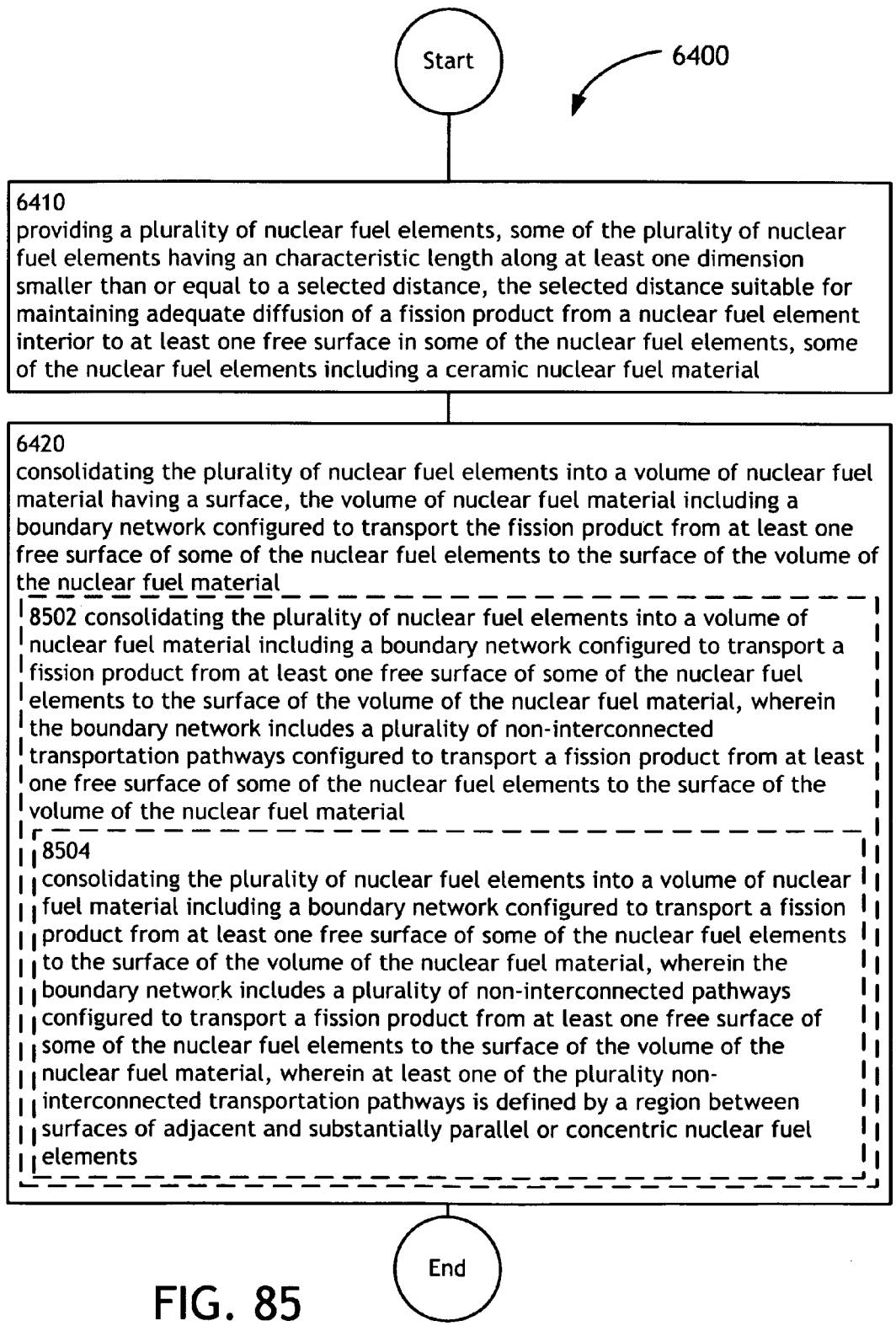

FIG. 85 illustrates alternative embodiments of the example operational flow 6400 of FIG. 64. FIG. 85 illustrates example embodiments where the operation 6420 may include at least one additional operation. Additional operations may include an operation 8502, and/or an operation 8504.

The operation 8502 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes a plurality of non-interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 configured to transport a fission product 118 from the surfaces 212 of the nuclear fuel elements 204 to the geometric surface 201 of the nuclear fuel 200.

Further, the operation 8504 illustrates consolidating the plurality of nuclear fuel elements into a volume of nuclear fuel material including a boundary network configured to transport a fission product from at least one free surface of some of the nuclear fuel elements to the surface of the volume of the nuclear fuel material, wherein the boundary network includes a plurality of non-interconnected pathways configured to transport a fission product from at least one free surface of some of the nuclear fuel elements to the surface of the volume of the nuclear fuel material, wherein at least one of the plurality non-interconnected transportation pathways is defined by a region between surfaces of adjacent and substantially parallel or concentric nuclear fuel elements. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 defined by a region between surfaces of adjacent and substantially parallel or concentric nuclear fuel elements 204.

Figure 86:
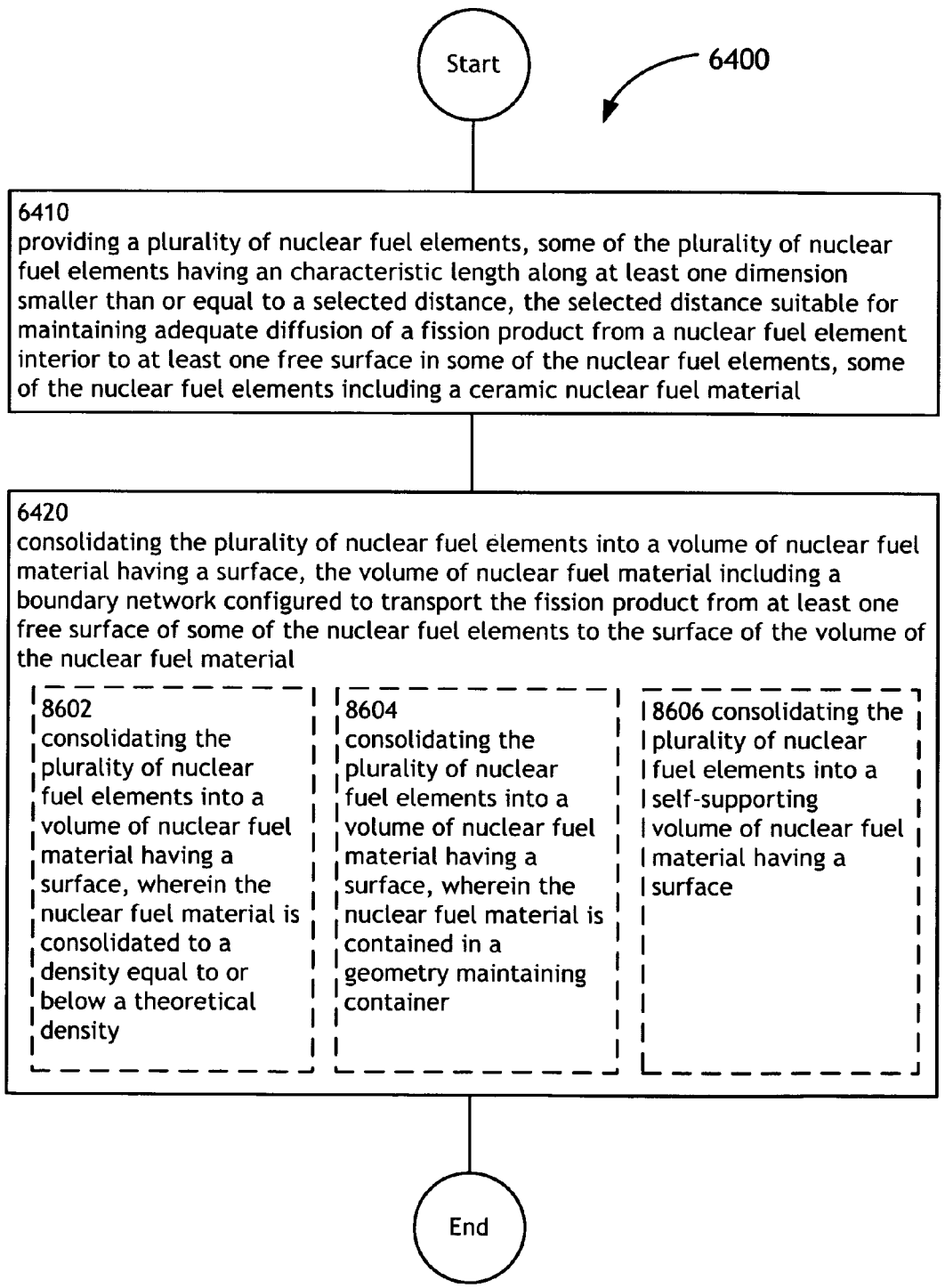

FIG. 86 illustrates alternative embodiments of the example operational flow 6400 of FIG. 64. FIG. 86 illustrates example embodiments where the operation 6420 may include at least one additional operation. Additional operations may include an operation 8602, an operation 8604, and/or an operation 8606.

The operation 8602 illustrates consolidating the plurality of nuclear fuel elements into a volume of nuclear fuel material having a surface, wherein the nuclear fuel material is consolidated to a density equal to or below a theoretical density. For example, as shown in FIGS. 1A through 4, the consolidation process (e.g., compacting, sintering, or the like) used to create the volume 202 of consolidated nuclear fuel 200 may produce a nuclear fuel piece having a selected density, wherein the selected density is less than the theoretical density. For instance, the nuclear fuel 200 may be consolidated to a density of between 65% to 99% of the theoretical density.

The operation 8604 illustrates consolidating the plurality of nuclear fuel elements into a volume of nuclear fuel material having a surface, wherein the nuclear fuel material is contained in a geometry maintaining container. For example, as shown in FIGS. 1A through 4, the plurality of nuclear fuel elements 204 may be compacted into a fuel containing vessel or container suitable for maintaining the shape of the nuclear fuel piece.

The operation 8606 illustrates consolidating the plurality of nuclear fuel elements into a self-supporting volume of nuclear fuel material having a surface. For example, as shown in FIGS. 1A through 4, a metal oxide powder, such as uranium-dioxide, may be formed into a self-supporting geometry via a compacting and sintering.

Figure 87:
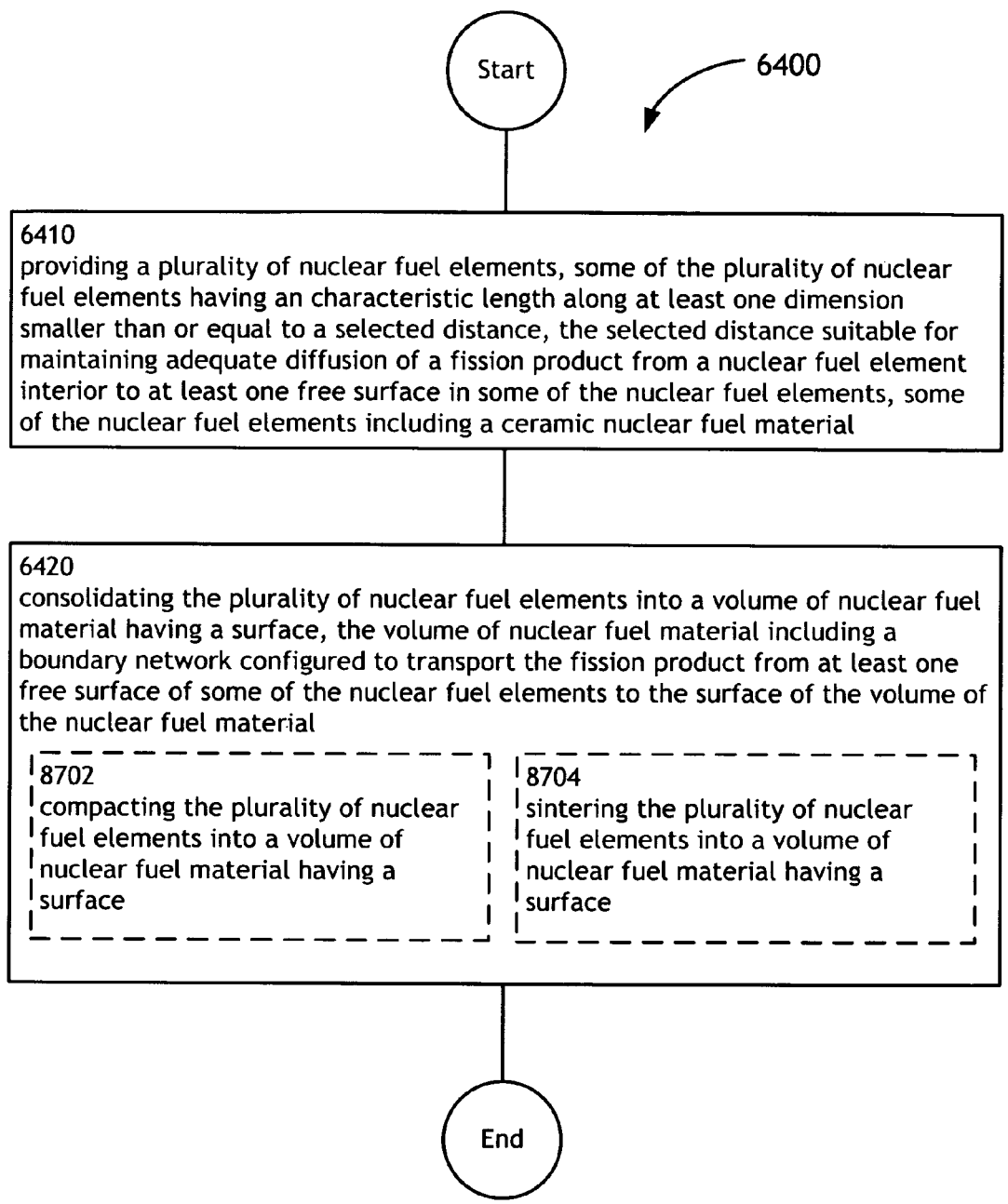

FIG. 87 illustrates alternative embodiments of the example operational flow 6400 of FIG. 64. FIG. 87 illustrates example embodiments where the operation 6420 may include at least one additional operation. Additional operations may include an operation 8702, and/or an operation 8704.

The operation 8702 illustrates compacting the plurality of nuclear fuel elements into a volume of nuclear fuel material having a surface. For example, as shown in FIGS. 1A through 4, a plurality of nuclear fuel elements 204, such as a metal oxide powder (e.g., uranium dioxide powder), may be placed in a mold and compacted to form a self-supporting fuel pellet.

The operation 8704 illustrates sintering the plurality of nuclear fuel elements into a volume of nuclear fuel material having a surface. For example, as shown in FIGS. 1A through 4, a plurality of nuclear fuel elements 204, such as a metal oxide powder (e.g., uranium dioxide powder), may be placed in a mold and compacted and sintered to form a self-supporting fuel pellet.

Figure 88:
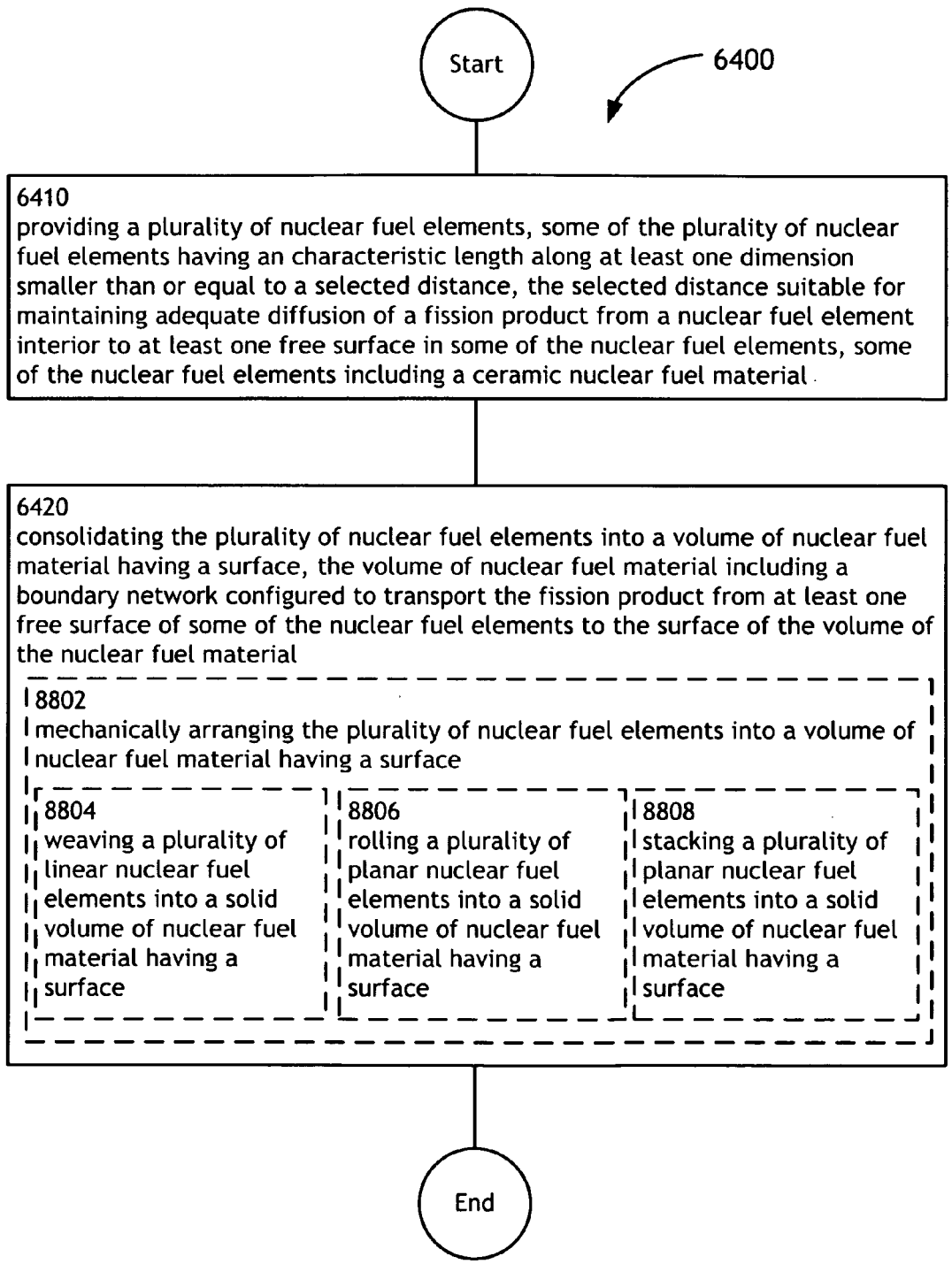

FIG. 88 illustrates alternative embodiments of the example operational flow 6400 of FIG. 64. FIG. 88 illustrates example embodiments where the operation 6420 may include at least one additional operation. Additional operations may include an operation 8802, an operation 8804, an operation 8806, and/or an operation 8808.

The operation 8802 illustrates mechanically arranging the plurality of nuclear fuel elements into a volume of nuclear fuel material having a surface. For example, as shown in FIGS. 1A through 4, a plurality of nuclear fuel elements 204, such as a plurality of ceramic nuclear fuel elements, may be mechanically arranged into a volume 202 of nuclear fuel 200.

Further, the operation 8804 illustrates weaving a plurality of linear nuclear fuel elements into a solid volume of nuclear fuel material having a surface. For example, as shown in FIG. 2J, a plurality of nuclear fuel elements 204, such as a plurality of ceramic nuclear fuel elements, may be woven into a woven structure 224 of nuclear fuel 200.

Further, the operation 8806 illustrates rolling a plurality of planar nuclear fuel elements into a solid volume of nuclear fuel material having a surface. For example, as shown in FIG. 2I, a nuclear fuel element 204, such as a ceramic planar sheet, or a sheet containing a ceramic nuclear fuel material, may be rolled into a cylindrical volume 222. It is further recognized that two or more of the cylindrical rolled volumes 222 may be combined to form a nuclear fuel 200.

Further, the operation 8808 illustrates stacking a plurality of planar nuclear fuel elements into a solid volume of nuclear fuel material having a surface. For example, as shown in FIG. 2H, two or more nuclear fuel elements 204, such as a metal oxide or metal carbide planar sheet, may be stacked together in order to form a volume of nuclear fuel 200.

Figure 89:
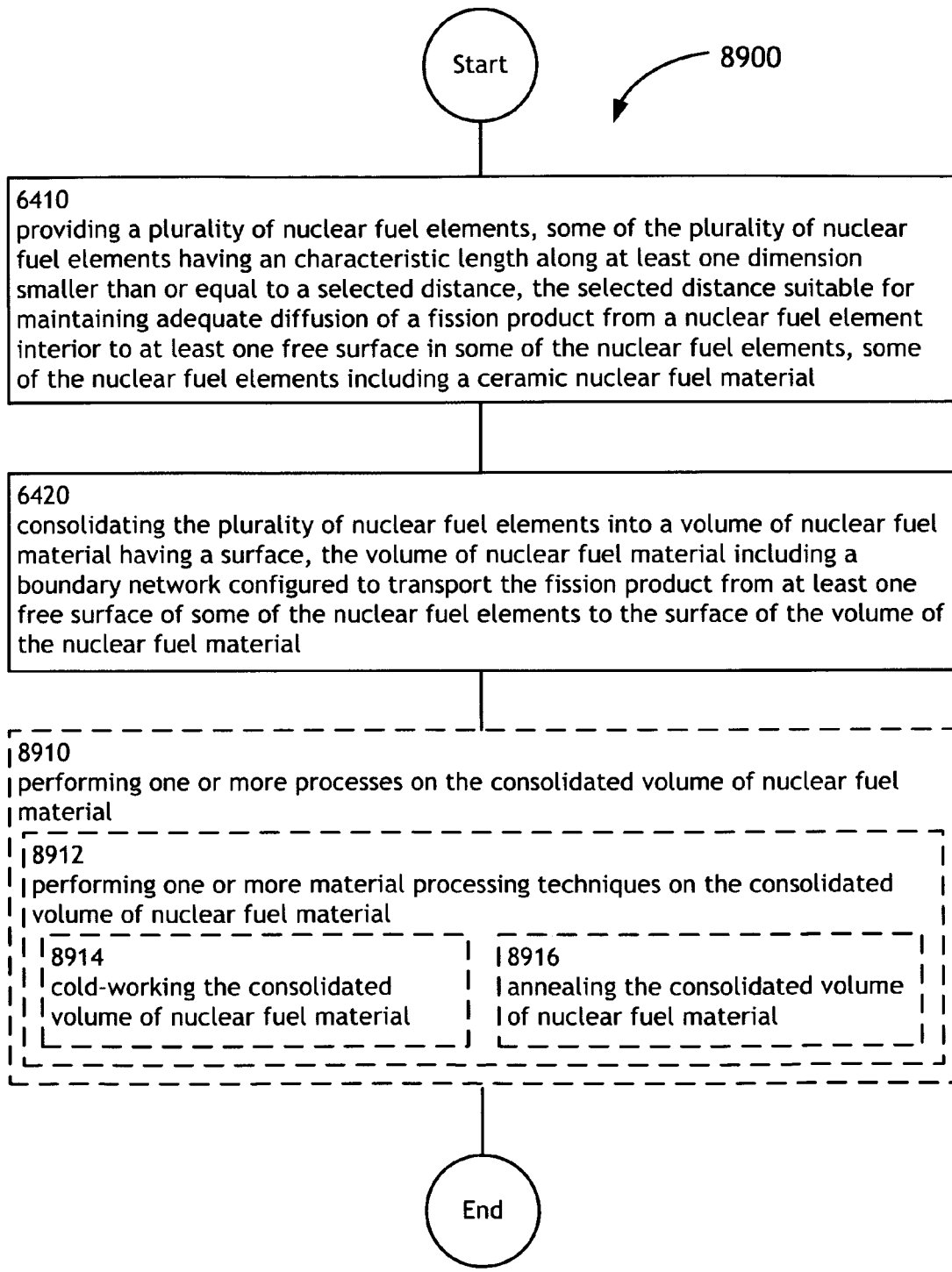

FIG. 89 illustrates an operational flow 8900 representing example operations related to a method for fabricating nuclear fuel. FIG. 89 illustrates an example embodiment where the example operational flow 6400 of FIG. 64 may include at least one additional operation. Additional operations may include an operation 8910, an operation 8912, an operation 8914, and/or an operation 8916.

After a start operation, an operation 6410, and an operation 6420, the operational flow 8900 moves to a processing operation 8910. Operation 8910 illustrates performing one or more processes on the consolidated volume of nuclear fuel material. For example, as shown in FIGS. 1A through 4, one or more process steps may be performed on the volume 202 of nuclear fuel 200.

The operation 8912 illustrates performing one or more material processing techniques on the consolidated volume of nuclear fuel material. For example, as shown in FIGS. 1A through 4, one or more material processing techniques may be performed on the volume 202 of nuclear fuel 200 in order to further refine the sizes of the nuclear elements 204 or the boundary network 214 of the nuclear fuel 200.

Further, the operation 8914 illustrates cold-working the consolidated volume of nuclear fuel material. For example, as shown in FIGS. 1A through 4, the consolidated volume 202 of nuclear fuel 200 may be cold-worked in order to further refine the sizes of the nuclear elements 204 or the boundary network 214 of the nuclear fuel 200. The cold-working process may include, but is not limited to, cold-rolling, extruding at low temperature, bending, compression, or drawing.

Further, the operation 8916 illustrates annealing the consolidated volume of nuclear fuel material. For example, as shown in FIGS. 1A through 4, the consolidated volume 202 of nuclear fuel material may be annealed. For instance, after being cold-worked, the nuclear reactor fuel 200 may be annealed in order to further refine the sizes of the nuclear elements 204 or the boundary network 214 of the nuclear fuel 200.

Figure 90:
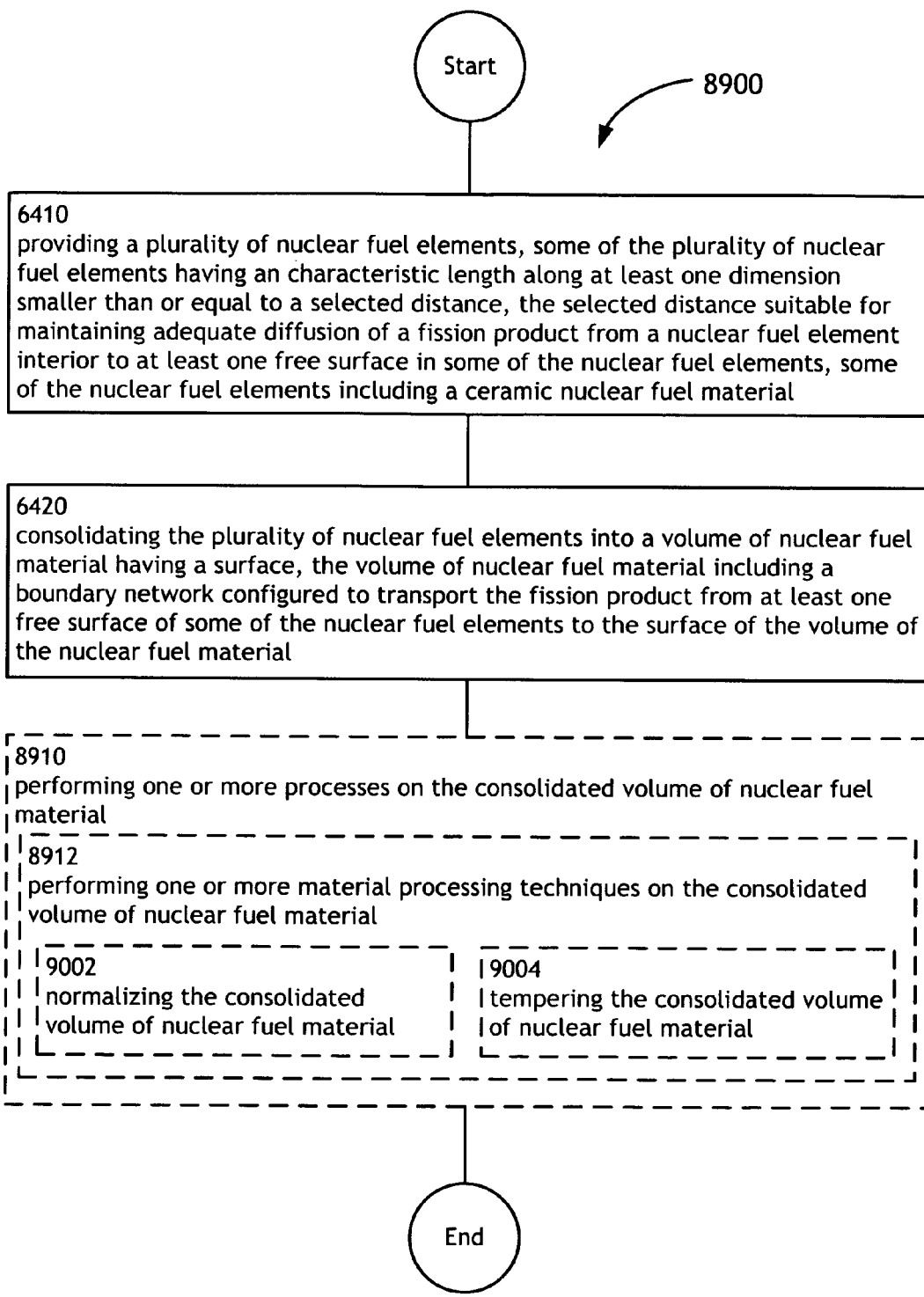

FIG. 90 illustrates alternative embodiments of the example operational flow 8900 of FIG. 89. FIG. 90 illustrates example embodiments where the operation 8910 may include at least one additional operation. Additional operations may include an operation 9002, and/or an operation 9004.

Further, the operation 9002 illustrates normalizing the consolidated volume of nuclear fuel material. For example, as shown in FIGS. 1A through 4, the consolidated volume 202 of nuclear fuel 200 may be normalized in order to further refine the sizes of the nuclear elements 204 or the boundary network 214 of the nuclear fuel 200.

Further, the operation 9004 illustrates tempering the consolidated volume of nuclear fuel material. For example, as shown in FIGS. 1A through 4, the consolidated volume 202 of nuclear fuel 200 may be tempered in order to further refine the sizes of the nuclear elements 204 or the boundary network 214 of the nuclear fuel 200.

Figure 91:
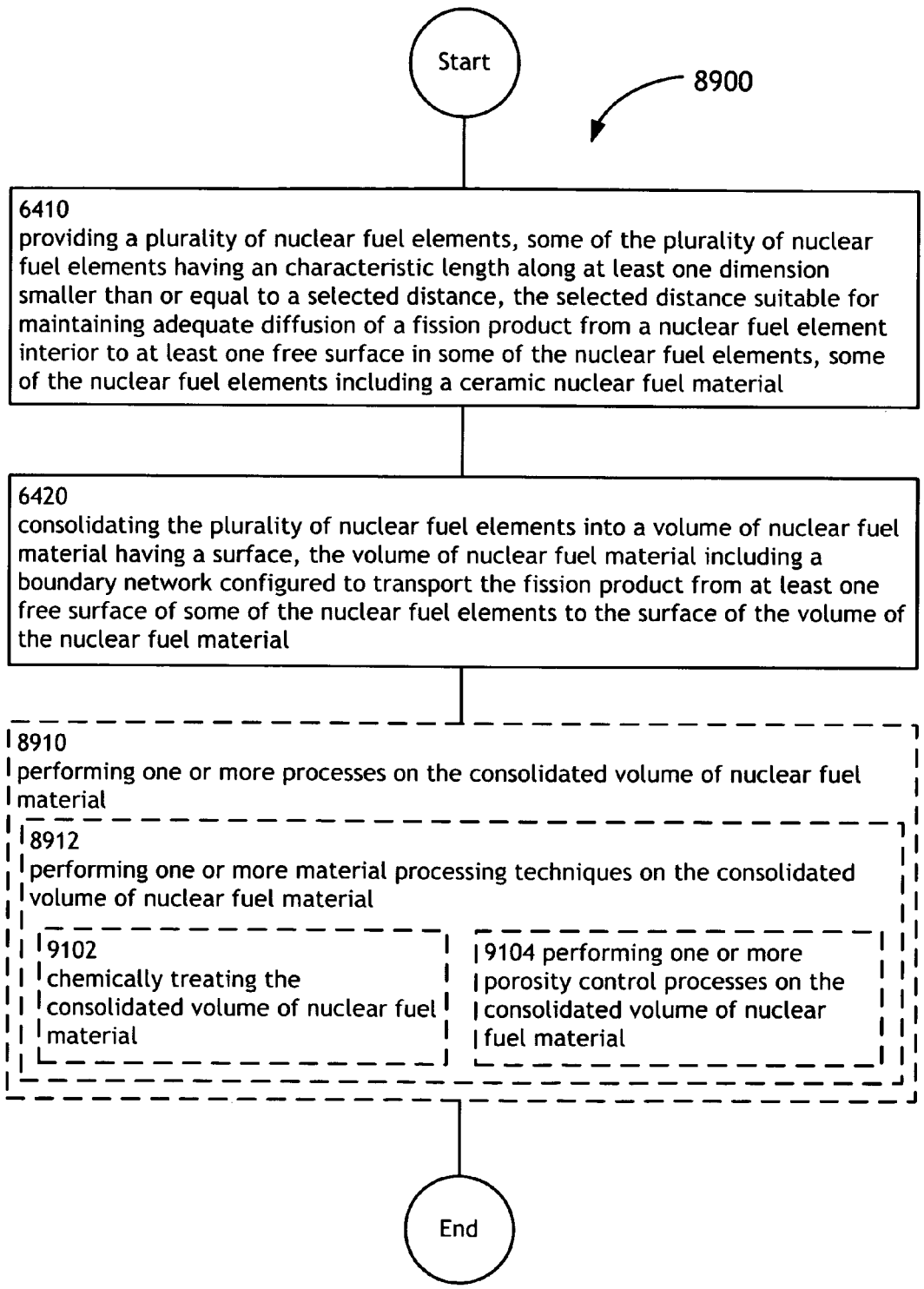

FIG. 91 illustrates alternative embodiments of the example operational flow 8900 of FIG. 89. FIG. 91 illustrates example embodiments where the operation 8910 may include at least one additional operation. Additional operations may include an operation 9102, and/or an operation 9104.

Further, the operation 9102 illustrates chemically treating the consolidated volume of nuclear fuel material. For example, as shown in FIGS. 1A through 4, the consolidated volume 202 of nuclear fuel 200 may be chemically treated in order to further refine the sizes of the nuclear elements 204 or the boundary network 214 of the nuclear fuel 200.

Further, the operation 9104 illustrates performing one or more porosity control processes on the consolidated volume of nuclear fuel material. For example, as shown in FIGS. 1A through 4, the consolidated volume 202 of nuclear fuel 200 may undergo a porosity control process (e.g., annealing or chemical treatment).

Figure 92:
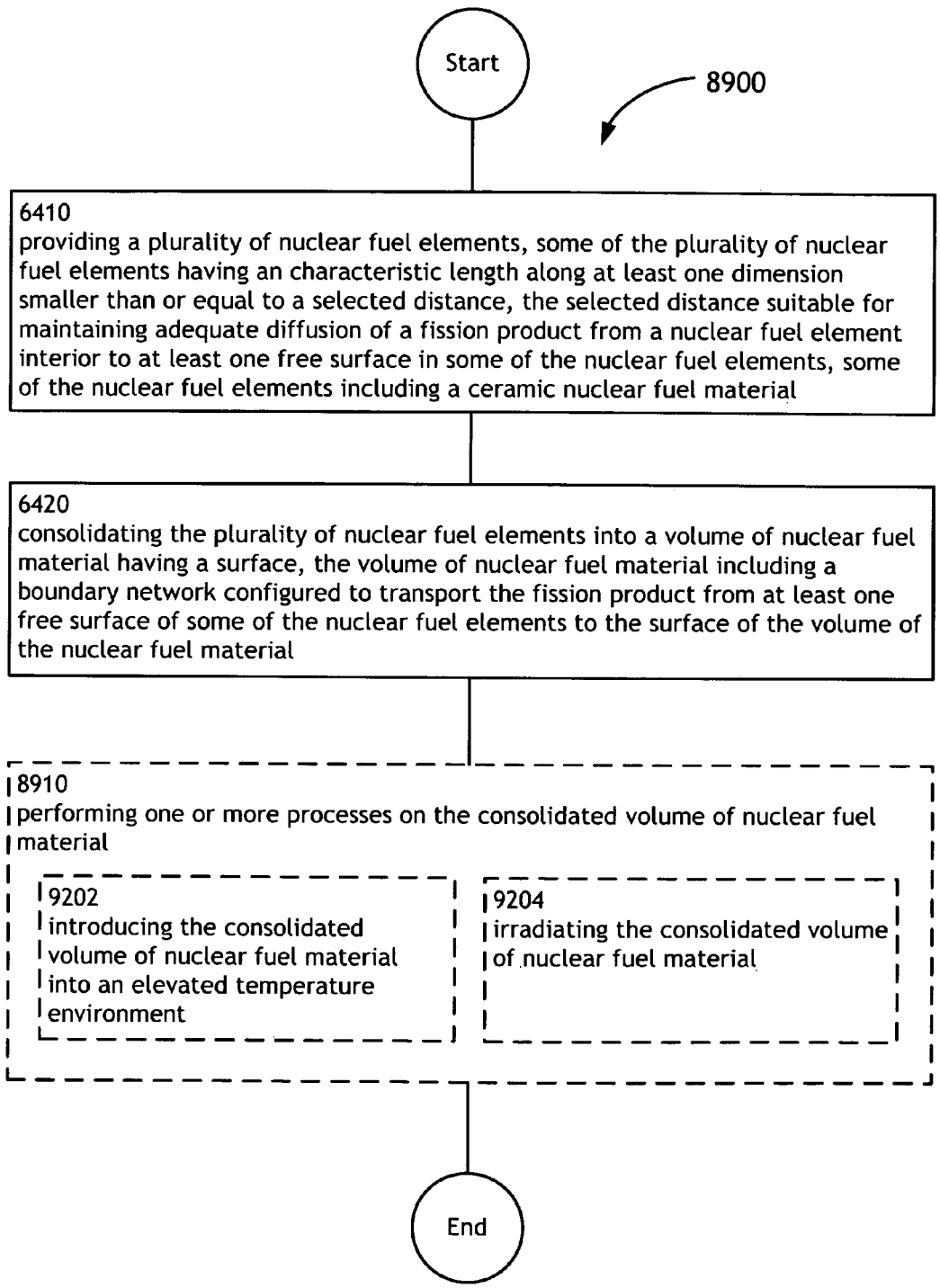

FIG. 92 illustrates alternative embodiments of the example operational flow 8900 of FIG. 89. FIG. 92 illustrates example embodiments where the operation 8910 may include at least one additional operation. Additional operations may include an operation 9202, and/or an operation 9204.

The operation 9202 illustrates introducing the consolidated volume of nuclear fuel material into an elevated temperature environment. For example, as shown in FIGS. 1A through 4, the consolidated volume 202 of nuclear fuel 200 may be introduced into a high temperature environment, such as a operation within a nuclear reactor.

The operation 9204 illustrates irradiating the consolidated volume of nuclear fuel material. For example, as shown in FIGS. 1A through 4, the consolidated volume 202 of nuclear fuel 200 may be irradiated (e.g., irradiated in nuclear reactor implementation or irradiated via neutron source) in order to refine the sizes of the nuclear fuel elements 204 or the boundary network 214.

Figure 93:
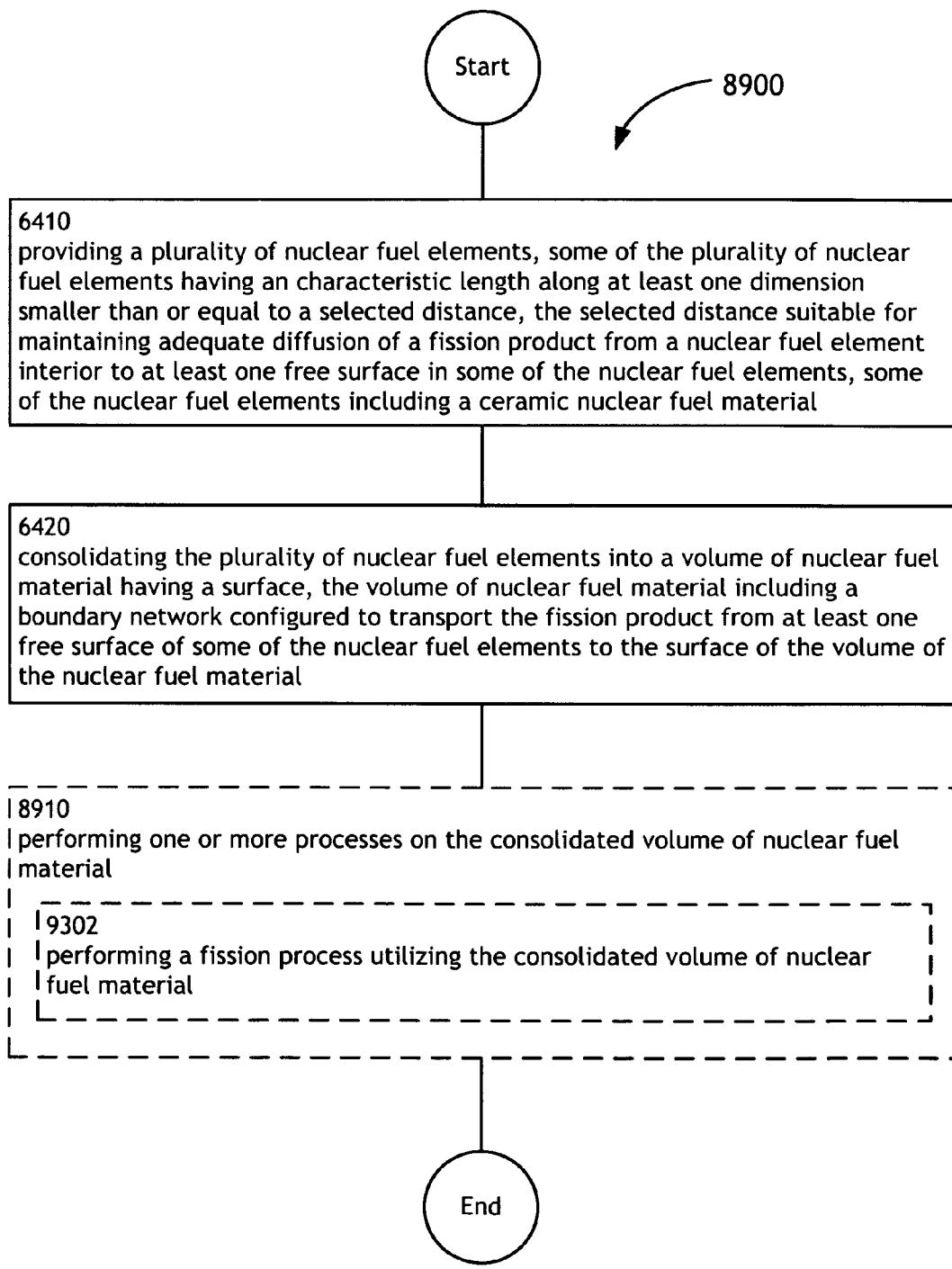

FIG. 93 illustrates alternative embodiments of the example operational flow 8900 of FIG. 89. FIG. 93 illustrates example embodiments where the operation 8910 may include at least one additional operation. Additional operations may include an operation 9302.

The operation 9302 illustrates performing a fission process utilizing the consolidated volume of nuclear fuel material. For example, as shown in FIGS. 1A through 4, the consolidated volume 202 of nuclear fuel 200 may be utilized in a fission process (e.g., utilized in a nuclear reactor). It is recognized that the sizes of the nuclear fission elements 204 may become more refined and/or the boundary network 214 of the nuclear fuel 200 may become more developed upon implementing the nuclear fuel 200 in a nuclear reactor 200.

Figure 94:
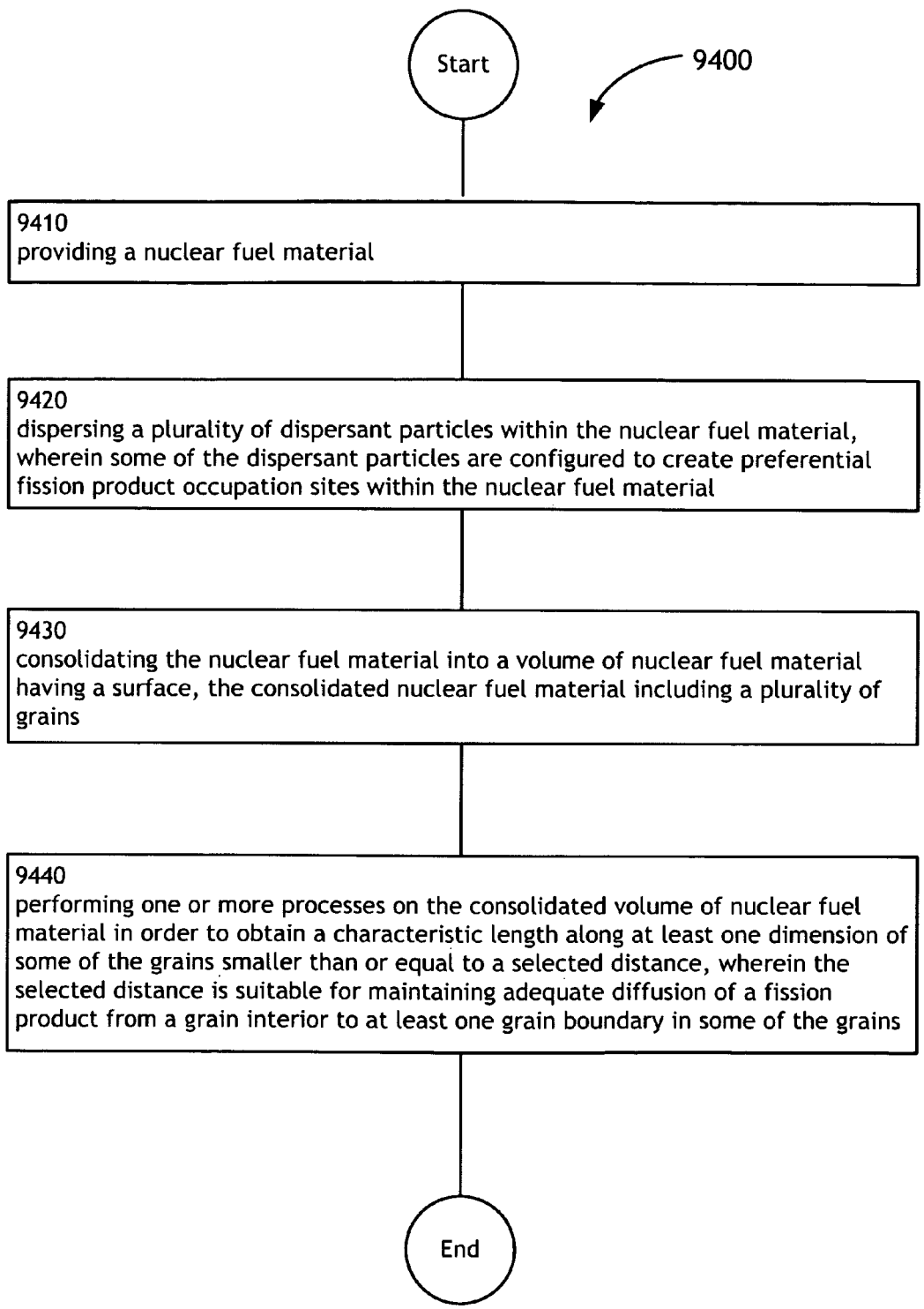
FIG. 94 is a high-level flowchart of a method for fabricating a nuclear fuel.

FIG. 94 illustrates an operational flow 9400 representing example operations related to a method for fabricating a nuclear fuel. In FIG. 94 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 9400 moves to a providing operation 9410. Operation 9410 depicts providing a nuclear fuel material. For example, as shown in FIGS. 1A through 4, a variety of nuclear fuel types may be provided, including, but not limited to, metal oxide nuclear materials or metal alloy nuclear fuel materials. Moreover, the provided nuclear fuel material may have undergone processing in order to reduce the particle size of the nuclear fuel to a desirable level. For instance, a volume of nuclear fuel material may undergo ball-milling (e.g., reactive) in order to achieve a desired average particle size.

Then, dispersing operation 9420 depicts dispersing a plurality of dispersant particles within the nuclear fuel material, wherein some of the dispersant particles are configured to create preferential fission product occupation sites within the nuclear fuel material. For example, as shown in FIGS. 1A through 4, the plurality of dispersant particles 318 may include, but is not limited to, a powder of particles of a selected material type. These particles may then be intermixed (e.g., dry mixing or wet mixing) with the provided nuclear fuel material. In another instance, the dispersant particles 318 may be dispersed into a molten metallic nuclear fuel material prior to casting of the nuclear fuel material.

Then, consolidating operation 9430 depicts consolidating the nuclear fuel material into a volume of nuclear fuel material having a surface, the consolidated nuclear fuel material including a plurality of grains. For example, as shown in FIGS. 1A through 4, the nuclear fuel material and the intermixed dispersant particles 318 may be consolidated into a volume 102 of nuclear fuel material having a plurality of grains 104. For instance, a volume 102 of metallic nuclear fuel material 124 may be cast from a molten phase into a solid nuclear fuel piece. In another instance, a ceramic nuclear fuel material 128 may be formed during a compaction and sintering process. The consolidated volume 102 of nuclear fuel material may then be provided for further processing.

Then, processing operation 9440 depicts performing one or more processes on the consolidated volume of nuclear fuel material in order to obtain a characteristic length along at least one dimension of some of the grains smaller than or equal to a selected distance, wherein the selected distance is suitable for maintaining adequate diffusion of a fission product from a grain interior to at least one grain boundary in some of the grains. For example, as shown in FIGS. 1A through 4, one or more process steps may be performed on the volume 102 of nuclear fuel material (e.g., fuel rod, fuel pellet, or fuel pebble) in order to reduce the grain sizes 106 of the grains 104 within the volume 102 of nuclear fuel material to a size below a critical size required for adequate diffusion of a fission product 108 from the interior 110 of the grains 104 to the grain-boundaries 112.

Figure 95:
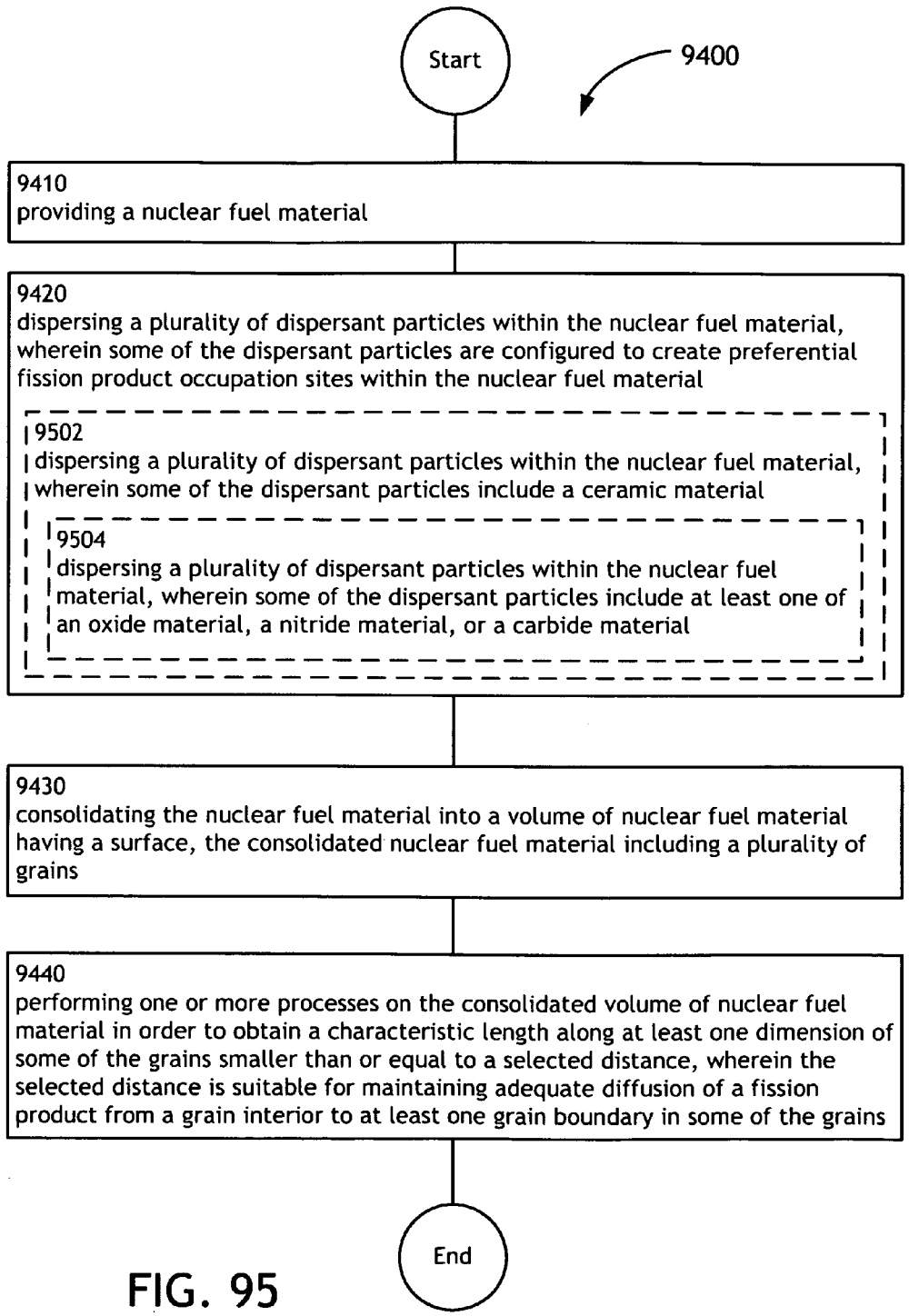
FIGS. 95 through 132 are high-level flowcharts depicting alternate implementations of FIG. 94.

FIG. 95 illustrates alternative embodiments of the example operational flow 9400 of FIG. 94. FIG. 95 illustrates example embodiments where the operation 9420 may include at least one additional operation. Additional operations may include an operation 9502, and/or an operation 9504.

The operation 9502 illustrates dispersing a plurality of dispersant particles within the nuclear fuel material, wherein some of the dispersant particles include a ceramic material. For example, the dispersant particles 318 may include one or more types of ceramic materials.

Further, the operation 9504 illustrates dispersing a plurality of dispersant particles within the nuclear fuel material, wherein some of the dispersant particles include at least one of an oxide material, a nitride material, or a carbide material. For example, the dispersant particles 318 may include, but are not limited to, one or more oxide particles, nitride particles, or carbide particles. For instance, some of the dispersant particles may include a stable oxide, such as zirconium dioxide.

Figure 96:
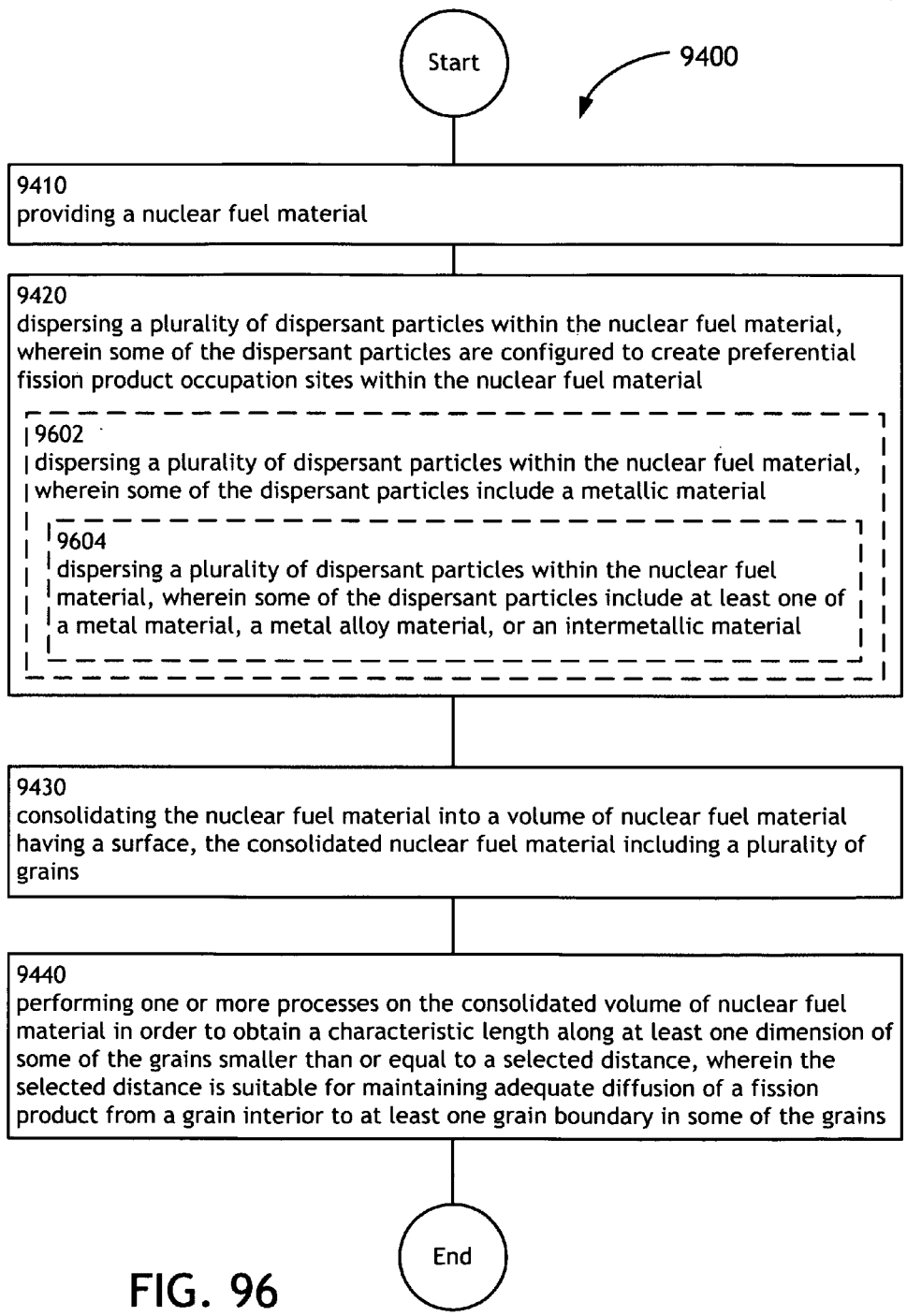

FIG. 96 illustrates alternative embodiments of the example operational flow 9400 of FIG. 94. FIG. 96 illustrates example embodiments where the operation 9420 may include at least one additional operation. Additional operations may include an operation 9602, and/or an operation 9604.

The operation 9602 illustrates dispersing a plurality of dispersant particles within the nuclear fuel material, wherein some of the dispersant particles include a metallic material. For example, the dispersant particles 318 may include one or more types of metallic materials.

Further, the operation 9604 illustrates dispersing a plurality of dispersant particles within the nuclear fuel material, wherein some of the dispersant particles include at least one of a metal material, a metal alloy material, or an intermetallic material. For example, the dispersant particles 318 may include, but are not limited to, one or more metal particles, metal alloy particles, or intermetallic particles.

Figure 97:
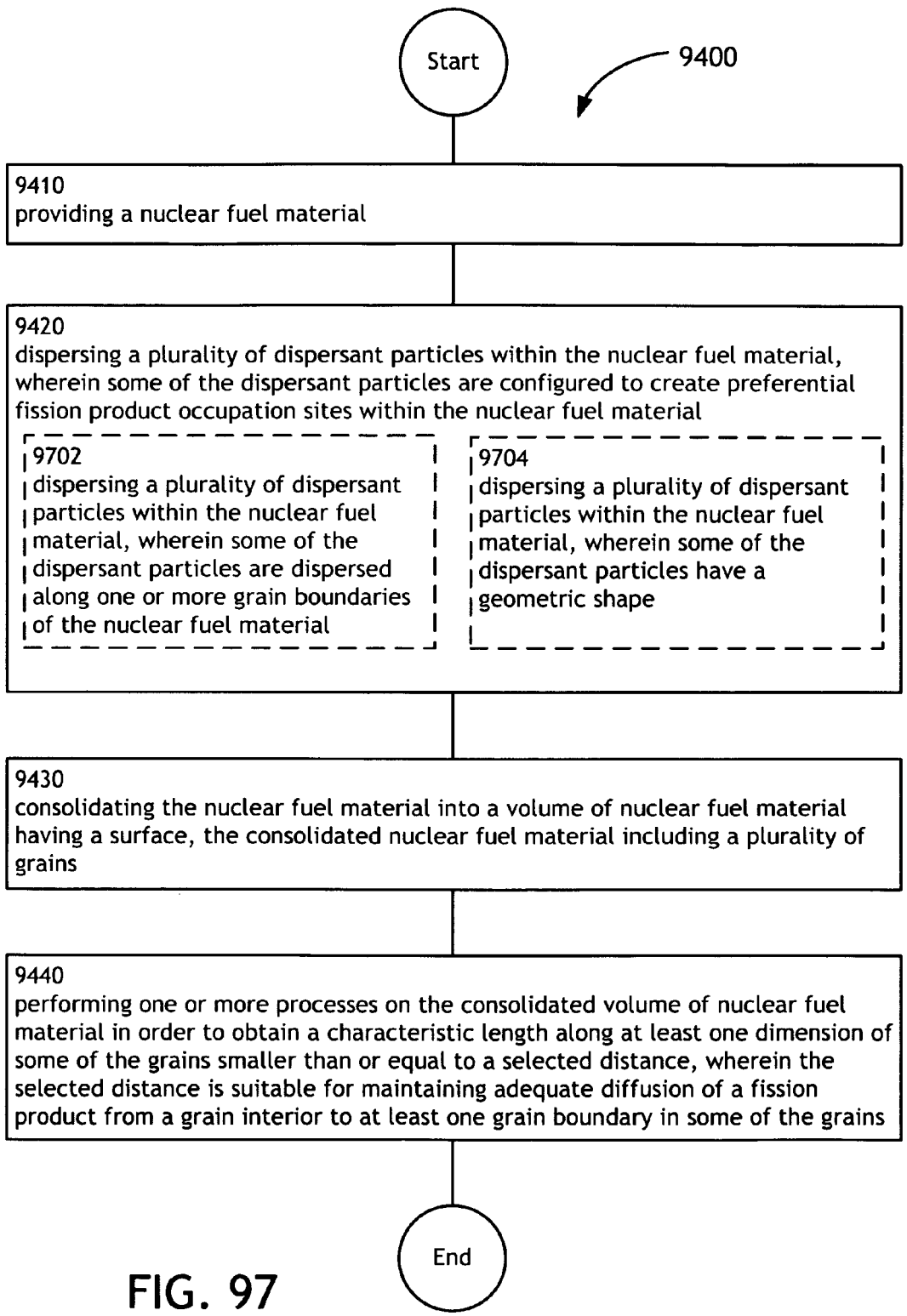

FIG. 97 illustrates alternative embodiments of the example operational flow 9400 of FIG. 94. FIG. 97 illustrates example embodiments where the operation 9420 may include at least one additional operation. Additional operations may include an operation 9702, and/or an operation 9704.

The operation 9702 illustrates dispersing a plurality of dispersant particles within the nuclear fuel material, wherein some of the dispersant particles are dispersed along one or more grain boundaries of the nuclear fuel material. For example, as shown in FIGS. 1A through 4, the some of the dispersant particles may be arranged such that they are localized on one or more grain-boundaries 112 of the nuclear fuel 100. The dispersant particles at the grain-boundaries 112 of the grains 104 of the nuclear fuel 100 may serve as preferential fission gas 118 occupation sites, which may facilitate "open" bubble formation along the grain-boundaries 112 during nuclear fuel operation.

The operation 9704 illustrates dispersing a plurality of dispersant particles within the nuclear fuel material, wherein some of the dispersant particles have a geometric shape. For example, as shown in FIGS. 1A through 4, the dispersant particles may have a substantially spherical shape. In a general sense, the dispersant particles may have any regular or irregular three dimensional shape.

Figure 98:
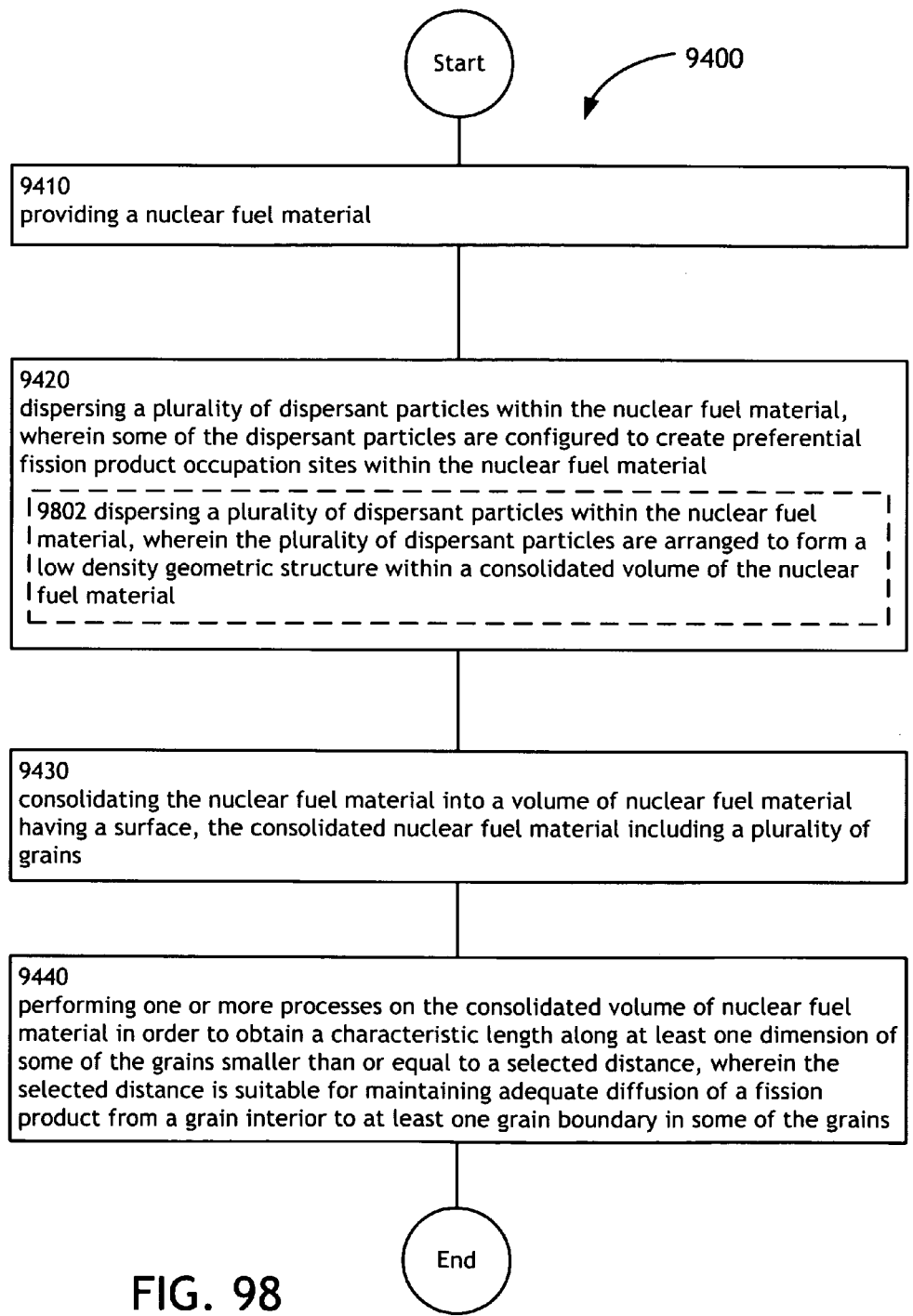

FIG. 98 illustrates alternative embodiments of the example operational flow 9400 of FIG. 94. FIG. 98 illustrates example embodiments where the operation 9420 may include at least one additional operation. Additional operations may include an operation 9802.

The operation 9802 illustrates dispersing a plurality of dispersant particles within the nuclear fuel material, wherein the plurality of dispersant particles are arranged to form a low density geometric structure within a consolidated volume of the nuclear fuel material. For example, in the case of a cylindrical fuel pellet, the dispersant particles 318 may be distributed throughout the nuclear fuels 100 in a manner which produces low density cylindrical concentric shells.

Figure 99:
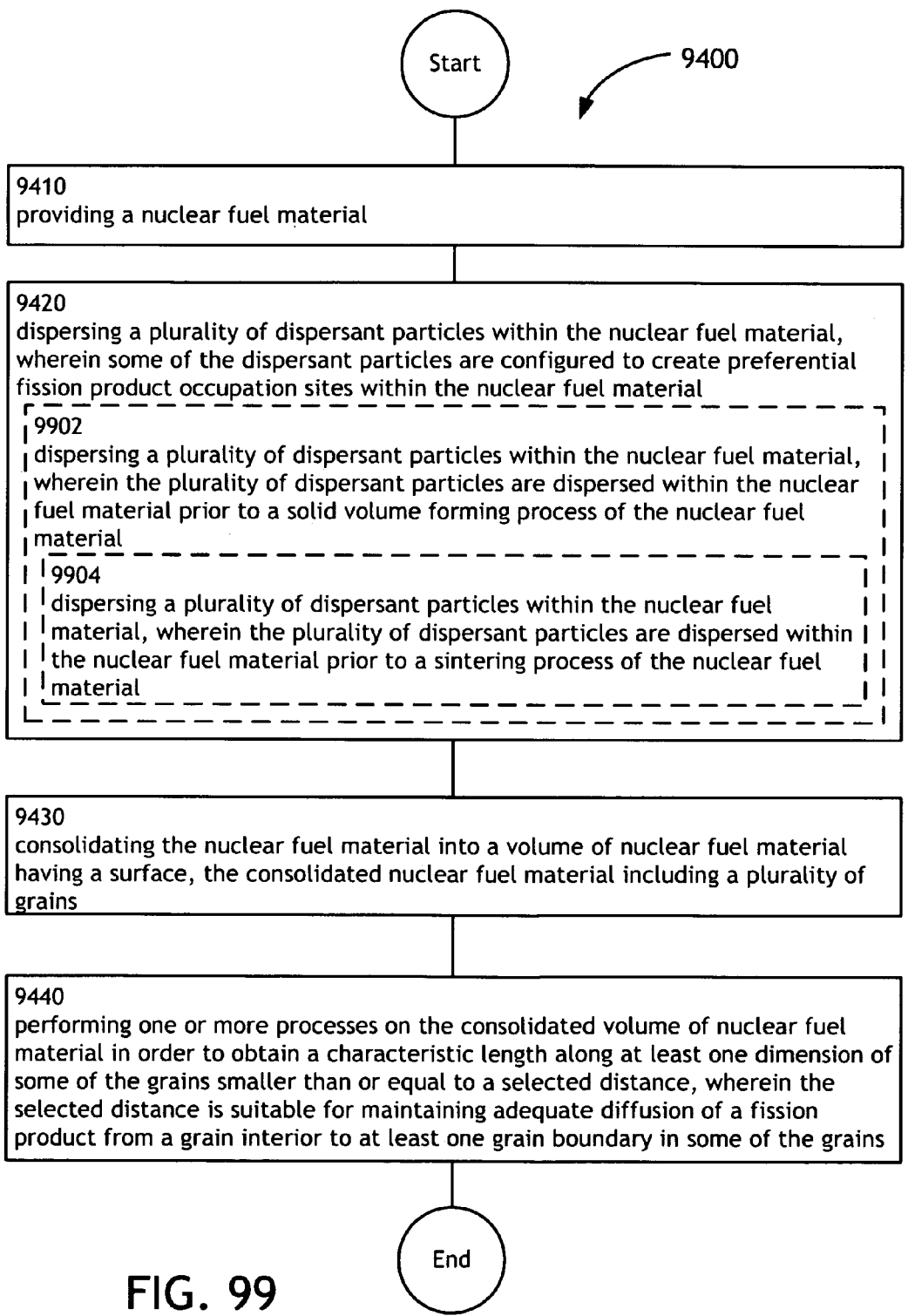

FIG. 99 illustrates alternative embodiments of the example operational flow 9400 of FIG. 94. FIG. 99 illustrates example embodiments where the operation 9420 may include at least one additional operation. Additional operations may include an operation 9902, and/or an operation 9904.

The operation 9902 illustrates dispersing a plurality of dispersant particles within the nuclear fuel material, wherein the plurality of dispersant particles are dispersed within the nuclear fuel material prior to a solid volume forming process of the nuclear fuel material. For example, as shown in FIGS. 1A through 4, the dispersant particles 318 may be intermixed with a nuclear fuel material or a pre-cursor of a nuclear fuel material prior to being pressed.

Further, the operation 9904 illustrates dispersing a plurality of dispersant particles within the nuclear fuel material, wherein the plurality of dispersant particles are dispersed within the nuclear fuel material prior to a sintering process of the nuclear fuel material. For example, as shown in FIGS. 1A through 4, the dispersant particles 318 may be intermixed with a nuclear fuel material or a pre-cursor of a nuclear fuel material prior to being pressed sintered.

Figure 100:
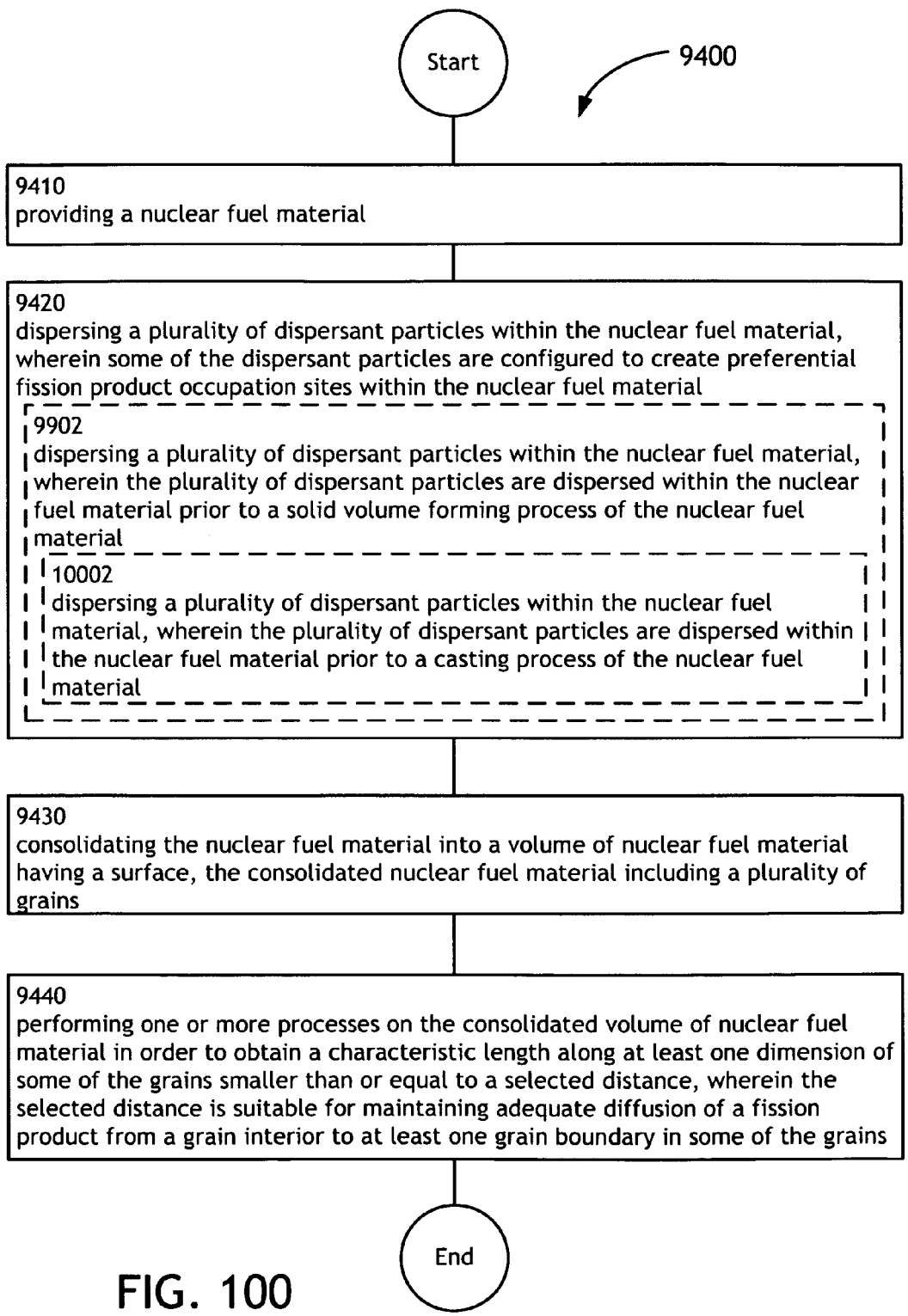

FIG. 100 illustrates alternative embodiments of the example operational flow 9400 of FIG. 94. FIG. 100 illustrates example embodiments where the operation 9420 may include at least one additional operation. Additional operations may include an operation 10002.

Further, the operation 10002 illustrates dispersing a plurality of dispersant particles within the nuclear fuel material, wherein the plurality of dispersant particles are dispersed within the nuclear fuel material prior to a casting process of the nuclear fuel material. For example, as shown in FIGS. 1A through 4, the dispersant particles 318 may be dispersed within the volume of a molten nuclear fuel material prior to being cast.

Figure 101:
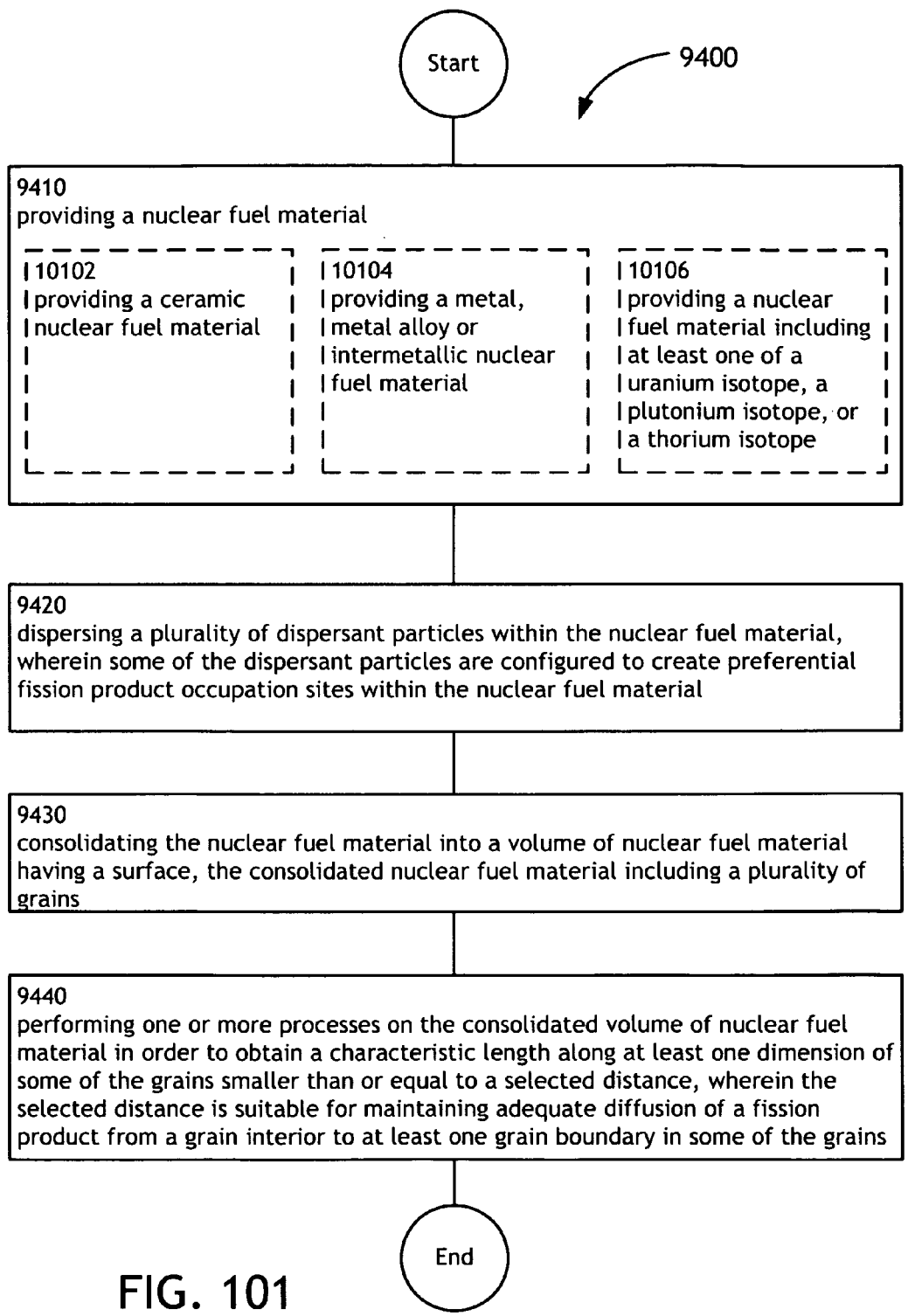

FIG. 101 illustrates alternative embodiments of the example operational flow 9400 of FIG. 94. FIG. 101 illustrates example embodiments where the operation 9410 may include at least one additional operation. Additional operations may include an operation 10102, an operation 10104, and/or an operation 10106.

The operation 10102 illustrates providing a ceramic nuclear fuel material. For example, as shown in FIGS. 1A through 4, the provided nuclear fuel material may include a ceramic based nuclear fuel material. For instance, nuclear fuel may include, but is not limited to an oxide nuclear fuel material (e.g., uranium oxide), a mixed oxide fuel material (e.g., mixed plutonium oxide and depleted uranium oxide), a nitride (e.g., uranium nitride) or a carbide (e.g., uranium carbide).

The operation 10104 illustrates providing a metal, metal alloy or intermetallic nuclear fuel material. For example, as shown in FIGS. 1A through 4, the provided nuclear fuel material may include a metallic based nuclear fuel material. For instance, the plurality of nuclear fuel elements 204 of the nuclear fuel 200 may include, but is not limited to a metal (e.g., uranium, plutonium, or thorium) nuclear fuel material, a metal alloy fuel material (e.g., uranium zirconium, uranium-plutonium-zirconium, or uranium zirconium hydride), or an intermetallic (e.g., $UFe_2$ or $UNi_2$) based nuclear fuel material.

The operation 10106 illustrates providing a nuclear fuel material including at least one of a uranium isotope, a plutonium isotope, or a thorium isotope. For example, as shown in FIGS. 1A through 4, the provided nuclear fuel material may include a fissile nuclear material including, but not limited to, uranium-235 or plutonium-239. By way of another example, the provided nuclear fuel elements 204 may include a non-fissile nuclear material including, but not limited to, thorium-232. While thorium-232 is not by itself fissile, it may be utilized to breed uranium-233, which is fissile in nature.

Figure 102:
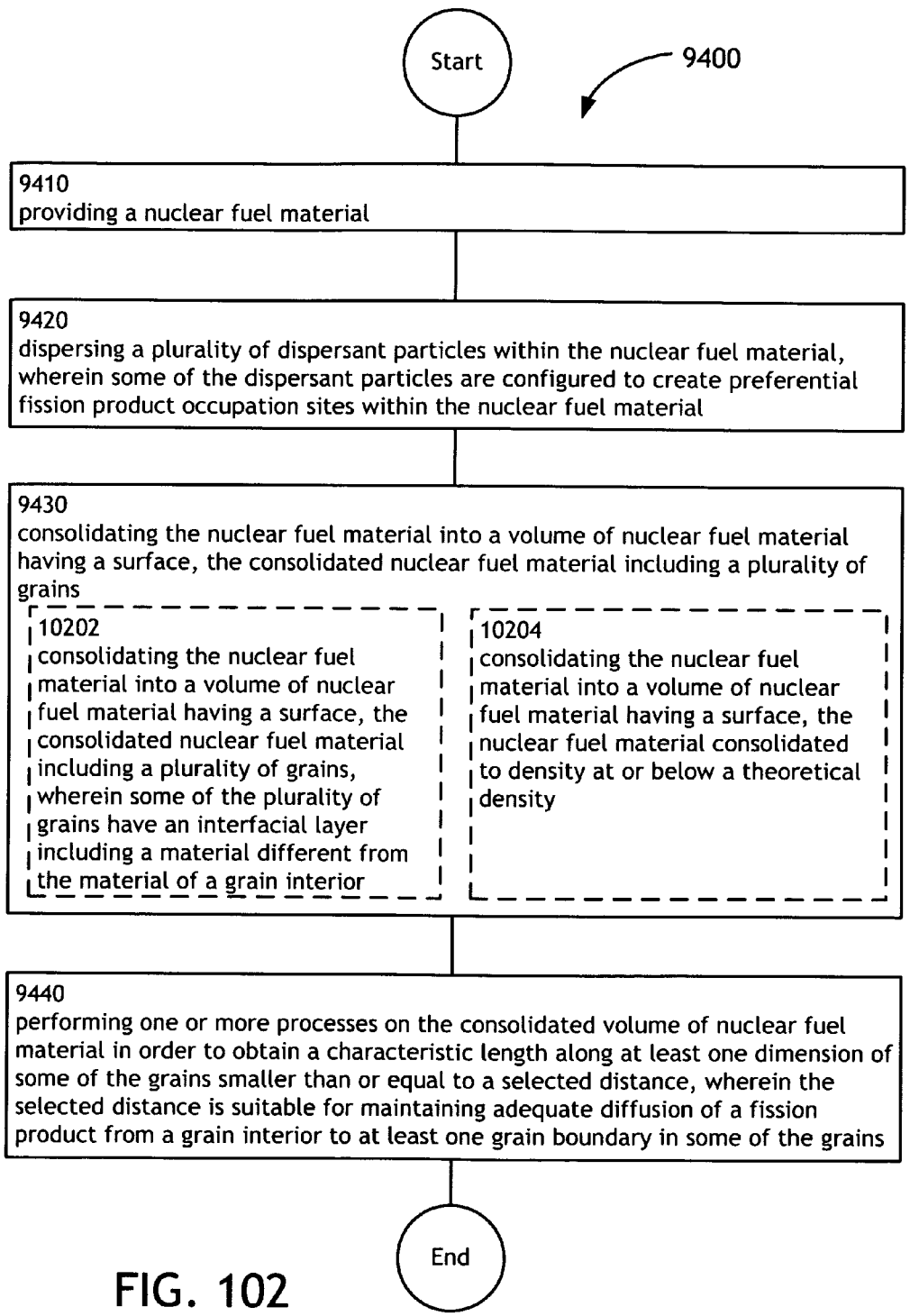

FIG. 102 illustrates alternative embodiments of the example operational flow 9400 of FIG. 94. FIG. 102 illustrates example embodiments where the operation 9430 may include at least one additional operation. Additional operations may include an operation 10202, and/or an operation 10204.

The operation 10202 illustrates consolidating the nuclear fuel material into a volume of nuclear fuel material having a surface, the consolidated nuclear fuel material including a plurality of grains, wherein some of the plurality of grains have an interfacial layer including a material different from the material of a grain interior. For example, as shown in FIG. 1J, the grains 104 of the nuclear fuel 100 may include an interfacial layer 154 of a material different than the grain-interiors 110. For instance, the grains 104 may include an oxide-based or carbide-based interfacial layer 154.

Figure 103:
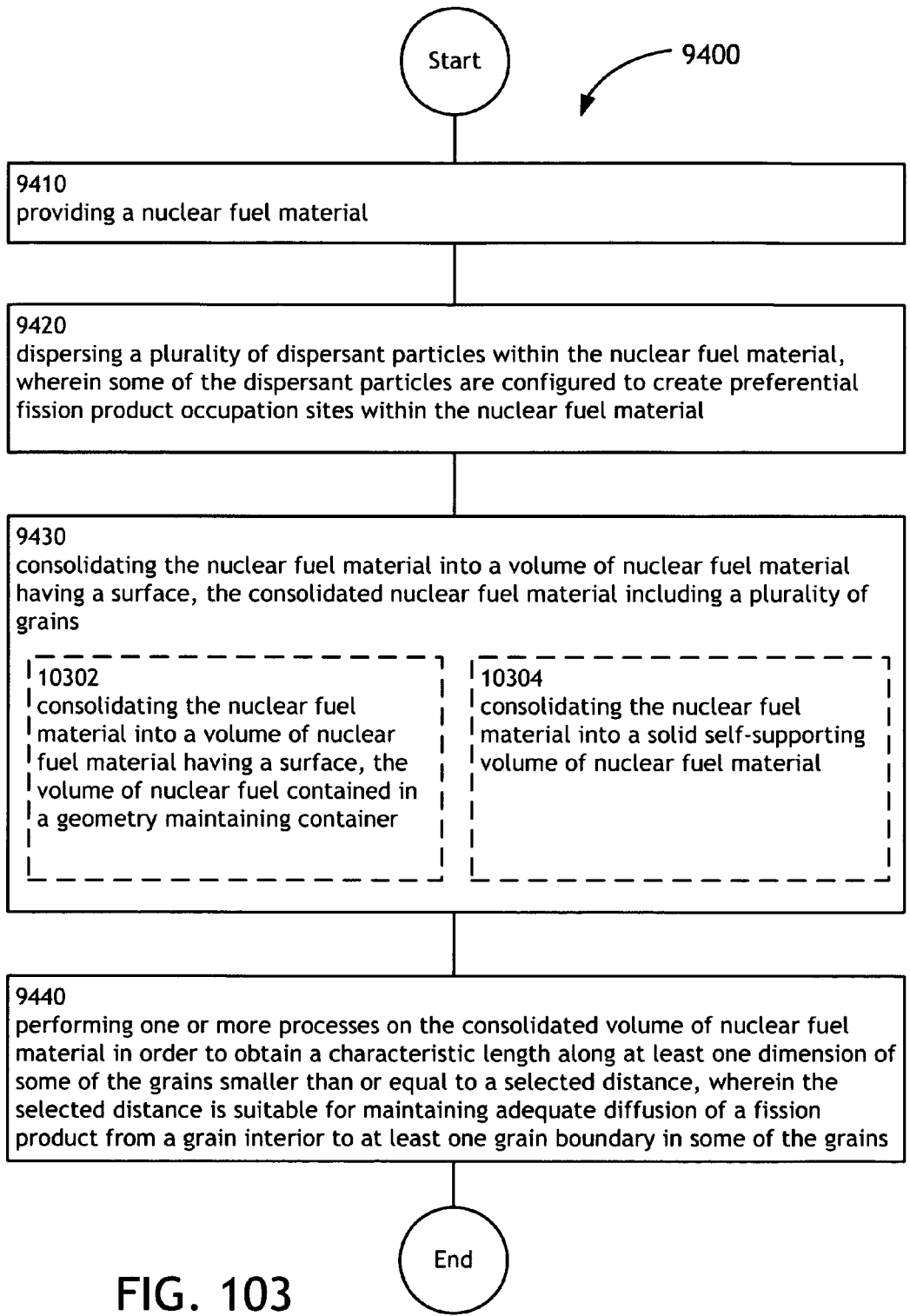

The operation 10204 illustrates consolidating the nuclear fuel material into a volume of nuclear fuel material having a surface, the nuclear fuel material consolidated to density at or below a theoretical density. For example, as shown in FIGS. 1A through 4, the consolidation process (e.g., casting, compacting, sintering, or the like) used to create the volume 102 of consolidated nuclear fuel material may fabricate a nuclear fuel piece having a selected density, wherein the selected density is less than the theoretical density. For instance, the nuclear fuel material may be consolidated to a density between approximately 65 and 99% of the theoretical density FIG. 103 illustrates alternative embodiments of the example operational flow 9400 of FIG. 94. FIG. 103 illustrates example embodiments where the operation 9430 may include at least one additional operation. Additional operations may include an operation 10302, and/or an operation 10304.

The operation 10302 illustrates consolidating the nuclear fuel material into a volume of nuclear fuel material having a surface, the volume of nuclear fuel contained in a geometry maintaining container. For example, as shown in FIGS. 1A through 4, a casting process may consolidate a metallic nuclear fuel material inside a fuel rod, where the molten metallic nuclear fuel material may then solidify.

The operation 10304 illustrates consolidating the nuclear fuel material into a solid self-supporting volume of nuclear fuel material. For example, as shown in FIGS. 1A through 4, a metal oxide powder, such as uranium-dioxide, may be consolidated and formed into a self-supporting geometry.

Figure 104:
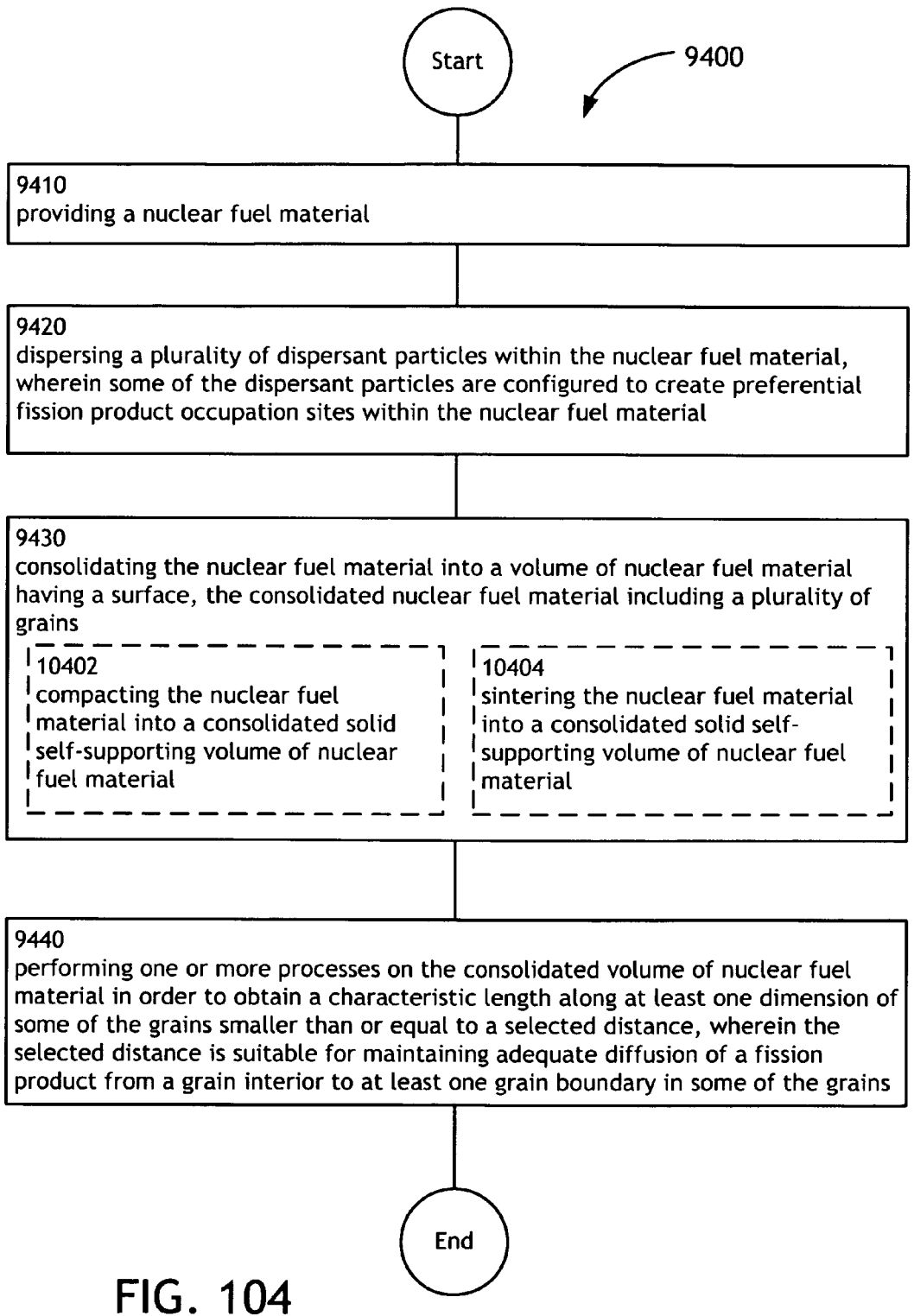

FIG. 104 illustrates alternative embodiments of the example operational flow 9400 of FIG. 94. FIG. 104 illustrates example embodiments where the operation 9430 may include at least one additional operation. Additional operations may include an operation 10402, and/or an operation 10404.

The operation 10402 illustrates compacting the nuclear fuel material into a consolidated solid self-supporting volume of nuclear fuel material. For example, as shown in FIGS. 1A through 4, a metal oxide powder, such as uranium-dioxide, may be placed in a mold and compacted to form a self-supporting fuel pellet.

The operation 10404 illustrates sintering the nuclear fuel material into a consolidated solid self-supporting volume of nuclear fuel material. For example, as shown in FIGS. 1A through 4, a metal oxide powder, such as uranium-dioxide, may be placed in a mold and compacted and sintered to form a self-supporting fuel pellet.

Figure 105:
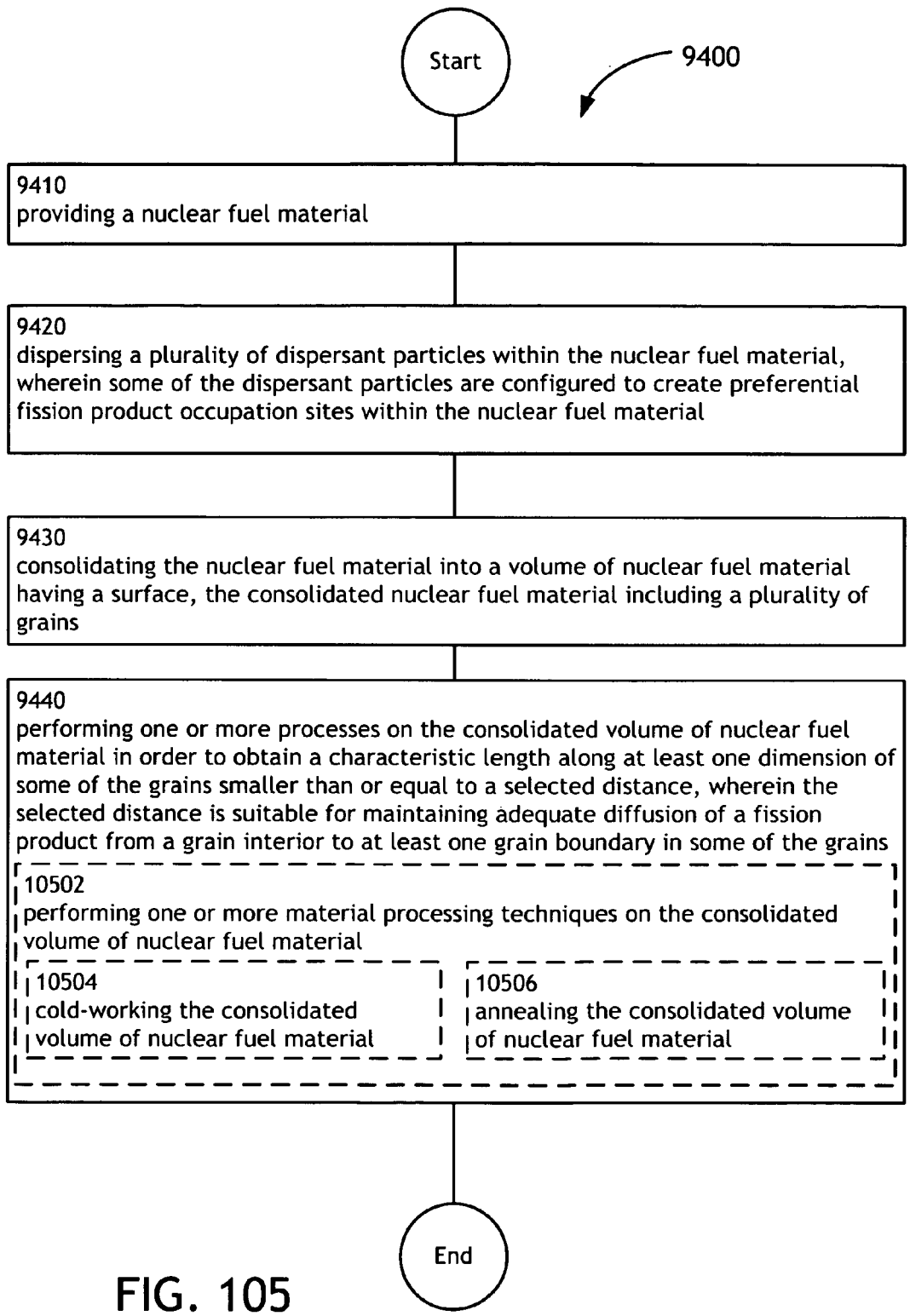

FIG. 105 illustrates alternative embodiments of the example operational flow 9400 of FIG. 94. FIG. 105 illustrates example embodiments where the operation 9440 may include at least one additional operation. Additional operations may include an operation 10502, an operation 10504, and/or an operation 10506.

The operation 10502 illustrates performing one or more material processing techniques on the consolidated volume of nuclear fuel material. For example, as shown in FIGS. 1A through 4, one or more material processing techniques may be performed on the volume 102 of nuclear fuel 100 in order to further refine the sizes of the nuclear elements 104 or the boundary network 114 of the nuclear fuel 100.

Further, the operation 10504 illustrates cold-working the consolidated volume of nuclear fuel material. For example, as shown in FIGS. 1A through 4, the consolidated volume 102 of nuclear fuel 100 may be cold-worked in order to further refine the sizes of the nuclear elements 104 or the boundary network 114 of the nuclear fuel 100. The cold-working process may include, but is not limited to, cold-rolling, extruding at low temperature, bending, compression, or drawing.

Further, the operation 10506 illustrates annealing the consolidated volume of nuclear fuel material. For example, as shown in FIGS. 1A through 4, the consolidated volume 102 of nuclear fuel material may be annealed. For instance, after being cold-worked, the nuclear reactor fuel 100 may be annealed in order to further refine the sizes of the nuclear elements 104 or the boundary network 114 of the nuclear fuel 100.

Figure 106:
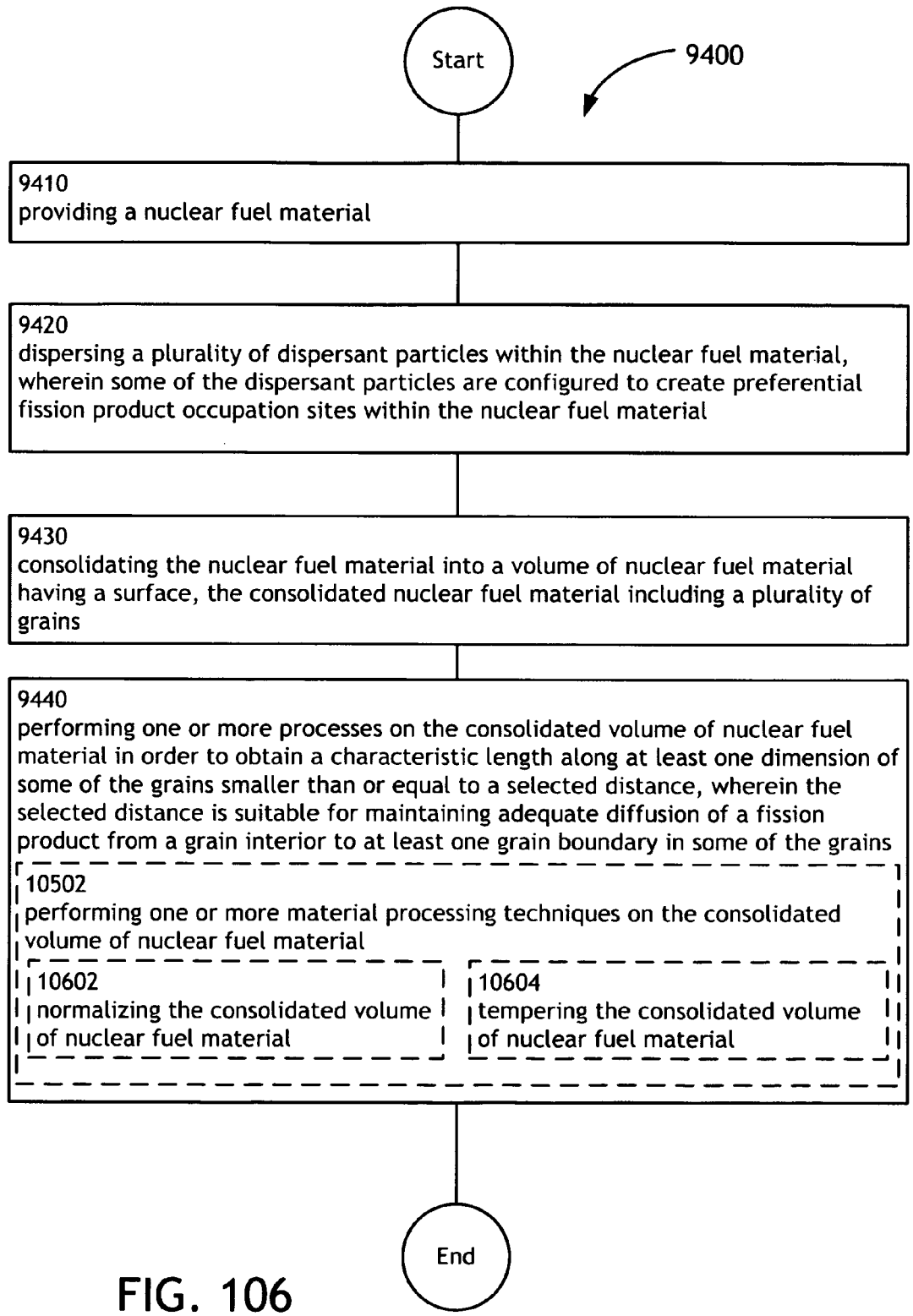

FIG. 106 illustrates alternative embodiments of the example operational flow 9400 of FIG. 94. FIG. 106 illustrates example embodiments where the operation 9440 may include at least one additional operation. Additional operations may include an operation 10602, and/or an operation 10604.

Further, the operation 10602 illustrates normalizing the consolidated volume of nuclear fuel material. For example, as shown in FIGS. 1A through 4, the consolidated volume 102 of nuclear fuel 100 may be normalized in order to further refine the sizes of the nuclear elements 104 or the boundary network 114 of the nuclear fuel 100.

Further, the operation 10604 illustrates tempering the consolidated volume of nuclear fuel material. For example, as shown in FIGS. 1A through 4, the consolidated volume 102 of nuclear fuel 100 may be tempered in order to further refine the sizes of the nuclear elements 104 or the boundary network 114 of the nuclear fuel 100.

Figure 107:
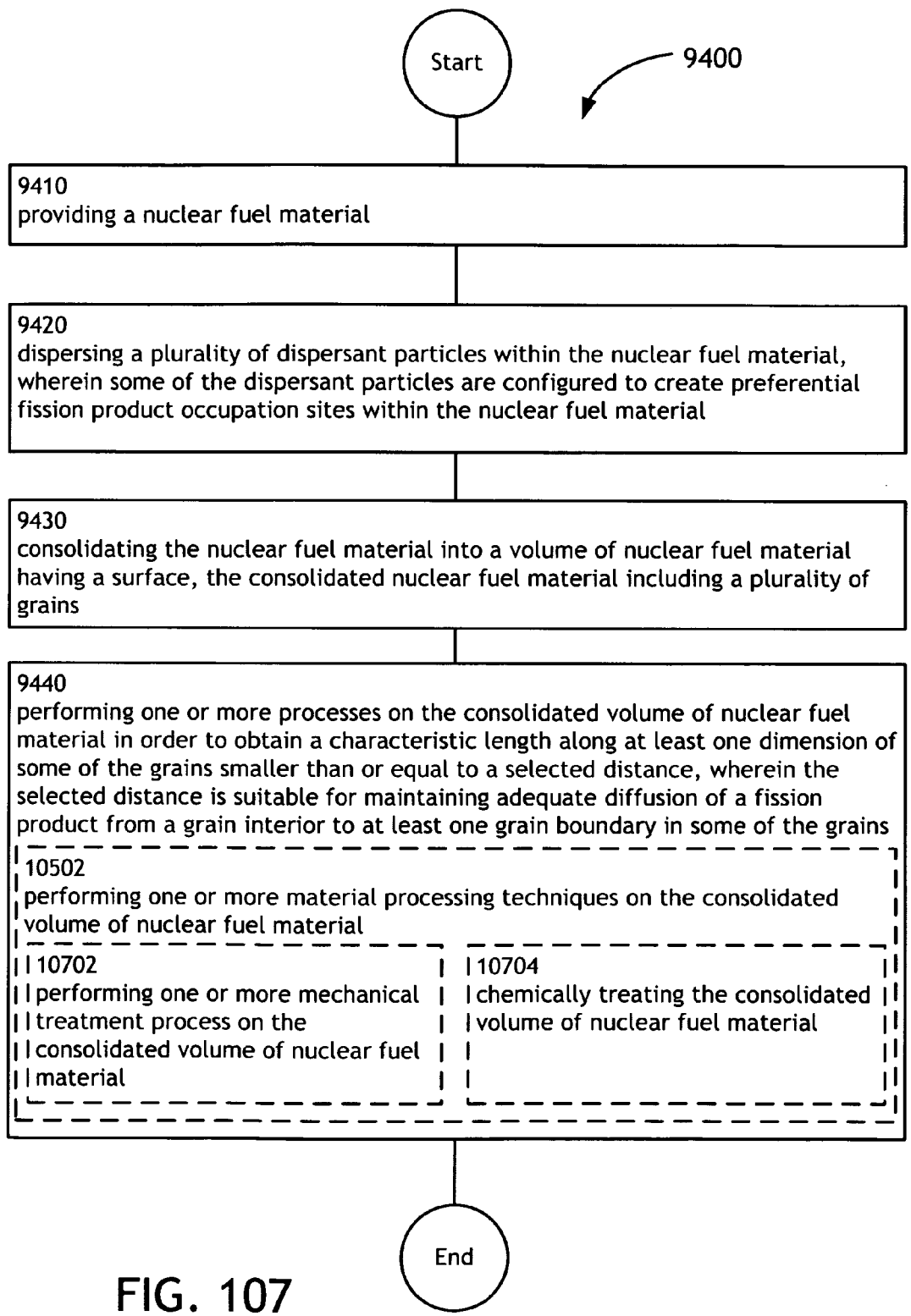

FIG. 107 illustrates alternative embodiments of the example operational flow 9400 of FIG. 94. FIG. 107 illustrates example embodiments where the operation 9440 may include at least one additional operation. Additional operations may include an operation 10702, and/or an operation 10704.

Further, the operation 10702 illustrates performing one or more mechanical treatment process on the consolidated volume of nuclear fuel material. For example, as shown in FIGS. 1A through 4, the consolidated volume 102 of nuclear fuel 100 may undergo a mechanical processing technique (e.g., stretching, bending, compression, or the like) in order to further refine the sizes of the nuclear elements 104 or the boundary network 114 of the nuclear fuel 100

Further, the operation 10704 illustrates chemically treating the consolidated volume of nuclear fuel material. For example, as shown in FIGS. 1A through 4, the consolidated volume 102 of nuclear fuel 100 may be chemically treated in order to further refine the sizes of the nuclear elements 104 or the boundary network 114 of the nuclear fuel 100.

Figure 108:
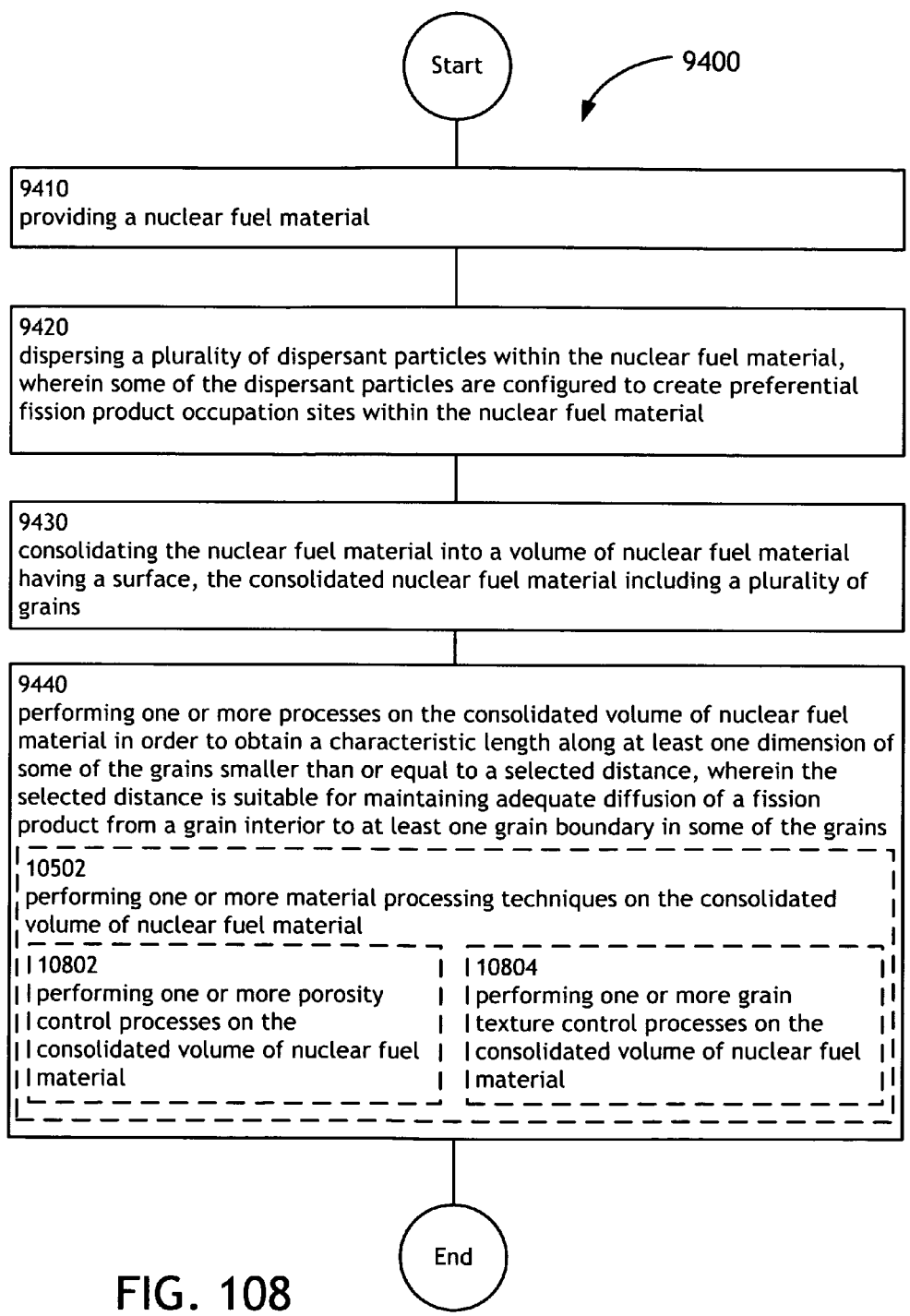

FIG. 108 illustrates alternative embodiments of the example operational flow 9400 of FIG. 94. FIG. 108 illustrates example embodiments where the operation 9440 may include at least one additional operation. Additional operations may include an operation 10802, and/or an operation 10804.

Further, the operation 10802 illustrates performing one or more porosity control processes on the consolidated volume of nuclear fuel material. For example, as shown in FIGS. 1A through 4, the consolidated volume 102 of nuclear fuel 100 may undergo a porosity control process (e.g., annealing or chemical treatment).

Further, the operation 10804 illustrates performing one or more grain texture control processes on the consolidated volume of nuclear fuel material. For example, as shown in FIGS. 1A through 4, the consolidated volume 102 of nuclear fuel 100 may undergo a grain texture control process, such as annealing or chemical treatment (e.g., doping) in order to control the grain texture of the plurality of grains 104 of the nuclear fuel 100.

Figure 109:
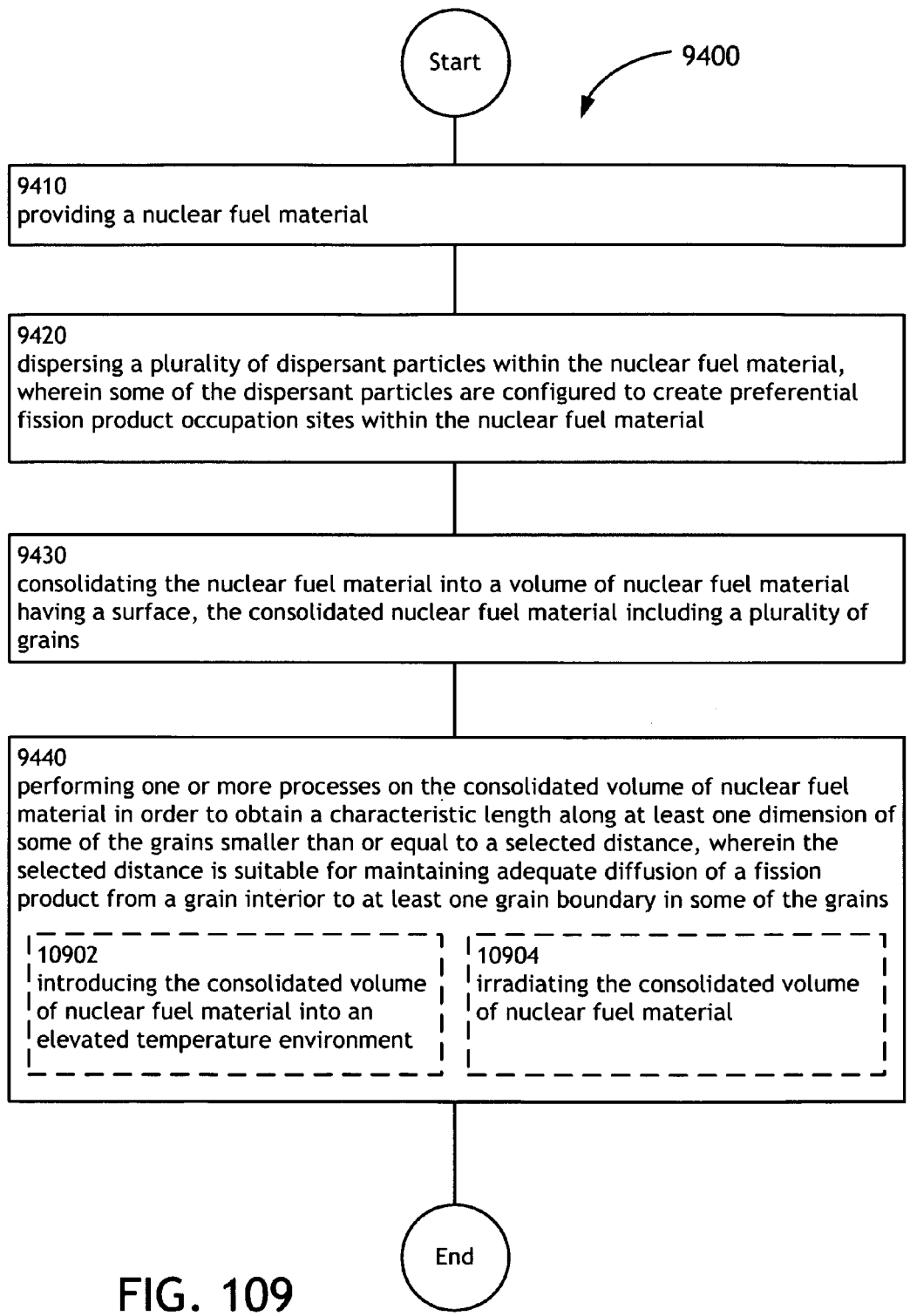

FIG. 109 illustrates alternative embodiments of the example operational flow 9400 of FIG. 94. FIG. 109 illustrates example embodiments where the operation 9440 may include at least one additional operation. Additional operations may include an operation 10902, and/or an operation 10904.

The operation 10902 illustrates introducing the consolidated volume of nuclear fuel material into an elevated temperature environment. For example, as shown in FIGS. 1A through 4, the consolidated volume 102 of nuclear fuel 200 may be introduced into a high temperature environment, such as operation within a nuclear reactor.

The operation 10904 illustrates irradiating the consolidated volume of nuclear fuel material. For example, as shown in FIGS. 1A through 4, the consolidated volume 102 of nuclear fuel 100 may be irradiated (e.g., irradiated in nuclear reactor implementation or irradiated via neutron source) in order to refine the sizes of the nuclear fuel elements 104 or the boundary network 114.

Figure 110:
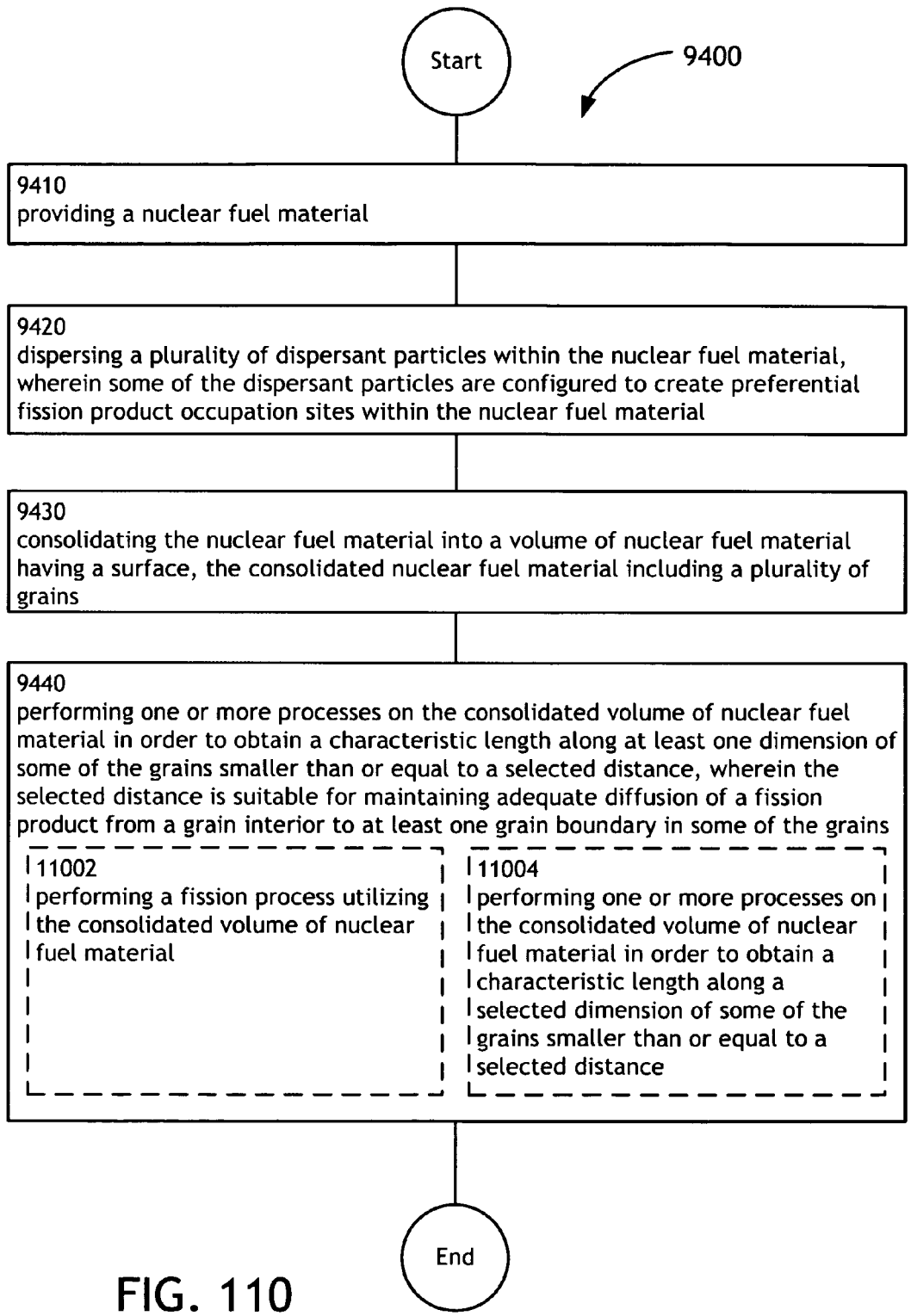

FIG. 110 illustrates alternative embodiments of the example operational flow 9400 of FIG. 94. FIG. 110 illustrates example embodiments where the operation 9440 may include at least one additional operation. Additional operations may include an operation 11002, and/or an operation 11004.

The operation 11002 illustrates performing a fission process utilizing the consolidated volume of nuclear fuel material. For example, as shown in FIGS. 1A through 4, the consolidated volume 102 of nuclear fuel 100 may be utilized in a fission process (e.g., utilized in a nuclear reactor). It is recognized that the sizes of the grains 104 of the nuclear fuel 100 may become more refined and/or the boundary network 114 of the nuclear fuel 100 may become more developed upon implementing the nuclear fuel 100 in a nuclear reactor.

The operation 11004 illustrates performing one or more processes on the consolidated volume of nuclear fuel material in order to obtain a characteristic length along a selected dimension of some of the grains smaller than or equal to a selected distance. For example, as shown in FIG. 1G, one or more processes may be utilized in order engineer the grains 104 of the nuclear fuel 100 to have a characteristic length 106 along a selected dimension of some grains 104. For instance, in grains having an elongated structure, the grains 104 may have a "thin" dimension smaller than or equal to a selected distance.

Figure 111:
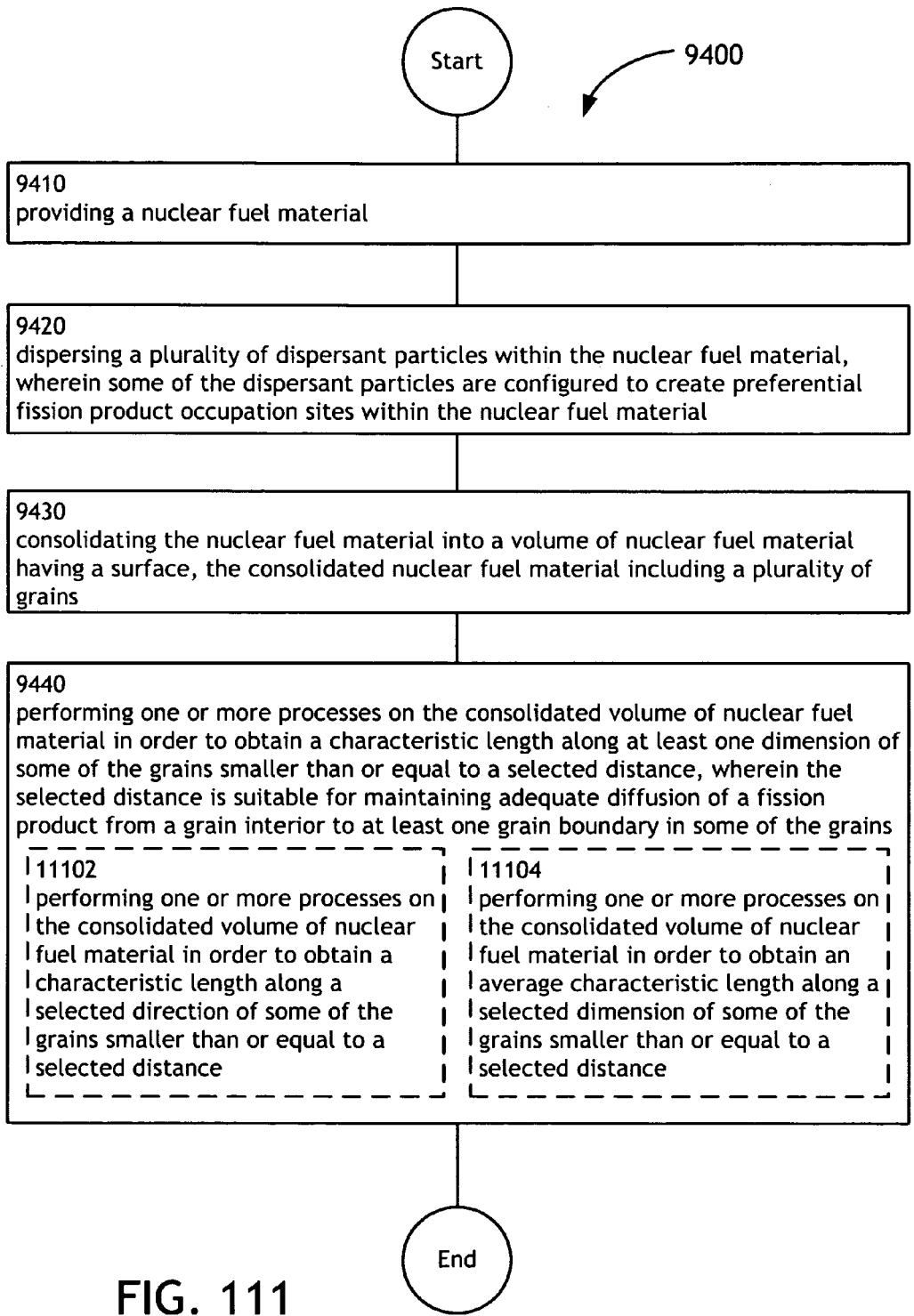

FIG. 111 illustrates alternative embodiments of the example operational flow 9400 of FIG. 94. FIG. 111 illustrates example embodiments where the operation 9440 may include at least one additional operation. Additional operations may include an operation 11102, and/or an operation 11104.

The operation 11102 illustrates performing one or more processes on the consolidated volume of nuclear fuel material in order to obtain a characteristic length along a selected direction of some of the grains smaller than or equal to a selected distance. For example, as shown in FIG. 1H, one or more processes may be utilized in order engineer the grains 104 of the nuclear fuel 100 to have a characteristic length 106 along a selected direction of some of the grains smaller than or equal to a selected distance. For instance, in grains having an elongated structure, the grains 104 may have a characteristic length 106 along a selected direction 134 with the nuclear fuel 100. For example, the grains may have a selected characteristic length 106 along the radial direction within a cylindrically shaped nuclear fuel piece (e.g., fuel pellet).

The operation 11104 illustrates performing one or more processes on the consolidated volume of nuclear fuel material in order to obtain an average characteristic length along a selected dimension of some of the grains smaller than or equal to a selected distance. For example, as shown in FIG. 1G, one or more processes may be utilized in order engineer the grains 104 of the nuclear fuel 100 to have an average characteristic length 106 along a selected dimension of some grains 104.

Figure 112:
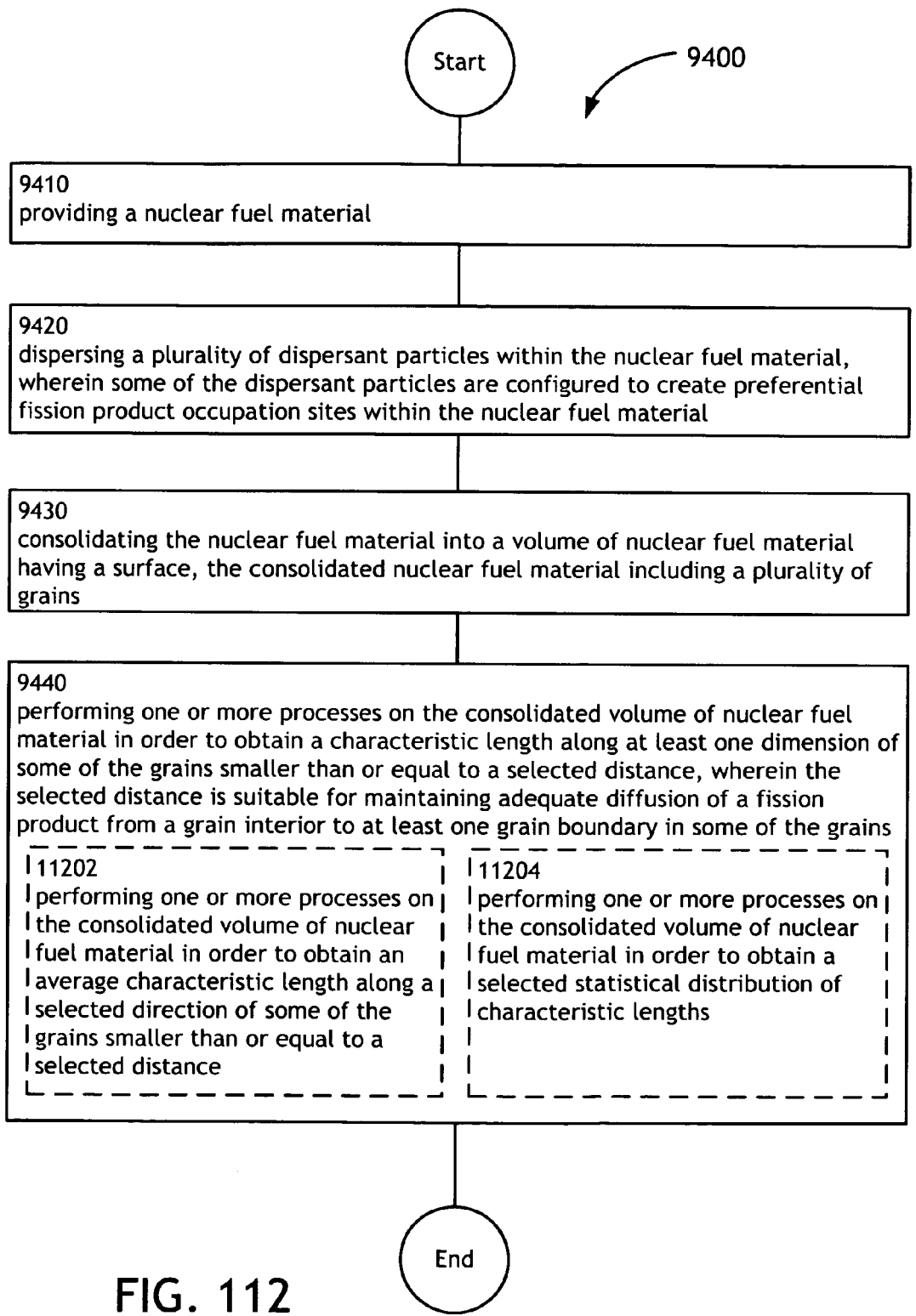

FIG. 112 illustrates alternative embodiments of the example operational flow 9400 of FIG. 94. FIG. 112 illustrates example embodiments where the operation 9440 may include at least one additional operation. Additional operations may include an operation 11202, and/or an operation 11204.

The operation 11202 illustrates performing one or more processes on the consolidated volume of nuclear fuel material in order to obtain an average characteristic length along a selected direction of some of the grains smaller than or equal to a selected distance. For example, as shown in FIG. 1H, one or more processes may be utilized in order engineer the grains 104 of the nuclear fuel 100 to have an average characteristic length 106 along a selected direction of some of the grains smaller than or equal to a selected distance. For instance, in grains having an elongated structure, the grains 104 may have an average characteristic length 106 along a selected direction 134 with the nuclear fuel 100. For example, the grains may have an average selected characteristic length 106 along the radial direction within a cylindrically shaped nuclear fuel piece (e.g., fuel pellet).

The operation 11204 illustrates performing one or more processes on the consolidated volume of nuclear fuel material in order to obtain a selected statistical distribution of characteristic lengths. For example, as shown in FIGS. 1A through 4, the grains 104 of the nuclear fuel 100 may have a selected statistical distribution of characteristic lengths. For example, the grains 104 of the nuclear fuel 100 may have a grain size distribution having a selected percentage of the grains 104 having a grain size 106 below a selected distance. For instance, the nuclear fuel 100 of the present invention may have a grain size 106 distribution such that 65% of the grains have a grain size 106 equal to or less than 4 μm, with an average grain size of 2.5 μm. In another example, the grains 104 of the nuclear fuel 100 may have a selected spatial distribution of characteristic lengths.

Figure 113:
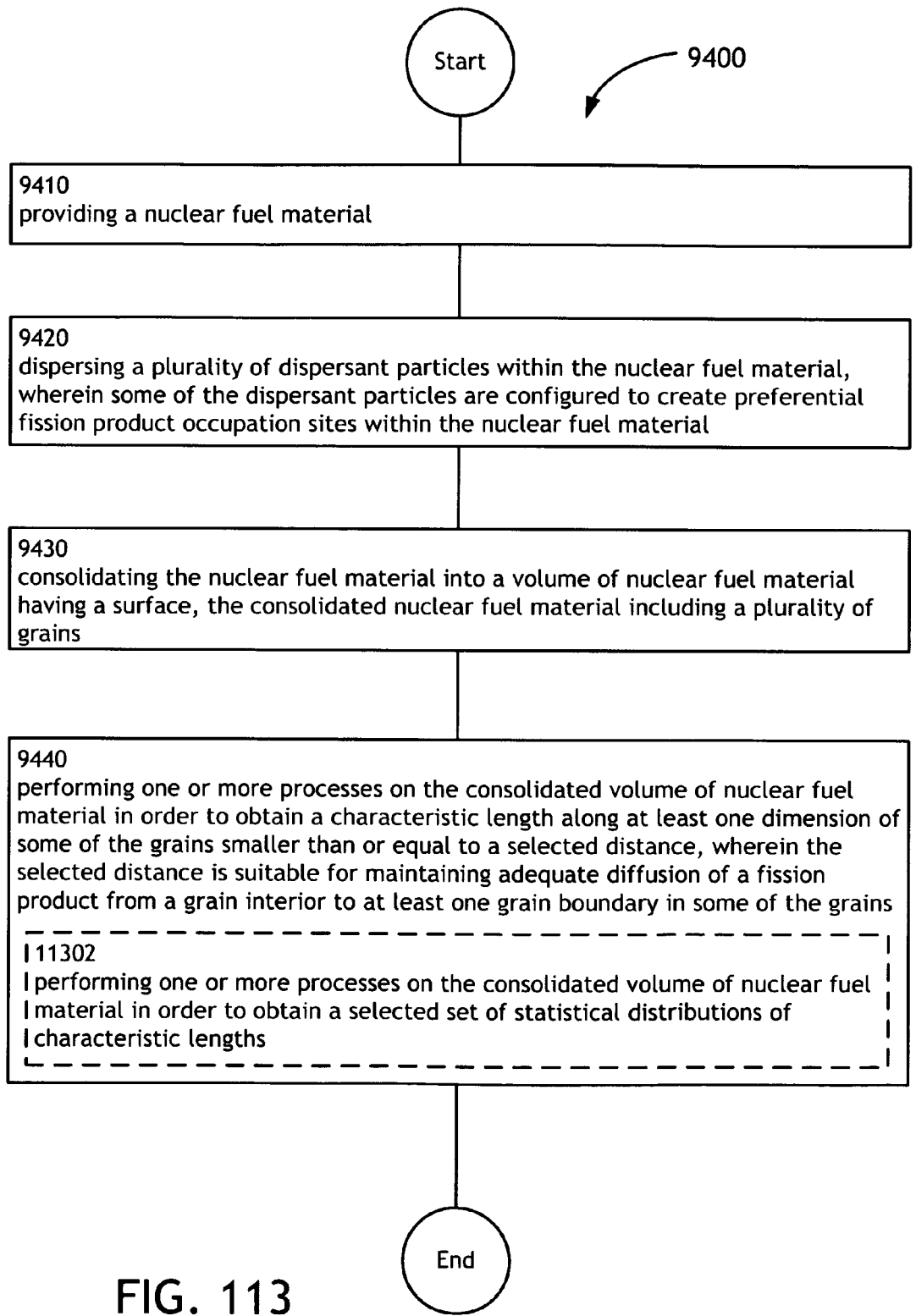

FIG. 113 illustrates alternative embodiments of the example operational flow 9400 of FIG. 94. FIG. 113 illustrates example embodiments where the operation 9440 may include at least one additional operation. Additional operations may include an operation 11302.

The operation 11302 illustrates performing one or more processes on the consolidated volume of nuclear fuel material in order to obtain a selected set of statistical distributions of characteristic lengths. For example, as shown in FIGS. 1A through 4, the grains 104 of the nuclear fuel 100 may have multiple statistical distributions of characteristic lengths. For instance, the nuclear fuel 100 of the present invention may have a grain size 106 distribution such that 25% of the grains have a grain size 106 equal to or less than 2 μm, 25% of the grains have a grain size 106 equal to or less than 1 μm, and 10% of the grains are below 0.5 μm.

Figure 114:
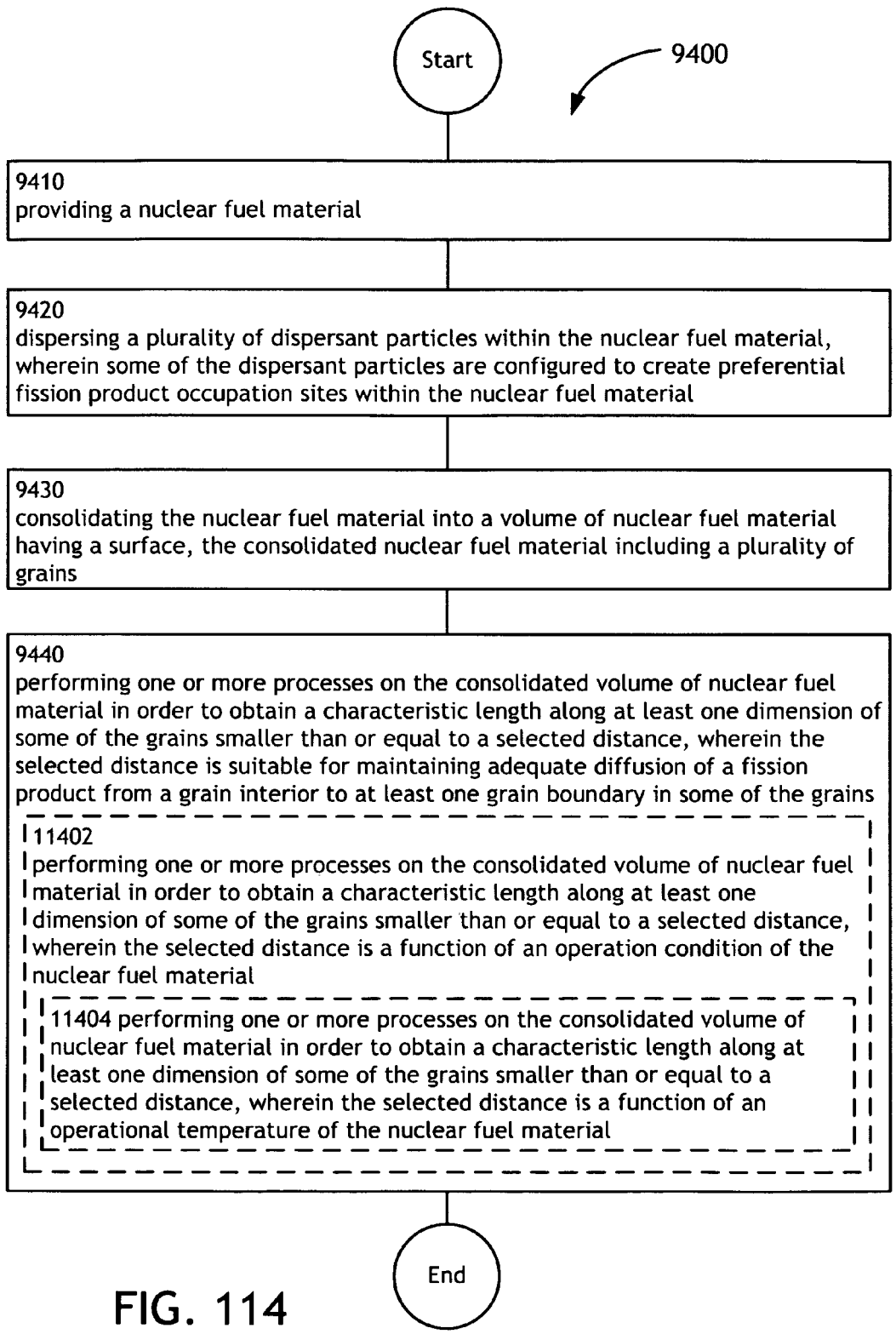

FIG. 114 illustrates alternative embodiments of the example operational flow 9400 of FIG. 94. FIG. 114 illustrates example embodiments where the operation 9440 may include at least one additional operation. Additional operations may include an operation 11402, and/or an operation 11404.

The operation 11402 illustrates performing one or more processes on the consolidated volume of nuclear fuel material in order to obtain a characteristic length along at least one dimension of some of the grains smaller than or equal to a selected distance, wherein the selected distance is a function of an operation condition of the nuclear fuel material. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, which is a function of an operation condition of the nuclear fuel 100. For instance, the critical size necessary to ensure adequate diffusion of a fission product 108 from the grain-interiors 110 to the grain-boundaries 112 of the nuclear fuel may depend upon an operational condition of the nuclear fuel 100.

Further, the operation 11404 illustrates performing one or more processes on the consolidated volume of nuclear fuel material in order to obtain a characteristic length along at least one dimension of some of the grains smaller than or equal to a selected distance, wherein the selected distance is a function of an operational temperature of the nuclear fuel material. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, which is a function of an operation temperature of the nuclear fuel 100. For instance, the critical size necessary to ensure adequate diffusion of a fission product 108 from the grain-interiors 110 to the grain-boundaries 112 of the nuclear fuel may depend upon the operation temperature of the nuclear fuel 100.

Figure 115:
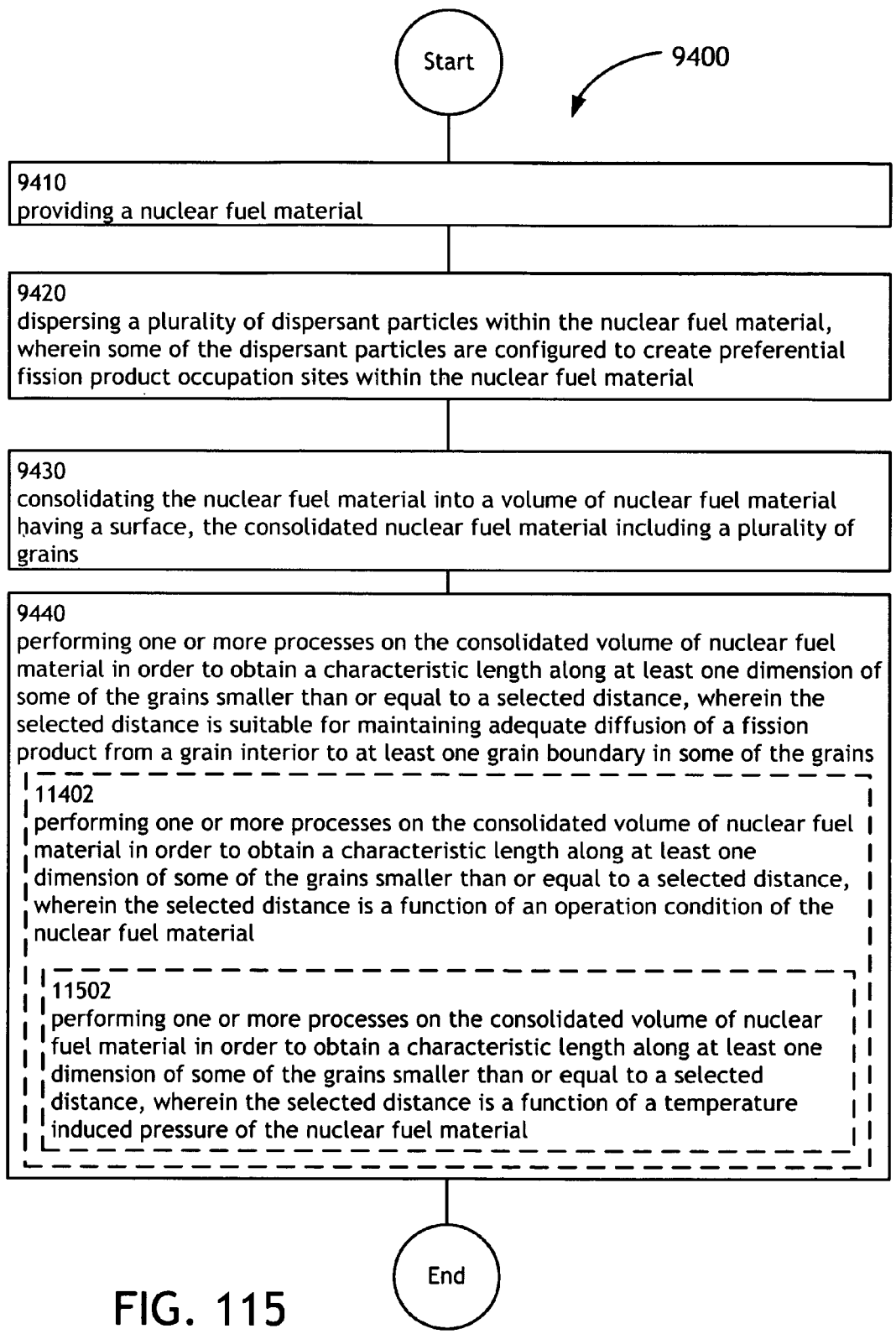

FIG. 115 illustrates alternative embodiments of the example operational flow 9400 of FIG. 94. FIG. 115 illustrates example embodiments where the operation 9440 may include at least one additional operation. Additional operations may include an operation 11502.

Further, the operation 11502 illustrates performing one or more processes on the consolidated volume of nuclear fuel material in order to obtain a characteristic length along at least one dimension of some of the grains smaller than or equal to a selected distance, wherein the selected distance is a function of a temperature induced pressure of the nuclear fuel material. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, which is a function of a temperature induced pressure of the nuclear fuel 100. For instance, the critical size necessary to ensure adequate diffusion of a fission product 108 from the grain-interiors 110 to the grain-boundaries 112 of the nuclear fuel may depend upon the temperature induced pressure within the nuclear reactor fuel 100.

Figure 116:
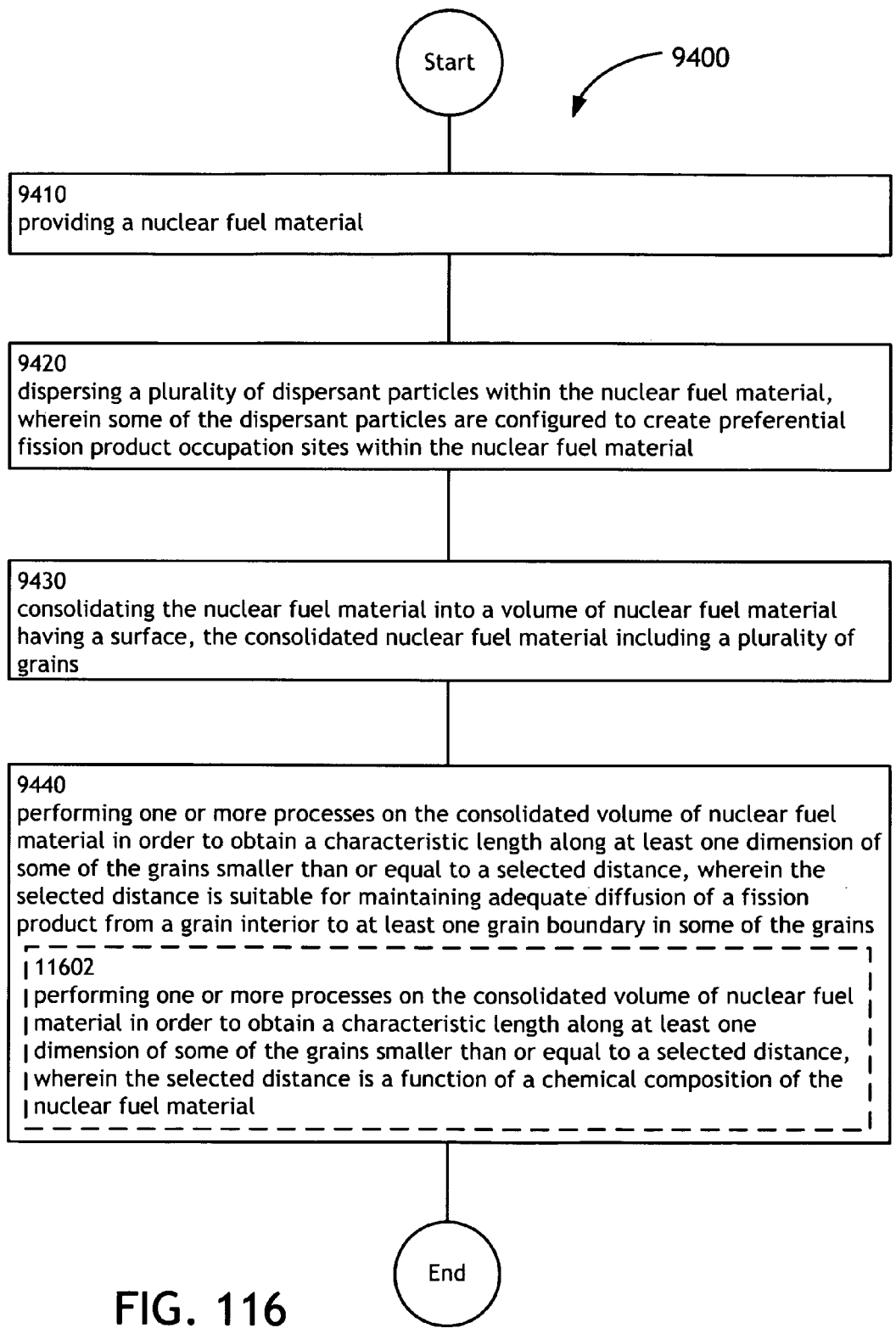

FIG. 116 illustrates alternative embodiments of the example operational flow 9400 of FIG. 94. FIG. 116 illustrates example embodiments where the operation 9440 may include at least one additional operation. Additional operations may include an operation 11602.

The operation 11602 illustrates performing one or more processes on the consolidated volume of nuclear fuel material in order to obtain a characteristic length along at least one dimension of some of the grains smaller than or equal to a selected distance, wherein the selected distance is a function of a chemical composition of the nuclear fuel material. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, which is a function of the chemical composition of the nuclear fuel 100. For instance, the critical size necessary to ensure adequate diffusion of a fission product 108 from the grain-interiors 110 to the grain-boundaries 112 of the nuclear fuel may depend upon the chemical composition (e.g., type of fissile material(s), types of alloying agents, relative concentration of fissile materials, or the like) of the nuclear reactor fuel 100.

Figure 117:
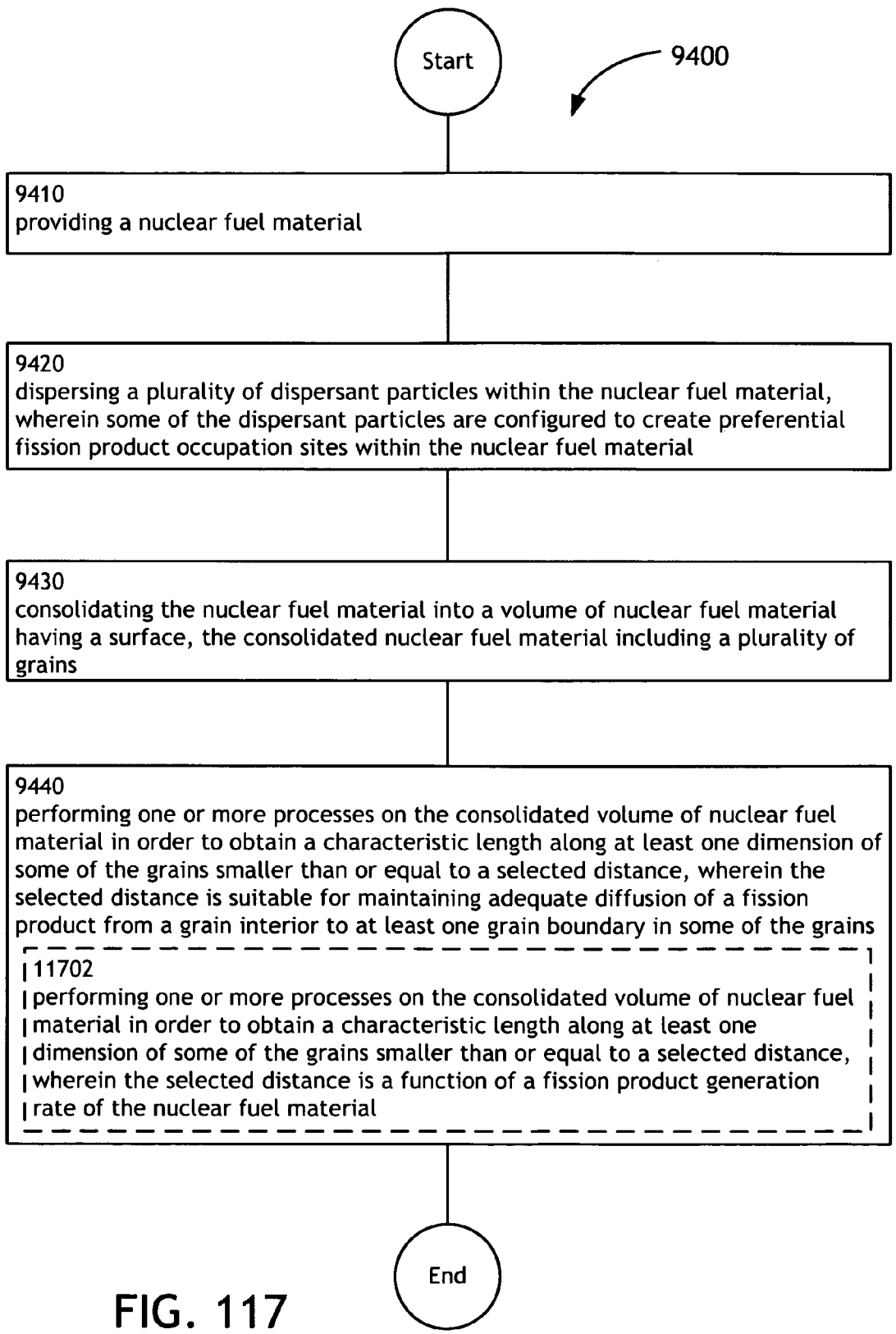

FIG. 117 illustrates alternative embodiments of the example operational flow 9400 of FIG. 94. FIG. 117 illustrates example embodiments where the operation 9440 may include at least one additional operation. Additional operations may include an operation 11702.

The operation 11702 illustrates performing one or more processes on the consolidated volume of nuclear fuel material in order to obtain a characteristic length along at least one dimension of some of the grains smaller than or equal to a selected distance, wherein the selected distance is a function of a fission product generation rate of the nuclear fuel material. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, which is a function of the fission product 108 generation rate within the nuclear fuel 100. For instance, the critical size necessary to ensure adequate diffusion of a fission product 108 from the grain-interiors 110 to the grain-boundaries 112 of the nuclear fuel may depend upon the fission product 108 generation rate of the nuclear reactor fuel 100. Further, the fission product 108 generation rate (e.g., fission gas 118 generation rate) is proportional to the fission rate with the nuclear fuel 100, which in turn is proportional to the power density of the nuclear fuel 100, which in turn is dependent upon the chemical composition of the nuclear fuel 100.

Figure 118:
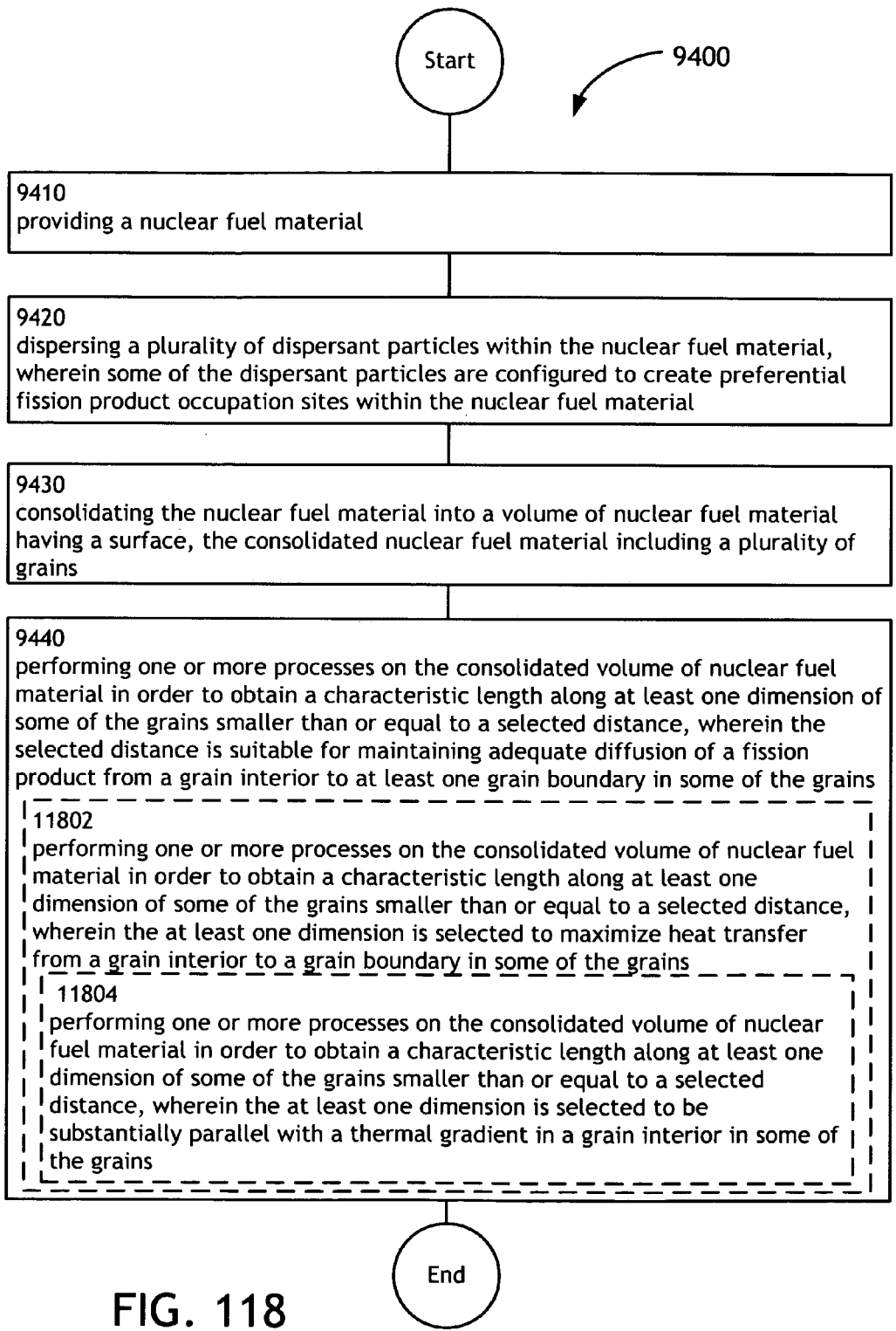

FIG. 118 illustrates alternative embodiments of the example operational flow 9400 of FIG. 94. FIG. 118 illustrates example embodiments where the operation 9440 may include at least one additional operation. Additional operations may include an operation 11802, and/or an operation 11804.

The operation 11802 illustrates performing one or more processes on the consolidated volume of nuclear fuel material in order to obtain a characteristic length along at least one dimension of some of the grains smaller than or equal to a selected distance, wherein the at least one dimension is selected to maximize heat transfer from a grain interior to a grain boundary in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, wherein the dimension of the grains is selected to maximize heat transfer from the grain interiors 110 to the grain-boundaries 112 of the nuclear fuel 100. For instance, a dimension of the grains 104 to be minimize may be selected in order maximize (or at least improve) heat transfer from the grain-interiors 110 to the grain-boundaries 112.

Further, the operation 11804 illustrates performing one or more processes on the consolidated volume of nuclear fuel material in order to obtain a characteristic length along at least one dimension of some of the grains smaller than or equal to a selected distance, wherein the at least one dimension is selected to be substantially parallel with a thermal gradient in a grain interior in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel smaller than a selected distance, wherein the at least one dimension is selected to be substantially parallel with a thermal gradient in a grain interior in some of the grains. For instance, in order to maximize diffusion of a fission gas 118 from the grain-interiors 110 to the grain-boundaries 112 a "thin" dimension of the grains 104 may be arranged so as to align substantially perpendicular to the direction of a thermal gradient within the nuclear fuel 100. Conversely, the "thick" dimension of the grains 104 may be aligned so as to align substantially parallel with the direction of the thermal gradient within the nuclear fuel 100.

Figure 119:
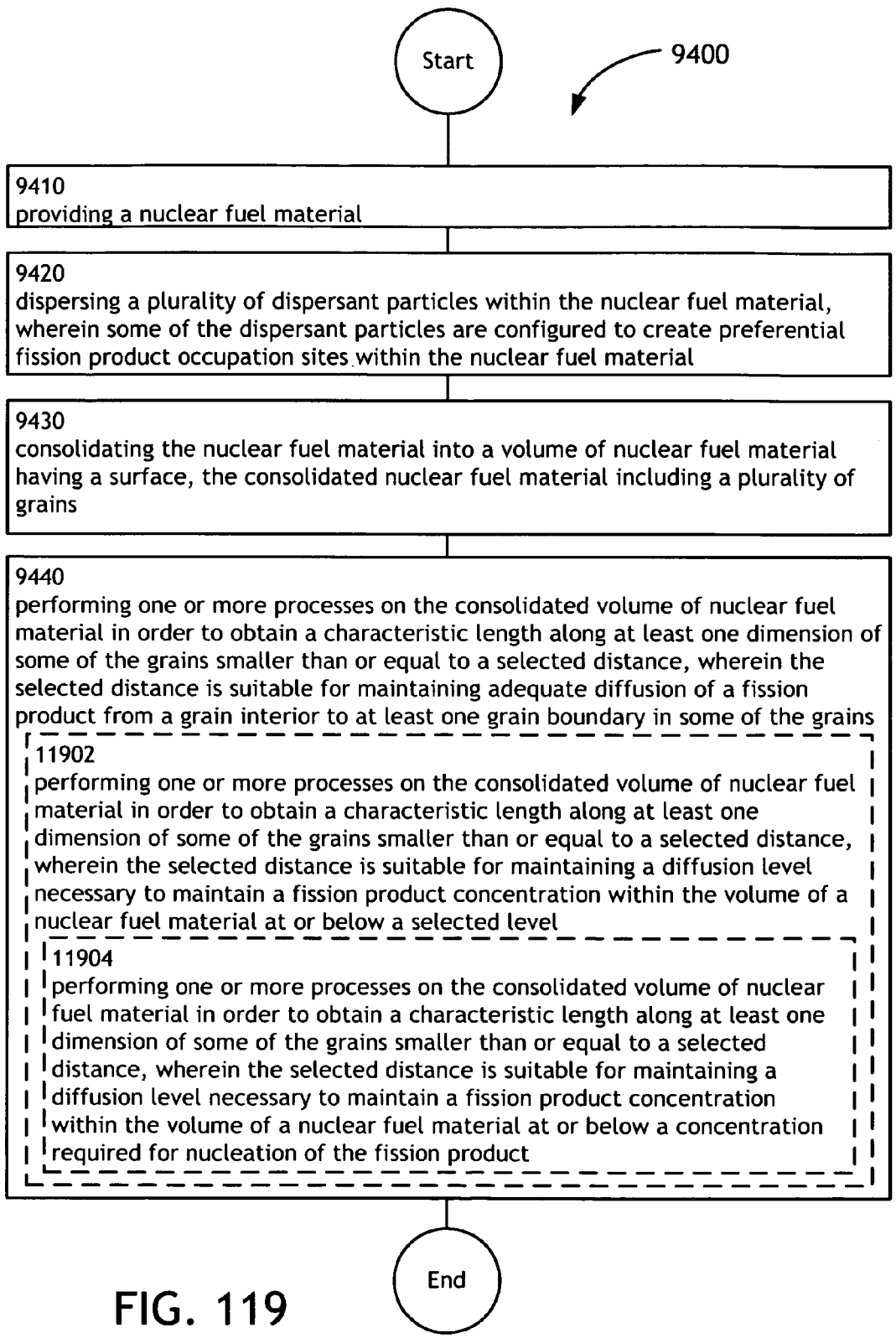

FIG. 119 illustrates alternative embodiments of the example operational flow 9400 of FIG. 94. FIG. 119 illustrates example embodiments where the operation 9440 may include at least one additional operation. Additional operations may include an operation 11902, and/or an operation 11904.

The operation 11902 illustrates performing one or more processes on the consolidated volume of nuclear fuel material in order to obtain a characteristic length along at least one dimension of some of the grains smaller than or equal to a selected distance, wherein the selected distance is suitable for maintaining a diffusion level necessary to maintain a fission product concentration within the volume of a nuclear fuel material at or below a selected level. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a selected distance, which is selected in order to maintain a selected fission product 108 (e.g., fission gas 118) concentration within the volume 102 of the nuclear fuel 100 at or below a selected level. For instance, in a general sense, the rate of diffusion from the grain-interiors 110 to the grain-boundaries 112 in the grains 104 may be inversely related to the average grain size 106 of the grains 104 of the nuclear fuel 100. In this sense, as the grain sizes 106 of the grains 104 decrease, the fission gas 118 diffusion rate from the grain-interiors 110 to the grain-boundaries 112 increases. Therefore, the concentration of a fission gas 118 within the grains 104 may be adjusted to fall within acceptable concentration levels by engineering the grain sizes 106 of the grains 104 of the nuclear fuel 100.

Further, the operation 11904 illustrates performing one or more processes on the consolidated volume of nuclear fuel material in order to obtain a characteristic length along at least one dimension of some of the grains smaller than or equal to a selected distance, wherein the selected distance is suitable for maintaining a diffusion level necessary to maintain a fission product concentration within the volume of a nuclear fuel material at or below a concentration required for nucleation of the fission product. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a selected distance, which is selected in order to maintain a selected fission product 108 (e.g., fission gas 118) concentration below a concentration level required for nucleation of the fission product 108 within a grain-interior 110. For instance, the concentration of a fission gas 118 within the grains 104 may be adjusted to fall below the concentration level required for fission gas nucleation with the grain-interiors 110 by engineering the grain sizes 106 of the grains 104 of the nuclear fuel 100.

Figure 120:
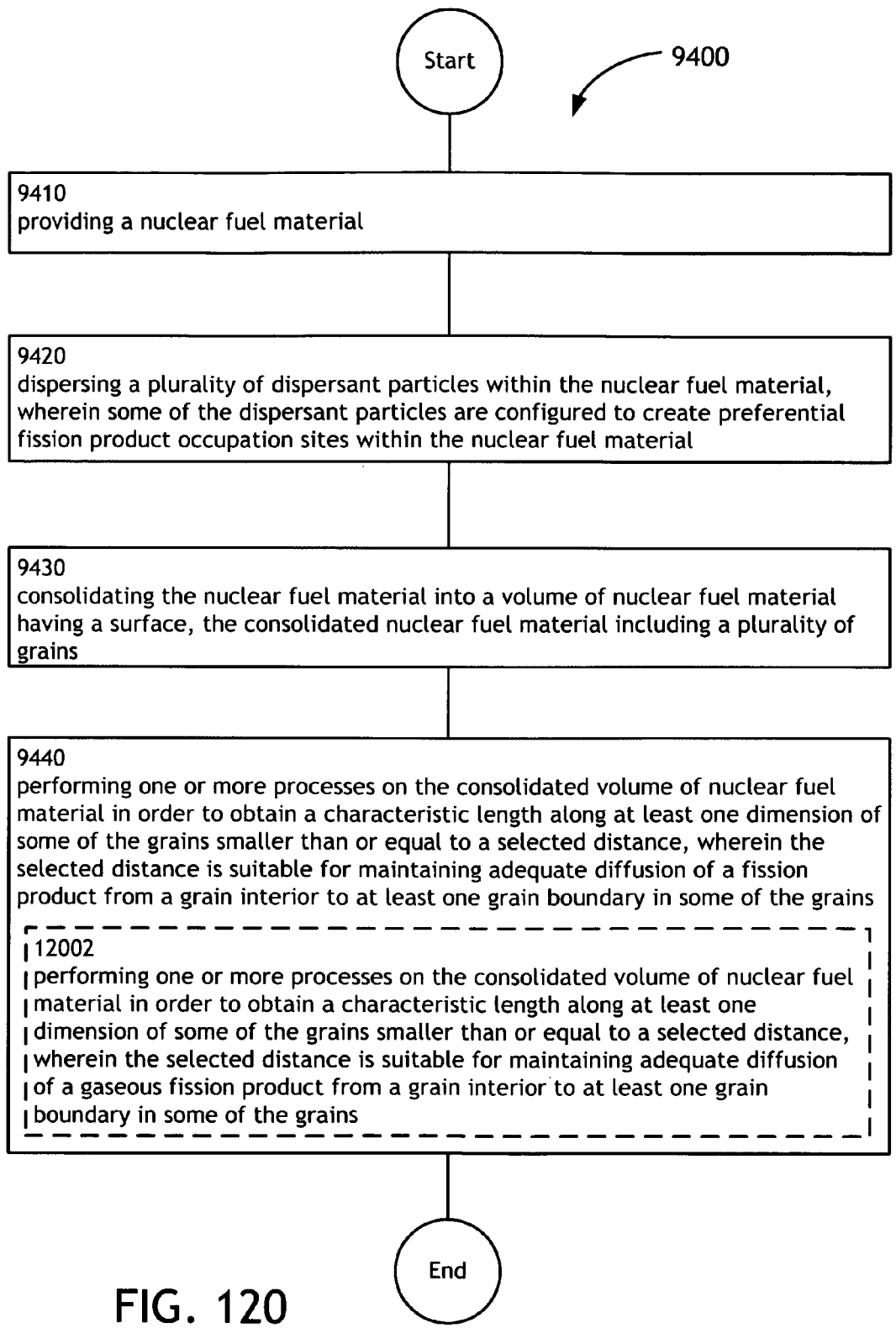

FIG. 120 illustrates alternative embodiments of the example operational flow 9400 of FIG. 94. FIG. 120 illustrates example embodiments where the operation 9440 may include at least one additional operation. Additional operations may include an operation 12002.

The operation 12002 illustrates performing one or more processes on the consolidated volume of nuclear fuel material in order to obtain a characteristic length along at least one dimension of some of the grains smaller than or equal to a selected distance, wherein the selected distance is suitable for maintaining adequate diffusion of a gaseous fission product from a grain interior to at least one grain boundary in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a critical distance required for adequate diffusion of a fission gas 118 (e.g., krypton or xenon) from the grain-interiors 110 to the grain-boundaries 112 of the grains 104.

Figure 121:
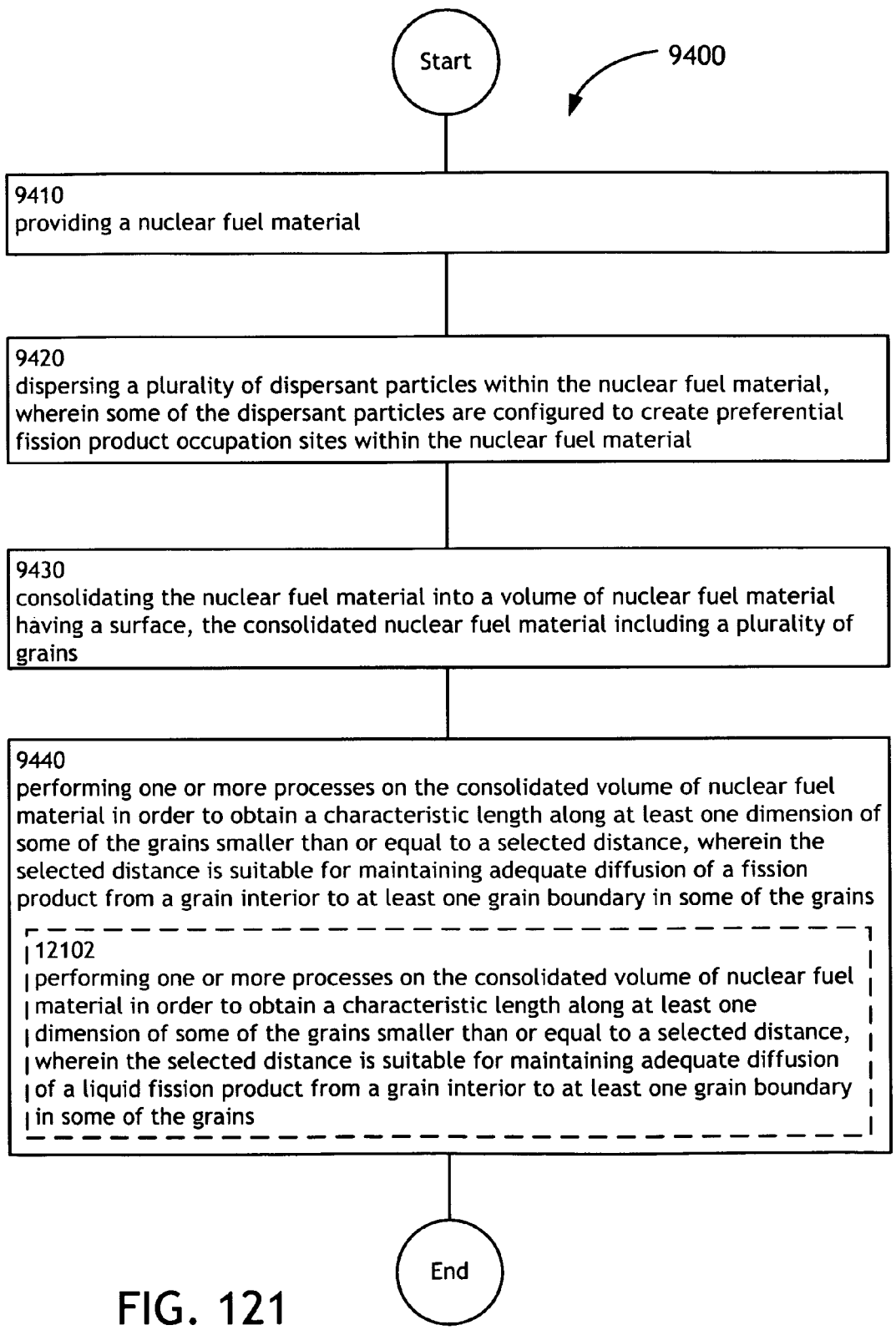

FIG. 121 illustrates alternative embodiments of the example operational flow 9400 of FIG. 94. FIG. 121 illustrates example embodiments where the operation 9440 may include at least one additional operation. Additional operations may include an operation 12102.

The operation 12102 illustrates performing one or more processes on the consolidated volume of nuclear fuel material in order to obtain a characteristic length along at least one dimension of some of the grains smaller than or equal to a selected distance, wherein the selected distance is suitable for maintaining adequate diffusion of a liquid fission product from a grain interior to at least one grain boundary in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a critical distance required for adequate diffusion of a liquid fission product 119 (e.g., liquid metal) from the grain-interiors 110 to the grain-boundaries 112 of the grains 104.

Figure 122:
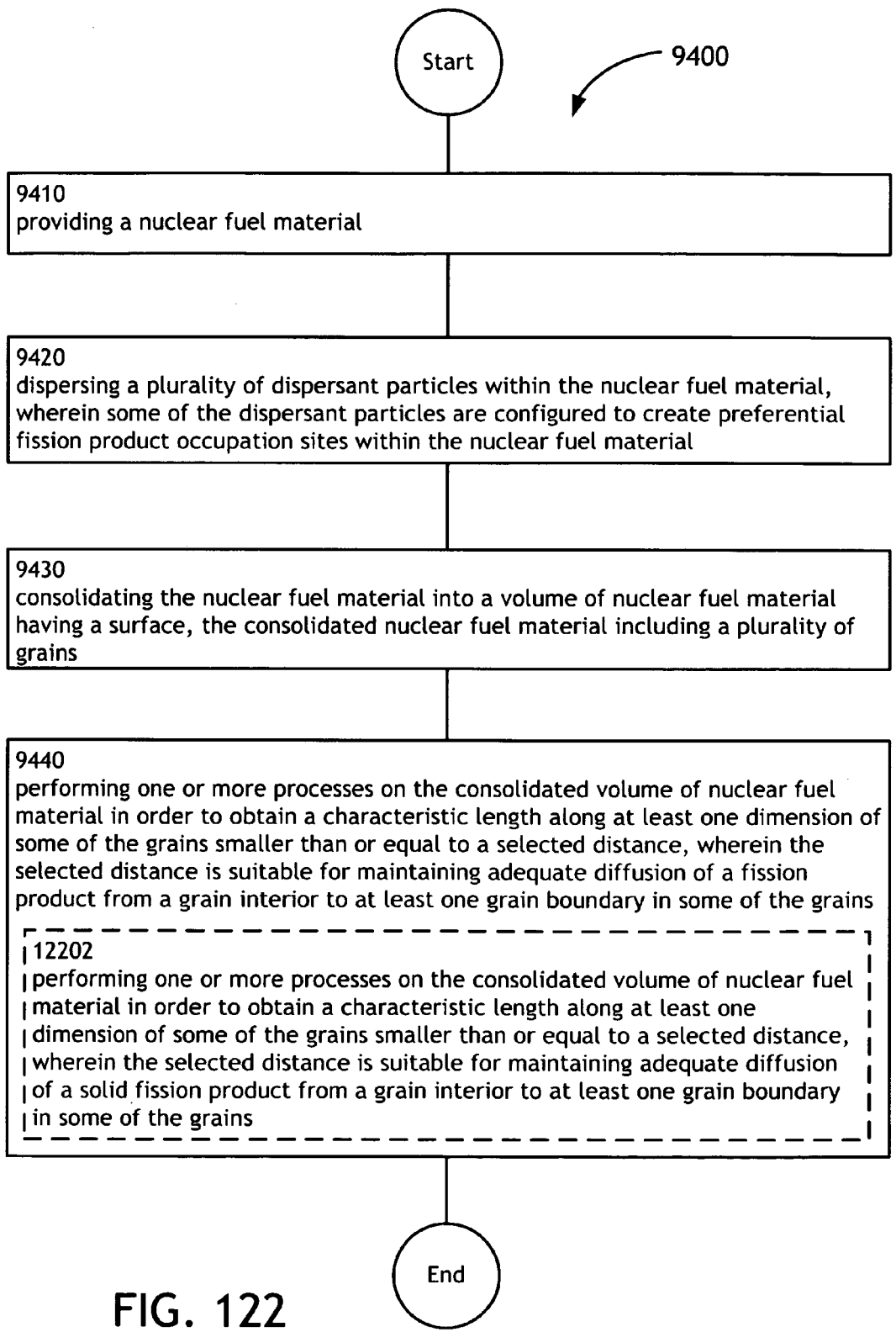

FIG. 122 illustrates alternative embodiments of the example operational flow 9400 of FIG. 94. FIG. 122 illustrates example embodiments where the operation 9440 may include at least one additional operation. Additional operations may include an operation 12202.

The operation 12202 illustrates performing one or more processes on the consolidated volume of nuclear fuel material in order to obtain a characteristic length along at least one dimension of some of the grains smaller than or equal to a selected distance, wherein the selected distance is suitable for maintaining adequate diffusion of a solid fission product from a grain interior to at least one grain boundary in some of the grains. For example, as shown in FIGS. 1A through 4, one or more processes may be utilized in order engineer the grains 104 of the nuclear fuel 100 to have a characteristic length 106 along at least one dimension of some of the grains 104 of the nuclear fuel 100 smaller than a critical distance required for adequate diffusion of a solid fission product 120 (e.g., tellurium or cesium) from the grain-interiors 110 to the grain-boundaries 112 of the grains 104.

Figure 123:
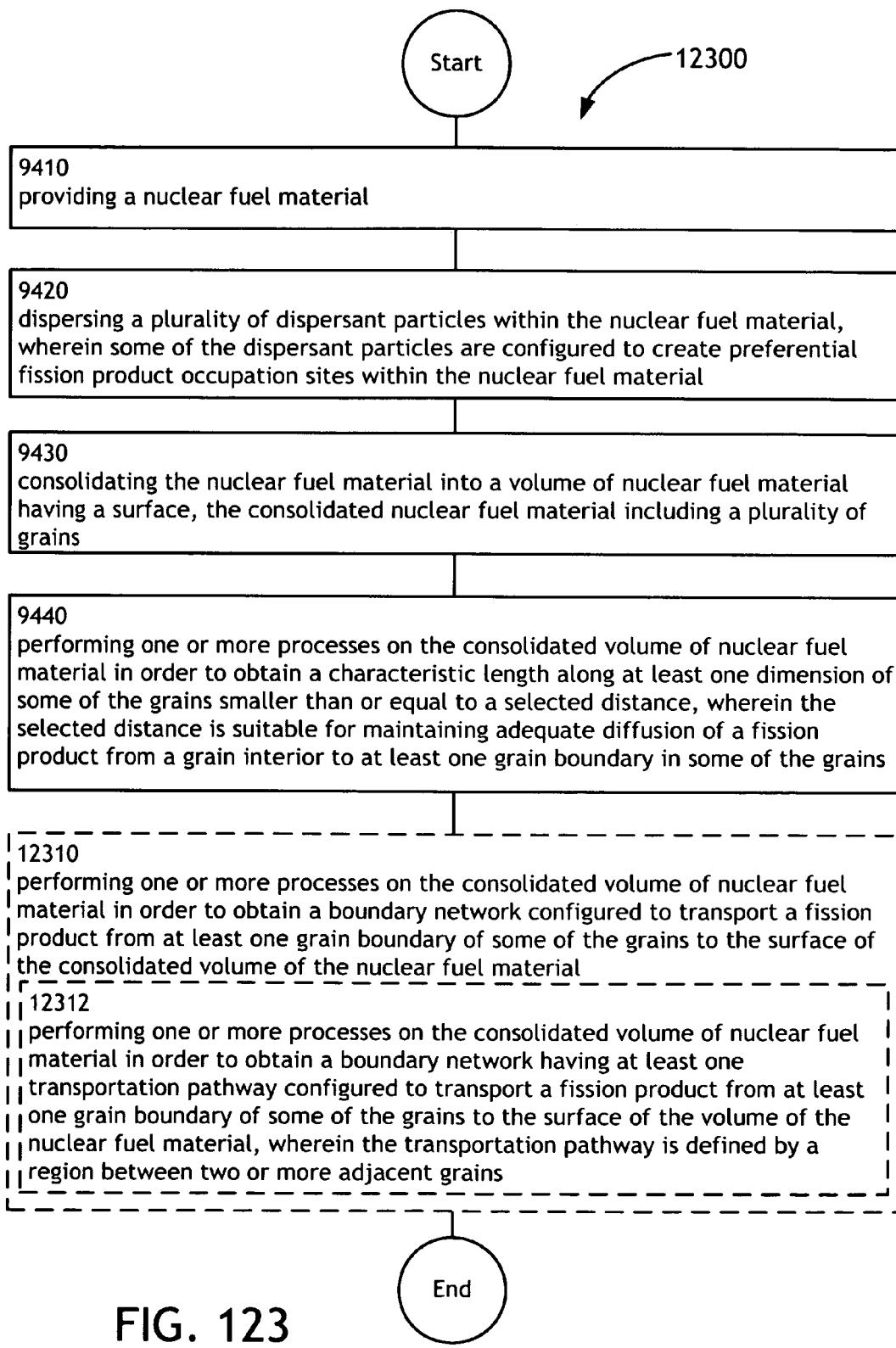

FIG. 123 illustrates an operational flow 12300 representing example operations related to a method for fabricating a nuclear fuel. FIG. 123 illustrates an example embodiment where the example operational flow 9400 of FIG. 94 may include at least one additional operation. Additional operations may include an operation 12310, and/or an operation 12312.

After a start operation, a providing operation 9410, a dispersing operation 9420, a consolidating operation 9430, and a processing operation 9440, the operational flow 12300 moves to a boundary formation operation 12310. Operation 12310 illustrates performing one or more processes on the consolidated volume of nuclear fuel material in order to obtain a boundary network configured to transport a fission product from at least one grain boundary of some of the grains to the surface of the consolidated volume of the nuclear fuel material. For example, as shown in FIGS. 1A through 4, one or more processes may be performed on the volume 102 of nuclear fuel 100 (e.g., fuel rod, fuel pellet, or fuel pebble) in order to form or further develop a boundary network 114 suitable for transporting a fission product 108 from the grain-boundaries 112 to the geometric surface 101 of the nuclear fuel 100.

The operation 12312 illustrates performing one or more processes on the consolidated volume of nuclear fuel material in order to obtain a boundary network having at least one transportation pathway configured to transport a fission product from at least one grain boundary of some of the grains to the surface of the volume of the nuclear fuel material, wherein the transportation pathway is defined by a region between two or more adjacent grains. For example, as shown in FIGS. 1A through 4, one or more processes (e.g., cold-working, annealing, or the like) may be performed on the volume 102 of nuclear fuel 100 (e.g., fuel rod, fuel pellet, or fuel pebble) in order to form or further develop a boundary network 114 having one or more transportation pathways 116 defined by a region two adjacent grains 104 suitable for transporting a fission product 108 from the grain-boundaries 112 to the geometric surface 101 of the nuclear fuel 100.

Figure 124:
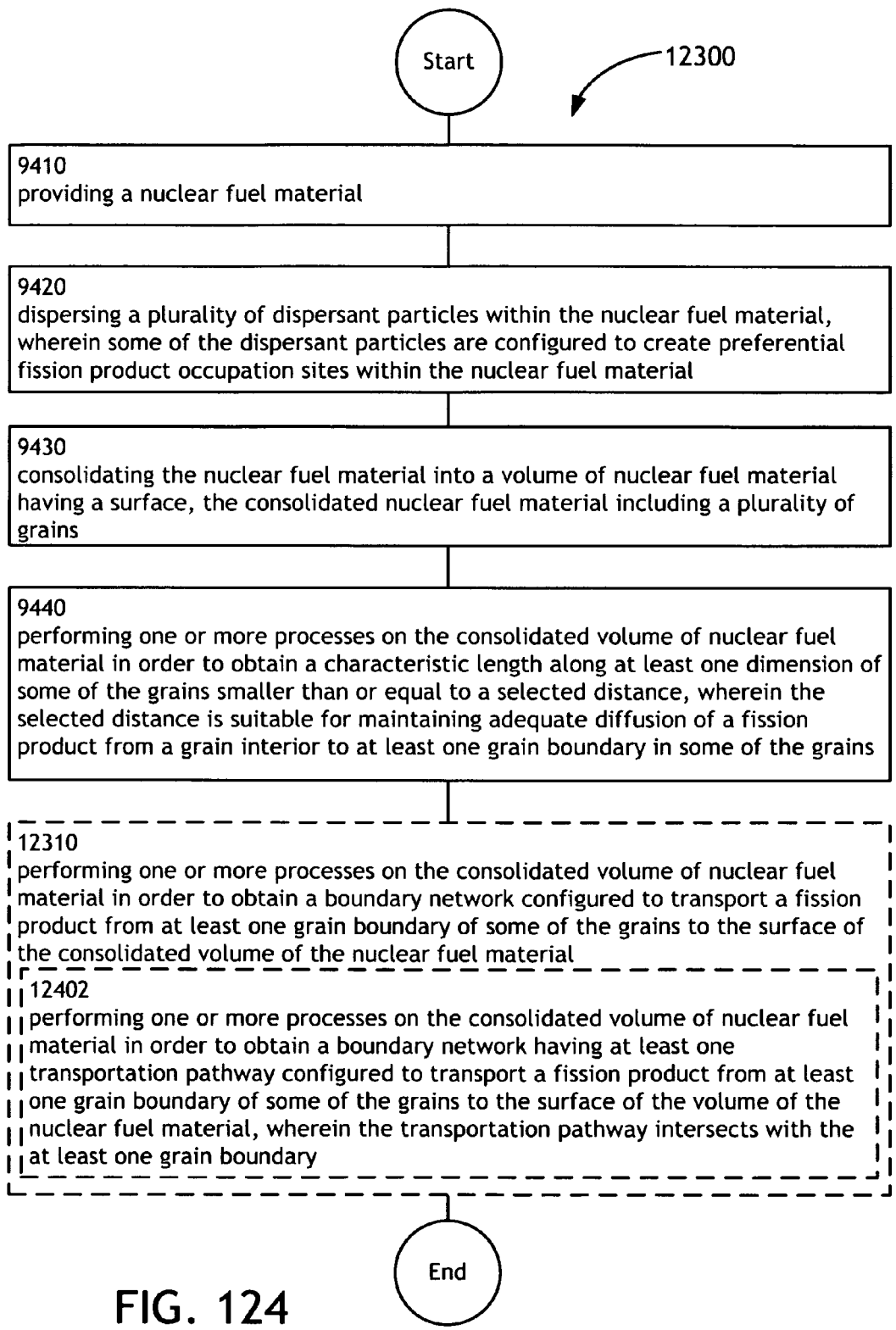

FIG. 124 illustrates alternative embodiments of the example operational flow 12300 of FIG. 123. FIG. 124 illustrates example embodiments where the operation 12310 may include at least one additional operation. Additional operations may include an operation 12402.

The operation 12402 illustrates performing one or more processes on the consolidated volume of nuclear fuel material in order to obtain a boundary network having at least one transportation pathway configured to transport a fission product from at least one grain boundary of some of the grains to the surface of the volume of the nuclear fuel material, wherein the transportation pathway intersects with the at least one grain boundary. For example, as shown in FIGS. 1A through 4, one or more processes may be performed on the volume 102 of nuclear fuel 100 in order to form or further develop a boundary network 114 having one or more transportation pathways 116 intersecting with a grain-boundary 110 of one or more grains 104 suitable for transporting a fission product 108 from the grain-boundaries 112 to the geometric surface 101 of the nuclear fuel 100

Figure 125:
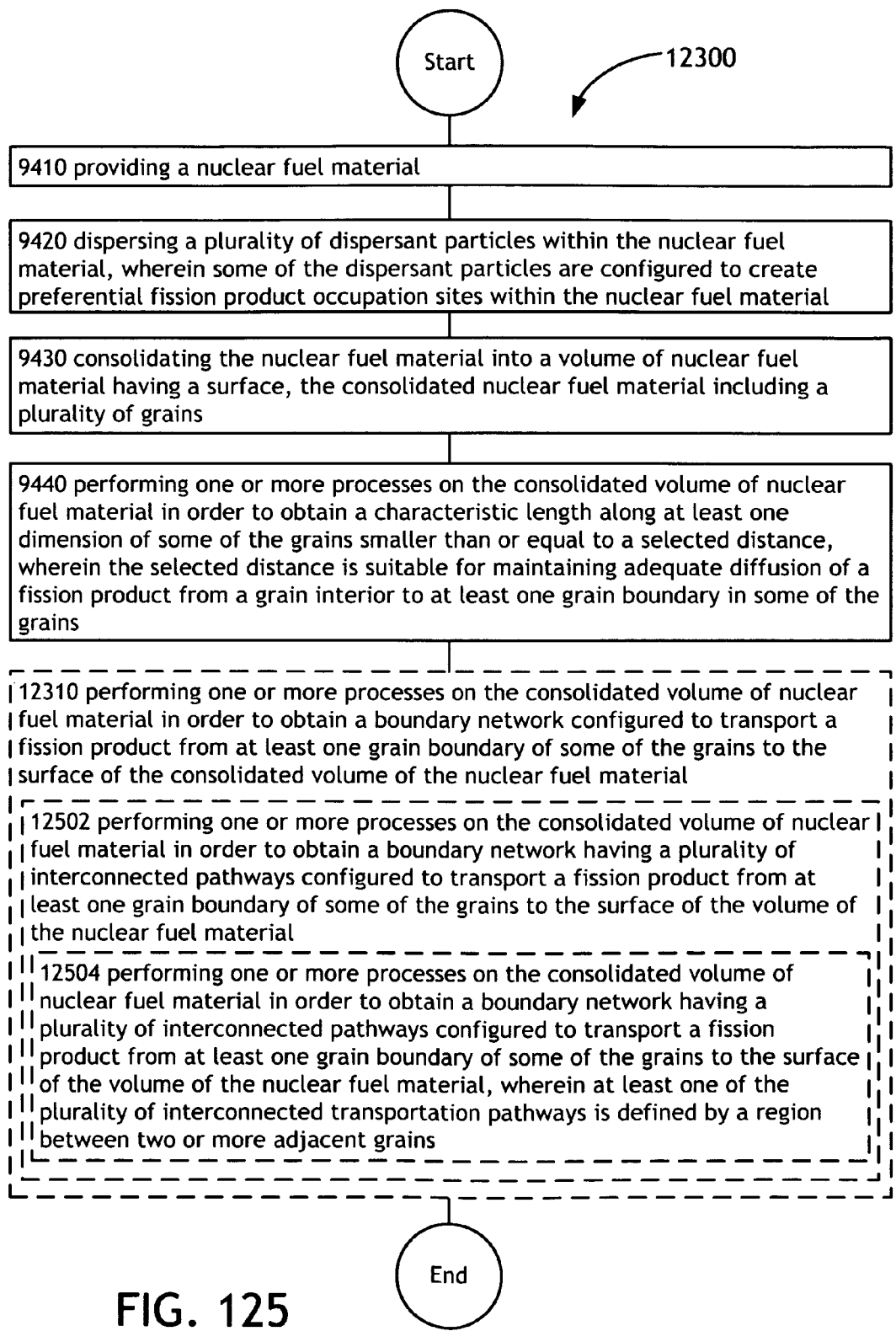

FIG. 125 illustrates alternative embodiments of the example operational flow 12300 of FIG. 123. FIG. 125 illustrates example embodiments where the operation 12310 may include at least one additional operation. Additional operations may include an operation 12502, and/or an operation 12504.

The operation 12502 illustrates performing one or more processes on the consolidated volume of nuclear fuel material in order to obtain a boundary network having a plurality of interconnected pathways configured to transport a fission product from at least one grain boundary of some of the grains to the surface of the volume of the nuclear fuel material. For example, as shown in FIGS. 1A through 4, one or more processes may be performed on the volume 102 of nuclear fuel 100 in order to form or further develop a boundary network 114 having one or more interconnected pathways suitable for transporting a fission product 108 from the grain-boundaries 112 to the geometric surface 101 of the nuclear fuel 100.

Further, the operation 12504 illustrates performing one or more processes on the consolidated volume of nuclear fuel material in order to obtain a boundary network having a plurality of interconnected pathways configured to transport a fission product from at least one grain boundary of some of the grains to the surface of the volume of the nuclear fuel material, wherein at least one of the plurality of interconnected transportation pathways is defined by a region between two or more adjacent grains. For example, as shown in FIGS. 1A through 4, one or more processes may be performed on the volume 102 of nuclear fuel 100 in order to form or further develop a boundary network 114 having one or more interconnected pathways defined by the region between two or more adjacent grains 104.

Figure 126:
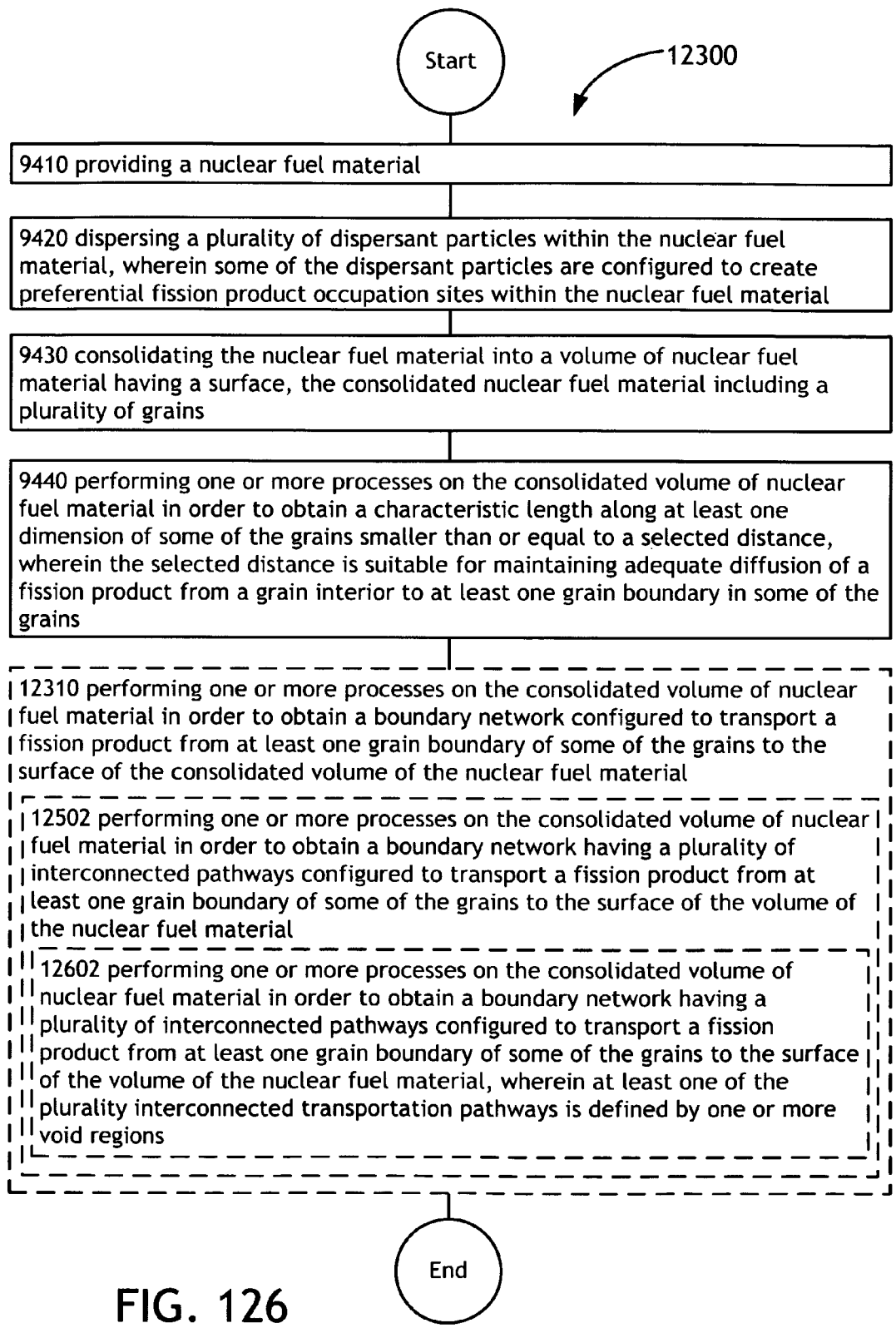

FIG. 126 illustrates alternative embodiments of the example operational flow 12300 of FIG. 123. FIG. 126 illustrates example embodiments where the operation 12310 may include at least one additional operation. Additional operations may include an operation 12602. Further, the operation 12602 illustrates performing one or more processes on the consolidated volume of nuclear fuel material in order to obtain a boundary network having a plurality of interconnected pathways configured to transport a fission product from at least one grain boundary of some of the grains to the surface of the volume of the nuclear fuel material, wherein at least one of the plurality interconnected transportation pathways is defined by one or more void regions. For example, as shown in FIGS. 1A through 4, one or more processes may be performed on the volume 102 of nuclear fuel 100 in order to form or further develop a boundary network 114 having one or more interconnected pathways defined by one or more void regions within the nuclear fuel 100.

Figure 127:
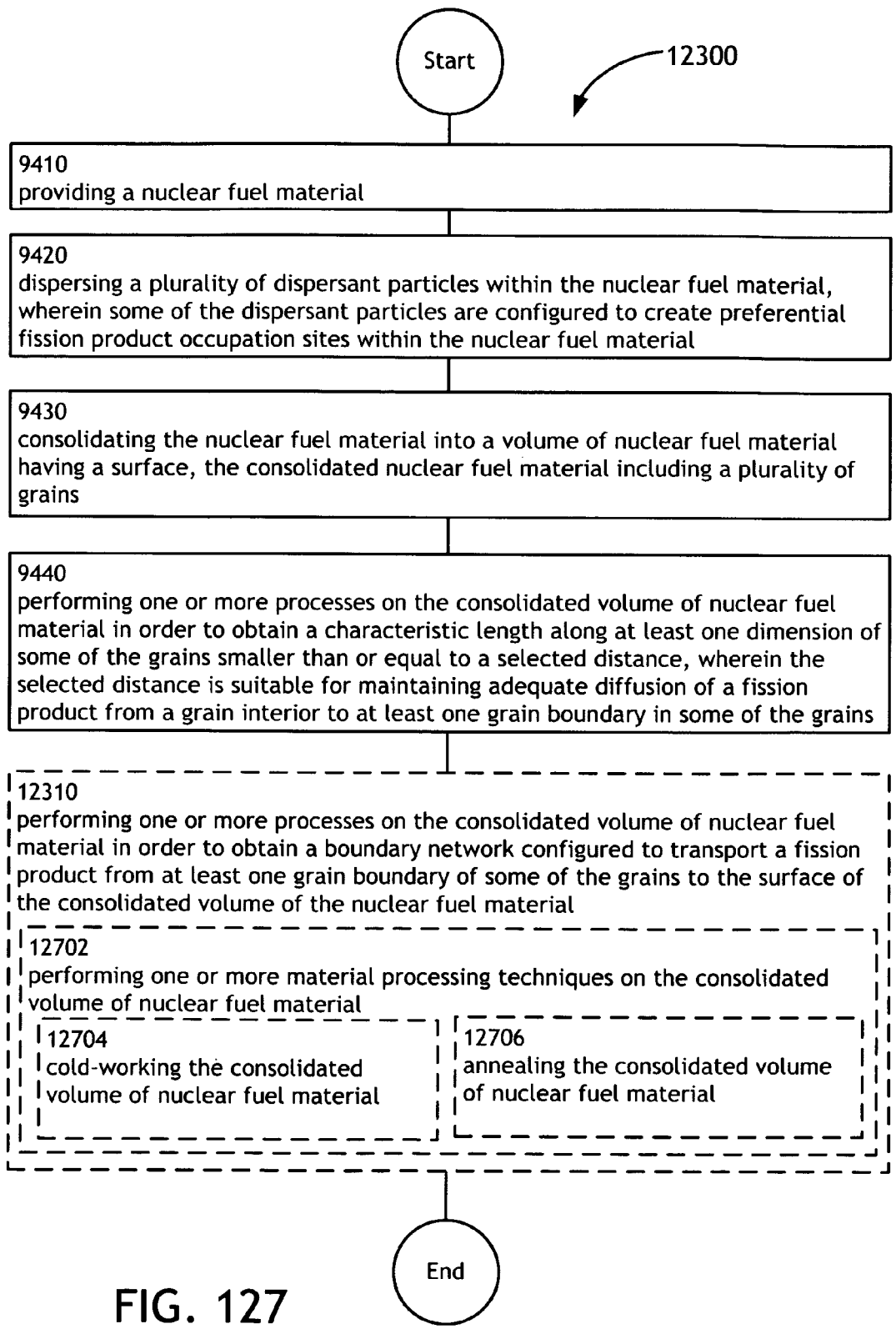

FIG. 127 illustrates alternative embodiments of the example operational flow 12300 of FIG. 123. FIG. 127 illustrates example embodiments where the operation 12310 may include at least one additional operation. Additional operations may include an operation 12702, an operation 12704, and/or an operation 12706.

The operation 12702 illustrates performing one or more material processing techniques on the consolidated volume of nuclear fuel material. For example, as shown in FIGS. 1A through 4, one or more material processing techniques may be employed to reduce the grain sizes 106 of the grains 104 within the nuclear fuel 100 below a size required for adequate diffusion of a fission product 108. In another example, one or more material processing steps may be employed to form or facilitate the formation of the boundary network 114 within the nuclear reactor fuel 100. Moreover, as the grain sizes 106 decrease within the nuclear fuel 100 the number of potential transportation pathways 116 of the boundary network 114 increases, increasing the interconnection frequency within the boundary network 114 and increasing the number of pathways 116 that intersect with the geometric surface 101 of the nuclear fuel 100. Further, grain size 106 reduction and boundary network 114 formation may be carried out utilizing a single process step or multiple process steps.

Further, the operation 12704 illustrates cold-working the consolidated volume of nuclear fuel material. For example, as shown in FIGS. 1A through 4, the consolidated volume 102 of nuclear fuel material may be cold-worked in order to reduce the grain sizes 106 of one or more grains 104 within the consolidated volume 102 and/or develop the boundary network 114 of the nuclear fuel 100. The cold-working process may include, but is not limited to, cold-rolling, extruding a cast nuclear fuel material at low temperature, bending, compression, or drawing.

Further, the operation 12706 illustrates annealing the consolidated volume of nuclear fuel material. For example, as shown in FIGS. 1A through 4, the consolidated volume 102 of nuclear fuel material may be annealed in order to reduce the grain sizes 106 of one or more grains 104 within the consolidated volume 102 and/or develop the boundary network 114 of the nuclear fuel 100. For instance, after being cold-worked, the nuclear reactor fuel 100 may be annealed to a temperature below the recrystallization temperature in order to achieve the desired grain size 106 within the nuclear fuel 100. In another instance, during a casting process, the nuclear reactor fuel 100 may be annealed in order to facilitate the migration of precipitating agents, such as carbon or nitrogen, out of the nuclear fuel material to the grain-boundaries 112 of the nuclear fuel 100.

Figure 128:
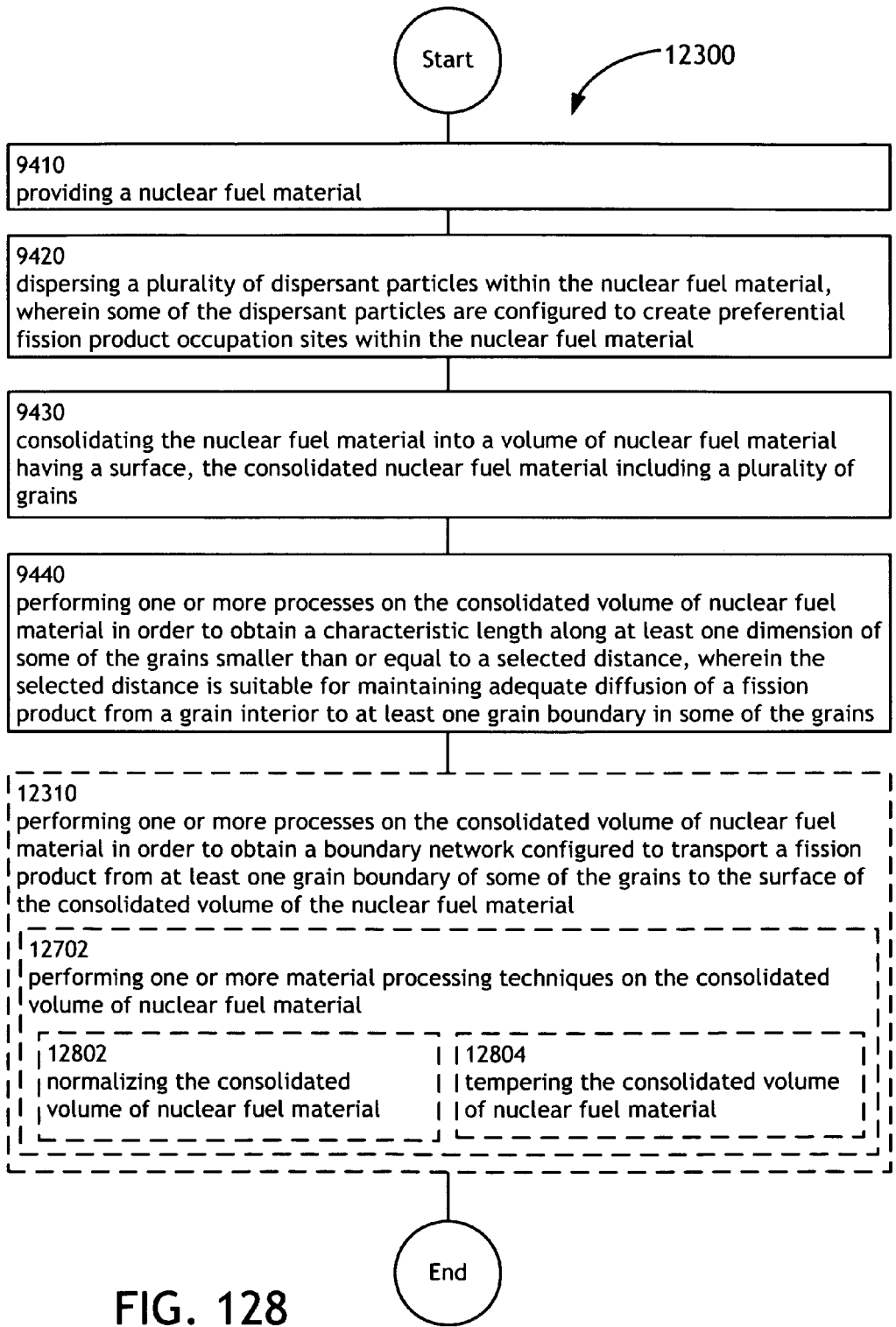

FIG. 128 illustrates alternative embodiments of the example operational flow 12300 of FIG. 123. FIG. 128 illustrates example embodiments where the operation 12310 may include at least one additional operation. Additional operations may include an operation 12802, and/or an operation 12804.

Further, the operation 12802 illustrates normalizing the consolidated volume of nuclear fuel material. For example, as shown in FIGS. 1A through 4, the consolidated volume 102 of nuclear fuel material may undergo a normalizing process in order to reduce the grain sizes 106 of one or more grains 104 within the consolidated volume 102 and/or develop the boundary network 114 of the nuclear fuel 100. For instance, after undergoing a cold-working process, the nuclear reactor fuel 100 may be annealed to a temperature above its upper critical temperature. The nuclear fuel 100 may be held at the elevated temperature for a selected amount of time and then cooled to ambient temperatures in air.

Further, the operation 12804 illustrates tempering the consolidated volume of nuclear fuel material. For example, as shown in FIGS. 1A through 4, the consolidated volume 102 of nuclear fuel material may undergo a tempering process in order to reduce the grain sizes 106 of one or more grains 104 within the consolidated volume 102 and/or develop the boundary network 114 of the nuclear fuel 100. For instance, the composition of the nuclear fuel material of the consolidated volume 102 of the nuclear fuel 100 may be suitable for precipitation of a precipitant (e.g., carbon) upon annealing. For example, a tempering process may be utilized to precipitate out a precipitating agent, such as, but not limited to, carbon. The precipitation of this agent into the grain structure of the nuclear fuel 100 may then lead to a reduction in the grain sizes 106 of the grains 104 and/or development of the boundary network 114 of the nuclear fuel 100.

Figure 129:
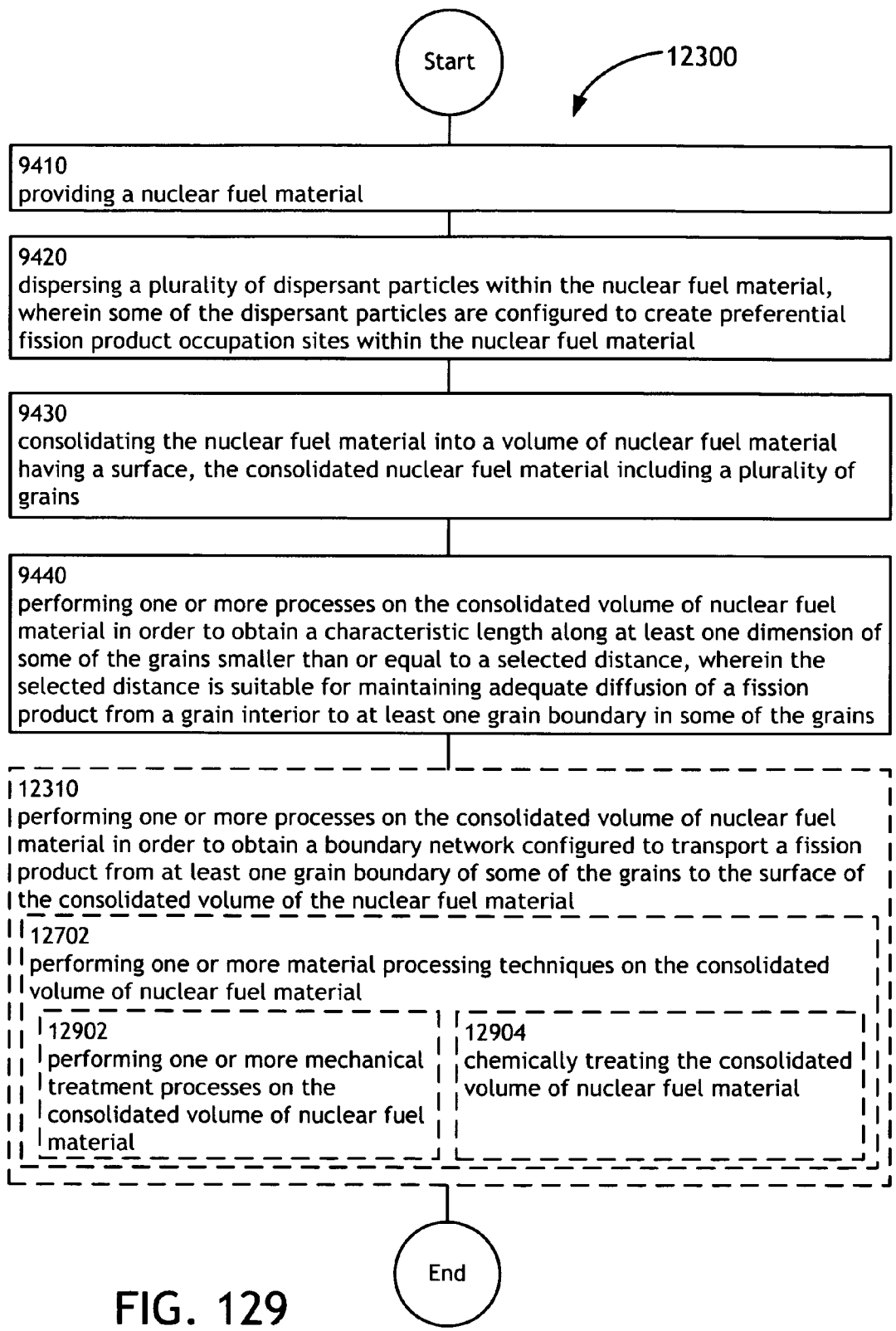

FIG. 129 illustrates alternative embodiments of the example operational flow 12300 of FIG. 123. FIG. 129 illustrates example embodiments where the operation 12310 may include at least one additional operation. Additional operations may include an operation 12902, and/or an operation 12904.

Further, the operation 12902 illustrates performing one or more mechanical treatment processes on the consolidated volume of nuclear fuel material. For example, as shown in FIGS. 1A through 4, the consolidated volume 102 of nuclear fuel material may undergo a mechanical treatment process (e.g., compression) in order to reduce the grain sizes 106 of one or more grains 104 within the consolidated volume 102 and/or develop the boundary network 114 of the nuclear fuel 100.

Further, the operation 12904 illustrates chemically treating the consolidated volume of nuclear fuel material. For example, as shown in FIGS. 1A through 4, the consolidated volume 102 of nuclear fuel material may undergo a chemical treatment process in order to reduce the grain sizes 106 of one or more grains 104 within the consolidated volume 102 and/or develop the boundary network 114 of the nuclear fuel 100. For instance, a volume of 102 uranium dioxide may undergo an annealing process in the presence of an oxygen reducing gas (e.g., hydrogen-argon mixture or hydrogen-nitrogen mixture) in order to convert a portion of the stoichiometric $UO_2$ phase to a non-stoichiometric oxygen reduced phase, such as $UO_{1.8}$. The sub-stoichiometric phase has a reduced grain size with respect to the stoichiometric phase.

Figure 130:
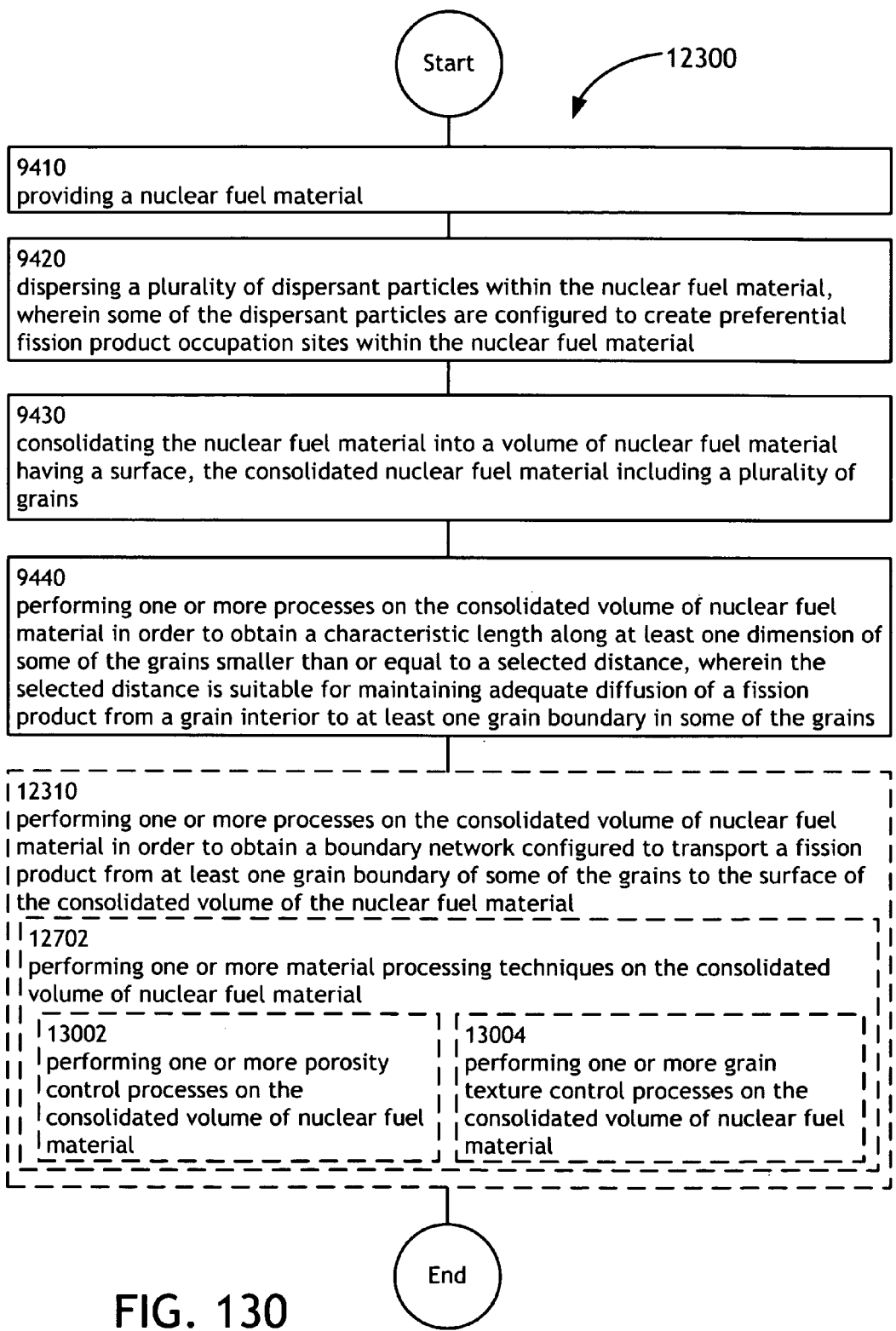

FIG. 130 illustrates alternative embodiments of the example operational flow 12300 of FIG. 123. FIG. 130 illustrates example embodiments where the operation 12310 may include at least one additional operation. Additional operations may include an operation 13002, and/or an operation 13004.

Further, the operation 13002 illustrates performing one or more porosity control processes on the consolidated volume of nuclear fuel material. For example, as shown in FIGS. 1A through 4, the consolidated volume 102 of nuclear fuel material may undergo a porosity control process. For instance, porosity of the nuclear fuel 100 may be controlled via a heat treatment process (e.g., an annealing process or melting process) or a chemical treatment process.

Further, the operation 13004 illustrates performing one or more grain texture control processes on the consolidated volume of nuclear fuel material. For example, as shown in FIGS. 1A through 4, the consolidated volume 102 of nuclear fuel material may undergo a grain texture control process. For instance, grain textures of the grains 104 of the nuclear fuel 100 may be controlled via a heat treatment process (e.g., annealing) or a chemical treatment process (e.g., doping).

Figure 131:
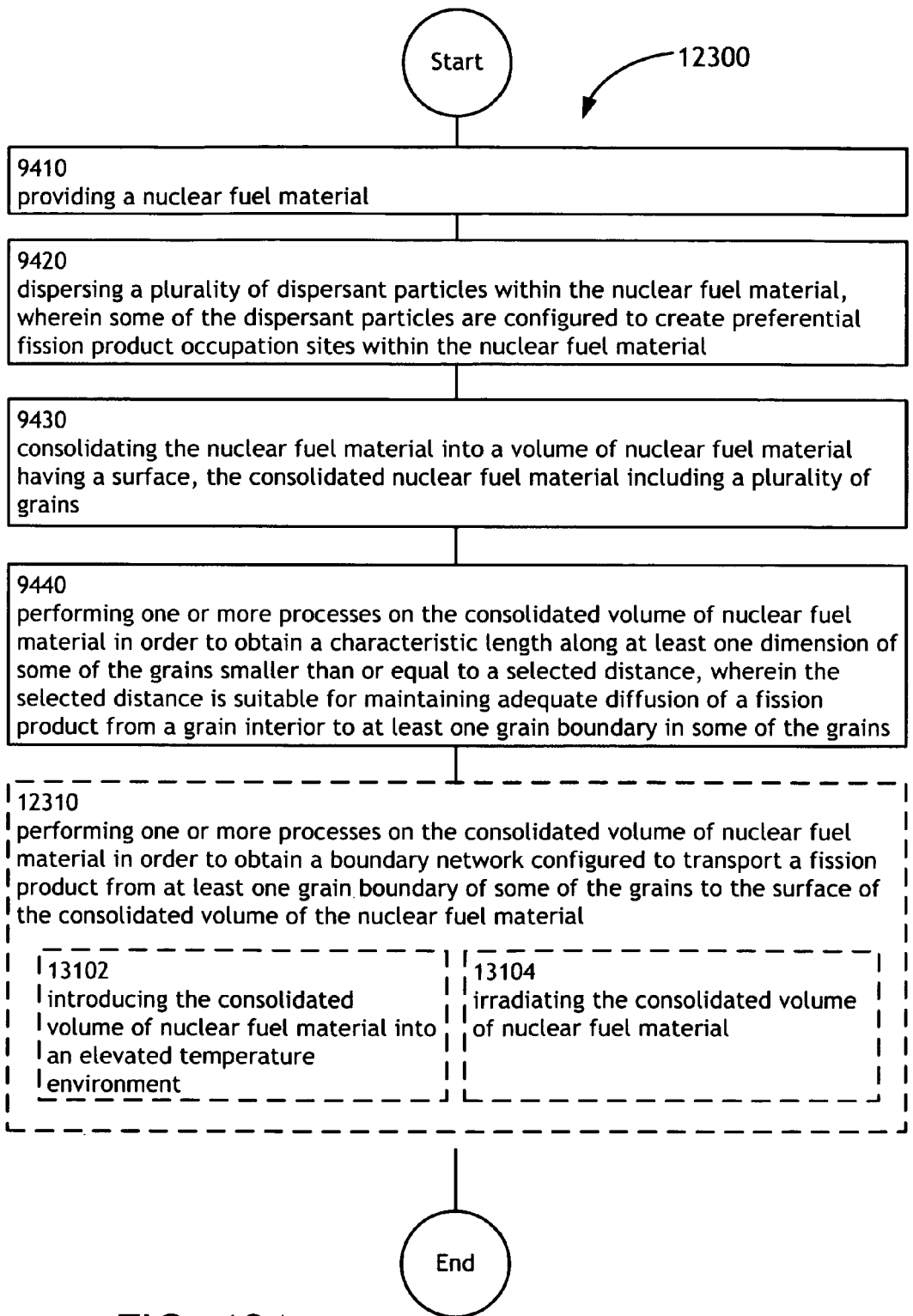

FIG. 131 illustrates alternative embodiments of the example operational flow 12300 of FIG. 123. FIG. 131 illustrates example embodiments where the operation 12310 may include at least one additional operation. Additional operations may include an operation 13102, and/or an operation 13104.

The operation 13102 illustrates introducing the consolidated volume of nuclear fuel material into an elevated temperature environment. For example, as shown in FIGS. 1A through 4, the consolidated volume 102 of nuclear fuel material may be exposed to a high temperature environment in order to reduce the grain sizes 106 of one or more grains 104 within the consolidated volume 102 and/or develop the boundary network 114 of the nuclear fuel 100. For instance, the consolidated volume 102 of nuclear fuel material may be implemented in a nuclear reactor setting. The nuclear fuel grain structure may be configured (e.g., cold-worked) to take advantage of the high temperature environment which occurs when the nuclear reactor fuel 100 undergoes fission. The thermal energy produced by the fission of a portion of the nuclear fuel 100 may act to reduce or further reduce the grain sizes 106 of one or more grains 104 within the consolidated volume 102 and/or develop the boundary network 114 of the nuclear fuel 100. For instance, the thermal energy produced during a fission process of the nuclear fuel 100 may act to facilitate migration of precipitant agents, such as carbon or nitrogen, within the nuclear fuel material. Upon thermal activation, the precipitants may migrate to the grain-boundaries 112 of the nuclear fuel 100, aiding in "open" bubble formation a the grain-boundaries, leading to a development of the boundary network 114.

The operation 13104 illustrates irradiating the consolidated volume of nuclear fuel material. For example, as shown in FIGS. 1A through 4, the consolidated volume 102 of nuclear fuel material may be irradiated in order to reduce the grain sizes 106 of one or more grains 104 within the consolidated volume 102 and/or develop the boundary network 114 of the nuclear fuel 100. For instance, the consolidated volume 102 of nuclear fuel material may be implemented in a nuclear reactor setting. Prior to implementation in the nuclear reactor setting, the grain sizes 106 of the nuclear fuel 100 may be engineered to have a size below the critical size necessary for adequate diffusion of a produced fission gases (e.g., xenon or krypton) from the grain-interiors 110 to the grain-boundaries 112 of the nuclear fuel 100. As a result, when implemented in a nuclear reactor setting the fission gases 118 produced during the nuclear fuel 100 fission processes may efficiently nucleate at the grain-boundaries 112 of the nuclear fuel 100. This may facilitate the production of a boundary network 114 suitable for transportation of the fission gases to the geometric surface 101 of the nuclear fuel 100.

Figure 132:
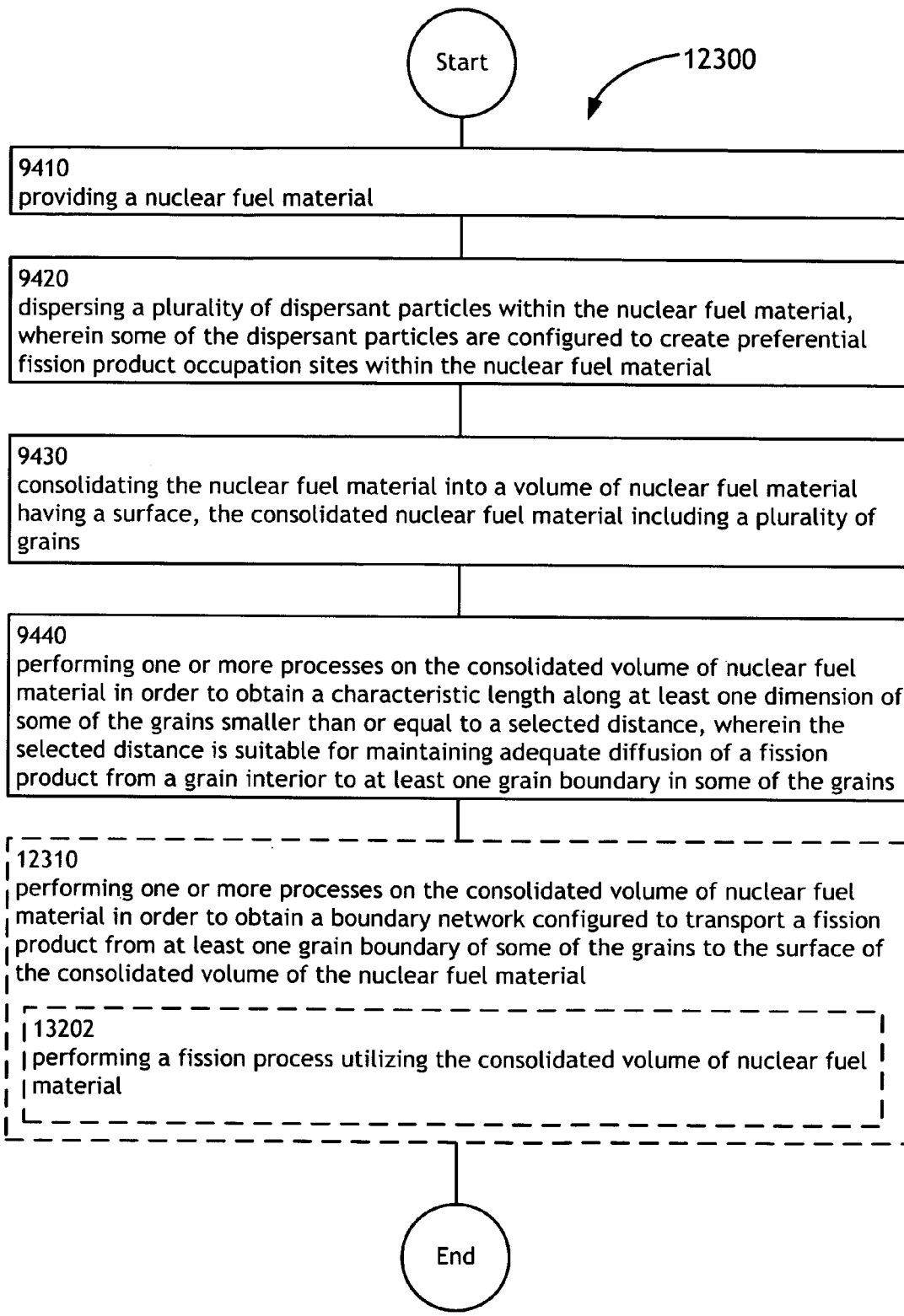

FIG. 132 illustrates alternative embodiments of the example operational flow 12300 of FIG. 123. FIG. 132 illustrates example embodiments where the operation 12310 may include at least one additional operation. Additional operations may include an operation 13202.

The operation 13202 illustrates performing a fission process utilizing the consolidated volume of nuclear fuel material. For example, as shown in FIGS. 1A through 4, the consolidated volume 102 of nuclear fuel material may be utilized in nuclear reactor in order to reduce the grain sizes 106 of one or more grains 104 within the consolidated volume 102 and/or develop the boundary network 114 of the nuclear fuel 100. For instance, the elevated radiation environment and/or the high temperatures within the nuclear fuel 100 may lead to the efficient nucleation at the grain-boundaries 112 of the nuclear fuel 100. This may facilitate the production of a boundary network 114 suitable for transportation of the fission gases to the geometric surface 101 of the nuclear fuel 100.

Figure 133:
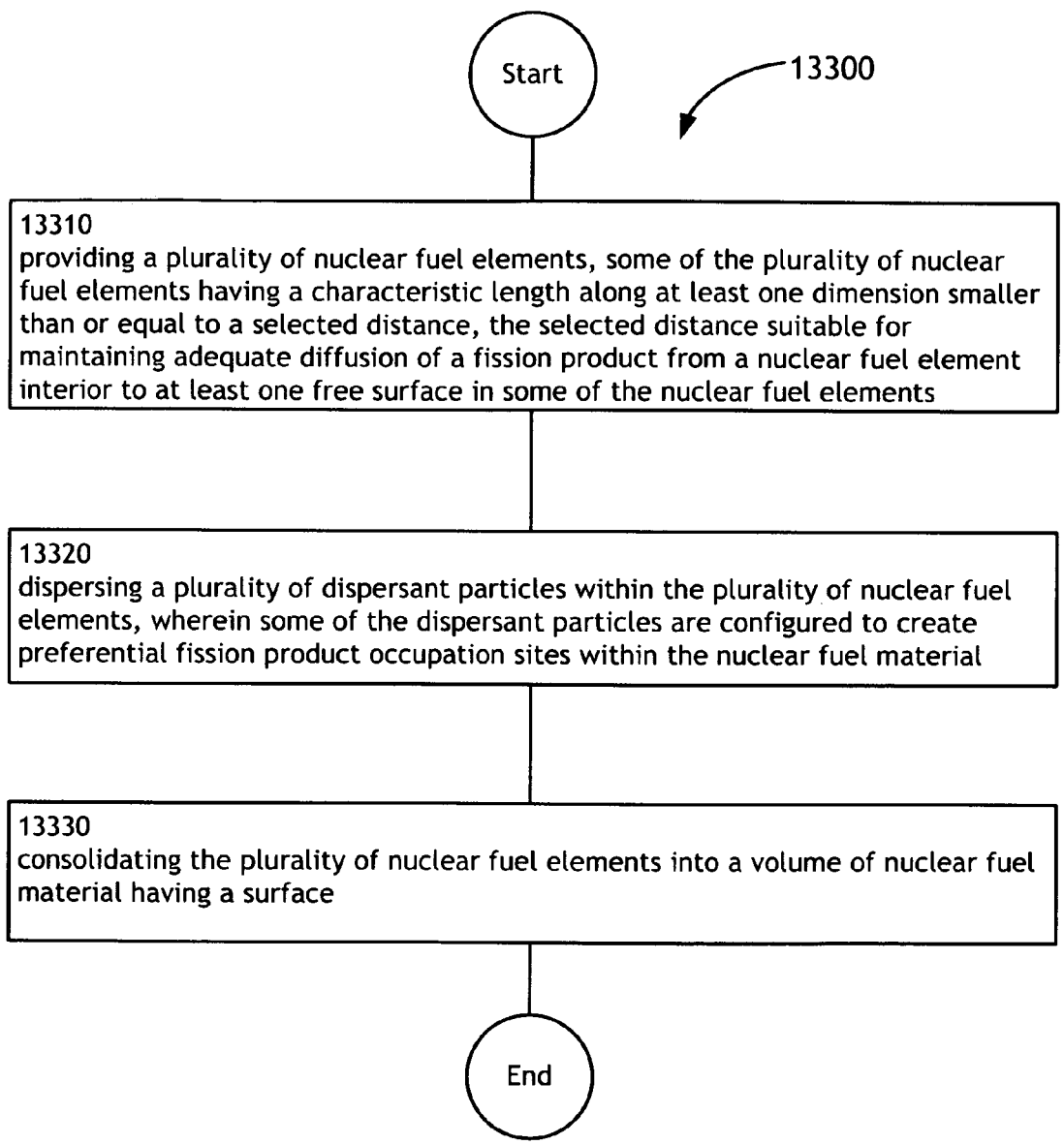
FIGS. 133 through 181 are high-level flowcharts depicting alternate implementations of FIG. 94.

FIG. 133 illustrates an operational flow 13300 representing example operations related to a method for fabricating a nuclear fuel. In FIG. 133 and in following figures that include various examples of operational flows, discussion and explanation may be provided with respect to the above-described examples of FIGS. 1A through 4, and/or with respect to other examples and contexts. However, it should be understood that the operational flows may be executed in a number of other environments and contexts, and/or in modified versions of FIGS. 1A through 4. Also, although the various operational flows are presented in the sequence(s) illustrated, it should be understood that the various operations may be performed in other orders than those which are illustrated, or may be performed concurrently.

After a start operation, the operational flow 13300 moves to a providing operation 13310. Providing operation 13310 depicts providing a plurality of nuclear fuel elements, some of the plurality of nuclear fuel elements having a characteristic length along at least one dimension smaller than or equal to a selected distance, the selected distance suitable for maintaining adequate diffusion of a fission product from a nuclear fuel element interior to at least one free surface in some of the nuclear fuel elements. For example, as shown in FIGS. 1A through 4, a plurality of nuclear fuel elements 204 may be fabricated via a ball milling process such that their average size is smaller than a critical distance suitable for maintaining adequate diffusion of a fission product 108 from the interiors 210 of the nuclear fuel elements 204 to the surfaces 212 of the nuclear fuel elements 204. For instance, a plurality of spherical nuclear fuel particles may be fabricated to have an average radius of 100 nm.

Then, dispersing operation 13320 depicts dispersing a plurality of dispersant particles within the plurality of nuclear fuel elements, wherein some of the dispersant particles are configured to create preferential fission product occupation sites within the nuclear fuel material. For example, as shown in FIGS. 1A through 4, the plurality of dispersant particles 318 may include, but is not limited to, a powder of particles of a selected material type. These particles may then be intermixed (e.g., dry mixing or wet mixing) with the provided nuclear fuel material.

Then, consolidating operation 13330 depicts consolidating the plurality of nuclear fuel elements into a volume of nuclear fuel material having a surface. For example, as shown in FIGS. 1A through 4, the provided plurality of nuclear fuel elements 204 (e.g., uranium dioxide powder) and the dispersant particles 318 may be consolidated into a solid volume 202 utilizing a sintering process.

Figure 134:
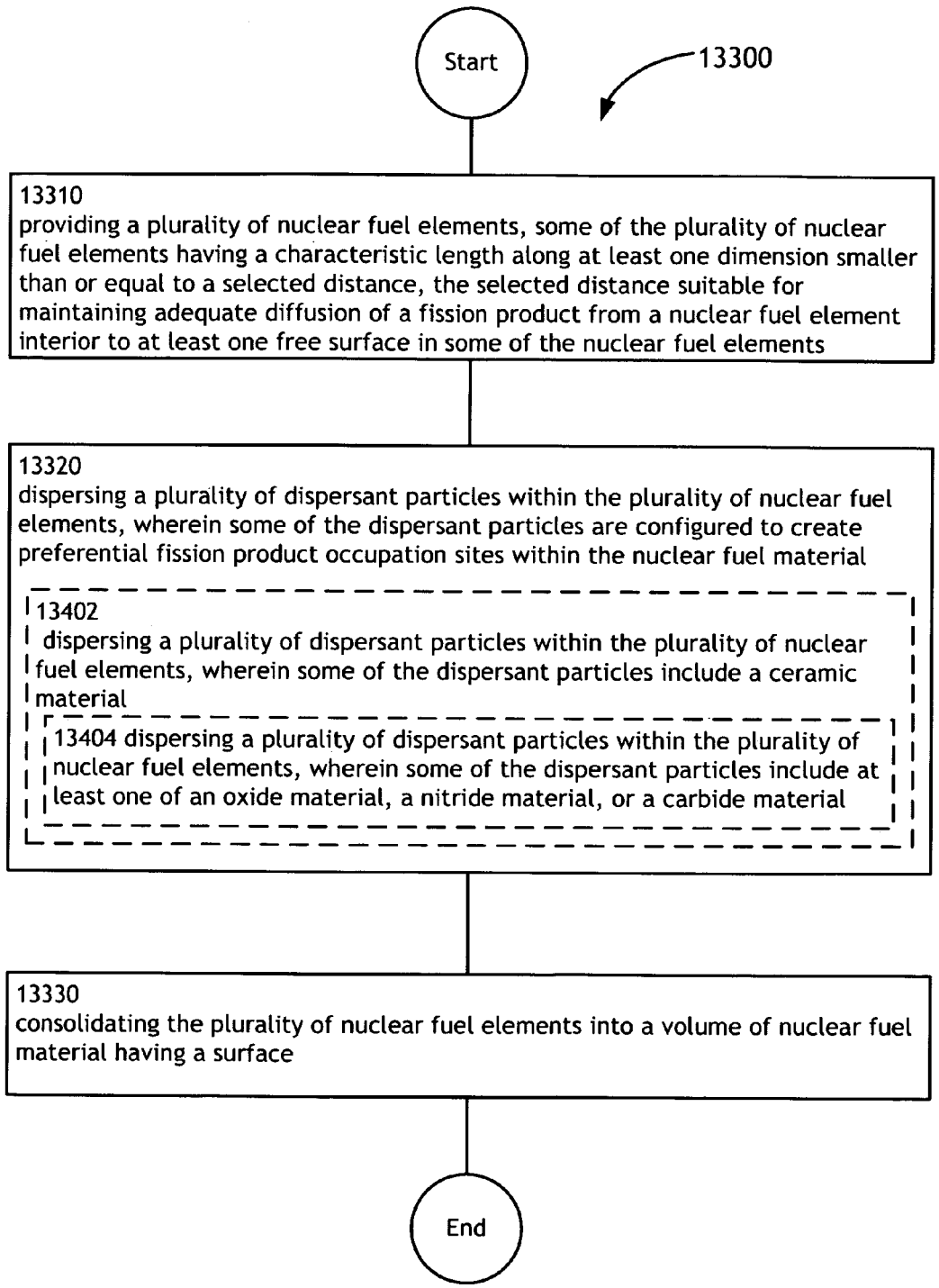

FIG. 134 illustrates alternative embodiments of the example operational flow 13300 of FIG. 133. FIG. 134 illustrates example embodiments where the operation 13320 may include at least one additional operation. Additional operations may include an operation 13402, and/or an operation 13404.

The operation 13402 illustrates dispersing a plurality of dispersant particles within the plurality of nuclear fuel elements, wherein some of the dispersant particles include a ceramic material. For example, the dispersant particles 318 may include one or more types of ceramic materials.

Further, the operation 13404 illustrates dispersing a plurality of dispersant particles within the plurality of nuclear fuel elements, wherein some of the dispersant particles include at least one of an oxide material, a nitride material, or a carbide material. For example, the dispersant particles 318 may include, but are not limited to, one or more oxide particles, nitride particles, or carbide particles. For instance, some of the dispersant particles may include a stable oxide, such as zirconium dioxide.

Figure 135:
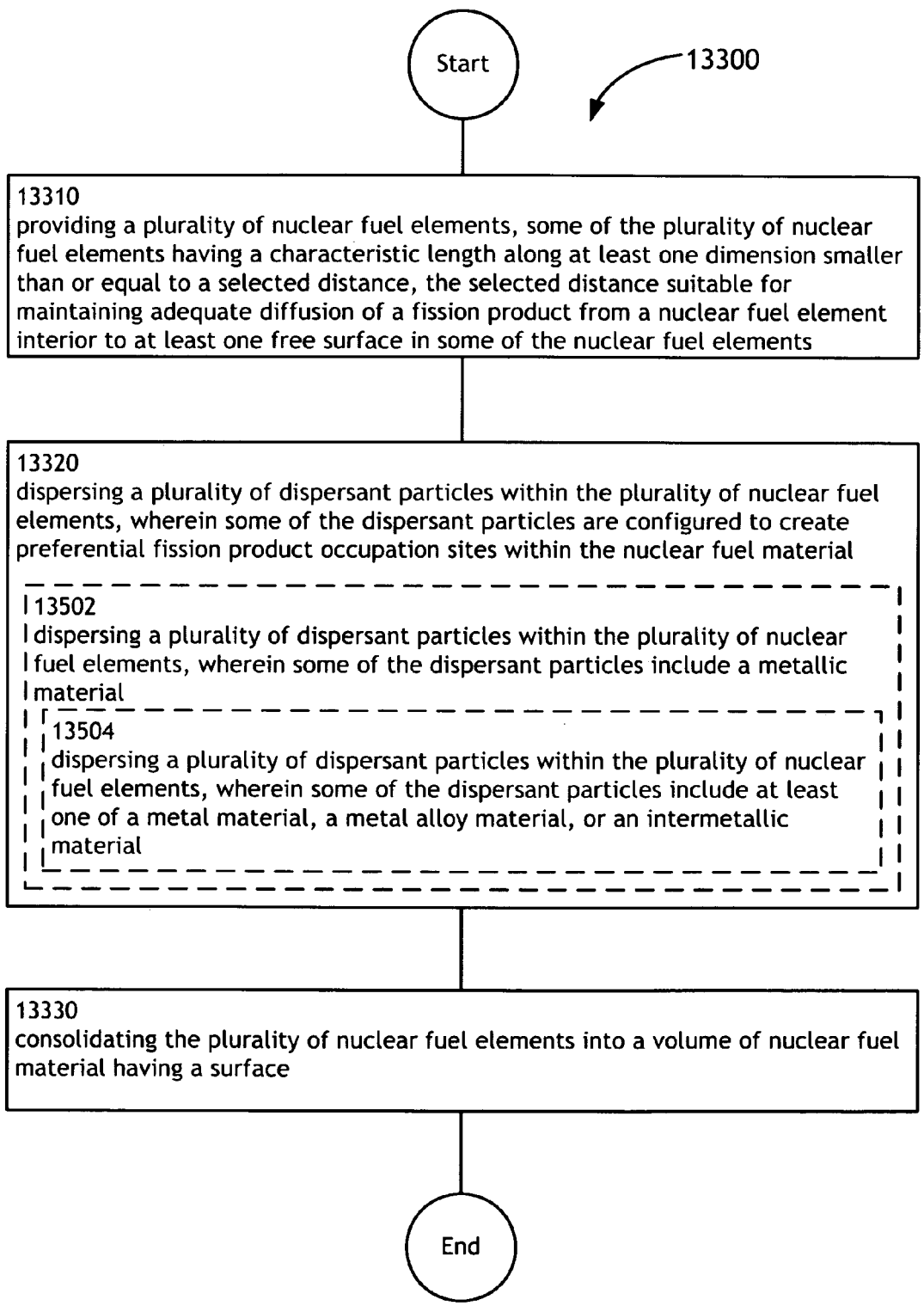

FIG. 135 illustrates alternative embodiments of the example operational flow 13300 of FIG. 133. FIG. 135 illustrates example embodiments where the operation 13320 may include at least one additional operation. Additional operations may include an operation 13502, and/or an operation 13504.

The operation 13502 illustrates dispersing a plurality of dispersant particles within the plurality of nuclear fuel elements, wherein some of the dispersant particles include a metallic material. For example, the dispersant particles 318 may include one or more types of metallic materials.

Further, the operation 13504 illustrates dispersing a plurality of dispersant particles within the plurality of nuclear fuel elements, wherein some of the dispersant particles include at least one of a metal material, a metal alloy material, or an intermetallic material. For example, the dispersant particles 318 may include, but are not limited to, one or more metal particles, metal alloy particles, or intermetallic particles.

Figure 136:
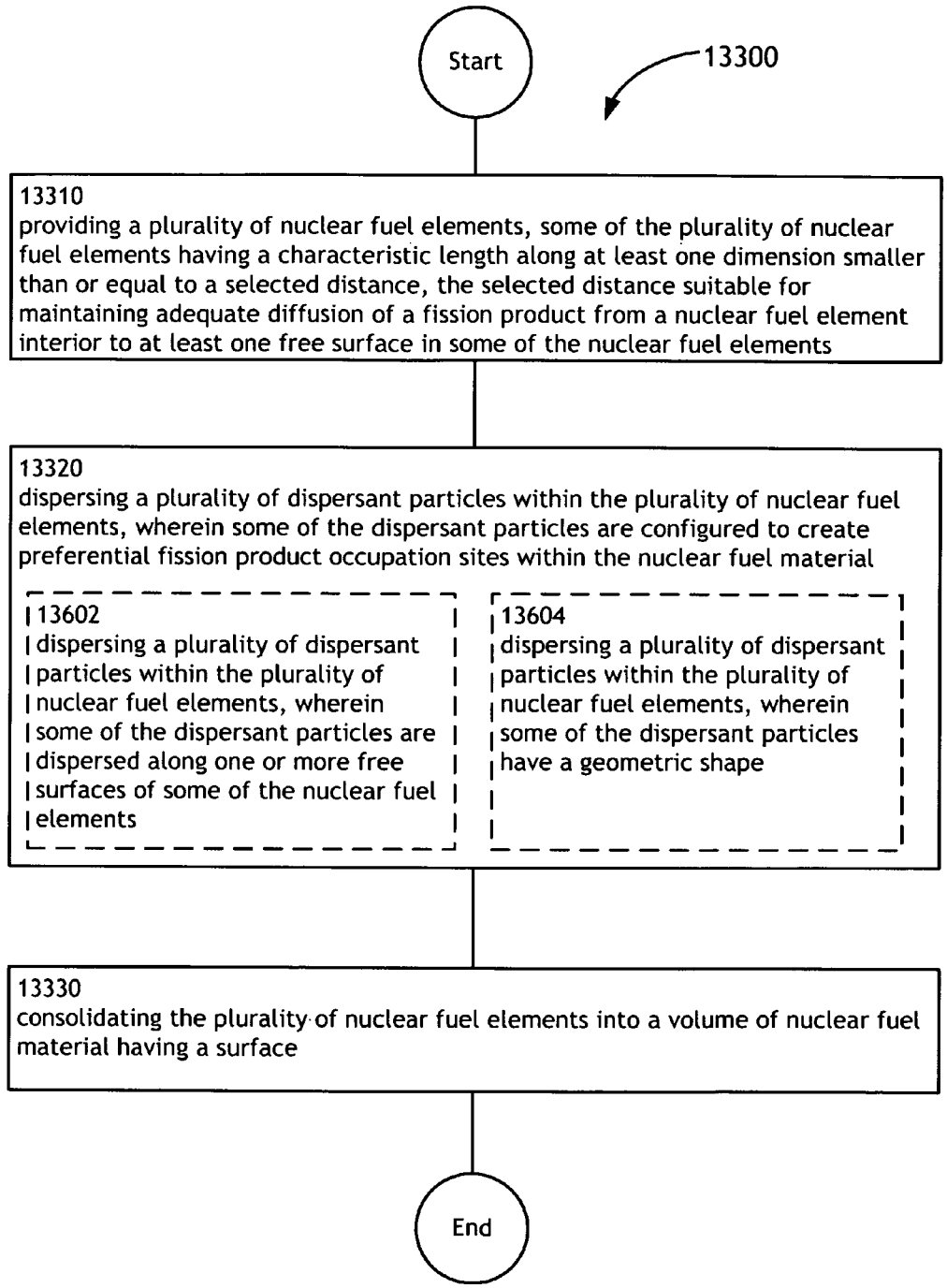

FIG. 136 illustrates alternative embodiments of the example operational flow 13300 of FIG. 133. FIG. 136 illustrates example embodiments where the operation 13320 may include at least one additional operation. Additional operations may include an operation 13602, and/or an operation 13604.

The operation 13602 illustrates dispersing a plurality of dispersant particles within the plurality of nuclear fuel elements, wherein some of the dispersant particles are dispersed along one or more free surfaces of some of the nuclear fuel elements. For example, as shown in FIGS. 1A through 4, some of the dispersant particles may be arranged such that they are localized on one or more surfaces 212 of the nuclear fuel elements 204 of the nuclear fuel 200. The dispersant particles at the surfaces 212 of the nuclear fuel elements 212 of the nuclear fuel 200 may serve as preferential fission gas 118 occupation sites, which may facilitate an interconnected porosity within the nuclear fuel 200, leading to a boundary network 214.

The operation 13604 illustrates dispersing a plurality of dispersant particles within the plurality of nuclear fuel elements, wherein some of the dispersant particles have a geometric shape. For example, as shown in FIGS. 1A through 4, the dispersant particles may have a substantially spherical shape. In a general sense, the dispersant particles may have any regular or irregular three dimensional shape.

Figure 137:
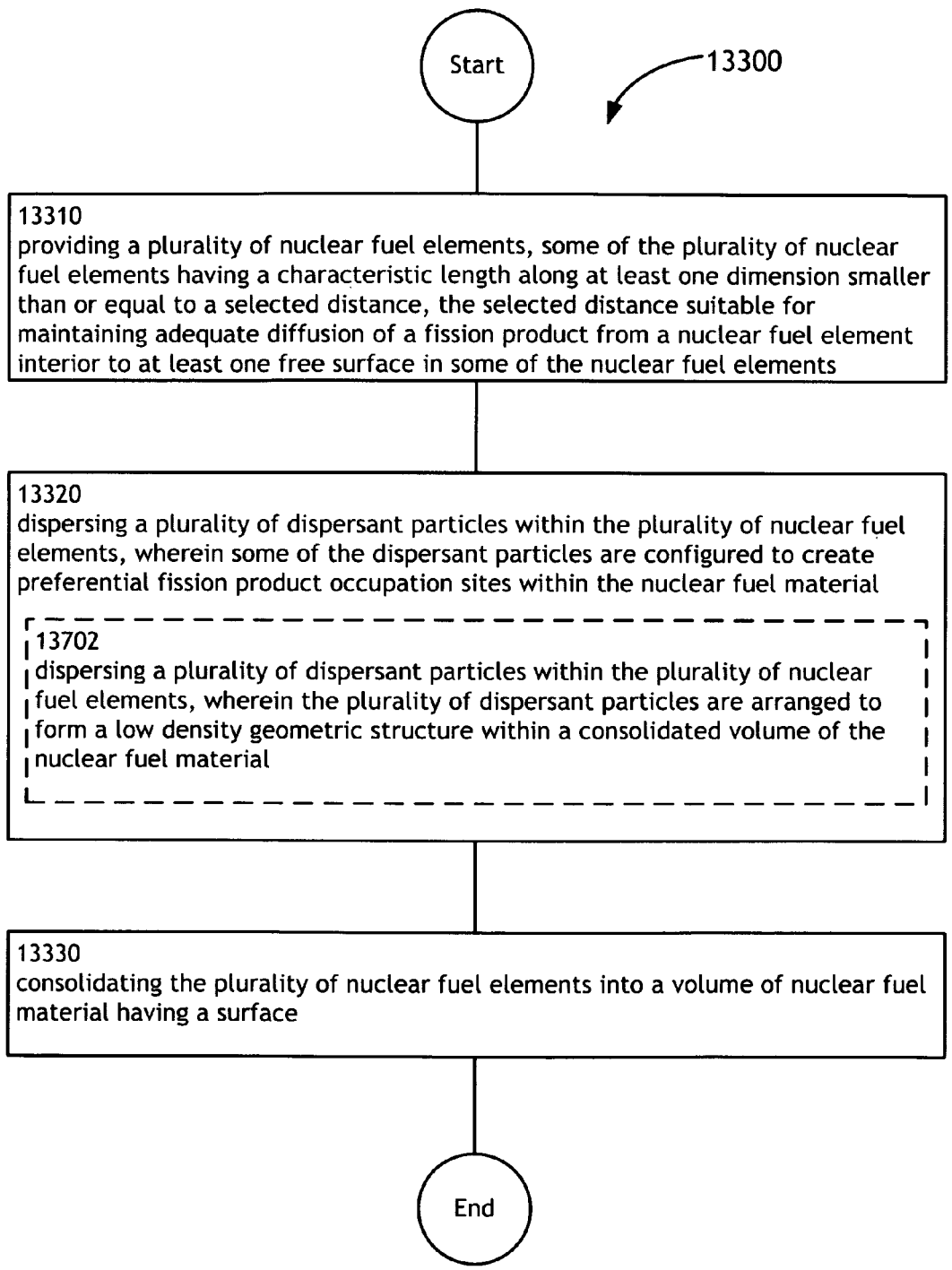

FIG. 137 illustrates alternative embodiments of the example operational flow 13300 of FIG. 133. FIG. 137 illustrates example embodiments where the operation 13320 may include at least one additional operation. Additional operations may include an operation 13702.

The operation 13702 illustrates dispersing a plurality of dispersant particles within the plurality of nuclear fuel elements, wherein the plurality of dispersant particles are arranged to form a low density geometric structure within a consolidated volume of the nuclear fuel material. For example, in the case of a cylindrical fuel pellet, the dispersant particles 318 may be distributed throughout the nuclear fuels 100 in a manner which produces low density cylindrical concentric shells.

Figure 138:
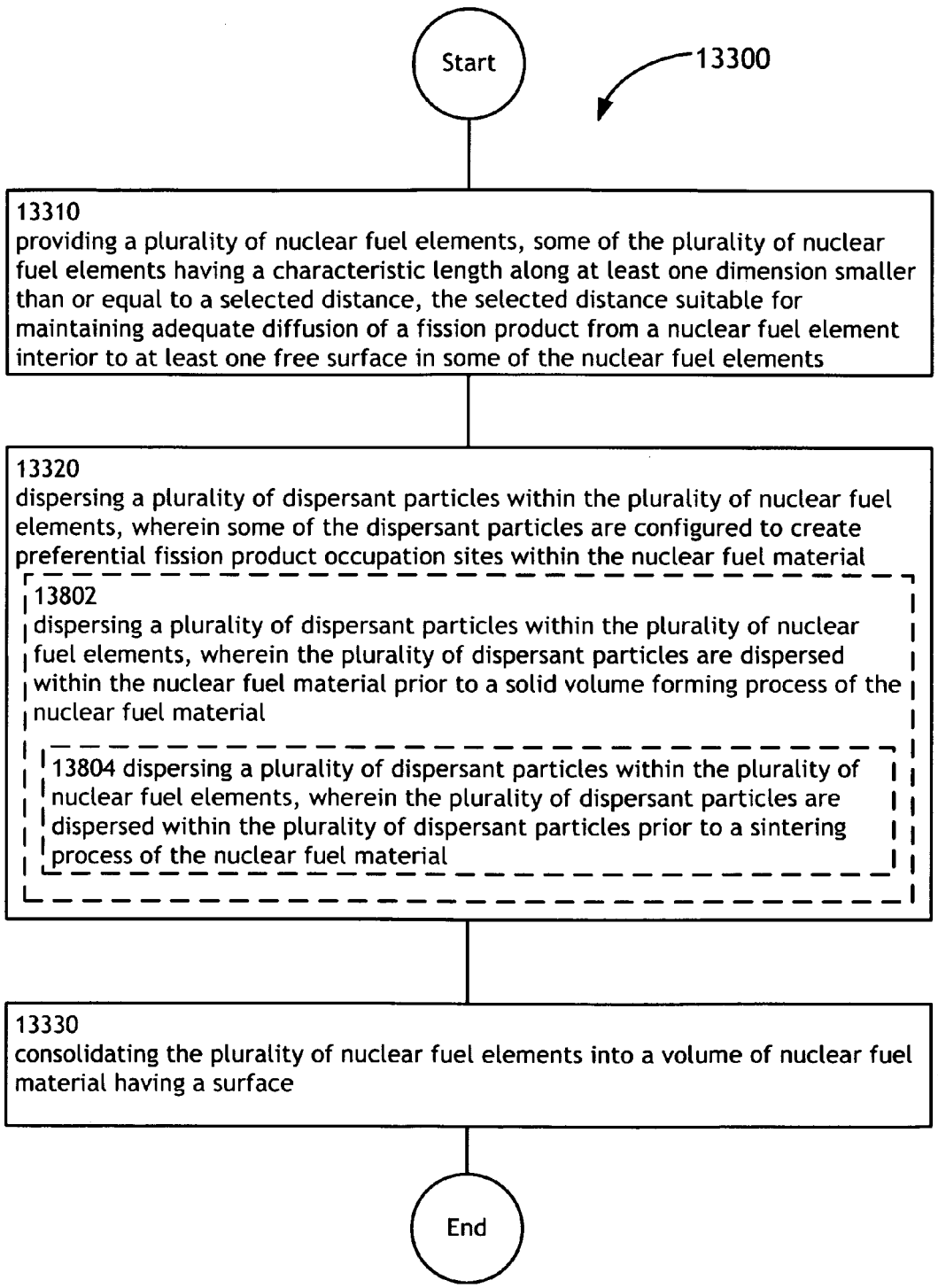

FIG. 138 illustrates alternative embodiments of the example operational flow 13300 of FIG. 133. FIG. 138 illustrates example embodiments where the operation 13320 may include at least one additional operation. Additional operations may include an operation 13802, and/or an operation 13804.

The operation 13802 illustrates dispersing a plurality of dispersant particles within the plurality of nuclear fuel elements, wherein the plurality of dispersant particles are dispersed within the nuclear fuel material prior to a solid volume forming process of the nuclear fuel material. For example, as shown in FIGS. 1A through 4, the dispersant particles 318 may be intermixed with a nuclear fuel material or a pre-cursor of a nuclear fuel material prior to being pressed.

Further, the operation 13804 illustrates dispersing a plurality of dispersant particles within the plurality of nuclear fuel elements, wherein the plurality of dispersant particles are dispersed within the plurality of dispersant particles prior to a sintering process of the nuclear fuel material. For example, as shown in FIGS. 1A through 4, the dispersant particles 318 may be intermixed with a nuclear fuel material or a pre-cursor of a nuclear fuel material prior to being pressed sintered.

Figure 139:
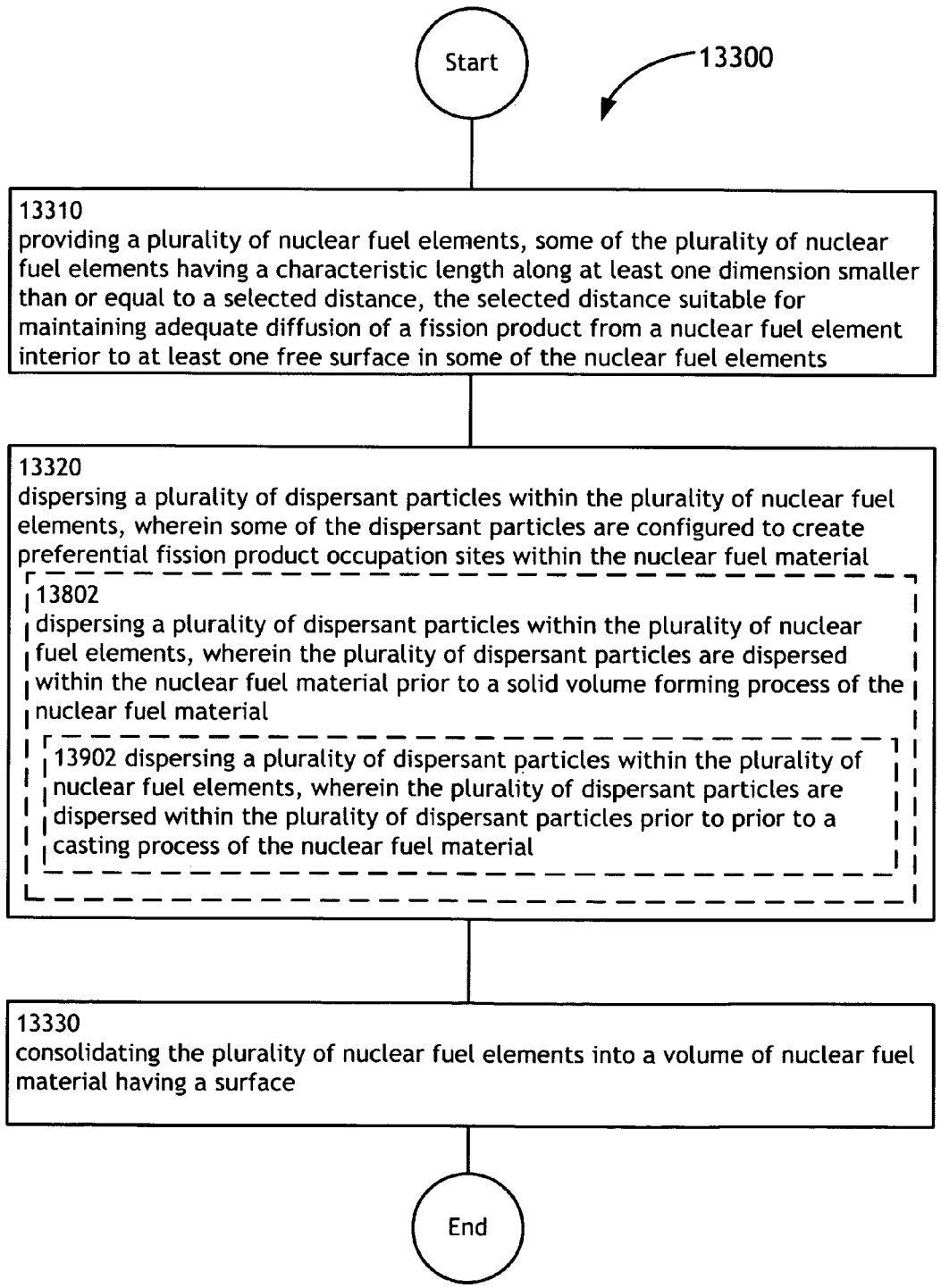

FIG. 139 illustrates alternative embodiments of the example operational flow 13300 of FIG. 133. FIG. 139 illustrates example embodiments where the operation 13320 may include at least one additional operation. Additional operations may include an operation 13902.

Further, the operation 13902 illustrates dispersing a plurality of dispersant particles within the plurality of nuclear fuel elements, wherein the plurality of dispersant particles are dispersed within the plurality of dispersant particles prior to prior to a casting process of the nuclear fuel material. For example, as shown in FIGS. 1A through 4, the dispersant particles 318 may be dispersed within the volume of a molten nuclear fuel material prior to being cast.

Figure 140:
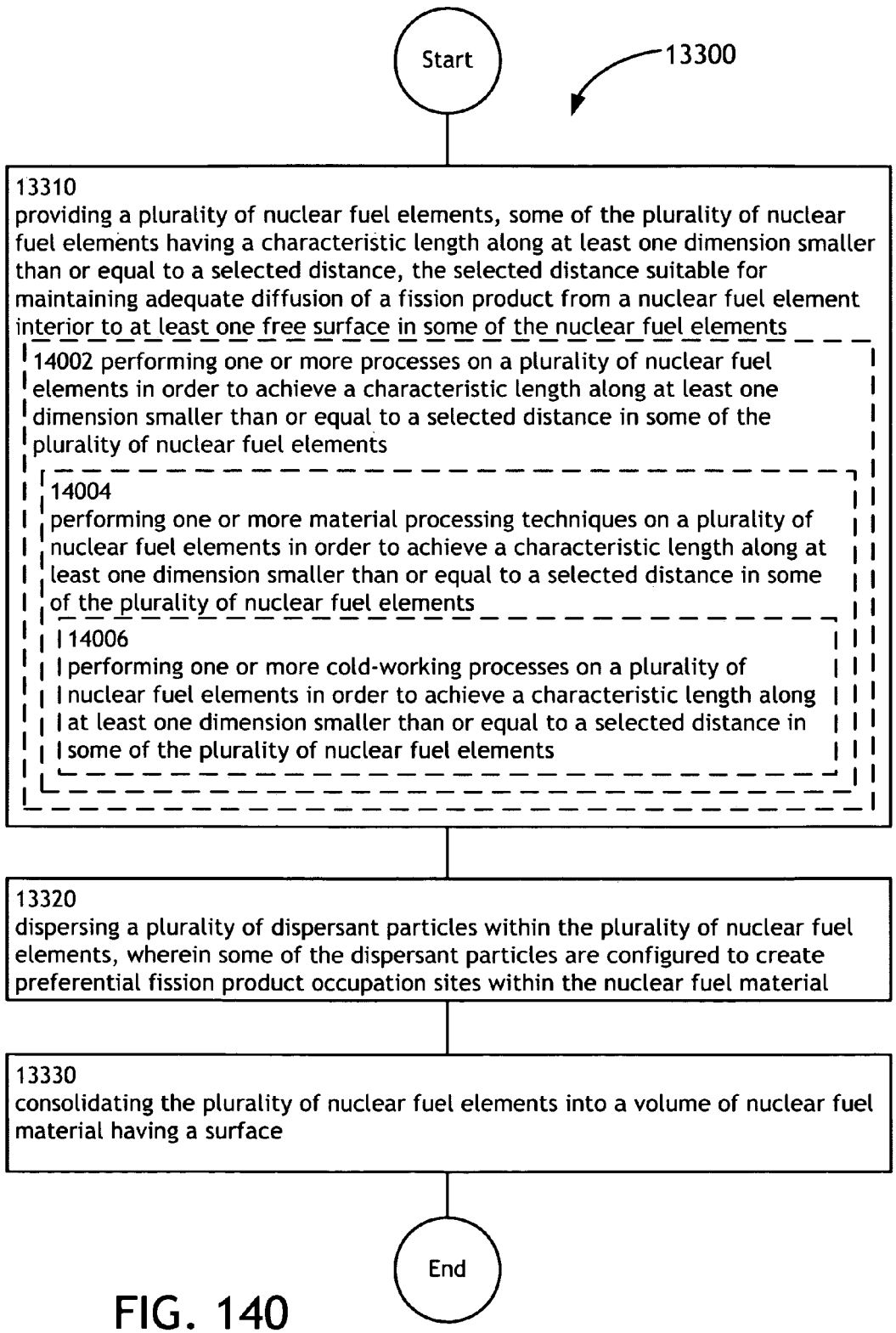

FIG. 140 illustrates alternative embodiments of the example operational flow 13300 of FIG. 133. FIG. 140 illustrates example embodiments where the operation 13310 may include at least one additional operation. Additional operations may include an operation 14002, an operation 14004, and/or an operation 14006.

The operation 14002 illustrates performing one or more processes on a plurality of nuclear fuel elements in order to achieve a characteristic length along at least one dimension smaller than or equal to a selected distance in some of the plurality of nuclear fuel elements. For example, as shown in FIGS. 1A through 4, one or more processes may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 14004 illustrates performing one or more material processing techniques on a plurality of nuclear fuel elements in order to achieve a characteristic length along at least one dimension smaller than or equal to a selected distance in some of the plurality of nuclear fuel elements. For example, as shown in FIGS. 1A through 4, one or more material processing techniques may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204.

Further, the operation 14006 illustrates performing one or more cold-working processes on a plurality of nuclear fuel elements in order to achieve a characteristic length along at least one dimension smaller than or equal to a selected distance in some of the plurality of nuclear fuel elements. For example, as shown in FIGS. 1A through 4, a cold-working process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. The cold-working process may include, but is not limited to, cold-rolling, drawing, bending, or compression.

Figure 141:
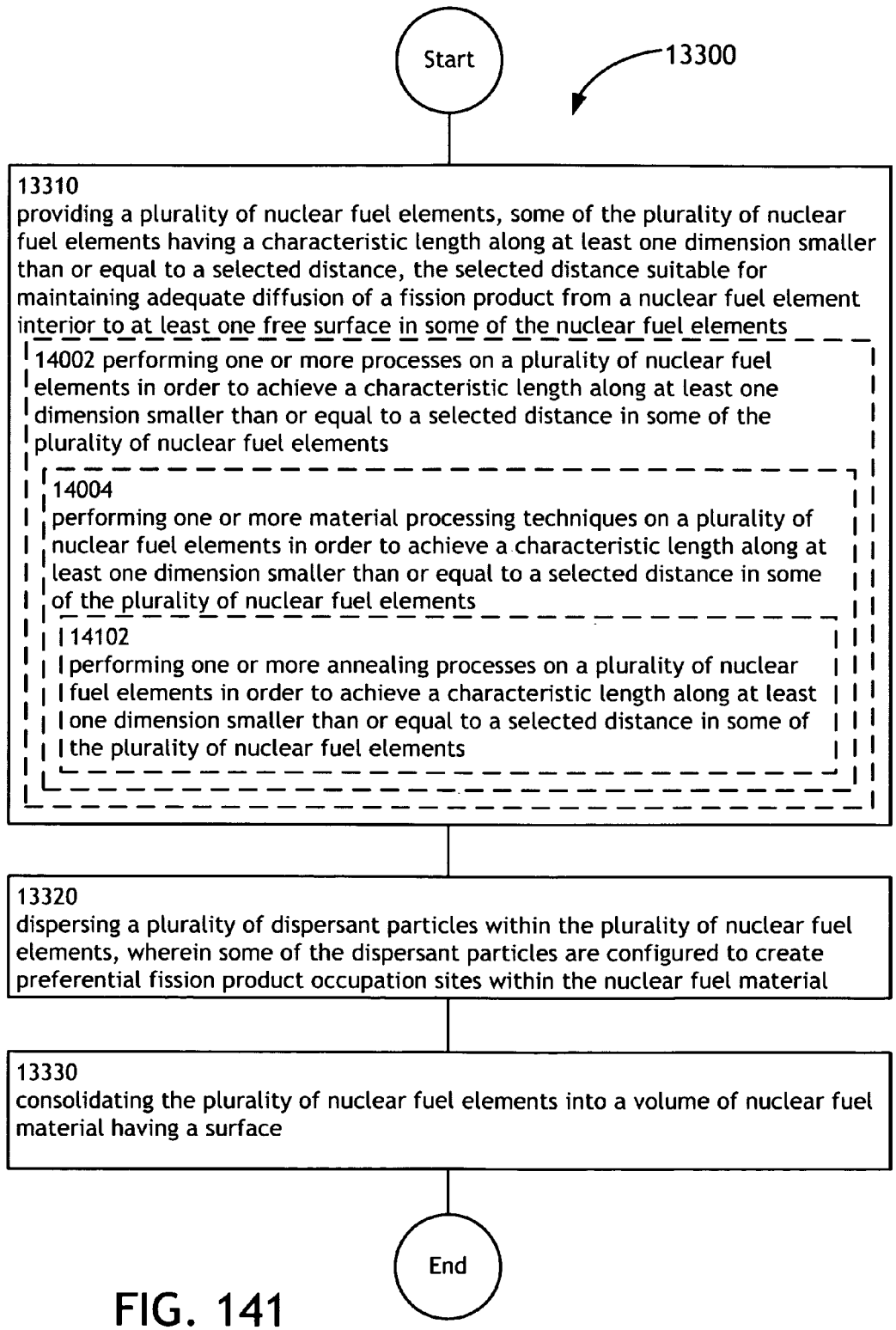

FIG. 141 illustrates alternative embodiments of the example operational flow 13300 of FIG. 133. FIG. 141 illustrates example embodiments where the operation 13310 may include at least one additional operation. Additional operations may include an operation 14102. For example, as shown in FIGS. 1A through 4, an annealing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. Further, the nuclear fuel elements 204 may be annealed in the presence of a processing gas, such as an oxygen reducing gas.

Figure 142:
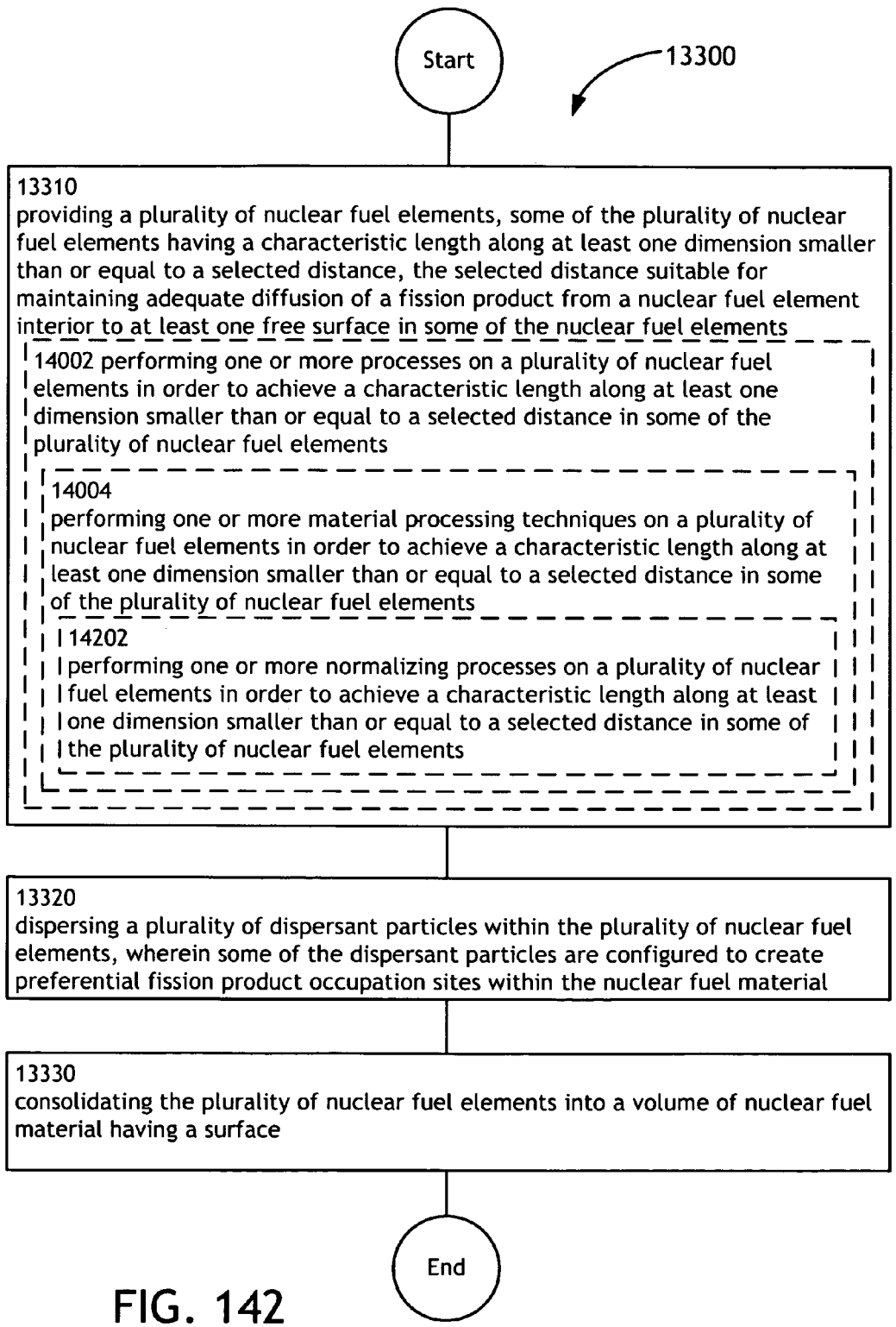

FIG. 142 illustrates alternative embodiments of the example operational flow 13300 of FIG. 133. FIG. 142 illustrates example embodiments where the operation 13310 may include at least one additional operation. Additional operations may include an operation 14202.

Further, the operation 14202 illustrates performing one or more normalizing processes on a plurality of nuclear fuel elements in order to achieve a characteristic length along at least one dimension smaller than or equal to a selected distance in some of the plurality of nuclear fuel elements. For example, as shown in FIGS. 1A through 4, a normalizing process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 143:
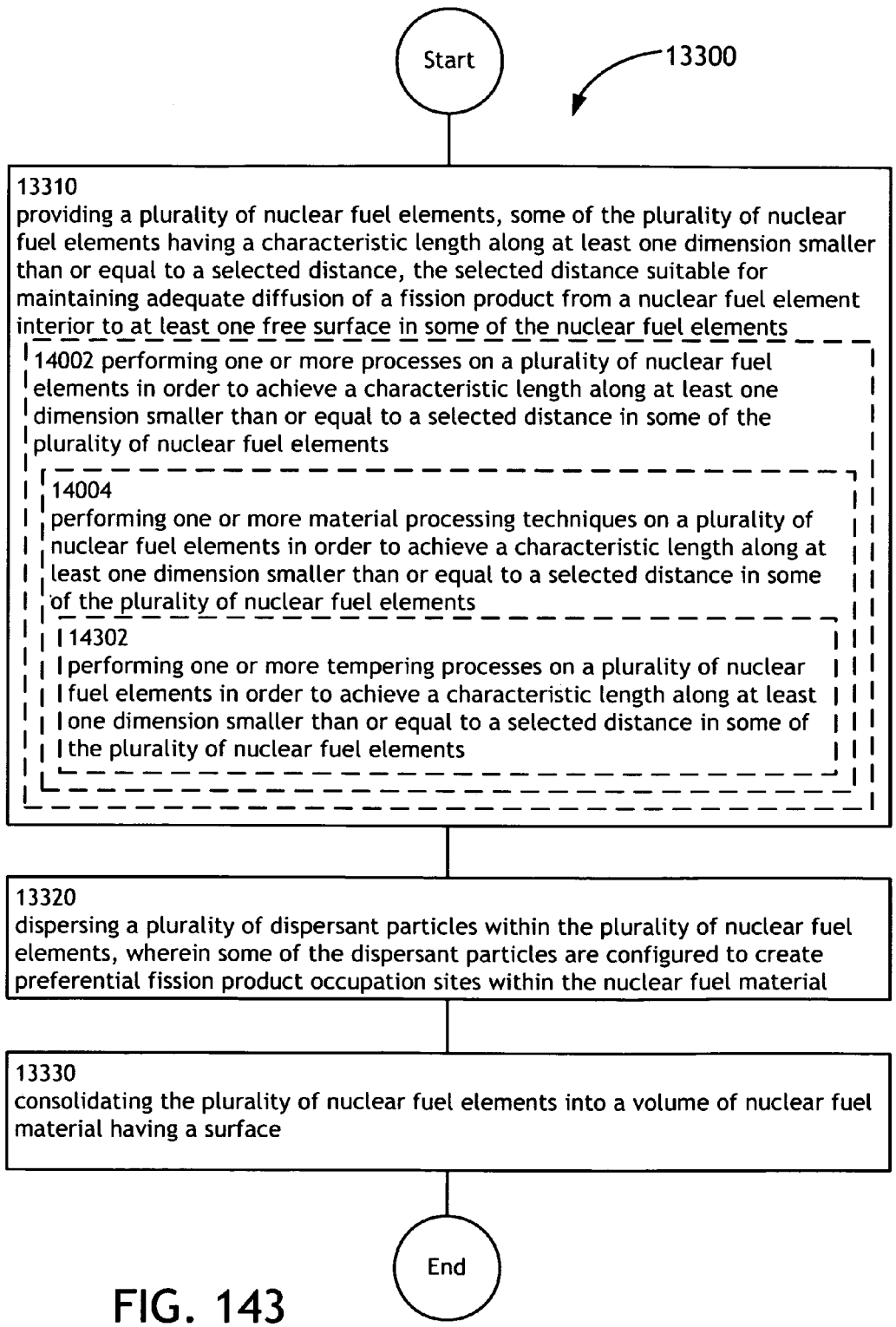

FIG. 143 illustrates alternative embodiments of the example operational flow 13300 of FIG. 133. FIG. 143 illustrates example embodiments where the operation 13310 may include at least one additional operation. Additional operations may include an operation 14302.

Further, the operation 14302 illustrates performing one or more tempering processes on a plurality of nuclear fuel elements in order to achieve a characteristic length along at least one dimension smaller than or equal to a selected distance in some of the plurality of nuclear fuel elements. For example, as shown in FIGS. 1A through 4, a tempering process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204, as described previously herein.

Figure 144:
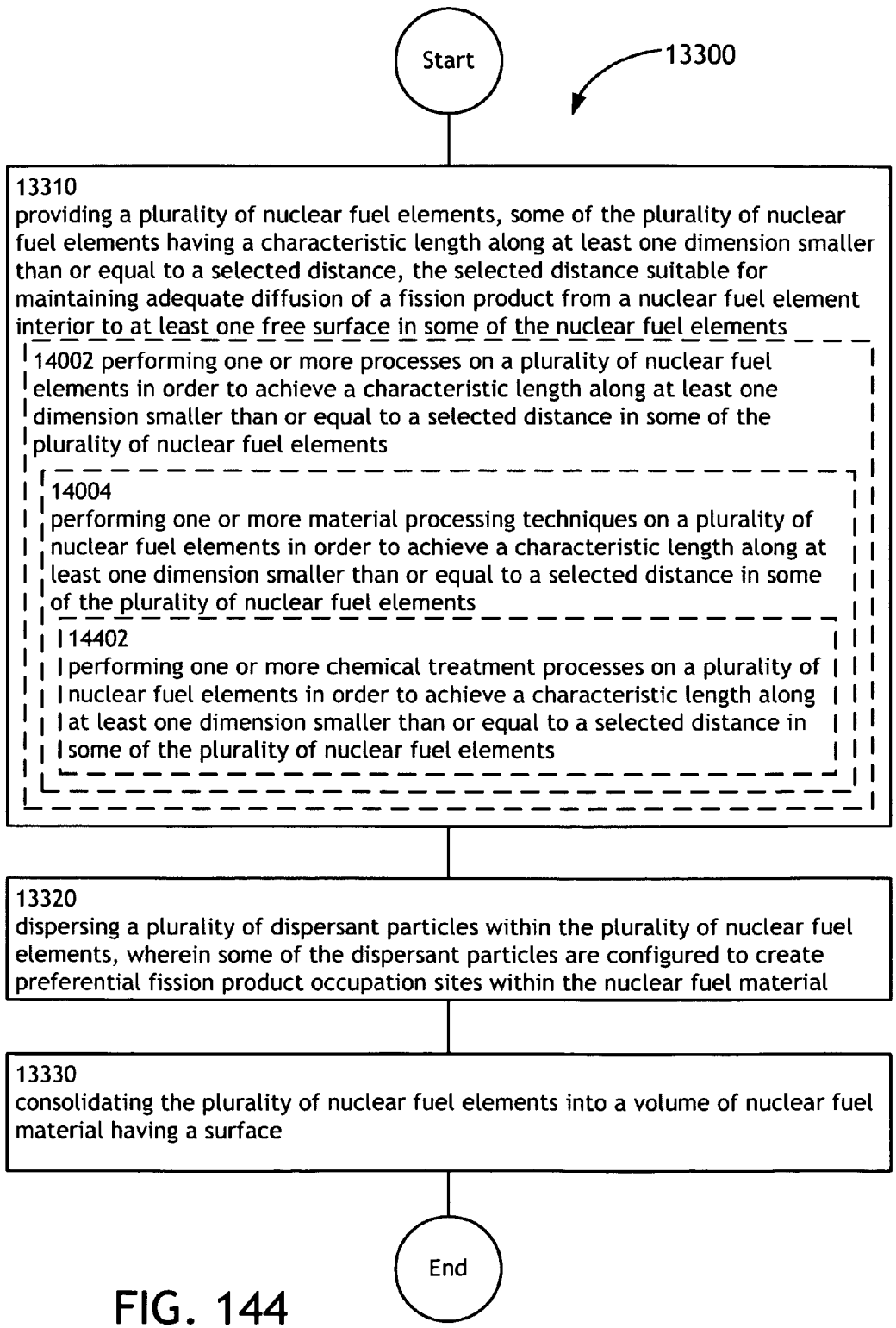

FIG. 144 illustrates alternative embodiments of the example operational flow 13300 of FIG. 133. FIG. 144 illustrates example embodiments where the operation 13310 may include at least one additional operation. Additional operations may include an operation 14402.

Further, the operation 14402 illustrates performing one or more chemical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a chemical treatment process may be performed on the provided nuclear fuel elements 204 in order to reduce the nuclear fuel element sizes 206 to a size below a critical size required for adequate diffusion of a fission product 108 from the interiors 210 of the nuclear fuel elements 204 to the surfaces 212 of the nuclear fuel elements 204. For instance, an oxygen reducing treatment may be performed on the provided nuclear fuel elements 204, as described previously herein.

Figure 145:
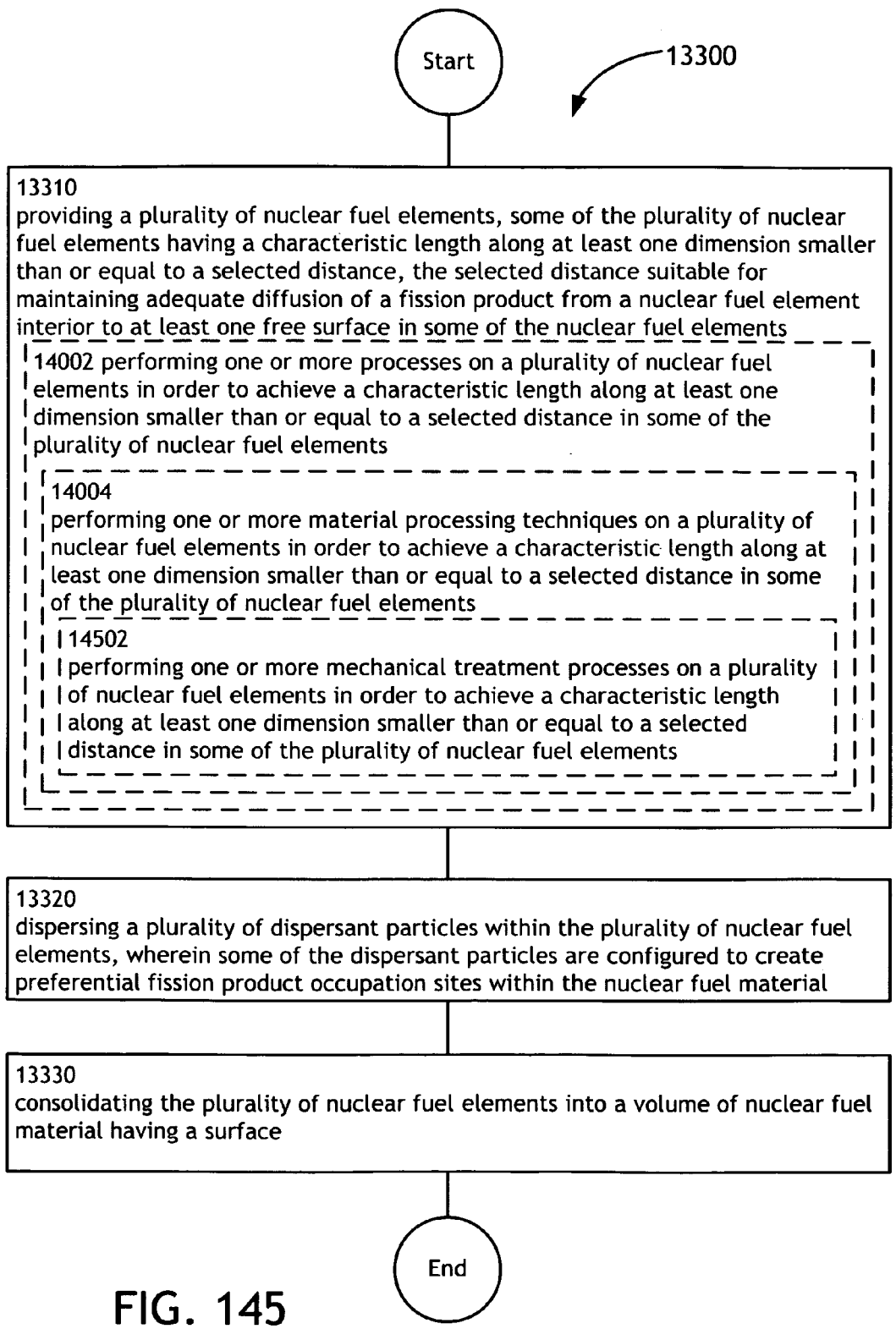

FIG. 145 illustrates alternative embodiments of the example operational flow 13300 of FIG. 133. FIG. 145 illustrates example embodiments where the operation 13310 may include at least one additional operation. Additional operations may include an operation 14502.

Further, the operation 14502 illustrates performing one or more mechanical treatment processes on a plurality of nuclear fuel elements in order to achieve a characteristic length along at least one dimension smaller than or equal to a selected distance in some of the plurality of nuclear fuel elements. For example, as shown in FIGS. 1A through 4, a mechanical process (e.g., reactive ball milling) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

Figure 146:
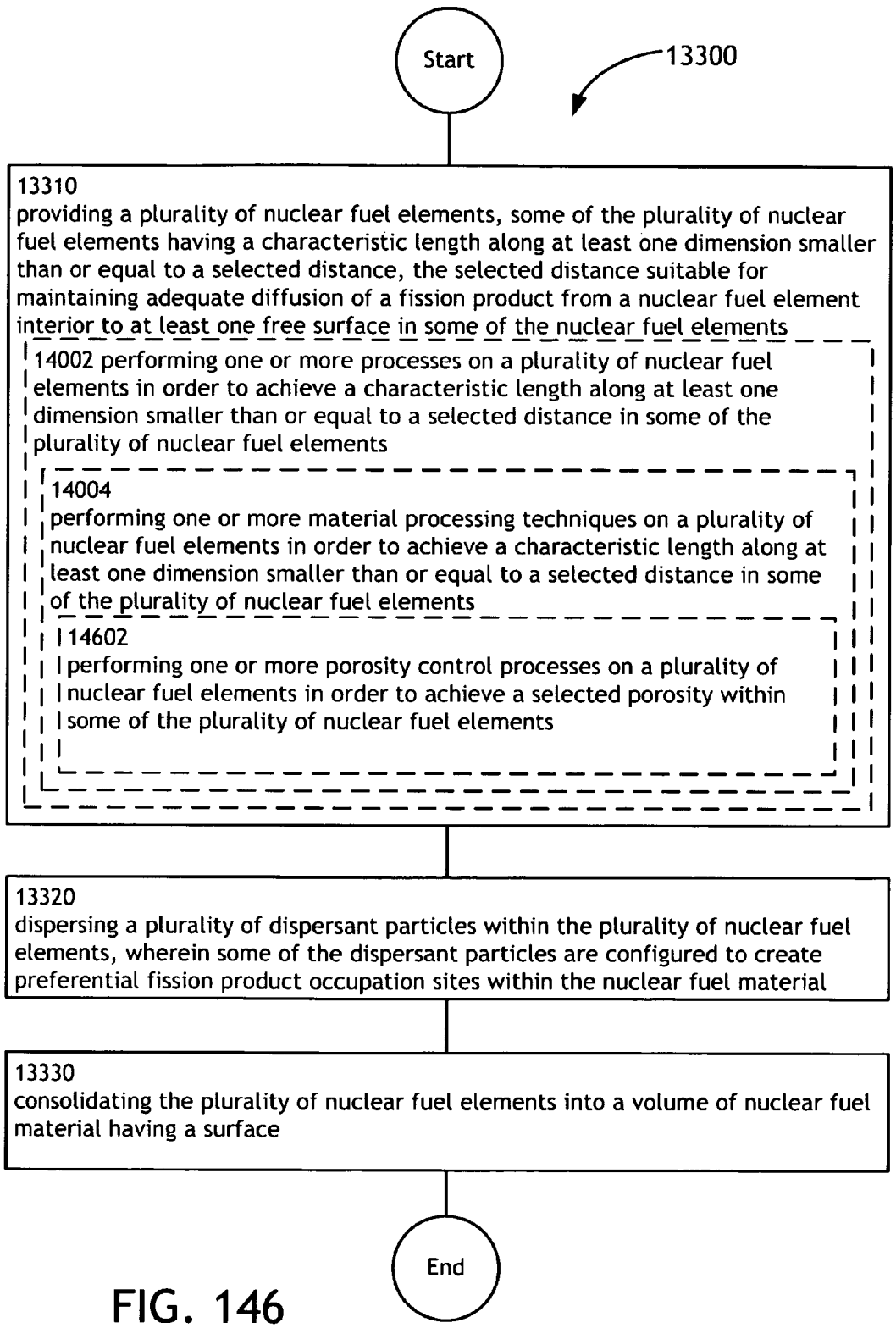

FIG. 146 illustrates alternative embodiments of the example operational flow 13300 of FIG. 133. FIG. 146 illustrates example embodiments where the operation 13310 may include at least one additional operation. Additional operations may include an operation 14602.

Further, the operation 14602 illustrates performing one or more porosity control processes on a plurality of nuclear fuel elements in order to achieve a selected porosity within some of the plurality of nuclear fuel elements. For example, as shown in FIGS. 1A through 4, a porosity control process may be performed on the provided nuclear fuel elements 204 in order to achieve a selected porosity in the nuclear fuel elements 204 the nuclear fuel elements 206. For instance, porosity of the nuclear fuel 100 may be controlled via a heat treatment process (e.g., an annealing process or melting process) or a chemical treatment process.

Figure 147:
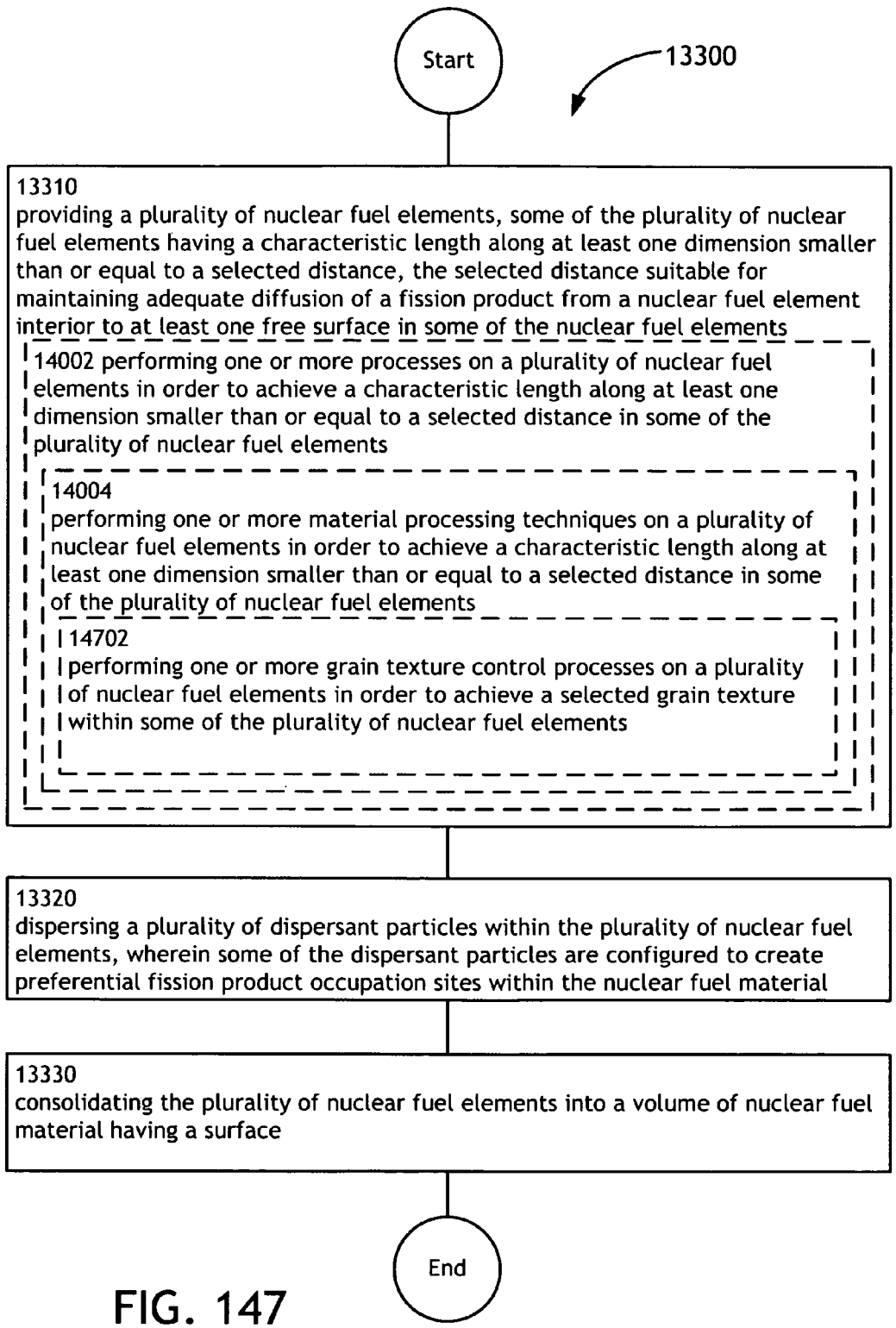

FIG. 147 illustrates alternative embodiments of the example operational flow 13300 of FIG. 133. FIG. 147 illustrates example embodiments where the operation 13310 may include at least one additional operation. Additional operations may include an operation 14702.

Further, the operation 14702 illustrates performing one or more grain texture control processes on a plurality of nuclear fuel elements in order to achieve a selected grain texture within some of the plurality of nuclear fuel elements. For example, as shown in FIGS. 1A through 4, a grain texture control process may be performed on the provided nuclear fuel elements 204 in order to achieve a selected grain texture in two or more grains of the nuclear fuel elements 204. For instance, grain textures of the grains of the nuclear fuel elements 204 may be controlled via a heat treatment process (e.g., annealing) or a chemical treatment process (e.g., doping).

Figure 148:
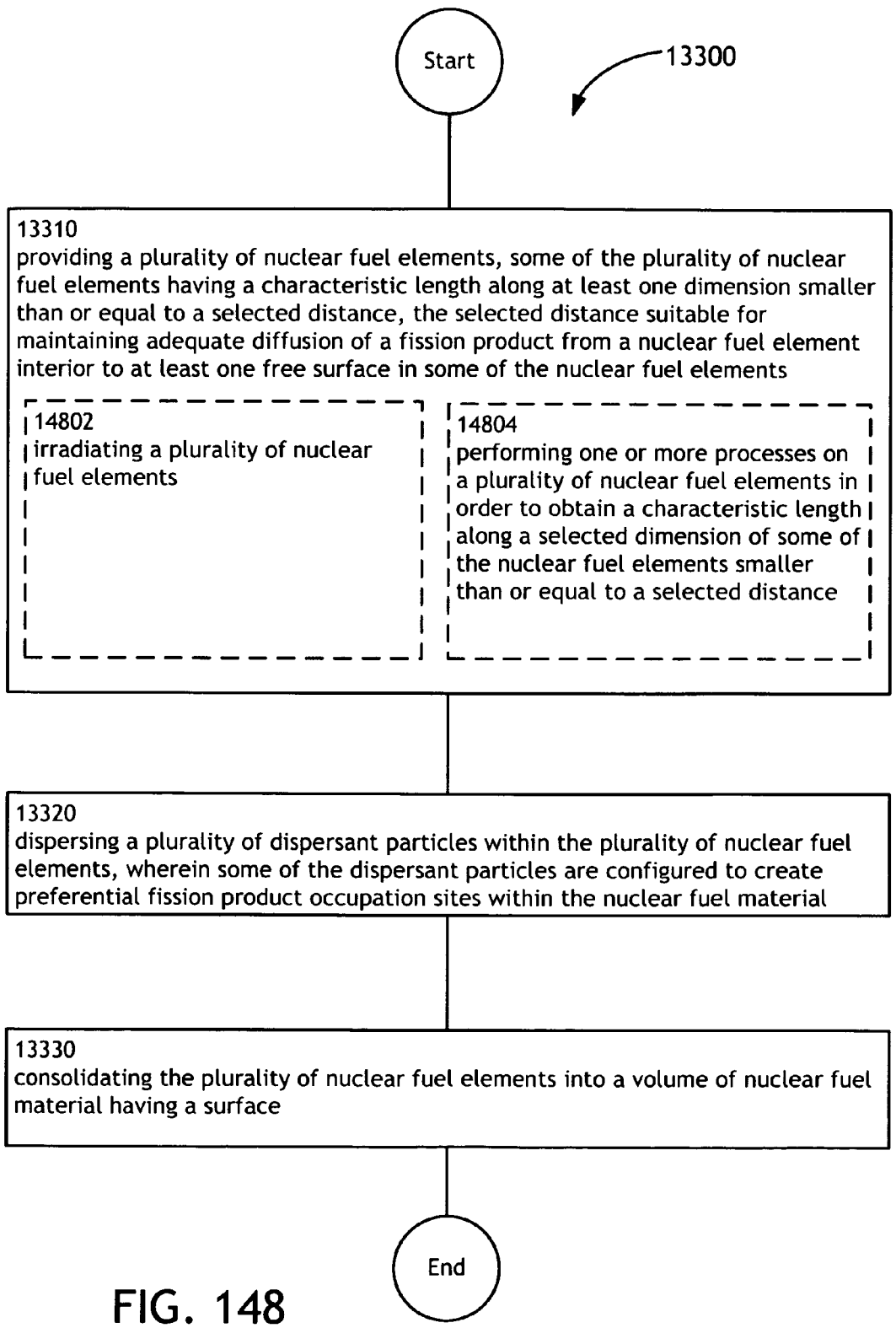

FIG. 148 illustrates alternative embodiments of the example operational flow 13300 of FIG. 133. FIG. 148 illustrates example embodiments where the operation 13310 may include at least one additional operation. Additional operations may include an operation 14802, and/or an operation 14804.

The operation 14802 illustrates irradiating a plurality of nuclear fuel elements. For example, as shown in FIGS. 1A through 4, an irradiating process (e.g., exposure to neutron flux) may be performed on the provided nuclear fuel elements 204 in order to reduce one or more dimensions of the nuclear fuel elements 206 to a size below a critical size required for adequate diffusion of a fission product 108 from the interiors 210 of the nuclear fuel elements 204 to the surfaces 212 of the nuclear fuel elements 204.

Figure 149:
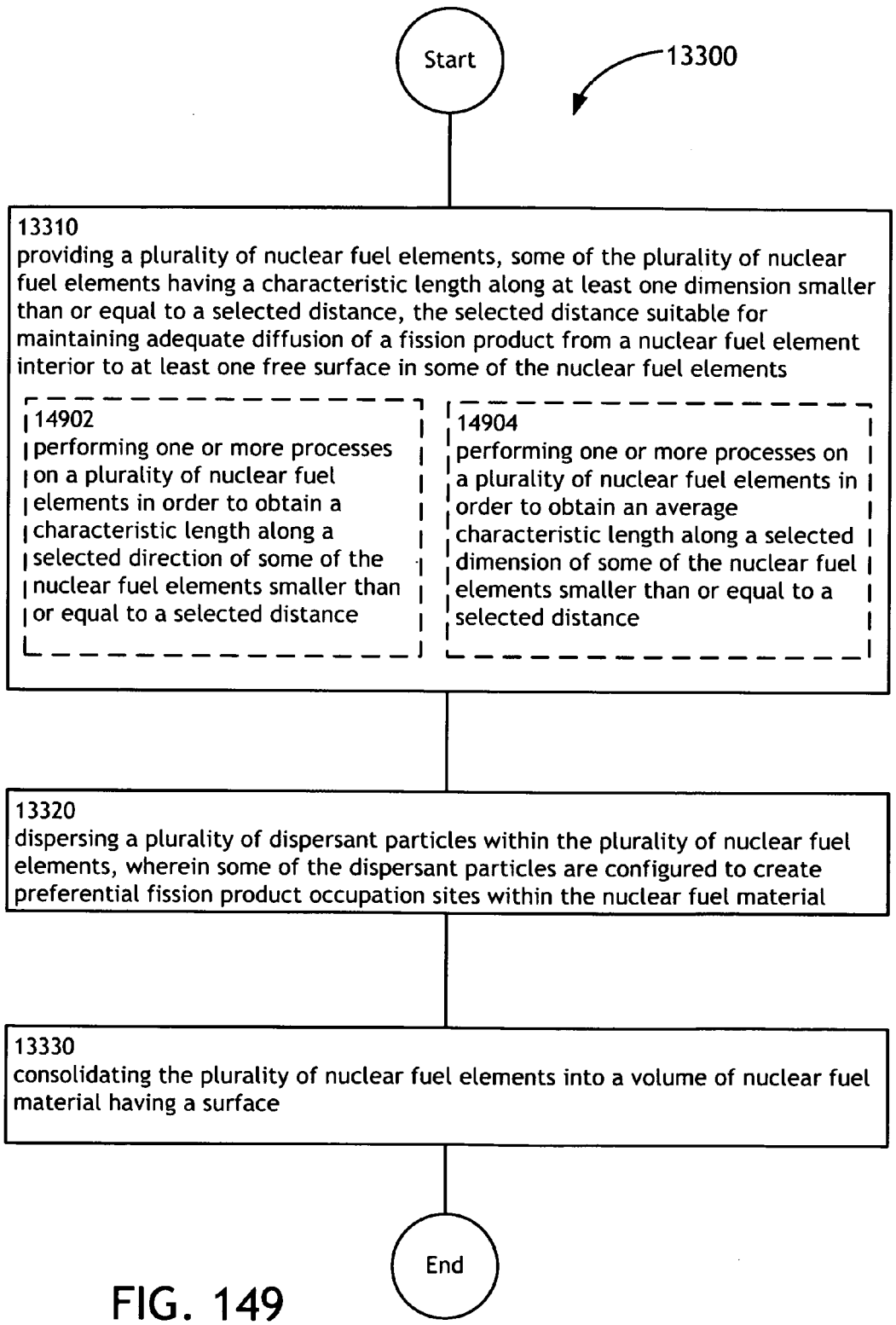

The operation 14804 illustrates performing one or more processes on a plurality of nuclear fuel elements in order to obtain a characteristic length along a selected dimension of some of the nuclear fuel elements smaller than or equal to a selected distance. For example, as shown in FIG. 2D, one or more processes may be utilized in order engineer the nuclear fuel elements 204 to have a characteristic length 206 along a selected dimension of some of the nuclear fuel elements 204. For instance, in nuclear fuel elements 204 having an elongated structure, the nuclear fuel elements 204 may have a "thin" dimension that is smaller than or equal to a selected distance FIG. 149 illustrates alternative embodiments of the example operational flow 13300 of FIG. 133. FIG. 149 illustrates example embodiments where the operation 13310 may include at least one additional operation. Additional operations may include an operation 14902, and/or an operation 14904.

The operation 14902 illustrates performing one or more processes on a plurality of nuclear fuel elements in order to obtain a characteristic length along a selected direction of some of the nuclear fuel elements smaller than or equal to a selected distance. For example, as shown in FIG. 2E, one or more processes may be utilized in order engineer the nuclear fuel elements 204 of the nuclear fuel 200 to have a characteristic length 206 along a selected direction smaller than or equal to a selected distance. For instance, in nuclear fuel elements having an elongated structure, the nuclear fuel elements 204 may have a characteristic length 206 along a selected direction 134 within the nuclear fuel 200. For example, the nuclear fuel elements may have a selected characteristic length 206 along the radial direction within a cylindrically shaped nuclear fuel piece (e.g., fuel pellet).

The operation 14904 illustrates performing one or more processes on a plurality of nuclear fuel elements in order to obtain an average characteristic length along a selected dimension of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected dimension of some nuclear fuel elements 204.

Figure 150:
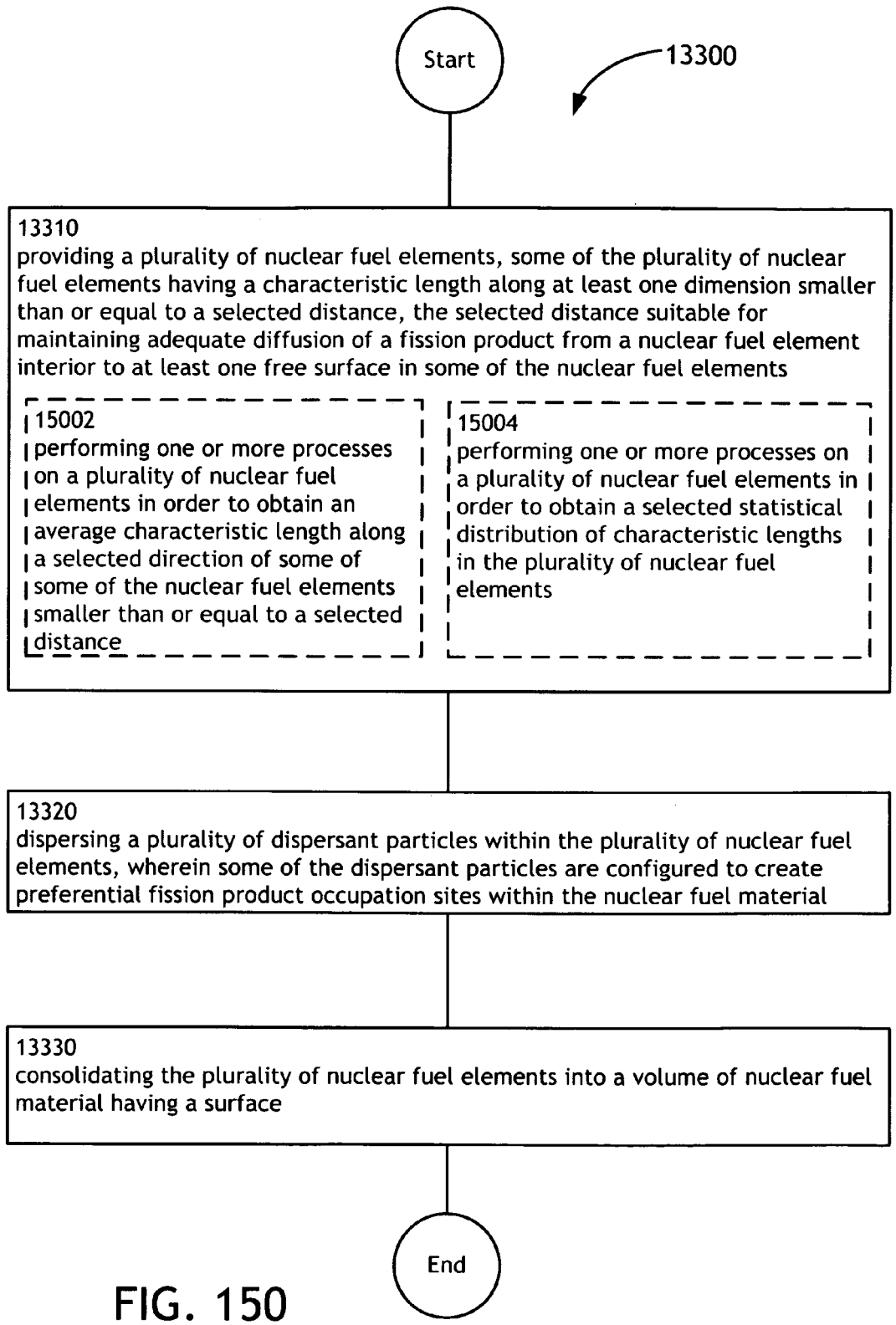

FIG. 150 illustrates alternative embodiments of the example operational flow 13300 of FIG. 133. FIG. 150 illustrates example embodiments where the operation 13310 may include at least one additional operation. Additional operations may include an operation 15002, and/or an operation 15004.

The operation 15002 illustrates performing one or more processes on a plurality of nuclear fuel elements in order to obtain an average characteristic length along a selected direction of some of some of the nuclear fuel elements smaller than or equal to a selected distance. For example, as shown in FIGS. 1A through 4, one or more processes may be utilized in order engineer the nuclear fuel elements 204 of the nuclear fuel 200 to have an average characteristic length 206 along a selected direction of some of the nuclear fuel elements 204 smaller than or equal to a selected distance. For instance, in nuclear fuel elements 204 having an elongated structure, the nuclear fuel elements 204 may have an average characteristic length 206 along a selected direction 134 with the nuclear fuel 200. For example, the nuclear fuel elements may have an average selected characteristic length 206 along the radial direction within a cylindrically shaped nuclear fuel piece (e.g., fuel pellet).

The operation 15004 illustrates performing one or more processes on a plurality of nuclear fuel elements in order to obtain a selected statistical distribution of characteristic lengths in the plurality of nuclear fuel elements. For example, as shown in FIGS. 1A through 4, the nuclear fuel elements 204 of the nuclear fuel 200 may have a selected statistical distribution of characteristic lengths 206. For example, the nuclear fuel elements 204 of the nuclear fuel 200 may have a element size distribution with a selected percentage of the nuclear fuel elements 204 having a size 206 below a selected distance. For instance, the nuclear fuel 200 of the present invention may have a nuclear fuel element (e.g., particle) size 206 distribution such that 65% of the nuclear fuel elements 204 have a size 206 equal to or less than 4 μm, with an average size of 2.5 μm. In another example, the nuclear fuel elements 204 of the nuclear fuel 200 may have a selected spatial distribution of characteristic lengths, within the consolidated volume of nuclear fuel 200.

Figure 151:
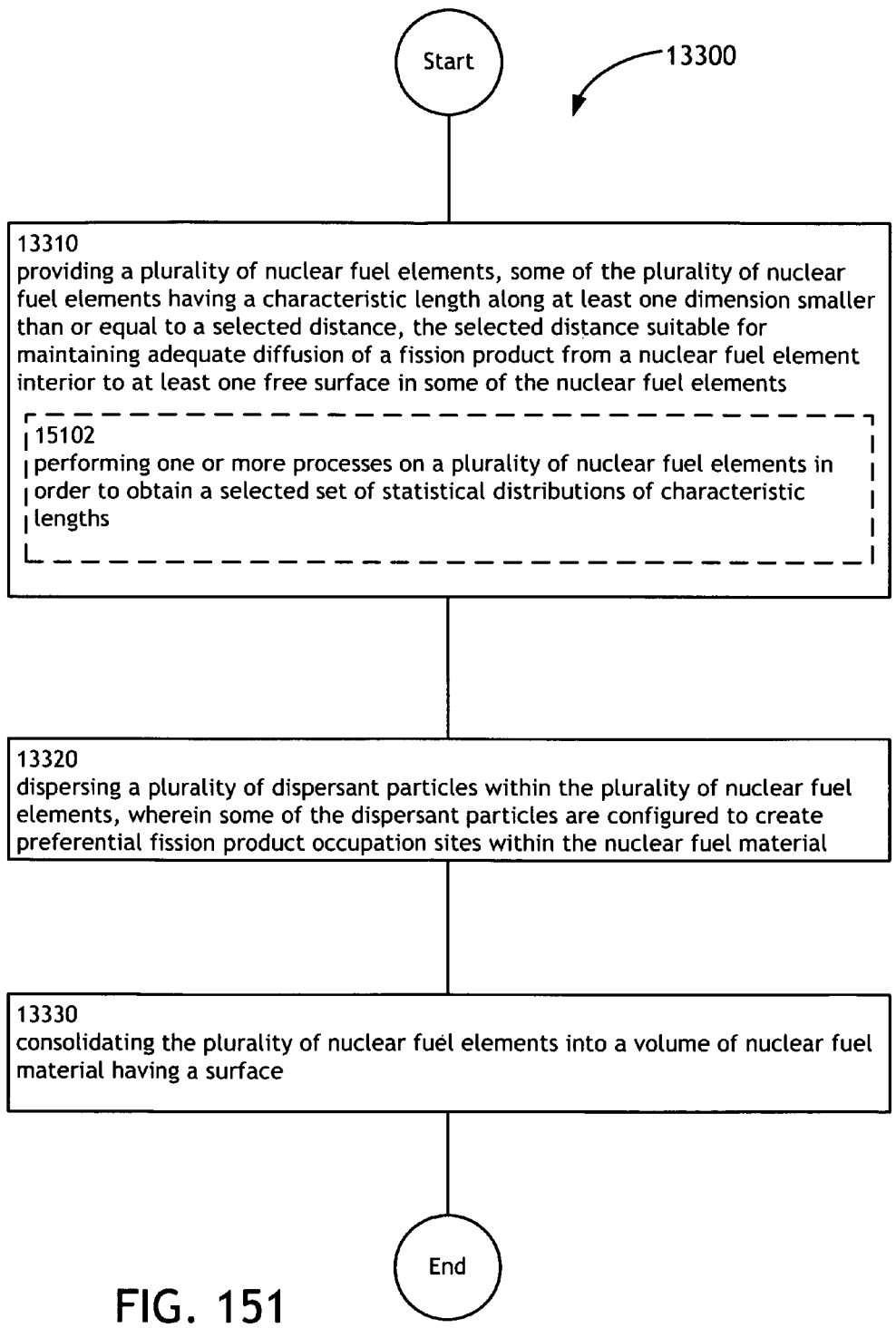

FIG. 151 illustrates alternative embodiments of the example operational flow 13300 of FIG. 133. FIG. 151 illustrates example embodiments where the operation 13310 may include at least one additional operation. Additional operations may include an operation 15102.

The operation 15102 illustrates performing one or more processes on a plurality of nuclear fuel elements in order to obtain a selected set of statistical distributions of characteristic lengths. For example, the nuclear fuel elements 204 of the nuclear fuel 200 may have multiple statistical distributions of characteristic lengths 206. For instance, the nuclear fuel 200 of the present invention may have a nuclear fuel element size 206 distribution such that 25% of the nuclear fuel elements 204 have a size equal to or less than 10 μm, 25% of the nuclear fuel elements have a nuclear fuel element size 106 equal to or less than 5 μm, and 10% of the nuclear fuel elements are below 1 μm.

Figure 152:
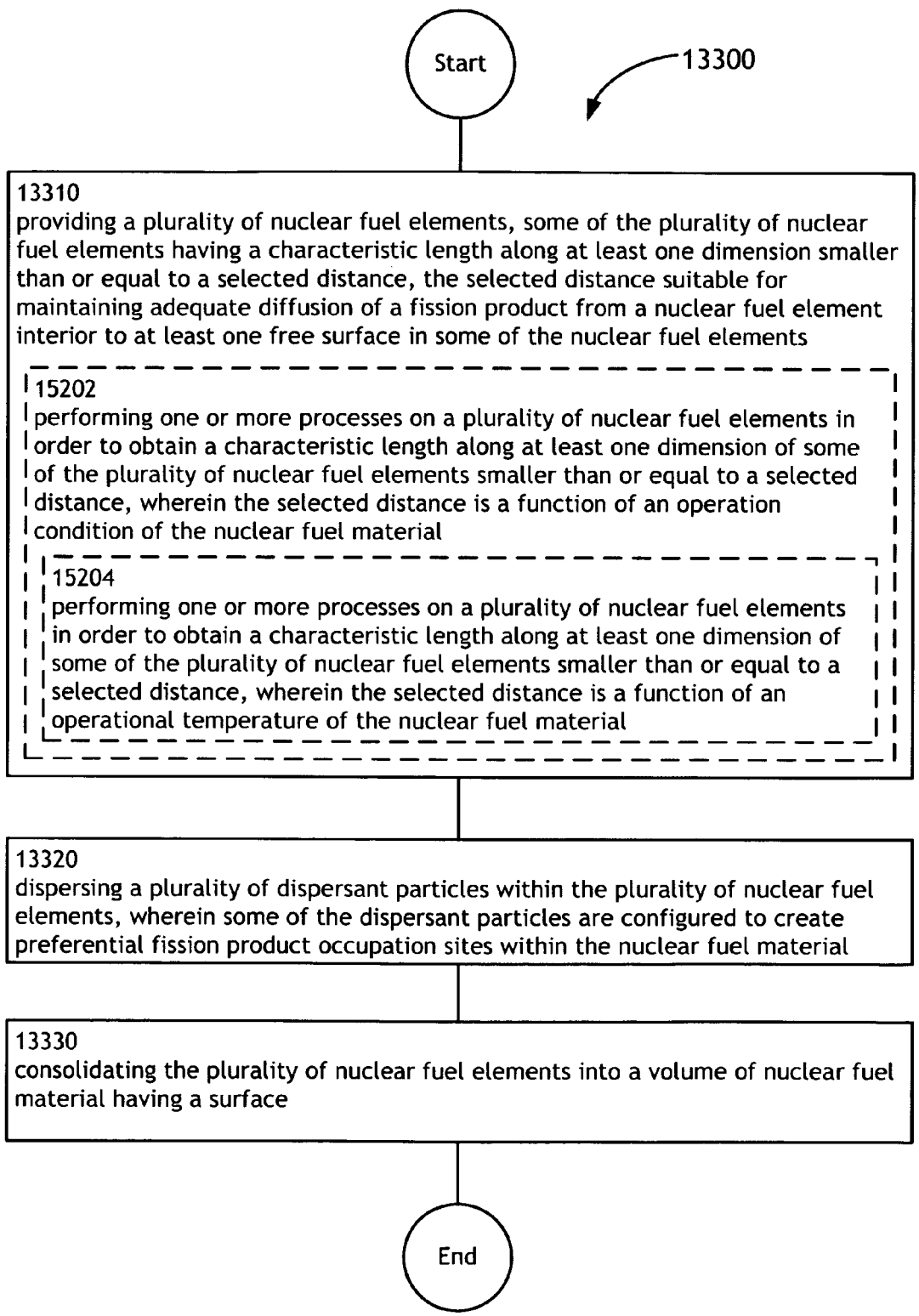

FIG. 152 illustrates alternative embodiments of the example operational flow 13300 of FIG. 133. FIG. 152 illustrates example embodiments where the operation 13310 may include at least one additional operation. Additional operations may include an operation 15202, and/or an operation 15204.

The operation 15202 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operation condition of the nuclear fuel material For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel smaller than a selected distance, which is a function of an operation condition of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend upon an operational condition of the nuclear fuel 200.

Further, the operation 15204 illustrates performing one or more processes on a plurality of nuclear fuel elements in order to obtain a characteristic length along at least one dimension of some of the plurality of nuclear fuel elements smaller than or equal to a selected distance, wherein the selected distance is a function of an operational temperature of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of an operation temperature of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the operation temperature of the nuclear fuel 200.

Figure 153:
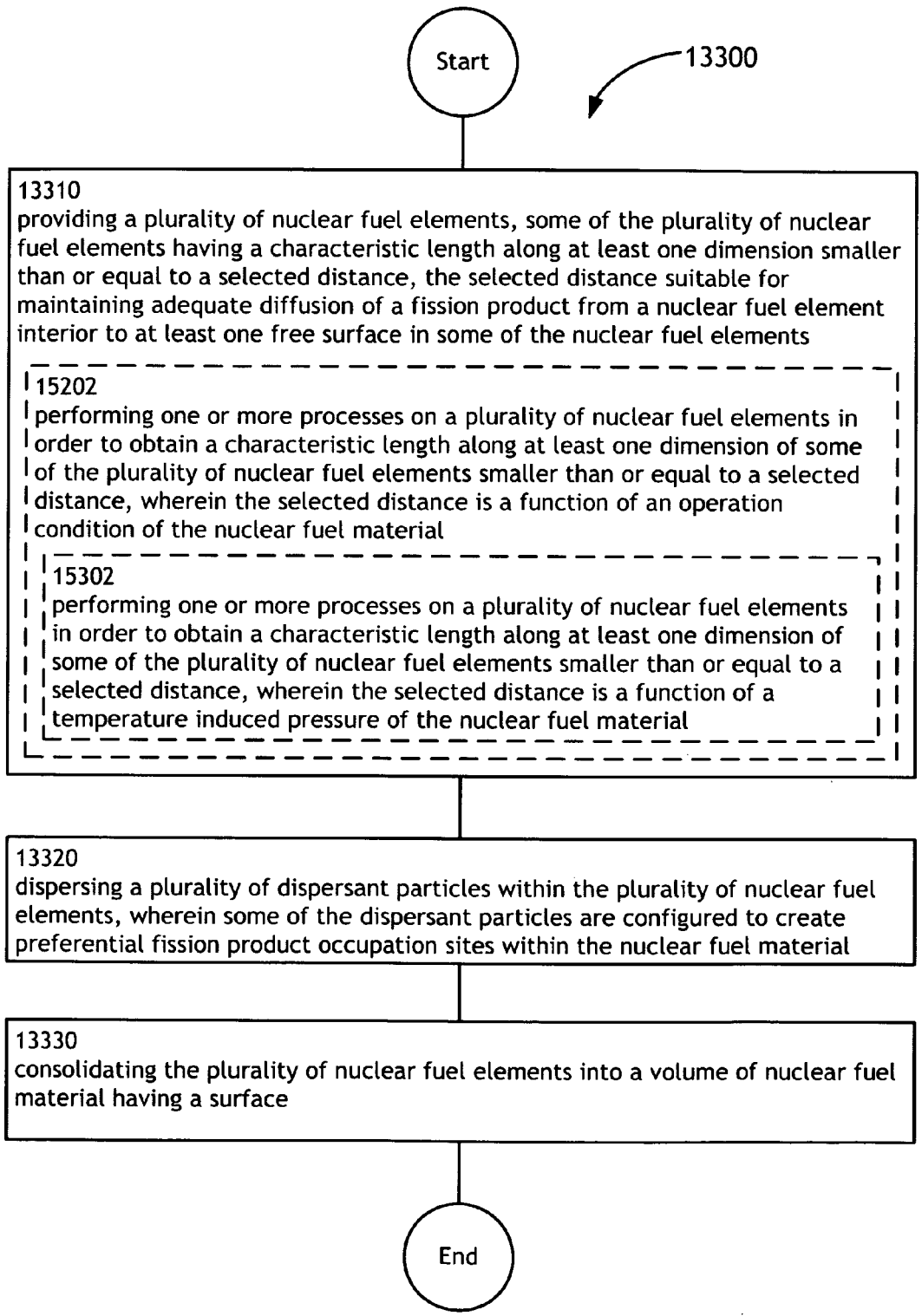

FIG. 153 illustrates alternative embodiments of the example operational flow 13300 of FIG. 133. FIG. 153 illustrates example embodiments where the operation 13310 may include at least one additional operation. Additional operations may include an operation 15302. Further, the operation 15302 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a temperature induced pressure of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel smaller than a selected distance, which is a function of a temperature induced pressure of the nuclear fuel 200. For instance, the critical size necessary to ensure adequate diffusion of a fission product 108 from the interiors 210 of the nuclear fuel elements 204 to the surfaces 212 of the nuclear fuel elements 204 of the nuclear fuel 200 may depend may depend upon the temperature induced pressure within the nuclear reactor fuel 100.

Figure 154:
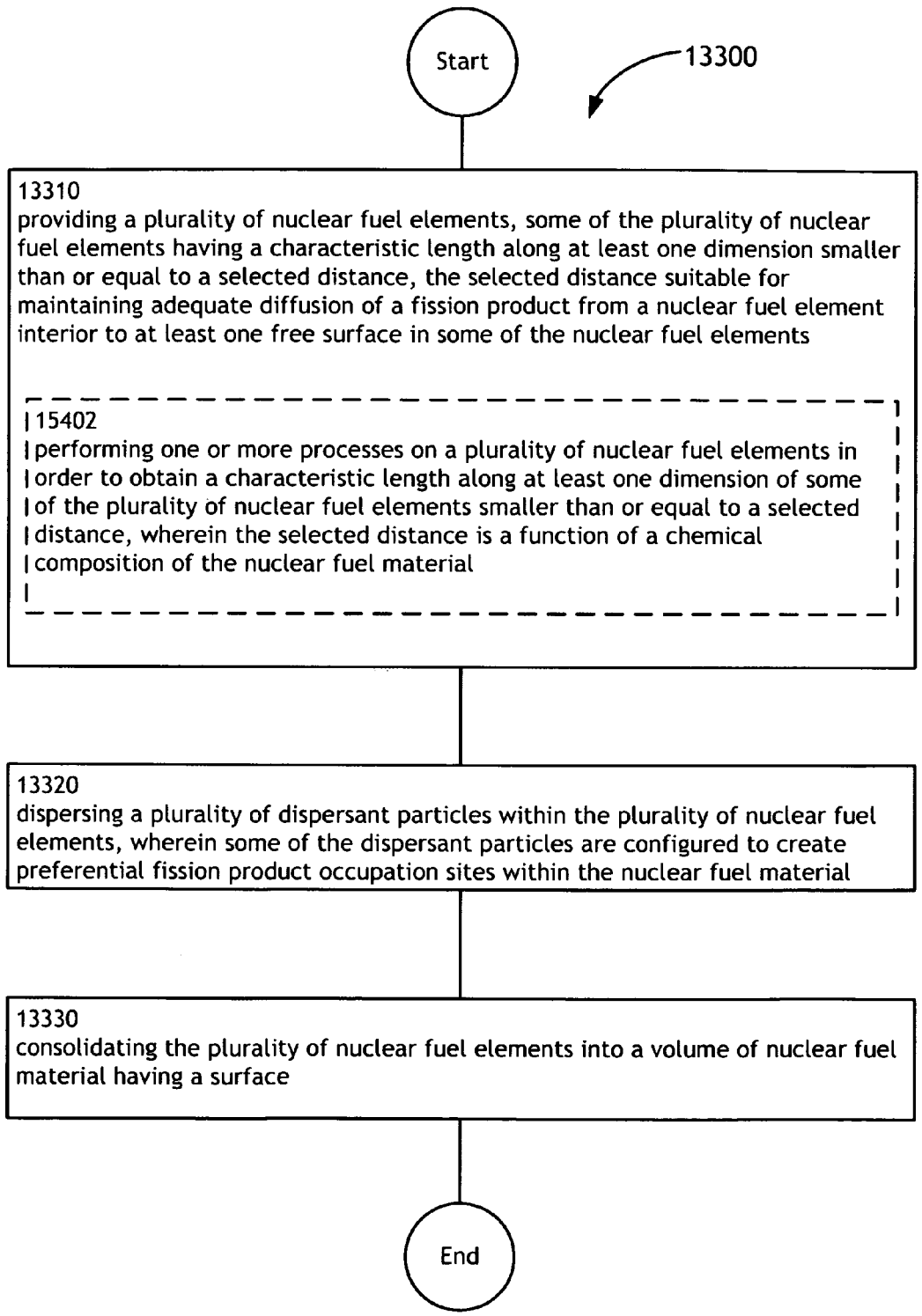

FIG. 154 illustrates alternative embodiments of the example operational flow 13300 of FIG. 133. FIG. 154 illustrates example embodiments where the operation 13310 may include at least one additional operation. Additional operations may include an operation 15402.

The operation 15402 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a chemical composition of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the chemical composition of the nuclear fuel 200. For instance, the critical size necessary to ensure adequate diffusion of a fission product 108 from the interiors 210 of the nuclear fuel elements 204 to the surfaces 212 of the nuclear fuel elements of the nuclear fuel 200 may depend upon the chemical composition (e.g., type of fissile material(s), types of alloying agents, relative concentration of fissile materials, or the like) of the nuclear reactor fuel 200.

Figure 155:
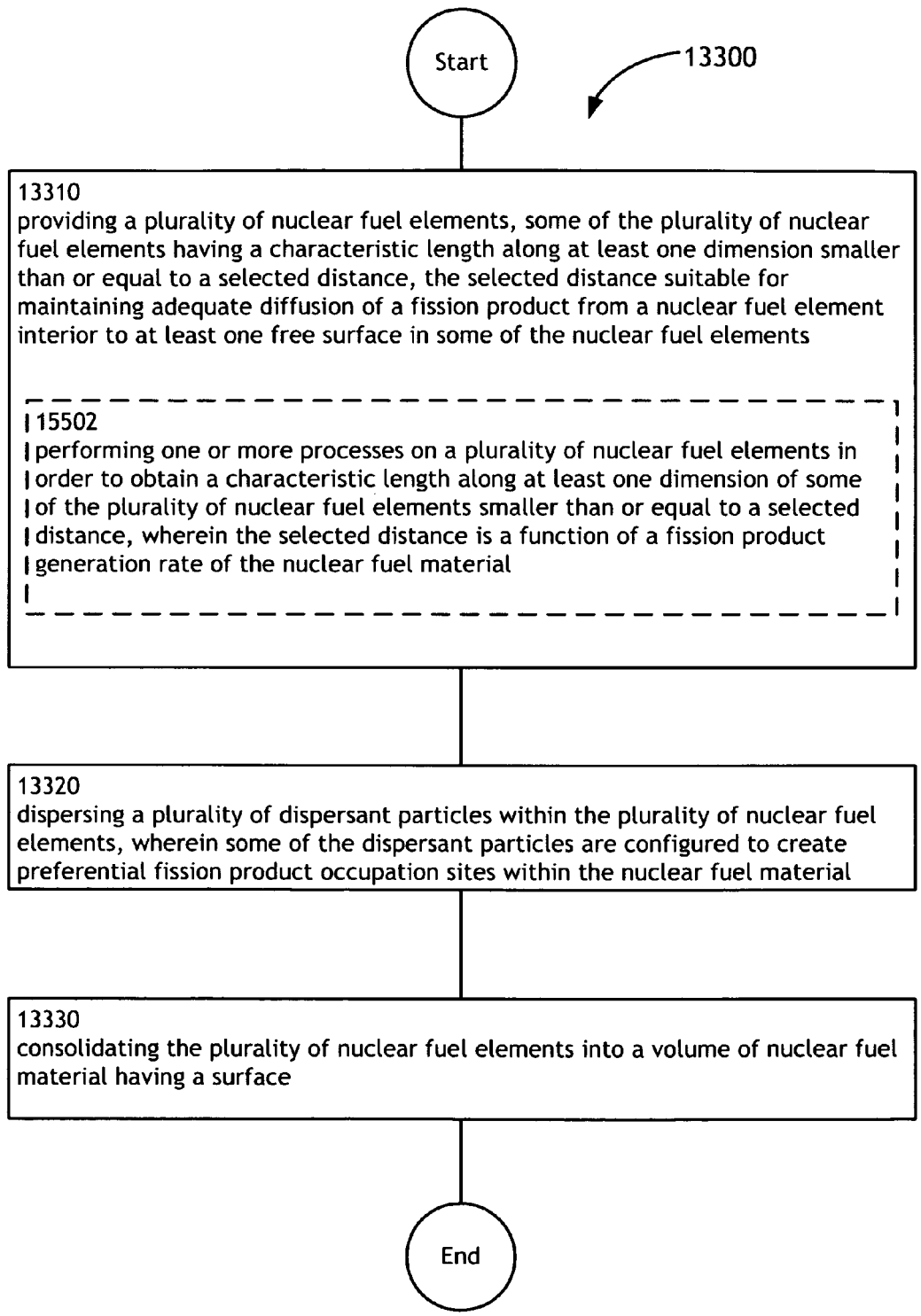

FIG. 155 illustrates alternative embodiments of the example operational flow 13300 of FIG. 133. FIG. 155 illustrates example embodiments where the operation 13310 may include at least one additional operation. Additional operations may include an operation 15502.

The operation 15502 illustrates performing one or more processes on a plurality of nuclear fuel elements in order to obtain a characteristic length along at least one dimension of some of the plurality of nuclear fuel elements smaller than or equal to a selected distance, wherein the selected distance is a function of a fission product generation rate of the nuclear fuel material. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is a function of the fission product 108 generation rate within the nuclear fuel 200. For instance, the critical size necessary to ensure adequate diffusion of a fission product 108 from interiors 210 of the nuclear fuel elements 204 to the surfaces 212 of the nuclear fuel elements 204 of the nuclear fuel 200 may depend upon the fission product 108 generation rate of the nuclear reactor fuel 200. Further, the fission product 108 generation rate (e.g., fission gas 118 generation rate) is proportional to the fission rate with the nuclear fuel 200, which in turn is proportional to the power density of the nuclear fuel 200, which in turn is dependent upon the chemical composition of the nuclear fuel 200.

Figure 156:
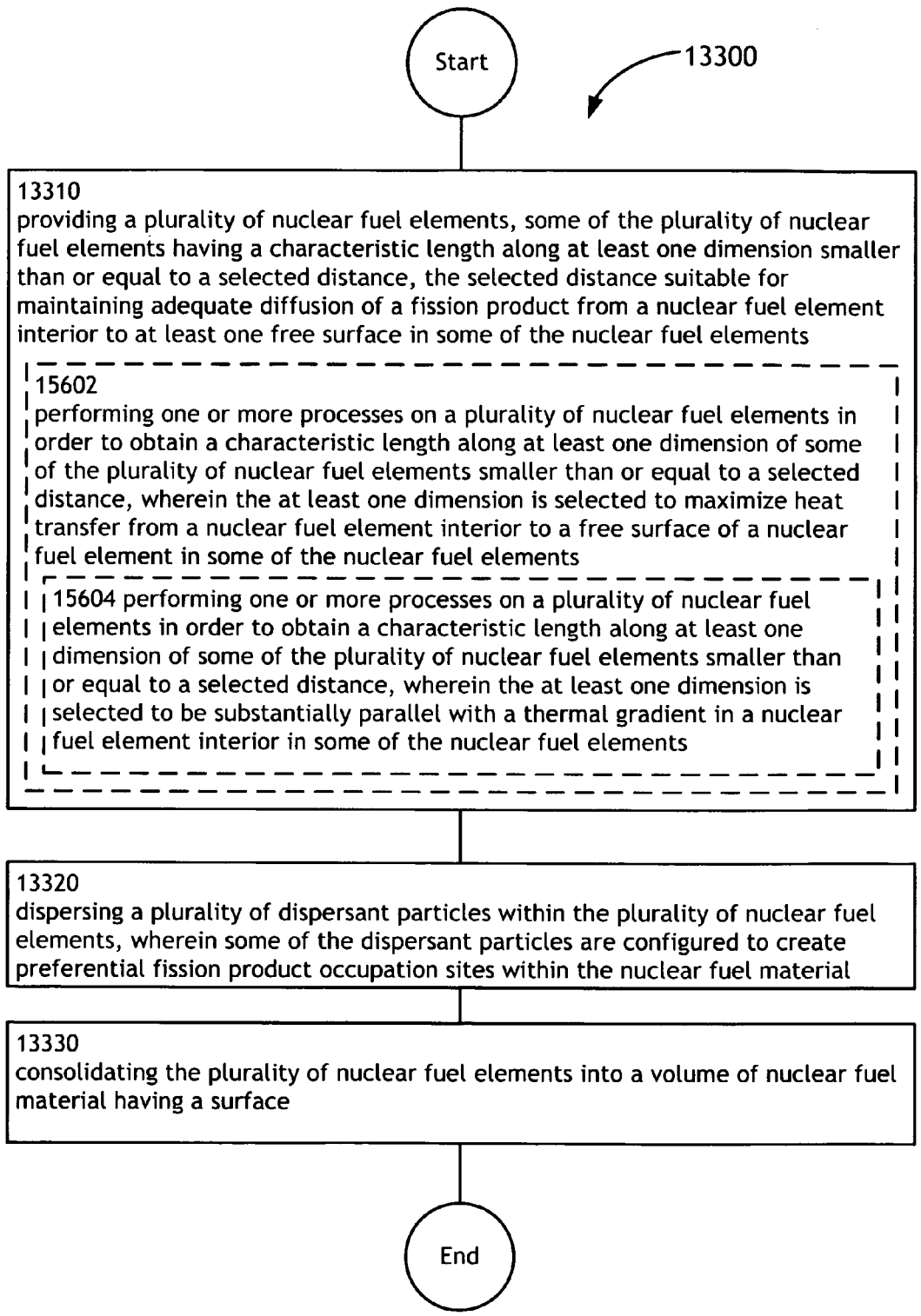

FIG. 156 illustrates alternative embodiments of the example operational flow 13300 of FIG. 133. FIG. 156 illustrates example embodiments where the operation 13310 may include at least one additional operation. Additional operations may include an operation 15602, and/or an operation 15604.

The operation 15602 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to maximize heat transfer from a nuclear fuel element interior to a free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the dimension of the nuclear fuel elements is selected in order to maximize heat transfer from the interiors 210 of the nuclear fuel elements 204 to the surfaces 212 of the nuclear fuel elements 204 of the nuclear fuel 200. For instance, a dimension of the nuclear fuel elements 204 to be minimized may be selected in order maximize (or at least improve) heat transfer from the interiors 210 of the nuclear fuel elements 204 to the surfaces 212 of the nuclear fuel elements 204.

Further, the operation 15604 illustrates performing one or more processes on a plurality of nuclear fuel elements in order to obtain a characteristic length along at least one dimension of some of the plurality of nuclear fuel elements smaller than or equal to a selected distance, wherein the at least one dimension is selected to be substantially parallel with a thermal gradient in a nuclear fuel element interior in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, wherein the at least one dimension is selected to be substantially parallel with a thermal gradient in a grain interior in some of the nuclear fuel elements. For instance, in order to maximize diffusion of a fission gas 118 from the interiors 210 of the nuclear fuel elements 204 to the surfaces 212 of the nuclear fuel elements 204 a "thin" dimension of the nuclear fuel elements 204 may be arranged so as to align substantially perpendicular to the direction of a thermal gradient within the nuclear reactor fuel 200. Conversely, a "thick" dimension of the nuclear fuel elements 204 may be arranged so as to align substantially parallel with the direction of the thermal gradient within the nuclear reactor fuel 200.

Figure 157:
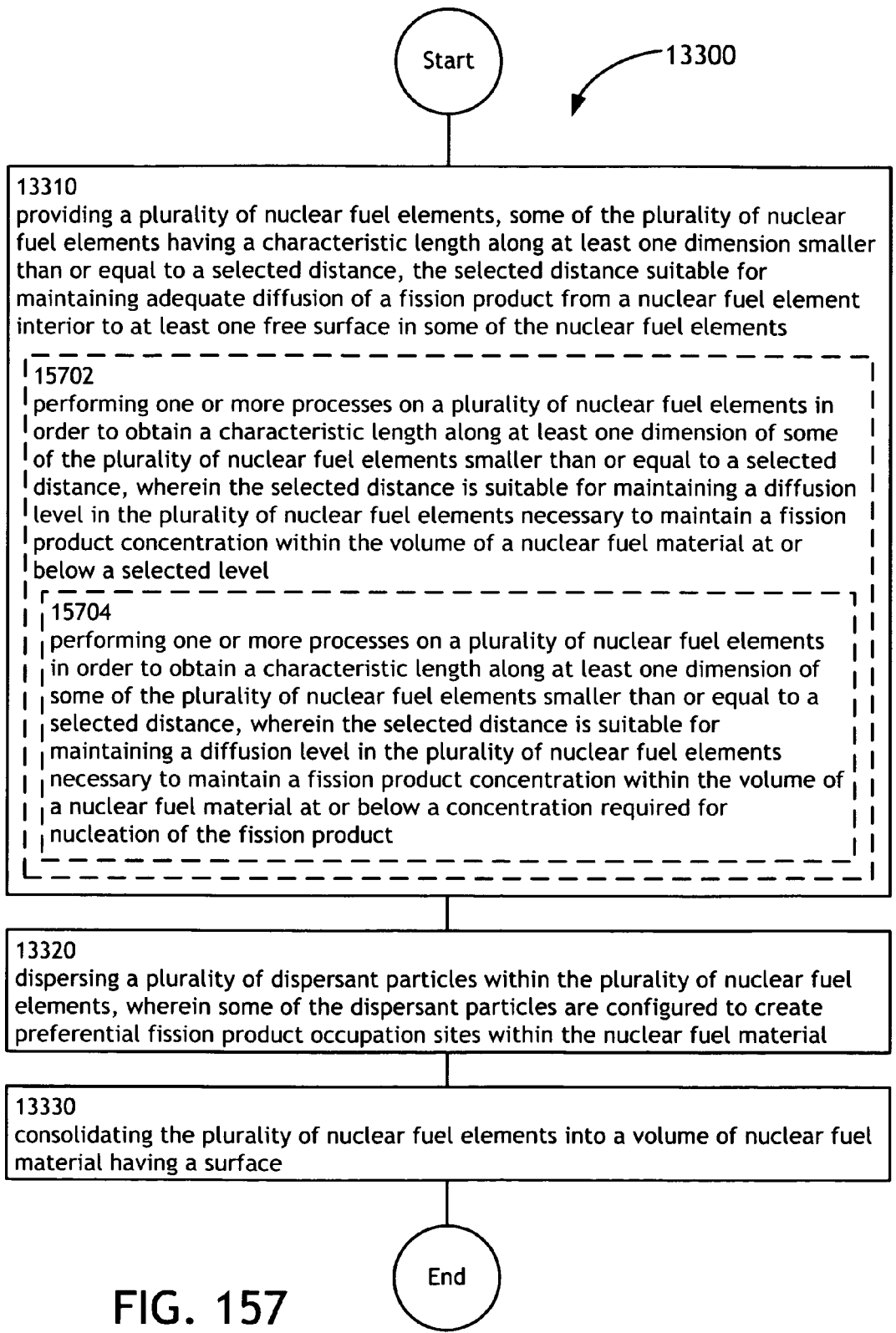

FIG. 157 illustrates alternative embodiments of the example operational flow 13300 of FIG. 133. FIG. 157 illustrates example embodiments where the operation 13310 may include at least one additional operation. Additional operations may include an operation 15702, and/or an operation 15704.

The operation 15702 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a selected level. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 to be smaller than a selected distance, which is selected in order to maintain a selected fission product 108 (e.g., fission gas 118) concentration within the volume 102 of the nuclear fuel 100 at or below a selected level. For instance, the rate of diffusion from the interiors 210 of the nuclear fuel elements 204 to the surfaces 212 of the nuclear fuel elements 204 in the nuclear fuel elements 204 may be inversely related to the average nuclear fuel element size 206 within the nuclear fuel 200. In this sense, as the nuclear fuel element sizes 206 of the nuclear fuel elements 204 decrease, the fission gas 118 diffusion rate from the interiors 210 of the nuclear fuel elements 204 to the surfaces 212 of the nuclear fuel elements 204 may increase. Therefore, the concentration of a fission gas 118 within the nuclear fuel elements 204 may be adjusted to fall within acceptable concentration levels by engineering the nuclear fuel element sizes 206 of the nuclear fuel elements 204 of the nuclear fuel 200.

Further, the operation 15704 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining a diffusion level in the plurality of nuclear fuel elements necessary to maintain a fission product concentration within the volume of a nuclear fuel material at or below a concentration required for nucleation of the fission product. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain a selected fission product 108 concentration below a concentration level required for nucleation of the fission product 108 within an interior 210 of a nuclear fuel element 204. For instance, the concentration of a fission gas 118 within the nuclear fuel elements 204 may be adjusted to fall below the concentration level required for fission gas nucleation within the interiors 210 of the nuclear fuel elements 204 by engineering the nuclear fuel element sizes 206 of the nuclear fuel elements 204 of the nuclear fuel 200.

Figure 158:
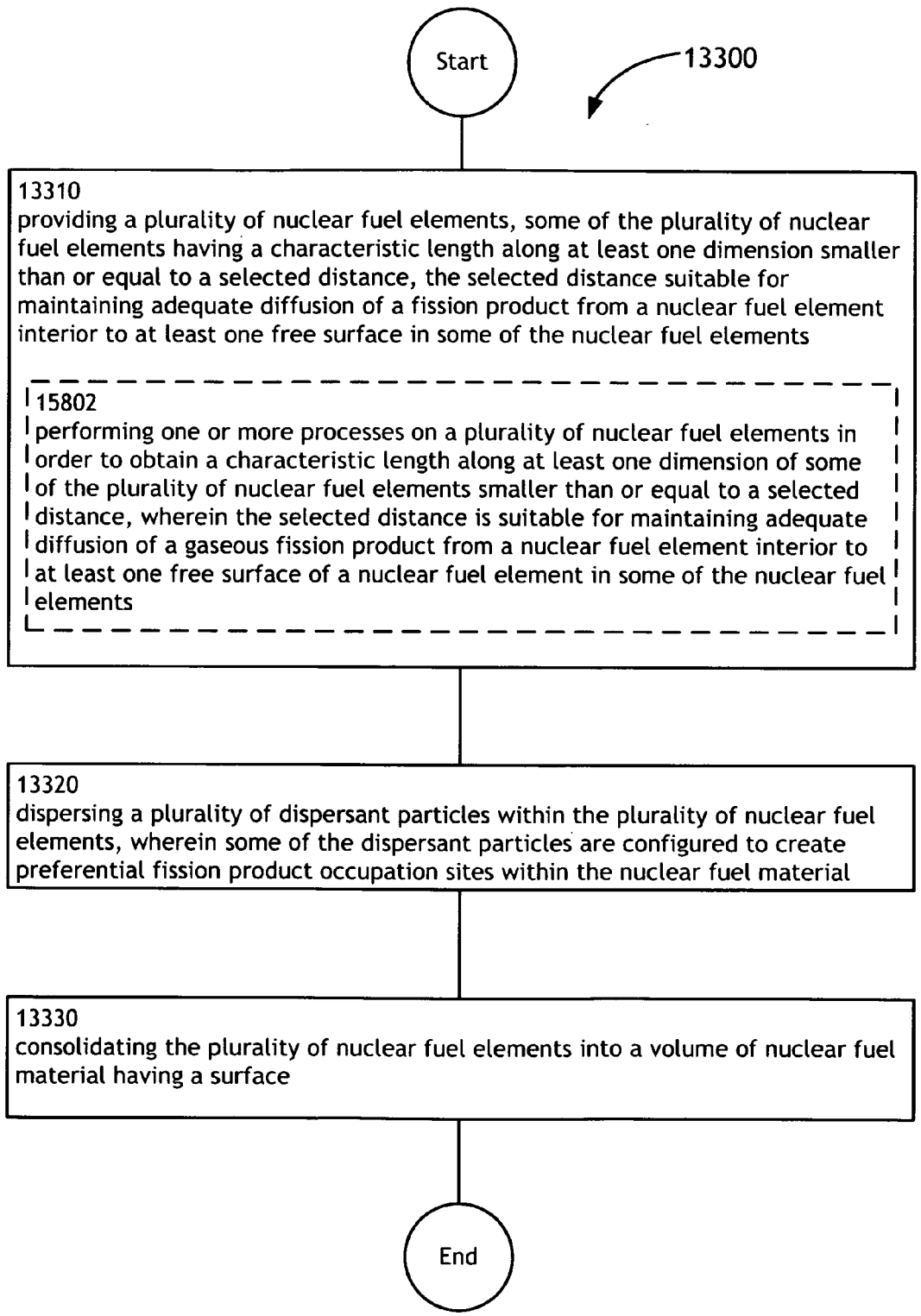

FIG. 158 illustrates alternative embodiments of the example operational flow 13300 of FIG. 133. FIG. 158 illustrates example embodiments where the operation 13310 may include at least one additional operation. Additional operations may include an operation 15802.

The operation 15802 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a gaseous fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a gaseous fission product (e.g., krypton or xenon) from the interiors 210 of the nuclear fuel elements 204 to the surfaces 212 of the nuclear fuel elements 204.

Figure 159:
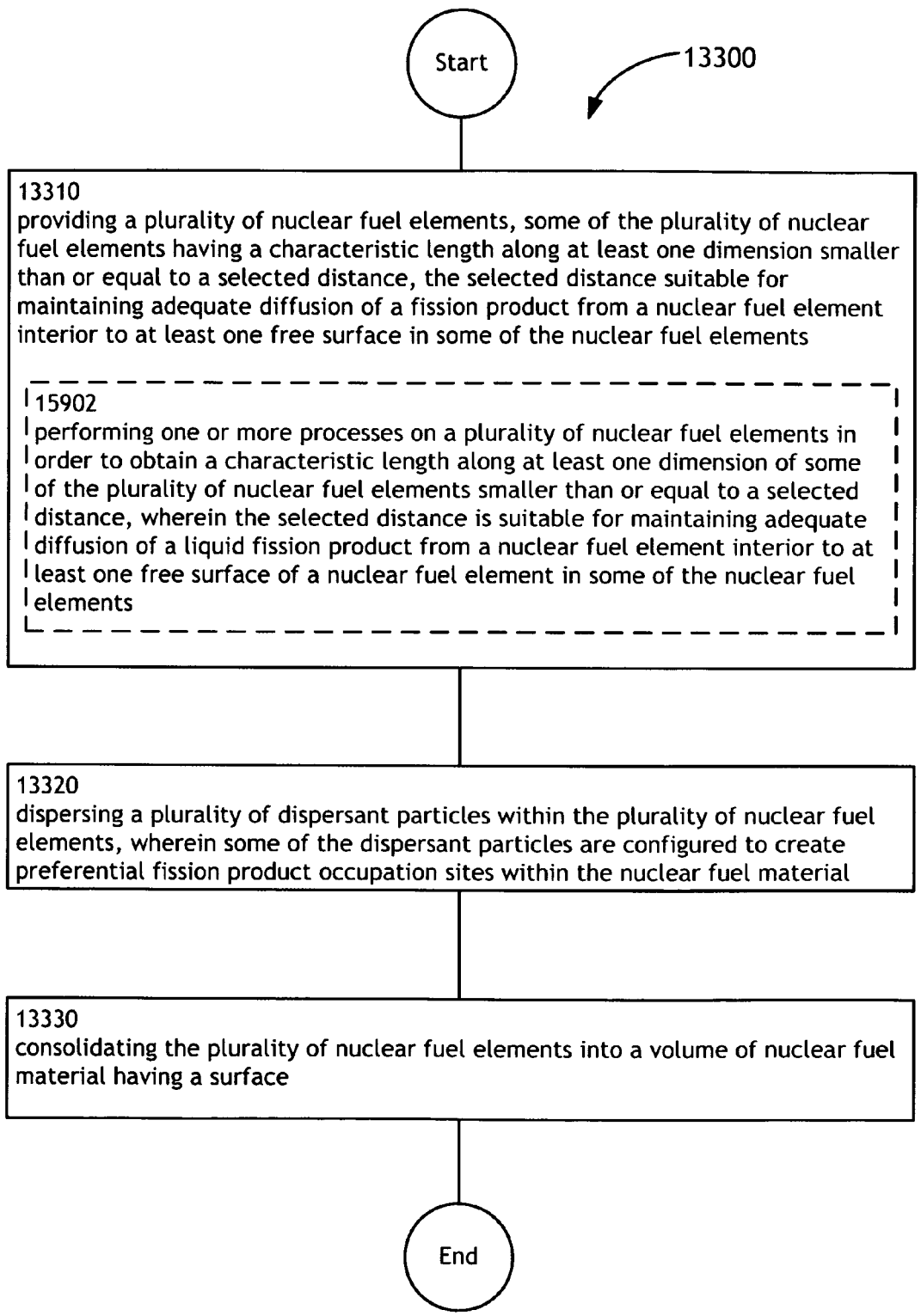

FIG. 159 illustrates alternative embodiments of the example operational flow 13300 of FIG. 133. FIG. 159 illustrates example embodiments where the operation 13310 may include at least one additional operation. Additional operations may include an operation 15902.

The operation 15902 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a liquid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a liquid fission product (e.g., a liquid metal) from the interiors 210 of the nuclear fuel elements 204 to the surfaces 212 of the nuclear fuel elements 204.

Figure 160:
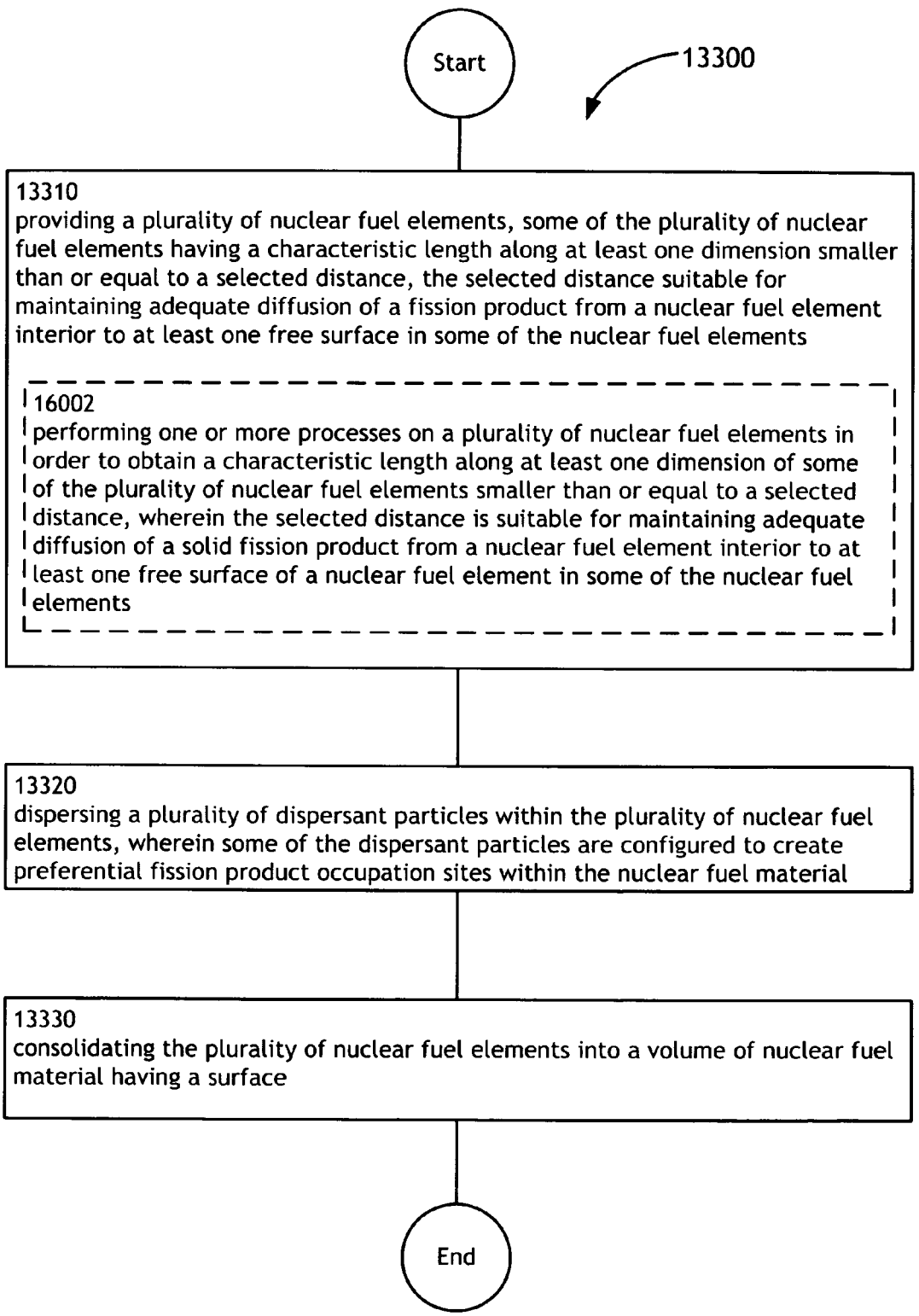

FIG. 160 illustrates alternative embodiments of the example operational flow 13300 of FIG. 133. FIG. 160 illustrates example embodiments where the operation 13310 may include at least one additional operation. Additional operations may include an operation 16002.

The operation 16002 illustrates performing one or more processes on a plurality of nuclear fuel elements in order to obtain a characteristic length along at least one dimension of some of the plurality of nuclear fuel elements smaller than or equal to a selected distance, wherein the selected distance is suitable for maintaining adequate diffusion of a solid fission product from a nuclear fuel element interior to at least one free surface of a nuclear fuel element in some of the nuclear fuel elements. For example, as shown in FIGS. 1A through 4, one or more processes may be utilized in order engineer the nuclear fuel elements 204 of the nuclear fuel 200 to have a characteristic length 206 along at least one dimension of some of the nuclear fuel elements 204 of the nuclear fuel 200 smaller than a selected distance, which is selected in order to maintain adequate diffusion of a solid fission product (e.g., tellurium or cesium) from the interiors 210 of the nuclear fuel elements 204 to the surfaces 212 of the nuclear fuel elements 204.

Figure 161:
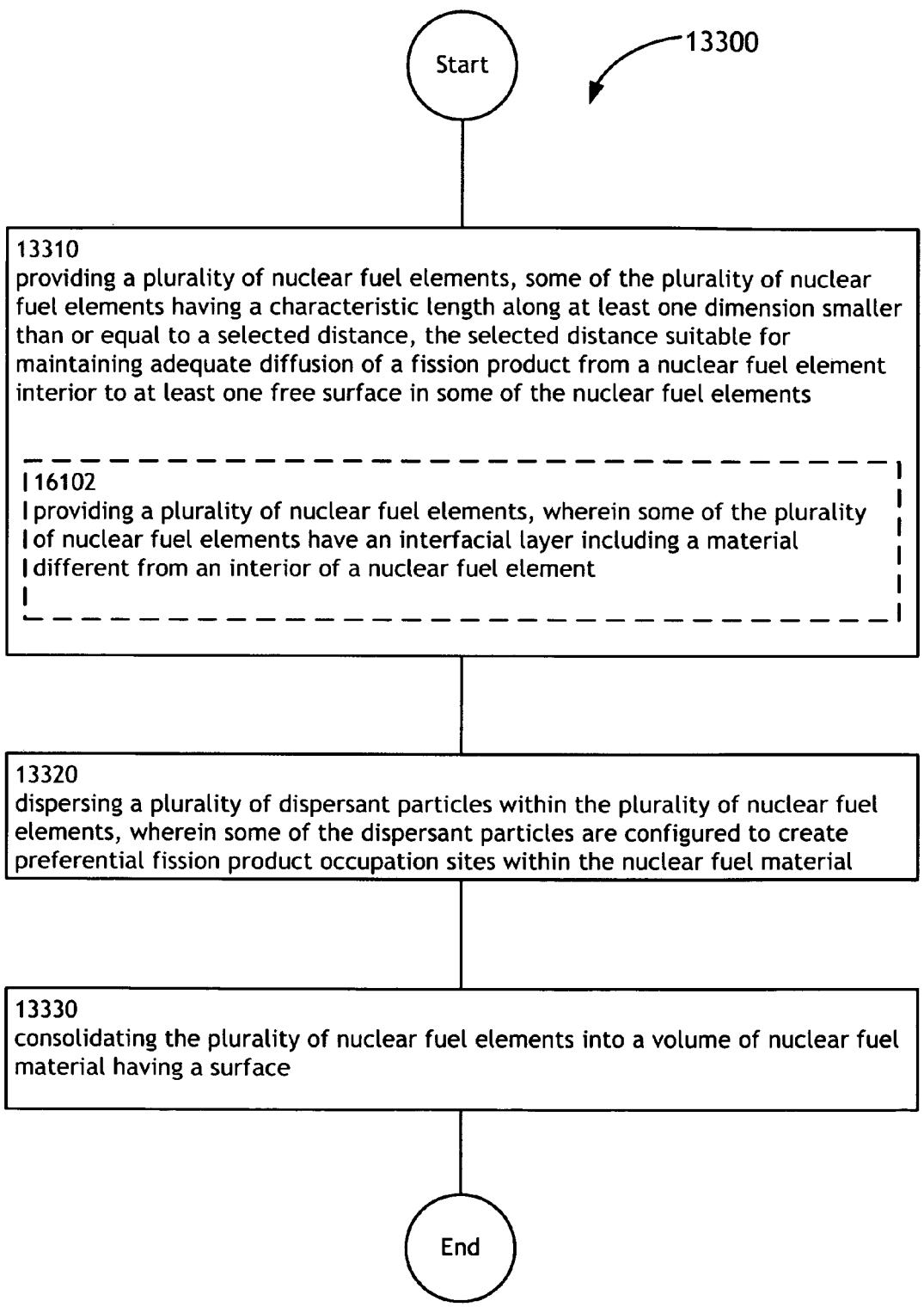

FIG. 161 illustrates alternative embodiments of the example operational flow 13300 of FIG. 133. FIG. 161 illustrates example embodiments where the operation 13310 may include at least one additional operation. Additional operations may include an operation 16102.

The operation 16102 illustrates providing a plurality of nuclear fuel elements, wherein some of the plurality of nuclear fuel elements have an interfacial layer including a material different from an interior of a nuclear fuel element. For example, as shown in FIG. 2G, one or more of the nuclear fuel elements 204 of the nuclear fuel 200 may include an interfacial layer of a material different from the material within the interiors 210 of the nuclear fuel elements 204. For instance, the nuclear fuel elements 204 may include an oxide-based or carbide-based interfacial layer.

Figure 162:
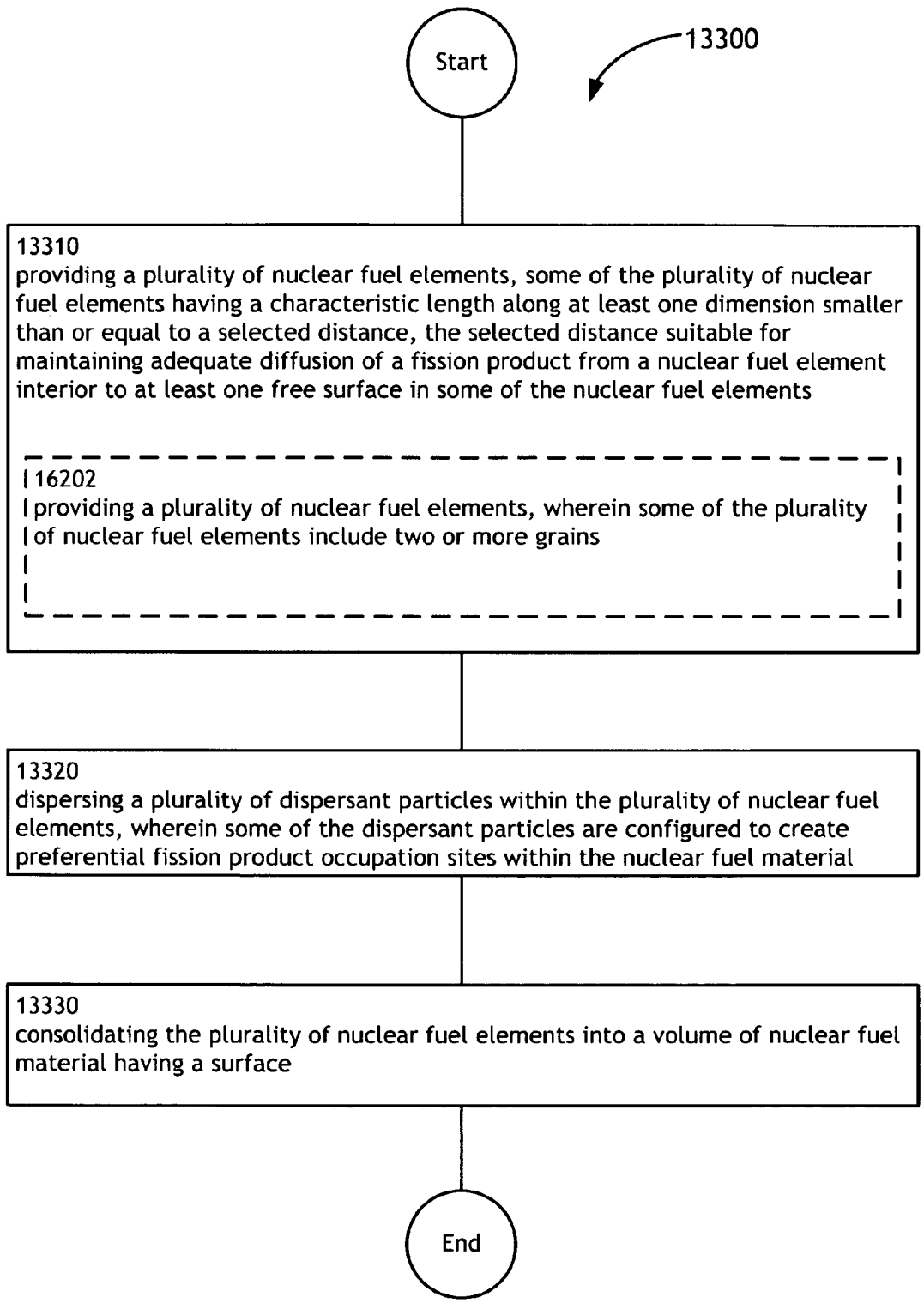

FIG. 162 illustrates alternative embodiments of the example operational flow 13300 of FIG. 133. FIG. 162 illustrates example embodiments where the operation 13310 may include at least one additional operation. Additional operations may include an operation 16202.

The operation 16202 illustrates providing a plurality of nuclear fuel elements, wherein some of the plurality of nuclear fuel elements include two or more grains. For example, as shown in FIG. 2F, one or more of the nuclear fuel elements 204 of the nuclear fuel 200 may include two or more grains (i.e., the nuclear fuel elements are polycrystalline).

Figure 163:
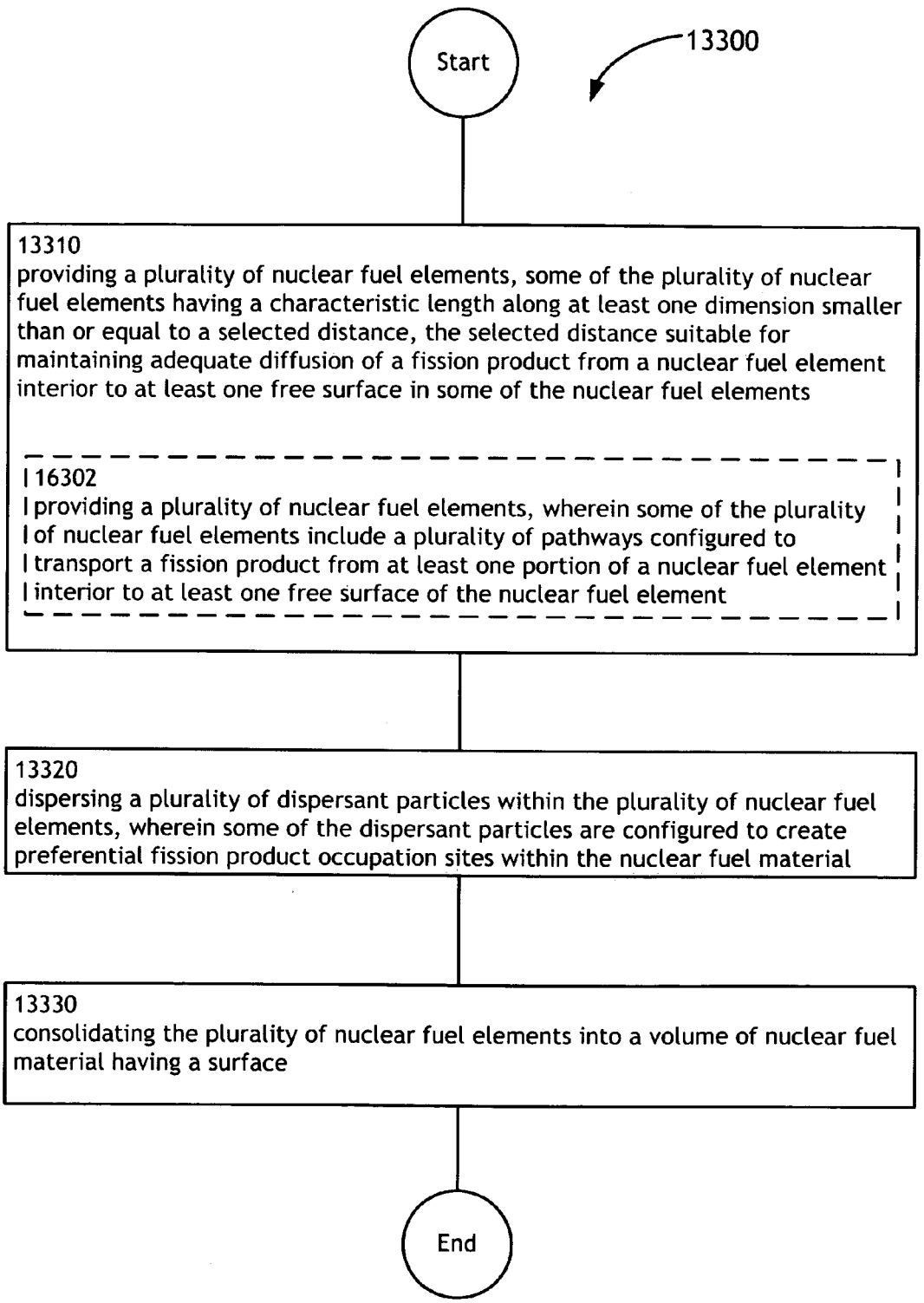

FIG. 163 illustrates alternative embodiments of the example operational flow 13300 of FIG. 133. FIG. 163 illustrates example embodiments where the operation 13310 may include at least one additional operation. Additional operations may include an operation 16302.

The operation 16302 illustrates providing a plurality of nuclear fuel elements, wherein some of the plurality of nuclear fuel elements include a plurality of pathways configured to transport a fission product from at least one portion of a nuclear fuel element interior to at least one free surface of the nuclear fuel element. For example, as shown in FIG. 2F, one or more of the nuclear fuel elements 204 of the nuclear fuel 200 may include one or more internal pathways suitable for transporting fission gas 118 from the nuclear fuel element interior 210 to the nuclear fuel element surface 212. Moreover, as previously described herein, the internal pathways 110 may be defined by a grain-boundary 112 between adjacent grains within a common nuclear fuel element 204.

Figure 164:
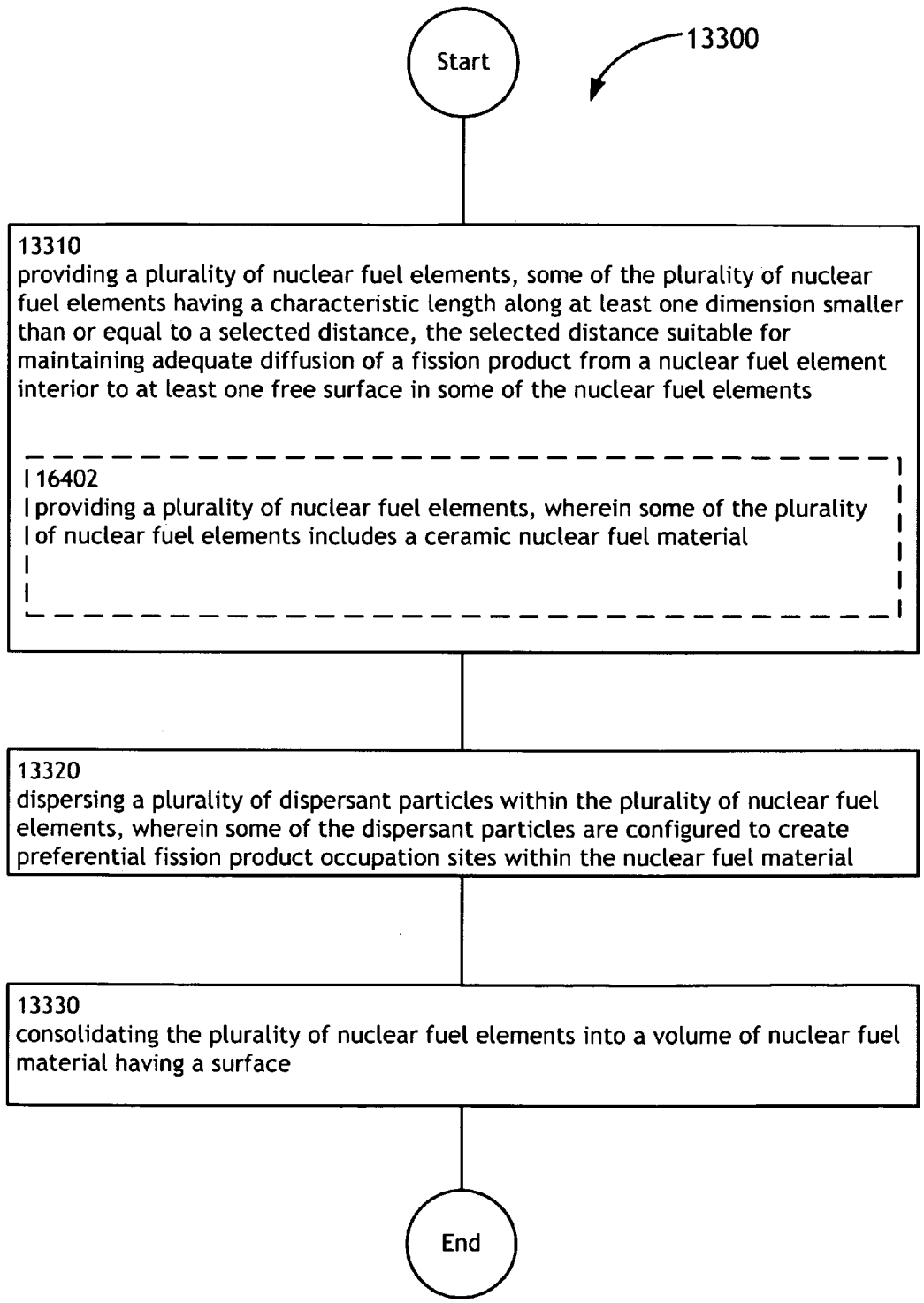

FIG. 164 illustrates alternative embodiments of the example operational flow 13300 of FIG. 133. FIG. 164 illustrates example embodiments where the operation 13310 may include at least one additional operation. Additional operations may include an operation 16402.

The operation 16402 illustrates providing a plurality of nuclear fuel elements, wherein some of the plurality of nuclear fuel elements includes a ceramic nuclear fuel material. For example, as shown in FIGS. 1A through 4, some of the nuclear fuel elements 204 may include, but are not limited to a metal oxide (e.g., uranium dioxide, plutonium dioxide, or thorium dioxide) nuclear fuel material, a mixed oxide nuclear fuel material (e.g., blend of plutonium dioxide and depleted uranium dioxide), a metal nitride (e.g., uranium nitride) based nuclear fuel material, or a metal carbide (e.g., uranium carbide) based nuclear fuel material.

Figure 165:
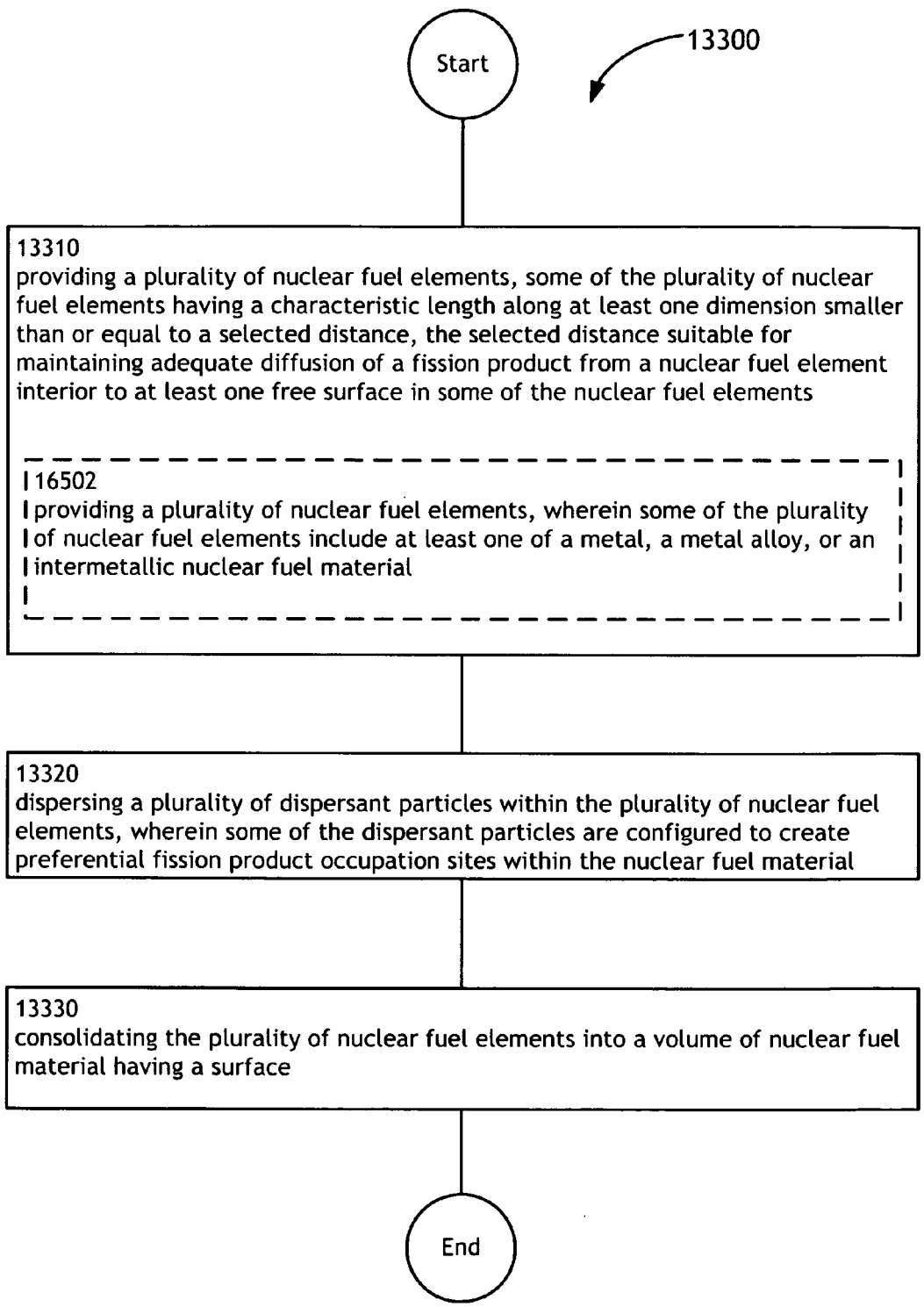

FIG. 165 illustrates alternative embodiments of the example operational flow 13300 of FIG. 133. FIG. 165 illustrates example embodiments where the operation 13310 may include at least one additional operation. Additional operations may include an operation 16502.

The operation 16502 illustrates providing a plurality of nuclear fuel elements, wherein some of the plurality of nuclear fuel elements include at least one of a metal, a metal alloy, or an intermetallic nuclear fuel material. For example, as shown in FIGS. 1A through 4, the provided nuclear fuel elements 204 may include a metal based nuclear fuel material. For instance, the plurality of nuclear fuel elements 204 of the nuclear fuel 200 may include, but is not limited to a metal (e.g., uranium, plutonium, or thorium) nuclear fuel material, a metal alloy fuel material (e.g., uranium zirconium, uranium-plutonium-zirconium, or uranium zirconium hydride), or an intermetallic (e.g., $UFe_2$ or $UNi_2$) based nuclear fuel material.

Figure 166:
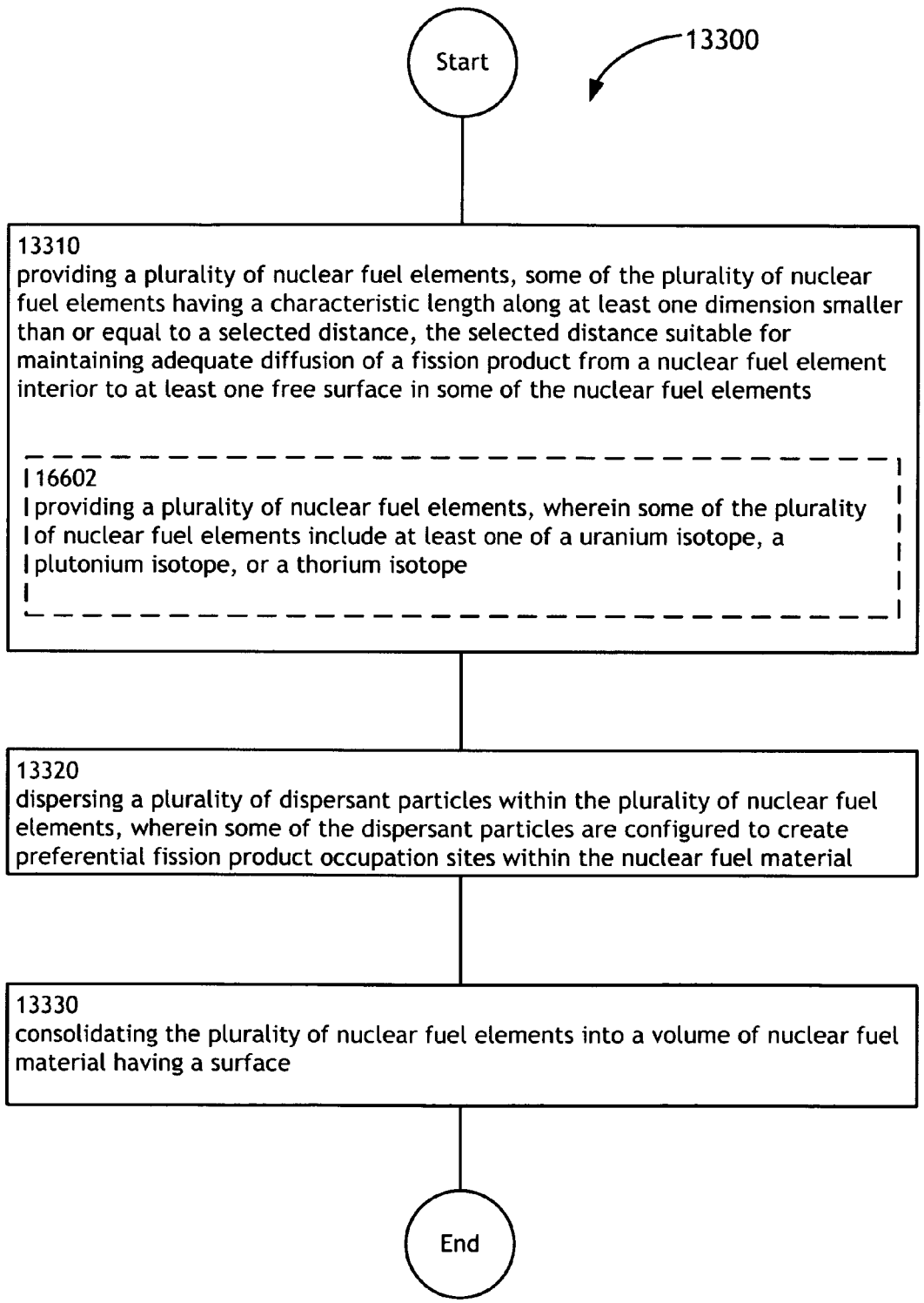

FIG. 166 illustrates alternative embodiments of the example operational flow 13300 of FIG. 133. FIG. 166 illustrates example embodiments where the operation 13310 may include at least one additional operation. Additional operations may include an operation 16602.

The operation 16602 illustrates providing a plurality of nuclear fuel elements, wherein some of the plurality of nuclear fuel elements include at least one of a uranium isotope, a plutonium isotope, or a thorium isotope. For example, as shown in FIGS. 1A through 4, the provided nuclear fuel elements 204 may include a fissile nuclear material including, but not limited to, uranium-235 or plutonium-239. By way of another example, the provided nuclear fuel elements 204 may include a non-fissile nuclear material including, but not limited to, thorium-232. While thorium-232 is not by itself fissile, it may be utilized to breed uranium-233, which is fissile in nature.

Figure 167:
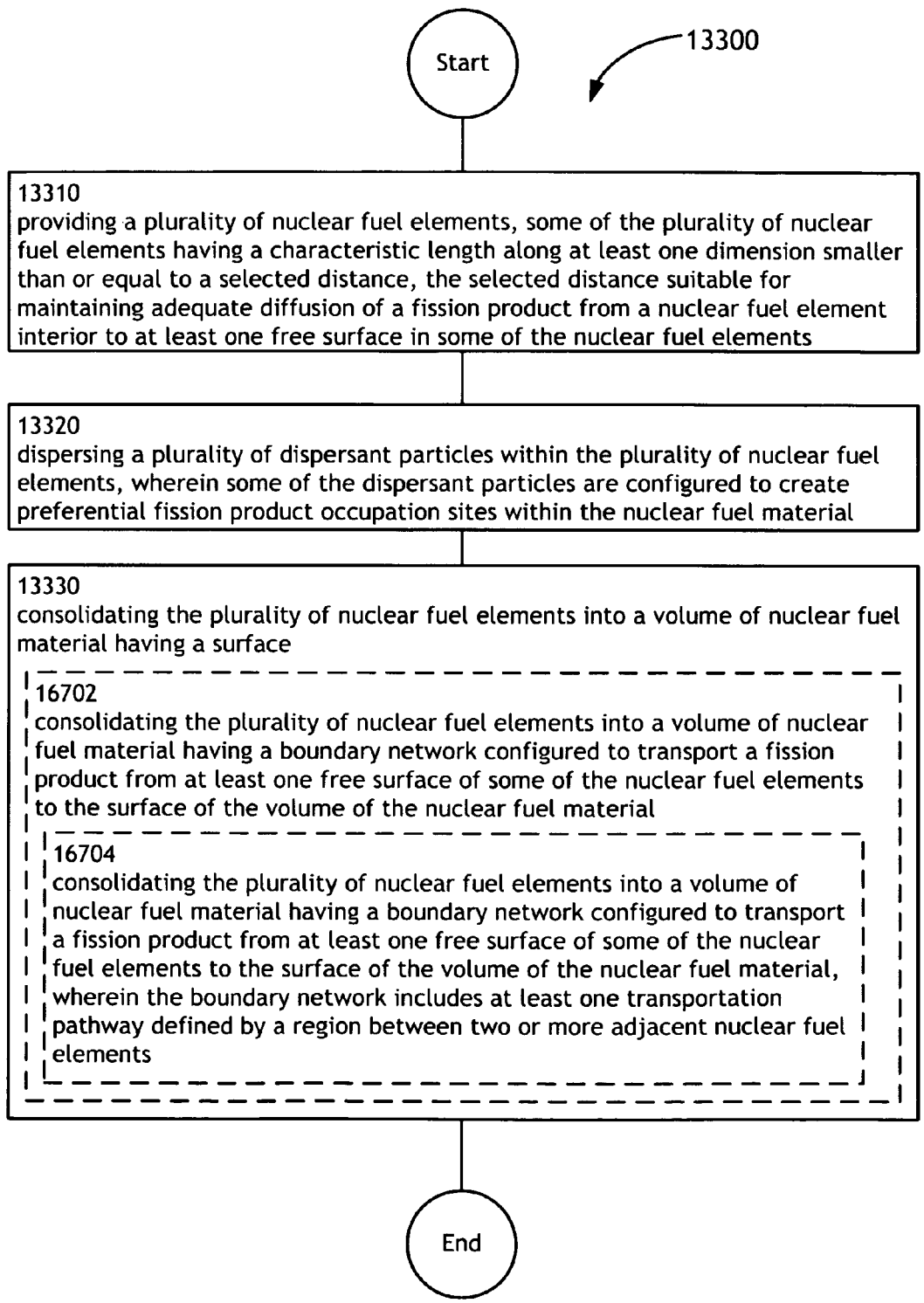

FIG. 167 illustrates alternative embodiments of the example operational flow 13300 of FIG. 133. FIG. 167 illustrates example embodiments where the operation 13330 may include at least one additional operation. Additional operations may include an operation 16702, and/or an operation 16704.

The operation 16702 illustrates consolidating the plurality of nuclear fuel elements into a volume of nuclear fuel material having a boundary network configured to transport a fission product from at least one free surface of some of the nuclear fuel elements to the surface of the volume of the nuclear fuel material. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 configured to transport a fission product 118 from the surfaces 212 of the nuclear fuel elements 204 to the geometric surface 201 of the nuclear fuel 200.

Further, the operation 16704 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes at least one transportation pathway defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216.

Figure 168:
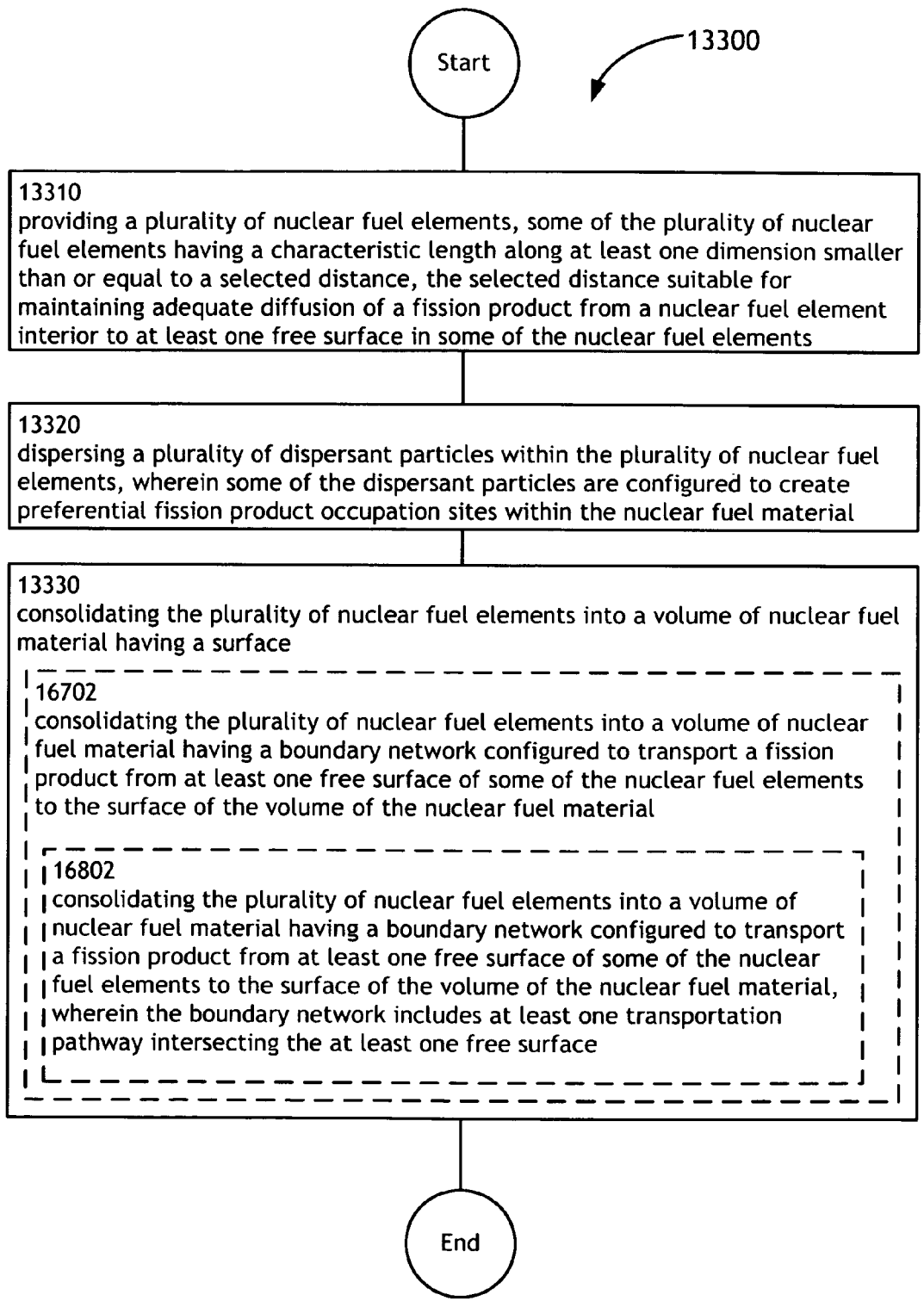

FIG. 168 illustrates alternative embodiments of the example operational flow 13300 of FIG. 133. FIG. 168 illustrates example embodiments where the operation 13330 may include at least one additional operation. Additional operations may include an operation 16802.

Further, the operation 16802 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes at least one transportation pathway intersecting the at least one free surface. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for providing a boundary network 214 having at least one transportation pathway 216 intersecting a surface 212 of one or more nuclear fuel elements 204. For example, as shown in FIGS. 1A through 4, the nuclear fuel elements 204 may be consolidated via a mechanical process configured to provide spatial configuration within the consolidated nuclear fuel 200 suitable for providing a boundary network 214 having at least one transportation pathway 216 intersecting a surface 212 of one or more nuclear fuel elements 204.

Figure 169:
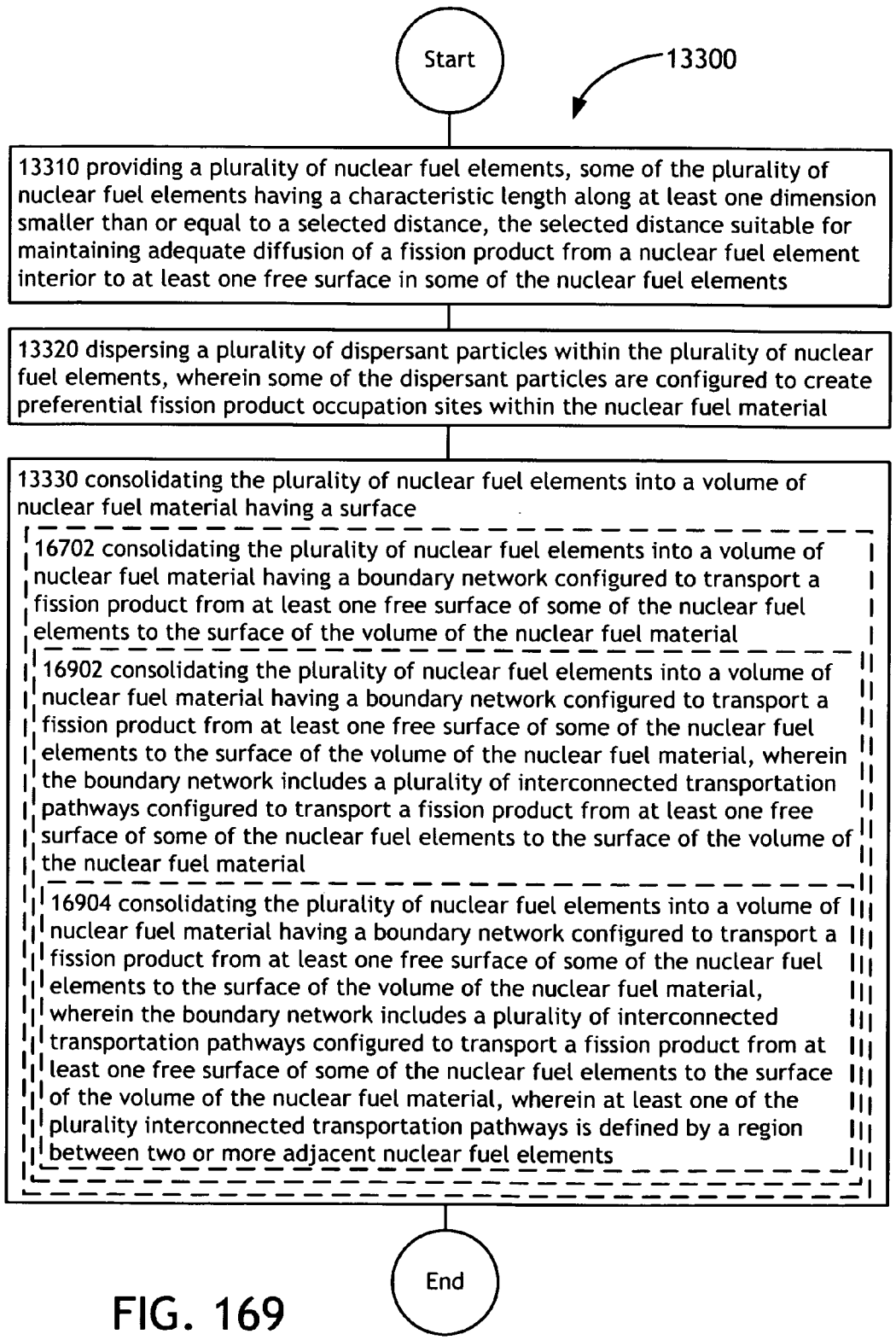

FIG. 169 illustrates alternative embodiments of the example operational flow 13300 of FIG. 133. FIG. 169 illustrates example embodiments where the operation 13330 may include at least one additional operation. Additional operations may include an operation 16902, and/or an operation 16904.

Further, the operation 16902 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 plurality of interconnected transportation pathways 216 configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 configured to transport a fission product 118 from the surfaces 212 of the nuclear fuel elements 204 to the geometric surface 201 of the nuclear fuel 200.

Further, the operation 16904 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected transportation pathways configured to transport a fission product from at least one free surface of some of the nuclear fuel elements to the surface of the volume of the nuclear fuel material, wherein at least one of the plurality interconnected transportation pathways is defined by a region between two or more adjacent nuclear fuel elements. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by a region between two or more adjacent nuclear fuel elements. 204 and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 170:
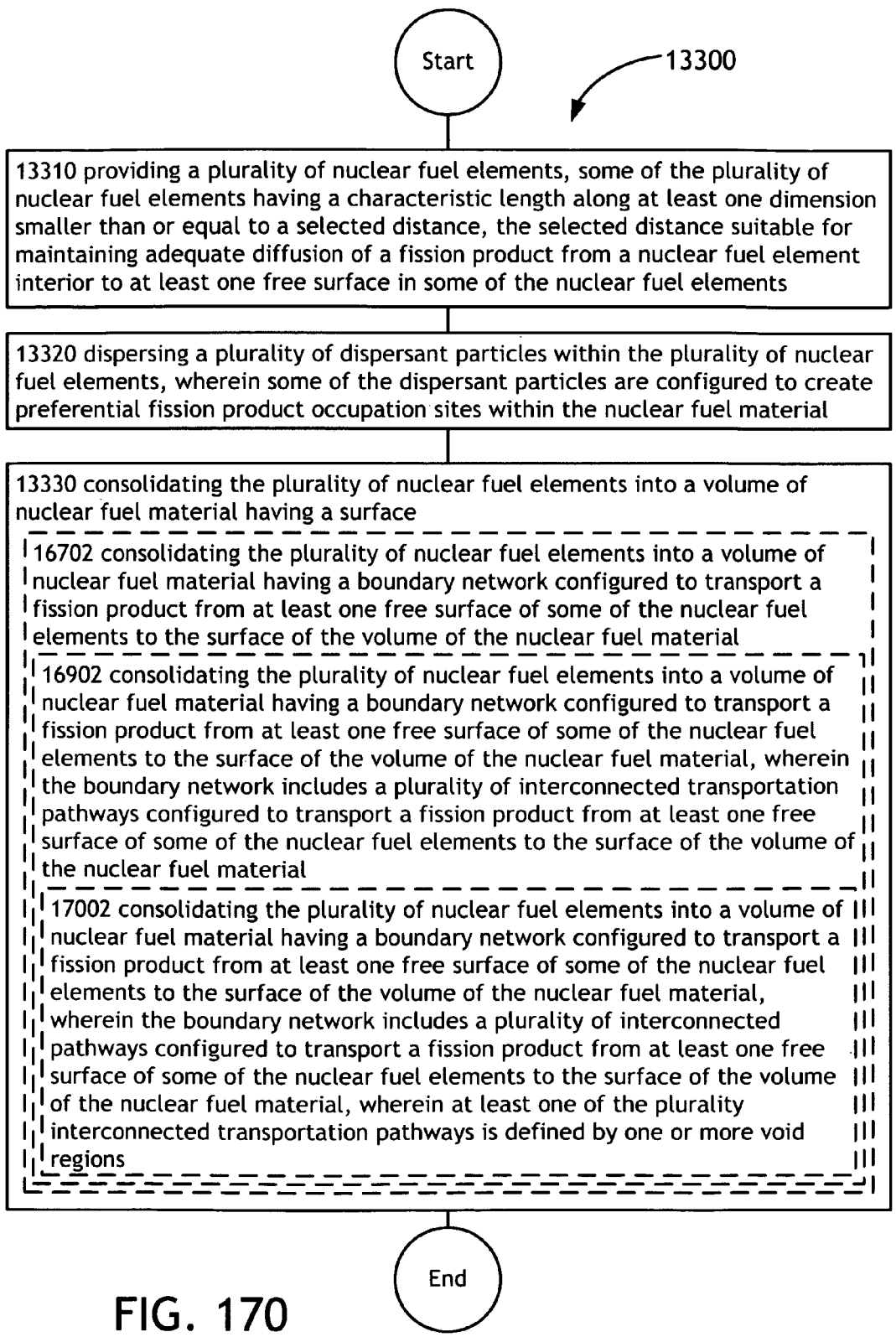

FIG. 170 illustrates alternative embodiments of the example operational flow 13300 of FIG. 133. FIG. 170 illustrates example embodiments where the operation 13330 may include at least one additional operation. Additional operations may include an operation 17002.

Further, the operation 17002 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of interconnected pathways configured to transport a fission product from at least one free surface of some of the nuclear fuel elements to the surface of the volume of the nuclear fuel material, wherein at least one of the plurality interconnected transportation pathways is defined by one or more void regions. For example, as shown in FIGS. 1A through 4, the nuclear fuel elements 204 may be consolidated via a consolidation process, such as, but not limited to, a compacting process, or a sintering process, configured to provide a porosity level within the consolidated nuclear fuel 200 suitable for producing a boundary network 214 having a plurality of interconnected transportation pathways 216 defined by one or more void regions and configured to transport a fission product 118 from the surfaces 212 of the nuclear fuel elements 204 to the geometric surface 201 of the nuclear fuel 200. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of interconnected transportation pathways 216 defined by a region between two or more adjacent nuclear fuel elements and configured to transport a fission product 118 from the surfaces 212 of the nuclear fuel elements 204 to the geometric surface 201 of the nuclear fuel 200.

Figure 171:
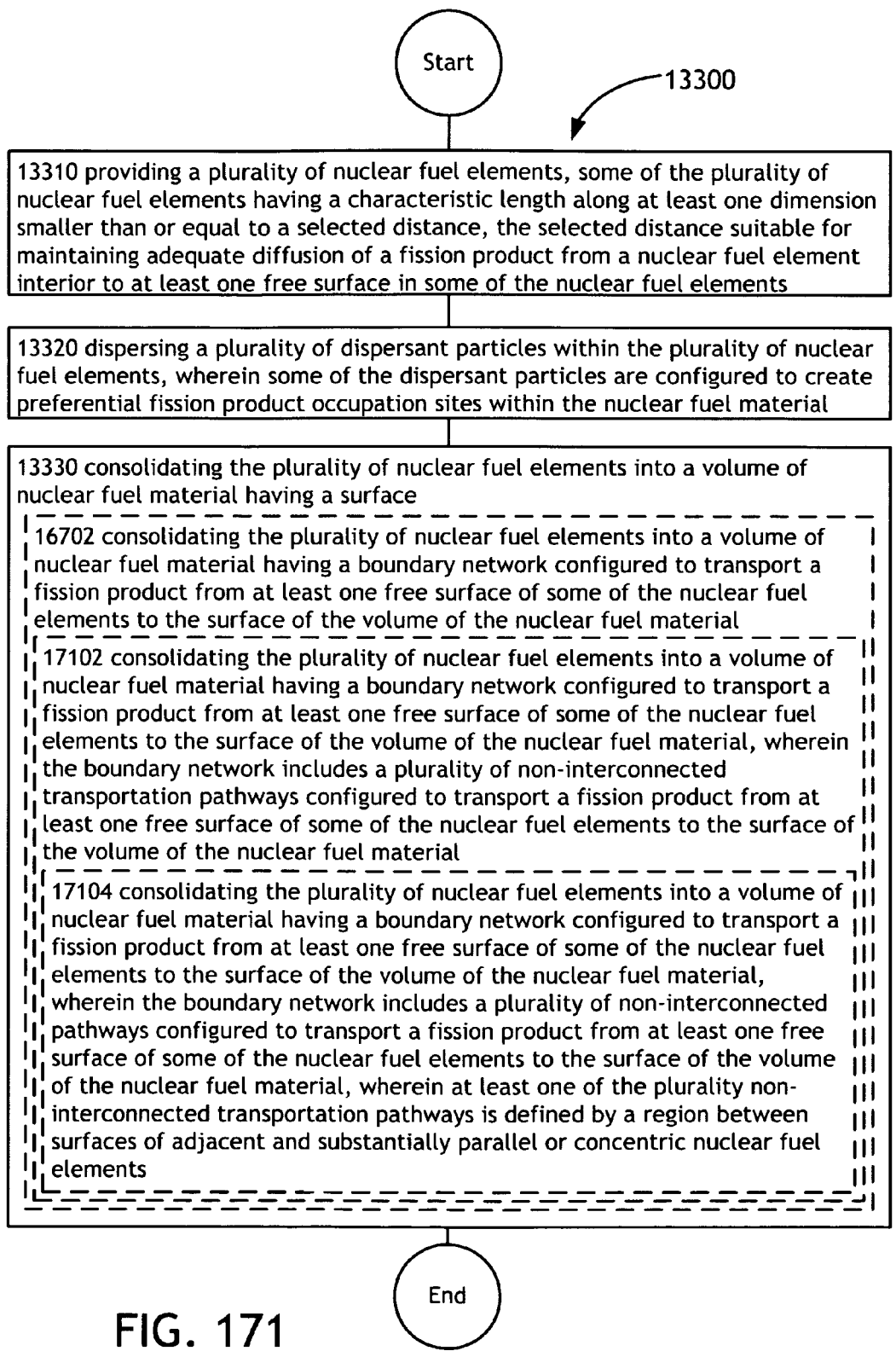

FIG. 171 illustrates alternative embodiments of the example operational flow 13300 of FIG. 133. FIG. 171 illustrates example embodiments where the operation 13330 may include at least one additional operation. Additional operations may include an operation 17102, and/or an operation 17104.

Further, the operation 17102 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of non-interconnected transportation pathways configured to transport a fission product from at least one free surface of some of the nuclear fuel elements to the surface of the volume of the nuclear fuel material. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 configured to transport a fission product 118 from the surfaces 212 of the nuclear fuel elements 204 to the geometric surface 201 of the nuclear fuel 200.

Further, the operation 17104 illustrates consolidating the plurality of nuclear fuel elements into a volume of nuclear fuel material having a boundary network configured to transport a fission product from at least one free surface of some of the nuclear fuel elements to the surface of the volume of the nuclear fuel material, wherein the boundary network includes a plurality of non-interconnected pathways configured to transport a fission product from at least one free surface of some of the nuclear fuel elements to the surface of the volume of the nuclear fuel material, wherein at least one of the plurality non-interconnected transportation pathways is defined by a region between surfaces of adjacent and substantially parallel or concentric nuclear fuel elements. For example, as shown in FIGS. 1A through 4, the nuclear fuel elements 204 may be consolidated via a mechanical process configured to provide spatial configuration within the consolidated nuclear fuel 200 suitable for producing a boundary network 214 having plurality of non-interconnected transportation pathways 214 defined by a region between surfaces of adjacent and substantially parallel or concentric nuclear fuel elements 204.

Figure 172:
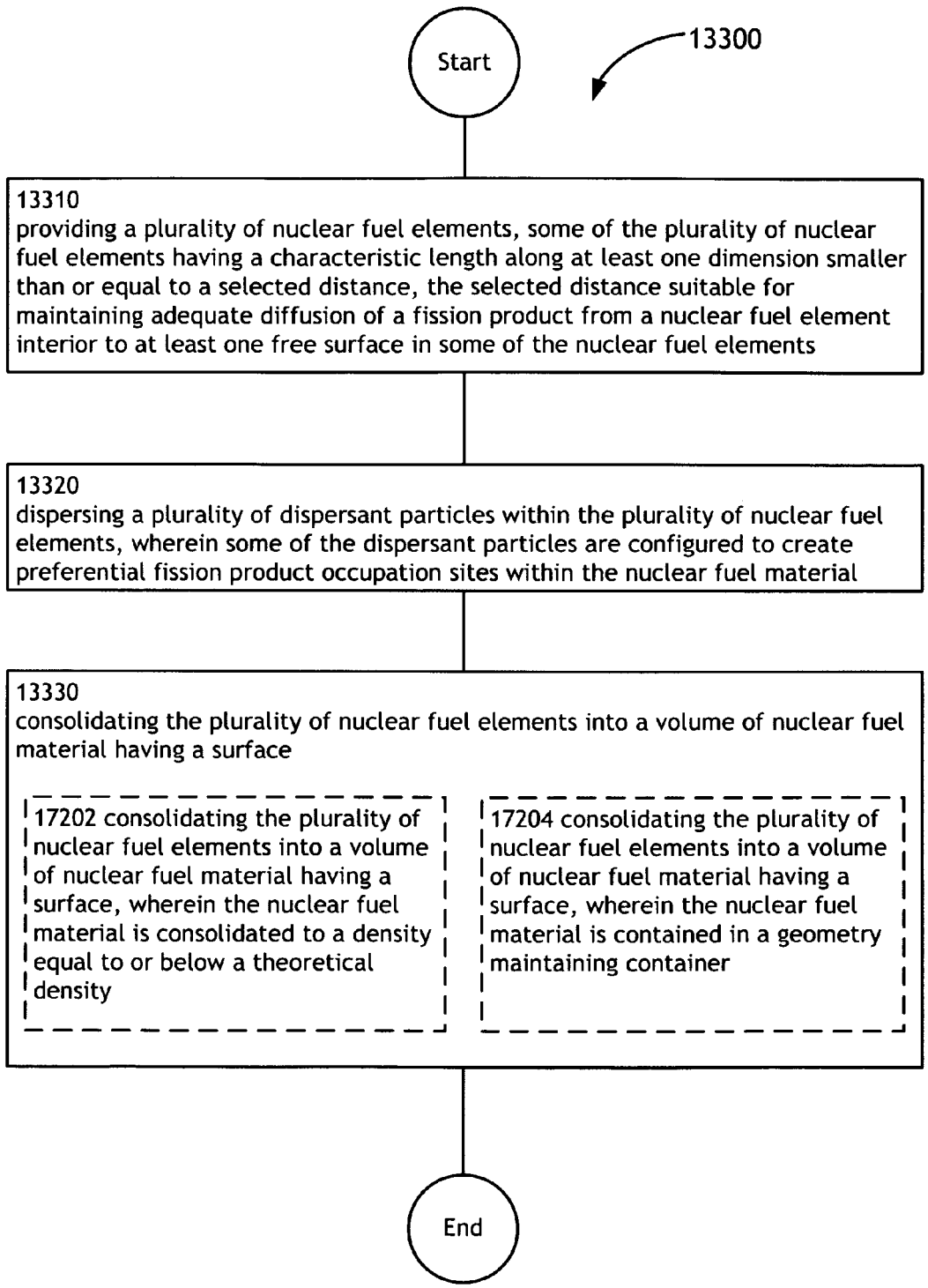

FIG. 172 illustrates alternative embodiments of the example operational flow 13300 of FIG. 133. FIG. 172 illustrates example embodiments where the operation 13330 may include at least one additional operation. Additional operations may include an operation 17202, and/or an operation 17204.

The operation 17202 illustrates consolidating the plurality of nuclear fuel elements into a volume of nuclear fuel material having a surface, wherein the nuclear fuel material is consolidated to a density equal to or below a theoretical density. For example, as shown in FIGS. 1A through 4, the consolidation process (e.g., compacting, sintering, or the like) used to create the volume 202 of consolidated nuclear fuel 200 may produce a nuclear fuel piece having a selected density, wherein the selected density is less than the theoretical density. For instance, the nuclear fuel 200 may be consolidated to a density of 95% of the theoretical density.

The operation 17204 illustrates consolidating the plurality of nuclear fuel elements into a volume of nuclear fuel material having a surface, wherein the nuclear fuel material is contained in a geometry maintaining container. For example, as shown in FIGS. 1A through 4, the plurality of nuclear fuel elements 204 may be compacted into a fuel containing vessel or container suitable for maintaining the shape of the nuclear fuel piece.

Figure 173:
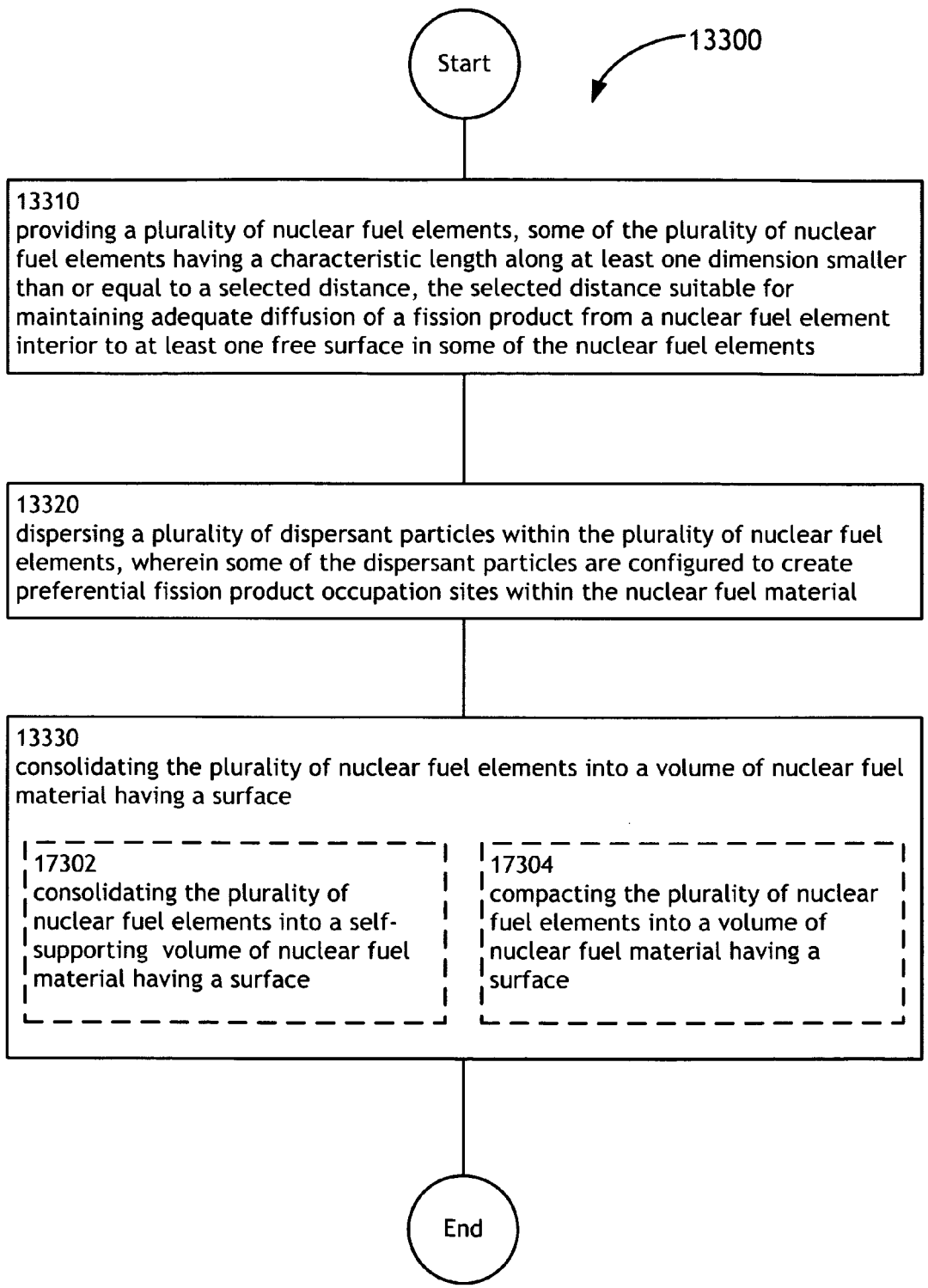

FIG. 173 illustrates alternative embodiments of the example operational flow 13300 of FIG. 133. FIG. 173 illustrates example embodiments where the operation 13330 may include at least one additional operation. Additional operations may include an operation 17302, and/or an operation 17304.

The operation 17302 illustrates consolidating the plurality of nuclear fuel elements into a self-supporting volume of nuclear fuel material having a surface. For example, as shown in FIGS. 1A through 4, a metal oxide powder, such as uranium-dioxide, may be formed into a self-supporting geometry via a compacting and sintering.

The operation 17304 illustrates compacting the plurality of nuclear fuel elements into a volume of nuclear fuel material having a surface. For example, as shown in FIGS. 1A through 4, a plurality of nuclear fuel elements 204, such as a metal oxide powder (e.g., uranium dioxide powder), may be placed in a mold and compacted to form a self-supporting fuel pellet.

Figure 174:
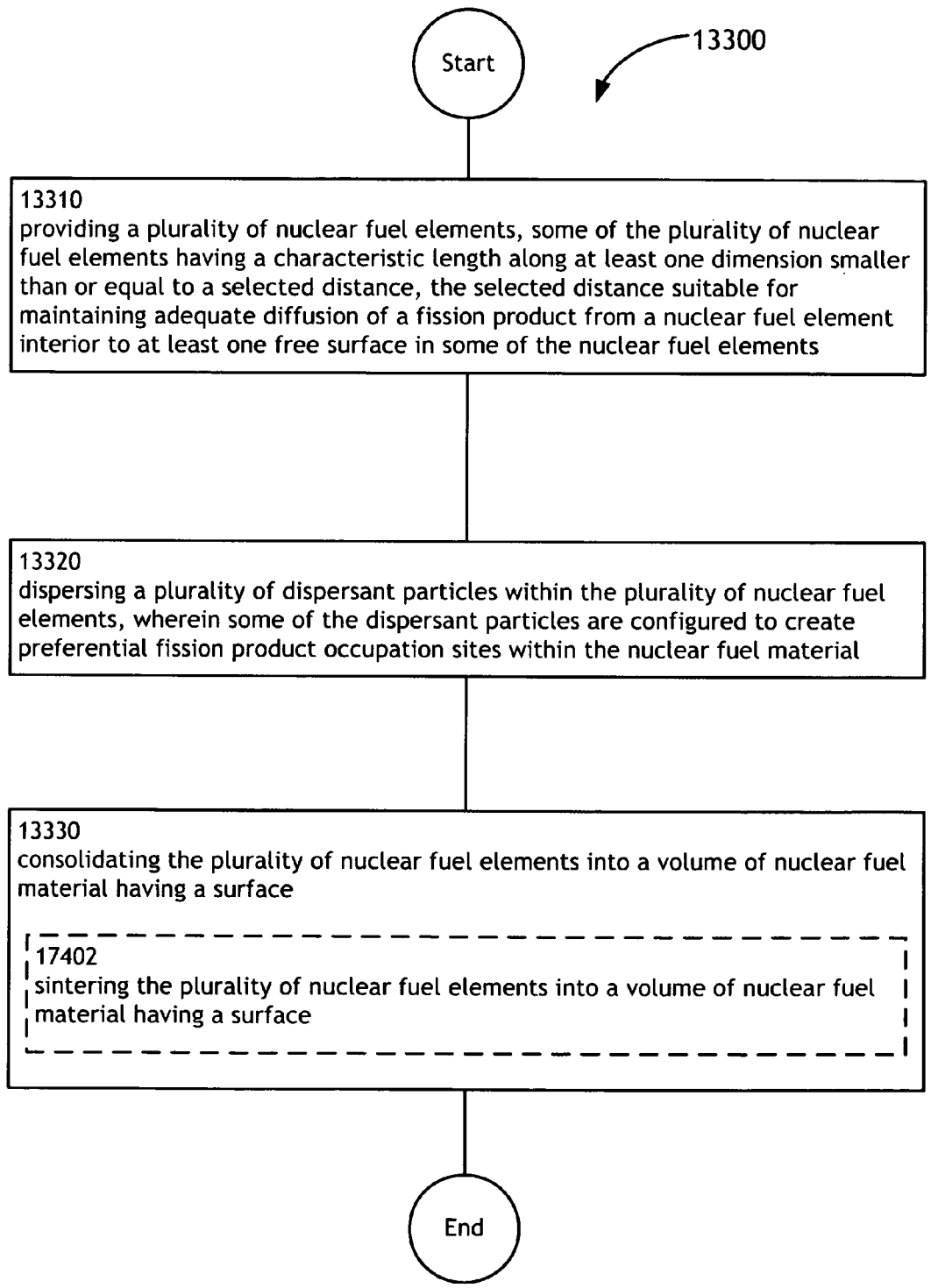

FIG. 174 illustrates alternative embodiments of the example operational flow 13300 of FIG. 133. FIG. 174 illustrates example embodiments where the operation 13330 may include at least one additional operation. Additional operations may include an operation 17402.

The operation 17402 illustrates sintering the plurality of nuclear fuel elements into a volume of nuclear fuel material having a surface. For example, as shown in FIGS. 1A through 4, a plurality of nuclear fuel elements 204, such as a metal oxide powder (e.g., uranium dioxide powder), may be placed in a mold and compacted and sintered to form a self-supporting fuel pellet.

Figure 175:
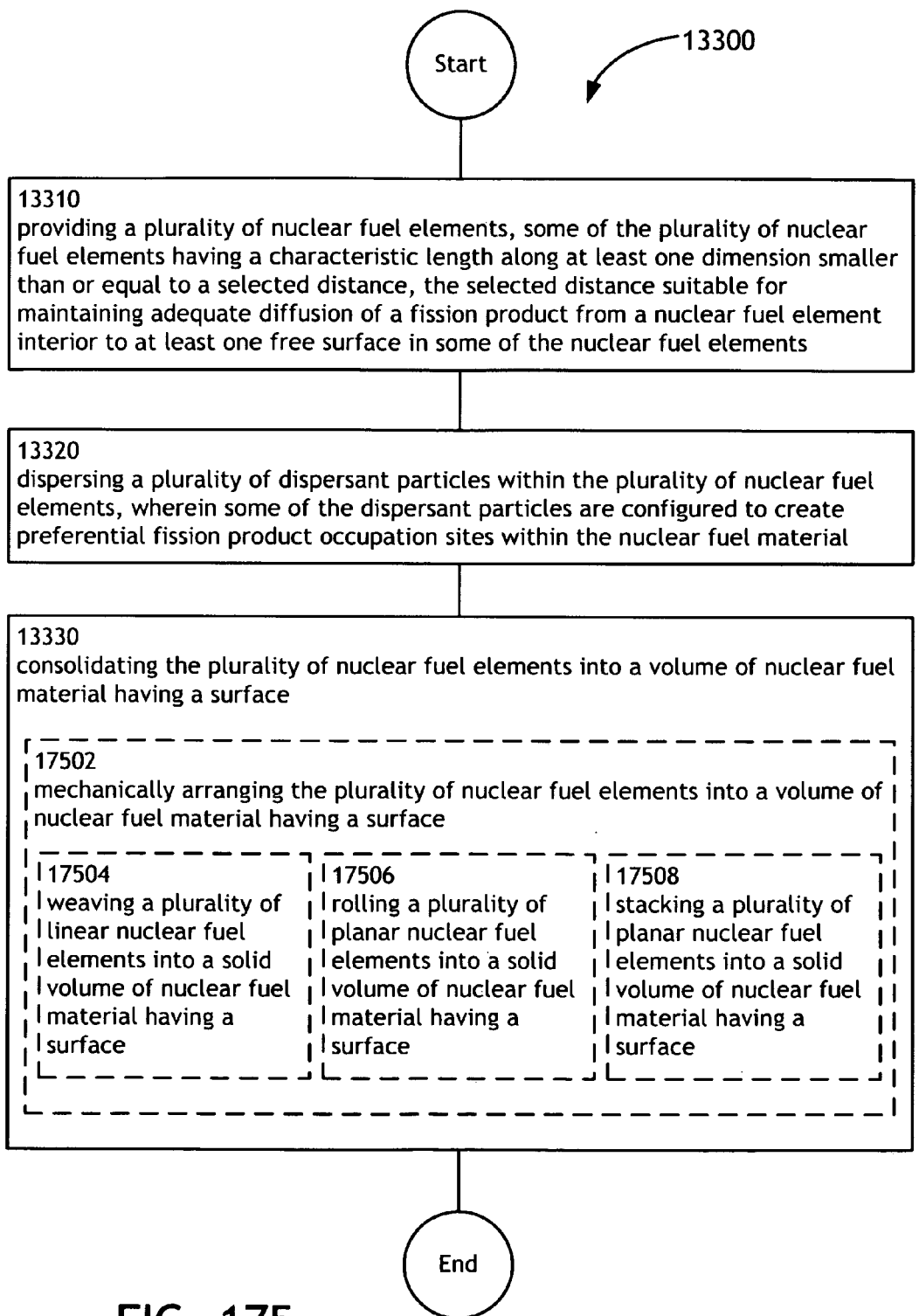

FIG. 175 illustrates alternative embodiments of the example operational flow 13300 of FIG. 133. FIG. 175 illustrates example embodiments where the operation 13330 may include at least one additional operation. Additional operations may include an operation 17502, an operation 17504, an operation 17506, and/or an operation 17508.

The operation 17502 illustrates mechanically arranging the plurality of nuclear fuel elements into a volume of nuclear fuel material having a surface. For example, as shown in FIGS. 1A through 4, a plurality of nuclear fuel elements 204, such as a plurality of metal (e.g., thorium) or metal alloy (e.g., uranium alloy) nuclear fuel elements, may be mechanically arranged into a volume 202 of nuclear fuel 200.

Further, the operation 17504 illustrates weaving a plurality of linear nuclear fuel elements into a solid volume of nuclear fuel material having a surface. For example, as shown in FIG. 2J, a plurality of nuclear fuel elements 204, such as a plurality of metal (e.g., thorium) or metal alloy (e.g., uranium alloy) nuclear fuel elements, may be woven into a woven structure 224 of nuclear fuel 200.

Further, the operation 17506 illustrates rolling a plurality of planar nuclear fuel elements into a solid volume of nuclear fuel material having a surface. For example, as shown in FIG. 2I, a nuclear fuel element 204, such as a metal or metal alloy planar sheet, may be rolled into a cylindrical volume 222. It is further recognized that two or more of the cylindrical rolled volumes 222 may be combined to form a nuclear fuel 200.

Further, the operation 17508 illustrates stacking a plurality of planar nuclear fuel elements into a solid volume of nuclear fuel material having a surface. For example, as shown in FIG. 2H, two or more nuclear fuel elements 204, such as a metal or metal alloy planar sheet, may be stacked together in order to form a volume of nuclear fuel 200.

Figure 176:
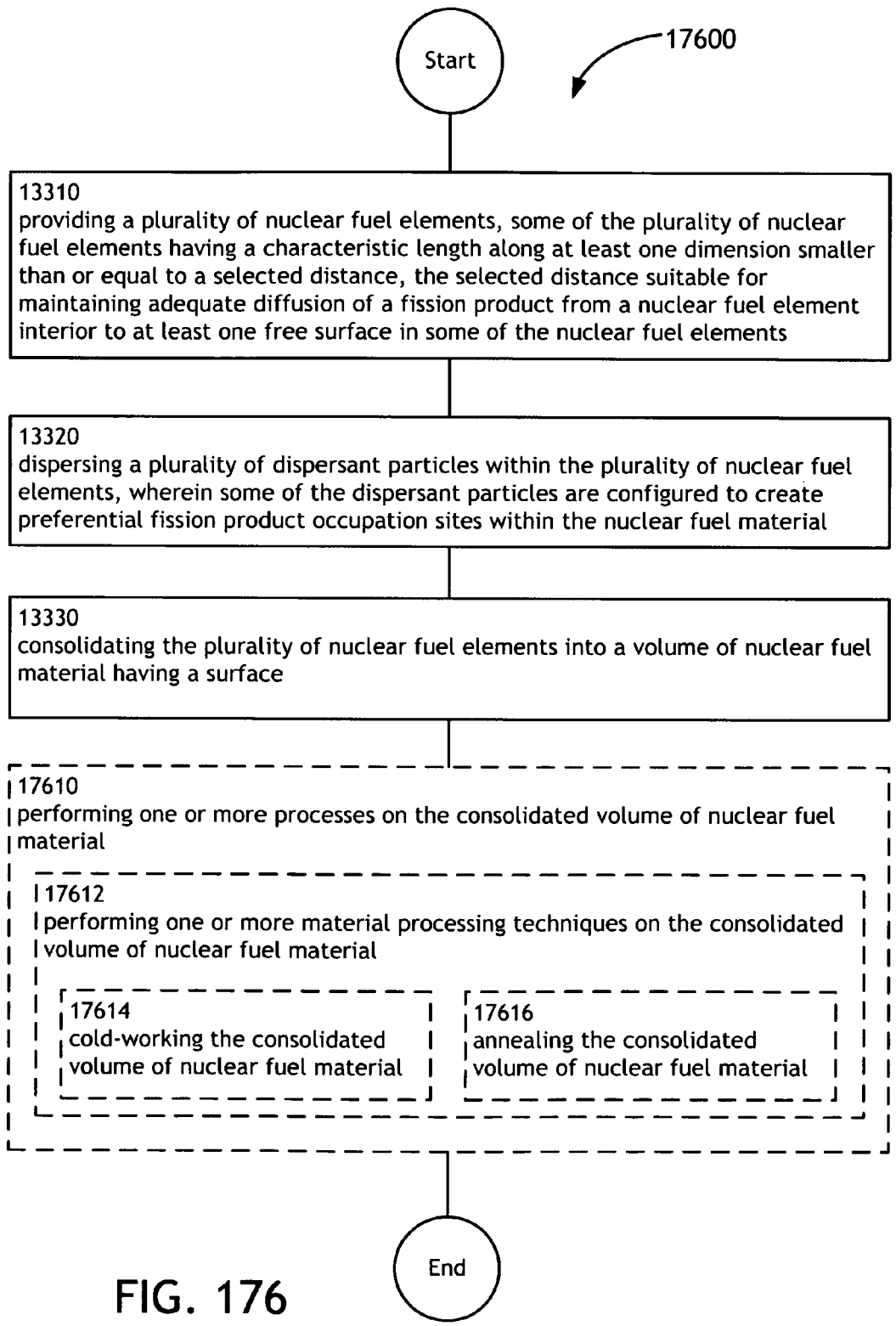

FIG. 176 illustrates an operational flow 17600 representing example operations related to a method for fabricating a nuclear fuel. FIG. 176 illustrates an example embodiment where the example operational flow 13300 of FIG. 133 may include at least one additional operation. Additional operations may include an operation 17610, an operation 17612, an operation 17614, and/or an operation 17616.

After a start operation, a providing operation 13310, a dispersing operation 13320, and a consolidation operation 13330, the operational flow 17600 moves to a processing operation 17610. Operation 17610 illustrates performing one or more processes on the consolidated volume of nuclear fuel material. For example, as shown in FIGS. 1A through 4, one or more processing techniques may be performed on the volume 202 of nuclear fuel 200 in order to further refine the sizes of the nuclear elements 204 or the boundary network 214 of the nuclear fuel 200.

The operation 17612 illustrates performing one or more material processing techniques on the consolidated volume of nuclear fuel material. For example, as shown in FIGS. 1A through 4, one or more material processing techniques may be performed on the volume 202 of nuclear fuel 200 in order to further refine the sizes of the nuclear elements 204 or the boundary network 214 of the nuclear fuel 200.

Further, the operation 17614 illustrates cold-working the consolidated volume of nuclear fuel material. For example, as shown in FIGS. 1A through 4, the consolidated volume 202 of nuclear fuel 200 may be cold-worked in order to further refine the sizes of the nuclear elements 204 or the boundary network 214 of the nuclear fuel 200. The cold-working process may include, but is not limited to, cold-rolling, extruding at low temperature, bending, compression, or drawing.

Further, the operation 17616 illustrates annealing the consolidated volume of nuclear fuel material. For example, as shown in FIGS. 1A through 4, the consolidated volume 202 of nuclear fuel material may be annealed. For instance, after being cold-worked, the nuclear reactor fuel 200 may be annealed in order to further refine the sizes of the nuclear elements 204 or the boundary network 214 of the nuclear fuel 200.

Figure 177:
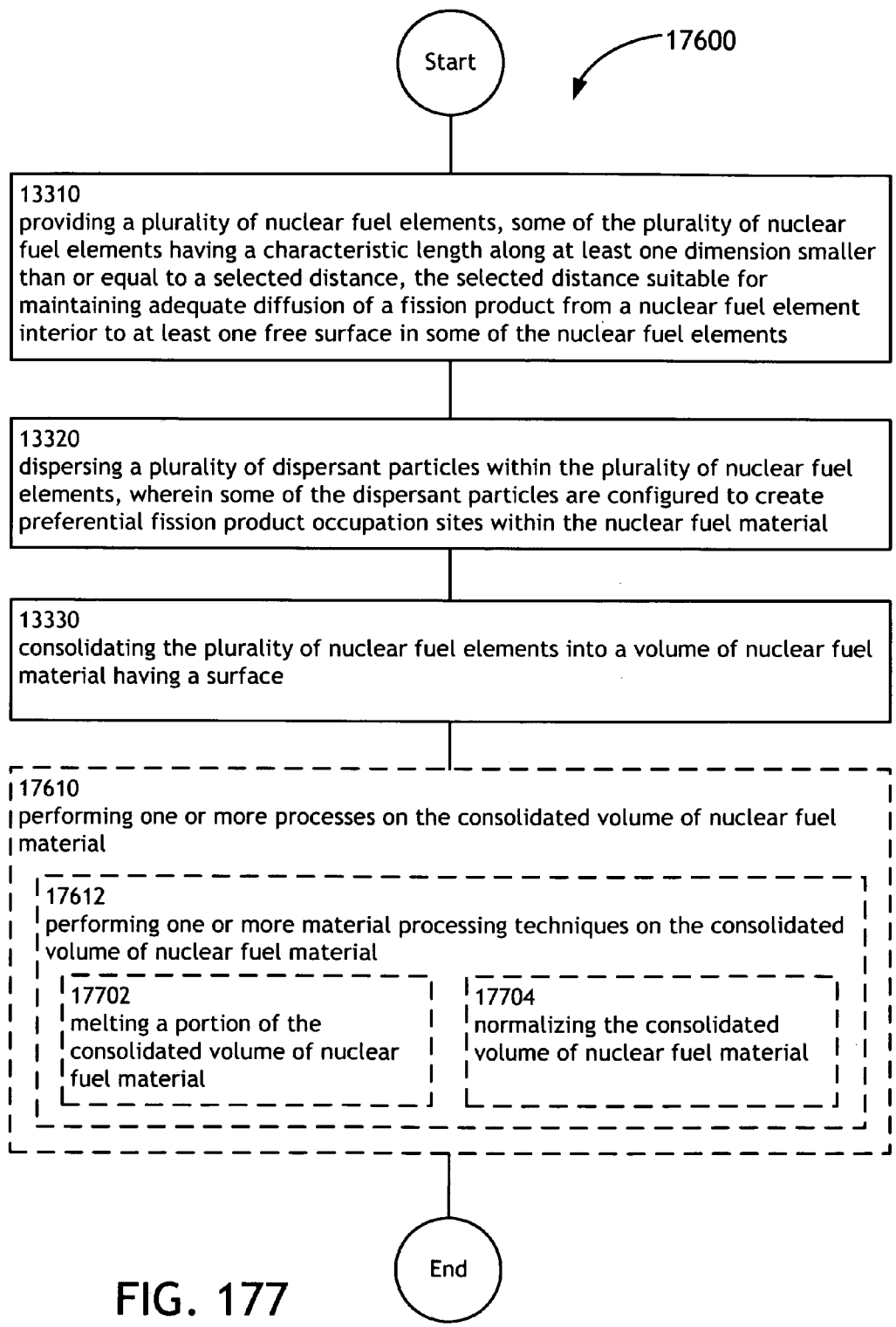

FIG. 177 illustrates alternative embodiments of the example operational flow 17600 of FIG. 176. FIG. 177 illustrates example embodiments where the operation 17610 may include at least one additional operation. Additional operations may include an operation 17702, and/or an operation 17704.

Further, the operation 17702 illustrates melting a portion of the consolidated volume of nuclear fuel material. For example, as shown in FIGS. 1A through 4, a portion of the consolidated volume 202 of nuclear fuel 200 may be melted.

Further, the operation 17704 illustrates normalizing the consolidated volume of nuclear fuel material. For example, as shown in FIGS. 1A through 4, the consolidated volume 202 of nuclear fuel 200 may be normalized in order to further refine the sizes of the nuclear elements 204 or the boundary network 214 of the nuclear fuel 200.

FIG. 61 illustrates alternative embodiments of the example operational flow 5900 of FIG. 59. FIG. 61 illustrates example embodiments where the operation 5910 may include at least one additional operation. Additional operations may include an operation 6102, and/or an operation 6104.

Figure 178:
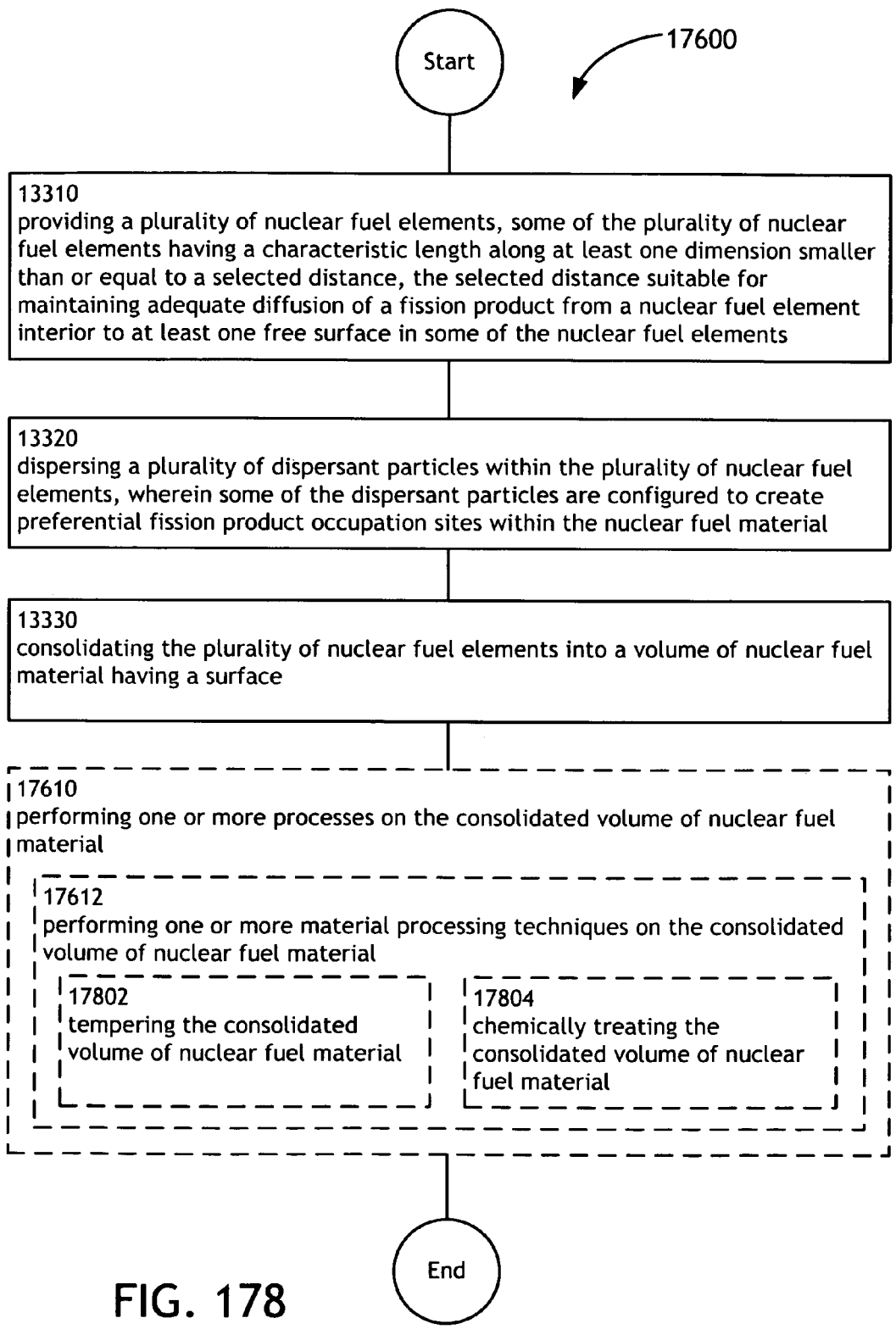

FIG. 178 illustrates alternative embodiments of the example operational flow 17600 of FIG. 176. FIG. 178 illustrates example embodiments where the operation 17610 may include at least one additional operation. Additional operations may include an operation 17802, and/or an operation 17804.

Further, the operation 17802 illustrates tempering the consolidated volume of nuclear fuel material. For example, as shown in FIGS. 1A through 4, the consolidated volume 202 of nuclear fuel 200 may be tempered in order to further refine the sizes of the nuclear elements 204 or the boundary network 214 of the nuclear fuel 200.

Further, the operation 17804 illustrates chemically treating the consolidated volume of nuclear fuel material. For example, as shown in FIGS. 1A through 4, the consolidated volume 202 of nuclear fuel 200 may be chemically treated in order to further refine the sizes of the nuclear elements 204 or the boundary network 214 of the nuclear fuel 200.

Figure 179:
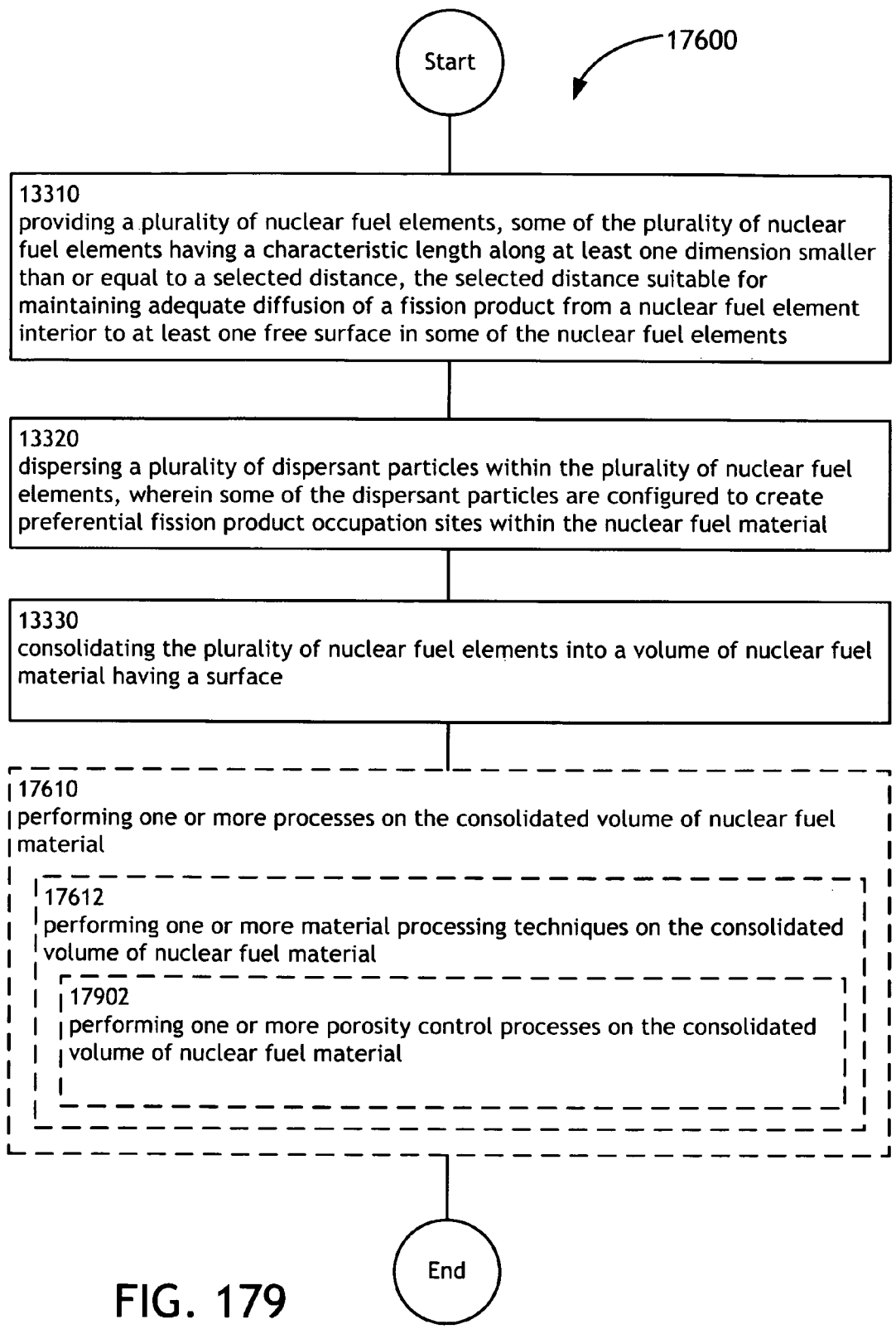

FIG. 179 illustrates alternative embodiments of the example operational flow 17600 of FIG. 176. FIG. 179 illustrates example embodiments where the operation 17610 may include at least one additional operation. Additional operations may include an operation 17902.

Further, the operation 17902 illustrates performing one or more porosity control processes on the consolidated volume of nuclear fuel material. For example, as shown in FIGS. 1A through 4, the consolidated volume 202 of nuclear fuel 200 may undergo a porosity control process (e.g., annealing or chemical treatment).

Figure 180:
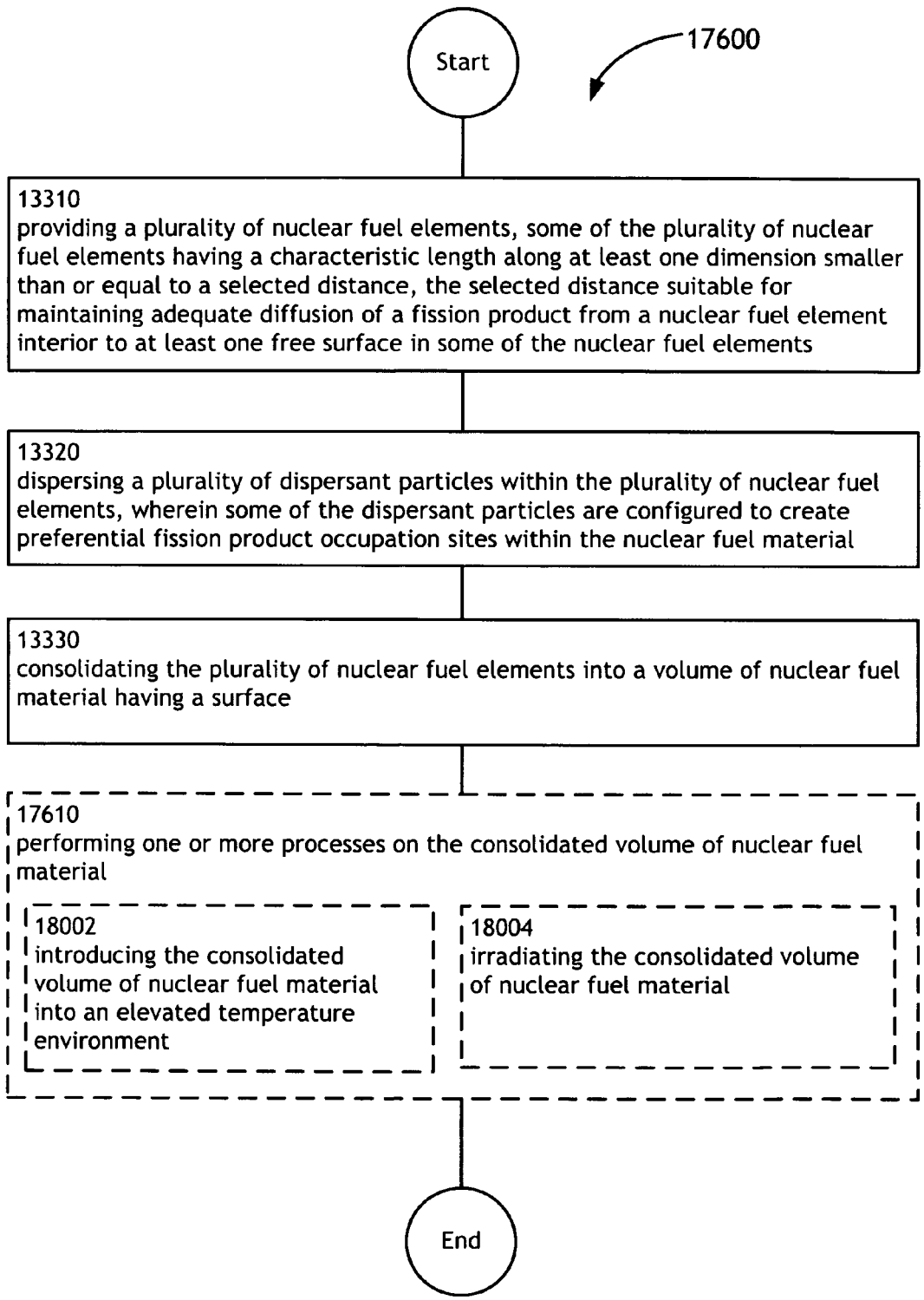

FIG. 180 illustrates alternative embodiments of the example operational flow 17600 of FIG. 176. FIG. 180 illustrates example embodiments where the operation 17610 may include at least one additional operation. Additional operations may include an operation 18002, and/or an operation 18004.

The operation 18002 illustrates introducing the consolidated volume of nuclear fuel material into an elevated temperature environment. For example, as shown in FIGS. 1A through 4, the consolidated volume 202 of nuclear fuel 200 may be introduced into a high temperature environment, such as a operation within a nuclear reactor.

The operation 18004 illustrates irradiating the consolidated volume of nuclear fuel material. For example, as shown in FIGS. 1A through 4, the consolidated volume 202 of nuclear fuel 200 may be irradiated (e.g., irradiated in nuclear reactor implementation or irradiated via neutron source) in order to refine the sizes of the nuclear fuel elements 204 or the boundary network 114.

Figure 181:
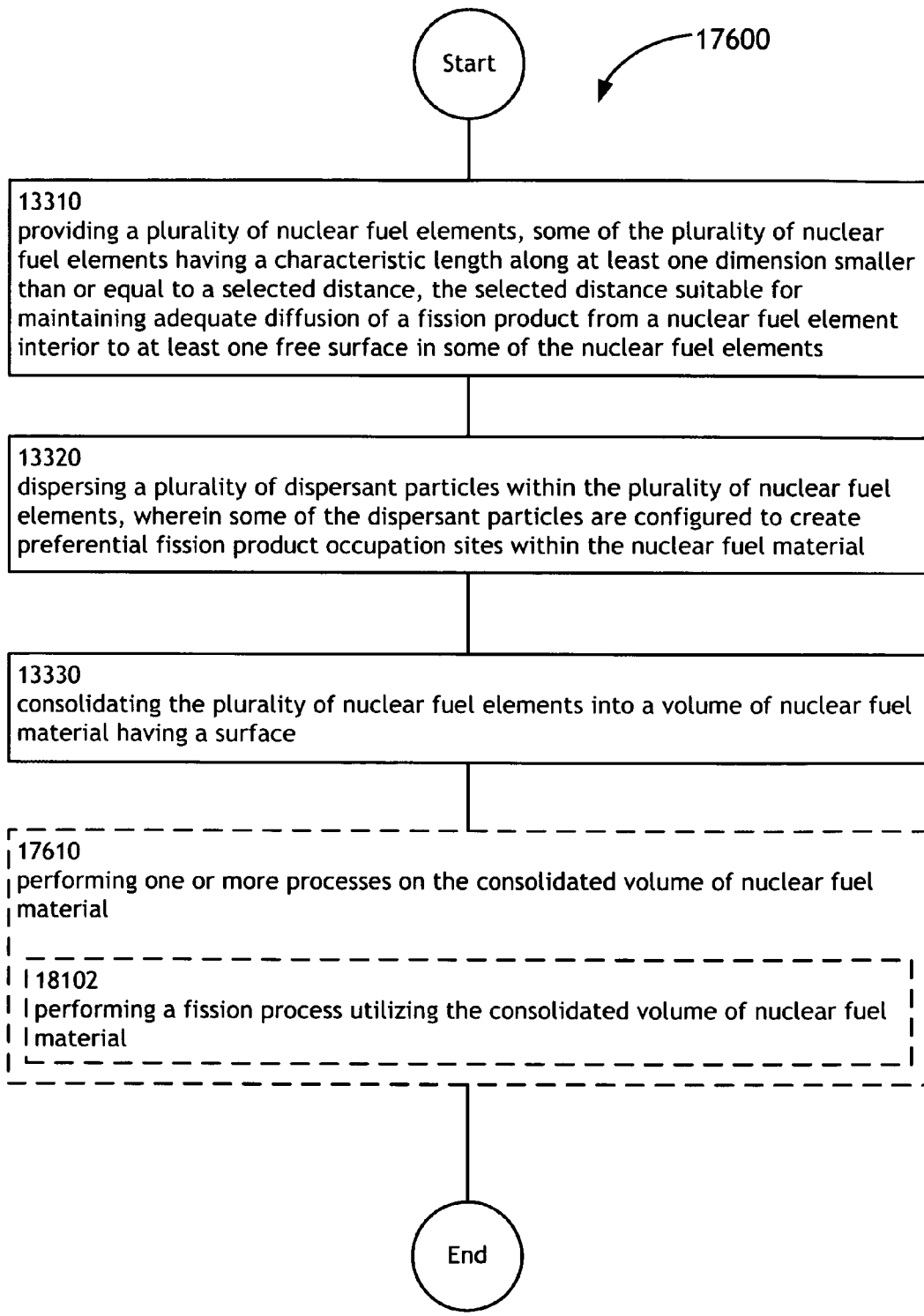

FIG. 181 illustrates alternative embodiments of the example operational flow 17600 of FIG. 176. FIG. 181 illustrates example embodiments where the operation 17610 may include at least one additional operation. Additional operations may include an operation 18102.

The operation 18102 illustrates performing a fission process utilizing the consolidated volume of nuclear fuel material. For example, as shown in FIGS. 1A through 4, the consolidated volume 202 of nuclear fuel 200 may be utilized in a fission process (e.g., utilized in a nuclear reactor). It is recognized that the sizes of the nuclear fission elements 204 may become more refined and/or the boundary network 114 of the nuclear fuel 200 may become more developed upon implementing the nuclear fuel 200 in a nuclear reactor 200.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A nuclear fuel, comprising:
   a volume of a nuclear fuel material defined by a surface, the nuclear fuel material including a plurality of grains, some of the plurality of grains having a characteristic length along at least one dimension smaller than or equal to a selected distance, the selected distance suitable for maintaining adequate diffusion of a fission product from a grain interior to at least one grain boundary in some of the grains, the nuclear fuel material including a boundary network configured to transport the fission product from at least one grain boundary of some of the grains to the surface of the volume of the nuclear fuel material.

2. The nuclear fuel of claim 1, wherein the fission product comprises:
a gaseous fission product, a liquid fission product, or a solid fission product.

3. The nuclear fuel of claim 1, wherein the characteristic length along at least one dimension smaller than or equal to a selected distance of some of the plurality of grains is at least partially achieved via a material processing technique.

4. The nuclear fuel of claim 3, wherein the characteristic length along at least one dimension smaller than or equal to a selected distance of some of the plurality of grains is at least partially achieved via at least one of a cold-working process, an annealing process, a normalization process, a mechanical process, a chemical treatment process or a tempering process.

5. The nuclear fuel of claim 1, wherein the characteristic length along at least one dimension smaller than or equal to a selected distance of some of the plurality of grains is at least partially achieved via an elevated temperature environment.

6. The nuclear fuel of claim 1, wherein the characteristic length along at least one dimension smaller than or equal to a selected distance of some of the plurality of grains is at least partially achieved via irradiation.

7. The nuclear fuel of claim 1, wherein some of the plurality of grains have a selected grain texture, wherein the grain texture is controlled via a grain texture control process.

8. The nuclear fuel of claim 1, wherein the nuclear fuel material has a selected porosity, wherein the porosity is controlled via a porosity control process.

9. The nuclear fuel of claim 1, wherein the characteristic length along at least one dimension smaller than or equal to a selected distance of some of the plurality of grains is at least partially achieved prior to a fission reaction process of the nuclear fuel material.

10. The nuclear fuel of claim 1, wherein the characteristic length along at least one dimension smaller than or equal to a selected distance of some of the plurality of grains is at least partially achieved during a fission reaction process of the nuclear fuel material.

11. The nuclear fuel of claim 1, wherein the characteristic length along at least one dimension of some of the plurality of grains comprises:
a characteristic length along a selected dimension of some of the plurality of grains.

12. The nuclear fuel of claim 1, wherein the characteristic length along at least one dimension of some of the plurality of grains comprises:
a characteristic length of some of the plurality of grains along a selected direction.

13. The nuclear fuel of claim 1, wherein some of the plurality of grains have an average characteristic length along a selected dimension smaller than or equal to a selected distance.

14. The nuclear fuel of claim 1, wherein some of the plurality of grains have an average characteristic length along a selected direction smaller than or equal to a selected distance.

15. The nuclear fuel of claim 1, wherein at least a portion of the plurality of grains has a selected statistical distribution of characteristic lengths.

16. The nuclear fuel of claim 1, wherein at least a portion of the plurality of grains has a selected set of distributions of characteristic lengths.

17. The nuclear fuel of claim 1, wherein the selected distance is a function of an operational condition of the nuclear fuel material.

18. The nuclear fuel of claim 1, wherein the selected distance is a function of a chemical composition of the nuclear fuel material.

19. The nuclear fuel of claim 1, wherein the selected distance is a function of a fission product generation rate in the nuclear fuel material.

20. The nuclear fuel of claim 1, wherein the at least one dimension is selected to maximize heat transfer from a grain interior to a grain boundary in some of the grains.

21. The nuclear fuel of claim 20, wherein the at least one dimension is selected to be substantially parallel with a thermal gradient in a grain interior in some of the grains.

22. The nuclear fuel of claim 1, wherein the selected distance suitable for maintaining adequate diffusion of a fission product comprises:
a selected distance suitable for maintaining a diffusion level necessary to maintain a fission product concentration within the volume of a nuclear fuel material at or below a selected level.

23. The nuclear fuel of claim 1, wherein the boundary network of the nuclear fuel material is at least partially achieved via a material processing technique.

24. The nuclear fuel of claim 23, wherein the boundary network of the nuclear fuel material is at least partially achieved via at least one of a cold-working process, an annealing process, a normalization process, a mechanical process, a tempering process, or a chemical treatment process.

25. The nuclear fuel of claim 1, wherein the boundary network of the nuclear fuel material is at least partially achieved via a porosity control process.

26. The nuclear fuel of claim 1, wherein the boundary network of the nuclear fuel material is at least partially achieved via a grain texture control process.

27. The nuclear fuel of claim 1, wherein the boundary network of the nuclear fuel material is at least partially achieved via an elevated temperature environment.

28. The nuclear fuel of claim 1, wherein the boundary network of the nuclear fuel material is at least partially achieved via irradiation.

29. The nuclear fuel of claim 1, wherein the boundary network of the nuclear fuel material is at least partially achieved prior to a fission reaction process of the nuclear fuel material.

30. The nuclear fuel of claim 1, wherein the boundary network of the nuclear fuel material is at least partially achieved during a fission reaction process of the nuclear fuel material.

31. The nuclear fuel of claim 1, wherein the characteristic length along at least one dimension of some of the plurality of grains and formation of the boundary network of the nuclear fuel material are at least partially achieved simultaneously in a fabrication process.

32. The nuclear fuel of claim 1, wherein the boundary network of the nuclear fuel material includes at least one transportation pathway arranged to transport the fission product from at least one grain boundary of at least one of the plurality of grains to the surface of the volume of the nuclear fuel material.

33. The nuclear fuel of claim 32, wherein the at least one transportation pathway arranged to transport the fission product from the at least one grain boundary of at least one of the plurality of grains to the surface of the volume of the nuclear fuel material is defined by a region between two or more adjacent grains.

34. The nuclear fuel of claim 32, wherein the at least one transportation pathway arranged to transport the fission product from the at least one grain boundary of at least one of the plurality of grains to the surface of the volume of the nuclear fuel material intersects with the at least one grain boundary.

35. The nuclear fuel of claim 1, wherein the boundary network of the nuclear fuel material comprises:
a plurality of interconnected transportation pathways arranged to transport the fission product from at least one grain boundary of at least one of the plurality of grains to the surface of the volume of the nuclear fuel material.

36. The nuclear fuel of claim 35, wherein at least one of the plurality of interconnected transportation pathways arranged to transport the fission product from at least one grain boundary of at least one of the plurality of grains to the surface of the volume of the nuclear fuel material is defined by a grain boundary between two or more adjacent grains.

37. The nuclear fuel of claim 35, wherein at least one of the plurality of interconnected transportation pathways arranged to transport the fission product from at least one grain boundary of at least one of the plurality of grains to the surface of the volume of the nuclear fuel material is defined by one or more void regions.

38. The nuclear fuel of claim 1, wherein some of the plurality of grains comprise:
a grain having an interfacial layer, wherein the interfacial layer includes a material different from the material of the grain interior.

39. The nuclear fuel of claim 1, wherein the nuclear fuel material comprises:
a ceramic nuclear fuel material.

40. The nuclear fuel of claim 39, wherein the ceramic nuclear fuel material comprises at least one of an oxide nuclear fuel material, a carbide nuclear fuel material, or a nitride nuclear fuel material.

41. The nuclear fuel of claim 39, wherein the nuclear fuel material comprises:
a mixed oxide nuclear fuel material.

42. The nuclear fuel of claim 1, wherein the nuclear fuel material comprises at least one of a metal nuclear fuel material, a metal alloy nuclear fuel material, or an intermetallic nuclear fuel material.

43. The nuclear fuel of claim 1, wherein the nuclear fuel material includes at least one of a uranium isotope, a plutonium isotope, or a thorium isotope.

44. The nuclear fuel of claim 1, wherein the nuclear fuel material has a density equal to or below a theoretical density.

45. The nuclear fuel of claim 1, wherein the volume of a nuclear fuel material comprises:
a volume of a nuclear fuel contained in a geometry maintaining container.

46. The nuclear fuel of claim 1, wherein the volume of a nuclear fuel material comprises:
a self-supporting volume of a nuclear fuel material.

47. A method for fabricating a nuclear fuel, comprising:
providing a nuclear fuel material, the nuclear fuel material consolidated into a solid volume of nuclear fuel material having a surface, the consolidated nuclear fuel material including a plurality of grains; and
performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains.

48. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:
performing one or more material processing techniques on the consolidated volume of nuclear fuel material.

49. The method of claim 48, wherein the performing one or more material processing techniques on the consolidated volume of nuclear fuel material comprises:
cold-working the consolidated volume of nuclear fuel material.

50. The method of claim 48, wherein the performing one or more material processing techniques on the consolidated volume of nuclear fuel material comprises:
annealing the consolidated volume of nuclear fuel material.

51. The method of claim 48, wherein the performing one or more material processing techniques on the consolidated volume of nuclear fuel material comprises:
normalizing the consolidated volume of nuclear fuel material.

52. The method of claim 48, wherein the performing one or more material processing techniques on the consolidated volume of nuclear fuel material comprises:
tempering the consolidated volume of nuclear fuel material.

53. The method of claim 48, wherein the performing one or more material processing techniques on the consolidated volume of nuclear fuel material comprises:
performing one or more mechanical treatment processes on the consolidated volume of nuclear fuel material.

54. The method of claim 48, wherein the performing one or more material processing techniques on the consolidated volume of nuclear fuel material comprises:
chemically treating the consolidated volume of nuclear fuel material.

55. The method of claim 48, wherein the performing one or more material processing techniques on the consolidated volume of nuclear fuel material comprises:
performing one or more porosity control processes on the consolidated volume of nuclear fuel material.

56. The method of claim 48, wherein the performing one or more material processing techniques on the consolidated volume of nuclear fuel material comprises:
performing one or more grain texture control processes on the consolidated volume of nuclear fuel material.

57. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

introducing the consolidated volume of nuclear fuel material into an elevated temperature environment.

58. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

irradiating the consolidated volume of nuclear fuel material.

59. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing a fission process utilizing the consolidated volume of nuclear fuel material.

60. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along a selected dimension of some of the grains smaller than or equal to a selected distance.

61. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along a selected direction of some of the grains smaller than or equal to a selected distance.

62. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain an average characteristic length along a selected dimension of some of the grains smaller than or equal to a selected distance.

63. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain an average characteristic length along a selected direction of some of the grains smaller than or equal to a selected distance.

64. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a selected statistical distribution of characteristic lengths.

65. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a selected set of statistical distributions of characteristic lengths.

66. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance, wherein the selected distance is a function of an operation condition of the nuclear fuel material.

67. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance, wherein the selected distance is a function of a chemical composition of the nuclear fuel material.

68. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance, wherein the selected distance is a function of a fission product generation rate of the nuclear fuel material.

69. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance, wherein the at least one dimension is selected to maximize heat transfer from a grain interior to a grain boundary in some of the grains.

70. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining a diffusion level necessary to maintain a fission product concentration within the volume of a nuclear fuel material at or below a selected level.

71. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining a diffusion level necessary to maintain a fission product concentration within the volume of a nuclear fuel material at or below a concentration required for nucleation of the fission product.

72. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:

performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material.

73. The method of claim 72, wherein the performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material comprises:
  performing one or more processes on the consolidated volume of nuclear fuel material in order to obtain a characteristic length along at least one dimension of some of the grains smaller than or equal to a selected distance and a boundary network having at least one transportation pathway configured to transport a fission product from at least one grain boundary of some of the grains to the surface of the volume of the nuclear fuel material, wherein the transportation pathway is defined by a region between two or more adjacent grains.

74. The method of claim 47, wherein the performing one or more processes on the consolidated volume of nuclear fuel material in order to obtain a characteristic length along at least one dimension of some of the grains smaller than or equal to a selected distance and a boundary network configured to transport a fission product from at least one grain boundary of some of the grains to the surface of the volume of the nuclear fuel material, wherein the selected distance is suitable for maintaining adequate diffusion of a fission product from a grain interior to at least one grain boundary in some of the grains comprises:
  performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material.

75. The method of claim 74, wherein the performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material comprises:
  performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material, wherein at least one of the plurality interconnected transportation pathways is defined by a region between two or more adjacent grains.

76. The method of claim 74, wherein the performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material comprises:
  performing one or more processes on the consolidated volume of nuclear fuel material in order to obtain a characteristic length along at least one dimension of some of the grains smaller than or equal to a selected distance and a boundary network having a plurality of interconnected pathways configured to transport a fission product from at least one grain boundary of some of the grains to the surface of the volume of the nuclear fuel material, wherein at least one of the plurality interconnected transportation pathways is defined by one or more void regions.

77. The method of claim 47, wherein the providing a nuclear fuel material, the nuclear fuel material consolidated into a solid volume of nuclear fuel material having a surface, the consolidated nuclear fuel material including a plurality of grains comprises:
  providing a nuclear fuel material, the nuclear fuel material consolidated into a solid volume of nuclear fuel material having a surface, the consolidated nuclear fuel material including a plurality of grains, wherein some of the plurality of grains have an interfacial layer including a material different from the material of a grain interior.

78. The method of claim 47, wherein the providing a nuclear fuel material, the nuclear fuel material consolidated into a solid volume of nuclear fuel material having a surface, the consolidated nuclear fuel material including a plurality of grains comprises:
  providing a ceramic nuclear fuel material, the ceramic nuclear fuel material consolidated into a solid volume of nuclear fuel material having a surface, the consolidated nuclear fuel material including a plurality of grains.

79. The method of claim 47, wherein the providing a nuclear fuel material, the nuclear fuel material consolidated into a solid volume of nuclear fuel material having a surface, the consolidated nuclear fuel material including a plurality of grains comprises:
  providing a metal nuclear fuel material, a metal alloy nuclear fuel material nuclear fuel material, or an intermetallic nuclear fuel material consolidated into a solid volume of nuclear fuel material having a surface, the consolidated nuclear fuel material including a plurality of grains.

80. The method of claim 47, wherein the providing a nuclear fuel material, the nuclear fuel material consolidated into a solid volume of nuclear fuel material having a surface, the consolidated nuclear fuel material including a plurality of grains comprises:
  providing a nuclear fuel material including at least one of a uranium isotope, a plutonium isotope, or a thorium isotope, the nuclear fuel material consolidated into a solid volume of nuclear fuel material having a surface, the consolidated nuclear fuel material including a plurality of grains.

81. The method of claim 47, wherein the providing a nuclear fuel material, the nuclear fuel material consolidated into a solid volume of nuclear fuel material having a surface, the consolidated nuclear fuel material including a plurality of grains comprises:
  providing a nuclear fuel material, the nuclear fuel material consolidated into a solid volume having a density equal to or below a theoretical density, the nuclear fuel material having a surface, the consolidated nuclear fuel material including a plurality of grains.

82. The method of claim 47, wherein the providing a nuclear fuel material, the nuclear fuel material consolidated into a solid volume of nuclear fuel material having a surface, the consolidated nuclear fuel material including a plurality of grains comprises:
compacting a nuclear fuel material into a consolidated solid self-supporting volume of nuclear fuel material having a surface, the consolidated nuclear fuel material including a plurality of grains.

83. The method of claim 47, wherein the providing a nuclear fuel material, the nuclear fuel material consolidated into a solid volume of nuclear fuel material having a surface, the consolidated nuclear fuel material including a plurality of grains comprises:
sintering a nuclear fuel material into a consolidated solid self-supporting volume of nuclear fuel material having a surface, the consolidated nuclear fuel material including a plurality of grains.

84. The method of claim 47, wherein the providing a nuclear fuel material, the nuclear fuel material consolidated into a solid volume of nuclear fuel material having a surface, the consolidated nuclear fuel material including a plurality of grains comprises:
casting a nuclear fuel material into a consolidated solid self-supporting volume of nuclear fuel material having a surface, the consolidated nuclear fuel material including a plurality of grains.

85. The method of claim 47, wherein the providing a nuclear fuel material, the nuclear fuel material consolidated into a solid volume of nuclear fuel material having a surface, the consolidated nuclear fuel material including a plurality of grains comprises:
extruding a nuclear fuel material into a consolidated solid self-supporting volume of nuclear fuel material having a surface, the consolidated nuclear fuel material including a plurality of grains.

\* \* \* \* \*